US012496253B2

(12) United States Patent
Taylor

(10) Patent No.: US 12,496,253 B2
(45) Date of Patent: Dec. 16, 2025

(54) METHODS, SYSTEMS, AND/OR DEVICES FOR THERMAL TREATMENTS

(71) Applicant: John Richard Taylor, Irving, TX (US)

(72) Inventor: John Richard Taylor, Irving, TX (US)

( * ) Notice: Subject to any disclaimer, the term of this patent is extended or adjusted under 35 U.S.C. 154(b) by 229 days.

(21) Appl. No.: 18/197,365

(22) Filed: May 15, 2023

(65) Prior Publication Data

US 2023/0390154 A1 Dec. 7, 2023

Related U.S. Application Data

(63) Continuation-in-part of application No. 29/773,825, filed on Mar. 11, 2021, now Pat. No. Des. 1,084,370.

(Continued)

(51) Int. Cl.

*A61H 33/00* (2006.01)

*A61H 33/06* (2006.01)

(52) U.S. Cl.

CPC ..... *A61H 33/6005* (2013.01); *A61H 33/0087* (2013.01); *A61H 2033/061* (2013.01); *A61H 2033/062* (2013.01); *A61H 2205/022* (2013.01)

(58) Field of Classification Search

CPC ............ A61H 33/6005; A61H 33/0087; A61H 2033/061; A61H 2033/062; A61H 2205/022

(Continued)

(56) References Cited

U.S. PATENT DOCUMENTS 1,446,841 A 2/1923 Dietsche
2,475,259 A 7/1949 Singleton (Continued)

FOREIGN PATENT DOCUMENTS

CN 101268984 A 3/2008
CN 114432116 A * 5/2022

(Continued)

OTHER PUBLICATIONS (1) Streff, A.; Kuehl, L.K.; Michaux, G.; Anton, F. Differential physiological effects during tonic painful hand immersion tests using hot and ice water. Eur. J. Pain 2010, 14, 266-272.

(Continued)

*Primary Examiner* — Lori L Baker

(74) *Attorney, Agent, or Firm* — Eric Kelly

(57) ABSTRACT

A soaking device and methods of using are used to cool and/or to heat a face of a person for a purpose of inducing a desired and/or intended outcome in that person. The cooling and/or the heating of the face may be sufficient to induce the desired and/or the intended outcome in that person. The desired and/or intended outcome may relate to: release of at least one type of neurotransmitter; trigeminal nerve stimulation; (indirect) vagus nerve stimulation; trans-dermal drug delivery; bypass of the blood-brain-barrier (BBB); aesthetic medicine; cardiovascular; dermatological; ears, nose, and throat (otolaryngological); ophthalmological; neurological; psychological; endocrinological; and/or rheumatological benefits to that person. At least one step of the method may include receiving at least some of the face within an immersion-liquid for at least a minimum amount of time while the immersion-liquid is within a temperature-range and while the immersion-liquid is within the soaking device.

21 Claims, 119 Drawing Sheets

Related U.S. Application Data

(60) Provisional application No. 63/462,210, filed on Apr. 26, 2023, provisional application No. 63/458,076, filed on Apr. 7, 2023, provisional application No. 63/446,818, filed on Feb. 18, 2023, provisional application No. 63/443,030, filed on Feb. 2, 2023, provisional application No. 63/403,259, filed on Sep. 1, 2022, provisional application No. 63/390,926, filed on Jul. 20, 2022, provisional application No. 63/343,054, filed on May 17, 2022.

(58) Field of Classification Search
USPC .................................................... 4/584, 538
See application file for complete search history.

(56) References Cited

U.S. PATENT DOCUMENTS

| | | | | |
|---|---|---|---|---|
| 3,465,370 | A | 9/1969 | Chemick | |
| 3,733,620 | A | 5/1973 | Glintz | |
| 4,004,302 | A | 1/1977 | Hori | |
| D249,278 | S | 9/1978 | Milligan | |
| 4,152,792 | A | 5/1979 | Glintz | |
| 4,281,423 | A | 8/1981 | Fukunaga | |
| 4,546,504 | A | 10/1985 | Vars | |
| 4,561,979 | A | 12/1985 | Harms | |
| 4,649,580 | A | 3/1987 | Bastien | |
| 4,864,667 | A | 9/1989 | Adams | |
| 5,245,713 | A | 9/1993 | Tickle | |
| 5,381,562 | A | 1/1995 | Holloway | |
| D388,534 | S | 12/1997 | Uemura | |
| D396,982 | S | 8/1998 | Harris | |
| D398,075 | S | 9/1998 | Book | |
| D434,524 | S | 11/2000 | Kalafsky | |
| 6,328,031 | B1 | 12/2001 | Tischer | |
| 6,405,389 | B1 | 6/2002 | Harty | |
| D461,278 | S | 8/2002 | Takechi | |
| D467,965 | S | 12/2002 | Haas | |
| D468,441 | S | 1/2003 | Pham | |
| 6,558,344 | B2 | 5/2003 | McKinnon | |
| 6,609,257 | B1 | 8/2003 | O'Geary | |
| D483,493 | S | 12/2003 | Lie | |
| D484,984 | S | 1/2004 | Takizawa | |
| D491,670 | S | 6/2004 | Leung | |
| D495,059 | S | 8/2004 | Lie | |
| D500,893 | S | 1/2005 | Chang | |
| D522,174 | S | 5/2006 | Jackel-Marken | |
| D551,513 | S | 9/2007 | Fiorella | |
| D566,246 | S | 4/2008 | Cunningham | |
| D569,004 | S | 5/2008 | Cafaro | |
| D573,260 | S | 7/2008 | Dunshee | |
| 7,448,093 | B1 | 11/2008 | Ruck | |
| D583,958 | S | 12/2008 | Usui | |
| D601,707 | S | 10/2009 | Chouiller | |
| 7,608,090 | B2 | 10/2009 | Matsui | |
| 7,641,835 | B2 | 1/2010 | Ramsey | |
| D616,933 | S | 6/2010 | Tegtmeyer | |
| D616,994 | S | 6/2010 | Cummings | |
| D621,330 | S | 8/2010 | Bock | |
| D621,927 | S | 8/2010 | Dominguez | |
| 7,785,303 | B2 | 8/2010 | Tapadiya | |
| D625,823 | S | 10/2010 | Schneider | |
| D627,076 | S | 11/2010 | Matsuo | |
| D628,627 | S | 12/2010 | Halbur | |
| D632,798 | S | 2/2011 | Tran | |
| 7,931,157 | B1 | 4/2011 | Palumbo | |
| D638,170 | S | 5/2011 | Chen | |
| D650,084 | S | 12/2011 | Tran | |
| D670,377 | S | 11/2012 | Adams | |
| D672,086 | S | 12/2012 | Tai | |
| 8,375,478 | B2 | 2/2013 | Luo | |
| D683,040 | S | 5/2013 | Arsenault | |
| D692,149 | S | 10/2013 | Uematsu | |
| D700,708 | S | 3/2014 | Ho | |
| D702,847 | S | 4/2014 | Arsenault | |
| D707,997 | S | 7/2014 | English | |
| D712,558 | S | 9/2014 | Ledbetter | |
| D713,665 | S | 9/2014 | Caforio | |
| D715,002 | S | 10/2014 | Chang | |
| D716,958 | S | 11/2014 | Thomas | |
| D736,939 | S | 8/2015 | McKay | |
| D736,940 | S | 8/2015 | McKay | |
| 9,168,199 | B2 * | 10/2015 | Li | A61M 35/00 |
| D757,280 | S | 5/2016 | Ogaki | |
| D757,282 | S | 5/2016 | Loyd | |
| D761,399 | S | 7/2016 | Kuzman | |
| 9,427,621 | B2 * | 8/2016 | Dristle | A63B 21/4003 |
| D767,154 | S | 9/2016 | Bromilow | |
| 9,504,625 | B2 * | 11/2016 | Glasford | A61H 23/0236 |
| 9,669,519 | B2 | 6/2017 | Wunderlich | |
| D801,543 | S | 10/2017 | Ton | |
| D809,804 | S | 2/2018 | Tai | |
| 9,918,896 | B2 * | 3/2018 | Tsang | A61H 33/026 |
| D825,969 | S | 8/2018 | Collette | |
| D831,830 | S | 10/2018 | Lemons | |
| D831,838 | S | 10/2018 | Koifman | |
| D837,542 | S | 1/2019 | Nicoll | |
| D847,344 | S | 4/2019 | McEwen | |
| D847,368 | S | 4/2019 | Edwards | |
| D862,599 | S | 10/2019 | Marcinkowski | |
| D863,575 | S | 10/2019 | Taylor | |
| D863,576 | S | 10/2019 | Taylor | |
| D864,403 | S | 10/2019 | Taylor | |
| 10,449,341 | B2 * | 10/2019 | Taylor | A61N 5/0616 |
| D882,878 | S | 4/2020 | Berggren | |
| 10,667,990 | B2 * | 6/2020 | Taylor | A61H 33/02 |
| 10,667,991 | B2 * | 6/2020 | Taylor | A61M 35/30 |
| D889,675 | S | 7/2020 | Taylor | |
| 10,849,605 | B2 | 12/2020 | Llan | |
| D916,303 | S | 4/2021 | Taylor | |
| D921,906 | S * | 6/2021 | Taylor | D24/201 |
| 11,154,697 | B2 * | 10/2021 | Taylor | A62B 18/00 |
| 2002/0146955 | A1 | 10/2002 | Levine | |
| 2003/0220593 | A1 * | 11/2003 | Morton | A61H 35/006<br>601/154 |
| 2004/0025243 | A1 | 2/2004 | Chien | |
| 2004/0225265 | A1 | 11/2004 | Tapadiya | |
| 2006/0207013 | A1 * | 9/2006 | Deboer | A61H 35/00<br>4/601 |
| 2008/0004677 | A1 * | 1/2008 | Gay | A61H 23/04<br>4/584 |
| 2008/0234610 | A1 | 9/2008 | Summers | |
| 2009/0106889 | A1 * | 4/2009 | Brown | A61H 33/0087<br>4/541.1 |
| 2010/0006467 | A1 | 1/2010 | Joseph | |
| 2011/0061159 | A1 * | 3/2011 | Mardirossian | A61G 7/0005<br>4/611 |
| 2011/0225726 | A1 | 9/2011 | Dominguez | |
| 2012/0222210 | A1 | 9/2012 | Wiggins | |
| 2012/0227177 | A1 | 9/2012 | Kiser | |
| 2013/0053737 | A1 | 2/2013 | Scerbo | |
| 2013/0226044 | A1 * | 8/2013 | Moore | A61H 33/0095<br>601/15 |
| 2014/0073996 | A1 | 3/2014 | Jaguan | |
| 2015/0305573 | A1 | 10/2015 | Stafford | |
| 2015/0328393 | A1 | 11/2015 | Stephens | |
| 2016/0096042 | A1 * | 4/2016 | Taylor | A61M 35/20<br>604/289 |
| 2016/0175550 | A1 * | 6/2016 | Taylor | A61M 35/30<br>128/202.16 |
| 2016/0213562 | A1 | 7/2016 | Gathers | |
| 2017/0202736 | A1 * | 7/2017 | Tsang | A61H 23/00 |
| 2017/0232242 | A1 * | 8/2017 | Taylor | A61M 35/30<br>604/289 |
| 2018/0229048 | A1 * | 8/2018 | Sikora | A61N 2/002 |
| 2020/0009360 | A1 * | 1/2020 | Taylor | A61M 35/30 |
| 2022/0287911 | A1 * | 9/2022 | To | A61H 33/6068 |

(56) References Cited

U.S. PATENT DOCUMENTS

| | | | | |
|---|---|---|---|---|
| 2025/0041155 | A1* | 2/2025 | Olsen | A61H 35/008 |
| 2025/0057725 | A1* | 2/2025 | Taylor | A61H 33/6005 |

FOREIGN PATENT DOCUMENTS

| | | | | | |
|---|---|---|---|---|---|
| DE | 20113164 | U1 | * | 1/2002 | A47K 3/022 |
| EP | 0930033 | A1 | | 7/1999 | |
| EP | 2868218 | A1 | | 6/2015 | |
| FR | 2637180 | A1 | | 6/1990 | |
| GB | 2288975 | A | * | 11/1995 | A61H 33/0087 |
| GB | 2590940 | A | * | 7/2021 | A61F 7/0053 |
| JP | 558358 | S | | 4/1981 | |
| JP | H1-212556 | A | | 8/1989 | |
| JP | 1367329 | | | 8/2009 | |
| JP | 1367331 | | | 8/2009 | |
| JP | 2017221655 | A | * | 12/2017 | A61F 7/00 |
| WO | WO-2004023959 | A1 | * | 3/2004 | A61H 35/006 |
| WO | WO-2005120428 | A1 | * | 12/2005 | A61H 33/0087 |
| WO | WO-2007068044 | A1 | * | 6/2007 | A61H 9/0078 |
| WO | 2009094601 | A2 | | 7/2009 | |
| WO | WO-2023224962 | A1 | * | 11/2023 | A61H 33/0087 |

OTHER PUBLICATIONS (2) Sugawara J, Tomoto T. Acute effects of short-term warm water immersion on arterial stiffness and central hemodynamics. Frontiers in physiology. Feb. 4, 2021;12:620201.
(3) Sujan MU, Rao MR, Kisan R, et al. Influence of hydrotherapy on clinical and cardiac autonomic function in migraine patients. J Neurosci Rural Pract. 2016;7(1):109-113.
(4) Tei C, Horikiri Y, Park JC, Jeong JW, Chang KS, Toyama Y, Tanaka N. Acute hemodynamic improvement by thermal vasodilation in congestive heart failure. Circulation. May 15, 1995;91(10):2582-90.
(5) Tepper SJ, Caparso A. Neuromodulation for Headaches—Sphenopalatine Ganglion Stimulation. Neuromodulation. Jan. 1, 2018:783-90.
(6) The sphenopalatine ganglion (SPG) and headache [Internet]. American Migraine Foundation. 2018 [cited Feb. 4, 2023]. Available from: https://americanmigrainefoundation.org/resource-library/sphenopalatine-ganglion/.
(7) Tipton MJ, Collier N, Massey H, Corbett J, Harper M. Cold water immersion: kill or cure ?. Experimental physiology. Nov. 1, 2017; 102(11):1335-55.
(8) Tsitsis N, Polkas G, Daoutis A, Prokooiou E, Kourkouta L. Hydrotherapy in Ancient Greece. Balkan Military Med Rev. 2013; 16(4): 462-466.
(9) Valizadeh, L.; Seyyedrasooli, A.; Zamanazadeh, V.; Nasiri, K. Comparing the effects of reflexology and footbath on sleep quality in the elderly: A controlled clinical trial. Iran. Red Crescent Med. J. 2015, 17, e20111.
(10) Van Tulleken C, Tipton M, Massey H, Harper CM. Open water swimming as a treatment for major depressive disorder. Case Reports. Aug. 1, 2018;2018:bcr-2018.
(11) Vathanophas V, Pattamakajonpong P, Assanasen P, Suwanwech T. The effect of steam inhalation on nasal obstruction in patients with allergic rhinitis. Asian Pac J Allergy Immunol. 2019;4.
(12) Wakabayashi H., Wijayanto T., Kuroki H., Lee J.Y., Tochihara Y. The effect of repeated mild cold water Immersions on the adaptation of the vasomotor responses. Int. J. Biometeorol. 2012;56:631-637. doi: 10.1007/s00484-011-0462-1.
(13) Walløe L. Arterio-venous anastomoses in the human skin and their role in temperature control. Temperature. Jan. 2, 2016;3(1):92-103.
(14) Wardlaw JM, Valdés Hernández MC, Muñoz-Maniega S. What are white matter hyperintensities made of? Relevance to vascular cognitive impairment. Journal of the American Heart Association. Jun. 23, 2015;4(6):e001140.
(15) Warren S, Yezierski RP, Capra NF. Chapter 18-the somatosensory system II: nociception, thermal sense, and touch. Fund Neurosci Basic Clin Appl. 2018.
(16) Weston WL, Lane AT, Morelli JG. Chapter 1—Structure and Function of the Skin. Eds: William L. Weston, Alfred T. Lane, Joseph G. Morelli, Color Textbook of Pediatric Dermatology (Fourth Edition). Mosby, 2007, pp. 1-9, ISBN 9780323049092, https://doi.org/10.1016/B978-0-323-04909-2.50004-7.
(17) White TG, Powell K, Shah KA, Woo HH, Narayan RK, Li C. Trigeminal nerve control of cerebral blood flow: a brief review. Frontiers in Neuroscience. Apr. 13, 2021;15:649910.
(18) Yarnitsky D, Gross Y, Lorian A, Shalev A, Shorer S, Tanaka T, Ayajiki K, Fujimiya M, Okamura T. Increased BBB permeability by parasympathetic sphenopalatine ganglion stimulation in dogs. Brain research. Aug. 27, 2004;1018 (2):236-40.
(19) Yoneshiro T, Aita S, Matsushita M, Kayahara T, Kameya T, Kawai Y, Iwanaga T, Saito M. Recruited brown adipose tissue as an antiobesity agent in humans. The Journal of clinical investigation. Aug. 1, 2013;123(8):3404-8.
(20) Yu, D., Zhang, L., & Huang, Y. Effects of 2-week and 6-week cold water swim training on the levels of neurotrophins and their mRNA in hippocampus of rats brain. Chinese Journal of Rehabilitation Medicine. Sep. 2013; 28(9):817-821.
(21) Zhou ZW, Li YD, Gao WW, Chen JL, Yue SY, Zhang JN. Cold water swimming pretreatment reduces cognitive deficits in a rat model of traumatic brain injury. Neural Regeneration Research. Aug. 2017; 12(8):1322.
be26-minimal-circle-blur-art-illusion, posted at androidpapers.co, online URL:http://androidpapers.co/be26-minimal-circle-blur-art-illustration/ (Year: 2019).
CNBTR 5PCS 88mm Universal HCS Flat Semicicle Saw Blades Black, posted at aliexpress.com, online, URL:https://www.aliexpress.com/item/CNBTR-5PCS-88mm-Universal-HCS-Flat-Semicircle-Saw-Blades-Black/32777274663.html (Years: 2019).
Find the area of shaded region in FIG. 12.48, where arc(APD, AQB, BRC, and CSD) are semicircles, posted Feb. 8, 2018, posted at sarthaks.com, online, URL:https://www.sarthaks.com/32495/find-the-area-of-the-shaded-region-in-fig-12-48-where-arc-apd-brc-and-csd-are-semicircles (Year: 2018).
Bin Divider, Black, 1/8 in. L, PK6, posted at zoro.com, no posting date, retrieived Dec. 2, 2020, online, URL: https://www.zoro.com/akro-mils-bin-diver-black-19-in-l-pk6-41230/i/G6096377/ (Year: 2020).
Curved scrapers, posted at veritastools.com, no posting date, retrieved Dec. 2, 2020, online, URL: http://www.veritastools.com/Products/Page.aspx?p=149 (Year: 2020).
Herdim scraper set, 7 piece set, posted at metmusic.com, no posting date, retrieved Dec. 2, 2020, online, URL: https://www.metmusic.com/tools/scrapers-misc/2897-herdim-scraper-set-7-piece-set (Year: 2020).
Making Scalloped Edge Greeting Cards, posted at auntannie.com, no posting date, retrieved Dec. 4, 2020, online, URL: https://www.auntannie.com/GreetingCards/ScallopedEdge/ (Year: 2020).
Pampered Chef Nylon Pan Scrapers Set of 3 in Brown, posted at amazon.com, available Feb. 24, 2019, retrieved Dec. 4, 2020, online, URL: https://www.amazon.com/Pampered-Chef-Nylon-Scrapers-Brown/dp/B07P3X1Q5J (Year: 2019).
Peeler Modern Glam Foldable 3-Panel Vanity Mirror by Christopher Knight Home, posted at overstock.com, no posting date, retrieved Dec. 4, 2020, online, URL: https://www.overstock.com/Home-Garden/Peeler-Modern-Glam-Foldable-3-Panel-Vanity-Mirrory-by-Christopher-Knight-Home-25.50-H-x-29.50-W-x-0.60-D/3205387 (Year: 2020.
Set of 4 Plastic Bowl and Dough Scrapers, Curved and Straight Edge, posted at amazon.com, reviewed Sep. 27, 2016, retrieved Dec. 2, 2020, online, URL: https://www.amazon.com/Plastic-Dough-Scrapers-Curved-Straight/dp/B075X5DLDF?th=1 (Year: 2016).
Regency 12" Stainless Steel Ice Bin Partition, posted at webstaurantstore.com, no posting date, retrieved Dec. 2, 2020, online, URL: https://www.webstaurantstore.com/regency-12-ice-bin-partition/600IBDIV12.html?utm_source=google&utm_medium=cpc&utm_campaign=GoogleShopping&gclid=EAlalQobChMIv_Soyryv7QIVSeG (Year: 2020).

(56) References Cited

OTHER PUBLICATIONS

The Inside Scalloped Screen Divider, posted at kaiyo.com, no posting date, retrieved Dec. 4, 2020, online, URL: https://www.kaiyo.com/the-inside-scalloped-screen-divider/ (Year: 2020).
Winco 12-Piece Plastic Dough Scraper, posted at walmart.com, no posting date, retrieved Dec. 2, 2020, online, URL: https://www.walmart.com/ip/Winco-12-Piece-Plastic-Dough-Scraoper/522406170?wmlspartner=wlpa&slectedSellerld=14567&&adid=22222222227065511981&wl0=&wl1=g&wl2=169625461193&wl4=pa- (Year: 2020.
(14) Algafly A.A., George K.P. The effect of cryotherapy on nerve conduction velocity, pain threshold and pain tolerance. Br. J. Sports Med. 2007;41:365-369.
(15) An J, Lee I, Yi Y. The thermal effects of water immersion on health outcomes: an integrative review. Int J Environ Res Public Health. 2019;16(7):E1280.
(16) Armstrong CL, Hopkins DA. Neurochemical organization of paratrigeminal nucleus projections to the dorsal vagal complex in the rat. Brain Res. 1998;785(1):49-57.
(17) Backonja M, Howland EW, Wang J, Smith J, Salinsky M, Cleeland CS. Tonic changes in alpha power during Immersion of the hand in cold water. Electroencephalography and clinical neurophysiology. Sep. 1, 1991;79(3):192-203.
(18) Bahadorfar M. A Study of Hydrotherapy and Its Health Benefits. Int J Res. 2014; 1(8): 294-305.
(19) Bailey, T.G.; Cable, N.T.; Miller, G.D.; Sprung, V.S.; Low, D.A.; Jones, H. Repeated warm water immersion Induces similar cerebrovascular adaptations to 8 weeks of moderate-intensity exercise training in females. Int. J. Sports Med. 2016, 37, 757-765.
(20) Barwood M, Burrows H, Cessford J, Fraser L, Goodall S, Griffiths S. Brain blood flow and hyperventilation on cold water immersion: can treading water help control these symptoms of cold shock ?. In Extreme Physiology & Medicine Dec. 2015 (vol. 4, No. 1, pp. 1-2). BioMed Central.
(21) Bernbaum M, Menon BK, Fick G, Smith EE, Goyal M, Frayne R, Coutts SB. Reduced blood flow in normal white matter predicts development of leukoaraiosis. Journal of cerebral blood flow & metabolism. Oct. 2015;35(10):1610-5.
(22) Bleakley CM, Davison GW. What is the biochemical and physiological rationale for using cold-water immersion in sports recovery? A systematic review. Br J Sports Med. 2010;44(3):179-187.
(23) Blondin DP, Labbe SM, Tingelstad HC, Noll C, Kunach M, Phoenix S, Guerin B, Turcotte EE, Carpentier AC, Richard D, Haman F. Increased brown adipose tissue oxidative capacity in cold-acclimated humans. The Journal of Clinical Endocrinology & Metabolism. Mar. 1, 2014;99(3):E438-46.
(24) Bornstein NM, Saver JL, Diener HC, Gorelick PB, Shuaib A, Solberg Y, Devlin T, Leung T, Molina CA. Sphenopalatine ganglion stimulation to augment cerebral blood flow: a randomized, sham-controlled trial. Stroke. Aug. 2019;50(8):2108-17.
(25) Brenner IK, Castellani JW, Gabaree C, Young AJ, Zamecnik J, Shephard RJ, et al. Immune changes in humans during cold exposure: Effects of prior heating and exercise. J Appl Physiol. 1999;87:699-710.
(26) Brunt, V.E.; Jeckell, A.T.; Ely, B.R.; Howard, M.J.; Thijssen, D.H.; Minson, C.T. Acute hot water immersion is protective against impaired vascular function following forearm ischemia-reperfusion in young healthy humans. Am. J. Physiol. Regul. Integr. Comp. Physiol. 2016, 311, R1060-R1067.
(27) Caous CA, de Sousa Buck H, Lindsey CJ. Neuronal connections of the paratrigeminal nucleus: a topographic analysis of neurons projecting to bulbar, pontine and thalamic nuclei related to cardiovascular, respiratory and sensory functions. Auton Neurosci. 2001;94(1-2):14-24.
(28) Carter HH, Spence AL, Pugh CJ, Ainslie P, Naylor LH, Green DJ. Cardiovascular responses to water immersion in humans: impact on cerebral perfusion. American Journal of Physiology-Regulatory, Integrative and Comparative Physiology. May 1, 2014;306(9):R636-40.
(29) Castro-Sanchez AM, Mataran-Penarrocha GA, Lara-Palomo I, Saavedra-Hernandez M, Arroyo-Morales M, Moreno-Lorenzo C. Hydrotherapy for the treatment of pain in people with multiple sclerosis: a randomized controlled trial. Evidence-based complementary and alternative medicine. Oct. 2012;2012.
(30) Chiluwal A, Narayan RK, Chaung W, Mehan N, Wang P, Bouton CE, Golanov EV, Li C. Neuroprotective effects of trigeminal nerve stimulation in severe traumatic brain injury. Scientific Reports. Jul. 28, 2017;7(1):6792.
(31) Chondronikola M, Volpi E, Børsheim E, Porter C, Annamalai P, Enerback S, Lidell ME, Saraf MK, Labbe SM, Hurren NM, Yfanti C. Brown adipose tissue improves whole-body glucose homeostasis and insulin sensitivity in humans. Diabetes. Dec. 1, 2014;63(12):4089-99.
(32) Clifton GL, Jiang JY, Lyeth BG, Jenkins LW, Hamm RJ, Hayes RL. Marked protection by moderate hypothermia after experimental traumatic brain injury. J Cereb Blood Flow Metab [Internet]. 1991;11(1):114-21. Available from: http://dx.doi.org/10.1038/jcbfm.1991.13.
(33) Coizet V, Dommett EJ, Klop EM, Redgrave P, Overton PG. The parabrachial nucleus is a critical link in the transmission of short latency nociceptive information to midbrain dopaminergic neurons. Neuroscience. 2010;168(1):263-272.
(34) Driessen AK. Vagal afferent processing by the paratrigeminal nucleus. Front Physiol. 2019;10:1110.
(35) Ebina, Kosuke, et al. "Oxygen and air nanobubble water solution promote the growth of plants, fishes, and mice." PLoS One 8.6 (2013): e65339.
(36) Eckberg DL, Mohanty SK, Raczkowska M. Trigeminal-baroreceptor reflex interactions modulate human cardiac vagal efferent activity. J Physiol. 1984;347:75-83.
(37) Edvinsson JCA, Viganò A, Alekseeva A, et al. The fifth cranial nerve in headaches. J Headache Pain. 2020;21(1):65.
(38) Eftekhari S, Salvatore CA, Johansson S, Chen TB, Zeng Z, Edvinsson L. Localization of CGRP, CGRP receptor, PACAP and glutamate in trigeminal ganglion. Relation to the blood-brain barrier. Brain research. Mar. 10, 2015;1600:93-109.
(39) Feletti A, SAnti GZ, Sammartino F, Bevilacqua M, Cisotto P, Longatti P. Peripheral trigeminal nerve field stimulation: report of 6 cases. Neurosurgical Focus. Sep. 1, 2013;35(3):E10.
(40) Fleming SA, Gutknecht NC. Gutknecht. Naturopathy and the Primary Care Practice. Prim Care. 2010;37:119-36.
(41) Gaul C, Diener HC, Silver N, Magis D, Reuter U, Andersson A, Liebler EJ, Straube A, PREVA Study Group. Non-Invasive vagus nerve stimulation for PREVention and Acute treatment of chronic cluster headache (PREVA): a randomised controlled study. Cephalalgia. May 2016;36(6):534-46.
(42) Geat D, Giovannini M, Barlocco EG, et al. Characteristics associated with clinical response to Comano thermal spring water balneotherapy in pediatric patients with atopic dermatitis. Ital J Pediatr. 2021;47(1):91.
(43) Gleveckas-Martens, N., & Crisan, E. Somatosensory System Anatomy: Overview, Gross Anatomy, Microscopic Anatomy (T. Gest, Ed.). Medscape. Jun. 14, 2021. https://emedicine.medscape.com/article/1948621-overview#a2.
(44) Gruner Svealv B, Cider A, Tang MS, Angwald E, Kardassis D, Andersson B. Benefit of warm water immersion on piventricular function in patients with chronic heart failure. Cardiovasc Ultrasound. 2009;7:33.
(45) Gundry SR. Unlocking the keto code: The revolutionary new science of keto that offers more benefits without deprivation. New York, NY: Harper; 2022.
(46) Han EY, Kim BR, Im SH, Choi JH, Kim SM. Effects of adjuvant hydrotherapy on functional status and mental relaxation in patients with knee osteoarthritis: Preliminary study. Journal of the Korean Geriatrics Society. Sep. 30, 2014;18(3):153-61.
(47) Harding EC, Franks NP, Wisden W. The temperature dependence of sleep. Frontiers in neuroscience. Apr. 24, 2019;13:336.
(48) Headache disorders. (n.d.). Retrieved Oct. 2, 2022, from https://www.who.int/news-room/fact-sheets/detail/headache-disorders.

(56) References Cited

OTHER PUBLICATIONS

(49) Herrera E., Sandoval M.C., Camargo D.M., Salvini T.F. Motor and sensory nerve conduction are affected differently by ice pack, ice massage, and cold water immersion. Phys. Ther. 2010;90:581-591. doi: 10.2522/ptj.20090131.
(50) Hibou A, Bordeau A, Pean I, Rouland E, Charpentier M. Support in addictology: hydrotherapy. Soins. Psychiatrie. Sep. 1, 2013(288):39-41.
(1) Hoekstra SP, Bishop NC, Faulkner SH, Bailey SJ, Leicht CA. Acute and chronic effects of hot water immersion on Inflammation and metabolism in sedentary, overweight adults. Journal of applied physiology. Dec. 26, 2018.
(2) Huberman, AD. The Science & Use of Cold Exposure for Health & Performance. [The Huberman Lab Podcast, Apr. 4, 2022.] Retrieved Sep. 10, 2022, from https://hubermanlab.com/using-deliberate-cold-exposure-for-health-and-performance/.
(3) Hu, Q.; Zhu, W.; Zhu, Y.; Zheng, L.; Hughson, R.L. Acute effects of warm footbath on arterial stiffness in healthy young and older women. Eur. J. Appl. Physiol. 2012, 112, 1261-1268.
(4) Huttunen P, Kokko L, Ylijukuri V. Winter swimming improves general well-being. Int J Circumpolar Health. 2004;63:140-4.
(5) Jacobs GD, Lubar JF. Spectral analysis of the central nervous system effects of the relaxation response elicited by autogenic training. Behavioral Medicine. Sep. 1, 1989;15(3):125-32.
(6) Jaiswal S, Tsai SY, Juan CH, Muggleton NG, Liang WK. Low delta and high alpha power are associated with better conflict control and working memory in high mindfulness, low anxiety individuals. Social cognitive and affective neuroscience. Jun. 2019;14(6):645-55.
(7) Jancin B. Head bath promising for primary headaches [Internet]. Mdedge.com. Frontline Medical Communications Inc.; 2014 [cited Feb. 21, 2023]. Available from: https://www.mdedge.com/internalmedicine/article/87095/mental-health/head-bath-promising-primary-headaches.
(8) Kelly JS, Bird E. Improved mood following a single immersion in cold water. Lifestyle Medicine. Dec. 2021;3(1):e53.
(9) Kim, H.J.; Lee, Y.; Sohng, K.Y. The effects of footbath on sleep among the older adults in nursing home: A quasi-experimental study. Complement. Ther. Med. 2016, 26, 40-46.
(10) Kjeld T, Pott FC, Secher NH. Facial immersion in cold water enhances cerebral blood velocity during breath-hold exercise in humans. Journal of Applied Physiology. Apr. 2009; 106(4):1243-8.
(11) Kojima, D.; Nakamura, T.; Banno, M.; Umemoto, Y.; Kinoshita, T.; Ishida, Y.; Tajima, F. Head-out immersion in hot water increases serum BDNF in healthy males. Int. J. Hyperth. 2018, 34, 834-839.
(12) Krauchi, K. How is the circadian rhythm of core body temperature regulated? Clin. Auton. Res. 2002, 12, 147-149.
(13) Kurniasari MD, Monsen KA, Weng SF, Yang CY, Tsai HT. Cold Water Immersion Directly and Mediated by Alleviated Pain to Promote Quality of Life in Indonesian with Gout Arthritis: A Community-based Randomized Controlled Trial. Biological Research For Nursing. Apr. 2022;24(2):245-58.
(14) Leppaluoto J, Westerlund T, Huttunen P, Oksa J, Smolander J, Dugue B, Mikkelsson M. Effects of long-term whole-body cold exposures on plasma concentrations of ACTH, beta-endorphin, cortisol, catecholamines and cytokines in healthy females. Scandinavian Journal of Clinical and Laboratory Investigation. Jan. 1, 2008;68(2):145-53.
(15) Li C, Chiluwal A, Afridi A, Chaung W, Powell K, Yang WL, Wang P, Narayan RK. Trigeminal nerve stimulation: a novel method of resuscitation for hemorrhagic shock. Critical care medicine. Jun. 1, 2019;47(6):e478-84.
(16) Little P, Stuart B, Mullee M, Thomas T, Johnson S, Leydon G, Rabago D, Richards-Hall S, Williamson I, Yao G, Raftery J. Effectiveness of steam inhalation and nasal irrigation for chronic or recurrent sinus symptoms in primary care: a pragmatic randomized controlled trial. CMAJ. Sep. 20, 2016;188(13):940-9.
(17) Mantoni T, Rasmussen JH, Belhage B, Pott FC. Voluntary respiratory control and cerebral blood flow velocity upon ice-water immersion. Aviation, space, and environmental medicine. Aug. 1, 2008;79(8):765-8.
(18) Massey H, Kandala N, Davis C, Harper M, Gorczynski P, Denton H. Mood and well-being of novice open water swimmers and controls during an introductory outdoor swimming programme: a feasibility study. Lifestyle Medicine. Oct. 2020;1(2):e12.
(19) Mcveigh JG, McGaughey H, Hall M, Kane P. The effectiveness of hydrotherapy in the management of fibromyalgia syndrome: A systematic review. Rheumatol Int. 2008;29:119-30.
(20) Merial-Kieny C, Mengual X, Guerrero D, Sibaud V. Clinical efficacy of Avene hydrotherapy measured in a large cohort of more than 10,000 atopic or psoriatic patients. J Eur Acad Dermatol Venereol. 2011;25 Suppl 1:30-34.
(21) Messlinger K, Russo AF. Current understanding of trigeminal ganglion structure and function in headache. Cephalalgia. Nov. 2019;39(13):1661-74.
(22) Mills W, Kondakis N, Orr R, Warburton M, Milne N. Does hydrotherapy impact behaviours related to mental health and well-being for children with autism spectrum disorder? a randomised crossover-controlled pilot trial. International journal of environmental research and public health. Jan. 2020;17(2):558.
(23) Mizuno, K.; Tanaka, M.; Tajima, K.; Okada, N.; Rokushima, K.; Watanabe, Y. Effects of mild-stream bathing on recovery from mental fatigue. Med. Sci. Monit. 2010, 16, CR8-CR14.
(24) Mooventhan A, Nivethitha L. Scientific evidence-based effects of hydrotherapy on various systems of the body. N Am J Med Sci. 2014;6(5):199-209.
(25) Mortimer R, Privopoulos M, Kumar S. The effectiveness of hydrotherapy in the treatment of social and behavioral aspects of children with autism spectrum disorders: A systematic review. Journal of multidisciplinary healthcare. Feb. 3, 2014:93-104.
(26) Moss GA. Medicine 2000 years ago: the case of Qumran and other biblical sites. J R Soc Promot Health. 2000;120(4):255-261.
(27) Moss GA. Water and health: a forgotten connection? Perspect Public Health. 2010;130(5):227-232.
(28) Moufarrij S, Deghayli L, Raffoul W, Hirt-Burri N, Michetti M, de Buys Roessingh A, et al. How important is hydrotherapy? Effects of dynamic action of hot spring water as a rehabilitative treatment for burn patients in Switzerland. Annals burns and fire disasters. 2014; 27(4): 184-191.
(29) Moulton EA, Pendse G, Morris S, et al. Capsaicin-induced thermal hyperalgesia and sensitization in the human trigeminal nociceptive pathway: an fMRI study. Neuroimage. 2007;35(4):1586-1600.
(30) Murphy O, O'Dwyer V, Lloyd-Mckernan A. The efficacy of warm compresses in the treatment of meibomian gland dysfunction and demodex folliculorum blepharitis. Current eye research. May 3, 2020;45(5):563-75.
(31) Naumann J, Kruza I, Denkel L, Kienle G, Huber R. Effects and feasibility of hyperthermic baths in comparison to exercise as add-on treatment to usual care in depression: a randomised, controlled pilot study. BMC psychiatry. Dec. 2020;20(1):1-3.
(32) Olafsson J, Lai X, Landsend EC, Olafsson S, Parissi E, Utheim ØA, Raeder S, Badian RA, Lagali N, Dartt DA, Utheim TP. TheraPearl Eye Mask and Blephasteam for the treatment of meibomian gland dysfunction: a randomized, comparative clinical trial. Scientific Reports. Nov. 17, 2021;11(1):22386.
K33) Park KS, Choi JK, Park YS. Cardiovascular regulation during water immersion. Applied Human Science. Nov. 30, 1999;18(6):233-41.
(34) Peretti D, Bastide A, Radford H, Verity N, Molloy C, Martin MG, Moreno JA, Steinert JR, Smith T, Dinsdale D, Willis AE. RBM3 mediates structural plasticity and protective effects of cooling in neurodegeneration. Nature. Feb. 2015;518(7538):236-9.
(35) Price S, Daly DT. Neuroanatomy, Trigeminal Nucleus. StatPearls Publishing; 2022.
(36) Quattrini S, Pampaloni B, Brandi ML. Natural mineral waters: chemical characteristics and health effects. Clinical Cases in Mineral and Bone Metabolism. Sep. 2016;13(3):173.

(56) References Cited

OTHER PUBLICATIONS

(37) Ramalingam V, Cheong SK, Lee PF. Study of EEG alpha wave response on the effects of video-guided deep breathing on pain rehabilitation. Technology and Health Care. Jun. 8, 2022(Preprint):1-0.
(38) Robiner WN. Psychological and physical reactions to whirlpool baths. J Behav Med. 1990;13:157-73.
(39) Rodriguez E, Sakurai K, Xu J, et al. A craniofacial-specific monosynaptic circuit enables heightened affective pain. Nat Neurosci. 2017;20(12):1734-1743.
(40) Torres-Ronda L, i del Alcazar XS. The properties of water and their applications for training. Journal of human kinetics. Dec. 30, 2014;44(1):237-48.
(41) Rowlatt J. Could cold water hold a clue to a dementia cure? BBC [Internet]. Oct. 19, 2020 [cited Jan. 25, 2023]; Available from: https://www.bbc.com/news/health-54531075.
(42) Rymaszewska J, Lion KM, Pawlik-Sobecka L, Pawlowski T, Szcześniak D, Trypka E, Rymaszewska JE, Zablocka A, Stanczykiewicz B. Efficacy of the whole-body cryotherapy as add-on therapy to pharmacological treatment of depression—a randomized controlled trial. Frontiers in Psychiatry. Jun. 9, 2020;11:522.
(43) Sakers A, De Siqueira MK, Seale P, Villanueva CJ. Adipose-tissue plasticity in health and disease. Cell. 2022;185(3):419-446.
(44) Sato M, Kanikowska D, Iwase S, et al. Effects of immersion in water containing high concentrations of CO2 (CO2-water) at thermoneutral on thermoregulation and heart rate variability in humans. Int J Biometeorol. 2009;53(1):25-30.
(45) Schmidt K, Forkmann K, Sinke C, Gratz M, Bitz A, Bingel U. The differential effect of trigeminal vs. peripheral pain stimulation on visual processing and memory encoding is influenced by pain-related fear. Neuroimage. 2016;134:386-395.
(46) Schmidt K, Schunke O, Forkmann K, Bingel U. Enhanced short-term sensitization of facial compared with limb heat pain. J Pain. 2015;16(8):781-790.
(47) Segura-Jimenez V, Carbonell-Baeza A, Aparicio VA, Samos B, Femia P, Ruiz JR, et al. A warm water pool-based exercise program decreases immediate pain in female fibromyalgia patients: uncontrolled clinical trial. Int J Sports Med. 2013; 34(7): 600-605.
(48) Shevchuk NA. Possible use of repeated cold stress for reducing fatigue in chronic fatigue syndrome: a hypothesis. Behav Brain Funct. 2007;3:55.
(49) Søberg S, Löfgren J, Philipsen FE, et al. Altered brown fat thermoregulation and enhanced cold-induced thermogenesis in young, healthy, winter-swimming men. Cell Reports Medicine. 2021;2(10):100408.
(50) Šrámek P, Šimečková M, Janský L, Šavlíková J, Vybíral S. Human physiological responses to immersion into water of different temperatures. European journal of applied physiology. Feb. 2000;81(5):436-42.

* cited by examiner

A method of [inducing][3901] a [desired and/or intended outcome][3903] in a [subject][3905] by touching a [heat transfer element][3907] against a [portion][3909] of the subject, wherein the heat transfer element is at least initially at a different temperature from a surface of the portion of the subject; wherein temperature of the heat transfer element is controlled by a [thermal means][3911].

FIG. 39

METHODS, SYSTEMS, AND/OR DEVICES FOR THERMAL TREATMENTS

PRIORITY NOTICE

The present (instant) U.S. nonprovisional patent application claims priority under 35 U.S.C. § 119(e) to the following seven U.S. provisional patent applications: (1) application Ser. No. 63/343,054 filed on May 17, 2022; (2) application Ser. No. 63/390,926 filed on Jul. 20, 2022; (3) application Ser. No. 63/403,259 filed on Sep. 1, 2022; (4) application Ser. No. 63/443,030 filed on Feb. 2, 2023; (5) application Ser. No. 63/446,818 filed on Feb. 18, 2023; (6) application Ser. No. 63/458,076 filed on Apr. 7, 2023; and (7) application Ser. No. 63/462,210 filed on Apr. 26, 2023; wherein all the disclosures of which are all incorporated herein by reference in their entirety; wherein all of these seven U.S. provisional patent applications, as well as the current U.S. nonprovisional patent application, are all from the same inventor (of John Richard Taylor).

CROSS REFERENCE TO RELATED U.S. PATENTS

The following U.S. patents, by the same inventor as the present inventions, are incorporated by reference as if fully set forth herein: U.S. Pat. Nos. 10,667,990, 10,449,341, 10,667,991, 11,154,697, U.S. design Pat. D863,575, U.S. design Pat. D863,576, U.S. design Pat. D864,403, U.S. design Pat. D889,675, and U.S. design Pat. D916,303.

TECHNICAL FIELD OF THE INVENTION

The present invention relates in general to hydrotherapy and/or thermal therapy and more specifically to thermal delivery devices, systems, and/or methods for providing hydrotherapy and/or thermal therapy to the entire human body or to a portion thereof, such as, but not limited to, the face or the head.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

The inventions and embodiments thereof of this subject patent application may pertain to devices, systems, and/or methods of thermal therapies and/or hydrotherapies to the whole human body or portion(s) thereof, such as, but not limited to, the face and/or the head. The human face in particular has some unique anatomical features (e.g., unique neuroanatomical circuitry and vasculature features) that makes thermal therapies and/or hydrotherapies applied to the face more desirable than targeting many other portions of the human body.

I. Brief History of Hydrotherapy

The history of hydrotherapy dates back thousands of years. Hydrotherapy, used since the time of the ancient Egyptians to promote healing, has the potential to boost mental, physical, and emotional health and may benefit those with specific medical conditions. Immersion in cold or hot water was used for health and wellness purposes in ancient Egyptian, Greek, Roman, Celtic, Indian, and Hebrew societies. Therapeutic practices utilizing hydrotherapy have been documented in ancient Chinese society, where cold water with tea extracts was used specifically to relieve pain and treat burns since 1550 BC. In ancient Greece, warm water baths were enhanced with minerals in order to treat various illnesses.

The father of "modern" hydrotherapy is thought by many to be Vincent Priessnitz, an Austrian farmer born in the 1700's who prescribed combinations of "water, food & air" in place of traditional medicine as cures for common ailments. Subsequently, a Bavarian priest by the name of Sebastian Kniepp advocated for Priessnitz's work with hydrotherapy, which lead to formal administration of the technique by health professionals in Europe.

Hydrotherapy may have introduced to the United States (U.S.) in 1844 at a clinic in New York City. Hydrotherapy spas sprung up in various U.S. cities; a tourism industry became established focused around these spas, particularly among the wealthy elite. Due to the rise and eventual dominance of allopathic medicine in the twentieth century, the popularity of hydrotherapy waned as it was relegated to a position of "alternative" medical therapy. However, the therapeutic benefits of hydrotherapy are profound and are beginning to be rediscovered in recent years and appreciated once again. Hydrotherapy has the added benefit of being relatively low cost and relatively accessible to the general population, as compared to other treatment modalities.

II. Hydrotherapy: Mechanisms of Action

Hydrotherapy may utilize one to three mechanisms of action, namely, thermal, mechanical, and/or chemical.

A. Thermal

Water is four (4) times more efficient at heat transfer than ambient air. Thermal delivery devices, systems, and/or methods of use may leverage this heat transfer property of water (or other liquids) along with the anatomical fact of the trigeminal nerve, and/or that the upper half of the (human) face contains glabrous skin. Recall, together with the palms/soles, the (upper) face is the most efficient region of human body for heat transfer (because of arteriovenous anastomoses [AVAs]). Facial sensitivity to temperature most likely enhances the thermal therapeutic effect of hydrotherapy.

Cold water induces peripheral vasoconstrictive effects in addition to decreased nerve cell conductivity. These responses could potentially be utilized to interrupt pain signaling pathways. Warm water, on the other hand, prompts vasodilation in the vasculature which can subsequently improve blood flow and tissue perfusion/oxygenation.

B. Mechanical

Three mechanical properties contribute to the efficacy of traditional hydrotherapy: buoyancy, hydrostatic pressure, and density. Such mechanical properties may offset gravity, serves as a form of resistance and compression, and acts as a thermal conductor.

C. Chemical

The chemical properties of water to dissolve waste solutes for excretion and create free ions when combined with minerals, are thought to provide further therapeutic benefit. Exogenous drugs can be added to a water bath to facilitate transdermal administration of therapeutics. Transdermal drug application can also take advantage of the vasodilation associated with warm water immersion. Oxygen nanobubbles in water can also have additional beneficial effects. One study demonstrated that oxygen-nanobubble water enhanced growth of both plants and animals (trout and mice).

III. Skin

Skin (cutaneous) sensory nerve endings in the skin may elicit sensations of: touch, itch, warmth, cold, and pain. Nerve branches may enter the skin (dermis) from the subcutaneous fat and form superficial and/or deep nerve plexuses. Unmyelinated nerve branches from either plexus may terminate in nerve endings that may be simple or specialized. Terminals from a single axon may serve an area as broad as one (1) square centimeter and may overlap with nerve endings from other axons. Note, all (to a majority of) axons that end in the epidermis are nociceptors; i.e., neurons that transmit pain messages. Nerve densities of range between 2 and 3,976 neurites per square millimeter of skin surface, depending upon the skin location and the individual. However, the hands and the face are the most densely innervated regions with respect to skin nerves. Inflow of cutaneous sensory information from skin (cutaneous) sensory nerve endings is strongly controlled and modulated by the cerebral cortex of the brain. The skin has a high sensitivity to rapid mechanical stimulation, with positional movements of less than 1 micrometer (μm) detectable.

Sensations of cold persist continuously when skin temperature is below eighty-six (86) degrees Fahrenheit (° F.) (or thirty [30] degrees Celsius [30° C.]), and sensations of warmth persist continuously when skin temperature is above 98.6° F. (37° C.). Changes in temperature of 0.054° F. (0.03° C.) may be detected, especially if the skin temperature changes faster than 0.126° F. per second (sec) (0.007° C./sec). Important to at least some embodiments described herein is that thermal sensitivity is highest on the face. At skin temperatures below 64.4° F. (18° C.) or above 113° F. (45° C.), pain (e.g., as a burning sensation) is produced. Pain may also be induced by pressure greater than fifty (50) grams per square millimeter and/or by disruption of the skin. See e.g., William L. Weston, MD, et al., Chapter 1, Color Textbook of Pediatric Dermatology (Fourth Edition), 2007.

Thus, thermal stimulation of skin (cutaneous) sensory nerve endings may produce sensations of pain (cold and/or heat), at skin temperatures below 64.4° F. (18° C.) or above 113° F. (45° C.), which may be a cornerstone for at least some embodiments described herein.

Studies also show that pain is at least associated with higher activity in the brain's parabrachial nucleus (PBN); and that facial pain is associated with higher activity in the PBN as compared to body pain. Facial skin is more sensitive to pain than body skin. This is likely due to the face being a densely innervated region; that at least a majority of facial (and/or cranial) nerves being directly wired (connected) to the brain versus body (spinal) nerves that are indirectly wired (connected) to the brain via the spinal cord; and because the distance a nerve signal must travel from cutaneous nerve endings to the brain (for signal interpretation) is generally (mostly) shorter for facial (and/or cranial) nerves than body nerves connected to the spinal cord. Sensory neurons from the head and face are wired directly into one of the brain's principal emotional signaling hubs, while sensory neurons from the body are connected only indirectly (e.g., via the intermediary of the spinal cord). See e.g., Erica Rodriguez, et al., A craniofacial-specific monosynaptic circuit enables heightened affective pain, Nature Neuroscience, 2017.

IV. Cranial Nerves

Cranial nerves are the nerves that emerge directly from the brain (including the brainstem), in contrast to spinal nerves (which emerge from segments of the spinal cord). Cranial nerves relay information between the brain and parts of the body, primarily to and from regions of the head, including the face, and the neck. The cranial nerves are usually/often considered components of the peripheral nervous system (PNS), although on a structural level the olfactory, optic and terminal nerves are more accurately considered part of the central nervous system (CNS). In humans there are typically twelve (12) pairs of cranial nerves: (I) olfactory nerve (mostly afferent); (II) optic nerve (mostly afferent); (III) oculomotor nerve (mostly efferent); (IV) trochlear nerve (mostly efferent); (V) trigeminal nerve (afferent and efferent) (see FIG. 38); (VI) abducent nerve (mostly efferent); (VII) facial (intermediate) nerve (afferent and efferent; (VIII) vestibulocochlear nerve (mostly afferent); (IX) glossopharyngeal nerve (afferent and efferent); (X) vagus nerve (afferent and efferent); (XI) accessory nerve (mostly efferent); and (XII) hypoglossal nerve (mostly efferent). The (V) trigeminal nerve is often broken down in three sub-nerves, the ophthalmic nerve, the maxillary never, and the mandibular nerve. The twelve (12) pairs of cranial nerves are nerves associated with the brain. The fibers in cranial nerves are of diverse functional types. Some cranial nerves are composed of only one type, others of several. In cranial nerve attachment to the brain, the first two cranial nerves (I) and (II) are associated with the forebrain, nerves (III) and (IV) with the midbrain, and nerves (V) to (XII) with the hindbrain. Cranial nerves generally permit one-way communication or two-way communication, meaning that some cranial nerves transmit information at least mostly to the brain (afferent), others at least mostly only transmit instructions out (efferent) from the brain, and the remainder are structured to receive and transmit information. Cranial nerves that are exclusively or mostly afferent are (I), (II), and (VIII); the mostly efferent cranial nerves are (III), (IV), (VI), (XI), and (XII); and the cranial nerves that contain both afferent and efferent fibers are (V), (VII), (IX), and (X). At least some embodiments of the present invention may benefit more from thermally stimulating afferent cranial nerves.

V. Neurotransmitters

Additionally, studies show that PBN stimulation/activation is associated with neurotransmitter production, such as, but not limited to, dopamine. Similarly, pain is associated with neurotransmitter (such as, but not limited to, dopamine and noradrenaline [norepinephrine]) release/production.

For example, plasma noradrenaline (norepinephrine) and dopamine concentrations were increased by 530% and by 250% respectively from a body (not face) cold water immersion at 57.2° F. (14° C.) that generated skin pain at this cold temperature. See e.g., Srámek P, et al., Human physiological responses to immersion into water of different temperatures, Eur. J. Appl. Physiol., 2000.

Note, production and/or release of dopamine from thermal (cold and/or hot) therapy may be superior to dopamine release from exercise, as dopamine from exercise tends to be rapidly metabolized solely for energy thus limiting dopamine's role as a neurotransmitter and/or hormone.

In the brain, serotonin modulates mood, anxiety, appetite, and potentially cognitive performance. Serotonin regulates thermogenesis in brown adipose tissue (BAT) with effects on energy balance, obesity, and related metabolic conditions. Thermogenesis in BAT may be activated by cold exposure or by activating the sympathetic nervous system, resulting in conversion of energy resources into heat, instead of activating ATP (adenosine triphosphate) synthase to produce ATP for regular cellular metabolism. The sympathetic nervous system itself may be activated by cold exposure. Serotonin may be produced and/or released as a result of cold exposure.

Exposure to cold is known to activate the sympathetic nervous system and increase the blood level of beta-endorphin and noradrenaline and to increase synaptic release of noradrenaline in the brain as well. Additionally, due to the high density of cold receptors in the skin, cold therapy may result in sending sufficient electrical impulses from skin nerve endings to the brain, which may result in an anti-depressive effect.

While dopamine, noradrenaline, and/or serotonin may boost mood, among other effects, oxytocin may play important roles in feelings of love/bonding, psychiatric, metabolic, blood sugar, and/or immune system pathways. Oxytocin may also play important roles with maintaining bone density and a youthful body composition. Further, oxytocin deficiency is associated with low mood. Ensuring adequate oxytocin levels may be important to maintenance of good physiological and psychological health. Release of oxytocin may promote thermogenesis, brown fat cell production, and/or burning of fat for warmth. Cold exposure may upregulate production/release of oxytocin in the hypothalamus in the brain. Like dopamine, noradrenaline, serotonin, and endorphins, oxytocin may also be released and/or modulated via cold exposure.

Thus, thermal stimulation of skin (cutaneous) sensory nerve endings may produce sensations of cold, warmth, and/or pain, at skin temperatures below 64.4° F. (18° C.) or above 113° F. (45° C.); and this thermal stimulation may thus in turn cause release of neurotransmitters (such as, but not limited to, dopamine, noradrenaline [norepinephrine], endorphins [e.g., beta-endorphin], serotonin, oxytocin, the four happy hormones, and/or the like).

Also note, that thermal stimulation of skin (cutaneous) sensory nerve endings is not just limited to producing sensations of cold, warmth, pain, and/or neurotransmitter release. Thermal (cooling and/or heating) stimulation of skin (cutaneous) sensory nerve endings may produce other and/or additional results, such as but not limited to, vasodilation; vasoconstriction; changes in plasma renin activity; changes in plasma cortisol; changes in blood aldosterone; diuresis; changes in rectal temperature; changes in peripheral catecholamine concentration; changes in cerebral blood flow; respiratory system changes; nervous system changes; changes in musculoskeletal system; changes in the gastrointestinal system; changes in reproduction systems; changes in urinary and/or renal system; changes in hematology; changes in immunology; hormonal changes; changes in the endocrine system; changes in the eyes; changes in the skin; changes in hair; and/or changes in temperature regulation. See e.g., Mooventhan, et al., "Scientific Evidence-Based Effects of Hydrotherapy on Various Systems of the Body," North American Journal of Medical Science, Volume 6, Issue 5, May 2014, which lists many health and/or medical issues that are affected by, changed by, and/or improved by various thermal therapies; wherein the teachings of this reference are incorporated by reference as if fully set-forth herein.

Release, production, and/or control of neurotransmitters (such as, but not limited to, dopamine, noradrenaline [norepinephrine], endorphins [e.g., beta-endorphin], serotonin, oxytocin, the four happy hormones, and/or the like) and/or thermal therapy may be associated with a variety of health issues, medical conditions, and/or the like, such as, but not limited to: psychiatric conditions; depression; schizophrenia; bipolar, attention-deficit/hyperactivity disorder (ADHD); post-traumatic stress disorder (PTSD); multiple sclerosis (MS); tinnitus; mood swings, aggression, anxiety, panic attacks, dementia; Alzheimer's disease; Parkinson's disease; (tobacco and/or nicotine) smoking; (chemical) addiction; behavioral addiction; (chemical) dependence; behavioral dependence; obsessive-compulsive disorder (OCD); brain injury, headache; migraine; hang-over; heart-rate; blood pressure; blood oxygenation; cardiovascular issues; blood glucose level; insulin level/sensitivity; sinus problems; eye problems; relieves pain and suffering particularly in rheumatism, fibromyalgia, and/or asthma; improves cardiac function and cardiac function in heart failure; improves peripheral blood flow in ischemic limbs; in myocardial infarction, thermal therapy increases eNOS vascular endothelial growth factor mRNA levels; provides a noninvasive therapy for myocardial infarction; improves exercise tolerance and endothelial function; improves peripheral circulation in cerebral palsy; reduces LDL cholesterol and increases HDL cholesterol; prevents (or prolongs onset) ischemic heart disease; reduces symptoms of ischemic heart disease; improves quality of life in patients with chronic obstructive pulmonary disease (COPD); improves bronchial patency; reduces frequency of infections; increases cutaneous blood flow; urine production; kidney health; cancer growth; sexual function (for men and women); metabolic rates; muscle growth; anti-aging; longevity increasing, slowing aging; reversing aging, portions thereof; combinations thereof; and/or the like.

For example, reduced norepinephrine and dopamine may be an important indicator for Alzheimer's disease; and non-reduced or higher norepinephrine and/or dopamine levels may be used to delay onset and/or treat Alzheimer's disease. For example, body (and not face) cold water (57.2° F. [14° C.]) immersion increased metabolic rate by 350%. For example, increased dopamine levels have been shown to improve sexual function in men and in women. For example, dopamine makes the heart beat stronger and/or more forcefully, which in turn helps to circulate oxygen enriched blood more efficiently. For example, dopamine increases urine production, which helps the body rid itself of blood and/or tissue toxins. For example, in contrast to dopamine effects on differentiated cells, dopamine exerts an inhibitory effect on cancer growth (e.g., dopamine shown to slow brain cancer and breast cancer). For example, dopamine facilitates building muscle without working out/exercise.

For example, thermal therapy may reduce symptoms associated with chemical addictions and/or chemical dependencies, wherein such chemicals may include, but are not limited to: nicotine, alcohol, ethanol, caffeine, opioids, medications, over the counter medications, prescription medications, controlled substances, drugs, delta-9-tetrahydrocannabinol (THC), tobacco, marijuana, cocaine, benzodiazepines, glucose, sucrose, fructose, lactose, sugar, adrenalin, portions thereof, combinations thereof, and/or the like. Similarly, behavioral addictions and/or dependencies, such as, but not limited to, eating, food, sex, gambling, portions thereof, combinations thereof, and/or the like, may be improved by thermal therapies.

Thus, thermal stimulation of skin (cutaneous) sensory nerve endings, that produces neurotransmitters (such as, but not limited to, dopamine and noradrenaline [norepinephrine]) may be used to affect, change, treat, and/or reduce symptoms any of these medical conditions or the like.

VI. The Trigeminal Access Point of the Human Face

A direct connection from facial sensory neurons to a nucleus in the brain, called the parabrachial nucleus, has been identified that delivers pain signals, and does not exist between sensory neurons in the body and the brain. Because of this, hydrotherapy and/or thermal therapy of the face may not only be more effective (than treating other portions of the human body) but also does so without the negatives of whole-body hydrotherapy, such as the difficulties in transporting and changing the temperature of large volumes of water, and the discomfort of exposing the entire body to cold water or hot water. Another key feature of the neuroanatomical circuitry of the face is its trigeminal nerve with its connections to the vagus nerve at the level of paratrigeminal nucleus in the brain and though its interactions with the baroreceptors in the neck, which promote parasympathetic outflow. Thermal therapies and/or hydrotherapies using the thermal delivery devices, systems, and/or methods of use as taught herein that target the face, may be used to stimulate vagus nerve activity in an easier, more efficient, safer, and less expensive way as compared to the vagus nerve stimulator.

Pain, light touch, pressure, vibration, temperature, and/or proprioception (spatial awareness) may be five forms of sensory information that are detected at or near the surface of the human face/head and relayed to the central nervous system by means of the trigeminal nerve—also known as the fifth cranial nerve (CN V). See e.g., FIG. 38 for a diagram of the trigeminal nerve (or see depictions of the trigeminal nerve in human anatomy books and/or videos). The trigeminal nerve is composed of three branches, the sensory ophthalmic nerve or V1 (eye level), the sensory maxillary nerve or V2 (at the level of the cheek bone), and the mixed sensory and motor mandibular nerve or V3 (at the level of the jaw). The motor component of V3 controls the muscles of mastication (jaw muscles).

For the most part, sensory input from the human face navigates first to the trigeminal ganglion (TG) and then to centrally located trigeminal nuclei, while motor output flows in the opposite direction from the motor nucleus to the human face. The exception to this pathway is the route taken by proprioceptive afferents from muscle spindles in the muscles of mastication and other muscles of the head and neck. These proprioceptive fibers, which convey sensory information regarding jaw opposition and head position, travel to the mesencephalic nucleus, where their cell bodies reside. Superior to the TG, the mesencephalic nucleus is positioned in the caudal midbrain and rostral pons.

The TG resides just outside the human brainstem. There are two bilateral trigeminal ganglia, one on the right and left sides of the brainstem. The TG can be found residing within Meckel's caves, existing immediately lateral to the superior pons. Within the TG lie the soma (aka cell bodies) of the pseudounipolar neurons that extend peripherally to innervate various structures of the face and the head (of a human).

After receiving sensory input from the human face, the first order sensory neurons within the TG then send out afferent projections that travel to the brainstem at the level of the mid-pons and either synapse there on the chief sensory nucleus (CSN) or continue downward along the spinal trigeminal tract (STT) and synapse in the spinal trigeminal nucleus (STN). Both the CSN and the STN contain second order neurons.

The STN is an elongated nucleus medial to the STT. Sensory afferents within the STT continue their descent until they reach their destination spot within the STN. The STN, which extends from the caudal pons into the upper cervical spinal cord, splits into three subnuclei, the pars oralis (most superior), pars interpolaris, and pars caudalis (most inferior). It is somatotopically arranged, whereby sensory input from the lateral face lies more inferiorly while sensory input from medial midline structures lie superiorly.

The pars caudalis extends from the inferior medulla to C2 or C3. The second order neurons in the CSN or STN then project fibers to third order neurons located in the thalamus, primarily the ventral posteromedial thalamic nucleus, via the trigeminothalamic tract. Third order neurons from the thalamus project to the postcentral gyrus of the primary sensory cortex.

Animal studies using Evans blue indicate that the TG is not shielded by the blood brain barrier (BBB), which would make it accessible to drugs that are not CNS-penetrant. It has been suggested that the TG might be the anatomical target of certain anti-migraine drugs (e.g., monoclonal antibodies, gepants, and/or triptans). Transdermal therapies could also act directly on the TG without having to go through the BBB.

When viewed microscopically, different components of the TG have been identified. These include the neuron-glia unit (NGU), nerve bundles (consisting of grouping of individual nerve fibers), extracellular matrix with micro-vessels, and occasional mast cells and stromal cells. All the components are interdependent on one another. Within the NGU, there are three neurons covered by a divided layer of satellite glial cells. The lack of astrocytes might account for the absence of a true BBB.

The upper half of the human face is one of only three anatomical regions on the human body that contains "glabrous" hairless skin. Glabrous skin regions on the forehead, palms of the hands, and soles of the feet are capable of the most efficient heat transfer of any other location in the human body. This capacity for heat transfer is due to the distinct interface of the blood vessels directly beneath the skin. Everywhere else in the human body, blood usually flows from artery to capillary to vein. Glabrous skin regions contain unique vascular structures called arteriovenous anastomoses (also known as AVAs), where the blood flows directly from arteries straight into veins. Because there are no tiny capillaries to flow through, AVAs can absorb or give off significant amounts of heat (as compared to other regions of the human body without AVAs).

IV. Neuroanatomy of the Trigeminal System & Related Structures

A. The Parabrachial Nucleus

Dopamine is an important chemical messenger, called a neurotransmitter, that is vital to establishing reward and motivation behavior (in humans). Numerous dopaminergic neurons (nerve cells) have been found to display a short-latency response to nociceptive (pain-related) sensory stimuli.

One study used multiple techniques to study the communication between the neurons in the parabrachial nucleus and dopaminergic neurons in the substantia nigra pars compacta (part of the basal ganglia important in orchestrating movement) and the ventral tegmental nucleus (a midbrain nucleus important in mediating reward, motivation, and repulsion), including tracer studies and concurrent extracellular recordings of neurons. The study authors found extensive interactions between parabrachial and dopaminergic neurons. They concluded that the parabrachial nucleus plays a key role in conveying short-latency nociceptive information to the dopaminergic neurons.

It is well-established that craniofacial pain is subjectively experienced more intensely than pain originating from other anatomical regions of the human body. This qualitative difference was observed in a study of human subjects which reported a subjective feeling of increased fear associated with facial pain in comparison to extremity pain, despite similar intensity ratings assigned to both stimuli.

Similarly, a human neuroimaging study revealed higher levels of amygdala activation on functional MRI (fMRI) when a noxious thermal stimulus was applied to the face, in comparison to when the same noxious stimulus was applied to the hand. Interestingly, repetitive application of noxious thermal stimuli to the extremities resulted in habituation (decreased perception of pain over time), whereas repetitive noxious stimulus to the face produced increased sensitivity to pain over time.

Greater facial sensitivity to pain was corroborated by an animal study on mice performed by researchers from Duke University Medical Center that observed heightened activation of the lateral parabrachial nucleus (a critical part of the affective pain circuit) involving greater numbers of neurons when noxious stimulus was applied to the face in comparison to the hindpaw. Through these experiments, the investigators identified a previously uncharacterized monosynaptic (involving one synapse, the tiny space between neurons across which chemical signals are sent) connection between craniofacial sensory neurons and neurons in the nociceptive lateral parabrachial nuclei. When this circuit was experimentally stimulated in mice, they responded by increasing avoidance behaviors and stress cries, while experimentally blocking the monosynaptic circuit decreased their facial pain sensitivity.

Thermal sensitivity on the (human) face is greater than anywhere else on the body. While this is clearly the case for noxious/painful/unpleasant stimuli, the same is likely to be true for more mild/temperate thermal sensory input. Thermal delivery devices, systems, and/or methods as discussed herein may leverage this biological organization to maximize the benefits of hydrotherapy through its direct application to the (human) face.

B. Paratrigeminal Nucleus

The paratrigeminal (PTG) nucleus consists of a mass of interstitial cells in the dorsal tip of the spinal trigeminal tract that collects sensory information from the vagus, trigeminal, spinal, and glossopharyngeal nerves and organizes this afferent neural input for nociceptive processing and mediating the baroreceptor reflex.

From its location rostral to the obex (the lowest point in the $4^{th}$ ventricle, or open space in the brain through which cerebrospinal fluid flows), the PTG nucleus serves an important role integrating visceral and somatosensory afferent information and likely modulates autonomic function through its projections to the dorsal vagal complex. The connections between PTG and the vagus are neurochemically unique, involving enkephalins (a naturally produced opiate) and nitric oxide, which dilates blood vessels amongst other functions.

C. Trigeminal-Baroreceptor Reflex

Immersion of the (human) face in cold water slightly elevates blood pressure and induces baroreflex bradycardia (slowed heart rate). These results indicate that there is a coordinated interaction between trigeminal sensory information and carotid arterial baroreceptors that stimulates a vagal-mediated effect on cardiac activity. Some study authors suggest that trigeminal sensory afferent input to the central nervous system (from trigeminal cutaneous receptors) increases vagal cardiac outflow and then augments vagal responses to arterial baroreceptor input.

D. Trigeminal Nerve Control of Cerebral Blood Flow

Activation of the trigeminal nerve modulates cerebral blood vessels via three separate mechanisms, all of which improve cerebral blood flow (CBF). First of all, there is retrograde movement of the electrical discharge of the trigeminal nerve that triggers the expulsion of vasoactive peptides (protein signaling molecules that act on blood vessels) onto the cerebral vasculature leading to cerebrovasodilation. Secondly, sensory afferents of the trigeminal nerve are part of a parasympathetic reflex arc that enhances CBF through cerebrovasodilation. Thirdly, the trigeminal nerve directly communicates with the rostral ventrolateral medulla (RVLM), causing a pressor response (increasing systemic blood pressure). The RVLM, a vital medullary nucleus, helps to regulate systemic vasomotor changes.

Another access point for the trigeminal nerve's influence on cerebral perfusion is through the sphenopalatine ganglion (SPG), an important supplier of parasympathetic innervation to the cerebrovasculature. The ability of SPG stimulation to vasodilate cerebral blood vessels, enhance ipsilateral CBF, and improve cortical perfusion was verified in preclinical studies. Research on rats and dogs suggests that it also enhances the permeability of the blood brain barrier (BBB).

The SPG, which contains both autonomic and sensory nerves, has a close association with the trigeminal nerve. It may be the last synaptic connection in the trigeminal nerve impulse spread associated with the group of headaches known as the trigeminal autonomic cephalgias, which include cluster headaches. Furthermore, the SPG might play a key role in spreading the outflow of trigeminal electrical activity during migraine to the tissue layers lining the brain, called the meninges. The autonomic nerves of the SPG innervate the lacrimal glands and the nasal and sinus epithelia. It is located directly posterior to the bony structures of the nasal cavity within the pterygopalatine fossa of the skull.

The activity of the trigeminal nerve has a considerable influence on cerebral perfusion in both normal and disease states. The importance of cerebral perfusion to brain function and health cannot be overstated. Disease states that are overtly characterized by abnormal cerebral perfusion include acute ischemic stroke, subarachnoid hemorrhage, and traumatic brain injury. All these pathologies have the possibility of being helped by trigeminal nerve stimulation.

Furthermore, there appears to be a highly significant inverse relationship between CBF and the development of white matter hyperintensities (WMH). In other words, poor cerebral perfusion predicted later leukoaraiosis (another term for WMH) while good CBF decreased the likelihood of its development. WMH are manifestations of brain damage from small vessel disease that, when present en masse, increase risk for cognitive impairment and dementia as well as other brain pathologies.

New advances in brain magnetic resonance imaging (MRI) studies are showing "pre-visible" changes in white matter regions of the brain that precede the appearance of recognizable WMH. This transitional pre-visible disease state is characterized by interstitial fluid mobility and water content and may be reversible by improving perfusion. Later changes include demyelination and axonal damage, which may be irreversible, leading to vascular cognitive impairment and dementia. Thus, attacking the disease process at an earlier stage by enhancing CBF, such as through trigeminal stimulation, is critical.

VIII. Face Desirable Location for Targeted Thermal- and/or Hydro-Therapy

The face versus the body may be a more desirable target of such thermal stimulation of skin (cutaneous) sensory nerve endings, because: the face is highly innervated; face skin reacts more strongly and faster than body skin in response to thermal stimulation; face skin feels cold, heat, and/or pain more intensely than body skin; facial and/or cranial nerves are wired directly to the brain versus body nerves which are wired to the spinal cord; a high density of facial skin nerve endings compared to many other parts of the body; and/or that nerve signals have a shorter distance to travel for facial and/or cranial nerves versus body nerves.

Additionally, thermally treating the (human) body (wherein "body" may be from below the neck) and not the face (or both the body and the face together) may have disadvantages versus just thermal treatment of the face only, because thermally treating the body and not the face (or both the body and the face together) is more likely to result in hypothermia or heat exhaustion/stroke because the entire body is being cooled/heated as compared against just thermally the face only, wherein only the face is being cooled/heated.

The entire body has both more mass and more surface area as compared to just the face. Thus, thermally treating the body and not the face (or both the body and the face together) may have disadvantages versus just thermal treatment of the face only, because thermally treating the body and not the face (or both the body and the face together) requires more energy to cool/heat that entire body as compared against just the face only, because of the larger amount of mass and surface area. Similarly, because the body is so much larger than the face, the size of the equipment for cooling/heating the body is much larger than equipment for cooling/heating just the face, which has less mass and less surface area. Thus, there may be scenarios where cooling and/or heating only the head, the face, or a portion thereof and not cooling and/or heating the remainder of the subject's body may be desired.

IX. Health Benefits of Hydrotherapy

There are a multitude of documented and purported benefits for hydrotherapy, such as, but not limited to: promotion of physical health (cardiovascular, endocrine, neurological, and/or immune); fortification of mental health and sense of wellbeing; aesthetic enhancement; rehabilitation, recovery, and/or physical therapy; disease treatment; disease prevention; portions thereof; combinations thereof; and/or the like.

Psychological benefits of hydrotherapy have also been well-established. Recovery from mental fatigue has been specifically described following immersion in water of a mild temperature. Enhanced relaxation, quality of life, and relief from mental stress and/or depression have also been characterized and documented.

A study on thermoneutral water immersion demonstrated its ability to improve cardiac output at a specified oxygen consumption level. Relative hyperperfusion of peripheral tissue was a natural consequence of this process. When subjects engaged in exercise immersed in water were compared to subjects exercising out of water, the study authors found that cardiac output increased by 50% due to water immersion, which amplified further when the temperature of the water was lowered. Both greater stroke volume and decreased peripheral resistance during water immersion were responsible for boosting cardiac output, enhancing overall blood flow to the tissues of the body.

One study investigated the effects of water immersion on cerebral perfusion. The study authors enrolled nine young and healthy male (human) subjects and subjected them to normothermic water immersion up to the level of the right atrium. This raised multiple physiologic measures of cardiovascular transport and aerobic respiration, including mean arterial pressure, cardiac output, and end-tidal carbon dioxide, and enhanced cerebral blood flow velocities in the middle and posterior cerebral arteries at the same time. These changes disappeared when water immersion stopped. This study shows the potential impact water immersion might provide to improve cerebrovascular as well as cardiovascular and respiratory health.

A. Warm Water Immersion

The potential benefits of vasodilation due to warm water immersion (WWI) cannot be overstated. Dilation of the vasculature leads to improved blood flow, tissue perfusion and oxygenation. In a group of young women, "passive heating" via hydrotherapy resulted in higher middle cerebral artery velocity and overall cerebrovascular conductance. The potential neurological benefits of this finding are enormous, particularly for patients suffering from stroke, or other cerebrovascular disorders.

One study measured an increase in serum levels of Brain-Derived Neurotrophic Factor (BDNF) following a 20-minute warm water bath. BDNF is a protein chemical messenger that has been linked to the proliferation, growth, differentiation, and maintenance of neurons. Regular warm water immersion (WWI) hydrotherapy could stimulate neurogenesis (creation of new neurons) and even reduce risk of dementia and cognitive decline. A decrease in cortisol levels was also observed, correlating with patient reports of reduced stress and an overall sense of wellbeing associated with hydrotherapy.

Interestingly, the trigeminal ganglion CGRP intercellular signaling pathway involves BDNF. Neurons within the trigeminal ganglion closely communicate with surrounding satellite glia cells via calcitonin gene-related peptide (CGRP) signaling. The glial cells release BDNF, which might play a role in a positive feedback loop to increase production of CGRP and promote nociceptive transmission through a tyrosine kinase (TrkB) receptor signaling pathway. This link between trigeminal ganglion intercellular communication and BDNF production suggests that hydrotherapy applied to the (human) face might also increase BDNF levels through this CGRP intercellular signaling pathway.

A 20-minute daily foot bath in warm water (41 degrees Celsius [106 degrees Fahrenheit]) in a group of elderly subjects resulted in a 22% reduction in the prevalence of sleep disorders. Given the prevalence of sleep disturbances in this population, these results are quite remarkable. The non-pharmacological nature of hydrotherapy makes it an ideal intervention to minimize polypharmacy (which can also adversely impact the geriatric population).

A review article evaluated nine (9) studies on the effects of WWI, which included multiple studies that investigated its impact on cardiovascular perfusion. These studies showed that WWI was able to circumvent the ischemic effects of vascular disease through vasodilation. Another pattern observed in subjects following WWI was reactive hyperemia, which is a phenomenon of enhanced blood flow that occurs as a compensatory response to a transient reduction or occlusion of blood flow. By lowering vascular resistance, reactive hyperemia enhances cardiopulmonary function. This phenomenon is frequently seen following exercise. In this way, the physiologic effects of WWI mirror the cardiovascular benefits of working out.

An investigation of the impact of warm water immersion (or cycling) on cardiorespiratory fitness yielded impressive results. Those researchers designated two experimental groups: warm water immersion in a 42 degree Celsius (108 degree Fahrenheit) bath vs. cycling aerobic exercise. Both groups engaged in their respective activity for 30 minutes, 3 times per week over the course of 2 months. At the end of the study period, both groups experienced increases in both cardiorespiratory fitness ($VO_2max$) and brachial artery flow-mediated vasodilation, as compared to baseline measures ($p<0.05$). The authors concluded that "passive heat training" could be a useful adjunct to cardiovascular exercise.

Of note, a separate group of investigators found increased levels of oxyhemoglobin (oxy-Hgb) in healthy human subjects that underwent a warm water foot bath. This improvement in the oxygenation of blood hemoglobin followed a dose-response, with more pronounced elevations in oxy-Hgb levels correlating with greater increases in water temperatures (38, 40, and 42 degrees Celsius [100, 104, and 108 degrees Fahrenheit]). Not only is more blood able to reach tissue (secondary to blood vessel dilation), but that blood can carry greater amounts of oxygen once it arrives.

These findings are consistent with results from another study investigating the impact of warm water immersion on various markers of cardiovascular health. Here, a group of healthy, young (albeit sedentary) subjects underwent WWI for 30 minutes per day, 3 times per week for 8 weeks. In comparison to the control group that underwent immersion in isothermal water, WWI was associated with reduced blood pressure and decreased carotid artery atherosclerosis and stiffness. Furthermore, WWI subjects exhibited elevated flow-mediated vasodilation (in comparison to isothermal controls).

The reduction in carotid artery stiffness from WWI extends peripherally. Research found a decrease in cardio-ankle vascular index, a measure of peripheral arterial atherosclerosis, following a warm water foot bath in healthy women between the ages of 29 and 60, suggesting less arterial stiffness and enhanced peripheral blood flow. Another study examined the effects of a 5-minute WWI up to heart level on a group of 10 men between the ages of 27 and 57; and that study found significant acute reductions in both peripheral and aortic arterial stiffness as well as enhanced perfusion of the coronary arteries (the arteries supplying blood to the heart).

These improvements in widespread vascular health outcome measures collectively support the use of hydrotherapy to promote cardiopulmonary health and enhance cerebrovascular and peripheral vascular perfusion.

The benefits of WWI extend to metabolic health and glucose control. One study demonstrated an ability of WWI to lower fasting blood glucose and insulin level in a group of sedentary overweight adults after repeated immersion in water heated to 39 degrees Celsius. Release of an acute inflammatory marker (IL-6) was also triggered by WWI leading to a paradoxically long-term anti-inflammatory effect.

B. Cold Water Immersion

Cold water immersion (CWI) has been associated with improvements in stress management, pain management, metabolism, attention, cognition, and/or overall mood. Cold water exposure activates specific nuclei within the reticular activating system (such as the locus coeruleus and raphe nuclei) resulting in a general state of alertness as well as a greater capacity of the central nervous system to recruit motor neurons. These systemic and functional effects can be attributed to the impact of CWI on the human sympathetic nervous system. Indeed, an increase in heart rate, blood pressure, metabolism, and peripheral catecholamine levels have been observed with CWI.

Like with WWI, there is evidence that CWI increases BDNF expression. A study published in 2013 evaluated the effects of cold-water swimming on chemical signaling in the brains of experimental rats. The study authors specifically analyzed the expression of different neurotrophins (a general term for neuronal growth factors), including BDNF, within the hippocampus of the brain, the brain's memory center. Cold water swimming increased hippocampal BDNF expression relative to controls.

An increase in heart rate variability (the variation in heart rate due to adjustments in autonomic activity) can be observed during cold water hand immersion. Heart rate variability is a marker of cardiovascular adaptability and health. In comparison to hot water hand immersion (at significantly high temperatures of 48 degrees Celsius [118 degrees Fahrenheit]), individual pain tolerance with higher reported pain thresholds was seen during hand CWI. This is likely due to both decreased nerve conduction velocity in addition to diminished pain perception associated with high levels of sympathetic activation. Indeed, one study determined that local application of cold temperature induces an analgesic effect via reduction in measured nerve conduction velocity and inhibition of nociceptive receptor sensitivity.

One study made an impressive discovery regarding the release of chemical messengers during cold water exposure. They found that cold water immersion of the human body resulted in a 250-500% increase in circulating levels of catecholamines such as epinephrine, norepinephrine, and dopamine. Cold-induced sympathetic activity promotes the release of norepinephrine both peripherally (from the adrenal glands) as well as within the central nervous system (CNS), most notably at the locus coeruleus. Increased levels of circulating norepinephrine are also accompanied by elevated beta-endorphin. Notably, there is an absence of a concurrent increase in the stress hormone cortisol. This combination of stress hormones (catecholamines without cortisol) produces what Nobel prize winner Hans Selyer described as 'eustress,' during which one experiences heightened energetic state without a concurrent degree of anxiety or other negative mental impact.

One study of young healthy men found that those who experienced cold water immersion for at least 11 minutes per week saw an increase in brown fat thermogenesis. This translated to a compensatory increase in core body temperature and a subsequent boost in their basal metabolic rate. The elevation in core body metabolism has both acute and long-term features.

Immediately upon entering the water and during CWI, the body will attempt to generate heat to compensate for the cold environment through shivering. However, following repetitive, chronic exposure to cold water, the human body will increase its stores of brown fat. This type of adipose tissue is literally shaded brown due to an increased number of mitochondria within individual cells. The mitochondria produce an uncoupling protein which decouples the proton (positively charged hydrogen ion) gradient created to produced chemical energy in the form of ATP and instead releases energy in the form of heat.

It is the increase in mitochondrially-dense brown fat stores (typically located beneath the clavicle, surrounding the heart and upper back) that requires more calories for maintenance (resulting in an increased metabolism on a long-term basis). Not only does CWI increase brown fat stores, but elevated norepinephrine, in fact, targets receptors on less metabolically active "white" adipose tissue to transform them into more metabolically active brown adipose tissue (BAT).

The mitochondrial uncoupling that occurs in brown fat makes individual mitochondria less efficient at producing energy but also protects mitochondria and their associated cells from the damaging effects of reactive oxidative species, aka free radicals. Mitochondrial health is optimized in brown fat, while total available energy in the tissue increases due to the increase in mitochondrial number from mitochondrial biogenesis, the production of new healthy mitochondria.

The molecular mechanism underlying the induction of mitochondrial biogenesis following CWI was elucidated from studies investigating the effects of leg CWI after exercise. These studies found that CWI upregulated the gene expression of peroxisome proliferator-activated receptor γ coactivator-1α (PGC-1α), a gene-regulating protein. By modifying gene activity, the regulatory protein induces vascular and metabolic changes, including exercise-induced mitochondrial biogenesis, to enable organisms to meet the demands of exercise. The upregulation of PGC-1α was found to extend beyond the cold water exposed limb, implying that a systemic (whole body) response occurs, which might be accomplished by catecholamine activation of AMP-activated protein kinase (AMPK). These mitochondrial effects have been shown to persist after multiple rounds of CWI. Leg CWI demonstrates that limited exposure to cold water to specific body part can have health benefits for the entire body. There is evidence suggesting that adaption to CWI and other cold exposures is centrally directed by the brain. This enables a coordinated whole-body response that could be leveraged to promote health by only using CWI on less than the whole-body.

Another study measured biological indicators of metabolic and cardiovascular health in a group of healthy young men immediately following immersion in water at various temperatures (32, 20, 14 degrees Celsius [90, 68, 57 degrees Fahrenheit]). As a point of reference, baseline (human) body temperature is 37 degrees Celsius (98.6 degrees Fahrenheit). Immersion in water at 32 degrees Celsius produced a somewhat calming effect (as indicated by an 11% and 15% decrease in blood pressure and heart rate, respectively). This parasympathetic response was paired with a 24% decrease in cortisol, a stress hormone. A significant increase (107%) of diuresis (excretion of bodily fluids) was also observed. In 20-degree Celsius water, an increase (93%) in metabolic rate was noted. This effect became even more pronounced for the group immersed in colder water (14 degrees Celsius): an impressive 350% increase in metabolic rate was measured, with resultant increases in heart rate and blood pressure, both systolic and diastolic (by 5%, 7%, and 8%, respectively). The boost in metabolism was accompanied by a 530% increase in norepinephrine levels and a 250% increase in Dopamine. This surge of catecholamines was not paired with a concurrent increase in cortisol, consistent with the physiologic state known as eustress. Increased metabolism and an improved overall mood were found to be associated with cold water immersion (CWI), as reflected by the biomarkers listed above.

An interesting physiological and biochemical phenomenon observed with CWI is increased minute ventilation (respiratory rate), decreased end tidal $CO_2$ levels, and cerebral vasoconstriction. These changes occur as part of a cold shock response (CSR) when someone is initially exposed to CWI, which can cause symptoms of dizziness. However, the CSR can be partially offset through leg exercise (kicking) begun 30 seconds after entering the water. Furthermore, another study showed that providing detailed instructions on suppressing reflex hyperventilation before CWI could prevent any meaningful decrease in cerebral blood flow velocity even in cold water naïve participants.

The CSR might seem like a drawback, but in fact, there is evidence that the limited stress provided by CWI can be used to optimize physiologic function and thus combat the negative effects of injury, a process known as hormesis. One study demonstrated that rats preconditioned with cold water swimming suffered less cognitive impairment than control mice following experimentally induced traumatic brain injury (TBI). Cognitive function was assessed using the Morris water maze, an evaluation where a rodent is taught to find a submerged platform in repeated trials. The neuroprotection demonstrated through preserved cognitive functioning was accompanied by an increase in the number of circulating endothelial progenitor cells (blood vessel precursor cells) and by enhanced angiogenesis (growth of new blood vessels) in the hippocampus (memory center) of the preconditioned rats.

One study investigated the effects of cold-water facial immersion on cerebral perfusion as measured by middle cerebral artery mean flow velocity (MCA $V_{mean}$). The middle cerebral artery (MCA) is one of the major arteries to the brain. Nine trained divers (all male) were evaluated during exercise, apnea, and facial immersion in 10 degree Celsius (50 degree Fahrenheit) water. Facial immersion in cold water was shown to enhance MCA $V_{mean}$ independent of carbon dioxide elevation (which also increases MCA $V_{mean}$).

CWI of the (human) face induces a demonstrably powerful parasympathetic response, which could be mediated by the paratrigeminal nucleus interconnections with the vagus nerve, and the communication between trigeminal sensory information and carotid baroreceptors, that augment vagal outflow. This stimulation of the parasympathetic nervous system by CWI resembles the mechanism of action of the vagus nerve stimulator (VNS), which has been used in the treatment of thousands of people with drug-resistant epilepsy and depression since 1997 and 2005, respectively. Thus, facial CWI, provided by thermal delivery devices, systems, and/or methods of use as taught herein, could enable a more natural, simpler, safer, and less expensive way to stimulate the vagus nerve.

Regular winter swimming has been associated with improvements in negative mood state, muscle tension, fatigue, and even memory. For swimmers suffering from either fibromyalgia or rheumatism, regular cold-water immersion improved associated pain symptoms. There are also purported immune benefits associated with cold exposure. Following immersion in 18-degree Celsius (64-degree Fahrenheit) water, increased circulating levels of leukocytes, granulocytes, and natural killer (NK) cells were measured.

A studies review analyzed 17 small trials that included a total of 366 (human) subjects to evaluate the benefit of CWI in preventing and treating muscle soreness after exercise. Those authors concluded that there is evidence that CWI decreases delayed onset muscle soreness following exercise compared to rest or no intervention. Beneficial effects of CWI were seen at 24 hours, 48 hours, 72 hours, and 96 hours following exercise.

A study evaluated the effects of CWI on different inflammatory markers and hormonal levels as a way of trying to elucidate its analgesic and anti-inflammatory properties. The inflammatory markers evaluated included the interleukins, IL-1-beta and IL-6, and tumor necrosis factor (TNF) alpha, and the hormones assessed included plasma adrenocorticotropic hormone (ACTH), cortisol, and the catecholamine hormones epinephrine and norepinephrine. This study authors evaluated a group of 10 healthy women subjected to winter swimming at a water temperature of 0-2 degrees Celsius three times per week for a duration of 12 weeks. These study authors found a reduction in plasma ACTH and cortisol during weeks 4-12 of CWI compared to the first week, which they attributed to habituation. While epinephrine remained unaffected, CWI boosted norepinephrine levels by 2 to 3-fold. These findings again demonstrate a eustress response. Cold exposure did not alter levels of any of the inflammatory markers. Given the positive correlation between CWI and norepinephrine levels, researchers hypothesized that norepinephrine may be responsible for the pain-relieving effects of cold exposure.

A study investigated the effects of CWI on young, healthy undergraduate students. After filling out a mood profile survey called the Profile of Mood States (POMS) questionnaire, 42 students were exposed to immersion in cold sea water at 13.6 degrees Celsius while 22 students served as controls. Participants, both in treatment and control groups filled out the POMS again following the intervention. The study authors found a significant improvement in mood in the CWI group compared to baseline. CWI reduced negative emotions and elevated positive emotions. No improvement was seen in controls when they repeated to questionnaire. In fact, the control droop scored higher on levels of depression compared to baseline.

The release of dopamine from cold exposure induced by CWI is another key human physiologic response. Very brief durations of cold exposure can result in persistent dopamine elevations that boost mood, energy, and focus. Numerous disease processes involve dopamine derangements, such as Parkinson's disease, substance abuse, disorders, and ADHD. There is strong potential that CWI might provide benefit in these conditions.

Elevated serotonin levels are also associated with CWI. Along with norepinephrine and dopamine, serotonin plays a central role in mood and well-being. Selective serotonin reuptake inhibitors (SSRIs) and serotonin-norepinephrine reuptake inhibitors (SNRIs) are two major classes of antidepressant medications. CWI has been shown to boost serotonin levels by reducing inflammatory signaling. Inflammatory cytokines can trigger depressive symptoms, including poor mood, low energy, and social isolation. A particular inflammatory cytokine called indoleamine 2,3-dioxygenase (IDO) breaks down tryptophan, a precursor to serotonin. Thus, induction of IDO from pro-inflammatory cytokine signaling lowers serotonin levels, which may promote the development of depressive symptoms. This molecular mechanism was identified in experimental rats that expressed depressive behavior. After exposure to cold water from swim training, the rodents' release of IDO fell, and their depressive symptoms decreased. In this way, CWI might also work in humans to counteract inflammation-induced depression.

There is also evidence that the hypothalamic hormone oxytocin, which is known for its anti-stress effects, might also play a key role in mediating health benefits from CWI. Oxytocin may promote thermogenesis by increasing brown adipose tissue (BAT) activity via the sympathetic nervous system, which is regulated by the hypothalamus. A preclinical study showed that experimental mice upregulated oxytocin in their brains in response to both short and long-term cold exposure. Additionally, correlation between genes involved in thermoregulation seems to depend on oxytocin receptor expression genes. In the absence of oxytocin activity, BAT metabolism and cold-induced thermogenesis are impaired, suggesting that oxytocin has a regulatory role in these processes. Like norepinephrine, oxytocin has the capacity to "brown" white adipose tissue (WAT), which has been demonstrated in inguinal WAT, with associated benefits in fighting obesity and poor metabolic health. Oxytocin may influence other pathways involved in BAT activity, including alpha-melanocyte stimulating hormone (a-msh), endocannabinoids, and steroidogenic factor 1 (SF1). It might also downregulate corticotropin releasing hormone (CRH) during adaptation to chronic stress. Studies suggest that oxytocin activity within the brain pertaining to cold adaptation occurs in the hypothalamus and the rostral medullary raphe, although other brain regions or peripheral sites may be involved. Several studies show that bone increases production of oxytocin following cold exposure, for example. Preliminary studies suggest that oxytocin (which can be induced by cold exposure, such as CWI) has far-reaching health benefits. It acts as a good serine protease dipeptidyl peptidase-4 (DPP4) inhibitor, a certain class of anti-diabetic medication that helps lower glucose levels. Research is showing that it may have cardioprotective effects mediated through the release of atrial natriuretic peptide and nitric oxide, which have cytoprotective (cell protective) functions and aid in reperfusion of ischemic heart muscle. Oxytocin is also known to have both anti-inflammatory and pro-immune properties.

C. Homeostasis & Thermoregulation

The human body possesses an internal thermostat that regulates the body's core temperature on a generally 24-hour cycle. Approximately 2 hours prior to waking, one experiences their temperature minimum which then steadily increases into the afternoon (when maximum daily temperature is generally reached). Often a fluctuation of roughly 0.9 degrees Celsius (0.5 degrees Fahrenheit) is observed over the course of a given 24-hour cycle.

It is possible to 'hack' this daily cycle to achieve more alertness by experiencing cold early in the morning. This will signal your body to raise your core temperature due to the cold environment. The inverse is also true; warm water immersion prior to bed time assists with cooling down core body temperature and facilitating the transition into sleep, reducing sleep latency and enhancing sleep depth.

The palms, soles, and upper half of the (human) face are the three anatomical regions of the human body that are most effective at heat transfer. Whereas blood typically flows from artery to capillary to vein, these three regions generally lack capillaries. Known as AVAs (arteriovenous anastomoses), the warm arterial blood flows directly into the venous draining system, allowing for significant heat to be given off or absorbed (depending on the surrounding environment).

X. Therapeutic Potential of Thermal and/or Hydro Therapy

The thermal delivery devices, systems, and/or methods of use as taught herein may be used for various therapeutic benefits from thermal therapies and/or from hydrotherapies.

Thermal therapies and/or hydrotherapies using the thermal delivery devices, systems, and/or methods of use as taught herein, may be used to provide various therapeutic benefits with respect to one or more of the following medical disciplines: aesthetic medicine; cardiovascular; dermatological; ear, nose, and throat (otolaryngology); ophthalmology; neurological; psychological; endocrinology; rheumatology; portions thereof; combinations thereof; and/or the like.

A. Aesthetic Medicine ("Med Spa")

Aesthetic medicine and/or "med spa" may include treatments for reducing, minimizing, and/or slowing down aging related skin problems, such as, but not limited to, skin wrinkles, age-spots, and/or the like. Aesthetic medicine and/or "med spa" may include treatments for hydrating, moisturizing, exfoliating, lifting, plumping, adding/returning elasticity, and/or the like with respect to human skin. Thermal therapies and/or hydrotherapies using the thermal delivery devices, systems, and/or methods of use as taught herein, may be used to provide various therapeutic benefits to human skin.

B. Cardiovascular

Thermal therapies and/or hydrotherapies using the thermal delivery devices, systems, and/or methods of use as taught herein, may be used to provide various cardiovascular therapeutic benefits. The disease process of atherosclerosis causes structural changes in the vascular endothelium and inflammatory reactions that result in a narrowing of the vascular lumen and stiffening of the arterial wall due to buildup of fatty plaque. These pathological changes alter shear stress forces and cause deleterious hemodynamic fluctuations. Evidence of hydrotherapy's vasodilatory effects, augmentation of arterial blood flow, and reduction in arterial wall stiffness, as demonstrated in research studies, supports the use of hydrotherapy as an adjunctive treatment for atherosclerosis.

Further, one study investigated 32 human patients with chronic congestive heart failure (CHF) secondary to dilated cardiomyopathy who underwent treatment with WWI hydrotherapy (hot water bath) at 41 degrees Celsius (106 degrees Fahrenheit) for 10 minutes. Improvements in cardiac function were observed, including enhanced cardiac and stroke indices and reduced systemic vascular resistance ($p<0.01$). Mitral regurgitation (abnormal backflow of blood through the mitral valve) also improved both while the subject was bathing and 30 minutes afterwards. The above findings were further supported by an echocardiographic study of 18 elderly human patients with congestive heart failure (CHF) where the researcher's observed improvement in biventricular systolic and diastolic function associated with warm water immersion. WWI was well tolerated by this patient population across the 8-week study period.

C. Dermatological

Thermal therapies and/or hydrotherapies using the thermal delivery devices, systems, and/or methods of use as taught herein, may be used to provide various dermatological therapeutic benefits.

An 8-year observational study of over 14,000 patient records investigated the effect of hydrotherapy on atopic dermatitis and psoriasis. Following 3 weeks of daily hydrotherapy, both the SCORing Atopic Dermatitis (SCORAD) and Psoriasis Area and Severity Index (PASI) clinical outcome measures demonstrated a statistically significant improvement.

In a study of over 800 cases of pediatric atopic dermatitis, the authors reported a clinically and statistically significant improvement in SCORAD outcomes in patients aged less than 16 years. The clinical improvement was especially pronounced in those with severe disease and in patients less than 4 years of age. According to the study authors, hydrotherapy was well tolerated, and no relevant adverse effects were reported.

Eighty-five percent (85%) of young people aged 14 to 25 develop acne, and 20% of all adults suffer from the condition, who could benefit from the therapeutic effects of hydrotherapy on the face (or other regions of skin with acne).

A group of Swiss clinical researchers investigated the benefits of 2-3 weeks of hydrotherapy utilizing hot spring water, water jets, and hydro-pressure on 31 patients suffering from skin burns. It was observed that the skin was more homogenous in structure, color, and viscoelasticity with diminished pruritus following hydrotherapy intervention. These results were "permanent" if hydrotherapy was administered for 3-6 months.

D. Ears, Nose, Sinus, and/or Throat (Otolaryngology)

Thermal therapies and/or hydrotherapies using the thermal delivery devices, systems, and/or methods of use as taught herein, may be used to provide various ears, nose, sinus, and/or throat (otolaryngology) therapeutic benefits. One study found a significant symptomatic benefit in nasal symptom scores in patients with allergic rhinitis treated with steam inhalation at a temperature of 42 to 44 degrees Celsius compared to baseline with a trend towards improvement in total nasal airflow. Another study evaluated the effects of daily nasal saline irrigation, daily steam inhalation, or both, versus usual care in the treatment of patients with chronic or recurrent sinusitis in a randomized controlled trial that enrolled 961 (human) patients who were randomly assigned to each of the four groups. Benefit was determined using the Rhinosinusitis Disability Index (RSDI) questionnaire, which was taken at baseline (871 were completed) and then after three months of intervention (671 of the initial 871 questionnaires were completed). RSDI scores significantly improved in groups with nasal irrigation compared to those without, which was sustained at six (6) months. A benefit found from steam inhalation was fewer headaches.

E. Ophthalmology

Thermal therapies and/or hydrotherapies using the thermal delivery devices, systems, and/or methods of use as taught herein, may be used to provide various ophthalmological therapeutic benefits.

Warm water compresses draped over the eyelids are the current standard of care for blepharitis (aka "dry eye"). Immersion of the face in a warm water may produce similar or better benefits for patients suffering with blepharitis. One study enrolled 42 (human) patients and investigated three warm compress devices, one of which employed moist heat, the OPTASE™ Moist Heat Mask. Only the moist heat compress device was able to effectively lower pathogen levels in *Demodex folliculorum* blepharitis.

Multiple studies have investigated the benefit of applying devices that use moist heat in the treatment of meibomian gland dysfunction, which is may be a significant cause of dry eye disease (DED). In the immediately above noted study for *Demodex folliculorum* blepharitis in which the authors investigated three warm compress devices, the moist heat compress device was able to significantly improve a composite score of meibum quality and ease of secretion from the meibomian gland. Another study investigated another moist heat device, the Blephasteam, in the treatment of meibomian gland dysfunction. The researchers enrolled seventy (70) patients of a Norwegian population. After six (6) months of treatment, the moist heat device was shown to significantly boost measures of meibomian gland function.

F. Neurological

Thermal therapies and/or hydrotherapies using the thermal delivery devices, systems, and/or methods of use as taught herein, may be used to provide various neurological therapeutic benefits.

A case report described six (6) (human) patients with trigeminal neuropathic pain (half of whom were diagnosed with trigeminal neuralgia) who underwent peripheral nerve stimulation, either of the trigeminal nerve directly or indirectly through the occipital nerve, which communicates with the trigeminal nerve at the level of the trigeminocervical nucleus. All patients experienced a large reduction in their reported facial pain at follow-up compared to their baseline pain levels.

Globally, the prevalence of headache disorder (symptomatic at least once in the past year) is estimated to be 47% (Headache disorders, WHO). The three (3) most common types of headaches are tension, sinus, and migraine headaches (in decreasing order of prevalence). According to the WHO Global Burden of Disease assessment, headache is the sixth leading cause of years lost to disability (YLD), placing a severe economic burden on both individuals and society overall (Headache disorders, WHO). The involvement of the fifth cranial nerve in headache has been thoroughly established, following the original postulation by Wolff in the 1940's. There are four (4) major types of headaches associated with the trigeminal nerve: tension headache, migraine, sinus headache, and cluster headache (part of a larger group of headaches known as trigeminal autonomic cephalgias).

An interesting prospective, observational, proof of concept study was conducted by ER physician, James Miner. Dr. Miner administered a 30-minute cold water head bath to treat 18 patients with a mean age of 29 years old who presented to the ER for treatment of headache. Patients met diagnostic criteria either for migraine headache, migrainous headache without meeting full diagnostic criteria for migraine, or tension headache. Dr. Miner's approach utilized gradual water cooling from lukewarm to cold over a period of 15 minutes since sudden cold exposure from an ice bath or ice pack can acutely worsen headache. The ice bath consisted of porcelain container, similar to the basin of a sink, containing lukewarm water with an icepack at the bottom of the basin that gradually cools the water. The patient then lowered their head back into the water basin in a supine position (on their back) until their head was submerged just above ear level. Before therapy, headache pain was rated severe by ten (10) patient and moderate by eight patients. After 30 minutes, the median headache pain level of all the study participants dropped nearly 20 points on a 100-point scale, and nine (9) patients rated their pain level as mild. An additional 30 minutes of cold-water immersion for a total of 60 minutes had only modest effects (median pain level dropped another two points and one more patients rated their headache pain as mild).

One study assessed how daily nasal saline irrigation, daily steam inhalation, both hydrotherapies, or usual care affected patients' symptoms with chronic or recurrent sinusitis. The authors conducted a randomized controlled trial that enrolled 961 patients who were randomly assigned to each of the four groups. Benefit was determined using the Rhinosinusitis Disability Index (RSDI) questionnaire, which was taken at baseline (871 were completed) and then after three months of intervention (671 of the initial 871 questionnaires were completed). Both nasal saline irrigation and steam inhalation were linked to less sinus headaches. Also, the application of a warm (moist) washcloth to the face is frequently recommended by healthcare professionals for relieving of sinus headache and congestion.

A study evaluated the application of non-invasive vagus nerve stimulation (nVNS) as a means of reducing the frequency of cluster headache. Ninety-seven (97) cluster headache (human) patients were randomly assigned to standard of care (49) or nVNS (48). After four (4) weeks of treatment, the nVNS group had significantly fewer headaches per week compared to compared to the control group. Furthermore, a significantly higher percentage of subjects in the nVNS group experienced a more than fifty percent (50%) drop in headache frequency compared to the control group. As mentioned above in the anatomy discussion, the trigeminal nerve has interconnections with the vagus nerve through the paratrigeminal nucleus and facial immersion in cold water may be a more efficient, safe, and effective way of stimulating the vagus nerve. Therefore, the thermal delivery devices, systems, and/or methods of use as taught herein may produce similar or better effects to nVNS with even less possibility of having side effects.

Migraine headache is associated with several autonomic symptoms. A growing body of literature supports that dysfunction of the autonomic nervous system is linked to the pathophysiology of migraine. For this reason, thermal therapies may have benefits for treating migraine patients.

Thermal hydrotherapy was studied as a non-pharmacological adjunct (conventional therapy versus conventional therapy PLUS hydrotherapy) in forty (40) (human) patients suffering from chronic migraine. Patients receiving hydrotherapy placed an arm and foot in a hot bath (39-43 degrees Celsius [103-110 degrees Fahrenheit]) while simultaneously receiving an ice massage to the scalp. Such thermal hydrotherapy was administered for twenty (20) minutes, daily for forty-five (45) days. At the end of the treatment period, the group receiving conventional therapy plus the thermal hydrotherapy experienced a decrease in both the frequency and intensity of headaches.

Four decades ago, preclinical research showed that cooling laboratory rats to 30 degrees Celsius achieved by partial immersion in a water bath significantly preserved beam balance skills following experimentally induced traumatic brain injury (TBI) compared to normothermic controls. There was a tendency toward less impairment of balance skills after cooling to 33 and 36 degrees Celsius.

More recent preclinical research on laboratory rats demonstrated that preconditioning with cold water swimming can preserve cognitive function (assessed using the Morris water maze) following experimentally induced traumatic brain injury (TBI). This is likely due to a hormesis response, in which a time limited mild to moderate stressor leads to changes in gene and protein expression that optimize physiologic function and protect against injury. In this study, the preservation of cognitive function was accompanied by enhanced hippocampus angiogenesis and proliferation of circulating endothelial progenitor cells.

Research on stimulation of the trigeminal nerve is also demonstrating its potential to alleviate damage from traumatic brain injury (TBI), specifically its ability to impact so-called 'secondary injury' from ischemia and hypoxia that occurs after the initial head trauma. Trigeminal nerve activity can improve cerebral perfusion on multiple levels, including activation of the rostral ventrolateral medulla, which elevates blood pressure, as well as inducing cerebrovasodilation via trigemino-cerebrovascular and trigemino-parasympathetic interactions. One study investigated the effect of trigeminal nerve stimulation (TNS) on cerebral blood flow (CBF) and brain oxygen tension ($PbrO_2$) following experimentally induced TBI in laboratory rats. The study authors hypothesized that trigeminal nerve stimulation (TNS) would lessen the damage from secondary injury. A controlled cortical impact was delivered to the rats' brains and then the rats received TNS for one (1) hour following brain injury (TBI). When compared to a TBI group without TNS, the TBI group with TNS showed significant elevations in systemic blood pressure, CBF, and brain oxygen tension ($PbrO_2$) during the hyperacute phase of TBI. The TBI plus TNS group showed additional positive findings compared to the TBI group without TNS, including less brain edema, disruption of the blood brain barrier, and lesion volume, and decreased levels of TNF-$\alpha$ and IL-6 cytokines (inflammatory signals) in the brain neocortex. Overall, the results of this study suggest that TNS could have powerful neuroprotective effects following TBI. Importantly, the improvement in CBF is not merely due to elevation in mean arterial blood pressure (MAP) since CBF rises much more steeply than MAP. Cerebral vasodilation is playing a critical role in VNS-induced enhancement of cerebral perfusion.

The benefits of trigeminal nerve stimulation (TNS) extend to hemorrhagic shock. One study investigated the survival benefit from TNS in the setting of experimentally induced severe hemorrhagic shock in laboratory rats by withdrawing their blood to dramatically lower their blood pressure. When compared to vehicle rats that had trigeminal nerve electrodes placed but did not receive stimulation, the rats in the TNS intervention group showed dramatically prolonged short-term survival. At sixty (60) minutes post induction of severe hemorrhagic shock via blood withdrawal, the survival rate was ninety percent (90%) in the TNS intervention group versus zero percent (0%) in the vehicle group. A cooperative balance between sympathetic and parasympathetic nervous system activity was observed following TNS, which was assessed using heart rate variability. TNS prevented runaway sympathetic hyperactivity by counterbalancing it with parasympathetic tone and postponed hemodynamic decompensation in the absence of fluid resuscitation while improving CBF. Underlying the enhanced tolerance to central hypovolemia from exsanguination were sympathetically mediated low-frequency oscillatory patterns of systemic blood pressure and elevated levels of norepinephrine in the bloodstream induced by TNS. Another important effect found in the TNS group was a reduction in systemic inflammation compared to the vehicle group. This lowering of inflammation may have been a consequence of improved hemodynamics by avoiding hypotension and associated ischemia. Another explanation for depressed immunoreactivity would be that it results from the interaction between the trigeminal afferents and vagal parasympathetic fibers, which form a trigemino-vagal pathway. The dorsal motor nucleus (DMN), an important parasympathetic outflow center, and the nucleus tractus solitarius, which communicates broadly with preganglionic parasympathetic fibers, receive input from trigeminal nerve afferents that are activated by TNS. Then the DMN and nucleus ambiguous in the brainstem's medulla oblongata are responsible for the parasympathetic output of this pathway.

Note, the thermal delivery devices, systems, and/or methods of use as taught herein may be used to stimulate the trigeminal nerve (e.g., via thermal delivery, electrodes, and/or chemical species included in a given immersion liquid).

A clinical trial of seventy-three (73) (human) patients suffering from multiple sclerosis (MS) investigated the efficacy of hydrotherapy in controlling MS related pain and associated symptoms. Thermal hydrotherapy was conducted in a swimming pool with the water temperature at 36 degrees Celsius (97 degrees Fahrenheit). Subjects were randomly assigned to experimental (thermal hydrotherapy) or control (relaxation exercise) groups. Following treatment for a period of twenty (20) weeks, the thermal hydrotherapy group scored significantly lower on reported pain measures ($p<0.028$) compared to the baseline. Severity of disability, muscle spasm, depression, and fatigue all improved markedly with the thermal hydrotherapy.

Repeated cold exposure is known to boost the function of specific nuclei within the reticular activating system (such as the locus coeruleus and raphe nuclei), which results an alert, action-ready state. This can promote improved motivation, energy, and capacity for a quick motor response by recruiting motoneurons. Furthermore, stress induced by cold lowers serotonin levels all over the brain, except for the brainstem. A similar serotonin pattern is associated with decreased fatigue in animal models of exercise-associated fatigue. Cold exposure also raises opioid tone (beta-endorphin) and metabolic rate that could aid in lowering pain associated with muscle fatigue and hastening recovery of muscle function. Thus, cryo and/or hydro therapies may be used for treating chronic fatigue syndrome (CFS).

A research team led by Professor Giovanna Mallucci investigated how proteins produced during cold water immersion (CWI) might be used to combat the development of neurogenerative disease. What fueled her curiosity was the fact that various hibernating mammals, such as, bears, hedgehogs and bats, lose 23-30% of their synapses during the winter while hibernating but then recover these synapses when they wake up in the Spring. Professor Mallucci later conducted research on human subjects, winter swimmers, who already expose themselves to the extreme cold throughout the winter by swimming at the unheated open-air lido on Hampstead Heath in London. Her research team analyzed the blood of the winter swimmers in 2016, 2017, and 2018 to determine their levels of RBM3 (a cold-shock protein in the brain and a RNA binding protein) and compared them to the RBM3 levels found in a Tai Chi group who trained next to the pool but never actually entered it. All the winter swimmers experienced hypothermia, with core temperatures as low as 34 degrees Celsius (93.2 degrees Fahrenheit). A significant number of them had pronounced elevations of RBM3. Neither the hypothermia nor the rise in RBM3 was found in the Tai Chi group.

One study showed that laboratory mice who were subjected to cold exposure (6-18 degrees Celsius for 45 minutes) went through a similar process of synapse breakdown and recovery. These researchers identified cold-shock proteins in the brain, including the RNA binding protein, RBM3, which was found to play a key role in synapse repair. Unlike wild type mice, both prion-infected and 5×FAD (expressing 5 Alzheimer-linked mutations) mice were unable reestablish synaptic connections following cold exposure in tandem with a failure to upregulate RBM3 levels. When RBM3 expression was upregulated in the hippocampus, the prion-infected and 5×FAD mutant mice acquired the ability to regrow synaptic connections following cold exposure. RBM3 overexpression was neuroprotective in both mouse models of neurodegenerative disease, preventing neuronal loss, prolonging survival, and maintaining normal behavior.

Randomized, controlled within-subjects crossover study investigated the impact of hydrotherapy on treatment of (human) children with a diagnosis of autism spectrum disorder (ASD) between the ages of 6 and 12. Subjects were randomly assigned to two groups, one of which received hydrotherapy between weeks 1 to 4, the other between weeks 5 to 8. The Child Behavior Checklist (CBCL) was completed at baseline and at weeks 4 and 8. The study authors found significant improvements following hydrotherapy compared to the control group in the subdomains of anxiety/depression and internalizing problems, as well as in thought problems and attention problems. Intervention also significantly improved the total problems score with a large effect size.

A systematic review meta-analysis was performed investigating the benefit of hydrotherapy in autism spectrum disorder (ASD) outcome. The study authors used search criteria that included affected individuals who were at a high functioning level and between the ages of 3 and 18. Measurements evaluating social interactions and behaviors were necessary for the study to be included in the analysis. Four studies met inclusion criteria. Study results showed that hydrotherapy intervention led to better overall social interactions or behaviors.

G. Psychological

Thermal therapies and/or hydrotherapies using the thermal delivery devices, systems, and/or methods of use as taught herein, may be used to provide various psychological therapeutic benefits.

Thermal therapies and/or hydrotherapies using the thermal delivery devices, systems, and/or methods of use as taught herein, may be used to provide various psychological therapeutic benefits to mood disorders, such as, but not limited to, anxiety and/or depression. Ten (10) minutes of warm water immersion in a whirlpool bath produced an overall feeling of well-being as well as a decrease in reported symptoms of anxiety as described in the DSM (Diagnostic and Statistical Manual of Mental Disorders). Immersion in a water bath with high levels of dissolved carbon dioxide bubbles ($CO_2$) has been observed to elicit high parasympathetic activity in human subjects, commonly associated with a subjective feeling of calm.

EEG data supports a relaxation effect from warm water immersion (WWI). A study examining the benefit of thermal hydrotherapy after viscous fluid injections for osteoarthritis took EEG reads during WWI and found reduced relative power of alpha waves in frontal, temporal, and parietal areas. Chronic pain causes a person to be very focused on a painful limb and hydrotherapy may help to break free of that hyperattention. As a way of interpreting the EEG data, a study showed that engaging in a self-hypnotic technique to induce relaxation, called an autogenic exercise, resulted in an acute lowering of alpha wave percentage while theta percentage rose.

One study compared the efficacy of hyperthermic baths (HTB) to a moderate-intensity physical exercise program (PEP) as add-on therapy to standard of care for the treatment of depression. The study authors enrolled 45 medically-stable (human) subjects suffering from moderate depression determined by Hamilton Depression Rating Scale (HAM-D) scores. Compliance was poor in the group randomized to participate in the PEP. Nevertheless, adjusted scores using a last-observation-carried-forward technique showed significantly fewer depressive symptoms in the HTB group compared to the PEP group as measure by HAM-D. Greater efficacy from HTB was also seen on a per-protocol analysis on a trend-level.

A double-blind randomized, controlled trial investigated the effects of whole-body cryotherapy on symptoms of depression in otherwise healthy (human) adults. Ninety-two (92) subjects between the ages of 20 and 73 who had been diagnosed with a depressive episode were enrolled. Depression levels were measured using the Beck Depression Inventory-II (BDI-II) and the Hamilton Depression Rating Scale (HAM-D 17). The group treated with cryotherapy showed significantly fewer depressive symptoms compared to the control group as measured by BDI-II and HAM-D 17.

One study compared the EEG alpha frequency power between a group of (human) participants with high mindfulness and low anxiety (HMLA) to a group with low mindfulness and high anxiety (LMHA) during a visual cognitive task, called the color Stroop test. In this test the word of a color is written in a different color, and the patient have to name the actual color not what is written. The HMLA group was found to have improved working memory capacity and accuracy. Because cold water immersion (CWI) enhances alpha frequency, CWI supports improving working memory and cognitive function while reducing anxiety.

One study evaluated the effect of outdoor swimming on mood. Sixty-one (61) (human) swimmers were compared to 22 controls who sat on the beach after a 10-week introductory outdoor swimming course. Mood was evaluated using Profile of Mood States and Short Warwick-Edinburgh Mental Well-being Scale questionnaires. Swimmers were found to have significantly larger declines in negative mood states, such as tension, anger, and depression, and greater improvements in well-being compared to controls at the end of the course. The authors also noted acute improvements in mood (increases in positive mood states and decreases in negative mood states) following swims.

A case report documents effective treatment of a 24-year-old woman suffering symptoms of major depressive disorder and anxiety with a weekly regimen of open cold-water swimming. She had received treatment for these disorders since the age of 17, and her symptoms were refractory to the antidepressants, fluoxetine and then citalopram. She started swimming after the birth of a child with the goal of getting off her medication and being free of symptoms. The patient reported acute improvement after each swim. Eventually she obtained a persistent improvement in mood and progressive decrease in depressive symptoms to the point where she was able to wean off her medication. She maintained her remission free from medication on one year follow-up.

Thermal therapies and/or hydrotherapies using the thermal delivery devices, systems, and/or methods of use as taught herein, may be used to provide various psychological therapeutic benefits to mood disorders, such as, but not limited to, additions and/or substance use (abuse) disorders. The Mayenne Centre in France applied hydrotherapy in their treatment of patients suffering from addictions for both addiction support therapy and prevention. An article described using hydrotherapy in treating a patient with addiction with positive results.

H. Endocrinology

Thermal therapies and/or hydrotherapies using the thermal delivery devices, systems, and/or methods of use as taught herein, may be used to provide various endocrine system (or portions thereof) therapeutic benefits. Thermal therapies and/or hydrotherapies using the thermal delivery devices, systems, and/or methods of use as taught herein, may be used to at least partially treat diabetes.

A clinical trial investigating the acute and chronic effects of warm water immersion (WWI) on a group of sedentary, overweight adults discovered that chronic repeated WWI at 39 degrees Celsius decreased fasting glucose and insulin levels. Extracellular heat shock protein in the plasma also decreased in the setting of chronic WWI, consistent with a reduction in chronic inflammation. Acute WWI triggered elevations in IL-6 and improved nitric oxide (NO) bioavailability. IL-6, an acute inflammatory signaling molecule, is in fact a marker of future anti-inflammatory activity in this clinical context. Interestingly, an acute inflammatory response from a time-limited physical stressor, such as exercise can lead to a prolonged anti-inflammatory reaction by triggering the release of anti-inflammatory cytokines, such as IL-1 receptor antagonist (IL-1ra) and IL-10. This acute inflammation intensifies in the context of hyperthermia. NO is important for many biological processes, including uptake of glucose into tissues. These results support that long-term treatment with thermal hydrotherapy may prove to be a useful adjunct in a multifactorial approach to improve glucose metabolism, even in those with limited exercise capacity.

Cold water immersion (CWI) may improve metabolic health by stimulating the production of brown fat and the "browning" of white adipose tissue (WAT) through the induction of mitochondrial biogenesis (production of new, healthy mitochondria). Brown and beige fat promote metabolic health, improve glucose and insulin sensitivity, and defends against diabetes. In one study six men naïve to cold exposure were subjected to cold temperature (10 degrees Celsius) for 2 hours 5 days per week for 4 weeks using a liquid cooling garment. After four weeks of the protocol, the study authors found that participants had a 45% percent increase in the volume of metabolically brown adipose tissue (BAT), and BAT oxidative metabolism more than doubled. Another study analyzed the impact of cold exposure on weight loss and thus its ability to combat obesity (associated with insulin insensitivity and increased risk for diabetes) in healthy individuals with low BAT activity at baseline. Daily 2-hour cold exposure at 17 degrees Celsius for 6 weeks increased BAT activity and reduced body fat mass at the same time. To directly assess the metabolic effects of BAT activity on metabolic health in humans, another study evaluated the effects of BAT activation on whole-body glucose homeostasis and insulin sensitivity. The study authors recruited 7 BAT-positive men and 5 BAT-negative men who were comparable in age, BMI, and adiposity and subjected them to a thermoneutral environment or 5-8 hours of cold exposure. Significant improvements in whole body glucose clearance, plasma glucose metabolism, and insulin sensitivity accompanied by elevated resting energy expenditures were only found in the BAT-positive group.

I. Rheumatology

Thermal therapies and/or hydrotherapies using the thermal delivery devices, systems, and/or methods of use as taught herein, may be used to provide various rheumatological therapeutic benefits, such as, but not limited to, treating fibromyalgia, various forms of arthritis, osteoarthritis, chronic ankle pain, and/or the like.

A warm-water based hydrotherapy intervention resulted in a 15% reduction in fibromyalgia related pain when administered over the course of 12 weeks. A systematic review on the management of Fibromyalgia Syndrome (FMS) concluded that "there is strong evidence for the use of hydrotherapy in the management of FMS" and highlighted positive clinical outcomes for pain, tender point count, and health-status.

One study investigated the capacity of cold-water immersion (CWI) to alleviate pain and associated symptoms due to gouty arthritis. They enrolled 76 (human) participants who were divided into two groups, one served as a control and the other was treated with CWI, consisting of exposure to 20-30 degrees Celsius for 20 minutes per day for 4 weeks. Compared to the control group and baseline evaluation, the CWI group scored significantly lower on measures of pain and improved on measures of joint mobility, physical activity, stress, anxiety, and quality of life after two weeks, which was sustained at 4 weeks. Depression scores were also reduced by the end of the study.

One study investigated whether hydrotherapy would provide additional benefit to a group of (human) patients with knee osteoarthritis receiving viscous fluid injections containing hyaluronic acid. A total of nineteen (19) patients were enrolled and randomly assigned to receive hydrotherapy or no additional treatment following their injections. Hydrotherapy treatment consisted of a green tea spa that was administered three (3) times per week for two (2) weeks. The study authors evaluated measures of pain, quality of life, and emotional status. They also took an electroencephalogram (EEG) reading to determine the relative spectral power of alpha waves. The Western Ontario and McMaster Universities osteoarthritis index (WOMAC) pain and function subscale scores were significantly improved compared to baseline in the hydrotherapy treatment group. A difference between the hydrotherapy and control groups was in a pain scale score where pain is rated by visual assessment according to a spectrum of cartoon faces with different facial expression (the visual analogue scale or VAS). Two weeks of hydrotherapy treatment also diminished the relative power of alpha waves in different brain regions, the frontal, temporal, and parietal areas, consistent with mental relaxation.

Deep breathing exercises are associated with a reduction in chronic ankle pain and enhance EEG alpha rhythm power in the occipital region after six weeks of treatment. During working memory and other cognitive tasks, alpha frequency increases in the prefrontal cortex, fronto-central and centro-parietal regions. Interestingly, alpha wave power is boosted by hand CWI in distinct ways depending on whether the water is painfully cold or merely cool, suggesting CWI helps alleviate chronic pain and enhance cognitive functioning. The effect was stronger when the water was colder.

XI. Conclusions

Hydrotherapy has been used since the time of the ancient Egyptians and ancient Greeks to promote health and well-being and is enjoying renewed appreciation after being largely relegated to the status of "alternative" medicine. For example, at least some potential benefits of hydrotherapy and/or thermal therapy, cold and/or warm liquid (water) immersion, may include: enhanced cerebral blood flow; improved peripheral blood flow; respiration health; cardiovascular health; greater release of brain-derived neurotrophic factor (BDNF), which has been referred to as "miracle grow" for the brain; more brown fat production with improved mitochondrial health; better metabolic health and glucose control; enhancing/improving sleep; improved mood, concentration, and cognitive function by boosting release of multiple neurotransmitters, including epinephrine, norepinephrine, dopamine, serotonin, and/or oxytocin. Hydrotherapy and/or thermal therapy could potentially have therapeutic application to overall health and wellbeing, as well as, numerous disease processes, such as, but not limited to, cardiovascular diseases; neurologic conditions, such as headaches; dermatologic conditions; and depression and anxiety. The thermal delivery devices, systems, and/or methods of use as taught herein, may be used to provide such hydrotherapies and/or thermal therapies.

Also, with respect to the human face in particular, at least some of the thermal delivery devices, systems, and/or methods of use as taught herein may provide hydrotherapies and/or thermal therapies directly to the face and thus leverage the unique neuroanatomical circuitry and vasculature of the face to promote health and well-being and/or treat various injuries, diseases, conditions, and/or disorders. The human face has several unique anatomical features. Facial sensory neurons communicate with the trigeminal ganglion (TG), which then communicates with the trigeminal nucleus in the brain. The TG exists outside the blood brain barrier (BBB) and thus provides easy access to the brain that could be conveyed through (facial) transdermal therapies that circumvent the BBB. Furthermore, a unique direct connection from facial sensory neurons to a nucleus in the brain, called the parabrachial nucleus, has been identified that delivers pain signals, and does not exist between sensory neurons in the body and the brain. In this way, the thermal delivery devices, systems, and/or methods of use as taught herein that may target the face, may be used to provide superior health benefits of hydrotherapy and/or thermal therapy more efficiently without some of the negatives of whole-body hydrotherapy, such as the difficulties in transporting and changing the temperature of large volumes of water, and the discomfort of exposing the entire human body to cold water.

Another key feature of the neuroanatomical circuitry of the trigeminal nerve is its connections with the vagus nerve at the level of paratrigeminal nucleus in the brain and though its interactions with the baroreceptors in the neck, which promote parasympathetic outflow. The thermal delivery devices, systems, and/or methods of use as taught herein that may target the face, may then be used to stimulate vagus nerve activity in a more natural, safer, and less expensive way compared to the vagus nerve stimulator. In addition, the trigeminal nerve plays a central role in the modulation of cerebral blood flow via three separate mechanisms, all of which enhance blood flow. Also, unique to the upper half of the (human) face and select areas of the body (e.g., palms and soles) is the presence of glabrous skin, which carries distinctive vascular structures called arteriovenous anastomoses (also known as AVAs) that enable faster transfer of heat, either into or out of the body, as compared to regions of the human body without such AVAs. All these features make direct application of hydrotherapy and/or thermal therapy to the face ideal, which has now been made possible in a convenient and unique way by thermal delivery devices, systems, and/or methods of use as taught herein that may target the face.

Note, before invention of a "face soaking device," a soaking-device 100, a handheld-thermal-device 3400, a handheld-thermal-device 3450, a whole head thermal delivery device 3500, face/head thermal delivery device 3600, face/head thermal delivery device 3700, and/or at least some of the thermal delivery devices 3911 described herein that may target the face 192 (collectively or individually referred to as "thermal delivery device(s) targeting the face"), there was not a good means for heating/cooling the face using an immersive temperature-controlled medium. In some embodiments, the "face soaking device" terminology may be face soaking device at least as substantially (mostly) shown and/or described in U.S. Pat. Nos. 10,667,990, 10,449,341, 10,667,991, 11,154,697, U.S. design Pat. D863,575, U.S. design Pat. D863,576, U.S. design Pat. D864,403, U.S. design Pat. D889,675, and/or U.S. design Pat. D916,303; wherein the "face soaking device" may comprise a vessel (configured to hold an immersion liquid), a breathing apparatus, a headrest, a neck gasket (which provides a water tight seal at the front of the user's neck but without discomfort or pain to the front of the user's neck), and at least one heating and/or cooling means for heating and/or cooling the immersion liquid that resides within the vessel portion.

Before the invention of the thermal delivery device(s) targeting the face (as discussed herein), a person might dip one's face into a bowl of water at a given temperature. However, that had at least a problem that a rim of the bowl would dig into the soft tissue of the front of the person's neck, causing discomfort and/or pain. Additionally, a mere bowl of water had no integral and/or comfortable means for breathing while that face was underwater and submerged within the water of the given bowl.

Or before the invention of the thermal delivery device(s) targeting the face (as discussed herein), a person might place a hot or a cold damp/wet towel onto their face. However, such a towel very quickly loses its heat/cold and thus quickly becomes non-effective for facial thermal skin therapy. Additionally, if the towel is too wet, such a process may wet undesirable things, such as other parts of the person and/or the person's surroundings. Or if the towel is too dry, it may too quickly lose its ability to heat and/or cool the face.

Or before the invention of the thermal delivery device(s) targeting the face (as discussed herein), a person might soak their entire body in a bathtub, hot tub, and/or jacuzzi of heated water. However, heating the entire body as opposed to just the face has drawbacks as noted above. Also, hot tubs (and many bathtubs) are often restricted to a maximum water temperature of 104° F., which may be too cool of an immersion liquid to elicit a proper pain and/or neurotransmitter release response. Additionally, bathtubs can be difficult or awkward to cool, if cooling instead of heating is a desired therapeutic approach to be used. And use of just a bathtub for soaking just the face has the same problems as a bowl of water as noted above.

Or before the invention of the thermal delivery device(s) targeting the face (as discussed herein), a person might use a radiation source (e.g., a light source, such as, but not limited to, a lamp or the sun) to heat their face, with the radiation passing through the air and then into the face. Such a means could not be used to cool the face, often results in dry skin, may result in undesirable skin pigmentation, may result in undesirable skin freckles, may result in undesirable skin moles, may result in undesirable skin sunspots, may result in undesirable skin wrinkles, may result in undesirable skin sun damage, and/or may result in undesirable burns to the skin.

Or before the invention of the thermal delivery device(s) targeting the face (as discussed herein), a person might use heated or cooled blown air onto their face to heat/cool the face via wind, a blower, a fan, or the like. However, a problem with such an approach is that air is a comparatively poor conductor of heat/cool as compared to an immersion liquid like water and/or a skin safe liquid oil. Additionally, blowing such air over the face can lead to undesirable drying of the skin.

Or before the invention of the thermal delivery device(s) targeting the face (as discussed herein), a person might use a sauna or steam air mixture to heat the entire body, including the face. However, heating the entire body as opposed to just the face has drawbacks as noted above. Air, even when mixed with steam, is a poor thermal conductor (as compared to water); hence, saunas routinely operate at a temperature of 195° F. whereas a hot tub might only operate at 104° F., because water is such a better heat conductor than air with steam. And this heating means does not lend itself to a cooling means.

Further, liquids (e.g., water) in general are better a heat transfer than gasses (e.g., air). The thermal conductivity of water is twenty-four (24) times that of air, and the energy required to heat a given volume of water by one degree Celsius is 3,500 times that of air, the cooling power of cold water in terms of human deep body temperature is approximately three times that of cold air at the same temperature. Consequently, a given rate of heat loss can be achieved at a higher cool temperature, and with a narrower skin-environment temperature gradient in water, than in air. In other words, prior art thermal therapies that use air as the heat transfer medium are less efficient than the thermal delivery device(s) targeting the face (as discussed herein), that use an immersion liquid such as, but not limited to, water.

Or before the invention of the thermal delivery device(s) targeting the face (as discussed herein), a person might use a walk-in refrigerator or freezer to cool the entire body, including the face. However, cooling the entire body as opposed to just the face has drawbacks as noted above. This type of cooling means does not work for cooling just the face and not the body. Further, walk-in refrigerators or freezers use cooled air as the heat transfer medium within the air volume of the given refrigerator/freezer, which as noted above is not as desirable as using a liquid like water. And walk-in refrigerators or freezers will dry out the skin (as they generally operate at low humidities).

The thermal delivery devices targeting the face (as discussed herein) have solved all those problems. With the thermal delivery device(s) targeting the face (as discussed herein), heat and/or cold may be applied to skin of the face (and not the whole body), in a controlled manner, at a predetermined temperature, for a predetermined duration, while the user breathes normally with their face submerged in the immersion liquid via a breathing apparatus of the given thermal delivery device, without drying out the skin, and/or (optionally) with various additives, such as, but not limited to, light therapy, gas bubble therapy, vibration, and/or other ingredients (e.g., chemicals) added into the immersion liquid. Thus, the thermal delivery device(s) targeting the face (as discussed herein) may be ideal thermal delivery device(s) for causing rapid and/or controlled brain neurotransmitter release by way of heating and/or cooling skin of the face, which in turn may be used to affect, change, treat, and/or reduce symptoms of a variety of medical conditions that benefit from release of brain neurotransmitters.

The thermal delivery device(s) targeting the face (as discussed herein), may also be used for topical face skin treatments and/or for administering (delivering) transdermal ingredients (chemicals/medications), wherein the topical ingredients and/or the transdermal ingredients may be dissolved and/or carried within the immersion liquid within the vessel portion of the given thermal delivery device targeting the face (as discussed herein) and thus delivered to facial skin in physical contact with the immersion liquid.

There is a need in the art for thermal delivery device(s) (such as, but not limited to, the thermal delivery device(s) targeting the face (as discussed herein) that are configured for and/or adapted to deliver heat and/or cold to specific, particular, and/or targeted portion(s)/region(s) of the skin of a living organism's body, such, as, but not limited to, the face; a facial cheek; a head (cranium); entire body of the organism; a body but not a head of the organism; an appendage; a limb; a digit; a finger; a thumb; a toe; a torso; a chest; a leg; an arm; a hand; a foot; a portion thereof; a combination thereof; and/or the like of the organism. There is need in the art for a system wherein the thermal delivery device is used to heat and/or cool skin of the organism in a manner that produces neurotransmitters by way of thermal skin stimulation using the thermal deliver device. There is need in the art for a method of using the thermal delivery device to heat and/or cool skin of the organism in a manner that produces neurotransmitters by way of thermal skin stimulation using the thermal deliver device. There is need in the art for a method of thermal stimulating skin to produce neurotransmitters.

There is a need in the art for thermal delivery device(s), system(s), and/or method(s) that may provide for and/or enhance transdermal delivery of ingredients (e.g., chemical(s) and/or medication(s)). There is need in the art for a method of inducing a desired and/or intended outcome in a subject (living organism) by way of thermal stimulating some region of skin of that subject.

It is to these ends that the present inventions and/or embodiments thereof have been developed.

BRIEF SUMMARY OF THE INVENTION

To minimize the limitations in the prior art, and to minimize other limitations that will be apparent upon reading and understanding the present specification, various embodiments of the present invention may describe thermal delivery device, systems, and/or methods of cooling and/or heating a portion of a subject for a purpose of inducing a desired and/or intended outcome in that so treated subject. In some embodiments, the thermal delivery device may be a "face soaking device" as shown and described in U.S. Pat. No. 10,667,990 and its related patents. In other embodiments, the thermal delivery device may be a device other than such a "face soaking device." In other embodiments, the thermal delivery device may be a device as shown and described herein such as, but not limited to, a soaking-device, a handheld-thermal-device, a whole head thermal delivery device, a face/head thermal delivery device, at least one of the devices shown and described in one of the U.S. provisional patent applications that this present (instant) U.S. nonprovisional patent application claims priority to, portions thereof, combinations thereof, and/or the like. In some embodiments, the subject may be a living human. In other embodiments, the subject may another type of living organism, such as, but not limited to, a vertebrate animal, a mammal, and/or a primate. In some embodiments, the portion may be a face, a head, or a portion thereof of the given subject. In other embodiments, the portion may be an entire body of the subject or some portion thereof. In some embodiments, the cooling and/or the heating of the portion (e.g., the face) may be sufficient to induce the desired and/or the intended outcome in that subject. In some embodiments, the desired and/or intended outcome may relate to: release of at least one type of neurotransmitter; trigeminal nerve stimulation; (indirect) vagus nerve stimulation; transdermal drug delivery; bypass of the blood-brain-barrier (BBB); aesthetic medicine; cardiovascular; dermatological; ears, nose, and throat (otolaryngological); ophthalmological; neurological; psychological; endocrinological; and/or rheumatological benefits to that subject. In some embodiments, the at least one type of neurotransmitter may be selected from: dopamine, noradrenaline [norepinephrine], serotonin, oxytocin, endorphins, portions thereof, combinations thereof, and/or the like.

In other embodiments, the thermal delivery device may be a soaking-device that may be used to soak a given body portion of a person (or other animal), such as, but not limited to, a face (or head) of the person, in an immersion liquid (such as, but not limited to, water). In some embodiments, the soaking-device may have a vessel (container/tub) configured to removably hold the immersion liquid. In some embodiments, the vessel (vessel portion) may be formed from a floor-and-sidewalls member, a front-panel, and a rear-panel. In some embodiments, the immersion liquid, the vessel, floor-and-sidewalls member, the front-panel, and/or the rear-panel may be warmed, heat, cooled, chilled, or combinations thereof. In some embodiments, beneath the vessel may be at least some insulation to slow temperature changes of the immersion liquid with respect to external ambient temperature located surrounding that given soaking-device. In some embodiments, the front-panel may comprise a neck-gasket member (flexible-member), which may permit the face (or the head) of the person to rest in the immersion liquid without having undesirable hard surfaces press into soft tissue of a front of the neck of that person and while maintaining a watertight seal between the neck-gasket member (flexible-member) and the person's neck (front of their neck). In some embodiments, this soaking-device may be largely (mostly) assembled from flat stock sheet materials that get cut and machined.

It is an objective of the present invention to provide a thermal delivery device.

It is another objective of the present invention to provide a thermal delivery device that is capable of cooling and/or heating a targeted portion (such as, but not limited to, a face) of a subject (such as, but not limited to, a living human).

It is another objective of the present invention to provide a thermal delivery device that is capable of selectively cooling and/or heating a face, a head, or a portion thereof without (directly) cooling and/or heating a remainder of that subject's body.

It is another objective of the present invention to provide a system for cooling and/or heating a targeted portion of a subject.

It is another objective of the present invention to provide a system for cooling and/or heating a targeted portion of a subject that at least utilizes a thermal delivery device.

It is another objective of the present invention to provide a method for cooling and/or heating a targeted portion of a subject.

It is another objective of the present invention to provide a method for cooling and/or heating a targeted portion of a subject that at least utilizes a thermal delivery device.

It is another objective of the present invention to provide a method of inducing a desired and/or intended outcome in a subject by cooling and/or heating a targeted portion of the subject that at least utilizes a thermal delivery device.

It is another objective of the present invention to provide a method of inducing release of at least one type of neurotransmitter that results in a desired and/or intended outcome in a subject by cooling and/or heating a targeted portion of the subject that at least utilizes a thermal delivery device.

It is another objective of the present invention to provide a method of [indirectly] stimulating a vagus nerve of a human by stimulating a trigeminal nerve of the human, wherein the trigeminal nerve is stimulated, at least in part, by heating the trigeminal nerve, cooling the trigeminal nerve, or alternating between heating and cooling of the trigeminal nerve using a thermal delivery device.

It is another objective of the present invention to provide a method of causing release of at least one type of neurotransmitter in an animal by, at least in part, heating a portion of the subject, cooling the portion, or alternating between heating and cooling of the portion using a thermal delivery device.

It is another objective of the present invention to provide a method of transdermal delivery of at least one chemical across a portion of skin by applying the at least one chemical to an exterior portion of the skin and by, at least in part, heating the portion of the skin, cooling the portion of the skin, or alternating between heating and cooling of the portion of the skin using a thermal delivery device.

It is another objective of the present invention to provide a method of improving a region of treated skin by using a thermal delivery device on that region of skin.

It is another objective of the present invention to provide a thermal delivery device that may be used recreationally.

It is another objective of the present invention to provide a soaking-device that is configured for the immersion/soaking of particular body portion(s), such as, but not limited to, the face (or head) of a person, but without having hard surfaces press into the soft tissues of a front of the neck of that person.

It is another objective of the present invention provide a soaking-device that is configured to warm, heat, cool, chill, combinations thereof, portions thereof, and/or the like, the particular body portion(s) that may be soaking/immersed within an immersion liquid of the soaking-device.

It is yet another objective of the present invention to make much (most) of the soaking-device from largely (mostly and/or mainly) off-the-shelf planar sheet materials, that may be subsequently formed, cut, and/or machined into various components (parts) of the soaking-device.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 5E shows the completed and fully assembled neck-gasket.

FIG. 16B shows this front-panel to side-panel attachment process further along than as compared to FIG. 16A.

FIG. 39 shows a method in a written form, identifying important aspects/parameters of this method via assigned reference numerals.

FIG. 47 shows a right front perspective view of a face immersion thermal delivery device.

REFERENCE NUMERAL SCHEDULE

Figure 1A:
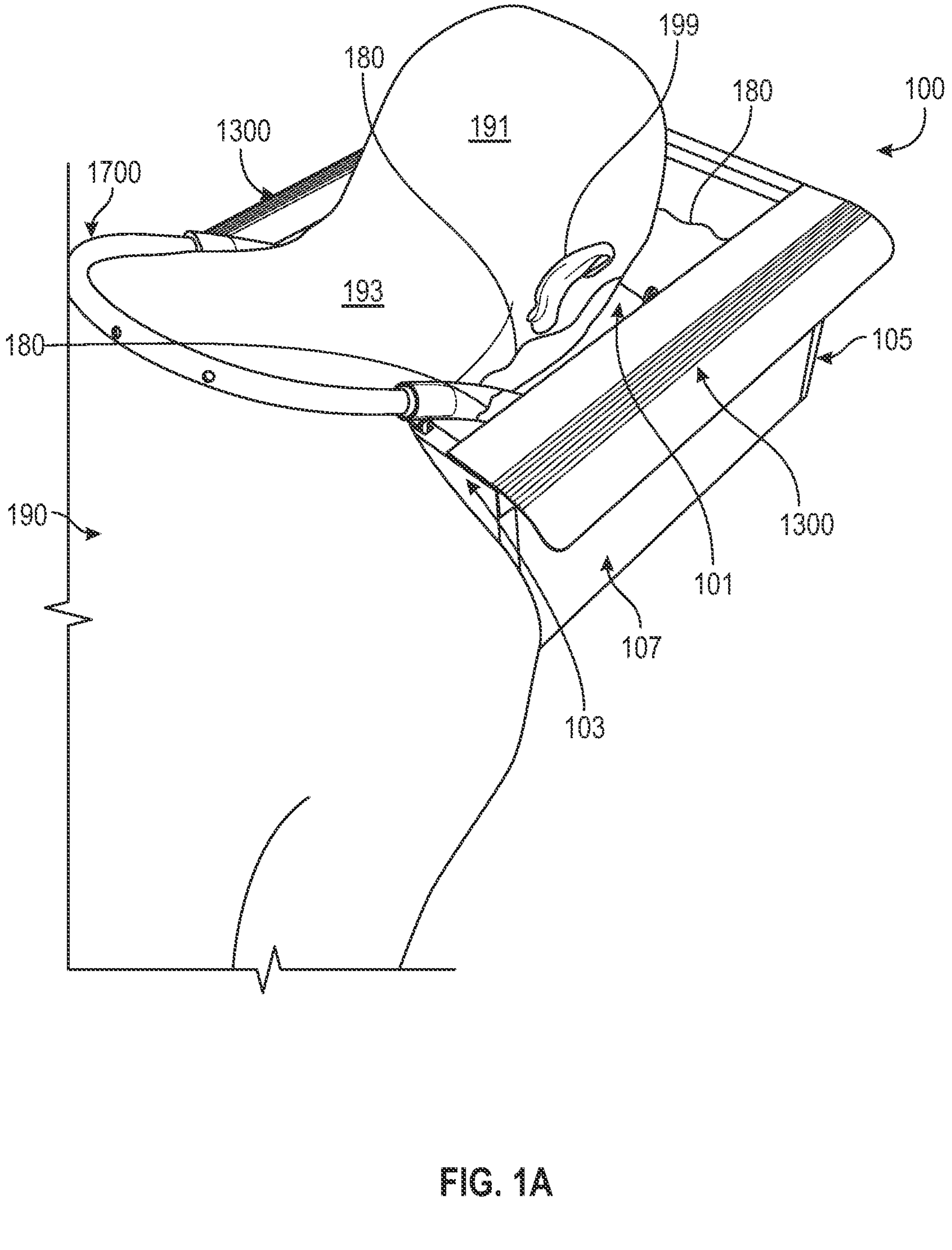
FIG. 1A shows a front, top, and right-side perspective view of an overall assembled soaking-device, in use by a human user, with a face of the user immersed (submerged) within an immersion-liquid of a vessel of that soaking-device.

100 soaking-device 100
101 floor-and-sidewalls 101
103 front-panel 103
105 rear-panel 105
107 side-panels 107
109 fastener 109
110 washer 110
111 cover 111
113 bottom-panel 113
115 insulation 115
117 electronics 117
180 immersion-liquid 180
190 user (human) 190
191 head 191
192 face 192

193 back-of-neck 193
195 hand 195
197 front-of-neck 197
199 ear 199
201 neck-gasket-channel 201
203 top 203
205 cutout region 205
500 neck-gasket 500
501 flexible-member 501
503 rigid-member 503
505 adhesive 505
507 backing 507
600 wedge 600
601 prong 601
701 internal (interior) surface 701
703 slot 703
705 channel (channel-for-end-gasket) 705
707 cam-post 707
709 cam-terminal-end 709
711 cam-pocket 711
713 bore 713
715 aperture 715
719 channel (channel-for-end-gasket) 719
721 aperture 721
801 terminal end 801
803 aperture 803
805 threaded-insert 805
811 external (exterior) surface 811
901 bottom 901
903 top 903
905 front-end 905
907 rear-end 907
917 threaded-insert 917
1001 top side 1001
1003 bottom side 1003
1005 left side 1005
1007 right side 1007
1101 floor-portion 1101
1103 sidewall-portion 1103
1105 top-ledge 1105
1107 terminal end 1107
1109 upper-surface 1109
1111 bottom-surface 1111
1200 end-gasket 1200
1201 receiving-channel 1201
1203 bore 1203
1205 threaded-insert 1205
1300 handle 1300
1301 top-portion 1301
1303 downward-protecting-portion (flange) 1303
1305 aperture 1305
1307 fastener 1307
1309 thermal-break 1309
1311 ascender-portion 1311
1400 slot (track) 1400
1401 opening 1401
1403 enclosed-region 1403
1405 terminal-end-edge 1405
1407 mating-member 1407
1500 light-source 1500
1501 wire(s) (cable(s)) 1501
1600 cam-nut 1600
1700 breathing-apparatus 1700
1701 rigid-elongate-hollow-member 1701
1703 flexible-elongate-hollow-member 1703
1705 mouthpiece 1705
1707 fitting 1707

1709 aperture 1709
1800 headrest (headrest assembly) 1800
1801 cushion-member 1801
1811 support-member (arm) 1811
1813 terminal-end 1813
1815 middle 1815
1821 bracket(s) 1821
1823 blade-portion (plate-portion) 1823
1825 receiver 1825
1827 receiver 1827
1829 tab 1829
1831 washer 1831
1833 thumb-screw 1833
2601 central-axial-bore 2601
2603 slit 2603
2605 cover (sleeve) 2605
2607 indicia 2607
2609 internal-material 2609
2700 tower 2700
2701 user-interface 2701
2703 housing 2703
2705 handle 2705
2707 temperature-sensor 2707
2709 gas-line-tubing 2709
2711 main-power-cable 2711
2713 intermediary-power-cable 2713
2915 electrode 2915
3001 gap 3001
3101 block (manifold) 3101
3103 liquid-level-sensor 3103
3300 bracket(s) 3300
3301 post 3301
3303 oval-member 3303
3400 handheld-thermal-device 3400
3401 handle 3401
3403 bladder-retainer 3403
3405 (conformable) bladder 3405
3407 thermal means (heating and/or cooling means) 3407
3409 power-supply 3409
3450 handheld-thermal-device 3450
3451 tube (cord, pipe, or conduit) 3451
3453 pump 3453
3455 reservoir 3455
3500 whole head thermal delivery device 3500
3501 flat bottomed containment vessel 3501
3503 neck gasket (seal) 3503
3505 breathing apparatus 3505
3507 tube (cord, pipe, or conduit) 3507
3509 headrest 3509
3511 fitting (port, valve, plug) 3511
3590 supportive surface 3590
3600 face/head thermal delivery device 3600
3601 jet (nozzle) 3601
3603 heat-transfer-liquid 3603
3605 catch-basin 3605
3700 face/head thermal delivery device 3700
3701 jet (nozzle) 3701
3703 support structure for person 3703
3800 human trigeminal nerve 3800
3901 inducing or the like 3901
3903 desired and/or intended outcome 3903
3905 subject 3905
3907 heat transfer element, medium, and/or fluid 3907
3909 portion 3909
3911 thermal means (thermal delivery device) 3911

4000 method of inducing a desired and/or intended outcome in a subject by touching a heat transfer element against a portion of the subject 4000
4001 step of locating portion against heat transfer element/medium 4001
4003 step of activating thermal means (thermal delivery device) 4003
4005 step of thermally exposing portion to thermal output from thermal means 4005
4007 step of ceasing thermal exposing 4007
4101 Processor(s) 4101
4103*a* Memory 4103*a*
4103*b* Electronic Storage 4103*b*
4105 Heating Means 4105
4107 Cooling Means 4107
4109 Heating and/or Cooling Means 4109
4111 Skin/Body Portion contact manes 4111
4113 Input(s)/Output(s) (I/O) 4113
4115 External Communications 4115
4117*a* Power-Supply 4117*a*
4117*b* Power-Supply 4117*b*
4200 thermal delivery device organizational chart 4200
4201 category of liquid as heat transfer medium 4201
4203 category of liquid and skin in physical contact 4203
4205 category of liquid and skin not in physical contact 4205
4207 category of thermal delivery devices using liquid immersion 4207
4209 category of thermal delivery devices using liquid immersion or wetting 4209
4211 category of thermal delivery devices having liquid containment vessel, seal, breathing apparatus, and/or head rest 4211
4213 category of thermal delivery devices using liquid filled bladder(s)/enclosure(s) 4213
4215 category of thermal delivery devices 4215
4217 category of gel, beads, solid(s), or the like as heat transfer medium 4217
4301 panel-exterior 4301
4303 panel-interior 4303
4305 tray (indentation/pocket) 4305
4307 remote-control 4307
4309 trim 4309
4400 whole head immersion thermal delivery device 4400
4401 heat-transfer-fluid-containment-vessel 4401
4109 heating and/or cooling means 4109
4403 breathing-apparatus 4403
4405 mouthpiece 4405
4407 circumferential-seal-for-neck (neck gasket) 4407
4409 headrest 4409
4411 port/valve 4411
4450 whole head immersion thermal delivery device 4450
4475 whole head immersion thermal delivery device 4475
4477 transparent viewing plate/window 4477
4500 whole head immersion thermal delivery device 4500
4501 containment vessel 4501
4503 shoulder-cover 4503
4505 straps-for-armpits/shoulders 4505
4600 face immersion thermal delivery device 4600
4601 containment-vessel 4601
4603 face-peripheral-seal 4603
4605 head-strap 4605
4650 face immersion thermal delivery device 4650
4700 face immersion thermal delivery device 4700
4701 containment-vessel 4701
4703 terminal end of tubing 4703

DETAILED DESCRIPTION OF THE INVENTION

The following U.S. patents, by the same inventor as the present inventions and embodiments, are incorporated by reference as if fully set forth herein: U.S. Pat. Nos. 10,667,990, 10,449,341, 10,667,991, 11,154,697, U.S. design Pat. D863,575, U.S. design Pat. D863,576, U.S. design Pat. D864,403, U.S. design Pat. D889,675, and U.S. design Pat. D916,303. These preexisting U.S. patents disclose and teach a face soaking device or portions thereof.

In terms of nomenclature and/or terminology, as used herein "thermal" may refer to heat, hot, warm, warmth, heating, cold, cool, cooler, cooling, portions thereof, combinations thereof, and/or the like. That is, "thermal" may refer to cooling, heating, or both. "Thermal" as used herein is not necessarily limited to only heating.

In terms of nomenclature and/or terminology, as used herein "thermal therapy," "thermal treatment," "thermal excitation," and/or "thermal stimulation" may be used interchangeably; and may generally refer to heating, cooling, and/or both heating and cooling of a given target (e.g., portion 3909) (using a thermal delivery device 3911/thermal treatment device 3911).

In terms of nomenclature and/or terminology, as used herein "heat therapy," "heat treatment," and/or "thermotherapy" may be used interchangeably; and may generally refer to heating of a given target (e.g., portion 3909) (using a thermal delivery device 3911/thermal treatment device 3911).

In terms of nomenclature and/or terminology, as used herein "cold therapy," "cold treatment," "cryo-therapy," and/or "cryotherapy" may be used interchangeably; and may generally refer to cooling of a given target (e.g., portion 3909) (using a thermal delivery device 3911/thermal treatment device 3911).

In terms of nomenclature and/or terminology, as used herein "hydrotherapy" may refer to thermal therapy wherein an immersion liquid (e.g., immersion-liquid 180) or sprayed/jetted liquid used may be predominantly (mostly) of water (and/or at least mostly water with various predetermined additives).

In terms of nomenclature and/or terminology, unless otherwise stated, as used herein "treatment" with respect to treating a given health and/or medical issue/condition, may mean a method and/or process that improves at least one negative symptom associated with that given health and/or medical issue/condition; and/or may refer to a method and/or a process that prevents and/or reduces at least one negative symptom associated with that given health and/or medical issue/condition.

In terms of nomenclature and/or terminology, unless otherwise stated, the terms of "chemical," "chemical species," "chemical-additive," and/or "additive" may be used interchangeably; and are often used in a context of additive(s) to an immersion liquid (immersion-liquid) and/or with respect to transdermal delivery.

In terms of nomenclature and/or terminology, unless otherwise stated, "immersion" may be mean a given animal body part (portion) (such as, but not limited to, a head and/or a face) may be (entirely or mostly) within a given heat transfer fluid (e.g., heat transfer fluid 3907), wherein that heat transfer fluid may be a liquid (such as, but not limited to, at least water) and/or a gas (such as, but not limited to, at least air, oxygen, nitrogen, carbon dioxide, portions thereof, combinations thereof, and/or the like).

In terms of nomenclature and/or terminology, as used herein reference numerals "190" and/or "3905" may be used interchangeably; wherein these reference numerals may refer to: a user, a subject, a human, a person, an animal, a vertebrate animal, a mammal, a primate, and/or the like.

In terms of nomenclature and/or terminology, unless otherwise stated, as used herein "face soaking device" may be a device/apparatus/machine at least as substantially (mostly) shown and/or described in U.S. Pat. Nos. 10,667,990, 10,449,341, 10,667,991, U.S. utility patent 391154697, U.S. design Pat. D863,575, U.S. design Pat. D863,576, U.S. design Pat. D864,403, U.S. design Pat. D889,675, and/or U.S. design Pat. D916,303; wherein the "face soaking device" may comprise a vessel (configured to hold an immersion liquid), a breathing apparatus, a headrest, a neck gasket (which provides a water tight seal at the front of the user's neck but without discomfort or pain to the front of the user's neck), and at least one heating and/or cooling means for heating and/or cooling the immersion liquid and thus for also heating and/or cooling a user's 190 face 192 that is within the vessel and/or submerged within the given immersion liquid.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1A shows a front, top, and right-side perspective view of an overall assembled soaking-device 100, in use by a human user 190, with a face 192 of the user 190 immersed (submerged) within an immersion-liquid 1800 of a vessel of soaking-device 100. In some embodiments, when soaking-device 100 may in use as intended by user 190, such as is shown in FIG. 1A, a back-of-neck 193 may not be touching a neck-gasket 500 of soaking-device 100; whereas, a front-of-neck 197 may be in direct physical contact with at least some portions of neck-gasket 500 (flexible-member 501) of soaking-device 100. Compare for example, FIG. 1A to FIG. 5F. FIG. 1A shows back-of-neck 193 not touching neck-gasket 500; whereas, FIG. 5F shows front-of-neck 197 in direct physical contact with at least some portions of neck-gasket 500 (flexible-member 501). One ear 199 of user 190 may be visible in FIG. 1A. A portion of this ear 199 of user 190 may be just partially visible in FIG. 5F.

Continuing discussing FIG. 1A, in some embodiments, soaking-device 100 may be configured to (temporarily) hold immersion-liquid 1800 (such as, but not limited to, water) above a floor-and-sidewalls 101 component, between the sidewalls of the floor-and-sidewalls 101 component and between a front-panel 103 and a rear-panel 105 of soaking-device 100. In some embodiments, the front-panel 103 and the rear-panel 105 may be opposing from each other, with a length of the floor-and-sidewalls 101 disposed between front-panel 103 and rear-panel 105. In some embodiments, because floor-and-sidewalls 101, front-panel 103, and rear-panel 105 may be configured to hold this immersion-liquid 180 without leaking, those particular components (parts) may collaboratively work together in forming a watertight (water proof) vessel configured to hold this immersion-liquid 180. Thus, the floor-and-sidewalls 101, the front-panel 103, and the rear-panel 105 may define a waterproof vessel (container) (for holding this immersion-liquid 180) that is open at its top as shown in FIG. 1A. See also, FIG. 1B, FIG. 1C, FIG. 1D, and/or FIG. 1H that also shows these configurations and/or arrangements of the floor-and-sidewalls 101, the front-panel 103, and the rear-panel 105 of soaking-device 100 that may form this waterproof vessel (container) that is open at its top.

In some embodiments, immersion-liquid 180 may also be referred to as a liquid because immersion-liquid 180 may be used to immerse (submerge) at least one body part, body portion, combinations thereof, portion thereof, and/or the like of the user 190. For example, and without limiting the scope of the present invention, this at least one body part, body portion, combinations thereof, portion thereof, and/or the like of the user 190 as shown in FIG. 1A may be a face 192 of user 190, a portion of face 192 of user 190, and/or a portion of a head 191 of user 190. Note, face 192 of user 190 may be at least partially shown in FIG. 17F and/or in FIG. 17G. In some embodiments, immersion-liquid 180 within this vessel of soaking-device 100 may be heated, cooled, chilled, combinations thereof, portions thereof, and/or the like.

In some embodiments, immersion-liquid 180 within this vessel of soaking-device 100 may have various predetermined additives added to the liquid (water), such as, but not limited to: salts, ions, minerals, electrolytes, chemicals, medicines, pharmaceuticals, botanicals, essential oils, fragrances, perfumes, soaps, surfactants, cleaners, moisturizers, cosmetics, shampoos, conditioners, combinations thereof, portions thereof, and/or the like.

In some embodiments, an animal 190 body part (or portion thereof) may be soaked within this immersion-liquid 180 that is being (temporarily) hold within the vessel portion of soaking-device 100. In some embodiments, animal 190 may be selected from a vertebrate animal, a mammalian animal, a primate animal, or a human. In some embodiments, the body part of animal 190 may be selected from head 191, a face 192, a hand 195, a foot, an arm, a leg, combinations thereof, portions thereof, and/or the like. In some embodiments, reference numeral "190" may refer to the user of soaking-device 100 who is and/or intends to have a body portion soaked (immersed) within the vessel portion of soaking-device 100; wherein this user 190 may be selected from a vertebrate animal, a mammalian animal, a primate animal, or a human.

FIG. 1A also shows concurrent use of a breathing-apparatus 1700. In some embodiments, when a mouth and/or a nose of user 190 may be submerged (immersed) within immersion-liquid 180 of the vessel portion of soaking-device 100, the breathing-apparatus 1700 may be used by that user 190, so that user 190 may continue to breathe while concurrently having their face 192 (mouth and/or their nose) completely (entirely) submerged within immersion-liquid 180. Note, breathing-apparatus 1700 is further shown in FIG. 17A through FIG. 17H and is further discussed in the discussion of those figures.

FIG. 1A also shows handles 1300 of soaking-device 100. In some embodiments, handles 1300 may be configured for user 190 to hold and/or carry soaking-device 100, with or without immersion-liquid 180 within the vessel portion of soaking-device 100. Note, handles 1300 are further shown in FIG. 13A through FIG. 13D and in FIG. 14A through FIG. 14C and is further discussed in the discussion of those figures.

Figure 1B:
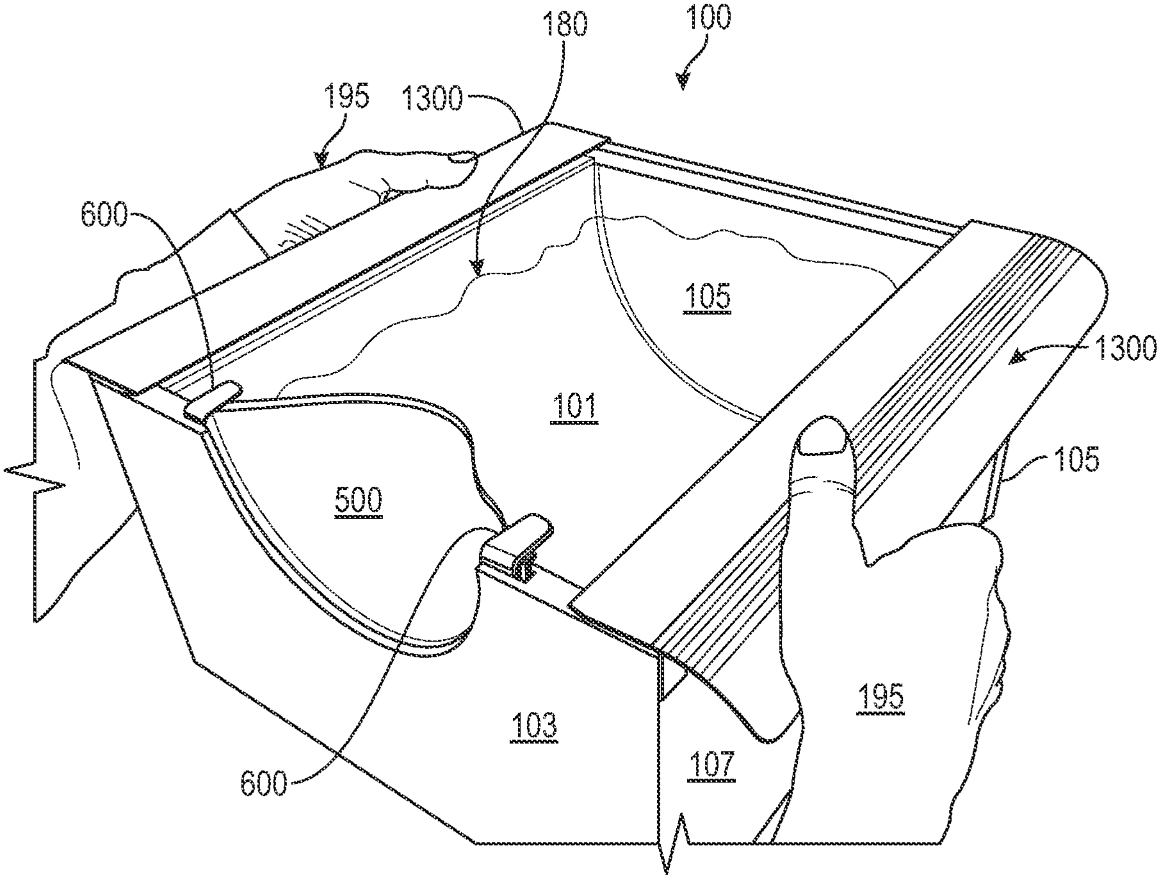
FIG. 1B shows the front, top, and right-side perspective view of the overall assembled soaking-device of FIG. 1A.

FIG. 1B shows the front, top, and right-side perspective view of overall assembled soaking-device 100. Note, FIG. 1B largely differs from FIG. 1A, in that in FIG. 1B user 190 does not have their face 192 immersed (submerged) within immersion-liquid 180 within the vessel portion of soaking-device 100. Because face 192 of user 190 is not occupying the vessel portion of soaking-device 100 in FIG. 1B, more of floor-and-sidewalls 101, front-panel 103, rear-panel 105, and handles 1300 may be seen in FIG. 1B as compared to FIG. 1A.

With respect to front-panel 103 and/or rear-panel 105 shown in FIG. 1B, in some embodiments, front-panel 103 and/or rear-panel 105 may be a (mostly/substantially) vertically oriented planar member(s) of soaking-device 100. In some embodiments, front-panel 103 and/or rear-panel 105 may be a (mostly/substantially) vertically upright member of soaking-device 100. In some embodiments, front-panel 103 and rear-panel 105 may be disposed oppositely from each other. In some embodiments, front-panel 103 and rear-panel 105 may be separated from each other by a length of floor-and-sidewalls 101. In some embodiments, front-panel 103 and/or rear-panel 105 may comprise two opposing sides (major surfaces), namely, an internal (interior) surface and an external (exterior) surface. In some embodiments, the external (exterior) surfaces of front-panel 103 and/or of rear-panel 105 may face away from each other (and away from soaking-device 100). In some embodiments, the internal (interior) surfaces of front-panel 103 and/or of rear-panel 105 may face each other. In some embodiments, when front-panel 103 and rear-panel 105 may be installed and/or assembled forming aspects of soaking-device 100, then the major planar surfaces (internal and/or external) of front-panel 103 and rear-panel 105 may be substantially parallel with each other. In some embodiments, at least some of the internal (interior) surfaces of front-panel 103 and/or rear-panel 105 may be wetted and/or intended to be wetted by immersion-liquid 180. In some embodiments, at least some of the internal (interior) surfaces of front-panel 103 and/or of rear-panel 105 may be configured to directly physically contact and hold immersion-liquid 180. In some embodiments, the external (exterior) surfaces of front-panel 103 and/or of rear-panel 105 may not be intended to directly hold immersion-liquid 180. In some embodiments, the external (exterior) surfaces of front-panel 103 and/or of rear-panel 105 may not be intended to directly physically touch and/or be wetted by immersion-liquid 180, except for incidental splash or the like.

With respect to rear-panel 105 shown in FIG. 1B, in some embodiments, a portion of rear-panel 105, including its internal (interior) surfaces may be at least substantially (mostly) optically see through, transparent, translucent, and/or the like (with respect to average/typical human vision). Whereas, in some embodiments, the external (exterior) surface(s) of rear-panel 105 may be at least substantially (mostly) non-see through, opaque, non-optically transparent, non-optically translucent, and/or the like (with respect to average/typical human vision). In some embodiments, the external (exterior) surface(s) of rear-panel 105 may be covered in a solid backing of at least one color so as to be at least substantially (mostly) non-see through, opaque, non-optically transparent, non-optically translucent, and/or the like (with respect to average/typical human vision). Thus, lighting into a top portion of rear-panel 105 may exit through internal (interior) surfaces of rear-panel 105.

Additionally, FIG. 1B shows that a (removable) neck-gasket 500 and a (removable) wedge 600 may be attached to front-panel 103. In some embodiments, neck-gasket 500 and/or wedge 600 may be attached to front-panel 103. In some embodiments, neck-gasket 500 and/or wedge 600 may be removably attached to front-panel 103. In some embodiments, soaking-device 100 and/or front-panel 103 may comprise neck-gasket 500 and/or wedge 600.

With respect to neck-gasket 500, in some embodiments, when the body portion (or portion thereof) of user 190 may be (removably) immersed within the vessel portion of soaking-device 100, another (different) body portion (or portion thereof) of user 190 may be in removable and in watertight (waterproof) physical contact with a top portion and/or a side portion of neck-gasket 500. For example, and without limiting the scope of the present invention, when a human 190 face may be immersed within immersion-liquid 180 within the vessel of soaking-device 100 (i.e., the face is the body portion), a front of a neck of that person 190 may physically touch and rest up against a waterproof flexible portion of neck-gasket 500 to form a temporary watertight seal between the front of the neck of user 190 and the neck-gasket 500 (i.e., the front of the neck of user 190 may be the other [different] body portion). See e.g., FIG. 5F that shows this front of the neck of user 190 in removable physical interaction with neck-gasket 500. Also note, this this front of the neck of user 190 in removable physical interaction with neck-gasket 500 is occurring in FIG. 1A, but is not readily visible from FIG. 1A. In some embodiments, the waterproof flexible portion of the neck-gasket 500 may be a waterproof elastomeric material like neoprene (or silicone or rubber).

Also shown in FIG. 1B are portions of the floor-and-sidewalls 101. See FIG. 11A and in FIG. 11B for just the floor-and-sidewalls 101 component shown by itself. In some embodiments, upper-surface 1109 portions of the floor-and-sidewalls 101 shown in FIG. 1B may be wetted with immersion-liquid 180; and in general, immersion-liquid 180 may be (temporary) residing on top of these visible surfaces of the floor-and-sidewalls 101 shown in FIG. 1B. In some embodiments, the floor-and-sidewalls 101 member may be a continuous member that serves as both a (wetted or wettable) floor and as opposing (wetted or wettable) sidewalls to the vessel of soaking-device 100. In some embodiments, floor-and-sidewalls 101 member may be waterproof. In some embodiments, floor-and-sidewalls 101 member may be made from a material (or materials) that is considered by persons of ordinary skill in the relevant industries to be good or desirable at heat transfer, such as, but not limited to, a metal, an alloy, stainless steel, graphene, and/or the like.

Also shown in FIG. 1B is a portion of one of two opposing side-panels 107 (i.e., a portion of the right side-panel 107). In some embodiments, a given side-panel 107 may be a (mostly/substantially) vertically oriented planar member of soaking-device 100. In some embodiments, a given side-panel 107 may be a (mostly/substantially) vertically upright member of soaking-device 100. In some embodiments, side-panels 107 may not be intended to directly hold immersion-liquid 180. In some embodiments, side-panels 107 may not be intended to directly physically touch and/or be wetted by immersion-liquid 180, except for incidental splash or the like. That is, side-panels 107 may not be direct portions of the vessel portion of soaking-device 100. In some embodiments, side-panels 107 may form exterior opposing side walls of soaking-device 100. In some embodiments, the main (majority) exterior sides and/or surfaces of soaking-device 100 may be defined by exterior portions of front-panel 103, rear-panel 105, and side-panels 107. In some embodiments, the exterior portions of front-panel 103, rear-panel 105, and side-panels 107 may wrap around and/or enclose an entire perimeter of soaking-device 100.

Also shown in FIG. 1B are two opposing handles 1300. In some embodiments, these two opposing handles 1300 may have elongate lengths that are at least substantially parallel with each other. In some embodiments, each handle 1300 may be attached to a given side-panel 107 (near the top of the given side-panel 107). In some embodiments, each handle 1300 may be resting on top of a given side-panel 107 and on top of a portion of the floor-and-sidewalls 101 (this portion of the floor-and-sidewalls 101 is a top-ledge 1105 shown in FIG. 11A and in FIG. 11B).

Figure 1C:
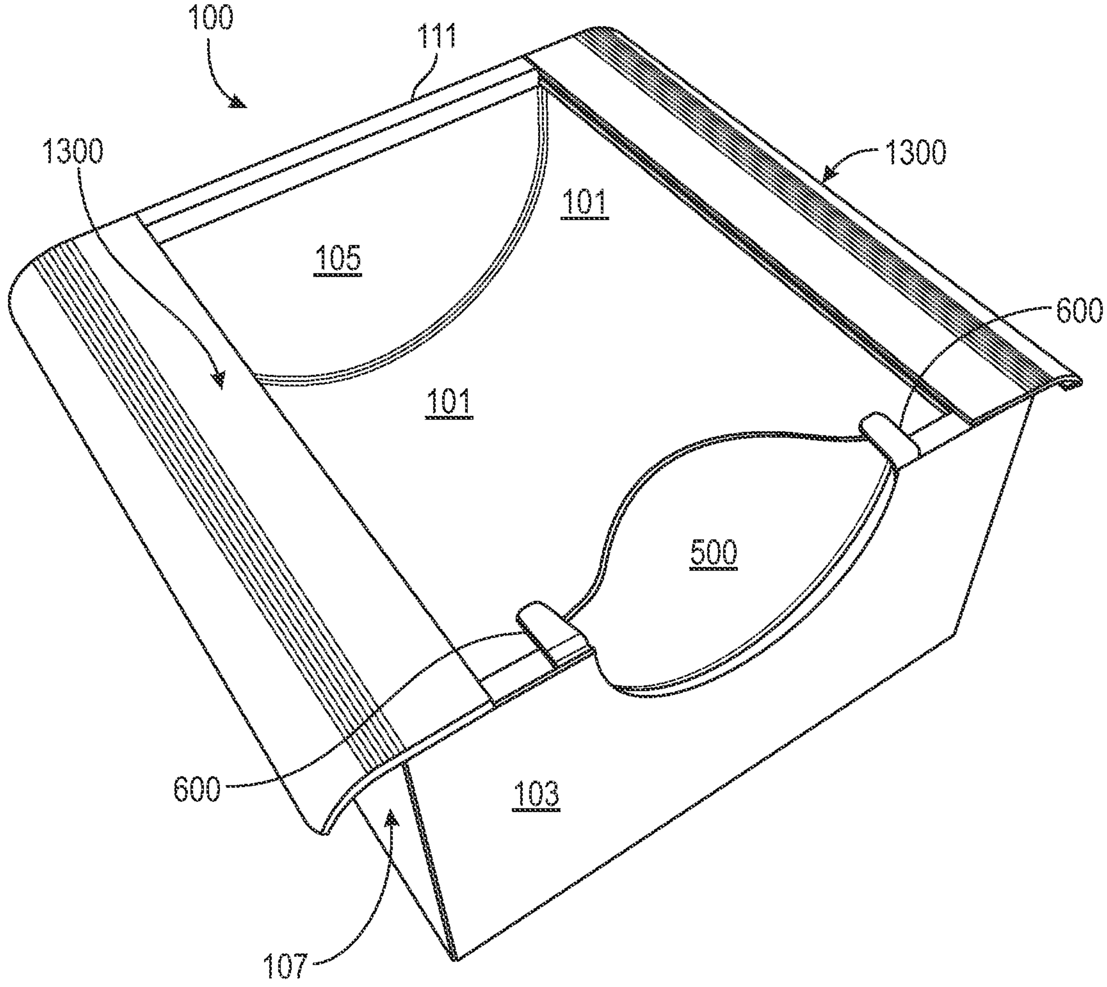
FIG. 1C shows a different front and top perspective view of the overall assembled soaking-device of FIG. 1A (i.e., different from FIG. 1A and/or from FIG. 1B).

Also shown in FIG. 1B in a slot 1400 visible on one of the handles 1300 (although each handle 1300 may each comprise such a slot 1400). In some embodiments, such a slot 1400 may also be present on the other handle 1300, but not visible in FIG. 1B because of the viewing angle. In some embodiments, these slots 1400 of the handles 1300 may run in a parallel direction as the elongate length of the given handle 1300. In some embodiments, a cross-section of a given slot 1400 may be at least substantially (mostly) "T" shaped. In some embodiments, slots 1400 may be opposing each other, with a lengthwise opening to the given slot 1400 facing each other, when each handle 1300 may be installed (assembled) onto its respective side-panel 107. In some embodiments, these slots 1400 may function as a track (rail) system for (removable) attachment of various mating-members 1407. In some embodiments, a given mating-member 1407 may have a portion that is configured to fit into and be captured by a given slot 1400. An example of such a mating-member 1407 is shown in FIG. 14B and in FIG. 14C FIG. 1C shows a different front and top perspective view of the overall assembled soaking-device 100 (i.e., different from FIG. 1A and/or from FIG. 1B). FIG. 1C shows most of the same components (parts) of soaking-device 100 as FIG. 1B, except the side-walls 107 are not readily visible in FIG. 1C (one side-wall 107 [the left side-wall 107] is partially visible in FIG. 1C). The internal (interior) surface(s) of rear-panel 105 of soaking-device 100, above floor-and-sidewalls 101, may be visible from FIG. 1C.

Figure 1D:
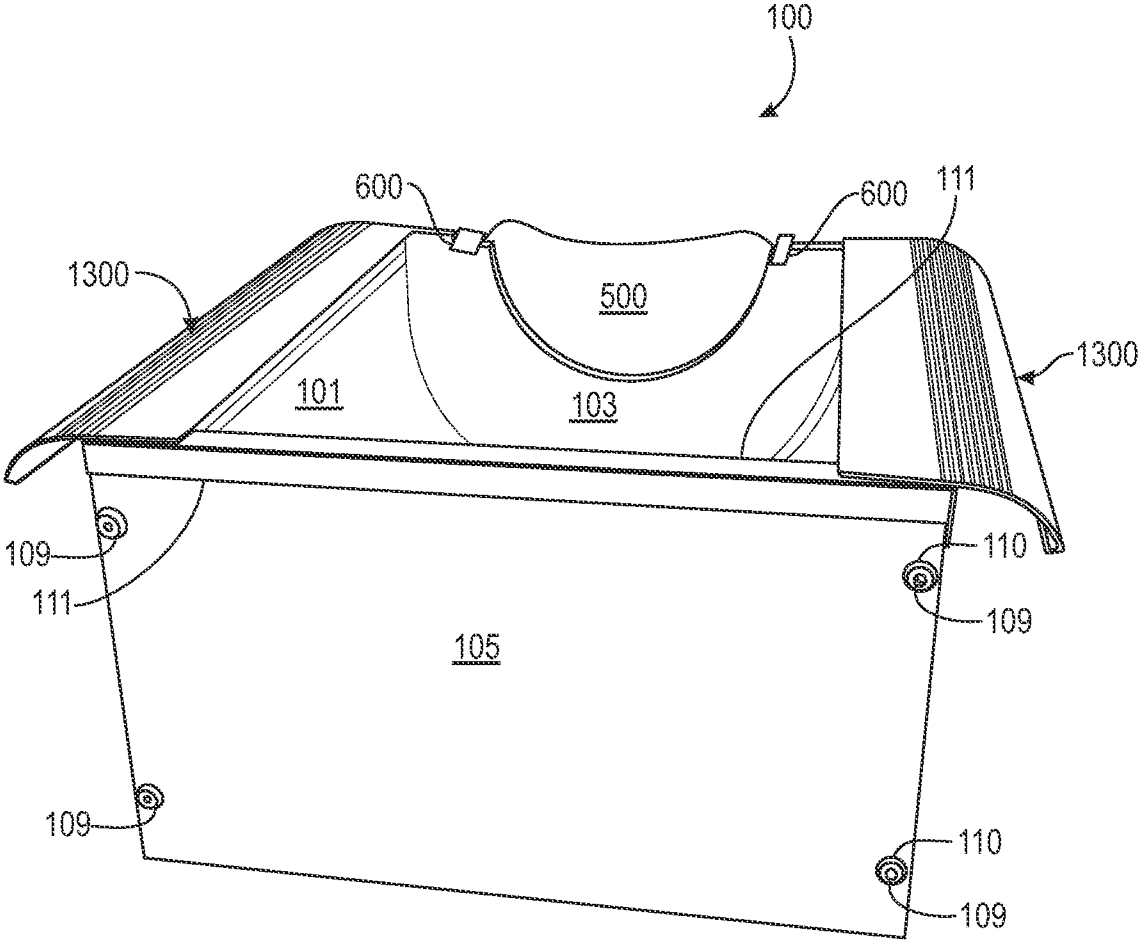
FIG. 1D shows a top rear (back) perspective view of soaking-device of FIG. 1A (in its assembled configuration).

FIG. 1D shows a top rear (back) perspective view of soaking-device 100. The external (exterior) surface(s) of rear-panel 105 of soaking-device 100 may be visible from FIG. 1D. In some embodiments, the external (exterior) surface of rear-panel 105 may be at least substantially (mostly) non-see through, opaque, non-optically transparent, non-optically translucent, and/or the like (with respect to average/typical human vision). In some embodiments, the external (exterior) surface of rear-panel 105 may be covered in a solid backing of at least one color so as to be at least substantially (mostly) non-see through, opaque, non-optically transparent, non-optically translucent, and/or the like (with respect to average/typical human vision). FIG. 1D may show fastener(s) 109 used to attach rear-panel 105 to side-panels 107. FIG. 1D may show fastener(s) 109 that may be configured to attach rear-panel 105 to side-panels 107. FIG. 1D may also show that a top of rear-panel 105 is capped with a cover 111. In some embodiments, cover 111 may be located on top of rear-panel 105. In some embodiments, cover 111 may cover over at least some lighting elements 1500 of soaking-device 100. At least some of the internal (interior) surface(s) of front-panel 103 of soaking-device 100, above floor-and-sidewalls 101, may be visible from FIG. 1D. At least some of the internal (interior) surfaces of neck-gasket 500, (removably) attached to front-panel 103, may be visible from FIG. 1D. In some embodiments, at least some of a top of neck-gasket 500 may extend above a top of front-panel 103 (when neck-gasket 500 is not under a load from a body portion of user 190 physically engaging with neck-gasket 500).

Figure 1E:
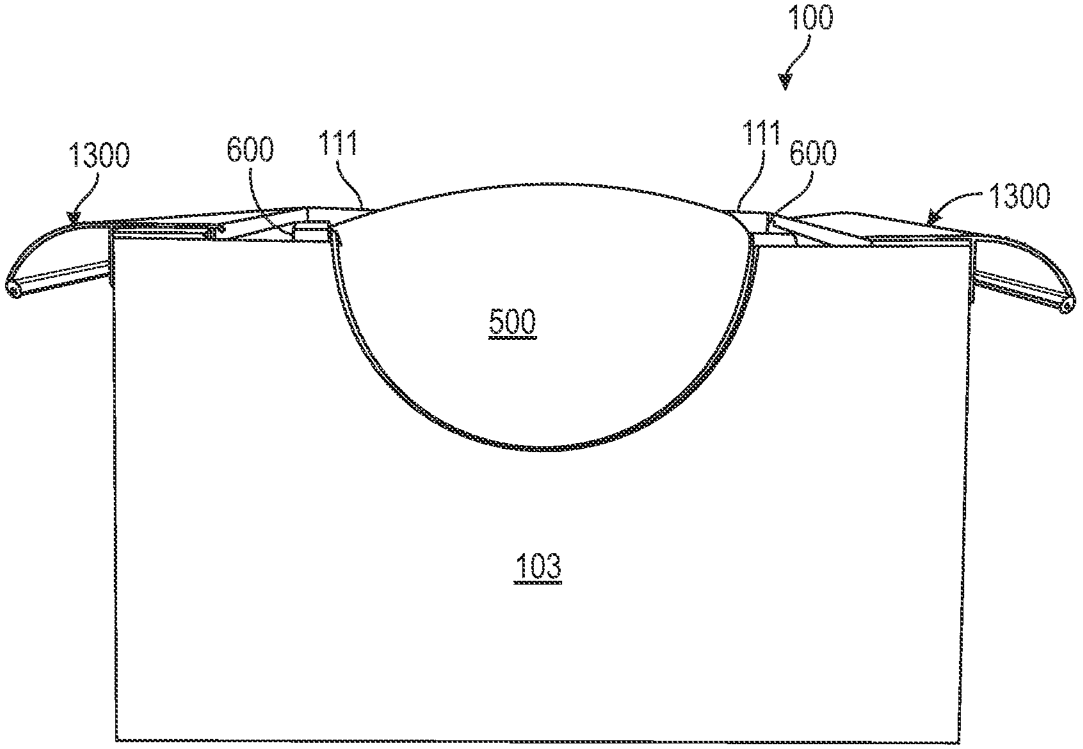
FIG. 1E shows an approximate front view of soaking-device of FIG. 1A (in its assembled configuration).

FIG. 1E shows an approximate front view of soaking-device 100 (in its assembled configuration). The external (exterior) surfaces of front-panel 103 are largely visible from FIG. 1E. In some embodiments, no fasteners may be present on the external (exterior) surfaces of front-panel 103. At least some of the external (exterior) surfaces of neck-gasket 500, (removably) attached to front-panel 103, may be visible from FIG. 1E. In some embodiments, at least some of the external (exterior) surfaces of neck-gasket 500 may physically and removably contact front-of-neck 197 of user 190 during intended use of soaking-device 100 (see e.g., FIG. 5F). In some embodiments, at least some of the external (exterior) surfaces of neck-gasket 500 may physically and removably contact front-of-neck 197 of user 190 during intended use of soaking-device 100 forming a temporary watertight seal and/or a waterproof seal between the front of the neck of user 190 and neck-gasket 500 (see e.g., FIG. 5F). Continuing discussing FIG. 1E, in some embodiments, at least some of a top of neck-gasket 500 may extend above a top of front-panel 103 (when neck-gasket 500 is not under a load from a body portion of user 190 physically engaging with neck-gasket 500). In some embodiments, at least some of a top of neck-gasket 500 may extend above a top of wedge 600. In some embodiments, at least some of a top of wedge 600 may extend above a top of front-panel 103. In some embodiments, at least some of a top of wedge 600 may extend above a top of front-panel 103 but not above a top of neck-gasket 500.

In some embodiments, an outside-edge of a given handle 1300 may extend out beyond an external (exterior) surface of a given side-panel 107. In some embodiments, the outside-edge of a given handle 1300 may run along the length of the given handle 1300 and may be disposed away from portions of the given handle 1300 that may be in physical contact with other elements of soaking-device 100 (such as, but not limited to, its associated [proximate] side-panel 107). In some embodiments, a linear distance between the two-opposing outside-edges of the two opposing handles 1300 may be wider than a different linear distance between the two-opposing external (exterior) surfaces of the side-panels 107. See e.g., FIG. 1E.

Figure 1F:
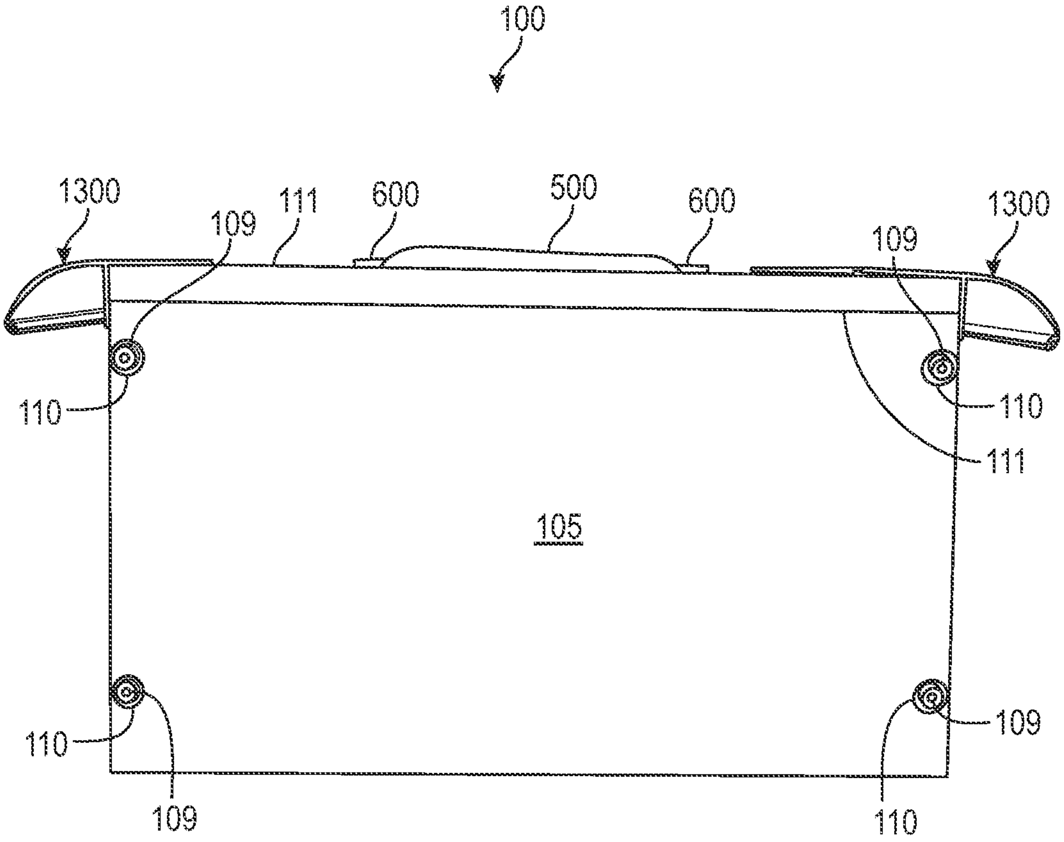
FIG. 1F shows an approximate rear (back) view of soaking-device of FIG. 1A (in its assembled configuration).

FIG. 1F shows an approximate rear (back) view of soaking-device 100 (in its assembled configuration). The external (exterior) surfaces of rear-panel 105 are largely visible from FIG. 1F. In some embodiments, the outside-edge of a given handle 1300 may extend out beyond the external (exterior) surface of its associated (proximate) side-panel 107. In some embodiments, a linear distance between the two-opposing outside-edges of the two opposing handles 1300 may be wider than a different linear distance between the two-opposing external (exterior) surfaces of the side-panels 107. FIG. 1F may show fastener(s) 109 used to attach rear-panel 105 to side-panels 107. FIG. 1F may show fastener(s) 109 that may be configured to attach rear-panel 105 to side-panels 107. FIG. 1F may also show that the top of rear-panel 105 is capped with cover 111.

Figure 1G:
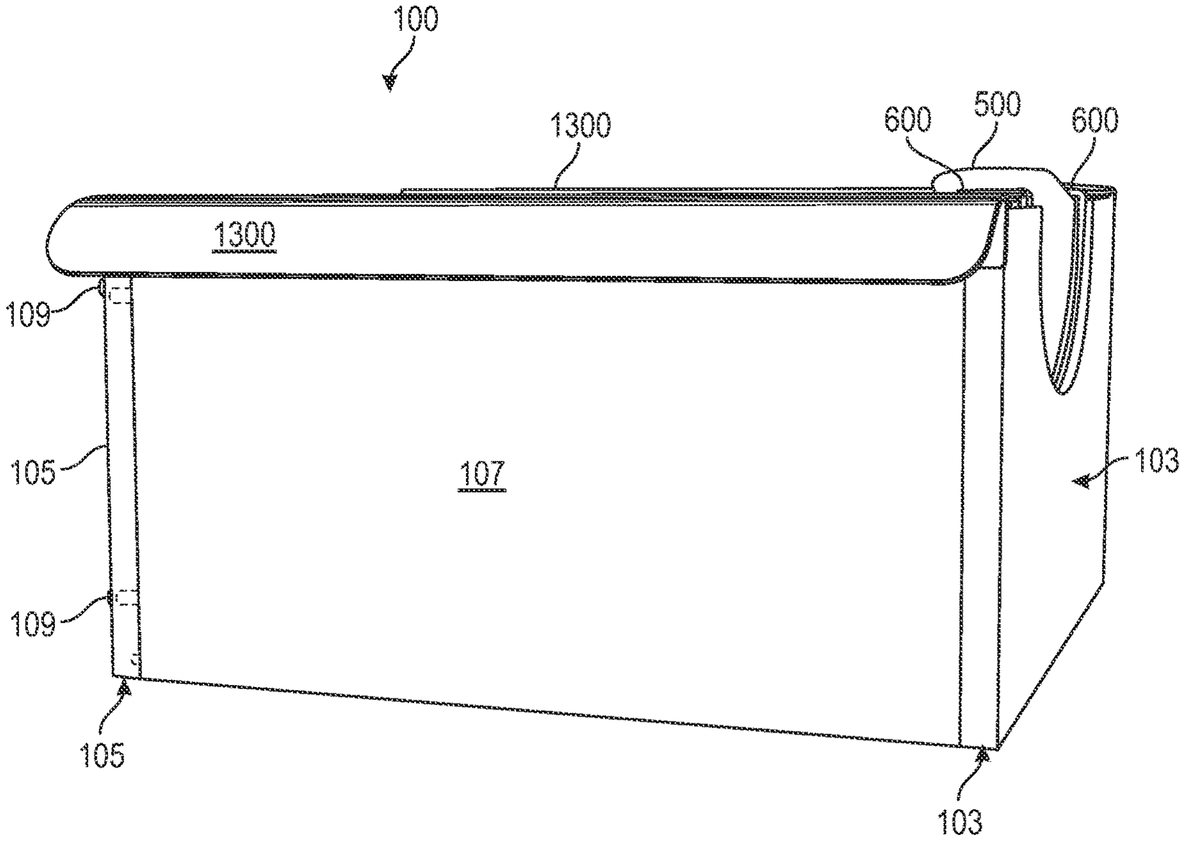
FIG. 1G shows an approximate side view (left-side view) of soaking-device of FIG. 1A (in its assembled configuration); and technically, FIG. 1G may be a side perspective view of this soaking-device, as a portion of a front-panel may also be visible in FIG. 1G.

FIG. 1G shows an approximate side view (left-side view) of soaking-device 100 (in its assembled configuration). Technically, FIG. 1G may be a side perspective view of soaking-device 100, as a portion of front-panel 103 may be visible in FIG. 1G. The external (exterior) surfaces of (left) side-panel 107 may be largely visible from FIG. 1G. FIG. 1G may show the outside-edge of its handle 1300 running in parallel with the length of its handle 1300. In some embodiments, no fasteners may be present on the external (exterior) surfaces of side-panel 107.

Figure 1H:
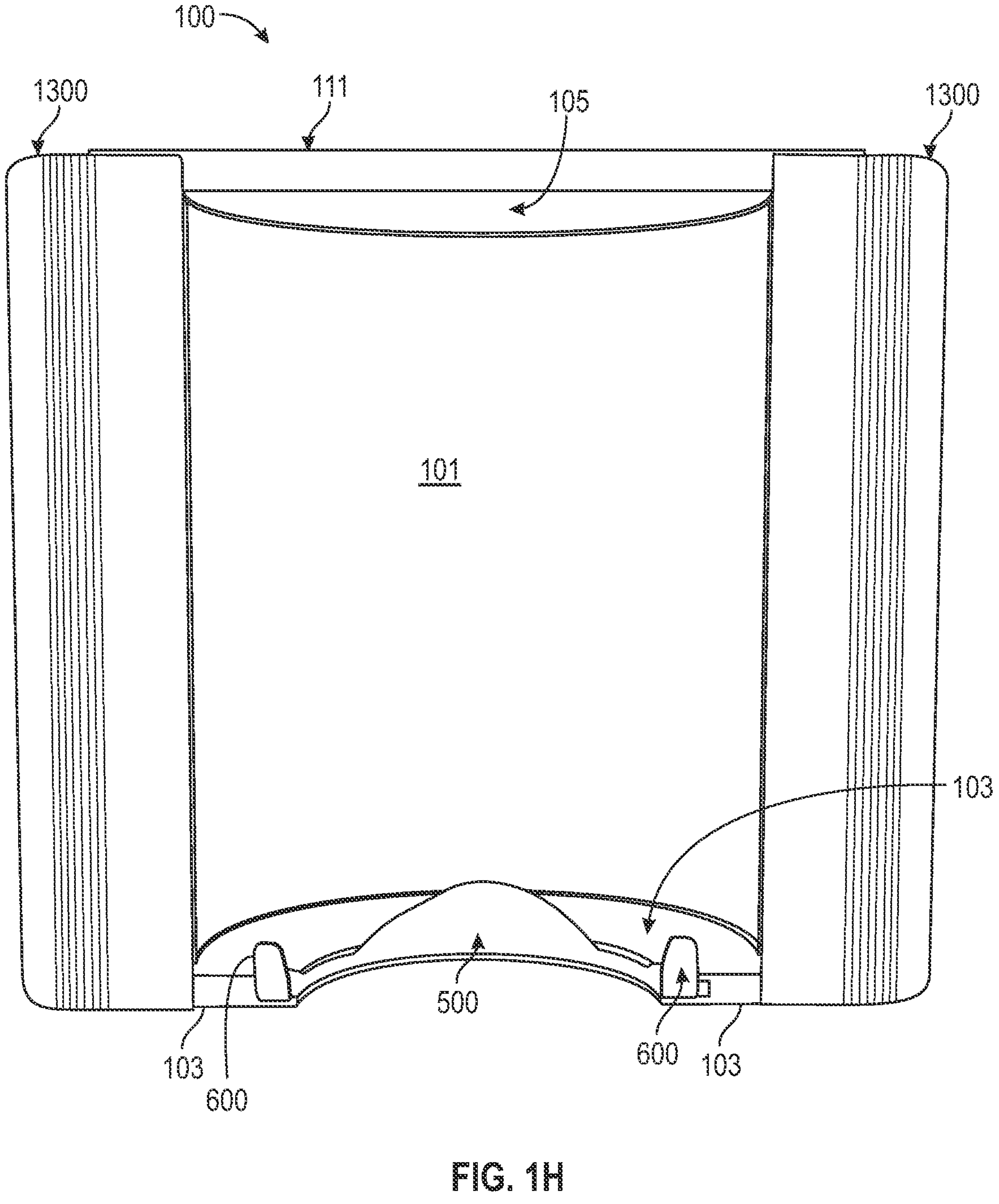
FIG. 1H shows an approximate top view of soaking-device of FIG. 1A (in its assembled configuration).

FIG. 1H shows an approximate top view of soaking-device 100 (in its assembled configuration). In some embodiments, the tops and/or upper surfaces of the two opposed handles 1300 may be visible in FIG. 1H. FIG. 1H may show the lengths of the two opposing handles 1300 running in at least substantially (mostly) parallel directions with respect to each other. In some embodiments, the two opposing handles 1300 may be separated from each other by a width of certain regions of floor-and-sidewalls 101, namely, a single floor-portion 1101 and two (2) opposing sidewall portions 1103. In some embodiments, the two opposing handles 1300 may be separated from each other by a width of certain regions of floor-and-sidewalls 101, namely, a width of floor-and-sidewalls 101 between its two (2) opposing top-ledges 1105.

Continuing discussing FIG. 1H, at least some of the upper-surfaces 1109 of floor-and-sidewalls 101, namely, the upper surfaces of its single floor-portion 1101 and its two (2) opposing sidewall portions 1103, may be seen in FIG. 1H. At least some of the upper-surfaces 1109 of floor-and-sidewalls 101, namely, the upper surfaces of its single floor-portion 1101 and its two (2) opposing sidewall portions 1103, may be configured to hold and be wetted by immersion-liquid 180. At least some of the upper-surfaces 1109 of floor-and-sidewalls 101, namely, the upper surfaces of its single floor-portion 1101 and its two (2) opposing sidewall portions 1103, may be optically reflective (with respect to human vision) and/or polished. At least some of the internal (interior) surfaces of front-panel 103 and/or of rear-panel 105 may be visible in FIG. 1H. At least some of the top of cover 111 (on top of a top of rear-panel 105) may be visible in FIG. 1H. Tops of the opposing prongs 601 of wedge 600 may be visible in FIG. 1H.

Figure 1I:
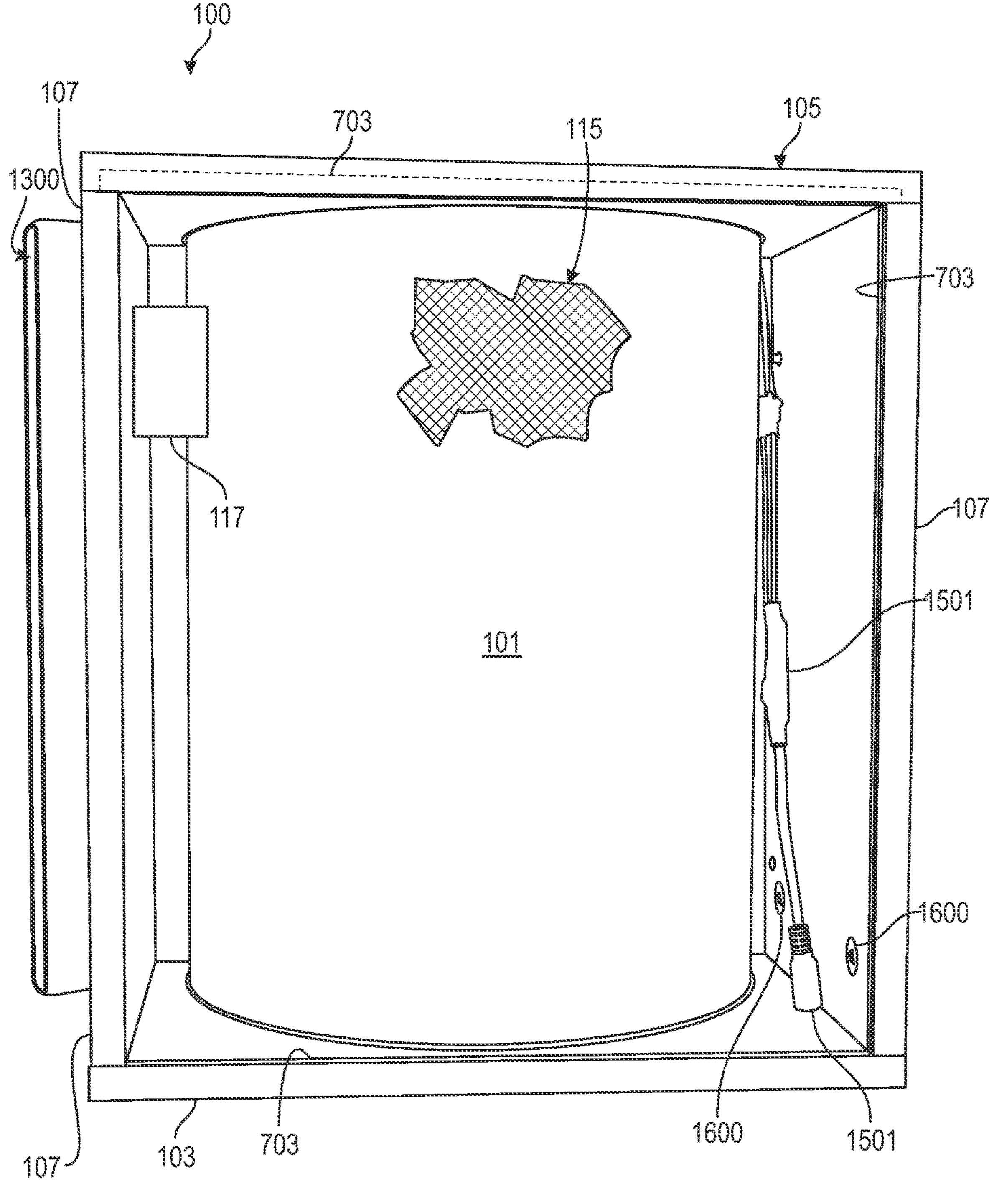
FIG. 1I shows an approximate bottom view of soaking-device of FIG. 1A (in its assembled configuration).

FIG. 1I shows an approximate bottom view of soaking-device 100 (in its assembled configuration). Note, in FIG. 1I a bottom-panel 113 of soaking-device 100 may be omitted (or transparent) so that an underside (bottom-surface 1111) of floor-and-sidewalls 101 may be seen (or at least partially seen). In some embodiments, located between the bottom-panel 113 and the bottom of the floor-and-sidewalls 101 (i.e., underneath the floor-and-sidewalls 101) may be one or more of: insulation 115; (electric) heat pad(s); (electric) heat tape; (electric) heat element(s); (electric) heating element(s); a chiller; air pump(s); compressor(s); lighting driver (transformer); a transformer; a thermostat; a rheostat; electronics; circuitry; ground fault interrupt (GFI) circuitry and/or breaker; power supply; AC/DC converter(s); wireless power transmitter(s); wireless power receiver(s); wiring; cabling; tubing; air/gas tubing; heat sink; fins; a computer; circuit board(s); printed circuit board(s) (PCBs); central processing unit(s) (CPUs); motherboard; memory (for operating system, firmware, software, settings, data, and/or the like); storage (for operating system, firmware, software, settings, data, and/or the like); buttons; switches; antennas; radios; light(s); light emitting diode (LED); speaker(s); combinations thereof; portions thereof; and/or the like.

Continuing discussing FIG. 1I, in some embodiments, insulation 115 may be shown in FIG. 1I as a region (portion) of crosshatch pattern beneath floor-and-sidewalls 101. While only this region (portion) of crosshatch pattern is shown as insulation 115 in FIG. 1I, in some embodiments, this crosshatch pattern indicating insulation 115 may larger, occupying all the bottom-surface 1111 of floor-and-sidewalls 101 or some region that is less than all of bottom-surface 1111.

Continuing discussing FIG. 1I, in some embodiments, reference numeral "117" may indicate one or more electronics of soaking-device 100, such as, but not limited to, (electric) heat pad(s); (electric) heat tape; (electric) heat element(s); (electric) heating element(s); a chiller; air pump(s); lighting driver (transformer); transformer; thermostat; rheostat; electronics; circuitry; power supply; AC/DC converter; wiring; cabling; tubing; air/gas tubing; heat sink; fins; a computer; circuit board(s); printed circuit board(s) (PCBs); central processing unit(s) (CPUs); motherboard; memory (for operating system, firmware, software, settings, data, and/or the like); storage (for operating system, firmware, software, settings, data, and/or the like); buttons; switches; antennas; radios; light(s); light emitting diode (LED); speaker(s); combinations thereof; portions thereof; and/or the like. While only one such electronics 117 may be shown in FIG. 1I, in some embodiments, one or more such electronics 117 may be located beneath floor-and-sidewalls 101 in soaking-device 100.

Figure 1J:
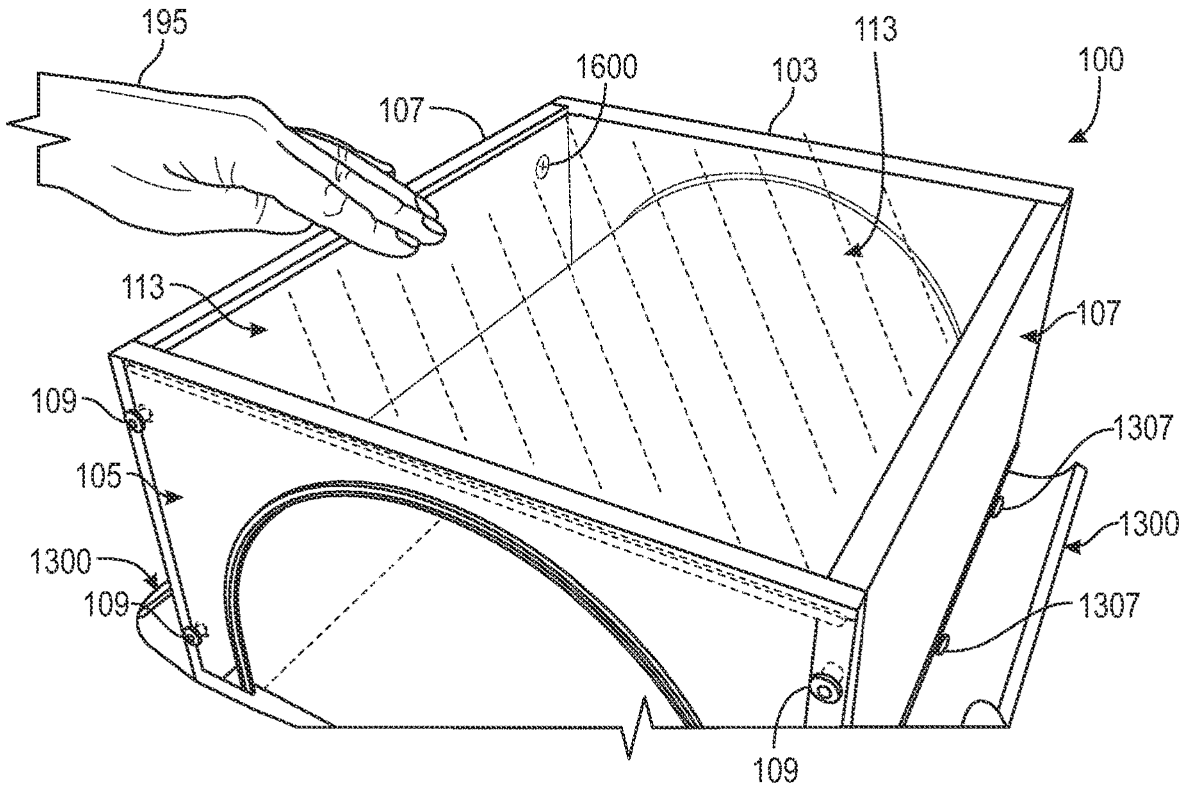
FIG. 1J shows a rear and a bottom perspective view of the overall assembled soaking-device of FIG. 1A (in its assembled configuration).

FIG. 1J shows a rear and a bottom perspective view of the overall assembled soaking-device 100. In FIG. 1J fasteners 109 may be shown aiding in the attachment of rear-panel 105 to the opposing side-panels 107. In some embodiments, fasteners 109 may be mechanical fasteners, such as, but not limited to, screws, bolts, rivets, pins, rods, dowels, portions thereof, combinations thereof, and/or the like. Different fasteners 1307 may be shown in FIG. 1J aiding in the attachment of a given handle 1300 to a top portion of a given side-panel 107. In some embodiments, different fasteners 1307 may be mechanical fasteners, such as, but not limited to, screws, bolts, rivets, pins, rods, dowels, portions thereof, combinations thereof, and/or the like.

Also shown in FIG. 1J is another component of soaking-device 100, a bottom-panel 113. In some embodiments, bottom-panel 113 (or a portion thereof) may be transparent, translucent, and/or the like (with respect to average/typical human vision). In other embodiments, bottom-panel 113 (or a portion thereof) may be opaque, non-transparent, non-translucent, and/or the like (with respect to average/typical human vision). However, a transparent bottom-panel 113 may be shown in FIG. 1J, of this particular embodiment of soaking-device 100 to better show off features, aspects, components, structures, geometry, and/or relationships between bottom-panel 113 and a bottom of the floor-and-sidewalls 101. A bottom of floor-and-sidewalls 101 may be visible in FIG. 1J only because the shown embodiment of bottom-panel 113 may be transparent. In some embodiments, bottom-panel 113 may be a (mostly/substantially) horizontally oriented planar member (with respect to the assembled configuration of soaking-device 100). In some embodiments, at least two perimeter edges of bottom-panel 113 may be retained within (linear) slots 703 that run around bottom internal (interior) surfaces (sides) 701 of the side-panel(s) 107, the front-panel 103, and/or the rear-panel 105. In some embodiments, at least three perimeter edges of bottom-panel 113 may be retained within (linear) slots 703 that run around bottom internal (interior) surfaces (sides) 701 of the side-panel(s) 107, the front-panel 103, and/or the rear-panel 105. In some embodiments, the four perimeter edges of bottom-panel 113 may be retained within (linear) slots 703 that run around bottom internal (interior) surfaces (sides) 701 of the side-panel(s) 107, the front-panel 103, and/or the rear-panel 105. In some embodiments, all the perimeter edges of bottom-panel 113 may be retained within (linear) slots 703 that run around bottom internal (interior) surfaces (sides) 701 of the side-panel(s) 107, the front-panel 103, and/or the rear-panel 105. See FIG. 7 for internal (interior) surfaces (sides) 701 of the side-panel(s) 107, the front-panel 103, and/or the rear-panel 105 and for slots 703.

In some embodiments, located between the bottom-panel 113 and the bottom of the floor-and-sidewalls 101 (i.e., underneath the floor-and-sidewalls 101) may be one or more of: insulation; (electric) heat pad(s); (electric) heat tape; (electric) heat element(s); (electric) heating element(s); a chiller; air pump(s); lighting driver (transformer); transformer; thermostat; rheostat; electronics; circuitry; power supply; AC/DC converter; wiring; cabling; tubing; air/gas tubing; heat sink; fins; a computer; circuit board(s); printed circuit board(s) (PCBs); central processing unit(s) (CPUs); motherboard; memory (for operating system, firmware, software, settings, data, and/or the like); storage (for operating system, firmware, software, settings, data, and/or the like); buttons; switches; antennas; radios; light(s); light emitting diode (LED); speaker(s); combinations thereof; portions thereof; and/or the like.

Figure 2A:
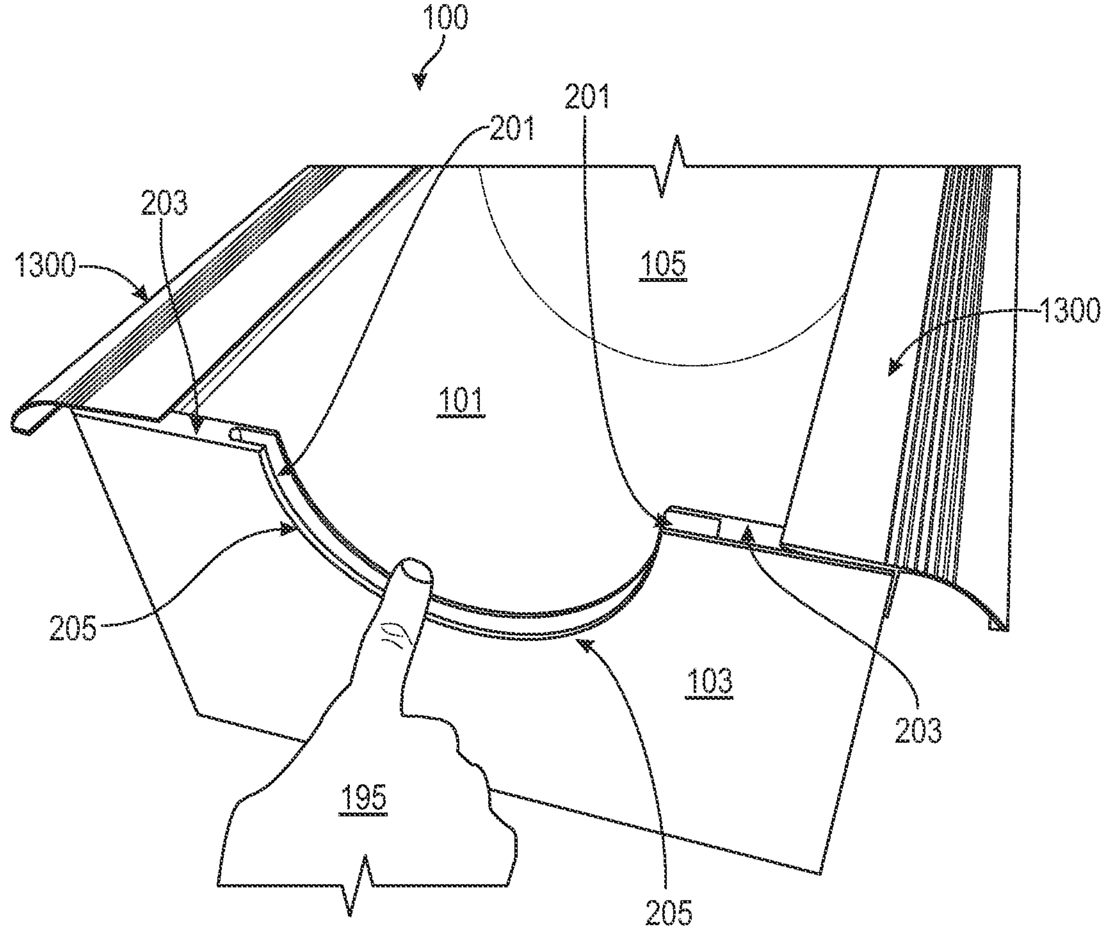
FIG. 2A is a top front perspective of the soaking-device of FIG. 1A (in its mostly assembled configuration), with a particular focus on a front-panel that has its neck-gasket and its wedge removed to show a neck-gasket-channel in a top of that front-panel.
Figure 2B:
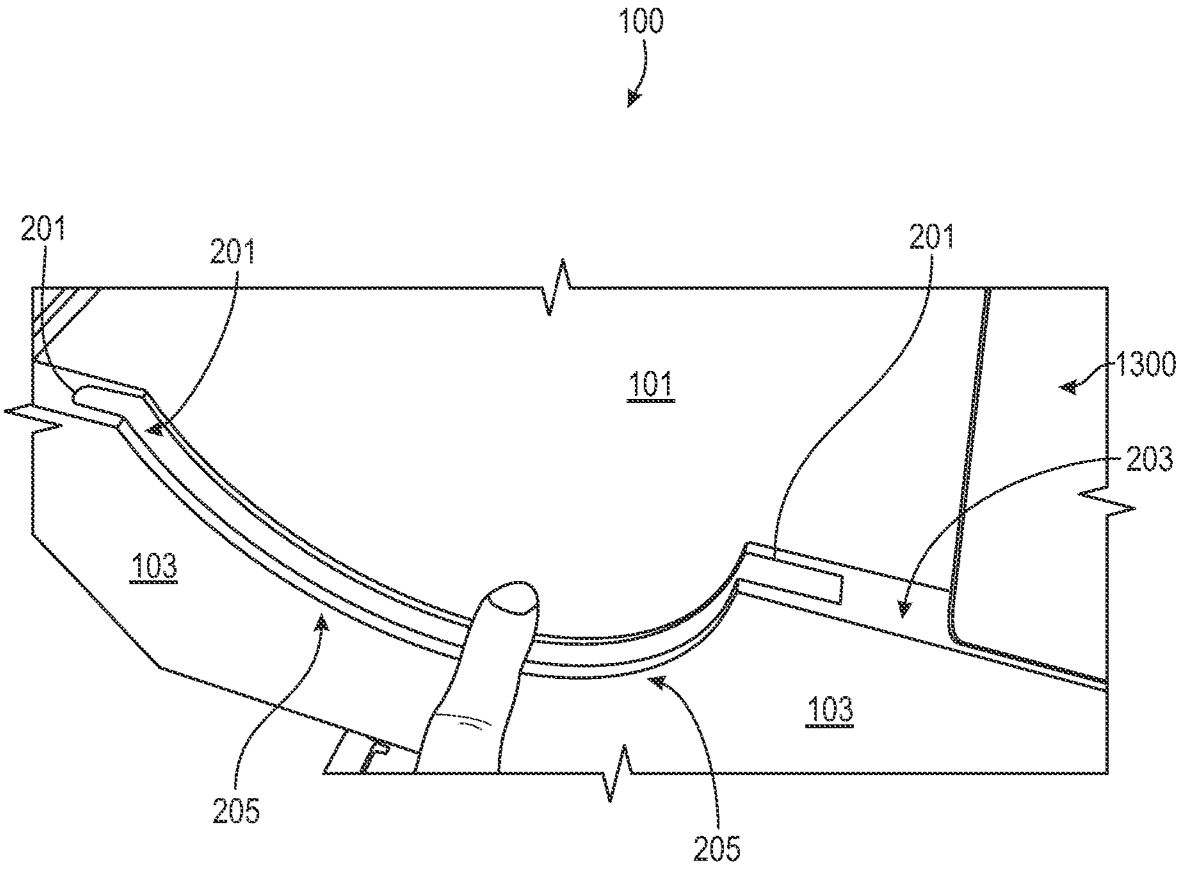
FIG. 2B is a top front perspective of the front-panel that also shows a neck-gasket-channel within a top of a cutout region of the front-panel.

FIG. 2A is a top front perspective of soaking-device 100, with a focus on front-panel 103. FIG. 2B a top front perspective of front-panel 103 that shows a neck-gasket-channel 201 within a top 203 of a cutout region 205 of front-panel 103. FIG. 2B shows a more enlarged (closer up view) of neck-gasket-channel 201 as compared to neck-gasket-channel 201 shown in FIG. 2A. Note, FIG. 2A and FIG. 2B shows front-panel 103 with its neck-gasket 500 and its wedge 600 removed from a neck-gasket-channel 201 of front-panel 103. Whereas, in FIG. 1A to FIG. 1G, the neck-gasket 500 and the wedge 600 were shown and/or were removably attached to front-panel 103. However, when the neck-gasket 500 and the wedge 600 may be removably attached to front-panel 103, then the neck-gasket-channel 201 of front-panel 103 may not be readily visible because neck-gasket-channel 201 may be at least partially visibly blocked by portions of neck-gasket 500 and of wedge 600 being seated within neck-gasket-channel 201.

As shown in FIG. 2A and in FIG. 2B, a top 203 center region of front-panel 103 has cutout region 205. In some embodiments, cutout region 205 may have top portions that are below (beneath) top 203 of front-panel 103. In some embodiments, when cutout region 205 may be view from a front view (or a back [rear] view), cutout region 205 may have a shape that is at least substantially (mostly) similar to one or more of: a half-circle, a semi-circle, a half-oval, a half-ellipse, a polygon, a half-polygon, a square, a rectangle, portions thereof, combinations thereof, and/or the like. Note, cutout region 205 need not be formed from cutting into a top 203 of front-panel 103.

Continuing discussing FIG. 2A and FIG. 2B, in some embodiments, extending into cutout region 205 from its top (a finite and fixed distance), may be a channel, namely, the neck-gasket-channel 201. In some embodiments, neck-gasket-channel 201 may be a channel that runs a fixed (finite) distance into a portion of a top cutout region 205 of front-panel 103. In some embodiments, neck-gasket-channel 201 may be configured to (removably) receive the bottom portions of neck-gasket 500 and of wedge 600 to create the watertight (waterproof) seal between the neck-gasket 500 and front-panel 103. In some embodiments, neck-gasket-channel 201 may be configured for removably receiving a bottom portion of the neck-gasket 500. In some embodiments, neck-gasket-channel 201 may be configured for removably receiving a bottom portion of the wedge 600. In some embodiments, neck-gasket-channel 201 may be configured for removably receiving the bottom portion of the neck-gasket 500 and the bottom portion of the wedge 600. In some embodiments, the bottom portion of neck-gasket 500 may be held removably in place within neck-gasket-channel 201 by wedge 600 that also fits into the neck-gasket-channel 201 and presses up against the bottom portion of neck-gasket 500. When the neck-gasket 500 may be removably attached to front-panel 103 in this manner, there may be a continuous watertight (waterproof) seal between portions of front-panel 103 that physically contact neck-gasket 500.

Figure 3A:
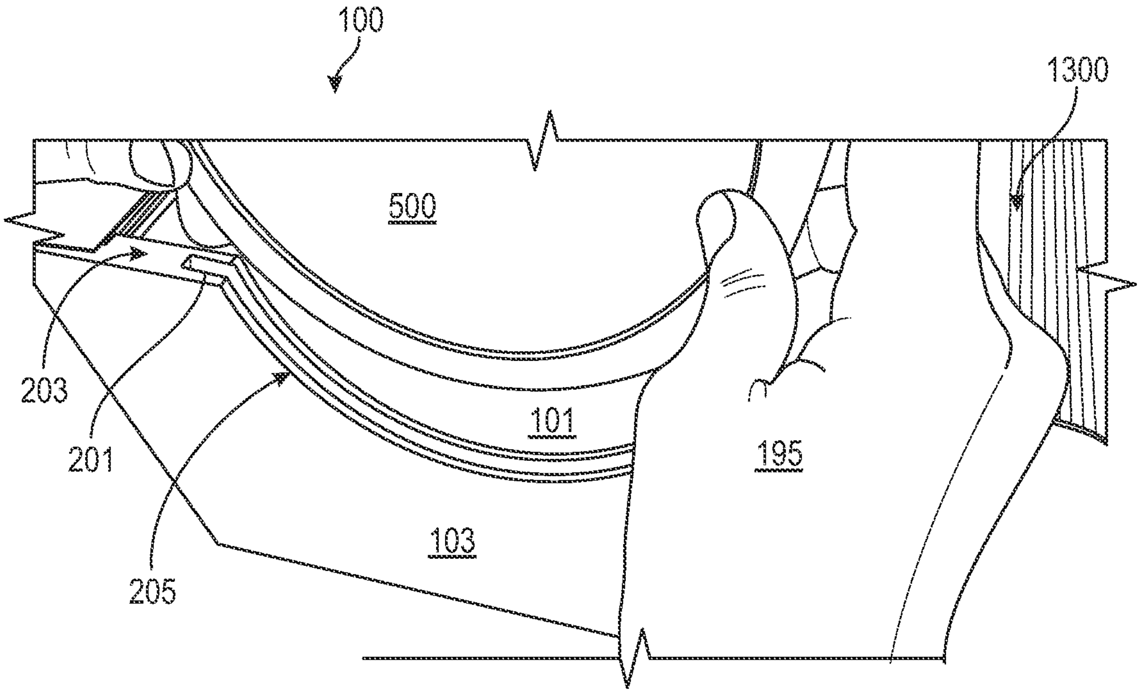
FIG. 3A is a top front perspective view of the front-panel and showing a bottom portion of a neck-gasket not inserted within its receiving neck-gasket-channel located on the front-panel.
Figure 3B:
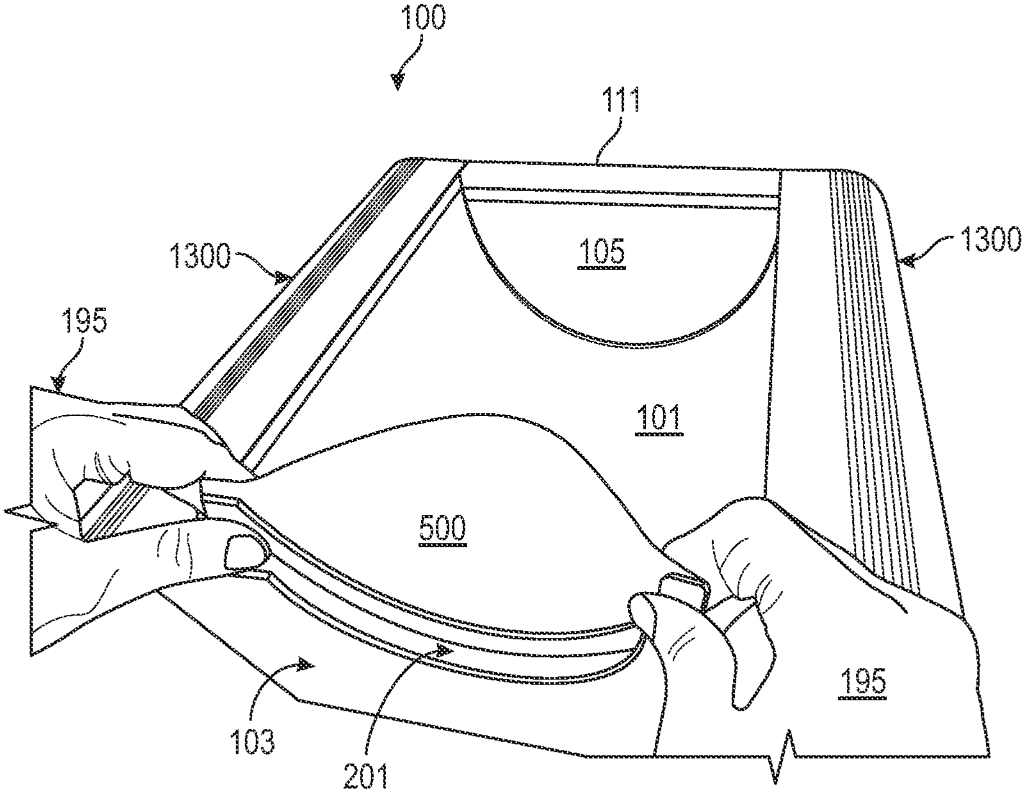
FIG. 3B is a top front perspective view of the front-panel and showing bottom portions of the neck-gasket, with some of the bottom portions of the neck-gasket being inserted its receiving neck-gasket-channel located in the front-panel.
Figure 3C:
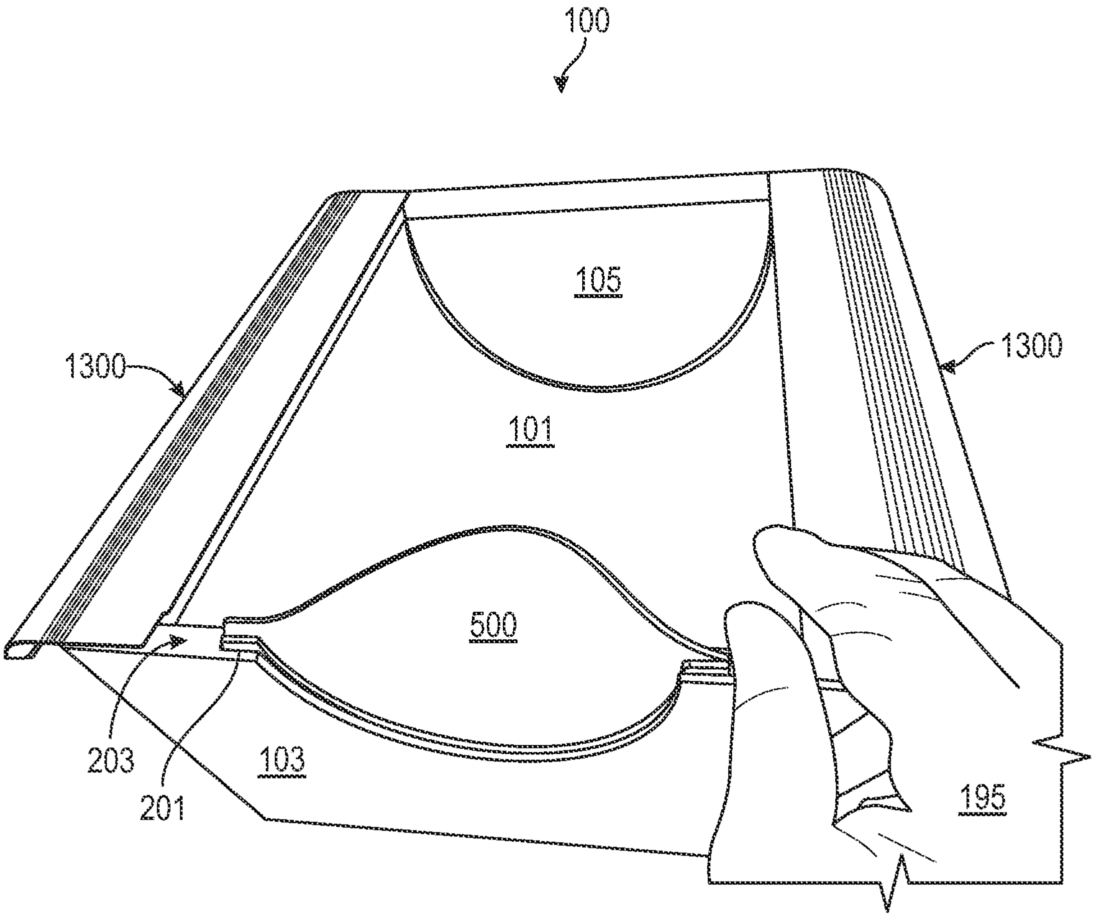
FIG. 3C is a top front perspective view of the front-panel and showing bottom portions of the neck-gasket having been fully inserted into its receiving neck-gasket-channel located in the front-panel.

FIG. 3A to FIG. 3C are a series of three sequential drawings showing a sequential process of inserting the bottom edge portions of neck-gasket 500 into its receiving neck-gasket-channel 201. FIG. 3A is a top front perspective view of front-panel 103 and showing a bottom portion of neck-gasket 500 not yet inserted within its receiving neck-gasket-channel 201. FIG. 3A shows a beginning of the process to removably attach neck-gasket 500 to the front-panel 103. In some embodiments, the bottom edge portions of neck-gasket 500 will be inserted into its receiving neck-gasket-channel 201.

FIG. 3B is a top front perspective view of front-panel 103 and showing bottom portions of neck-gasket 500, with some of the bottom portions of neck-gasket 500 being inserted its receiving neck-gasket-channel 201 located in front-panel 103. FIG. 3B shows the process to removably attach neck-gasket 500 to its receiving neck-gasket-channel 201 in front-panel 103 a bit further along as compared to FIG. 3A. Now in FIG. 3B, at least some of the bottom edge portions of neck-gasket 500 have been inserted into its receiving neck-gasket-channel 201 in front-panel 103.

FIG. 3C is a top front perspective view of front-panel 103 and showing bottom portions of neck-gasket 500 having been inserted into its receiving neck-gasket-channel 201 located in front-panel 103. FIG. 3C shows the process to removably insert neck-gasket 500 to front-panel 103 completed, with the bottom portions of neck-gasket 500 fully (entirely) inserted into its receiving neck-gasket-channel 201 located in front-panel 103. However, note at this point shown in FIG. 3C, wedge 600 is not yet also inserted into receiving neck-gasket-channel 201 located in front-panel 103, and thus there may not be a watertight (waterproof) seal between neck-gasket 500 and front-panel 103.

Figure 4A:
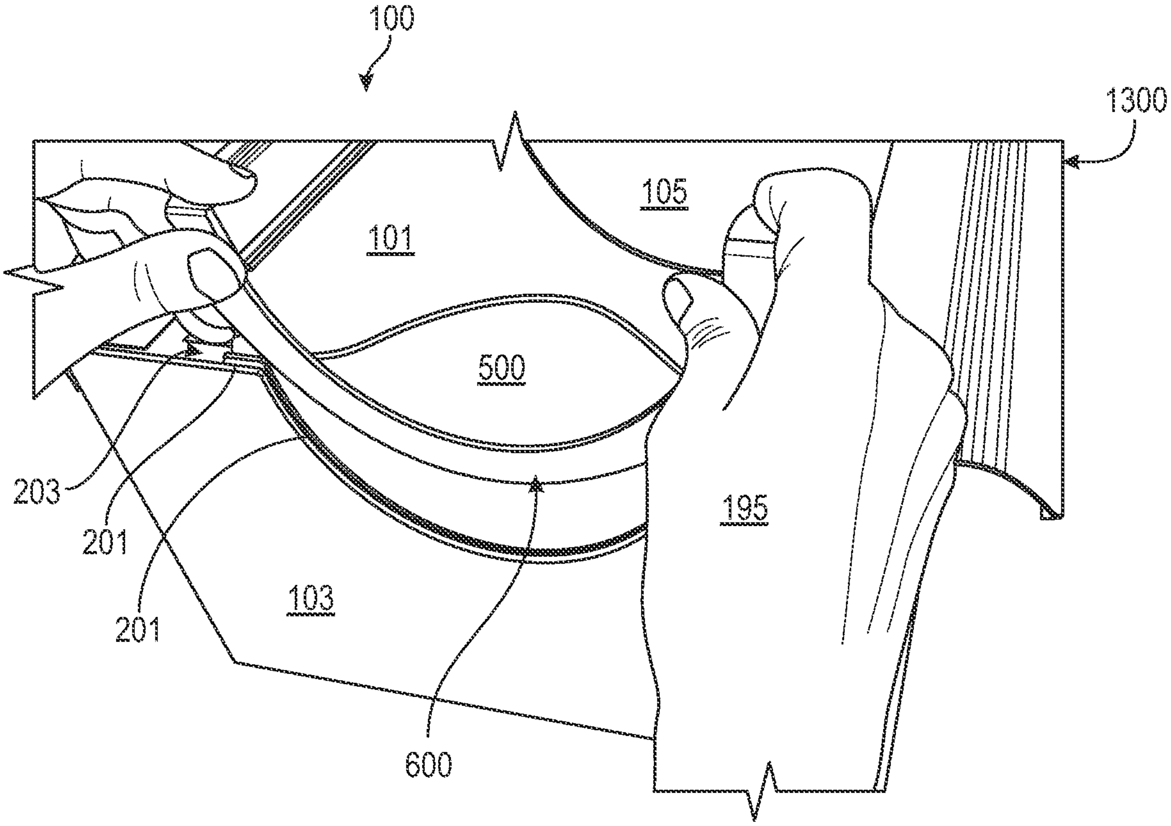
FIG. 4A is a top front perspective view of the front-panel, with the neck-gasket inserted into its receiving neck-gasket-channel located on the front-panel, and with the wedge not yet inserted into this neck-gasket-channel.
Figure 4B:
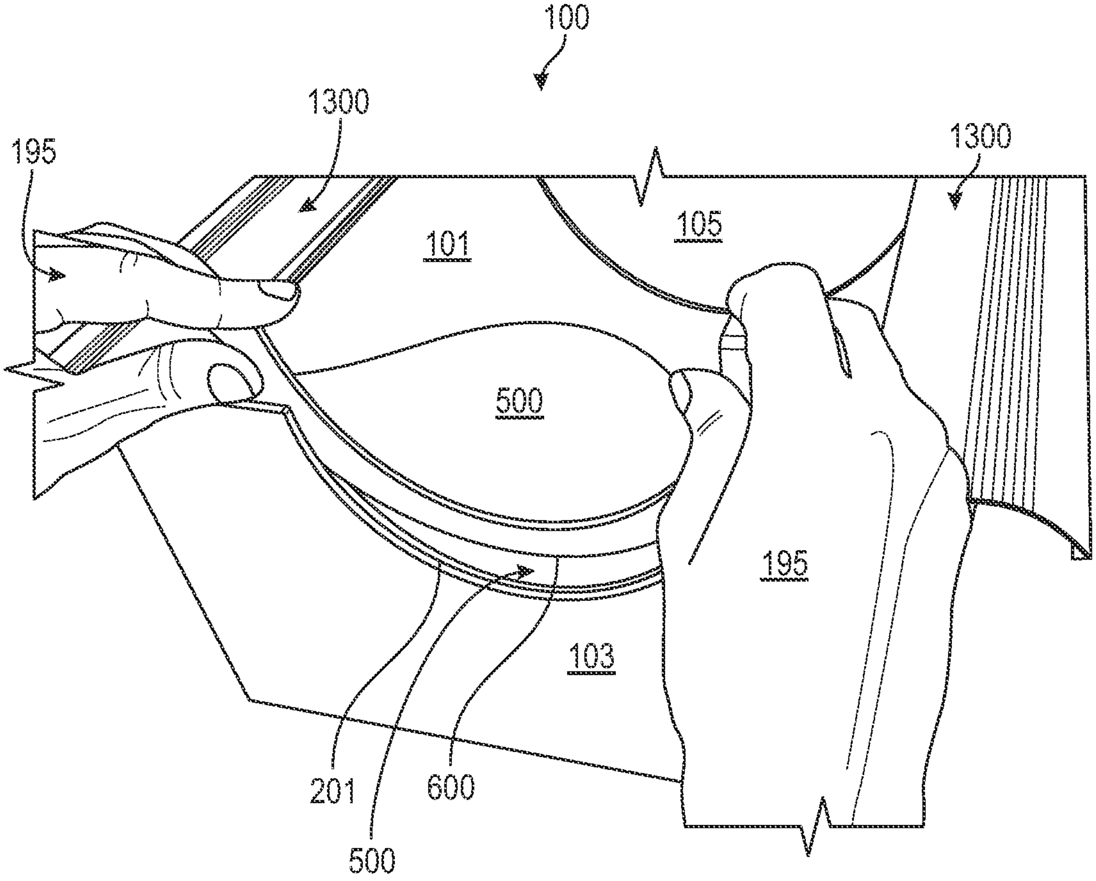
FIG. 4B is a top front perspective view of the front-panel, with the neck-gasket inserted into its receiving neck-gasket-channel located on the front-panel, and with the wedge only partially inserted into this neck-gasket-channel.
Figure 4C:
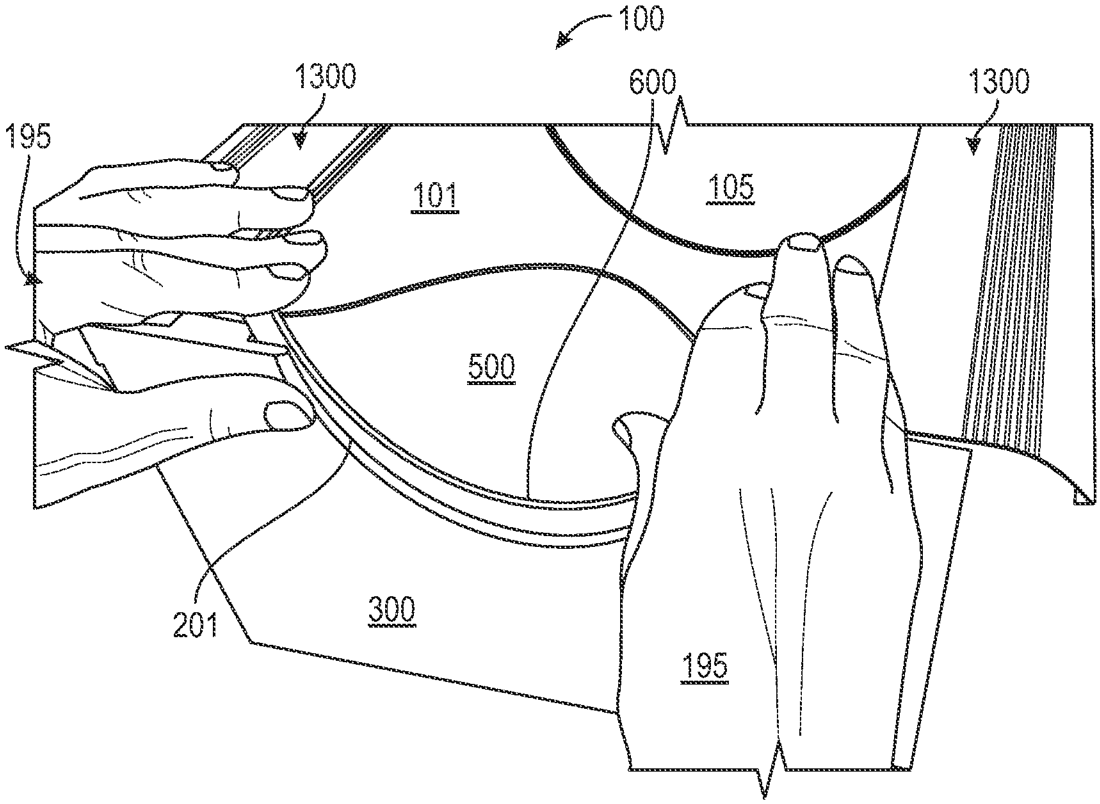
FIG. 4C is a top front perspective view of the front-panel, with the neck-gasket inserted into its receiving neck-gasket-channel located on the front-panel, and with the wedge more inserted into this neck-gasket-channel as compared to FIG. 4B.

FIG. 4A to FIG. 4C are a series of four sequential drawings showing a sequential process of inserting the bottom edge portions of wedge 600 into neck-gasket-channel 201 (of front-panel 103) and adjacent to the already inserted bottom edges of neck-gasket 500 into neck-gasket-channel 201. Note, FIG. 1A to FIG. 1G, show and/or have both the neck-gasket 500 and the wedge 600 fully and entirely inserted (seated) to neck-gasket-channel 201, resulting in the watertight (waterproof) seal between neck-gasket 500 and front-panel 103.

FIG. 4A is a top front perspective view of front-panel 103, with neck-gasket 500 inserted into its neck-gasket-channel 201 located on front-panel 103, and with wedge 600 not yet inserted into this neck-gasket-channel 201. FIG. 4A shows a beginning of the process to removably attach wedge 600 to the front-panel 103. In some embodiments, wedge 600 may be inserted into neck-gasket-channel 201 next to the already inserted bottom edge portions of neck-gasket 500 such that the inserted wedge 600 will press (wedge) up against the inserted portions of neck-gasket 500 within neck-gasket-channel 201. In some embodiments, the insertion process of wedge 600 may be very similar to the insertion process of neck-gasket 500. In some embodiments, wedge 600 may be a stiff/rigid member.

FIG. 4B is a top front perspective view of front-panel 103, with neck-gasket 500 inserted into its receiving neck-gasket-channel 201 located on front-panel 103, and with wedge 600 only partially inserted into this neck-gasket-channel 201. FIG. 4B shows the process to removably attach wedge 600 to front-panel 103 a bit further along as compared to FIG. 4A. Now in FIG. 4B, at least some of the bottom edge portions of wedge 600 have been inserted into neck-gasket-channel 201 next to the already inserted neck-gasket 500.

FIG. 4C is a top front perspective view of front-panel 103, with neck-gasket 500 inserted into its receiving neck-gasket-channel 201 located on front-panel 103, and with wedge 600 more inserted into this neck-gasket-channel 201 as compared to FIG. 4B. FIG. 4C shows the process to removably attach wedge 600 to front-panel 103 further along as compared to FIG. 4B. Now in FIG. 4C, more of bottom edge portions of wedge 600 have been inserted into neck-gasket-channel 201 next to the already inserted neck-gasket 500.

See FIG. 1B for when wedge 600 has been fully (entirely) inserted into neck-gasket-channel 201 next to the already inserted neck-gasket 500. Once wedge 600 is fully (entirely) inserted into neck-gasket-channel 201 and neck-gasket 500 has already been fully (entirely) inserted into neck-gasket-channel 201 (e.g., as shown in FIG. 1B), then where neck-gasket 500 physically contacts surfaces of neck-gasket-channel 201 may form the watertight (waterproof) seal between neck-gasket 500 and front-panel 103. Once wedge 600 is fully (entirely) inserted (e.g., as shown in FIG. 1B), then neck-gasket 500 and front-panel 103 interface may be watertight (waterproof).

Removal of neck-gasket 500 may proceed in essentially the reverse steps, i.e., wedge 600 may be removed first from neck-gasket-channel 201 and then neck-gasket 500 may be removed from neck-gasket-channel 201. In some embodiments, wedge 600 may be removed from neck-gasket-channel 201 by squeezing opposing prongs 601 of wedge 600 towards each other and lifting (pulling) wedge 600 away from 201.

Figure 5A:
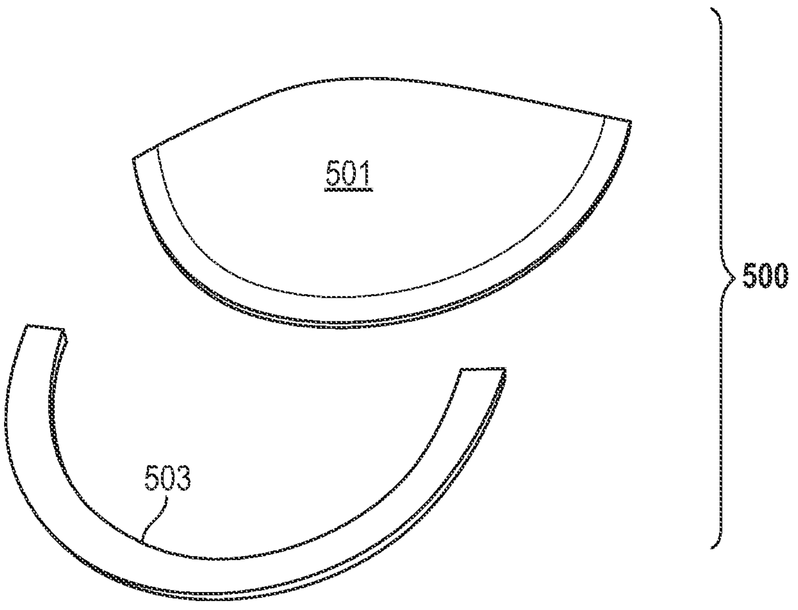
FIG. 5A is a top perspective exploded view of the neck-gasket assembly showing that the neck-gasket may be at least comprised of two separate parts, namely, a flexible-member and a rigid-member.

FIG. 5A is a top perspective exploded view of the neck-gasket 500 assembly, showing that the neck-gasket 500 may be at least comprised of two separate parts (components), namely, a flexible-member 501 and a rigid-member 503. That is, reference numeral "500" may refer to the overall neck-gasket assembly, in its assembled configuration, that may at least comprise flexible-member 501 and rigid-member 503. In some embodiments, flexible-member 501 may be a flexible member. In some embodiments, flexible-member 501 may be a waterproof material. In some embodiments, flexible-member 501 may be an elastomeric material. In some embodiments, flexible-member 501 may be selected from one or more of: neoprene, silicone, rubber, a flexible plastic, portions thereof, combinations thereof, and/or the like. In some embodiments, flexible-member 501 may be a flat and planar member that is wider (or longer) than thick. In some embodiments, when flexible-member 501 may be spread out and laying flat upon a flat substrate surface, then flexible-member 501 may have a predetermined shape that at least substantially matches and/or is sized to cover over void space formed from the cutout region 205 of front-panel 103, except that a top of flexible-member 501 may extend above top 203 of front-panel 103. For example, and without limiting the scope of the present invention, when cutout region 205 may have a substantially semi-circle shape, then flexible-member 501 may also have a substantially semi-circle shape (and/or of a similar size), except for the top of flexible-member 501.

Continuing discussing FIG. 5A, in some embodiments, rigid-member 503 may be planar flat rigid member that has a shape that at least substantially (mostly) complementary matches a bottom edge shape of flexible-member 501, such that when rigid-member 503 is attached to the bottom portions of flexible-member 501, then that neck-gasket 500 assembly shares a common bottom edge shape that is now rigid, whereas, the rest of flexible-member 501 may remain flexible. For example, and without limiting the scope of the present invention, when the bottom edge portions of flexible-member 501 may be have a substantially (mostly) U-shape or a half-arc of a circle shape, then rigid-member 503 may have a similarly sized and shape U-shape or have a shape that is of a similar shape and size to the half-arc of circle shape. In some embodiments, rigid-member 503 may be configured to function as a stiffener that is attached to the bottom side portion of flexible-member 501 to provide some stiffness (rigidity) to the bottom edge portions of neck-gasket 500.

Figure 5B:
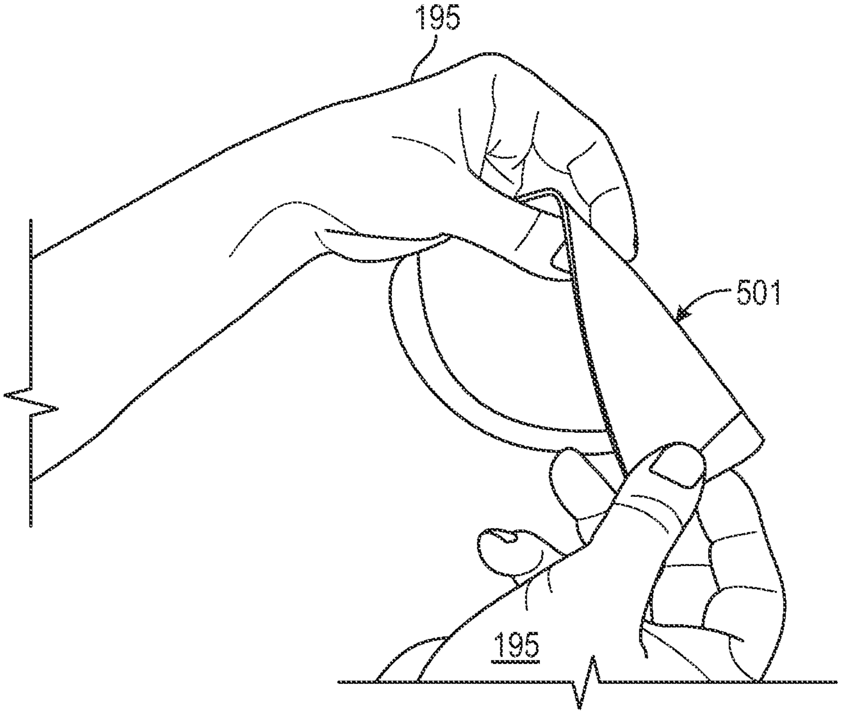
FIG. 5B is a view of the flexible-member, showing a portion of the flexible-member being bent and/or folded over on itself to demonstrate that flexible-member may be flexible.

FIG. 5B is a view of flexible-member 501 showing a portion of flexible-member 501 being bent and/or folded over on itself to demonstrate that flexible-member 501 may be flexible. FIG. 5B shows that flexible-member 501 may be flexible.

Figure 5C:
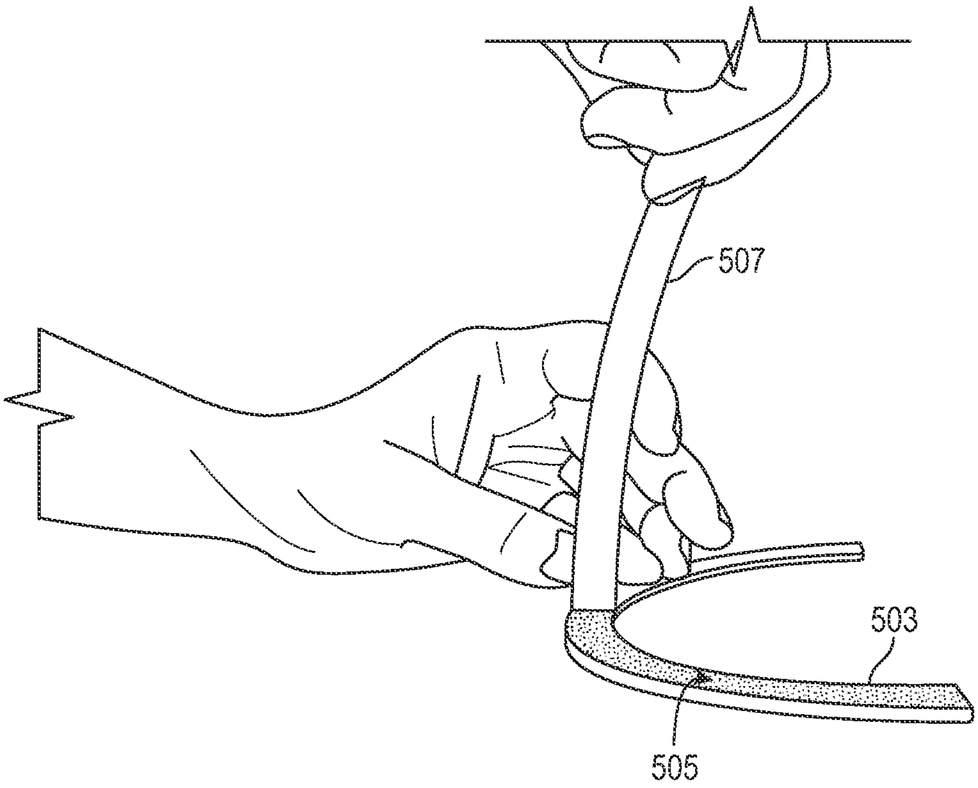
FIG. 5C shows a backing from an adhesive being removed from one side of the rigid-member, such that the rigid-member may be attached to a bottom side portion of the flexible-member to form the neck-gasket completed assembly, that is referred to as the "neck-gasket."

FIG. 5C shows a backing 507 from an adhesive 505 being removed from one side of rigid-member 503, such that rigid-member 503 may be attached to a bottom side portion of flexible-member 501. In some embodiments, neck-gasket 500 may comprise flexible-member 501, rigid-member 503, and adhesive 505. In some embodiments, neck-gasket 500 may comprise flexible-member 501, rigid-member 503, adhesive 505, and backing 507. In some embodiments, adhesive 505 may be an adhesive. In some embodiments, adhesive 505 may be configured for attaching a side of rigid-member 503 to a bottom side portion of flexible-member 501 to form neck-gasket 500.

Figure 5D:
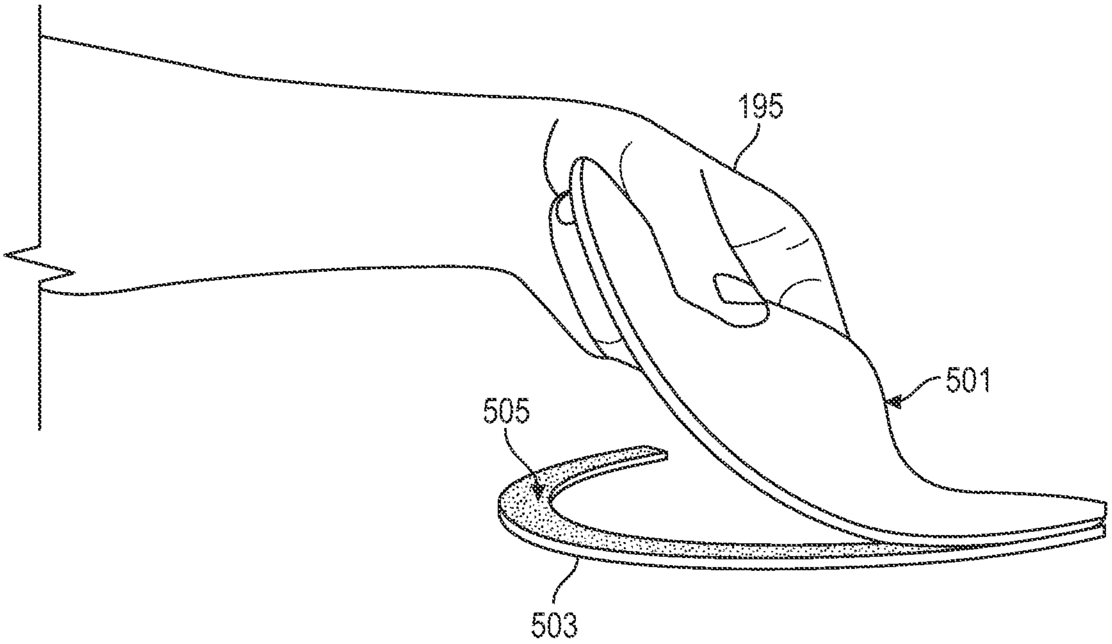
FIG. 5D shows a bottom side edge portion of the flexible-member being attached to a side of the rigid-member by using of the adhesive, wherein the adhesive is disposed between the bottom side edge portion of the flexible-member and the side of the rigid-member.

FIG. 5D shows a bottom side edge portion of flexible-member 501 being attached to a side of rigid-member 503 by using of adhesive 505, wherein adhesive 505 is disposed between the bottom side edge portion of flexible-member 501 and the side of rigid-member 503. In FIG. 5D this attachment process is shown as only being partially completed, i.e., in process.

Figure 5E:
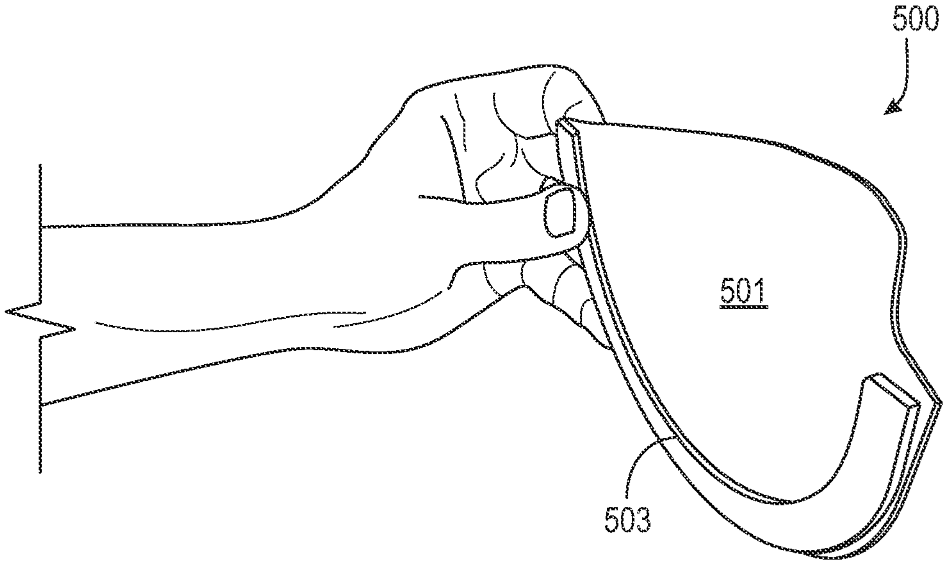
FIG. 5E shows the bottom side edge portion of the flexible-member having been fully (entirely) attached to the side of the rigid-member by use of the adhesive, wherein the adhesive is disposed between the bottom side edge portion of the flexible-member and the side of the rigid-member.
Figure 5F:
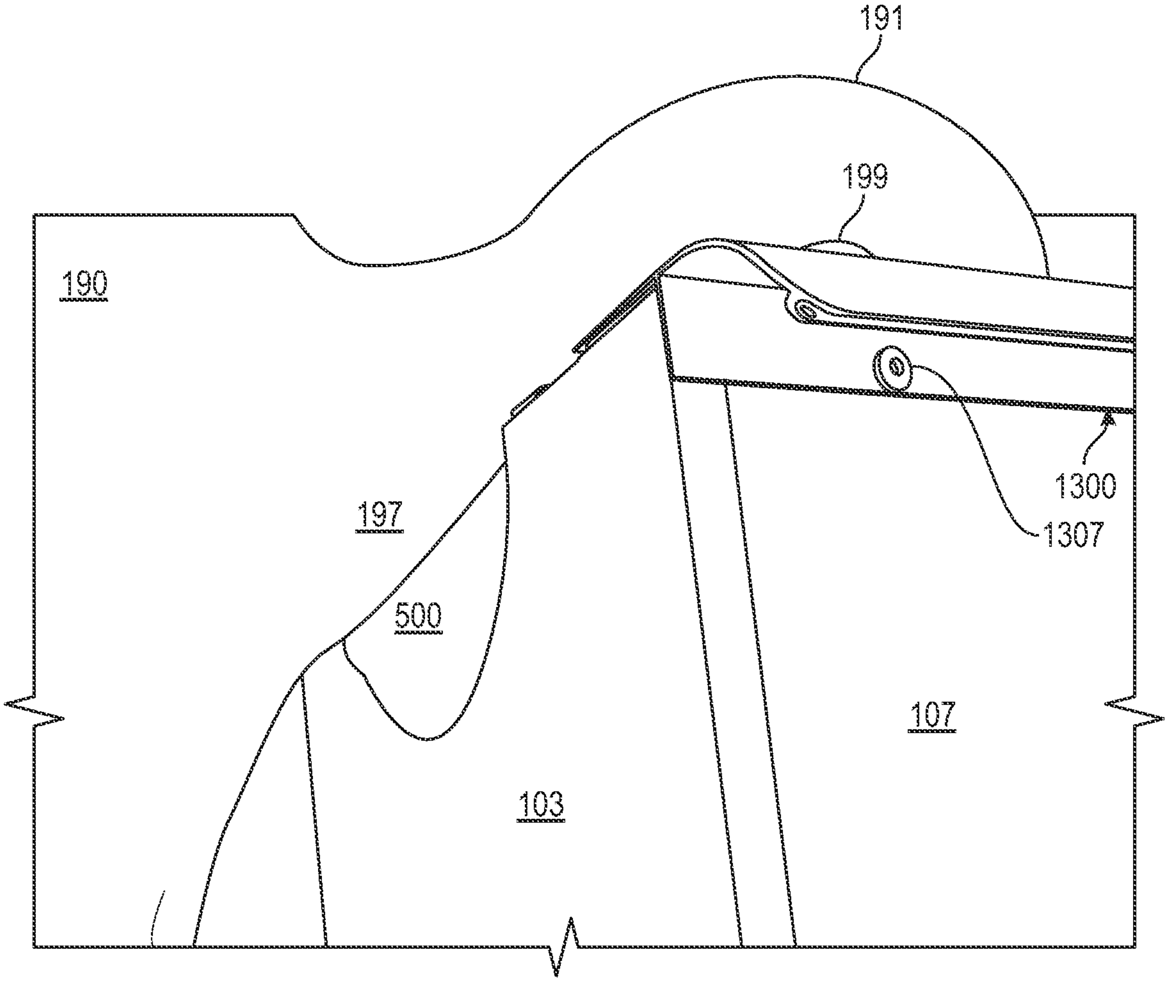
FIG. 5F is a bottom front and (right) side partial perspective view of the soaking-device of FIG. 1A, with a focus on showing how the neck-gasket interacts with a front of a body part of the user, such as a front of a neck of the user.

FIG. 5E shows the bottom side edge portion of flexible-member 501 having been fully (entirely) attached to the side of rigid-member 503 by use of adhesive 505, wherein adhesive 505 is disposed between the bottom side edge portion of flexible-member 501 and the side of rigid-member 503. In FIG. 5E this attachment process is shown in its completed state, such that fully assembled neck-gasket 500 is shown in FIG. 5E.

FIG. 5F is a bottom front and (right) side partial perspective view of soaking-device 100, with a focus on showing how neck-gasket 500 removably interacts with a body part of user 190, such as, a front of a neck of user 190. FIG. 5F is a different view of the situation of FIG. 1A, i.e., when user 190 has their face immersed within the vessel portion of soaking-device 100 (e.g., with the face of user 190 within the immersion-liquid 180), and the front of the neck of user 190 is in removable physical contact with side surface(s) of neck-gasket 500. In some embodiments, when the front of the neck of user 190 may be physically pressing up against side surface(s) of neck-gasket 500 and physically touching side surface(s) of neck-gasket 500, then there may be (secondary) watertight (waterproof) seal as between the front of the neck of user 190 and the side surface(s) of neck-gasket 500, wherein this may be deemed a "secondary" watertight (waterproof) seal in comparison to a "primary" watertight seal that may exist between neck-gasket 500 and neck-gasket-channel 201 of front-panel 103. In some embodiments, as soon the neck of user 190 is removed from neck-gasket 500, this secondary watertight seal may cease to exist; however, the immersion-liquid 180 will not leak out from the vessel portion of soaking-device 100 because when the face of the user 190 is removed from this vessel the immersion-liquid 180 level within the vessel naturally lowers a bit and is not sufficiently high to come over a top of neck-gasket 500 (nor over the top of this vessel).

Figure 6:
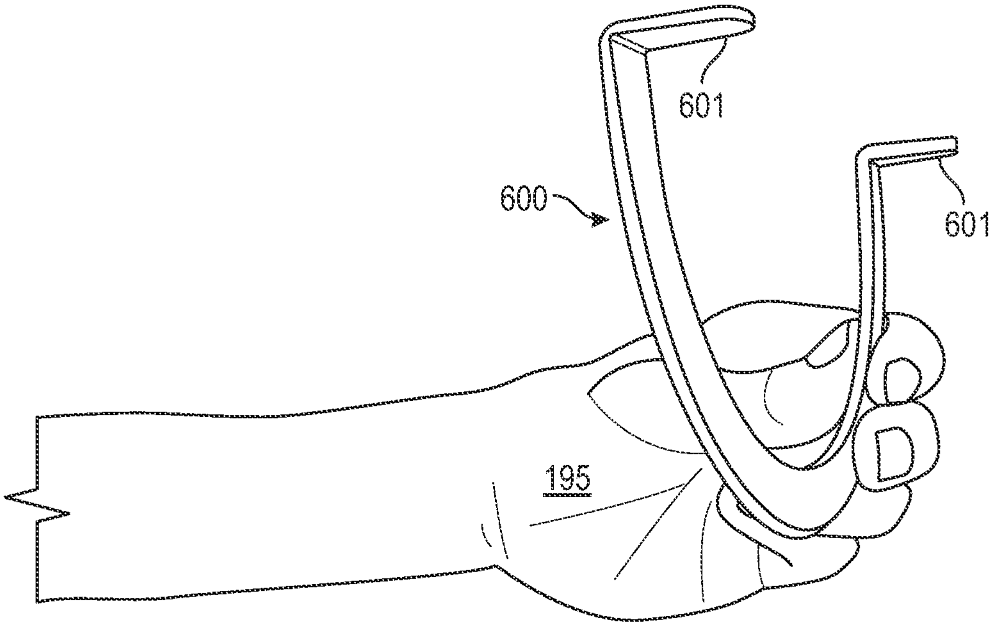
FIG. 6 is a perspective view of just the wedge component (part) shown by itself.

FIG. 6 is a perspective view of just wedge 600 shown by itself. In some embodiments, wedge 600 may be a rigid member. In some embodiments, wedge 600 may be made from one or more of: a metal, an alloy, a wood, a composite, a plastic, a reinforced plastic, a laminate, portions thereof, combinations thereof, and/or the like. In some embodiments, wedge 600 may be planar flat rigid member (except for its prongs 601) that has a shape that at least substantially (mostly) complementary matches a bottom edge shape of neck-gasket 500 and/or of neck-gasket-channel 201. For example, and without limiting the scope of the present invention, when the bottom edge portions of neck-gasket 500 may be have a substantially (mostly) U-shape or a half-arc of a circle shape, then wedge 600 (except for its prongs 601) may have a similarly sized and shape U-shape or have a shape that is of a similar shape and size to the half-arc of circle shape. In some embodiments, wedge 600 (except for its prongs 601) may be configured to fit at least mostly into neck-gasket-channel 201 and up against the bottom edge portions of neck-gasket 500 that are already within neck-gasket-channel 201. In some embodiments, wedge 600 (except for its prongs 601) may be shaped and/or sized to fit at least mostly into neck-gasket-channel 201 and up against the bottom edge portions of neck-gasket 500 that are already within neck-gasket-channel 201. In some embodiments, wedge 600 (except for its prongs 601) may be configured to function as a wedge to help push portions of neck-gasket 500 up against surfaces of neck-gasket-channel 201, to form the primary watertight (waterproof) seal.

Continuing discussing FIG. 6, in some embodiments, wedge 600 may have two terminal ends. In some embodiments, wedge 600 may comprise a prong 601 located at each of its terminal ends. In some embodiments, prongs 601 of wedge 600 may point at least substantially (mostly) orthogonally away from the flat planar surfaces of wedge 600. In some embodiments, prongs 601 of wedge 600 may be configured to aid in removal of wedge 600 from neck-gasket-channel 201. In some embodiments, wedge 600 may be removed from neck-gasket-channel 201 by squeezing opposing prongs 601 of wedge 600 towards each other and lifting (pulling) wedge 600 away from 201.

Figure 7:
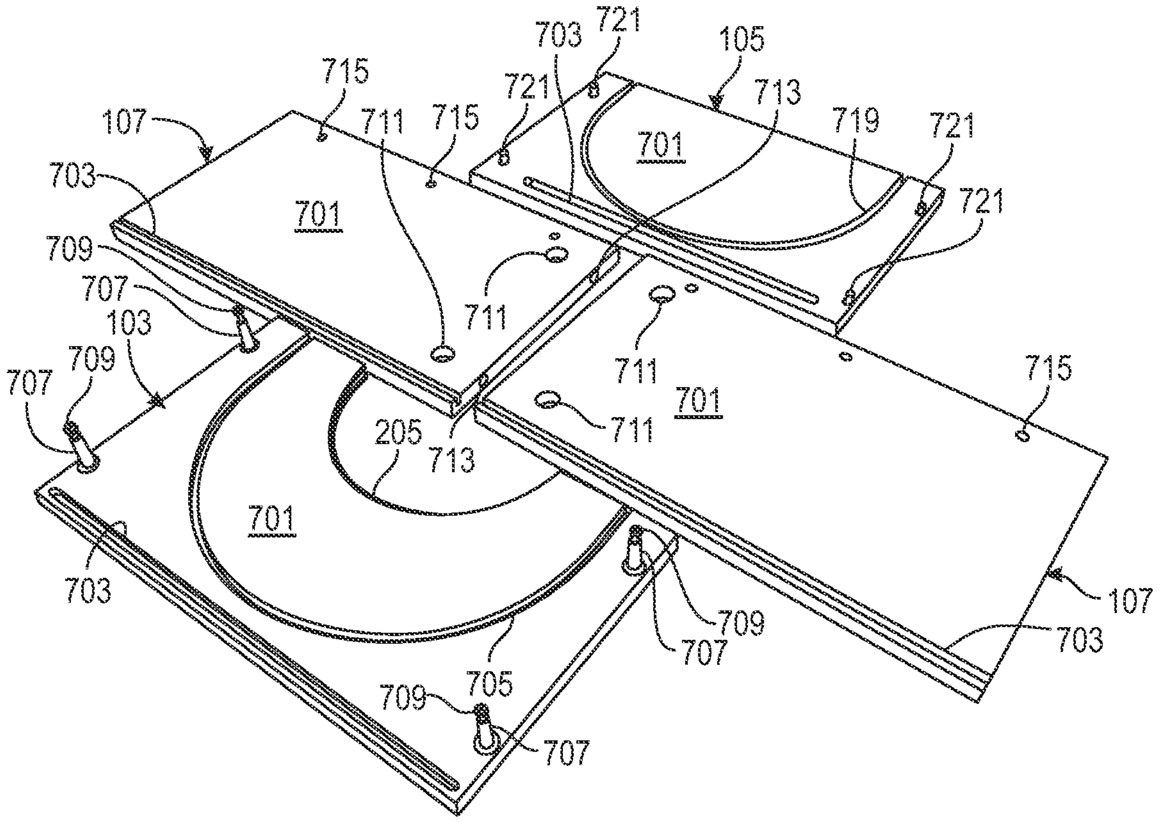
FIG. 7 is a perspective view showing all the panels of the soaking-device of FIG. 1A in a dissembled configuration.

FIG. 7 is a perspective view showing all the panels of soaking-device 100 in a dissembled configuration. FIG. 7 shows perspective views of the following panels of soaking-device 100: front-panel 103, rear-panel 105, (two) side-panels 107, and bottom-panel 113. FIG. 7 shows the internal (interior) facing surfaces of: front-panel 103, rear-panel 105, (two) side-panels 107, and bottom-panel 113. In FIG. 7, the external (exterior) facing surfaces of front-panel 103, rear-panel 105, (two) side-panels 107, and bottom-panel 113 are not shown as the front-panel 103, rear-panel 105, (two) side-panels 107, and bottom-panel 113 are all shown as laying on their respective external (exterior) facing surfaces. In some embodiments, front-panel 103, rear-panel 105, (two) side-panels 107, and/or bottom-panel 113 may be planar sheet polygon members of at least one predetermined thickness. In some embodiments, front-panel 103, rear-panel 105, (two) side-panels 107, and/or bottom-panel 113 may each have at least one predetermined thickness that may be fixed, finite, non-variable, the same, different, and/or variable. In some embodiments, front-panel 103, rear-panel 105, (two) side-panels 107, and/or bottom-panel 113 may be at least partially optically transparent, translucent, opaque, portions thereof, combinations thereof, and/or the like, with respect to human vision. In some embodiments, front-panel 103, rear-panel 105, (two) side-panels 107, and/or bottom-panel 113 may be formed, cut, and/or machined (e.g., CNC) from planar sheet stock material, such as, but not limited to, planar sheet material of at least one of: plastic, wood, laminates, metal, metal alloys, fiberglass, combinations thereof, portions thereof, and/or the like.

Continuing discussing FIG. 7, in some embodiments, the two side-panels 107 may be at least substantially (mostly) identical to each other in terms of size, shape, geometry, features, structures, portions thereof, combinations thereof, and/or the like. In some embodiments, the two side-panels 107 may be identical to each other in terms of size, shape, geometry, features, structures, portions thereof, combinations thereof, and/or the like. In some embodiments, the two side-panels 107 may be mirror images of each other. In some embodiments, one side-panel 107 may be a right side and the other remaining side-panel 107 may be a left side.

Continuing discussing FIG. 7, in some embodiments, front-panel 103 and rear-panel 105 may form the front and the rear boundary portions of the vessel portion of soaking-device 100 that is configured to removably hold immersion-liquid 180; and as such, at least some of the internal (interior) facing surfaces 701 of front-panel 103 and of rear-panel 105 may be intended and configured to come into direct physical contact with immersion-liquid 180; whereas, (two) side-panels 107 and bottom-panel 113 are not direct components of the vessel portion of soaking-device 100. In some embodiments, the internal (interior) facing surfaces 701 of (two) side-panels 107 and bottom-panel 113 are not intended nor configured to come into direct physical contact with immersion-liquid 180, except for incidental contact (e.g., from splash or the like).

Continuing discussing FIG. 7, in some embodiments, one or more of: front-panel 103, rear-panel 105, and/or (two) side-panels 107 may comprise at least one slot 703. In some embodiments, each of front-panel 103, rear-panel 105, and/or (two) side-panels 107 may comprise at least one slot 703. In some embodiments, slot 703 may be a (single) slot that runs from end to end near (proximate to and/or adjacent to) a bottom edge of one or more of: front-panel 103, rear-panel 105, and/or (two) side-panels 107; wherein, near, proximate to and/or adjacent to in this context may be ¼ (0.25) inch or less from the bottom edge. In some embodiments, slot 703 may be a (single) slot that runs from end to end near (proximate to and/or adjacent to) a bottom edge of each of: front-panel 103, rear-panel 105, and/or (two) side-panels 107; wherein, near, proximate to and/or adjacent to in this context may be ¼ (0.25) inch or less from the bottom edge. In some embodiments, slot 703 may run in a straight linear fashion. In some embodiments, a given slot 703 of a given panel of soaking-device 100 may be configured to capture and/or trap a perimeter edge of bottom-panel 113 within the given slot 703.

Continuing discussing FIG. 7, in some embodiments, the internal (interior) facing surface 701 of front-panel 103 may comprise a channel 705. In some embodiments, channel 705 may be located on the internal (interior) facing surface 701 of front-panel 103. In some embodiments, channel 705 may be located above slot 703 on the internal (interior) facing surface 701 of front-panel 103. In some embodiments, channel 705 may begin at top 203 of front-panel 103. In some embodiments, channel 705 may be configured to receive an end-gasket 1200. In some embodiments, a shape and/or a size of channel 705 may be configured to at least substantially (mostly) complementary match a shape and/or a size with respect to a transverse width cross-section through floor-and-sidewalls 101 (not including top-ledge 1105 portions of floor-and-sidewalls 101). In some embodiments, each opposing terminal end 1107 of floor-and-sidewalls 101 (not including top-ledge 1105 portions of floor-and-sidewalls 101) may be configured to fit into a receiving-channel 1201 of a given end-gasket 1200 (see e.g., FIG. 12A to FIG. 12D). In some embodiments, once at least one of the terminal ends 1107 of floor-and-sidewalls 101 (not including top-ledge 1105 portions of floor-and-sidewalls 101) has been fitted into an end-gasket 1200, then that combination of end-gasket 1200 attached to that terminal end 1107 of floor-and-sidewalls 101 (not including top-ledge 1105 portions of floor-and-sidewalls 101) may be fitted into channel 705 on the internal (interior) facing surface 701 of front-panel 103, resulting in a watertight (waterproof) seal between floor-and-sidewalls 101 (not including top-ledge 1105 portions of floor-and-sidewalls 101) and the internal (interior) facing surface 701 of front-panel 103 (see e.g., FIG. 16F).

Continuing discussing FIG. 7, in some embodiments, the internal (interior) facing surface 701 of front-panel 103 may comprise at least two cam-posts 707. In some embodiments, the internal (interior) facing surface 701 of front-panel 103 may comprise at least four cam-posts 707. In some embodiments, proximate to a left side and to a right side of the internal (interior) facing surface 701 of front-panel 103 may be at least one cam-post 707; such that, the right side has at least one cam-post 707 and the left-side has at least one cam-post 707; wherein, proximate in this context may be ¼ (0.25) inch or less. In some embodiments, proximate to a left side and to a right side of the internal (interior) facing surface 701 of front-panel 103 may be at least two cam-posts 707; such that, the right side has at least two cam-posts 707 and the left-side has at least two cam-posts 707; wherein, proximate in this context may be ¼ (0.25) inch or less. In some embodiments, any cam-posts 707 located on the internal (interior) facing surface 701 of front-panel 103 may be located (disposed) between slot 703 and top 203 of front-panel 103. In some embodiments, when soaking-device 100 may be in its assembled configuration (see e.g., FIG. 1B), cam-posts 707 may extend and/or point towards rear-panel 105. In some embodiments, when soaking-device 100 may be in its assembled configuration (see e.g., FIG. 1B), the portions of the cam-posts 707 that are not directly attached to the internal (interior) facing surface 701 of front-panel 103 may be at least partially embedded within the thickness of the two side-panels 107 and thus not visible. In some embodiments, each cam-post 707 may comprise a cam-terminal-end 709 that is configured to be physically engaged by a complementary mating cam-nut 1600 embedded within a thickness of the side-panels 107 and partially visible from the internal (interior) facing surface 701 of the side-panels 107. See e.g., FIG. 16C for cam-nuts 1600. In some embodiments, the cam-posts 707 of the internal (interior) facing surface 701 of front-panel 103 and the cam-nuts 1600 of side-panels 107 may be how front-panel 103 is attached to side-panels 107. In some embodiments, front-panel 103 may be attached to both side-panels 107 when soaking-device 100 is in its assembled configuration (see e.g., FIG. 1B).

Continuing discussing FIG. 7, in some embodiments, a given side-panel 107 may comprise at least one cam-pocket 711. In some embodiments, a cam-pocket 711 may be configured to receive and house a cam-nut 1600 (see e.g., FIG. 16C for cam-nuts 1600). In some embodiments, a cam-pocket 711 may be a region devoid of material, i.e., a pocket located within a given side-panel 107. In some embodiments, at least one opening to a given cam-pocket 711 may be on the internal (interior) facing surface 701 of a given side-panel 107; wherein this at least one opening may be how a given cam-nut 1600 is inserted into its given cam-pocket 711. In some embodiments, a given side-panel 107 may comprise two (or more) cam-pockets 711. In some embodiments, each side-panel 107 may comprise a quantity of cam-pockets 711; wherein the quantity of cam-pockets 711 for that given side-panel 107 is equal to the quantity of cam-posts 707 on one side of the internal (interior) facing surface 701 of front-panel 103. For example, and without limiting the scope of the present invention, if one side of the internal (interior) surface 701 of front-panel 103 has only one cam-post 707, then a given side-panel 107 may have only one cam-pocket 711. For example, and without limiting the scope of the present invention, if one side of the internal (interior) surface 701 of front-panel 103 has two cam-posts 707, then a given side-panel 107 may have two cam-pockets 711.

Continuing discussing FIG. 7, in some embodiments, a given side-panel 107 may comprise at least one bore 713. In some embodiments, a given bore 713 may be a continuous hole of void space, that may be cylindrical in shape, that runs from a given cam-pocket 711 linearly straight and directly to a closest side (not including a bottom or top) of that given side-panel 107. In some embodiments, bore 713 may be configured to receive an elongate portion of a given cam-post 707.

Continuing discussing FIG. 7, in some embodiments, a given side-panel 107 may comprise at least one aperture 715. In some embodiments, a given side-panel 107 may comprise from one to a dozen (12) apertures 715. In some embodiments, a given side-panel 107 may comprise two to five apertures 715. In some embodiments, a given aperture 715 of a given side-panel 107 may be a hole of void space running linearly straight and entirely through a thickness of that given side-panel 107, from the internal (interior) surface 701 to the external (exterior) surface of that given side-panel 107. In some embodiments, aperture(s) 715 may be located closer to a top of its given side-panel 107 than to a bottom of its given side-panel 107. In some embodiments, aperture(s) 715 may be located closer to a top of its given side-panel 107 than to slot 703 its given side-panel 107. In some embodiments, aperture(s) 715 may be located within ¾ (0.75) inches or less to the top of its given side-panel 107. In some embodiments, aperture(s) 715 may be used for securing (attaching) a given handle 1300 to a given side-panel 107. In some embodiments, a given aperture 715 may be configured to receive a threaded-insert 917 and/or a fastener 1307 (see e.g., FIG. 9A for threaded-insert 917).

Continuing discussing FIG. 7, in some embodiments, the internal (interior) facing surface 701 of rear-panel 105 may comprise a channel 719. In some embodiments, channel 719 may be located on the internal (interior) facing surface 701 of rear-panel 105. In some embodiments, channel 719 may be located above slot 703 on the internal (interior) facing surface 701 of rear-panel 105. In some embodiments, channel 719 may begin at a top of rear-panel 105. In some embodiments, channel 719 may be configured to receive an end-gasket 1200. In some embodiments, a shape and/or a size of channel 719 may be configured to at least substantially (mostly) complementary match a shape and/or a size with respect to the transverse width cross-section through floor-and-sidewalls 101 (not including top-ledge 1105 portions of floor-and-sidewalls 101). In some embodiments, each opposing terminal end 1107 of floor-and-sidewalls 101 (not including top-ledge 1105 portions of floor-and-sidewalls 101) may be configured to fit into a receiving-channel 1201 of a given end-gasket 1200 (see e.g., FIG. 12A to FIG. 12D). In some embodiments, once at least one of the terminal ends 1107 of floor-and-sidewalls 101 (not including top-ledge 1105 portions of floor-and-sidewalls 101) has been fitted into an end-gasket 1200, then that combination of end-gasket 1200 attached to that terminal end 1107 of floor-and-sidewalls 101 (not including top-ledge 1105 portions of floor-and-sidewalls 101) may be fitted into channel 719 on the internal (interior) facing surface 701 of rear-panel 105, resulting in a watertight (waterproof) seal between floor-and-sidewalls 101 (not including top-ledge 1105 portions of floor-and-sidewalls 101) and the internal (interior) facing surface 701 of rear-panel 105 (see e.g., FIG. 16H and FIG. 16I).

Continuing discussing FIG. 7, in some embodiments, when the transverse width cross-section through floor-and-sidewalls 101 (not including top-ledge 1105 portions of floor-and-sidewalls 101) is uniform throughout its length, then channel 719 and channel 705 may at least substantially (mostly) share a same shape and/or a same size with respect to each other and with respect to the size and shape of that transverse width cross-section through floor-and-sidewalls 101 (not including top-ledge 1105 portions of floor-and-sidewalls 101). In some embodiments, when the transverse width cross-section through floor-and-sidewalls 101 (not including top-ledge 1105 portions of floor-and-sidewalls 101) is the same at both of its terminal ends 1107, then channel 719 and channel 705 may at least substantially (mostly) share a same shape and/or a same size with respect to each other and with respect to the size and shape of that transverse width cross-section through floor-and-sidewalls 101 (not including top-ledge 1105 portions of floor-and-sidewalls 101) at its terminal ends 1107.

Continuing discussing FIG. 7, in some embodiments, rear-panel 105 may comprise at least one aperture 721. In some embodiments, rear-panel 105 may comprise from one to a dozen (12) apertures 721. In some embodiments, rear-panel 105 may comprise two to five apertures 721. In some embodiments, rear-panel 105 may comprise at least two apertures 721. In some embodiments, rear-panel 105 may comprise at least four apertures 721. In some embodiments, proximate to a left side and to a right side of rear-panel 105 may be at least one aperture 721; such that, the right side has at least one aperture 721 and the left-side has at least one aperture 721; wherein, proximate in this context may be ¼ (0.25) inch or less. In some embodiments, proximate to a left side and to a right side of rear-panel 105 may be at least two apertures 721; such that, the right side has at least two apertures 721 and the left-side has at least two apertures 721; wherein, proximate in this context may be ¼ (0.25) inch or less. In some embodiments, any aperture 721 located on rear-panel 105 may be located (disposed) between slot 703 and a top of rear-panel 105. In some embodiments, a given aperture 721 of rear-panel 105 may be a hole of void space running linearly straight and entirely through a thickness of rear-panel 105, from the internal (interior) surface 701 to the external (exterior) surface of rear-panel 105. In some embodiments, aperture(s) 721 may be located closer to a side than to a top, a bottom, or slot 703 of rear-panel 105. In some embodiments, aperture(s) 721 may be located within ¾ (0.75) inches or less to a closest side of rear-panel 105. In some embodiments, aperture(s) 721 may be used for securing (attaching) rear-panel 105 to the two side-panels 107. In some embodiments, a given aperture 721 may be configured to receive a threaded-insert or a fastener 109.

Figure 8A:
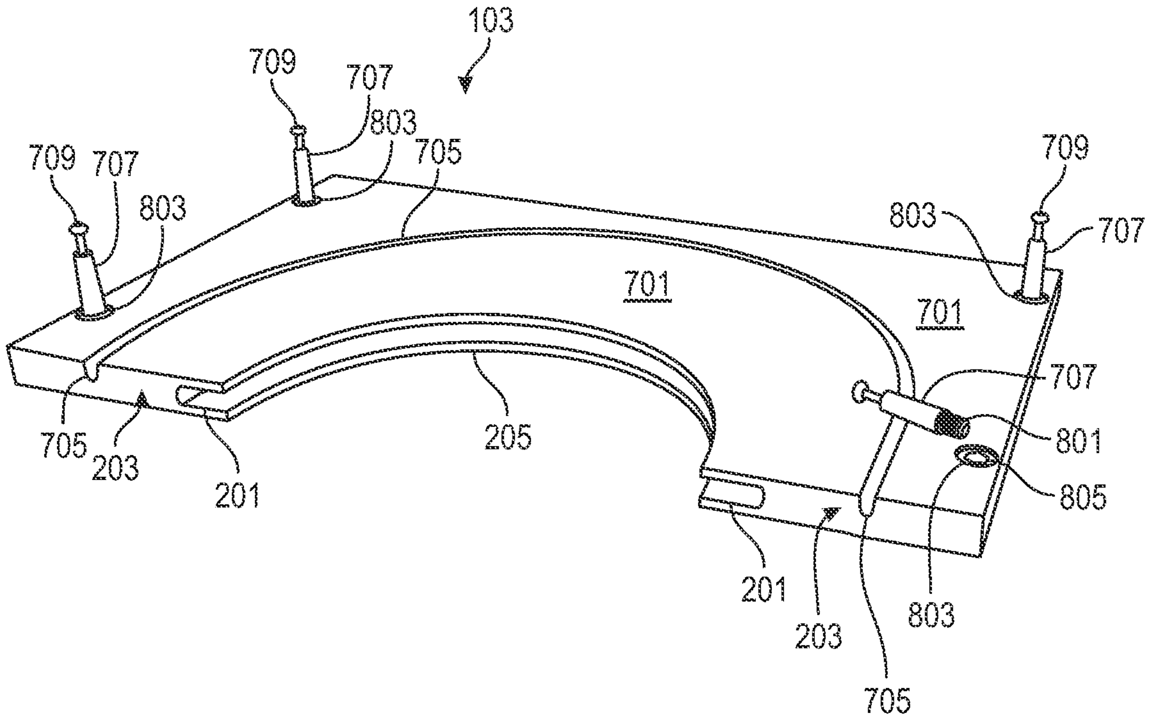
FIG. 8A is top internal (interior) perspective view of just the front-panel of the soaking-device of FIG. 1A.

FIG. 8A is top 203 internal (interior) 701 perspective view of just front-panel 103. Top 203 and internal (interior) facing surface 701 of front-panel 103 are shown in FIG. 8A. The cutout region front-panel 103 and neck-gasket-channel 201 of front-panel 103 are also at least partially visible in FIG. 8A; as well as, channel 705. Additionally, FIG. 8A shows a number of cam-posts 707 of front-panel 103. Note, one such cam-post 707 is shown in FIG. 8A detached from front-panel 103 to illustrate how terminal end 801 of a given cam-post 707 may be attached to front-panel 103. In some embodiments, terminal end 801 may be disposed opposite from cam-terminal-end 709. In some embodiments, cam-post 707 may comprise two oppositely disposed terminal ends, namely, cam-terminal-end 709 and terminal end 801. In some embodiments, cam-terminal-end 709 may be configured for physical engagement with a given cam-nut 1600. In some embodiments, terminal end 801 may be configured for attachment to front-panel 103. In some embodiments, terminal end 801 of a given cam-post 707 may be attached to an aperture 803 of front-panel 103. In some embodiments, a given aperture 803 of front-panel 103 may be a partial (non-through) hole of void space running linearly straight and not entirely through a thickness of front-panel 103, from the internal (interior) surface 701 but not extending to the external (exterior) surface of front-panel 103. In some embodiments, aperture 803 does not extend all the way through the thickness of front-panel 103. In some embodiments, aperture 803 may not be visible from the external (exterior) surface of front-panel 103. In some embodiments, front-panel may comprise at least one aperture 803. In some embodiments, a quantity of apertures 803 in front-panel 103 may match the quantity of cam-posts 707 in that same front-panel 103. In some embodiments, the quantity of cam-posts 707 in front-panel 103 may match the quantity of apertures 803 in that same front-panel 103. In some embodiments, an opening to aperture 803 may be located on the internal (interior) surface 701 of front-panel 103. In some embodiments, aperture 803 may be configured to receive, hold, and house a threaded-insert 805. In some embodiments, threaded-insert 805 may be a threaded insert. In some embodiments, each threaded-insert 805 may comprise an internal female threaded portion configured to receive a complementary male threaded fastener portion. In some embodiments, a given thread-insert 805 may be configured to frictionally fit within a given aperture 803. In some embodiments, front-panel 103 may comprise a quantity of thread-insert(s) 805 that matches a quantity of aperture(s) 803 of that front-panel 103. In some embodiments, the female thread portions of threaded-insert(s) 805 may be used for securing (attaching) a given terminal end 801 of a given cam-post 707 to the internal (interior) surface 701 of front-panel 103.

Figure 8B:
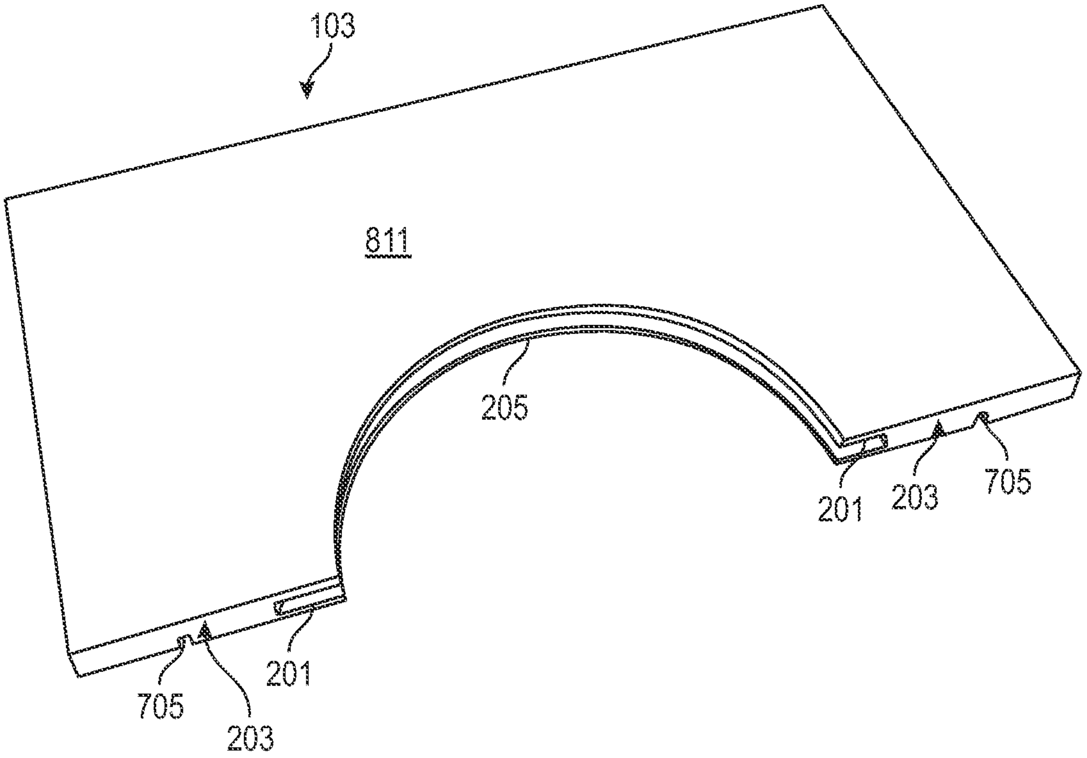
FIG. 8B is top external (exterior) surface perspective view of just the front-panel of the soaking-device of FIG. 1A.

FIG. 8B is top 203 external (exterior) surface 811 perspective view of just front-panel 103. Top 203 and external (exterior) surface 811 of front-panel 103 are shown in FIG. 8B. The cutout region front-panel 103 and neck-gasket-channel 201 of front-panel 103 are also at least partially visible in FIG. 8B. The two opposed openings to channel 705 on top 203 of front-panel 103 are also visible in FIG. 8B. In some embodiments, external (exterior) surface 811 of front-panel 103 may be free from visible holes, apertures, pockets, fasteners, portions thereof, combinations thereof, and/or the like.

Figure 9A:
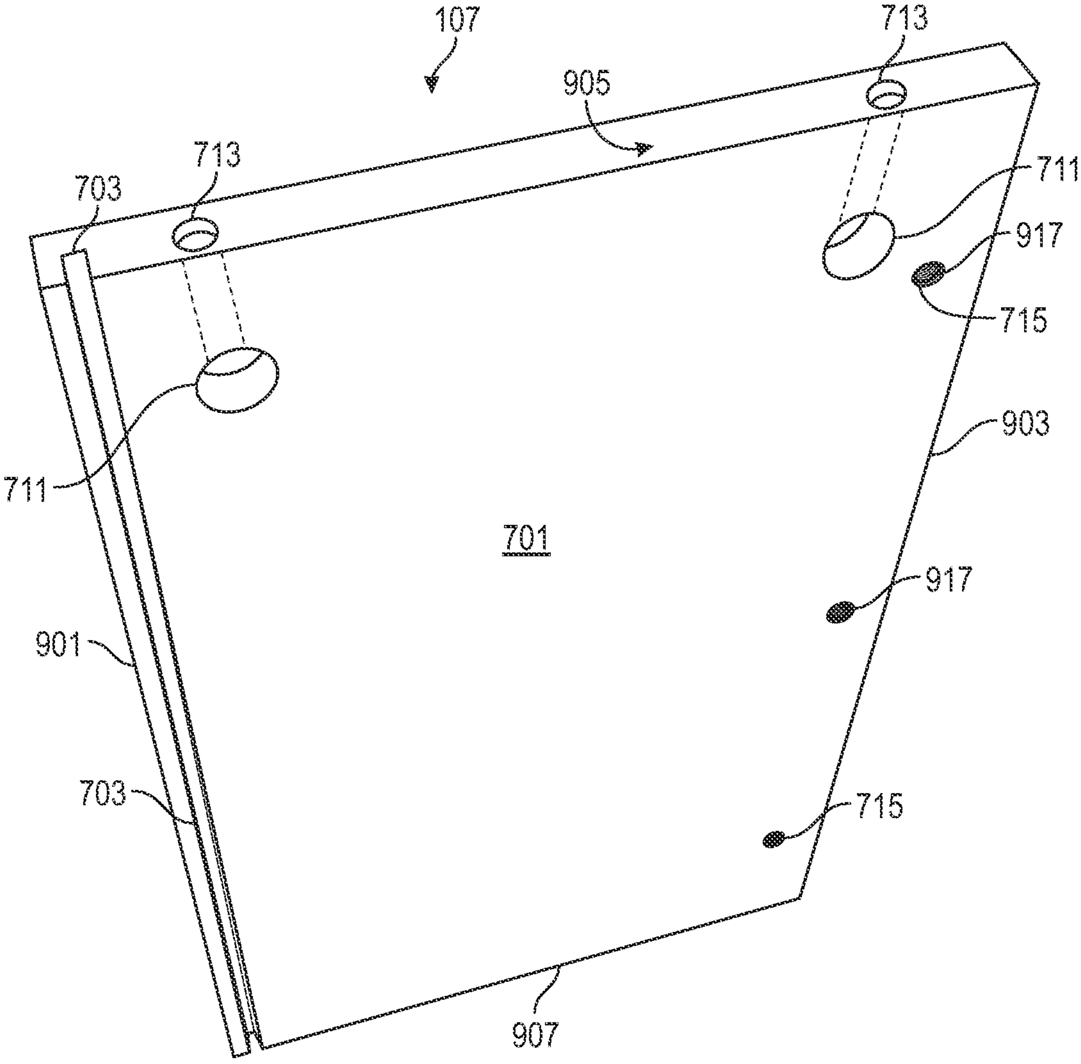
FIG. 9A is a front internal (interior) perspective view of just a (left) side-panel of the soaking-device of FIG. 1A.

FIG. 9A is a front internal (interior) 701 perspective view of just a (left) side-panel 107. The following structures and/or components of the internal (interior) surface 701 of (the left) side-panel 107 may be shown in FIG. 9A: slot 703, cam-pockets 711, bore 713, apertures 715, and/or threaded-inserts 917. See also FIG. 7 and its above discussion for structures and/or components of the internal (interior) surface 701 of (the left) side-panel 107. In some embodiments, slot 703 may run linearly straight and unobstructed, and proximate to (next to and/or adjacent to) a bottom 901, of side-panel 107 from a front-end 905 to a rear-end 907 of that side-panel 107. In some embodiments, bottom 901 of side-panel 107 may coincide with an overall bottom of soaking-device 100 when soaking-device 100 is in its assembled configuration as shown in FIG. 1J. In some embodiments, front-end 905 and rear-end 907 may be disposed opposite from each other, separated from each other by a length of side-panel 107. In some embodiments, front-end 905 and rear-end 907 of side-panel 107 may have edges and/or sides that run at least substantially (mostly) parallel with each other. In some embodiments, front-end 905 and rear-end 907 of side-panel 107 may be at least substantially (mostly) parallel with each other. In some embodiments, front-end 905 of side-panel 107 may butt up against the internal (interior) surface 701 of front-panel 103 when soaking-device 100 is in its assembled configuration as shown in FIG. 1B. In some embodiments, rear-end 907 of side-panel 107 may butt up against the internal (interior) surface 701 of rear-panel 105 when soaking-device 100 is in its assembled configuration as shown in FIG. 1B. In some embodiments, cam-pocket(s) 711 may be located closer to front-end 905 than to rear-end 907 of side-panel 107. In some embodiments, a given bore 713 may run from front-end 905 to a given cam-pocket 711. In some embodiments, an entry opening to a given bore 713 may be located on front-end 905. In some embodiments, apertures 715 of side-panel 107 may be arranged such that an imaginary linear line runs through at least three such apertures 715. In some embodiments, aperture(s) 715 may be located closer to a top 903 of side-panel 107 than to bottom 901 of that same side-panel 107. In some embodiments, bottom 901 and top 903 may be disposed opposite from each other and separated from each other by a height of side-panel 107. In some embodiments, bottom 901 and top 903 of side-panel 107 may have edges and/or sides that run at least substantially (mostly) parallel with each other. In some embodiments, bottom 901 and top 903 of side-panel 107 may be at least substantially (mostly) parallel with each other.

Continuing discussing FIG. 9A, in some embodiments, a given side-panel 107 may comprise at least one threaded-insert 917. In some embodiments, threaded-insert 917 may be a threaded insert. In some embodiments, each threaded-insert 917 may comprise an internal female threaded portion configured to receive a complementary male threaded fastener portion. In some embodiments, a given thread-insert 917 may be configured to frictionally fit within a given aperture 715. In some embodiments, a given side-panel 107 may comprise a quantity of thread-insert(s) 917 that matches a quantity of aperture(s) 715 of that given side-panel 107. In some embodiments, the female thread portions of threaded-insert(s) 917 may be used for securing (attaching) a given handle 1300 to its given side-panel 107. In some embodiments, a given female thread portions of a given threaded-insert 917 may be configured to receive fastener 1307.

Figure 9B:
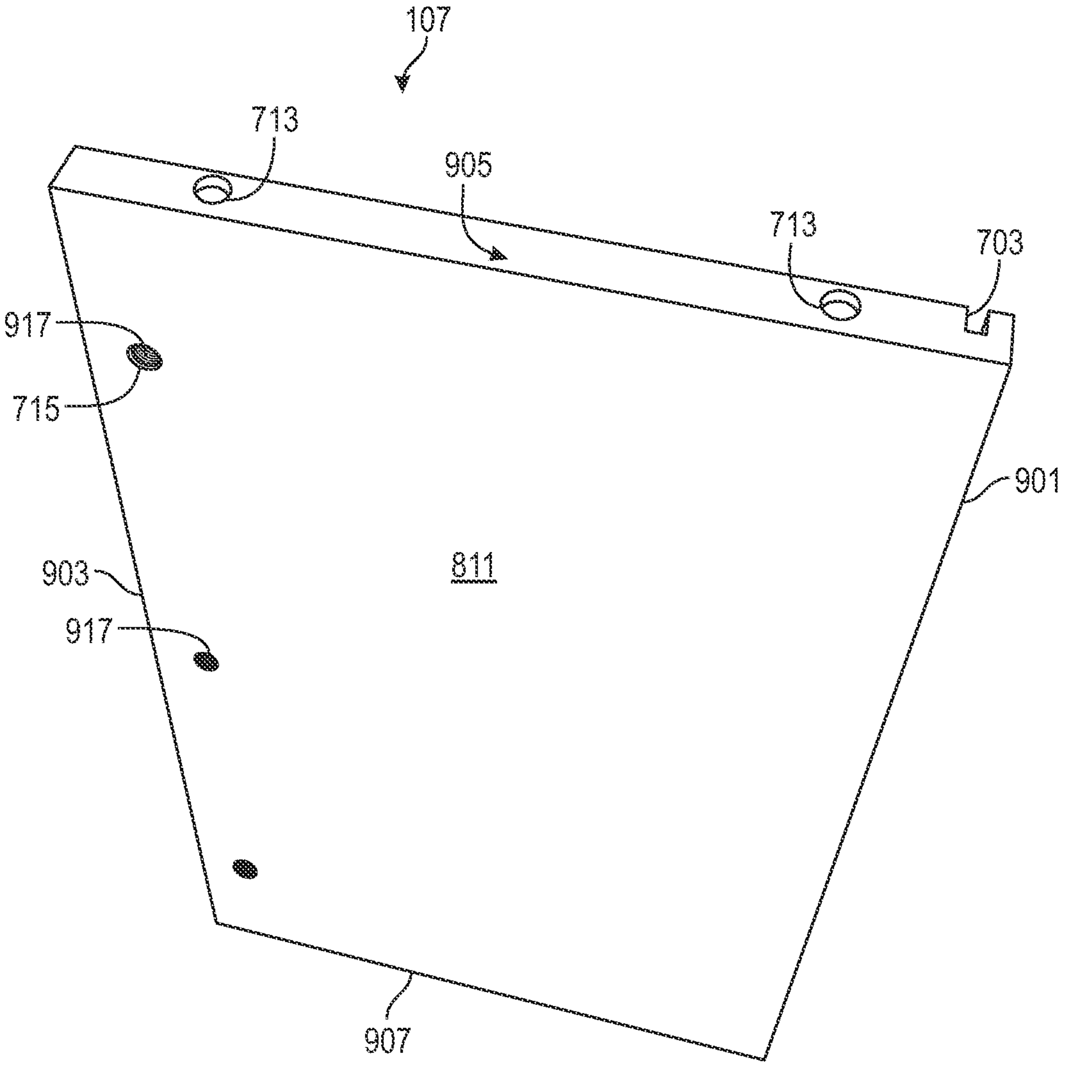
FIG. 9B is a front external (exterior) perspective view of just a (left) side-panel of the soaking-device of FIG. 1A.

FIG. 9B is a front external (exterior) 811 perspective view of just a (left) side-panel 107. Apertures 715 may be visible on the external (exterior) surface 811 of side-panel 107 in FIG. 9B. These apertures 715 shown in FIG. 9B may be the same apertures 715 visible in FIG. 9A. At least portions of two bores 713 extending into the thickness of side-panel 107 may be visible from front-end 905 shown in FIG. 9B. Entry openings to bores 713 on front-end 905 of side-panel may be shown in FIG. 9B. Additionally, an opening to slot 703 of side-panel 107 may be visible on front-end 905 of side-panel 107 and shown in FIG. 9B. In some embodiments, slot 703 of side-panel 107 may be entirely absent on the external (exterior) surface 811 of that side-panel 107.

Figure 10A:
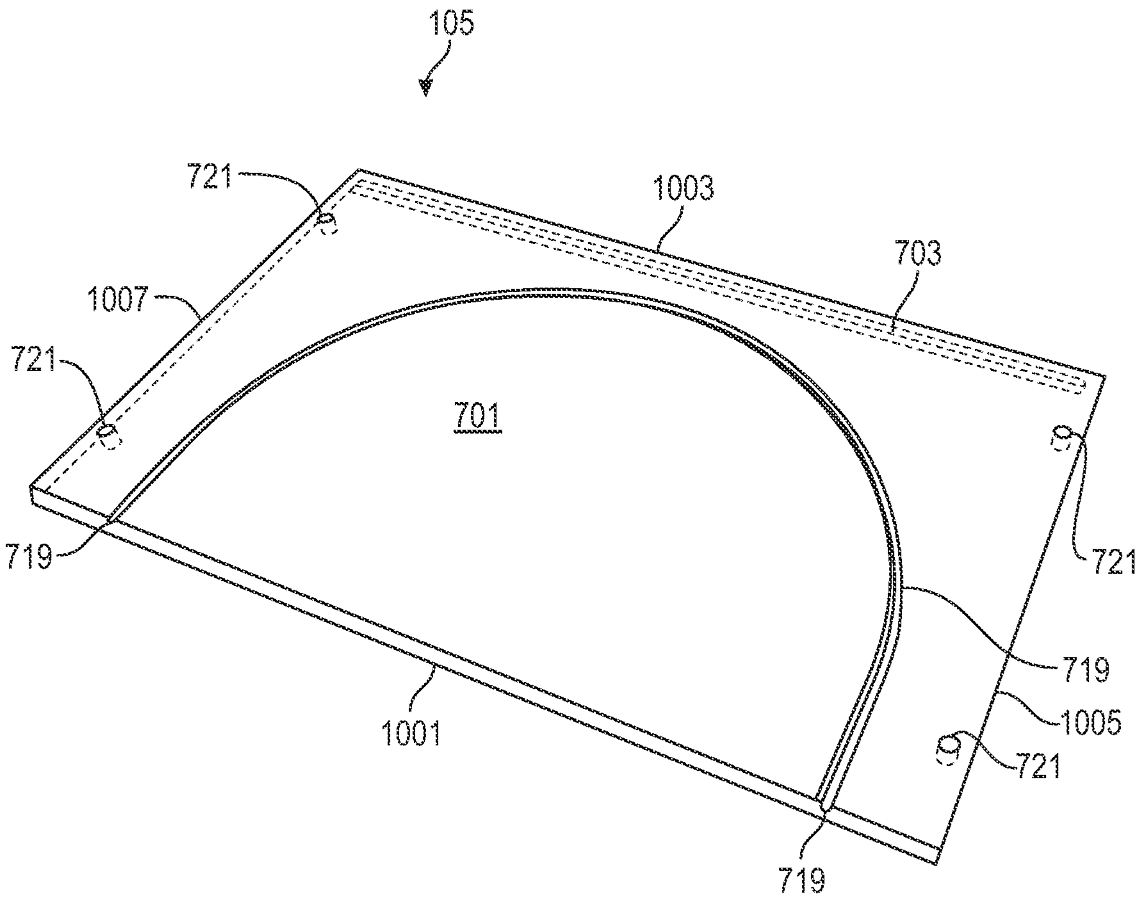
FIG. 10A is a top internal (interior) perspective view of just rear-panel of the soaking-device of FIG. 1A.

FIG. 10A is a top 1001 internal (interior) 701 perspective view of just rear-panel 105. In some embodiments, rear-panel 105 may comprise a top side 1001, a bottom side 1003, a left side 1005, and a right side 1007, wherein top side 1001, bottom side 1003, left side 1005, and right side 1007 define a continuous polygonal perimeter (boundary) to rear-panel 105, when rear-panel 105 is viewed from above or below and a major planar surface of rear-panel 105 may be lying flat upon a surface. In some embodiments, top side 1001 may be disposed opposite from bottom side 1003. In some embodiments, top side 1001 may be separated from bottom side 1003 by a height of rear-panel 105. In some embodiments, top side 1001 and bottom side 1003 may be at least substantially parallel to each other. In some embodiments, left side 1005 may be disposed opposite from right side 1007. In some embodiments, left side 1005 may be separated from right side 1007 by a width of rear-panel 105. In some embodiments, left side 1005 and right side 1007 may be at least substantially parallel to each other. Top side 1001 and internal (interior) facing surface 701 of rear-panel 105 are shown in FIG. 10A. The channel 719 of rear-panel 105 is shown in FIG. 10A. In some embodiments, slot 703 of rear-panel 105 may be located on internal (interior) surface 701 of rear-panel 105. In some embodiments, slot 703 may be located closer to bottom side 1003 than to top side 1001. In some embodiments, slot 703 of rear-panel 105 may run in a linear straight and unobstructed manner. In some embodiments, slot 703 of rear-panel 105 may run from left side 1005 to right side 1007; however, in some embodiments, slot 703 of rear-panel 105 may not reach all the way to left side 1005 nor to right side 1007. Additionally, FIG. 10A shows a number of apertures 721 of rear-panel 105. In some embodiments, apertures 721 may be grouped next to left side 1005 and next to right side 1007. In some embodiments, an aperture 721 grouped next to left side 1005 may be located closer to left side 1005 than to top side 1001. In some embodiments, an aperture 721 grouped next to left side 1005 may be located closer to left side 1005 than to bottom side 1003. In some embodiments, an aperture 721 grouped next to right side 1007 may be located closer to right side 1007 than to top side 1001. In some embodiments, an aperture 721 grouped next to right side 1007 may be located closer to right side 1007 than to bottom side 1003. In some embodiments, a given aperture 721 may be configured to receive a threaded-insert and/or a fastener 109.

Figure 10B:
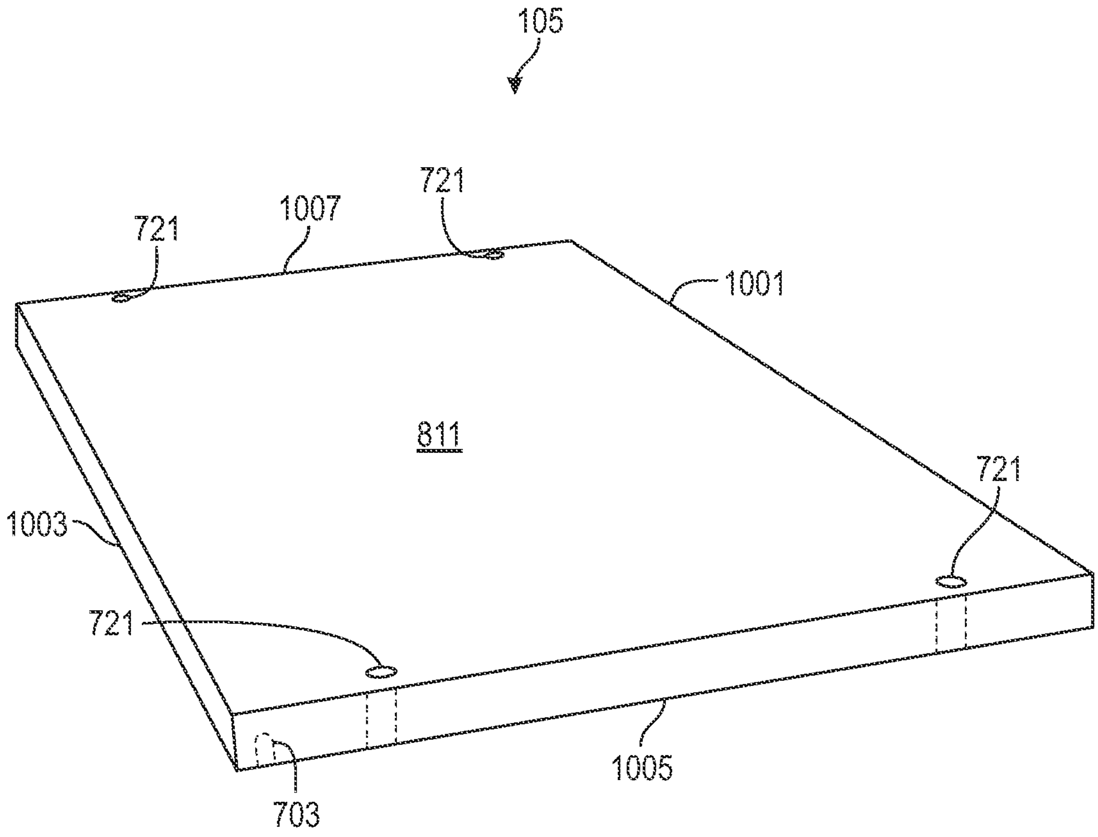
FIG. 10B is a bottom left internal (interior) perspective view of just rear-panel of the soaking-device of FIG. 1A.

FIG. 10B is a bottom 1003 left 1005 external (exterior) 811 perspective view of just rear-panel 105. FIG. 10B shows bottom side 1003, left side 1005, and the external (exterior) surface 811 of rear-panel 105. The same apertures 721 shown in FIG. 10A may also be visible in FIG. 10B.

Figure 11A:
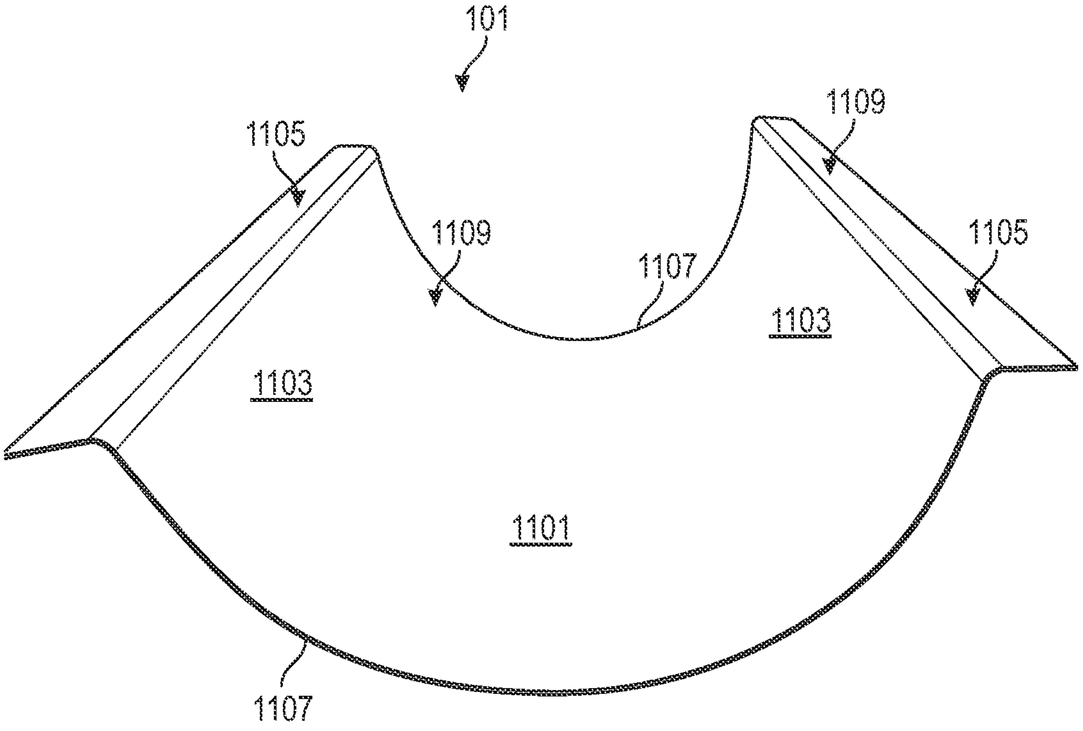
FIG. 11A shows just the floor-and-sidewalls member (of the soaking-device of FIG. 1A) by itself, from a top perspective view.
Figure 11B:
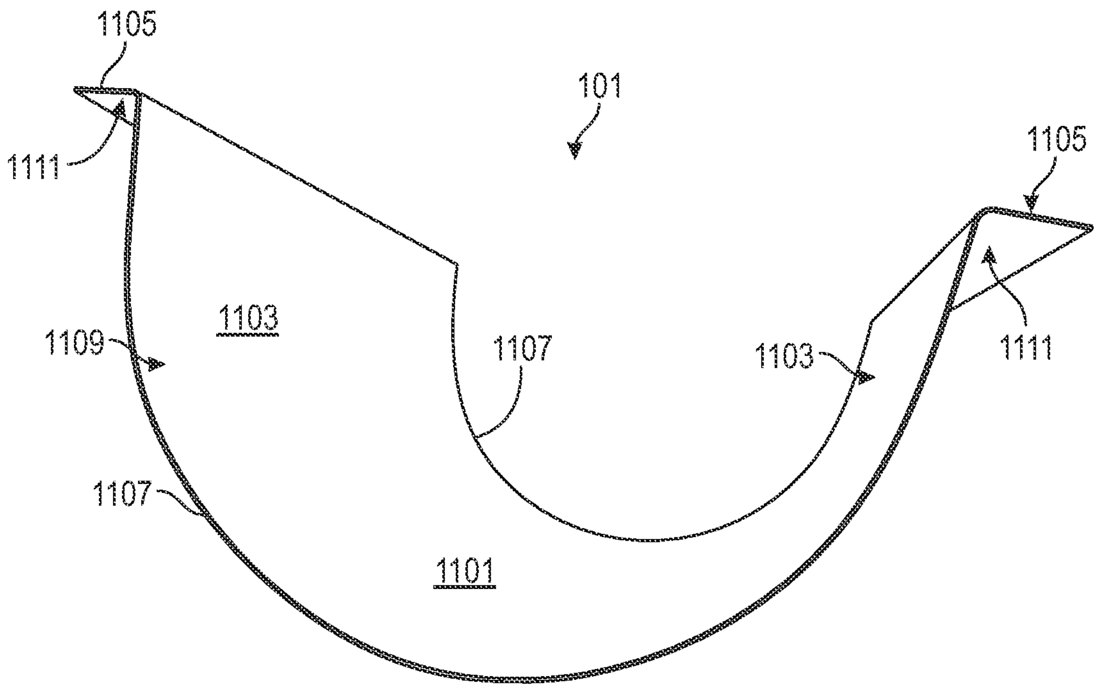
FIG. 11B shows just the floor-and-sidewalls member (of the soaking-device of FIG. 1A) by itself from a front (or rear) perspective view.

FIG. 11A shows just the floor-and-sidewalls 101 by itself, from a top perspective view. FIG. 11B shows just the floor-and-sidewalls 101 by itself from a front (or rear) perspective view. In some embodiments, a transverse width cross-section of the floor-and-sidewalls 101 may have a shape that at least substantially (mostly) resembles a "U" shape, a half-circle, a semi-circle, half of a cylinder, half pipe, combinations thereof, portions thereof, and/or the like. In some embodiments, the floor-and-sidewalls 101 member may be a continuous member that serves as both a floor and as opposing sidewalls to the vessel of soaking-device 100. In some embodiments, the floor-and-sidewalls 101 member may be waterproof. In some embodiments, at least some or most of the upper-surfaces 1109 of a given floor-and-sidewalls 101 may be configured to periodically touch and/or house immersion-liquid 180. In some embodiments, floor-and-sidewalls 101 (or most of floor-and-sidewalls 101) may be made from a material that is considered by persons of ordinary skill in the relevant industries to be good or desirable at heat transfer, such as, but not limited to, a metal, an alloy, stainless steel, copper, graphene, and/or the like. In an assembled configuration, below floor-and-sidewalls 101 may be heating and/or cooling elements, which is why it may be beneficial for floor-and-sidewalls 101 to be relatively good at heat transfer; i.e., so that immersion-liquid 180 may be heated, warmed, cooled, chilled, combinations thereof, portions thereof, and/or the like in reasonable amounts of time. In some embodiments, floor-and-sidewalls 101 may have a predetermined shape. In some embodiments, floor-and-sidewalls 101 may be bent, rolled, stamped, pressed, folded, combinations thereof, portions thereof, and/or the like into its predetermined overall final shape from at least one single planar sheet of stock material. In some embodiments, a given floor-and-sidewalls 101 may comprise a single floor-portion 1101; two (2) opposing sidewall-portions 1103; and two (2) opposing top-ledges 1105 portions. In some embodiments, the two (2) opposing sidewall-portions 1103 may flank and be continuously attached to floor-portion 1101. In some embodiments, floor-portion 1101 may be centrally located and may be a lowest portion of floor-and-sidewalls 101, when assembled soaking-device 100 may be resting upon a flat surface (e.g., a tabletop). In some embodiments, two (2) opposing sidewall-portions 1103 may form opposing sidewalls of floor-and-sidewalls 101. In some embodiments, each of two (2) opposing sidewall-portions 1103 may terminate and be attached to a given top-ledge 1105. In some embodiments, each top-ledge 1105 may be configured to rest on top of top 903 of a given side-panel 107, when soaking-device 100 may be in its assembled configuration. In some embodiments, when soaking-device 100 may be in its assembled configuration, then top-ledge 1105 of floor-and-sidewalls 101 may rests on top of top 903 of side-panel 107. In some embodiments, a given floor-and-sidewalls 101 may comprise two (2) opposing terminal ends 1107. In some embodiments, each terminal end 1107 of a given floor-and-sidewalls 101 may be configured to be attached to a given end-gasket 1200. In some embodiments, the two opposing terminal ends 1107 of the floor-and-sidewalls 101 may be separated from each other by the length of floor-and-sidewalls 101. See e.g., FIG. 11A and/or FIG. 11B.

Small portions of bottom-surface 1111 of floor-and-sidewalls 101 may be visible in FIG. 11B, underneath portions of top-ledges 1105. Larger portions of bottom-surface 1111 of floor-and-sidewalls 101 may be visible in FIG. 1I. In some embodiments, bottom-surface 1111 may be a bottom main (major) surface of floor-and-sidewalls 101. In some embodiments, bottom-surface 1111 and upper-surface 1109 may be oppositely disposed main (major) surfaces of floor-and-sidewalls 101. In some embodiments, bottom-surface 1111 and upper-surface 1109 may generally face away from each other.

Figure 12A:
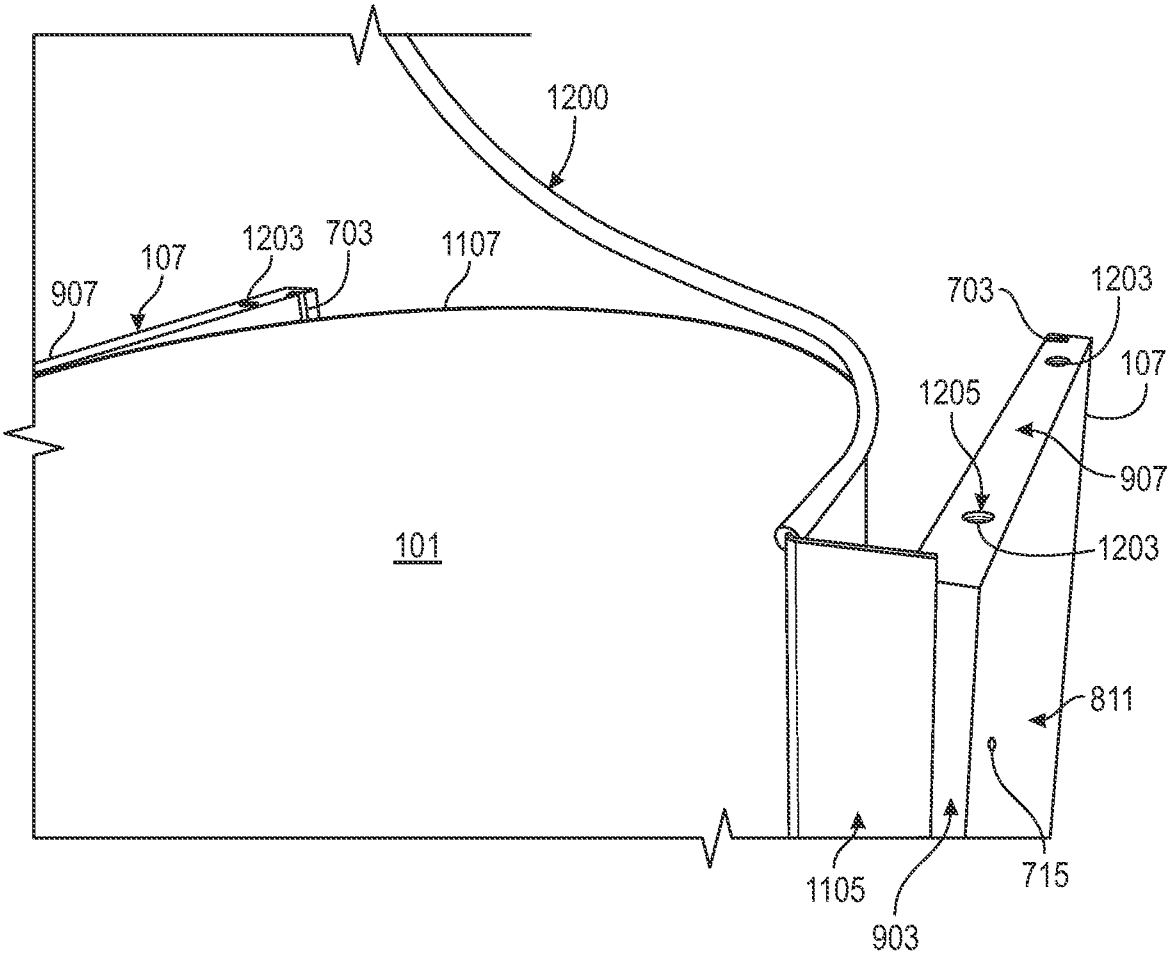
FIG. 12A is a rear top perspective view showing attachment of an end-gasket (flexible elongate member) to one of two terminal ends of the floor-and-sidewalls member (of the soaking-device of FIG. 1A).
Figure 12B:
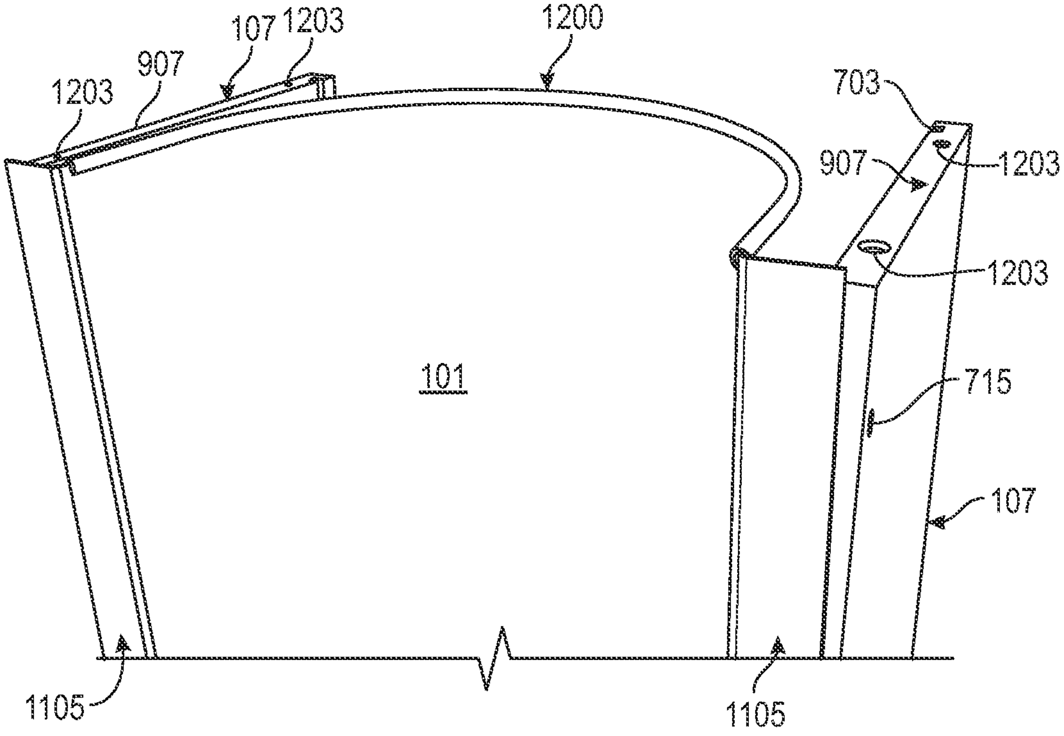
FIG. 12B is a rear top perspective view showing completion of the attachment process of FIG. 12A of the end-gasket (flexible elongate member) to one of the two terminal ends of the floor-and-sidewalls member (of the soaking-device of FIG. 1A).

FIG. 12A is a rear top perspective view showing attachment of an end-gasket 1200 to one of the two terminal ends 1107 of floor-and-sidewalls 101. In some embodiments, end-gasket 1200 may be a flexible elongate member with a receiving-channel 1201 that runs along a length of the given end-gasket 1200. In some embodiments, end-gasket 1200 may be at least substantially (mostly) made from one or more: elastomeric materials; waterproof materials; hydrophobic materials; gasket materials; sealing materials; combinations thereof; portions thereof; and/or the like. In some embodiments, end-gasket 1200 may be an elastomeric material. In some embodiments, end-gasket 1200 may be selected from one or more of: neoprene, silicone, rubber, a flexible plastic, portions thereof, combinations thereof, and/or the like. In some embodiments, a given soaking-device 100 may comprise two (2) separate and distinct end-gaskets 1200; i.e., one end-gasket 1200 for each of the two terminal ends 1107 of floor-and-sidewalls 101. In some embodiments, end-gasket 1200 may be configured for (removable) attachment to terminal end 1107 of floor-and-sidewalls 101. In some embodiments, end-gasket 1200 is attached to terminal end 1107 of floor-and-sidewalls 101 by pressing terminal end 1107 into receiving-channel 1201 of that end-gasket 1200, until that terminal end 1107 is at least substantially (mostly) filling (occupying) that receiving-channel 1201. FIG. 12A shows the beginning of this attachment process. And FIG. 12B shows completion of this attachment process for one end-gasket 1200 and one terminal end 1107 of floor-and-sidewalls 101. FIG. 12B is a rear top perspective view showing completion of the attachment process of FIG. 12A of end-gasket 1200 to at least one of the two terminal ends 1107 of the floor-and-sidewalls 101.

FIG. 12A and FIG. 12B also show that side-panel 107 may comprise at least one bore 1203 that extends into a thickness of side-panel 107, a finite, fixed, and predetermined amount from rear-end 907 of side-panel 107. In some embodiments, such bore(s) 1203 of side-panel 107 may line up to aperture(s) 721 of rear-panel 105, when rear-panel 105 is attached to side-panel 107. In some embodiments, bore 1203 may be configured to receive a portion of fastener 109, while concurrently a different portion of that fastener 109 may be received into a given aperture 721. In some embodiments, a given side-panel 107 may comprise at least one bore 1203. In some embodiments, an opening to bore 1203 may be from rear-end 907 of side-panel 107. In some embodiments, a total quantity of bore(s) 1203 of soaking-device 100 may match: a total quantity of aperture(s) 721 of that same soaking-device 100; and/or a total quantity of fastener(s) 109 of that same soaking-device 100. In some embodiments, bore 1203 may be configured to receive a threaded-insert 1205. In some embodiments, a given side-panel 107 may comprise at least one threaded-insert 1205. In some embodiments, threaded-insert 1205 may be a threaded insert. In some embodiments, each threaded-insert 1205 may comprise an internal female threaded portion configured to receive a complementary male threaded fastener portion. In some embodiments, a given threaded-insert 1205 may be configured to frictionally fit within a given bore 1203. In some embodiments, the female thread portions of threaded-insert 1205 may be used for securing (attaching) rear-panel 105 to side-panel 107. In some embodiments, a given female thread portions of a given threaded-insert 1205 may be configured to receive fastener 109. In some embodiments, a total quantity of threaded-insert(s) 1205 of soaking-device 100 may match: the total quantity bore(s) 1203 of that same soaking-device 100; the total quantity of aperture(s) 721 of that same soaking-device 100; and/or the total quantity of fastener(s) 109 of that same soaking-device 100.

Figure 12C:
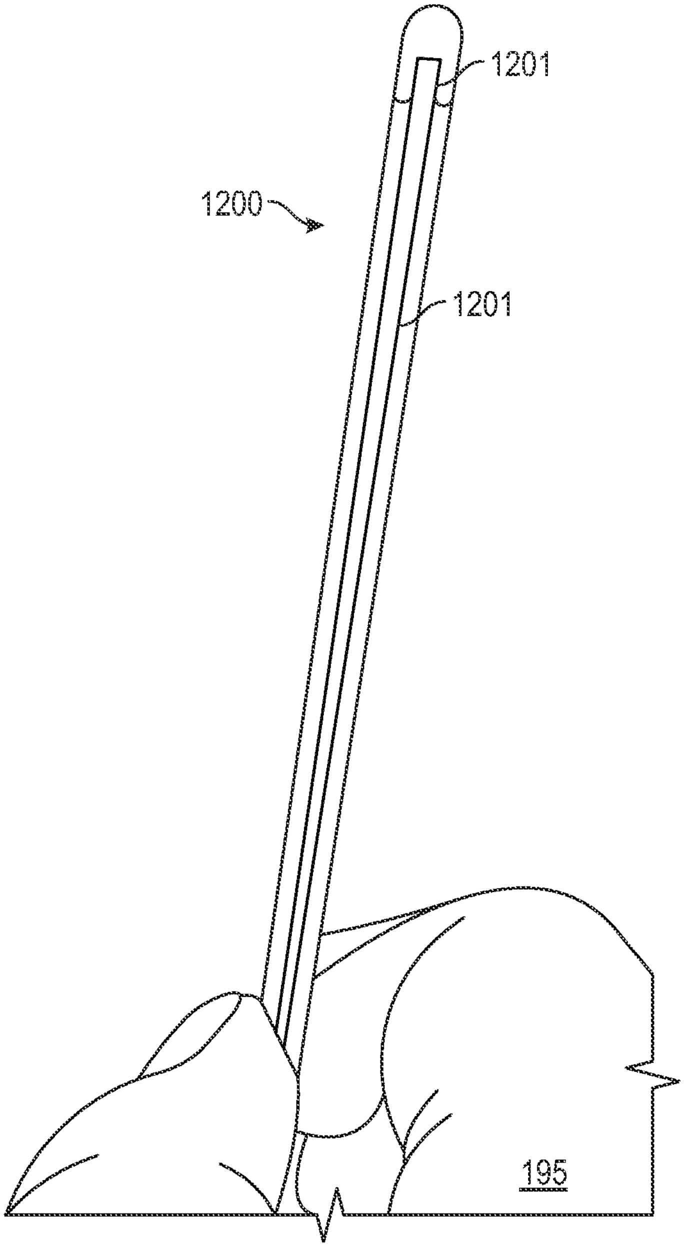
FIG. 12C is a perspective view of just a portion of one end-gasket.

FIG. 12C is a perspective view of just a portion of one end-gasket 1200. FIG. 12C shows the elongate nature of end-gasket 1200. In some embodiments, the member that may be formed into 1200 may be come in an extruded roll that may be cut to (predetermined) length to arrive at a given end-gasket 1200.

Figure 12D:
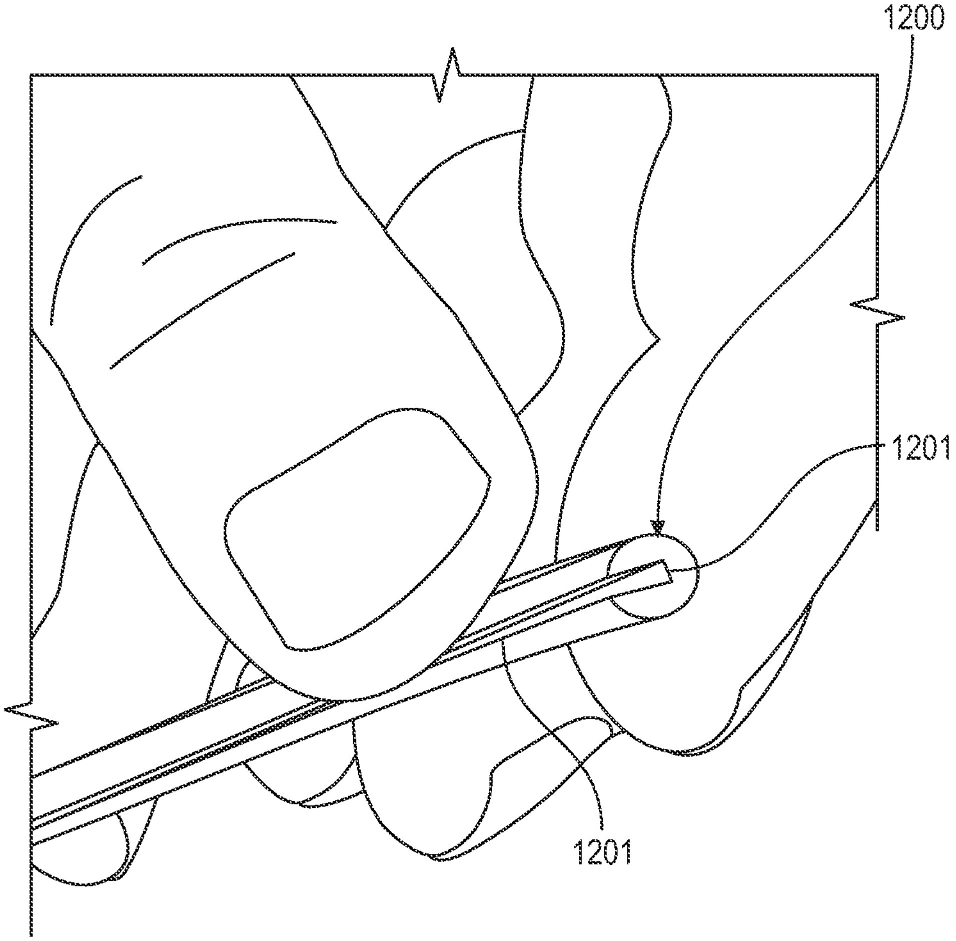
FIG. 12D is a perspective close up view of just a portion of the end-gasket showing its receiving-channel.

FIG. 12D is a perspective close up view of just a portion of one end-gasket 1200 showing its receiving-channel 1201. FIG. 12D shows receiving-channel 1201 within a given end-gasket 1200. In some embodiments, this receiving-channel 1201 may run a length of end-gasket 1200. In some embodiments, this receiving-channel 1201 may be configured to fit onto and/or around a given terminal end 1107 of floor-and-sidewalls 101. In some embodiments, a transverse width cross-section of a given end-gasket 1200 may have a shape that is at least substantially shaped as a letter "U," a letter "C," a letter "V," portions thereof, combinations thereof, and/or the like.

Figure 13A:
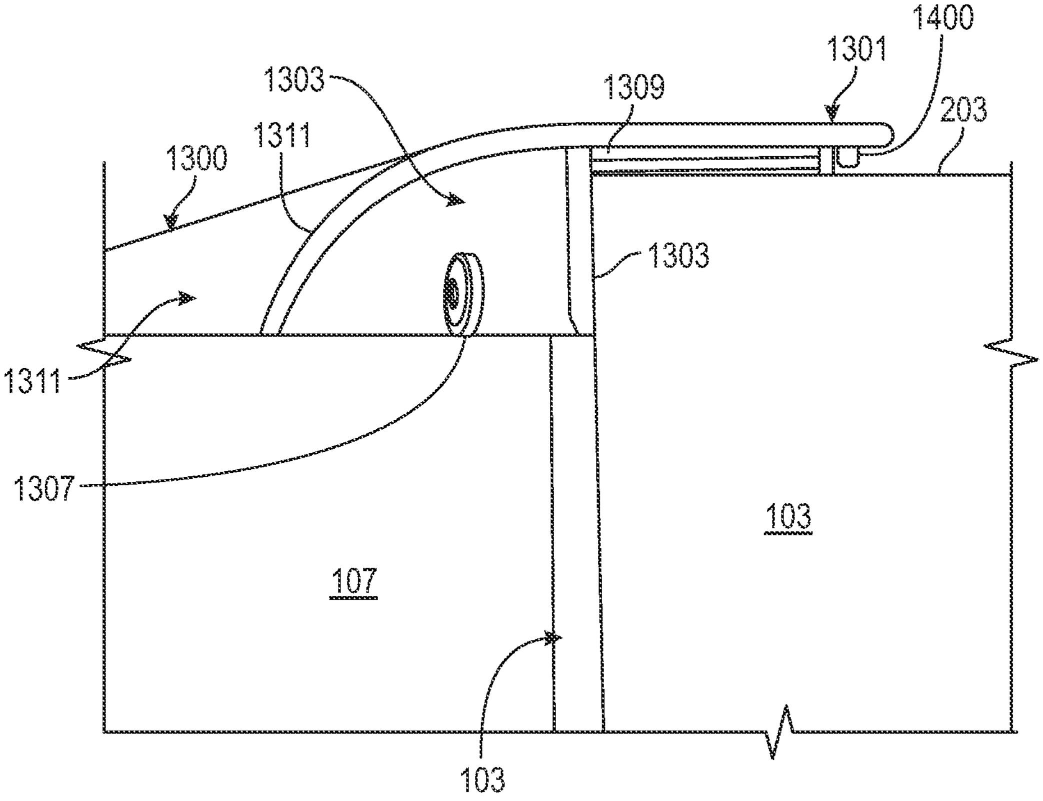
FIG. 13A is a close up left and front perspective view of the left front upper corner of the soaking-device of FIG. 1A showing how a handle may be attached to a side-panel.

FIG. 13A is a close up left and front perspective view of the left front upper corner region (portion) of the soaking-device 100 showing how a given handle 1300 may be attached to a given side-panel 107 (such as the left side-panel 107 shown in FIG. 13A). FIG. 13A shows a top-portion 1301 of handle 1300 laying flat on top of top 903 of the given side-panel 107, with a downward-protecting-portion 1303 of handle 1300 abutting up against the external (exterior) surface 811 of the given side-panel 107, towards (near) top 903 of side-panel 107. In some embodiments, top-portion 1301 and downward-protecting-portion 1303 may be different regions (portions) of a given handle 1300. In some embodiments, top-portion 1301 and downward-protecting-portion 1303 may be attached to each other. In some embodiments, top-portion 1301 and downward-protecting-portion 1303 may be connected to each other. In some embodiments, top-portion 1301 and downward-protecting-portion 1303 may be integral with each other. In some embodiments, top-portion 1301 and downward-protecting-portion 1303 may be of a single article of manufacture with respect to each other. In some embodiments, top-portion 1301 may be an elongate member that is planar and flat. In some embodiments, top-portion 1301 may be an elongate member that is planar and flat that is sized and shaped to be able to rest on top of top 903 of a given side-panel 107. In some embodiments, downward-protecting-portion 1303 may be another elongate member that is planar and flat, that is separate and different from the elongate, planar, and flat regions of top-portion 1301. In some embodiments, downward-protecting-portion 1303 may function as a flange that is configured to butt up against the external (exterior) surface 811 of the given side-panel 107, towards (near) top 903 of side-panel 107. In some embodiments, downward-protecting-portion 1303 may be termed flange 1303. In some embodiments, the major surfaces/sides of top-portion 1301 and downward-protecting-portion 1303 may be at least substantially orthogonal with respect to each other.

Figure 13B:
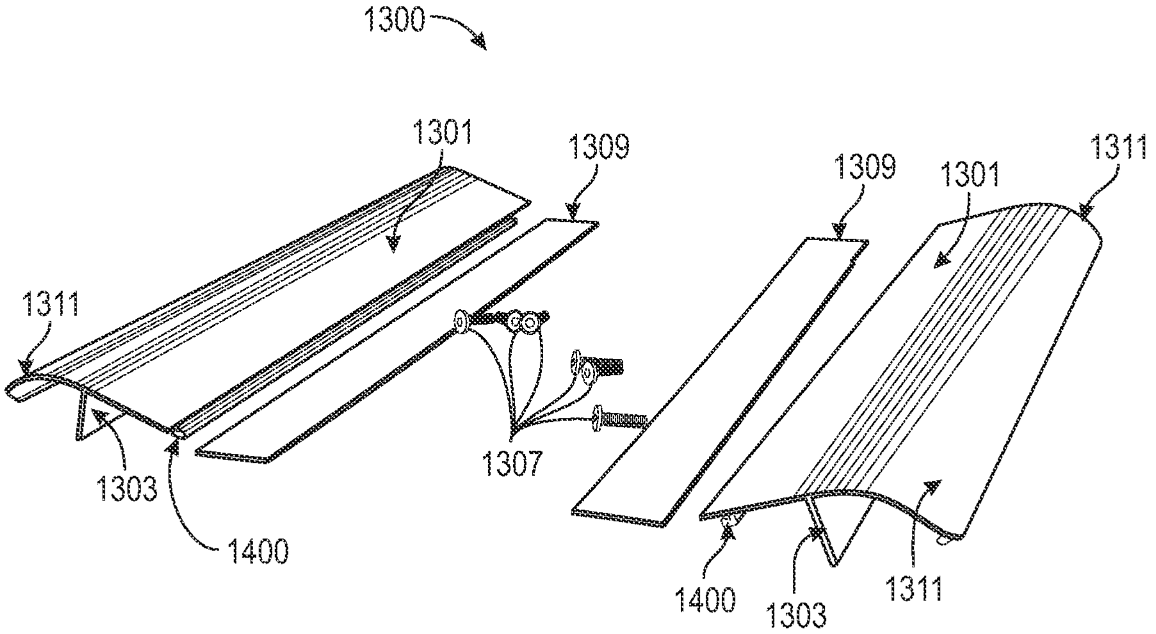
FIG. 13B is a top perspective view showing a pair of handle assemblies side by side to each other, in a state of disassembly.
Figure 13C:
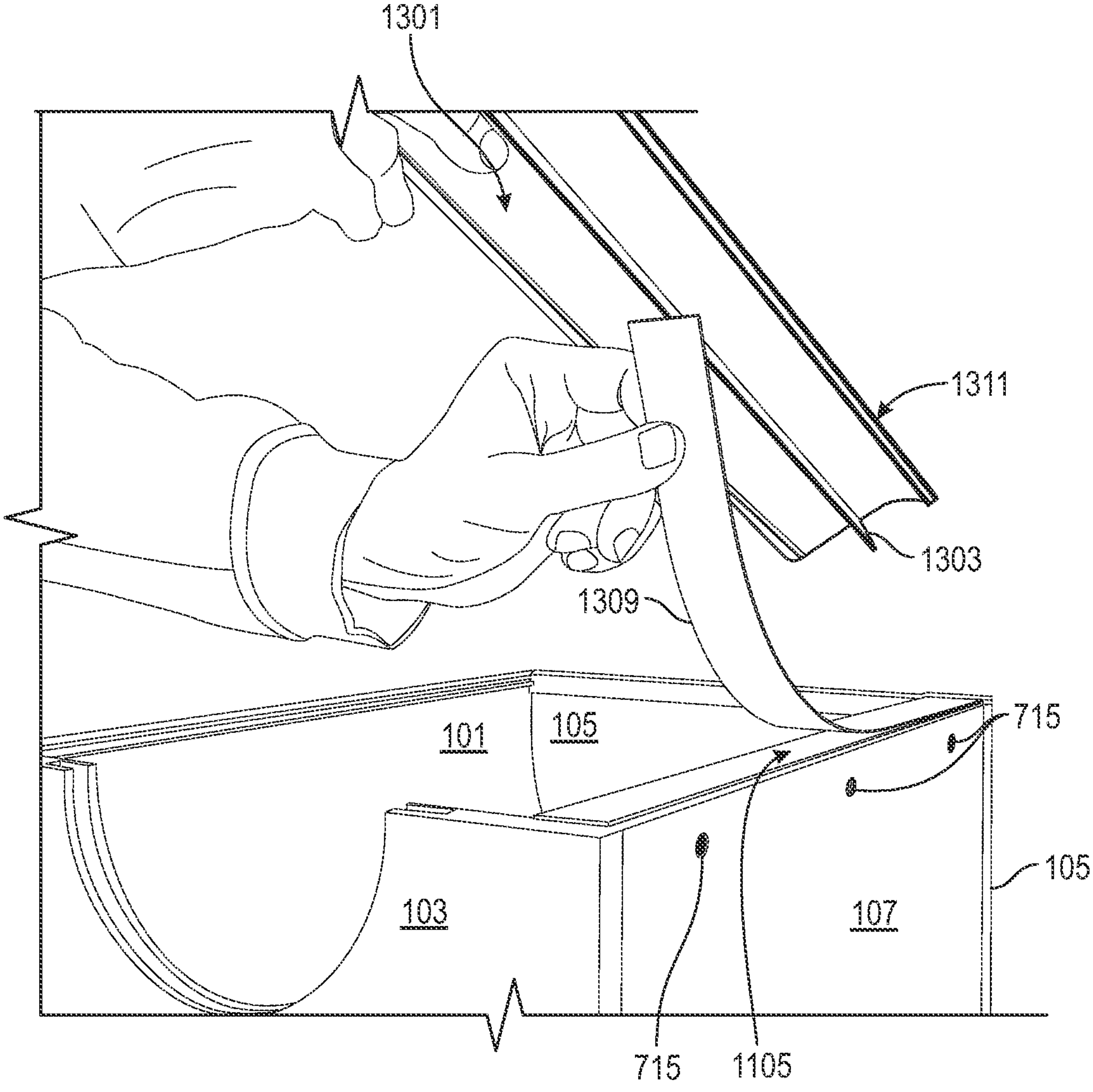
FIG. 13C is a top front right perspective view showing installation of a given thermal-break onto a top of a top-ledge of the floor-and-sidewalls member and beneath a top-portion of a handle.
Figure 13D:
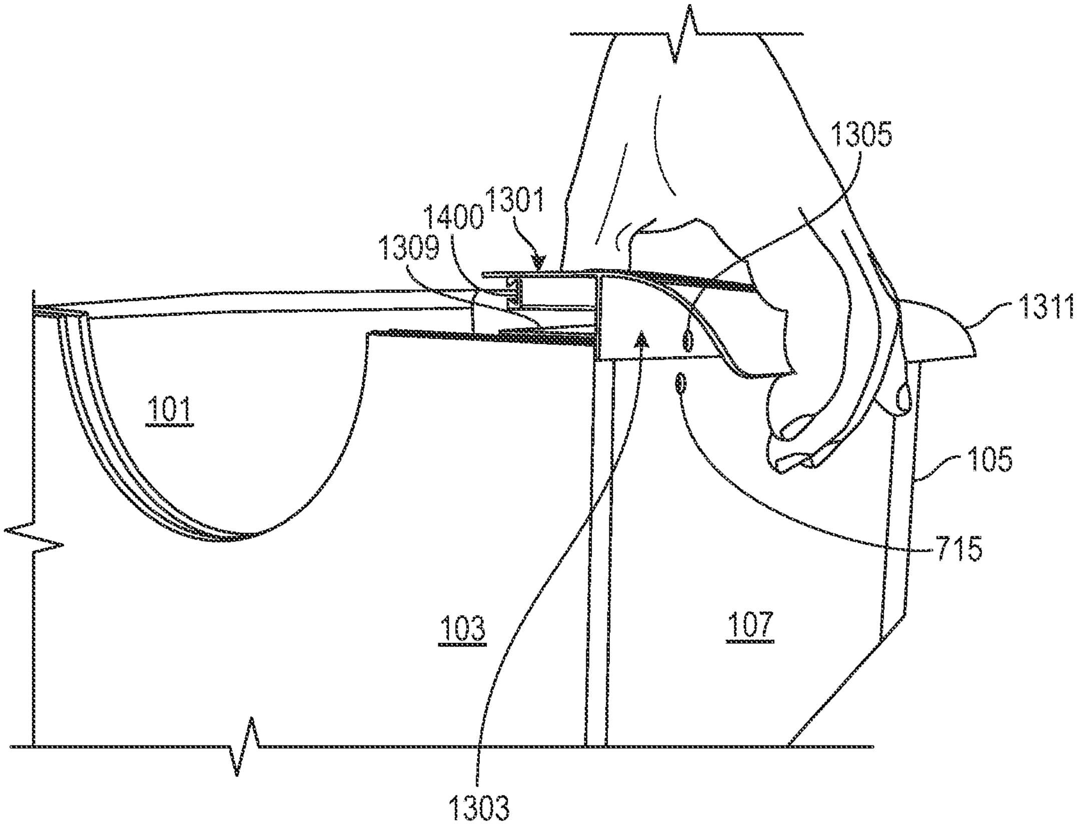
FIG. 13D is a top front right respective view of the upper top front right corner region of the soaking-device of FIG. 1A showing how a given handle may be installed onto the top (upper) region of a given side-panel of the soaking-device of FIG. 1A.

In some embodiments, downward-protecting-portion 1303 may have one or more apertures 1305 (see FIG. 13D for aperture 1305). In some embodiments, aperture 1305 may be a hole that passes entirely through downward-protecting-portion 1303 (flange 1303). In some embodiments, a fastener 1307 may pass through a given aperture 1305 of downward-protecting-portion 1303 and into aperture 715 of side-panel 107 to secure handle 1300 to side-panel 107. In some embodiments, a fastener 1307 may pass through a given aperture 1305 of downward-protecting-portion 1303 and into threaded-insert 917 (of aperture 715) of side-panel 107 to secure handle 1300 to side-panel 107. In FIG. 13A, one such fastener 1307, a portion of downward-protecting-portion 1303, and a portion of top-portion 1301 are all visible; as well as portions of the external (exterior) surface 811 of side-panel 107 and portions of the external (exterior) surface 811 of front-panel 103. However, apertures 1305, apertures 715, and threaded-inserts 917 are all not visible in FIG. 13A because they are covered by other structures.

FIG. 13A also shows a portion of at least one thermal-break 1309. In some embodiments, when a given handle 1300 may be attached to a given side-panel 107, disposed between top 903 of that given side-panel 107 and a bottom of top-portion 1301 of handle 1300 may be at least one thermal-break 1309. In some embodiments, thermal-break 1309 may slow a heat transfer rate between floor-and-sidewalls 101 and handle 1300. In some embodiments, thermal-break 1309 may minimize the handle 1300 getting uncomfortably too hot and/or too cold for holding by a naked human 190 hand or the like. In some embodiments, thermal-break 1309 may be made from a material (or materials) with slower heat transfer rates as compared to floor-and-sidewalls 101 and/or as compared to handle 1300. In some embodiments, thermal-break 1309 may be an insulator. In some embodiments, thermal-break 1309 may be at least partially made from one or more of: an elastomer; silicone; rubber; plastic; foam; fiber; mesh; combinations thereof; portions thereof; and/or the like. In some embodiments, thermal-break 1309 may be sized to complementary fit between a top of top-ledge 1105 of floor-and-sidewalls 101 and a bottom of top-portion 1301 of handle 1300. In some embodiments, thermal-break 1309 may be an elongate member. In some embodiments, thermal-break 1309 may be longer than wide and wider than thick. In some embodiments, thermal-break 1309 may be a planar member. In some embodiments, thermal-break 1309 may be flexible.

In some embodiments, thermal-break 1309 may be omitted from soaking-device 100; e.g., if and when the handle 1300 (or top-portion 1301) has relatively poor heat transfer characteristics (as compared to floor-and-sidewalls 101), as then thermal-break 1309 may be unnecessary.

FIG. 13B is a top perspective view showing a pair of handles 1300 assemblies side by side to each other, in a state of disassembly. In some embodiments, soaking-device 100 may comprise two handle 1300 assemblies, one for each of the two side-panels 107. In some embodiments, a single handle 1300 assembly may comprise at least one handle 1300, at least one fastener 1307, and at least one thermal-break 1309. In some embodiments, a quantity of fasteners 1307 may match a quantity of: apertures 1305, apertures 415, and/or threaded-inserts 417 of a given soaking-device 100.

FIG. 13C is a top front right perspective view showing installation of a given thermal-break 1309 onto a top of top-ledge 1105 of floor-and-sidewalls 101 and beneath the top-portion 1301 of handle 1300. FIG. 13C may also demonstrate that thermal-break 1309 may be flexible in some embodiments.

FIG. 13D is a top front right respective view of the upper top front right corner region of soaking-device 100 showing how a given handle 1300 may be installed onto the top (upper) region of a given side-panel 107. In FIG. 13D a thermal-break 1309 has already been installed onto a top of top-ledge 1105 of floor-and-sidewalls 101 and beneath the top-portion 1301 of handle 1300; and now the top-portion 1301 of that handle 1300 is being lowered onto a top of that thermal-break 1309 and over top 903 of that given side-panel 107. In FIG. 13D, at least one aperture 1305 of downward-protecting-portion (flange) 1303 is visible; as well as, at least aperture 715 of that given side-panel 107. Once that given top-portion 1301 of that handle 1300 is seated on top of that given thermal-break 1309 and/or on top of top 903 of that given side-panel 107, then each aperture 1305 of downward-protecting-portion (flange) 1303 will be in colinear alignment with a given aperture 715 of that given side-panel 107, such those collinearly aligned pairs of apertures 1305/715 may receive a fastener 1307 to secure that handle 1300 to that given side-panel 107. Compare FIG. 13A to FIG. 13D.

FIG. 13D also shows that in some embodiments, an end-view of a given handle 1300 may resemble a letter "f" and/or a transverse-width cross section through a given handle 1300 may resemble a letter "f" in some embodiments. For example, and without limiting the scope of the present invention, at least a portion of the horizontal stroke region of a letter "f" may coincide with downward-protecting-portion (flange) 1303; at least a portion of the stem region of a letter "f" may coincide with top-portion 1301; and/or at least a portion of the ascender region of a letter "f" may coincide with a portion of handle 1300 where human 190 fingers may be holding that given handle 1300, wherein this region of handle 1300 may be ascender-portion 1311. In some embodiments, a given handle 1300 may comprise at least one top-portion 1301, at least one downward-protecting-portion (flange) 1303, at least one aperture 1305, and at least one ascender-portion 1311. In some embodiments, ascender-portion 1311 may be a curved region (portion) of handle 1300.

Figure 14A:
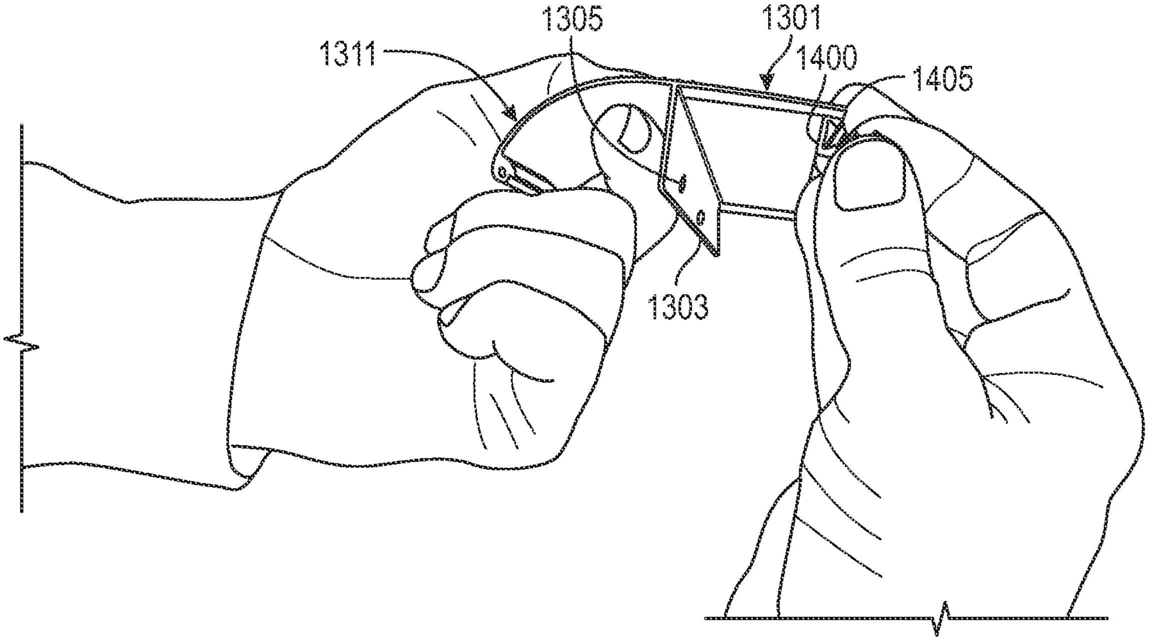
FIG. 14A shows an end view of a given handle of the soaking-device of FIG. 1A.
Figure 14B:
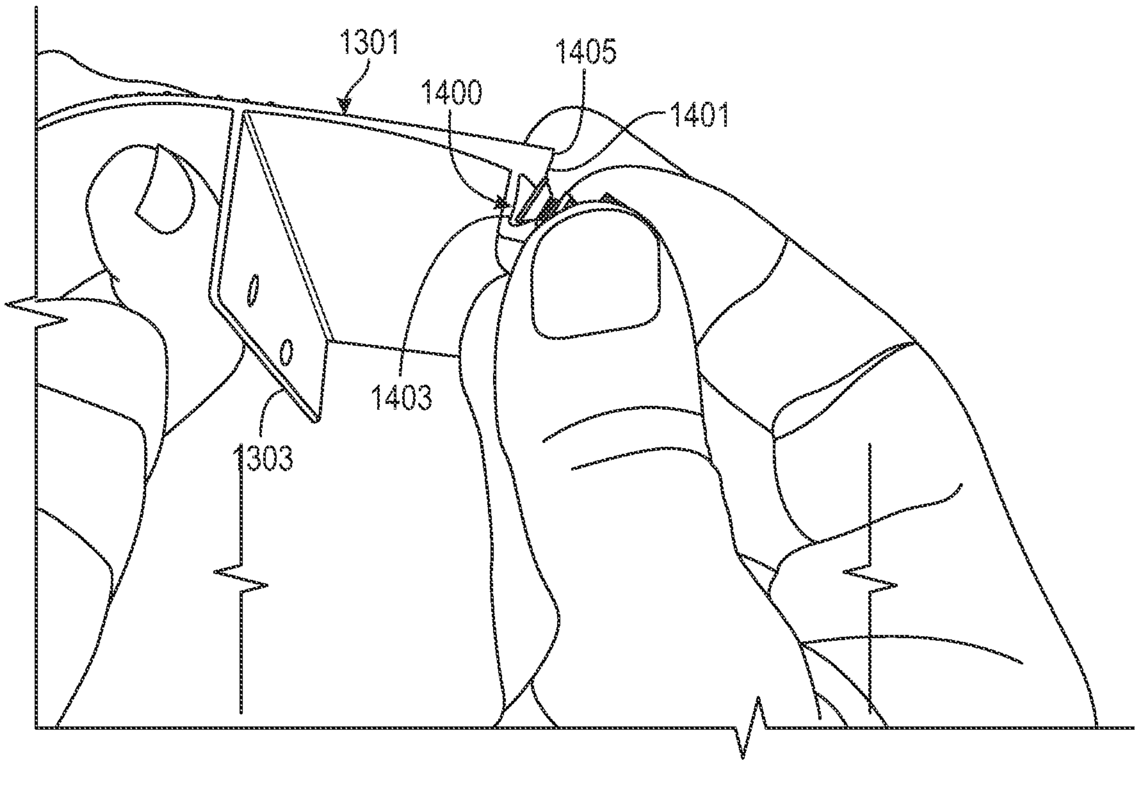
FIG. 14B is a close up (detail) view of FIG. 14A, that may better show at least one mating-member in a process of being inserted into a slot of a given handle of the soaking-device of FIG. 1A.
Figure 14C:
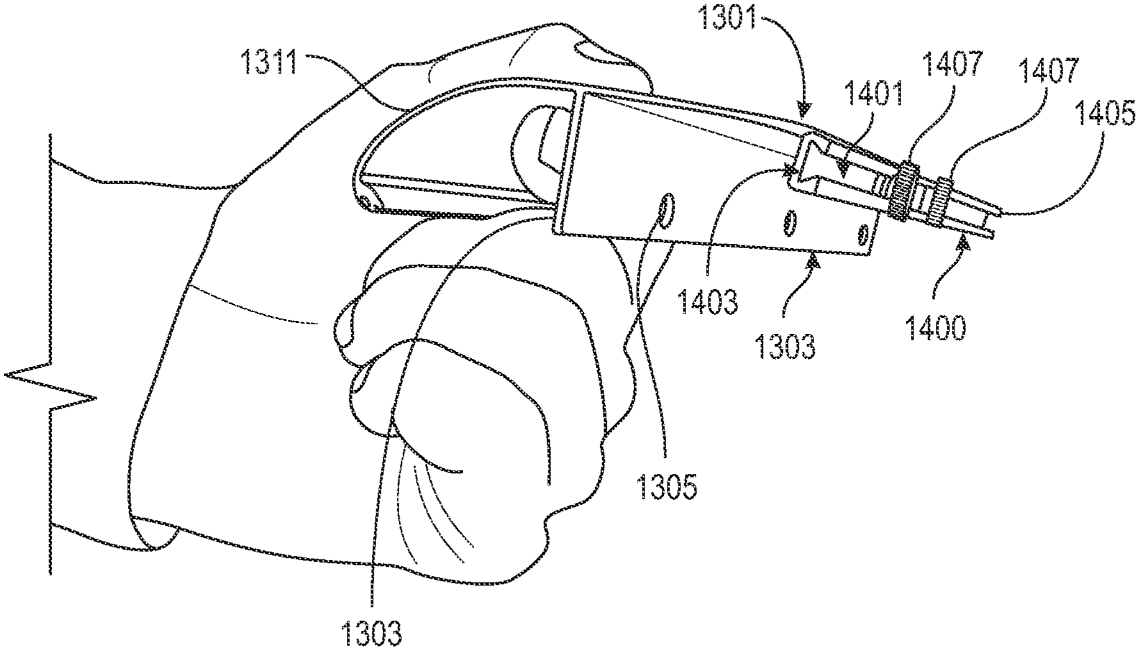
FIG. 14C is an end perspective view of a given handle showing at least one mating-member received into a slot of that given handle.

FIG. 14A shows an end view of a given handle 1300. In some embodiments, terminal-end-edge 1405 may be a terminal end edge of top-portion 1301 that is disposed away from downward-protecting-portion (flange) 1303 and/or that is disposed away from ascender-portion 1311 of that given handle 1300. In some embodiments, handle 1300 and/or top-portion 1301 may comprise terminal-end-edge 1405. In some embodiments, descending from a terminal-end-edge 1405 of top-portion 1301 of that given handle 1300 may be a slot 1400. In some embodiments, a length of slot 1400 may be at least substantially (mostly) parallel and/or dimensionally equal to a length of its associated (connected) terminal-end-edge 1405. In some embodiments, slot 1400 may run in a direction that is at least substantially (mostly) parallel to the length of its associated (connected) terminal-end-edge 1405. In some embodiments, slot 1400 may run in a direction that is at least substantially (mostly) linearly straight and/or unobstructed. In some embodiments, slot 1400 may comprise an opening 1401 and an enclosed-region 1403. In some embodiments, opening 1401 and enclosed-region 1403 may be operationally directly linked to each other. In some embodiments, opening 1401 may be facing away from downward-protecting-portion (flange) 1303 and/or away from ascender-portion 1311. In some embodiments, when both handles 1300 may be each attached to their respective side-panel 107, then each opening 1401 may be facing each other. In some embodiments, opening 1401 and enclosed-region 1403 may also run in a direction that is at least substantially (mostly) parallel with the length of slot 1400 and/or with the length of its associated (connected) terminal-end-edge 1405. In some embodiments, opening 1401 and enclosed-region 1403 may be configured to allow back-and-forth sliding translation of at least one mating-member 1407 held (trapped) within slot 1400. In some embodiments, a transverse-width cross-section through a given handle and/or a given slot 1400 may show that a shape of slot 1400 may at least substantially resemble a letter "T" with a bottom of a stem portion of a letter "T" coinciding with opening 1401 to slot 1400; and with the top horizontal arms portion of a letter "T" coinciding with the portions of slot 1400 that are mostly enclosed, as in enclosed-region 1403.

FIG. 14B is a close up (detail) view of FIG. 14A, that may better show at least one mating-member 1407 in a process of being inserted into slot 1400. In some embodiments, at least some portions of a given mating-member 1407 may have a size and/or a shape that complementary fits within slot 1400. In some embodiments, the at least some portions of the given mating-member 1407 may have a size and/or a shape that complementary fits within opening 1401 and/or within enclosed-region 1403. In some embodiments, the at least some portions of the given mating-member 1407 may have a size and/or a shape that complementary fits within slot 1400, such that those at least some portions of the given mating-member 1407 may slidingly translate back-and-forth within slot 1400. In some embodiments, the at least some portions of the given mating-member 1407 may have a size and/or a shape that at least substantially (mostly) resembles a letter "T." In some embodiments, the at least some portions of the given mating-member 1407 may be shaped as a screw, a bolt, a flat-head screw, and/or the like. In some embodiments, a given mating-member 1407 may be configured for two purposes, namely, (1) to removably and/or sliding attach to handle 1300 and/or (2) to permit one or more accessories to be removably attached to soaking-device 100, via the mating-member 1407 to slot 1400 interaction (engagement).

In some embodiments, the one or more accessories may be selected from: a breathing apparatus, a head rest, airline tubing, gas line tubing, a light, a thermometer, a temperature probe, a timer, portions thereof, combinations thereof, and/or the like.

FIG. 14C is an end perspective view of a given handle 1300 showing at least one mating-member 1407 received into slot 1400 of that given handle 1300. FIG. 14C is an end perspective view of a given handle 1300 showing at least two different mating-members 1407 being received into slot 1400 of that given handle 1300. In some embodiments, a given slot 1400 may be configured to accommodate one or more mating-members 1407 within that given slot 1400. However, because the length of slot 1400 is fixed, finite, and/or non-variable, there is a finite maximum quantity of mating-members 1407 that may simultaneously fit into a given slot 1400. Additionally, a greater the quantity of mating-member 1407 within a given slot 1400, the greater the reduction in sliding translation freedom of movement of those mating-members 1407 within that given slot 1400.

Figure 15A:
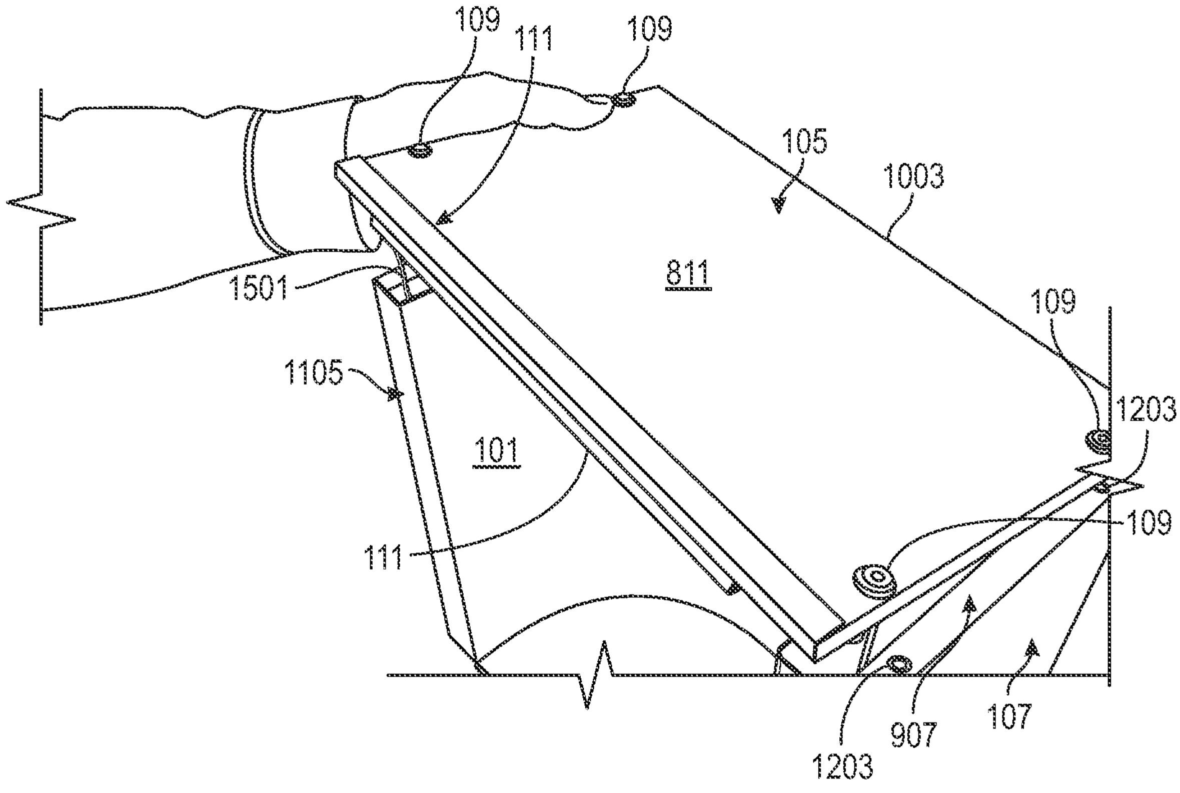
FIG. 15A is a top rear perspective view of the soaking-device of FIG. 1A, shown with its rear-panel detached from the side-panels and from the floor-and-sidewalls member.

FIG. 15A is a top rear perspective view of soaking-device 100, shown with rear-panel 105 detached from side-panels 107 and from floor-and-sidewalls 101. In some embodiments, wire(s) 1501 from at least one light-source 1500 may run from some portion of rear-panel 105 to an underside of floor-and-sidewalls 101. See FIG. 15C for at least one light-source 1500. In FIG. 15A, at least some of wire(s) 1501 may be seen running from a portion of rear-panel 105 to beneath top-ledge 1105 and inside of a given side-panel 107.

Figure 15B:
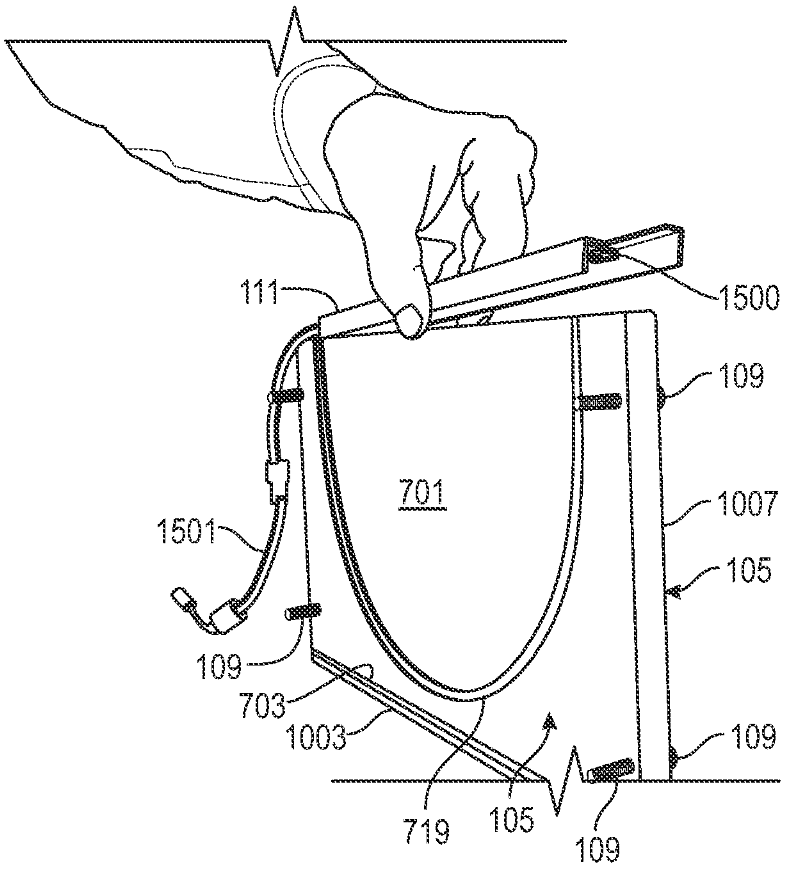
FIG. 15B is an inside perspective view of the rear-panel with its cover at least partially removed from a top of the rear-panel.

FIG. 15B is an inside perspective view of rear-panel 105 with its cover 111 at least partially removed from top 1001 of rear-panel 105. FIG. 15B shows internal (interior) surface 701 of rear-panel 105. In some embodiments, disposed between top 1001 and a bottom of cover 111 may be the at least one light-source 1500. A portion of the at least one light-source 1500 is just visible in FIG. 15B. At least some of wire(s) 1501 extending out from the at least one light-source 1500 may also be visible in FIG. 15B. In some embodiments, the at least one light-source 1500 may be configured to shine light down and/or into a thickness of rear-panel 105 from top 1001 of rear-panel 105. In some embodiments, external (exterior) surface 811 of rear-panel 105 may be opaque and/or frosted. In some embodiments, an opaque sheet of planar material (e.g., vinyl, paint, powder coating, and/or the like) may be adhered to, painted on, and/or powder coated to external (exterior) surface 811 of rear-panel 105 to make a rear-panel 105 that may have an external (exterior) surface 811 of that is opaque. In some embodiments, disposed between a given head of a given fastener 109 and this opaque sheet of planar material on external (exterior) surface 811 of rear-panel 105, may be at least one washer 110 (which may help to protect the opaque sheet of planar material from damage). In some embodiments, this opaque sheet of planar material (e.g., vinyl, paint, powder coating, and/or the like) may be one or more of: a predetermined color(s). In some embodiments, this opaque sheet of planar material (e.g., vinyl, paint, powder coating, and/or the like) may be one or more of: white, a predetermined color(s), and/or reflective, to help reflect light from light-source 1500 into immersion-liquid 180. In some embodiments, internal (interior) surface 701 of rear-panel 105 may be at least substantially (mostly) transparent and/or translucent with respect to light visible to humans. In some embodiments, internal (interior) surface 701 of rear-panel 105 may be frosted, but while still being at least substantially (mostly) transparent and/or translucent with respect to light visible to humans. In some embodiments, the thickness of rear-panel 105 may be at least substantially (mostly) transparent and/or translucent with respect to light visible to humans. In some embodiments, at least some of the light emitted by the at least one light-source 1500 may escape from internal (interior) surface 701 of rear-panel 105 and then shine into immersion-liquid 180. In some embodiments, the at least one light-source 1500 may be configured to light up immersion-liquid 180.

FIG. 15B also shows fasteners 109 resting within apertures 721 of rear-panel 105. Slot 703 of internal (interior) surface 701 of rear-panel 105 and/or channel 719 of internal (interior) surface 701 of rear-panel 105 are also shown in FIG. 15B.

Figure 15C:
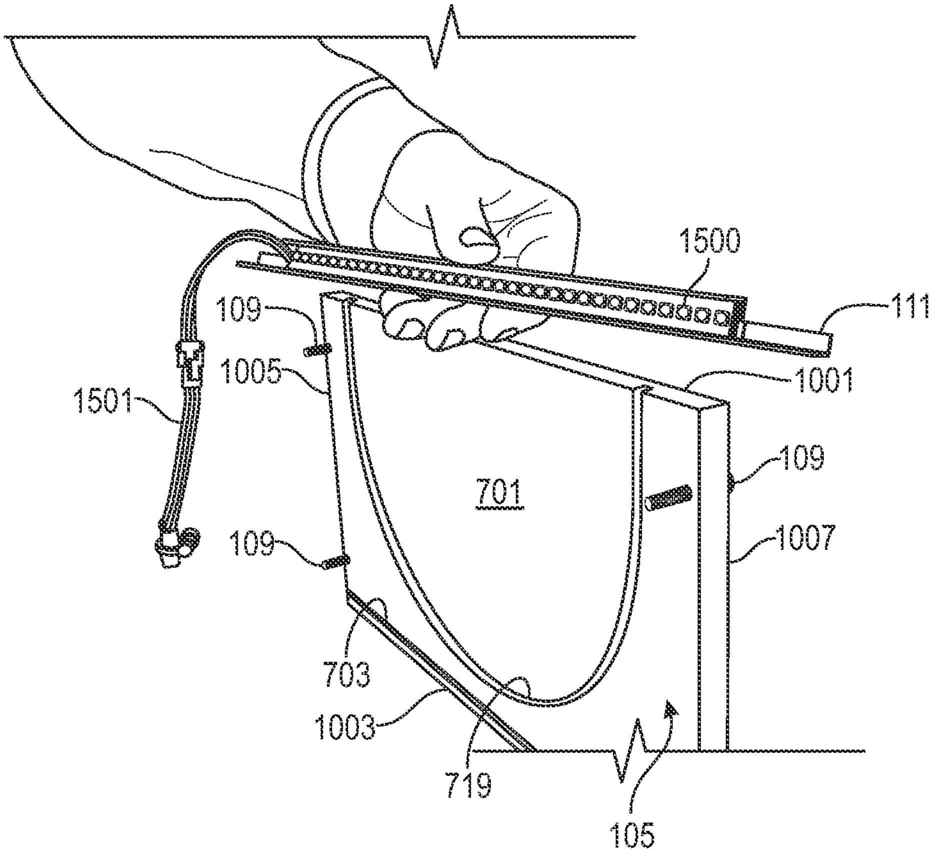
FIG. 15C is a bottom perspective view of a cover of a rear-panel of the soaking-device of FIG. 1A.

FIG. 15C is a bottom perspective view of cover 111 of rear-panel 105. FIG. 15C shows at least one light-source 1500. In some embodiments, the at least one light-source 1500 may be located between a bottom of cover 111 and top 1001 of rear-panel 105. In some embodiments, the at least one light-source 1500 may be disposed between the bottom of cover 111 and top 1001 of rear-panel 105. In some embodiments, the at least one light-source 1500 may be attached to the bottom of cover 111. In some embodiments, the at least one light-source 1500 may be configured to light up immersion-liquid 180. In some embodiments, the at least one light-source 1500 may be selected from at least one: light emitting diode (LED), LED strip, incandescent light bulb, halogen light bulb, fluorescent light bulb/source, neon light source, sodium light source, portions thereof, combinations thereof, and/or the like. In some embodiments, the at least one light-source 1500 may emit light of: one or more colors, one or more temperatures, light of a particular warmness, light of a particular coolness, light of a particular spectrum (wavelength), light of a particular lumen or lumens), light of a particular brightness, light of a particular intensity, portions thereof, combinations thereof, and/or the like. In some embodiments, light-source 1500 may be operatively connected to wire(s) 1501. In some embodiments, wire(s) 1501 may comprise at least one electrically conductive metal wire(s); such as, but not limited to, copper wire. In some embodiments, wire(s) 1501 may comprise at least one fiber optic cable. In some embodiments, wire(s) 1501 may be configured to transmit electricity, power, light, control signals, portions thereof, combinations thereof, and/or the like. In some embodiments, wire(s) 1501 may sheathed in non-electrically conductive insulation material. In some embodiments, wire(s) 1501 may operatively link at least one light-source 1500 to one or more: power-supply, driver, transformer, AC/DC converter, power-source, battery, rechargeable battery, controller, portions thereof, combinations thereof, and/or the like. In some embodiments, the one or more of: power-supply, driver, transformer, AC/DC converter, power-source, battery, rechargeable battery, controller, portions thereof, combinations thereof, and/or the like, may be located beneath floor-and-sidewalls 101 (i.e., beneath floor-portion 1101 and/or beneath sidewall-portion 1103) and/or at least mostly above bottom-panel 113. In some embodiments, rear-panel 105 (and/or a rear-panel 105 assembly) may comprise at least one light-source 1500. In some embodiments, cover 111 may comprise at least one light-source 1500. In some embodiments, soaking-device 100 may comprise at least one: light-source 1500, wire(s) 1501, power-supply, driver, transformer, AC/DC converter, power-source, battery, rechargeable battery, controller, portions thereof, combinations thereof, and/or the like.

In some embodiments, a given light-source 1500 may be installed at and/or any edge of rear-panel 105.

FIG. 16A through FIG. 16J may show at least some steps as to how a given soaking-device 100 may be (at least partially) assembled.

Figure 16A:
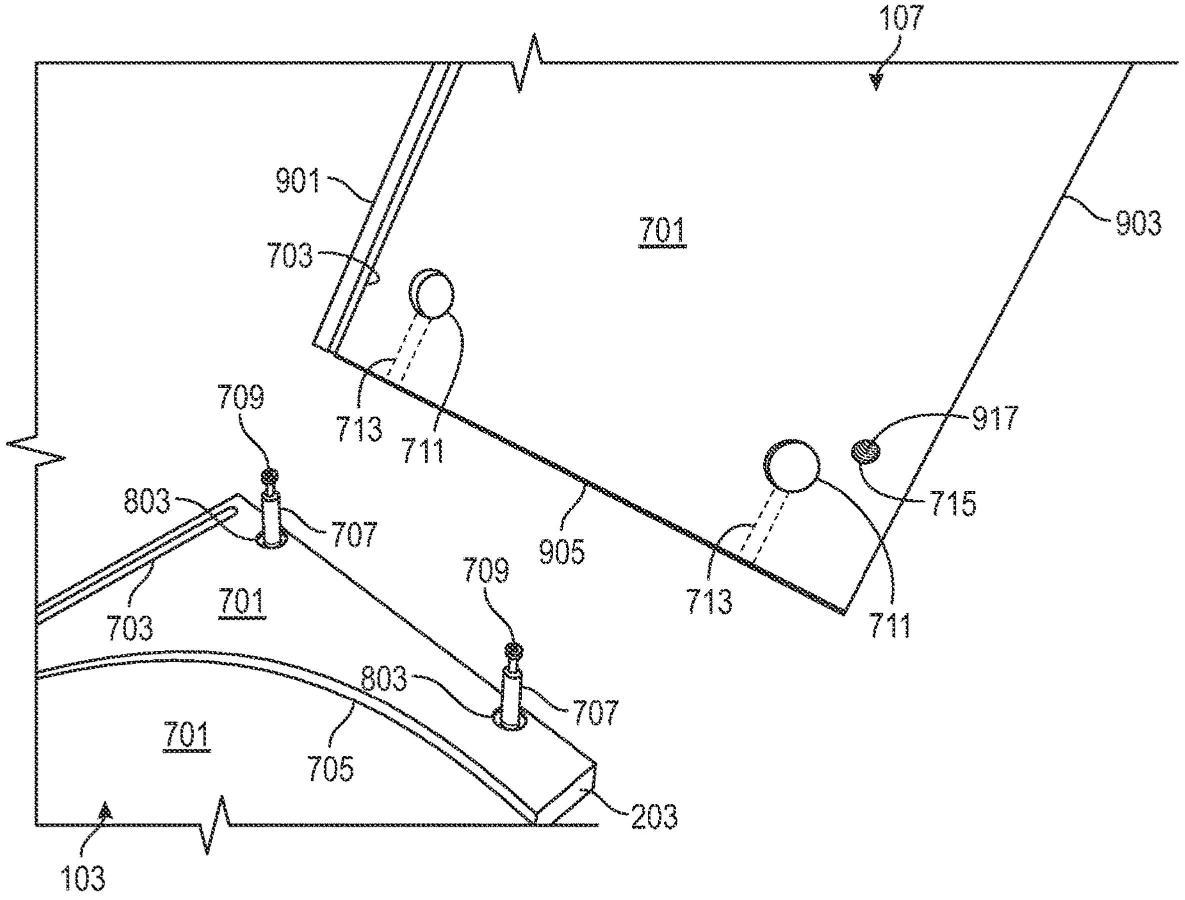
FIG. 16A is a partial inside perspective view of a front-panel and one side-panel, before attachment of that front-panel to that side-panel.

FIG. 16A shows how a given side-panel 107 may be attached to front-panel 103 by use of cam-posts 707 protruding from the internal (interior) surface 701 of front-panel 103 that get secured by cam-nuts 1600 located in cam-pockets 711 of the given side-panel 107. See FIG. 16C for cam-nuts 1600.

Also shown in FIG. 16A is an aperture 715 of the given side-panel 107 that may be used for attaching a given handle 1300 to that given side-panel 107. Also shown in FIG. 16A, may be a threaded-insert 917 located within that aperture 715. In some embodiments, aperture 715 and/or threaded-insert 917 may be configured to receive a given fastener 1307. Also shown in FIG. 16A is part of slot 703 on the internal (interior) surface 701 of the side-panel 107 that may be used to retain the bottom-panel 113. Bottom-panel 113 is not shown in FIG. 16A. Also shown in FIG. 16A is part of a different 703 on the internal (interior) surface 701 of front-panel 103 that may also be used to retain bottom-panel 113. Also shown in FIG. 16A is part of channel-for-end-gasket 705 on the internal (interior) surface 701 of front-panel 103 that may be used for forming a watertight teal with an end-gasket 1200 and with the floor-and-sidewalls 101.

Figure 16B:
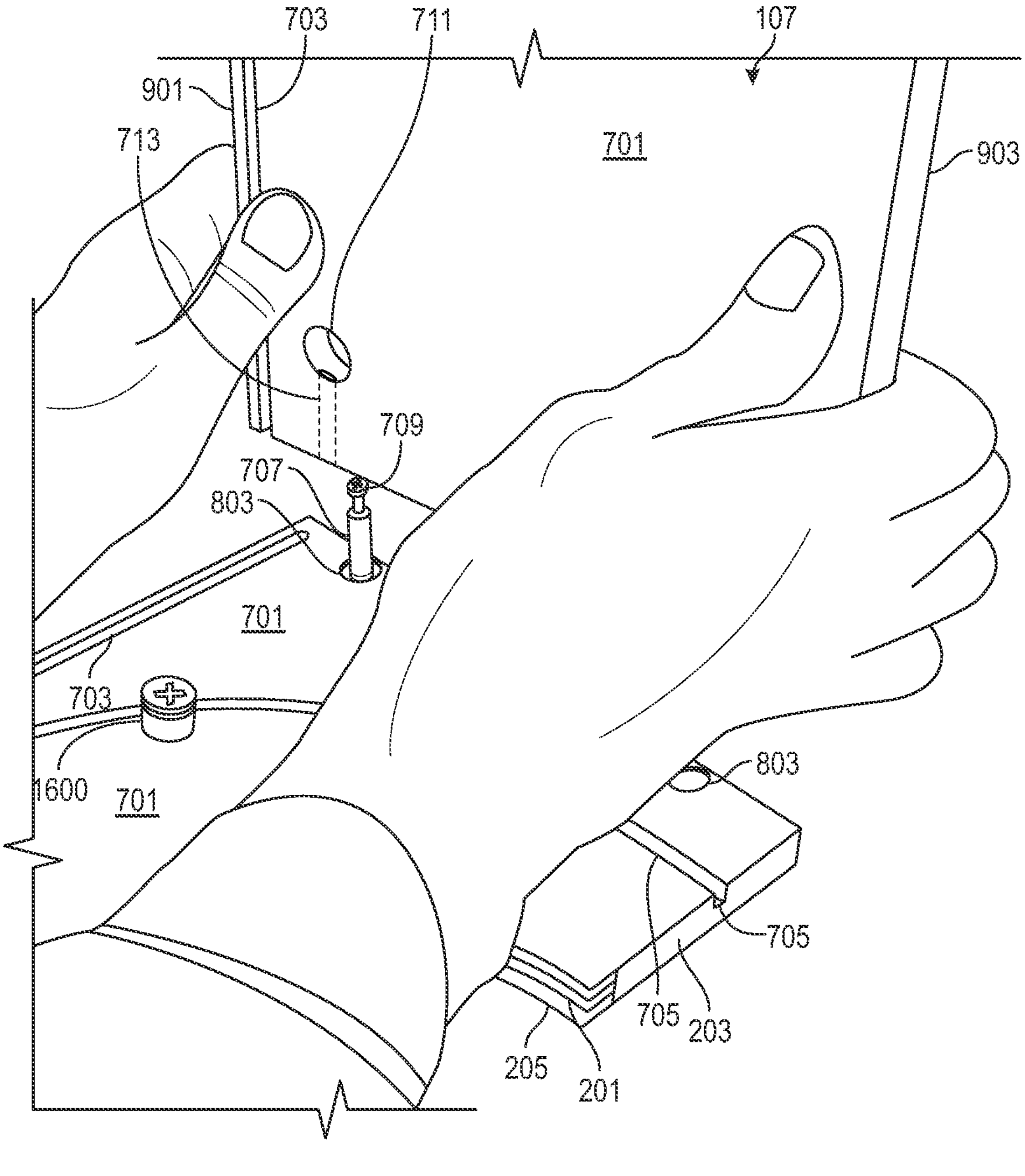
FIG. 16B is a partial inside perspective view of a front-panel and one side-panel, immediately before attachment of that front-panel to that side-panel.

FIG. 16B shows attaching a given side-panel 107 to front-panel 103 by use of cam-posts 707 protruding from the internal (interior) surface 701 of front-panel 103 that get secured by cam-nuts 1600 located in cam-pockets 711 of the given side-panel 107. Note, FIG. 16B is further along in this attachment process as compared to FIG. 16A. FIG. 16B also does show one loose cam-nut 1600 resting on the internal (interior) surface 701 of front-panel 103 before that particular cam-nut 1600 has been inserted into its respective cam-pocket 711 in the internal (interior) surface 701 of the given side-panel 107.

Also shown in FIG. 16B is a portion of the neck-gasket-channel 201 located in top 203 cutout region 205 of the front-panel 103.

Figure 16C:
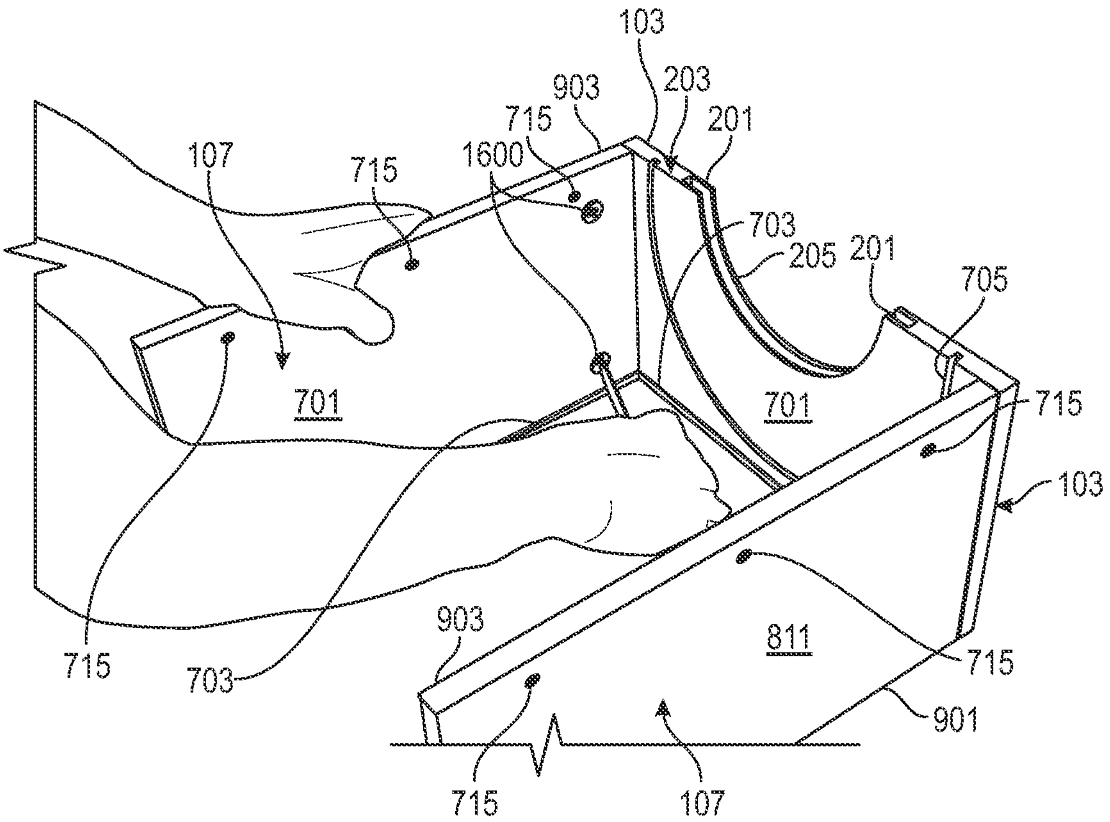
FIG. 16C is top perspective view showing the front-panel attached to two side-panels and showing a process of securing (tightening) cam-nuts within the side-panels.

FIG. 16C is top perspective view showing front-panel 103 attached to two side-panels 107. In FIG. 16C, the cam-posts 707 (i.e., the cam-terminal-ends 709 portions of the cam-posts 707) have been fully seated (received) into their respective receiving bores 713 of the two side-panels 107 and into the cam-pockets 711; and cam-nuts 1600 have been inserted into the cam-pockets 711 of the two side-panels 107. FIG. 16C shows how the cam-nuts 1600 are tightened against the cam-terminal-ends 709 of the cam-posts 707. Using a screwdriver (or the like), the given cam-nut 1600, within its given cam-pocket 711 is rotated (e.g., in clockwise fashion) to tighten that particular cam-nut 1600 against the 709 residing within that given cam-pocket 711. In some embodiments, this attachment between front-panel 103 and side-panels 107 may be shown as completed in FIG. 16C once all the cam-nuts 1600 have been tightened. In some embodiments, there may be two cam-nuts 1600 per each side-panel 107.

FIG. 16C also shows portions of the slots 703 present in the internal (interior) surface 701 of front-panel 103 and side-panels 107 that may be used to retain (trap) edges of bottom-panel 113 therein (note, bottom-panel 113 is not shown in FIG. 16C). Apertures 715 and threaded-inserts 917 of the side-panels 107 may also be seen in FIG. 16C. At least some portions of top 203 of cutout region 205 and neck-gasket-channel 201 of front-panel 103 may be visible in FIG. 16C. At least some portions of channel 705 of the internal (interior) surface 701 of front-panel 103 may be visible in FIG. 16C.

Figure 16D:
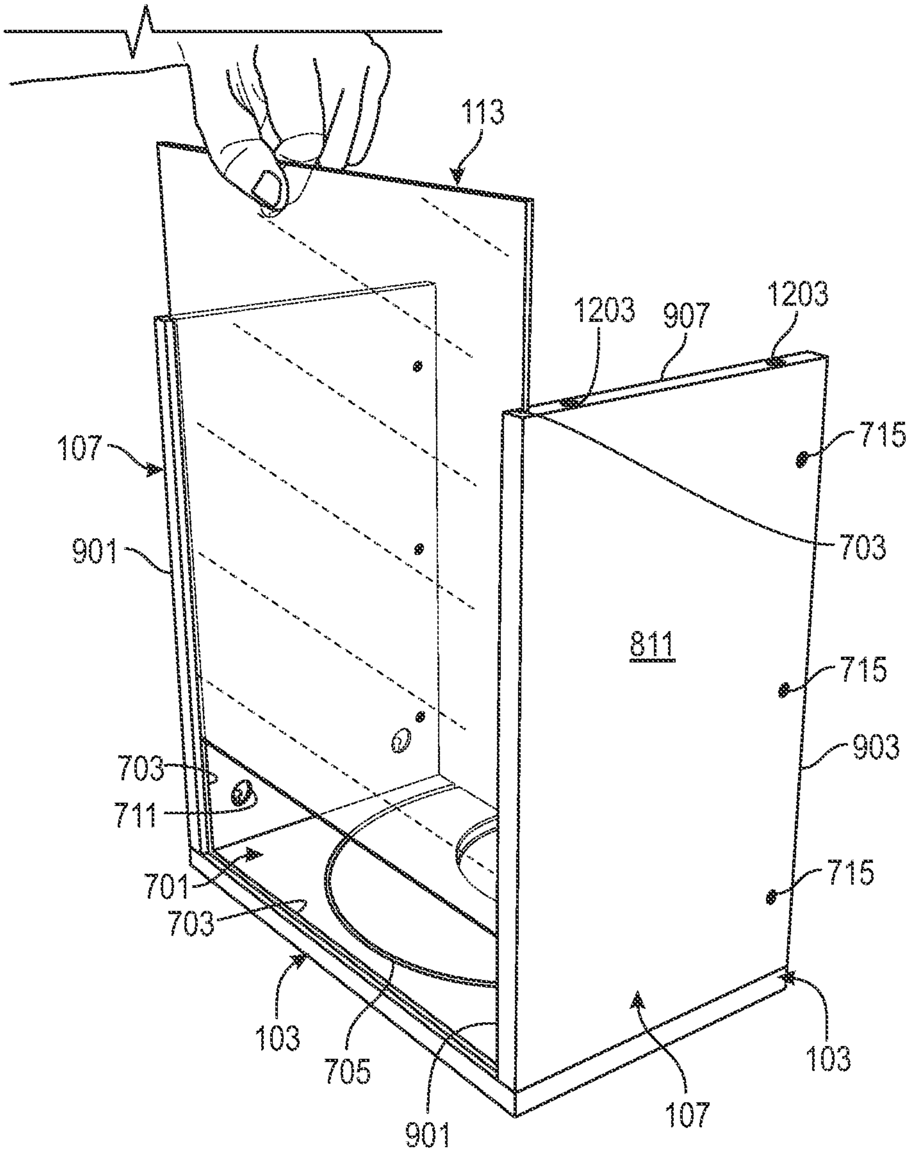
FIG. 16D shows a bottom perspective view of attaching a bottom-panel to the front-panel and to the side-panels.

FIG. 16D shows a bottom perspective view of attaching bottom-panel 113 to front-panel 103 and to side-panels 107. FIG. 16D may continue from FIG. 16C. In some embodiments, once the two side-panels 107 have been attached to front-panel 103 (e.g., as shown in FIG. 16A to FIG. 16C), then bottom-panel 113 may be attached to front-panel 103 and to side-panels 107. In some embodiments, to attach bottom-panel 113 to front-panel 103 and to side-panels 107, three of the perimeter edges of bottom-panel 113 may be slid into the slots 703 located on the internal (interior) surfaces 701 of front-panel 103 and of side-panels 107, with the rear-panel 105 not yet attached to the side-panels 107, but with front-panel 103 having been previously attached to the side-panels 107 (e.g., as shown in FIG. 16A to FIG. 16C).

Figure 16E:
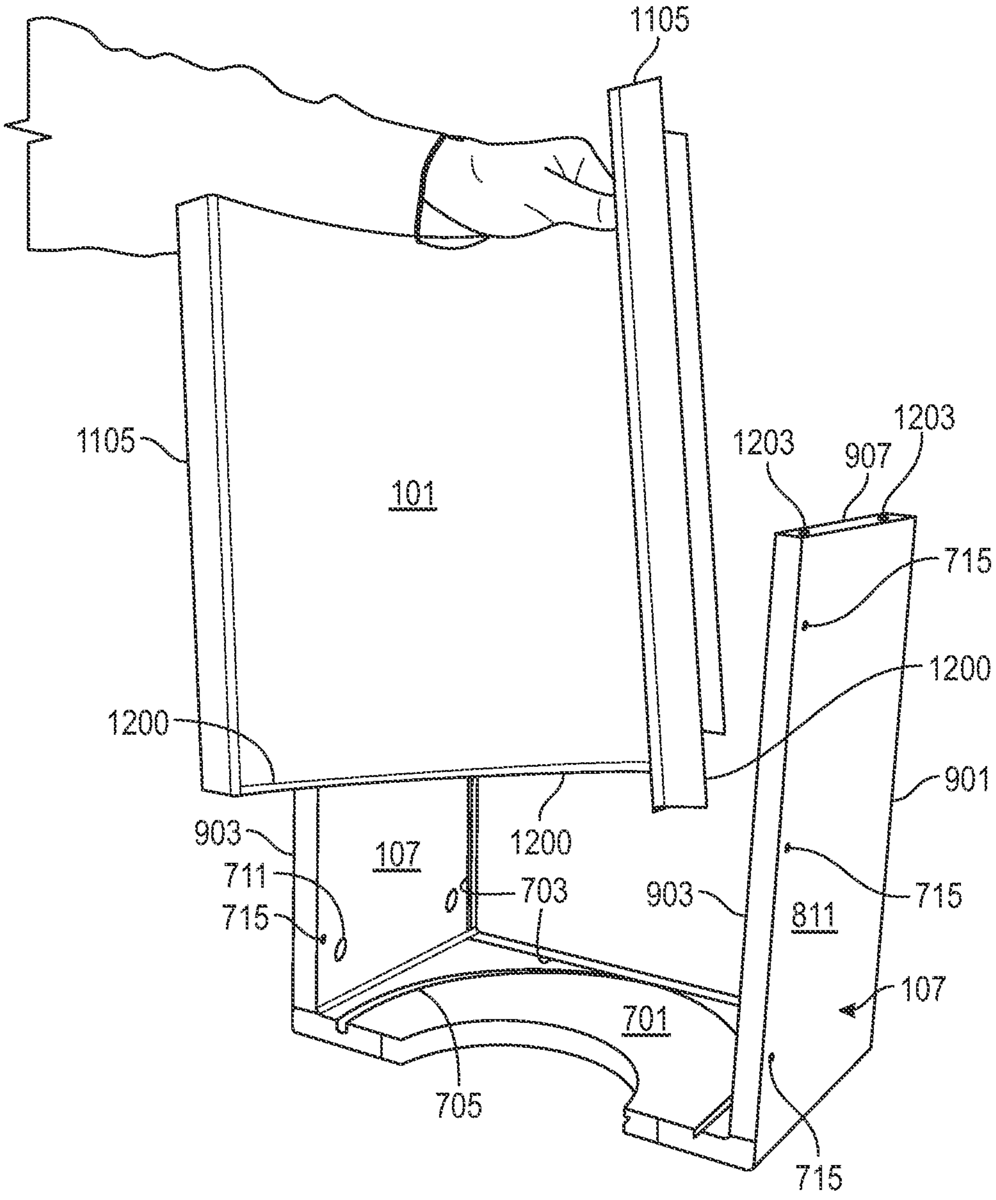
FIG. 16E is a top perspective view showing the floor-and-sidewalls member before that floor-and-sidewalls member may be attached to the front-panel.

FIG. 16E is a top perspective view showing floor-and-sidewalls 101 before floor-and-sidewalls 101 may be attached to front-panel 103. FIG. 16E is a top perspective view showing floor-and-sidewalls 101 before a terminal-end 1107 with attached end-gasket 1200 may be attached to channel 705 of the internal (interior) surface 701 of front-panel 103. In some embodiments, prior to attaching a terminal-end 1107 of floor-and-sidewalls 101 to channel 705 of the internal (interior) surface 701 of front-panel 103, a given end-gasket 1200 may need to be attached to that given terminal-end 1107. See e.g., FIG. 16G which shows a process of attaching a given end-gasket 1200 to a given terminal-end 1107 of floor-and-sidewalls 101. Once, the given end-gasket 1200 has been attached to the given terminal-end 1107 of floor-and-sidewalls 101, then that combination of terminal-end 1107, with attached end-gasket 1200, may be fitted into channel 705 of the internal (interior) surface 701 of front-panel 103.

Figure 16F:
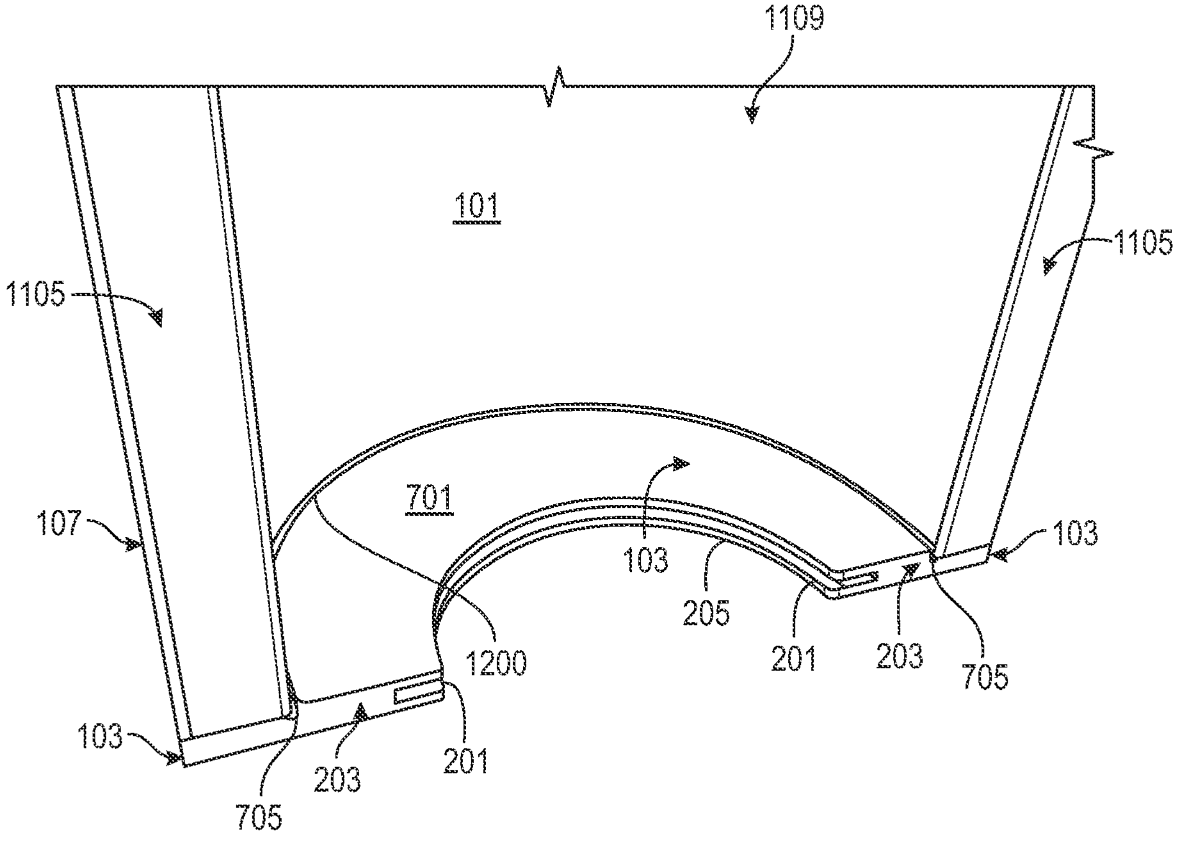
FIG. 16F is a partial top perspective view of the inside of the front-panel, with the floor-and-sidewalls member attached to the front-panel.

FIG. 16F shows the progress from FIG. 16E of attaching floor-and-sidewalls 101 to front-panel 103. FIG. 16F is a partial top perspective view of the inside of front-panel 103, with floor-and-sidewalls 101 attached to front-panel 103. FIG. 16F shows a given terminal-end 1107 combined with an attached end-gasket 1200 are together fitted into channel 705 of the internal (interior) surface 701 of front-panel 103, forming (creating) a watertight seal between floor-and-sidewalls 101 and front-panel 103. FIG. 16F may show (removable) attachment of one (1) terminal-end 1107 of floor-and-sidewalls 101 to the internal (interior) surface 701 of front-panel 103. In some embodiments, that one (1) terminal-end 1107 of floor-and-sidewalls 101 may be retained (captured) within receiving-channel 1201 of one (1) end-gasket 1200; and then that end-gasket 1200 along with its retained terminal-end 1107 of floor-and-sidewalls 101 may together both be fitted into the channel-for-end-gasket 705 that may be located on the internal (interior) surface 701 of front-panel 103; wherein this attachment configuration may result in a watertight seal between the internal (interior) surface 701 of front-panel 103 and floor-and-sidewalls 101.

Note, in some embodiments, attaching floor-and-sidewalls 101 to front-panel 103, may be done before or after sliding bottom-panel 113 into three of slots 703 of front-panel 103 and of the side-panels 107. In terms of the overall assembly of a given soaking-device 100, FIG. 16E and FIG. 16F (i.e., attaching floor-and-sidewalls 101 to front-panel 103) may come before or after FIG. 16D (i.e., sliding bottom-panel 113 into three of slots 703 of front-panel 103 and of the side-panels 107).

Figure 16G:
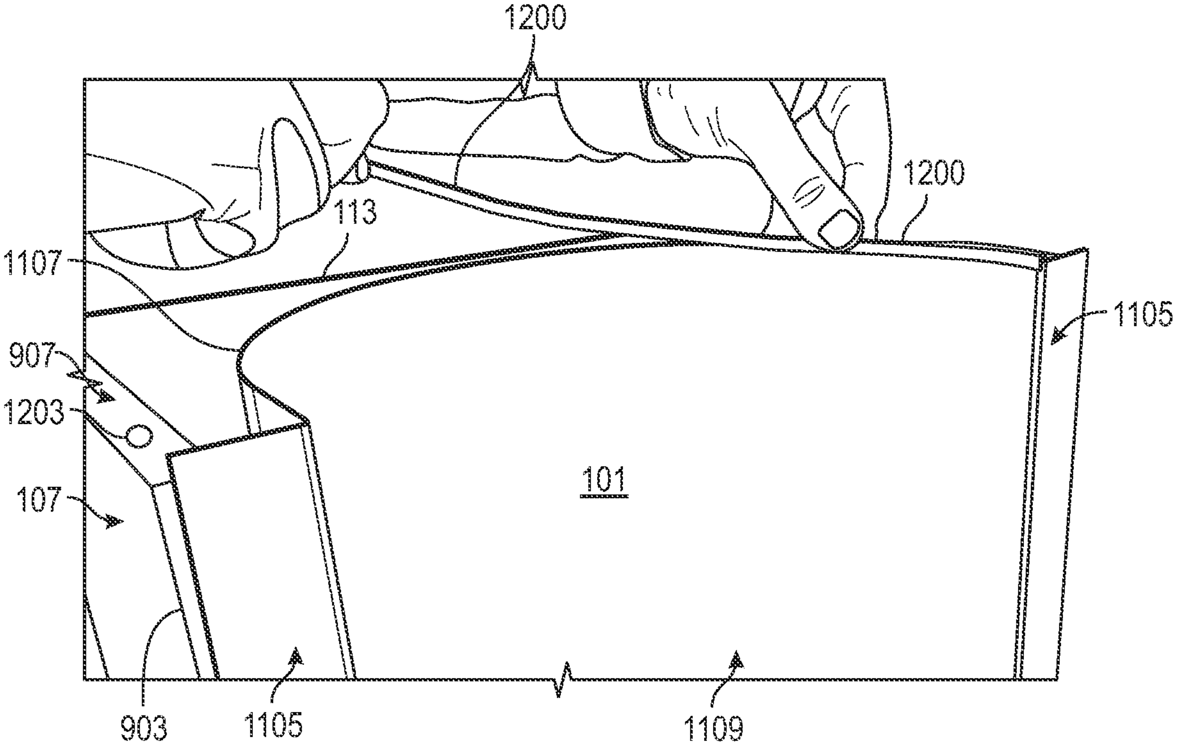
FIG. 16G is rear top partial perspective view, showing how a given terminal-end, of the floor-and-sidewalls, may be attached to a receiving-channel of a given end-gasket.

FIG. 16G is rear top partial perspective view, showing how a given terminal-end 1107, of floor-and-sidewalls 101, may be attached to receiving-channel 1201 of a given end-gasket 1200. In some embodiments, FIG. 16G may show end-gasket 1200 being fitted onto one (1) terminal-end 1107 of floor-and-sidewalls 101. In some embodiments, in FIG. 16G, the other terminal-end 1107 of floor-and-sidewalls 101, and the other end-gasket 1200, that are not shown in FIG. 16G may have already been attached to front-panel 103 as shown in FIG. 16F. In some embodiments, in FIG. 16G, one (1) end-gasket 1200 may be completely fitted onto one (1) terminal-end 1107 of floor-and-sidewalls 101 before rear-panel 105 may be attached to side-panels 107. In some embodiments, to attach a given end-gasket 1200 to a given terminal-end 1107 of floor-and-sidewalls 101, that terminal-end 1107 may be pushed into the receiving-channel 1201 of that end-gasket 1200.

Figure 16H:
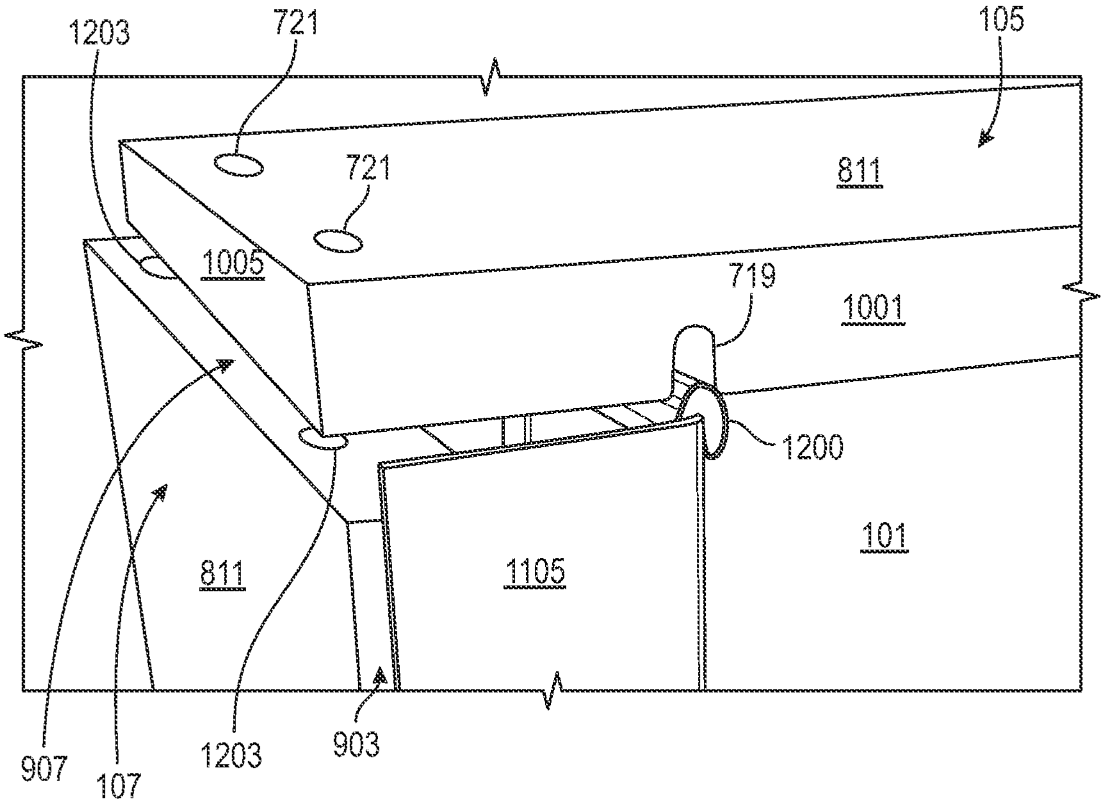
FIG. 16H shows a close-up detail view of how a given terminal-end, of the floor-and-sidewalls member, that has an attached end-gasket, may together be fitted into a channel of the internal (interior) surface of the rear-panel.

FIG. 16H shows a close-up detail view of how a given terminal-end 1107, of floor-and-sidewalls 101, that has an attached end-gasket 1200, may together be fitted into channel 719 of the internal (interior) surface 701 of rear-panel 105, to form (create and/or generate) a watertight seal between floor-and-sidewalls 101 and rear-panel 105. In some embodiments, FIG. 16H may show fitting of a given end-gasket 1200 that is retained on a given terminal-end 1107 of floor-and-sidewalls 101 into the channel-for-end-gasket 719 located on the internal (interior) surface 701 of rear-panel 105. Completion of this fitting may result in a watertight seal between at least some of the internal (interior) surface 701 of rear-panel 105 and floor-and-sidewalls 101.

Note, this fitting process shown in FIG. 16H between one end of floor-and-sidewalls 101 (along its attached end-gasket 1200) and rear-panel 105, may be essentially the same fitting process between the other end of floor-and-sidewalls 101 (along its attached other end-gasket 1200) and front-panel 103 (see e.g., FIG. 16F).

FIG. 16H may also show how bores 1203 of side-panels 107 and of apertures 721 of rear-panel 105 may be collinearly aligned to receive various portions of fasteners 109 for attaching rear-panel 105 to the side-panels 107.

Figure 16I:
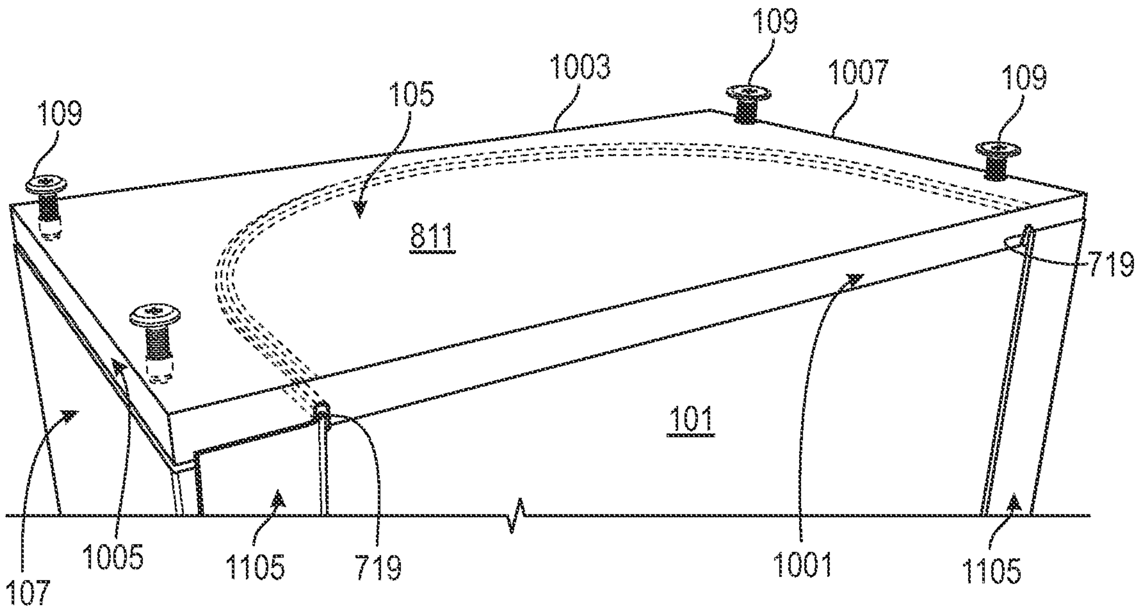
FIG. 16I is a partial rear top perspective view showing the floor-and-sidewalls attached to the rear-panel and showing fasteners (e.g., screws and/or bolts) about to secure that rear-panel to the two side-panels.

FIG. 16I is a partial rear top perspective view showing floor-and-sidewalls 101 attached to rear-panel 105 and showing fasteners 109 about to secure rear-panel 105 to the two side-panels 107. In some embodiments, once, these fasteners 109 may be secured (tightened), then rear-panel 105 may be securely attached to the two side-panels 107. In some embodiments, once, these fasteners 109 may be secured (tightened), then rear-panel 105 may be securely attached to the two side-panels 107; which may further support the attachment between rear-panel 105 and floor-and-sidewalls 101. In some embodiments, once, these fasteners 109 may be secured (tightened), then rear-panel 105 may be securely attached to the two side-panels 107; which may further increase pressure between where rear-panel 105 may be attached to floor-and-sidewalls 101. In some embodiments, when rear-panel 105 may be attached side-panel 107, each aperture 721 (of rear-panel 105) may be collinearly aligned with one bore 1203 of a given side-panel 107, so that portions of a given fastener 109 may pass into that pair of collinearly aligned aperture 721 and bore 1203. In some embodiments, fastener 109 may be a threaded mechanical fastener. In some embodiments, fastener 109 may be a screw, a bolt, and/or the like. In some embodiments, FIG. 16I may show attachment of rear-panel 105 to side-panels 107 by use of fasteners 109. In some embodiments, at this point (e.g., prior to attaching rear-panel 105 to side-panels 107) in the assembly process: side-panels 107 were previously attached to front-panel 103 (see e.g., FIG. 16A to FIG. 16C); one (a first) terminal-end 1107 of floor-and-sidewalls 101 was attached to the internal (interior) surface 701 of front-panel 103 (e.g., by use of one end-gasket 1200 and channel 705) (see e.g., FIG. 16F); bottom-panel 113 was inserted into three slots 703 located in the internal (interior) surface 701 of front-panel 103 and of the two side-panels 107 (see e.g., FIG. 16D); and the remaining (a second) terminal-end 1107 of floor-and-sidewalls 101 was attached to the internal (interior) surface 701 of rear-panel 105 (e.g., by use of the other end-gasket 1200 and channel 719) (see e.g., FIG. 16H).

In some embodiments, once front-panel 103 may be attached to the two side-panels 107, once floor-and-sidewalls 101 may be attached to front-panel 103, once bottom-panel 113 may be attached to front-panel 103 and to the two side-panels 107, once floor-and-sidewalls 101 may be attached to rear-panel 105, and once rear-panel 105 may be attached to the two side-panels 107; then handles 1300 may be attached to the side-panels 107. In some embodiments, one handle 1300 may be attached to one side-panel 107. See e.g., FIG. 13A to FIG. 13D for handle 1300 and for attachment of a given handle 1300 to a given side-panel 107.

Figure 16J:
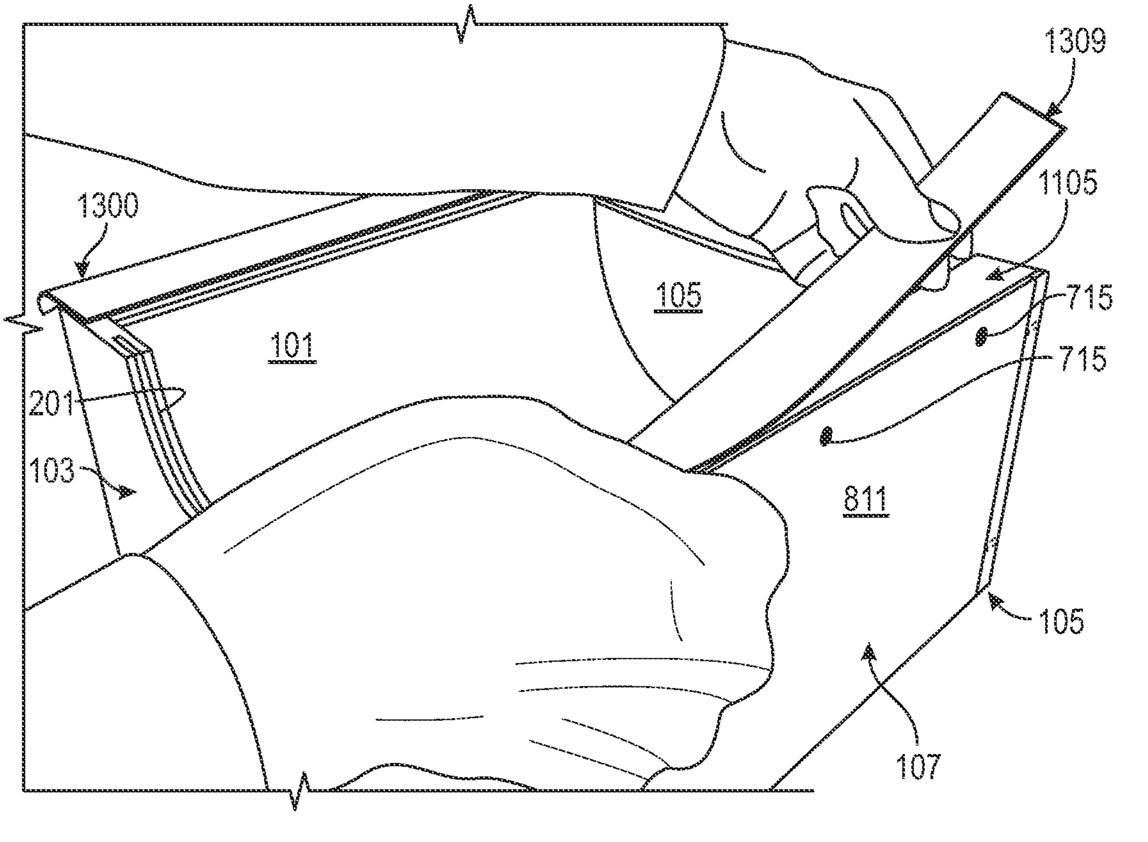
FIG. 16J is a top side perspective view showing a step of installing, locating, and/or placing at least one thermal-break onto a top of a top-ledge of the floor-and-sidewalls member before securing a given handle to a given side-panel.

FIG. 16J is a top side perspective view showing a step of installing, locating, and/or placing at least one thermal-break 1309 onto a top of a given top-ledge 1105 of floor-and-sidewalls 101 before securing a given handle 1300 to a given side-panel 107. FIG. 16J shows a step of installing, locating, and/or placing at least one thermal-break 1309 onto a top of the top-ledge 1105 of the floor-and-sidewalls 101 before securing a given handle 1300 to a given side-panel 107. In some embodiments, installed thermal-break 1309 may slow down heat transfer from floor-and-sidewalls 101 (e.g., from top-ledge 1105 and/or from sidewall-portion 1103) to handle 1300.

However, in some embodiments, thermal-break 1309 may be omitted. In some embodiments, thermal-break 1309 may be optional.

FIG. 17A through FIG. 17H show various aspects of breathing-apparatus 1700.

Figure 17A:
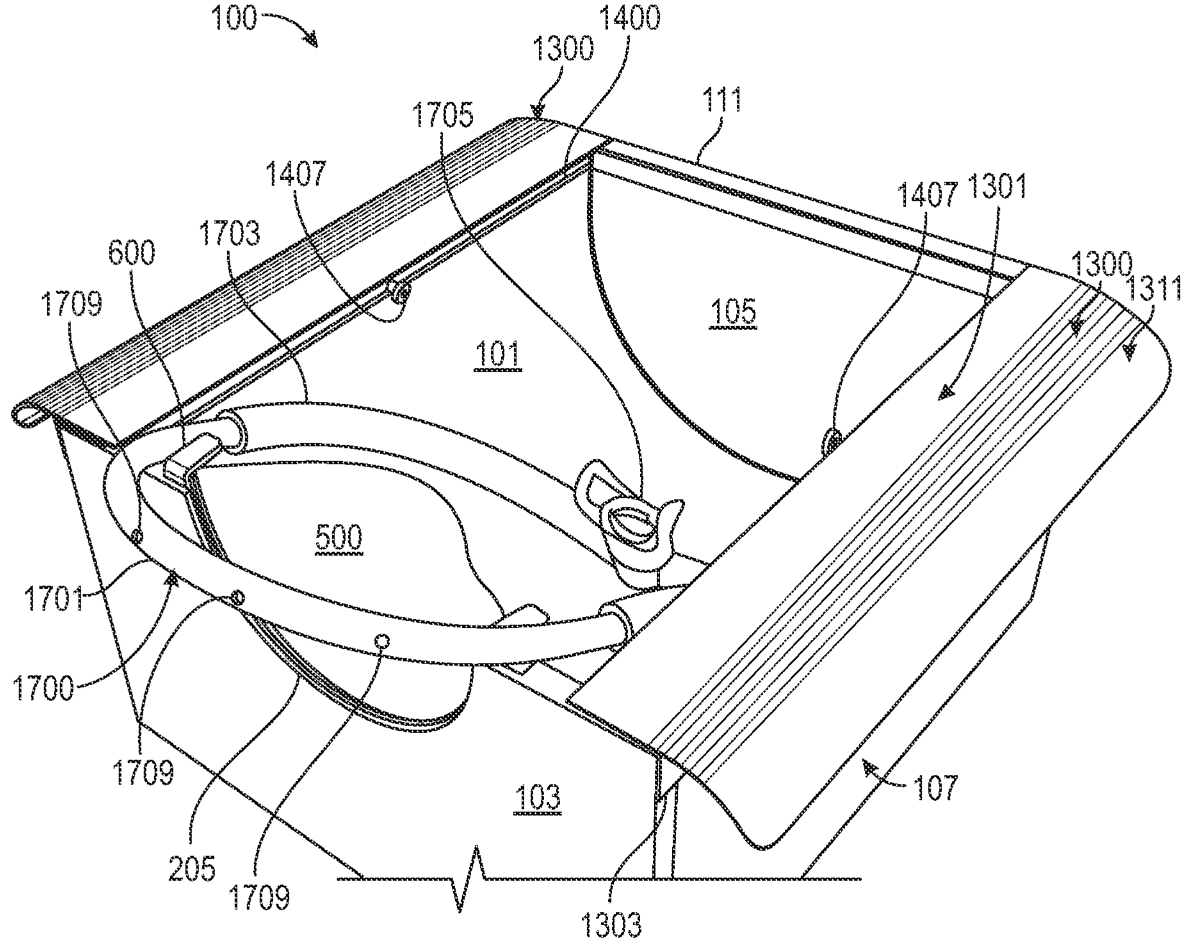
FIG. 17A is a top front right side perspective view of the soaking-device of FIG. 1A shown along with a breathing-apparatus.

FIG. 17A is a top front right side perspective view of soaking-device 100 along with a breathing-apparatus 1700. In FIG. 17A, breathing-apparatus 1700 is shown partially residing (resting) within the vessel portion of soaking-device 100, i.e., with a portion of breathing-apparatus 1700 in direct physical contact with floor-portion 1101 of floor-and-sidewalls 101. In some embodiments of breathing-apparatus 1700, FIG. 17A may show a general size relationship (comparison) between soaking-device 100 and breathing-apparatus 1700. In some embodiments, when user 190 may have their mouth and/or nose submerged within immersion-liquid 180 within the vessel portion of soaking-device 100, then that user 190 may continue to breathe by use of breathing-apparatus 1700.

Figure 17B:
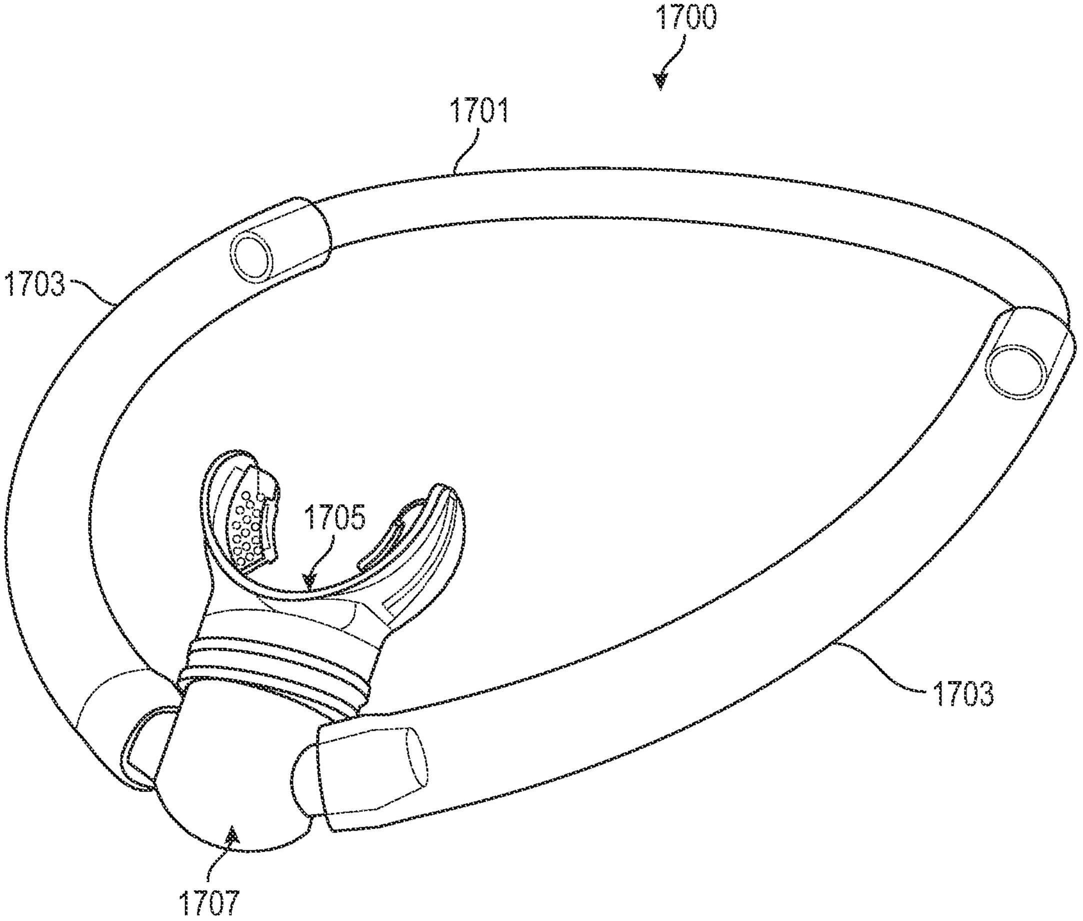
FIG. 17B shows a perspective view of just the breathing-apparatus of FIG. 17A (in its assembled configuration).

FIG. 17B shows a perspective view of just breathing-apparatus 1700 (in its assembled configuration). In some embodiments, breathing-apparatus 1700 may be comprised of one or more of: a rigid-elongate-hollow-member 1701, a flexible-elongate-hollow-member 1703, and a mouthpiece 1705. In some embodiments, breathing-apparatus 1700 may be comprised of: at least one rigid-elongate-hollow-member 1701, two separate flexible-elongate-hollow-members 1703, and one mouthpiece 1705. In some embodiments, breathing-apparatus 1700 may further comprise one or more fittings 1707. In some embodiments, breathing-apparatus 1700 may be comprised of one or more of: rigid-elongate-hollow-member 1701, flexible-elongate-hollow-member 1703, mouthpiece 1705, and/or fitting 1707.

Continuing discussing FIG. 17B, in some embodiments, mouthpiece 1705 may be configured to be removably gripped by a mouth, lip, teeth, and/or gums of user 190. In some embodiments, mouthpiece 1705 may be at least substantially similar to a mouthpiece used in snorkels (for use in snorkeling) and/or to a mouthpiece used in a breathing apparatus for SCUBA diving. In some embodiments, mouthpiece 1705 may be fitted with at least one one-way-valve (check-valve) that is configured to release immersion-liquid 180 from mouthpiece 1705 but is also configured to block (prevent and/or minimize) immersion-liquid 180 from entering past that check-valve and getting into mouthpiece 1705. In some embodiments, this check-valve may be a flapper type check-valve. Such check-valves are common on snorkeling snorkels and are incorporated by reference herein. In some embodiments, mouthpiece 1705 may be at least substantially (mostly) made from injection molding. In some embodiments, mouthpiece 1705 may be at least substantially (mostly) made from one or more: elastomers, silicone, rubber, a flexible plastic, portions thereof, combinations thereof, and/or the like. In some embodiments, mouthpiece 1705 may be operatively connected to a terminal end of one or more of flexible-elongate-hollow-member(s) 1703; and/or to one or more fitting(s) 1707. In some embodiments, mouthpiece 1705 may be configured for washing and/or sterilizing within a dishwasher. In some embodiments, mouthpiece 1705 may be configured for sterilizing within a microwave and/or oven.

Continuing discussing FIG. 17B, in some embodiments, flexible-elongate-hollow-member 1703 may be configured to operatively link mouthpiece 1705 to rigid-elongate-hollow-member 1701. In some embodiments, flexible-elongate-hollow-member 1703 may be an elongate member that is hollow and at least partially flexible. In some embodiments, flexible-elongate-hollow-member 1703 may be an elongate member that is tubular and hollow. In some embodiments, flexible-elongate-hollow-member 1703 may have a predetermined, fixed, finite, and/or non-variable length. In some embodiments, flexible-elongate-hollow-member 1703 may have a variable length because flexible-elongate-hollow-member 1703 may be stretchable and/or because at least some of flexible-elongate-hollow-member 1703 may have an accordion aspect that permits some expansion or some retraction. In some embodiments, flexible-elongate-hollow-member 1703 may comprise two opposing terminal ends. In some embodiments, at each of the two terminal ends of flexible-elongate-hollow-member 1703 may be one main opening to the hollow interior of flexible-elongate-hollow-member 1703; such that, flexible-elongate-hollow-member 1703 has two opposing main openings. In some embodiments, one terminal end of flexible-elongate-hollow-member 1703 may be configured for (removable) attachment to mouthpiece 1705 and/or to a fitting 1707; whereas, the other remaining terminal end of flexible-elongate-hollow-member 1703 may be configured to (removable) attachment to rigid-elongate-hollow-member 1701 and/or to another different fitting 1707. In some embodiments, breathing-apparatus 1700 may comprise two separate and distinct flexible-elongate-hollow-members 1703. In some embodiments, at least some of flexible-elongate-hollow-member 1703 may be made from the same or at least substantially (mostly) similar materials the flexible tubing used in snorkeling snorkels and/or SCUBA gear breathing tubing. In some embodiments, at least some of flexible-elongate-hollow-member 1703 may be made from extruding one or more: elastomers, silicone, rubber, flexible plastic, portions thereof, combinations thereof, and/or the like. In some embodiments, at least some of flexible-elongate-hollow-member 1703 may be reinforced to minimize or prevent kinking of flexible-elongate-hollow-member 1703. In some embodiments, at least some of flexible-elongate-hollow-member 1703 may be braided to reinforce flexible-elongate-hollow-member 1703. In some embodiments, at least some of flexible-elongate-hollow-member 1703 may be optically transparent and/or translucent with respect to human vision, as that may permit a cleanliness state of flexible-elongate-hollow-member 1703 to be determined by human visual inspection from an exterior of flexible-elongate-hollow-member 1703. In some embodiments, flexible-elongate-hollow-member 1703 may be configured for washing and/or sterilizing within a dishwasher. In some embodiments, flexible-elongate-hollow-member 1703 may be configured for sterilizing within a microwave and/or oven.

Continuing discussing FIG. 17B, in some embodiments, rigid-elongate-hollow-member 1701 may be configured to operatively link rigid-elongate-hollow-member 1701 to mouthpiece 1705 via at least one intermediary of flexible-elongate-hollow-member 1703. In some embodiments, rigid-elongate-hollow-member 1701 may be directly connected to one or two flexible-elongate-hollow-member(s) 1703. In some embodiments, rigid-elongate-hollow-member 1701 may be directly connected to one or two fitting(s) 1707. In some embodiments, rigid-elongate-hollow-member 1701 may be an elongate member that is hollow and fixedly rigid (at least compared to flexible-elongate-hollow-member 1703). In some embodiments, rigid-elongate-hollow-member 1701 may be rigid. Whereas, in other embodiments, rigid-elongate-hollow-member 1701 may be flexible, with a same or similar flexibility as flexible-elongate-hollow-member 1703. In some embodiments, rigid-elongate-hollow-member 1701 may be an elongate member that is tubular and hollow. In some embodiments, rigid-elongate-hollow-member 1701 may have a predetermined, fixed, finite, and/or non-variable length. In some embodiments, an overall length of rigid-elongate-hollow-member 1701 may have a predetermined overall shape. In some embodiments, this overall shape of rigid-elongate-hollow-member 1701 may a fixed and predetermined curvature. In some embodiments, this overall shape of rigid-elongate-hollow-member 1701 may be of a fixed and predetermined arc. In some embodiments, this overall shape of rigid-elongate-hollow-member 1701 may at least substantially (mostly) resemble a letter “c,” half-circle, semicircle, half-oval, half-ellipse, portions thereof, combinations thereof, and/or the like. In some embodiments, rigid-elongate-hollow-member 1701 may comprise two opposing terminal ends. In some embodiments, at each of the two terminal ends of rigid-elongate-hollow-member 1701 may be one main opening to the hollow interior of rigid-elongate-hollow-member 1701; such that, rigid-elongate-hollow-member 1701 has two opposing main openings. In some embodiments, only one of the two terminal ends of rigid-elongate-hollow-member 1701 may have a single main opening to the hollow interior of rigid-elongate-hollow-member 1701; such that, rigid-elongate-hollow-member 1701 has only one main opening. In some embodiments, one terminal end of rigid-elongate-hollow-member 1701 may be configured for (removable) attachment to flexible-elongate-hollow-member 1703 and/or to a fitting 1707; whereas, the other remaining terminal end of rigid-elongate-hollow-member 1701 may be configured to (removable) attachment to a separate and different flexible-elongate-hollow-member 1703 and/or to another different fitting 1707. In some embodiments, breathing-apparatus 1700 may comprise one rigid-elongate-hollow-member 1701. In some embodiments, at least some of rigid-elongate-hollow-member 1701 may be made from the same or at least substantially (mostly) similar materials as the tubing used in snorkeling snorkels and/or used in SCUBA gear breathing tubing. In some embodiments, at least some of rigid-elongate-hollow-member 1701 may be made from extruding one or more: metals, alloys, aluminum, stainless steel, elastomers, silicone, rubber, rigid plastic, flexible plastic, plastic, PVC, ABS, portions thereof, combinations thereof, and/or the like. In some embodiments, at least some of rigid-elongate-hollow-member 1701 may be reinforced to minimize or prevent kinking of rigid-elongate-hollow-member 1701. In some embodiments, at least some of rigid-elongate-hollow-member 1701 may be braided to reinforce rigid-elongate-hollow-member 1701. In some embodiments, at least some of rigid-elongate-hollow-member 1701 may be optically transparent and/or translucent with respect to human vision, as that may permit a cleanliness state of rigid-elongate-hollow-member 1701 to be determined by human visual inspection from an exterior of rigid-elongate-hollow-member 1701. In some embodiments, rigid-elongate-hollow-member 1701 may be configured for washing and/or sterilizing within a dishwasher. In some embodiments, rigid-elongate-hollow-member 1701 may be configured for sterilizing within a microwave and/or oven.

Continuing discussing FIG. 17B, in some embodiments, breathing-apparatus 1700 may comprise one or more fittings 1707. In some embodiments, breathing-apparatus 1700 may comprise no fittings 1707. In some embodiments, fitting 1707 may be optional and/or omitted in breathing-apparatus 1700. In some embodiments, a given fitting 1707 may be configured to operatively link: rigid-elongate-hollow-member 1701 to flexible-elongate-hollow-member 1703; flexible-elongate-hollow-member 1703 to mouthpiece 1705; combinations thereof; and/or the like. In some embodiments, a given fitting 1707 may be hollow. In some embodiments, a given fitting 1707 may be at least substantially (mostly) similar to a given plumbing fitting used to attach one end of a tube, tubing, hose, or pipe to another end of a tube, tubing, hose, or pipe. In some embodiments, a given fitting 1707 may comprise one or more hose barbs, threads, unions, couplings, portions thereof, combinations thereof, and/or the like. In some embodiments, a given fitting 1707 may function via friction and/or compression. In some embodiments, fitting 1707 may be rigid, flexible, combinations thereof, and/or the like. In some embodiments, at least some of fitting 1707 may be made from one or more: metals, alloys, aluminum, stainless steel, elastomers, silicone, rubber, rigid plastic, flexible plastic, plastic, PVC, ABS, portions thereof, combinations thereof, and/or the like. In some embodiments, at least some of fitting 1707 may be reinforced to minimize or prevent kinking of fitting 1707. In some embodiments, at least some of fitting 1707 may be braided to reinforce fitting 1707. In some embodiments, at least some of fitting 1707 may be optically transparent and/or translucent with respect to human vision, as that may permit a cleanliness state of fitting 1707 to be determined by human visual inspection from an exterior of fitting 1707. In some embodiments, fitting 1707 may be configured for washing and/or sterilizing within a dishwasher. In some embodiments, fitting 1707 may be configured for sterilizing within a microwave and/or oven.

Figure 17C:
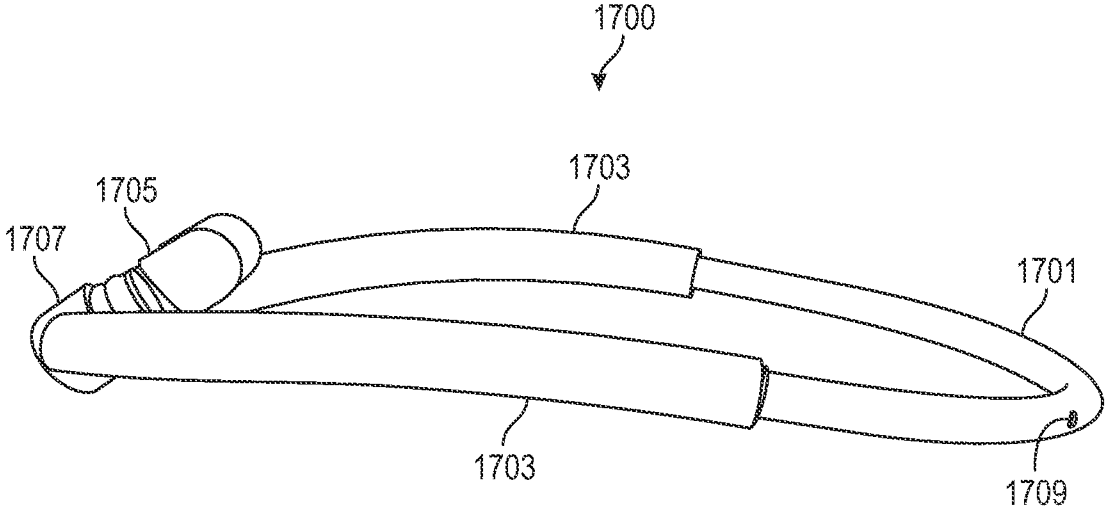
FIG. 17C shows a (right) side perspective view of the breathing-apparatus of FIG. 17A (in its assembled configuration).

FIG. 17C shows a (right) side perspective view of just breathing-apparatus 1700 (in its assembled configuration). FIG. 17C may show at least one aperture 1709. In some embodiments, breathing-apparatus 1700 may comprise at least one aperture 1709. In some embodiments, rigid-elongate-hollow-member 1701 may comprise at least one aperture 1709. In some embodiments, aperture 1709 may be a through hole that passes entirely through a sidewall of rigid-elongate-hollow-member 1701 from an exterior of rigid-elongate-hollow-member 1701 and into the hollow interior of rigid-elongate-hollow-member 1701. In some embodiments, aperture 1709 may extend in a radial direction that may be at least substantially (mostly) orthogonal or perpendicular with respect to an axial length of rigid-elongate-hollow-member 1701. In some embodiments, one or more apertures 1709 may be located on the exterior/outside curving arc of rigid-elongate-hollow-member 1701 that may be disposed and/or facing away from mouthpiece 1705, when breathing-apparatus 1700 is in its assembled configuration (see e.g., FIG. 17D). In some embodiments, when breathing-apparatus 1700 is in its assembled configuration and in use (as intended), with mouthpiece 1705 and a mouth of user 190 submerged within immersion-liquid 180 of the vessel portion of soaking-device 100, the aperture(s) 1709 may remain above and outside of immersion-liquid 180 and thus essentially dry (aside from moisture in respiratory gasses and in the ambient air's humidity) (see e.g., FIG. 17H).

Figure 17D:
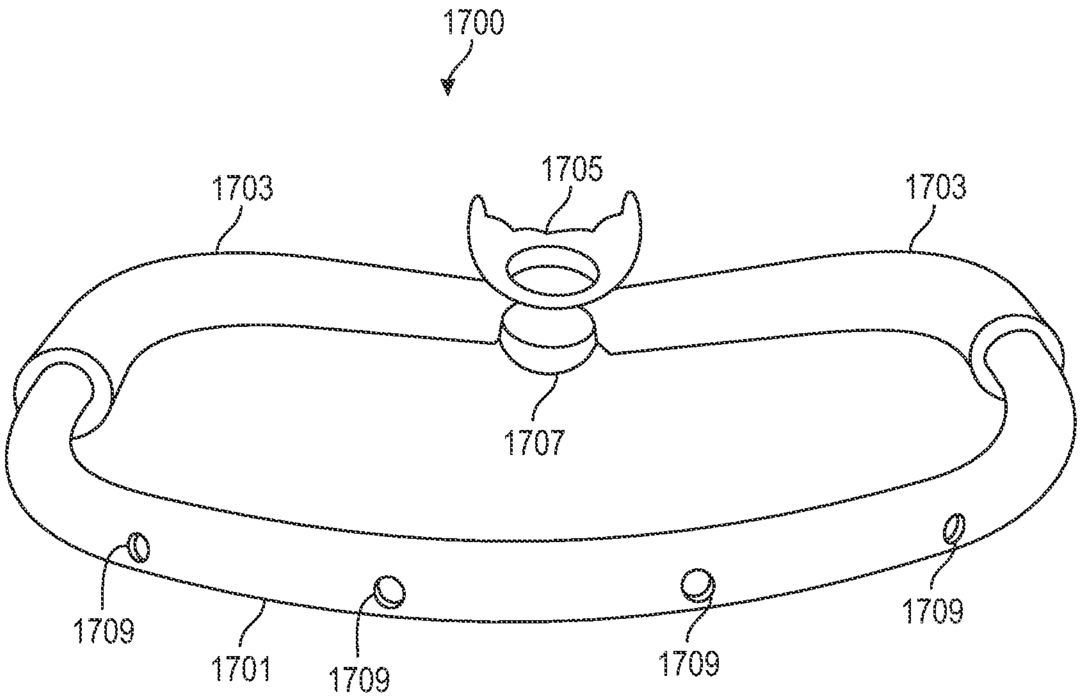
FIG. 17D shows another perspective view of just the breathing-apparatus of FIG. 17A (in its assembled configuration).

FIG. 17D shows another perspective view of just breathing-apparatus 1700 (in its assembled configuration). FIG. 17D may be from a view that opposing from the other perspective view of FIG. 17B. FIG. 17D may show two or more apertures 1709 of rigid-elongate-hollow-member 1701. FIG. 17D may show two or more apertures 1709 located on the exterior/outside curving arc of rigid-elongate-hollow-member 1701 that may be disposed and/or facing away from mouthpiece 1705, when breathing-apparatus 1700 is in its assembled configuration.

Figure 17E:
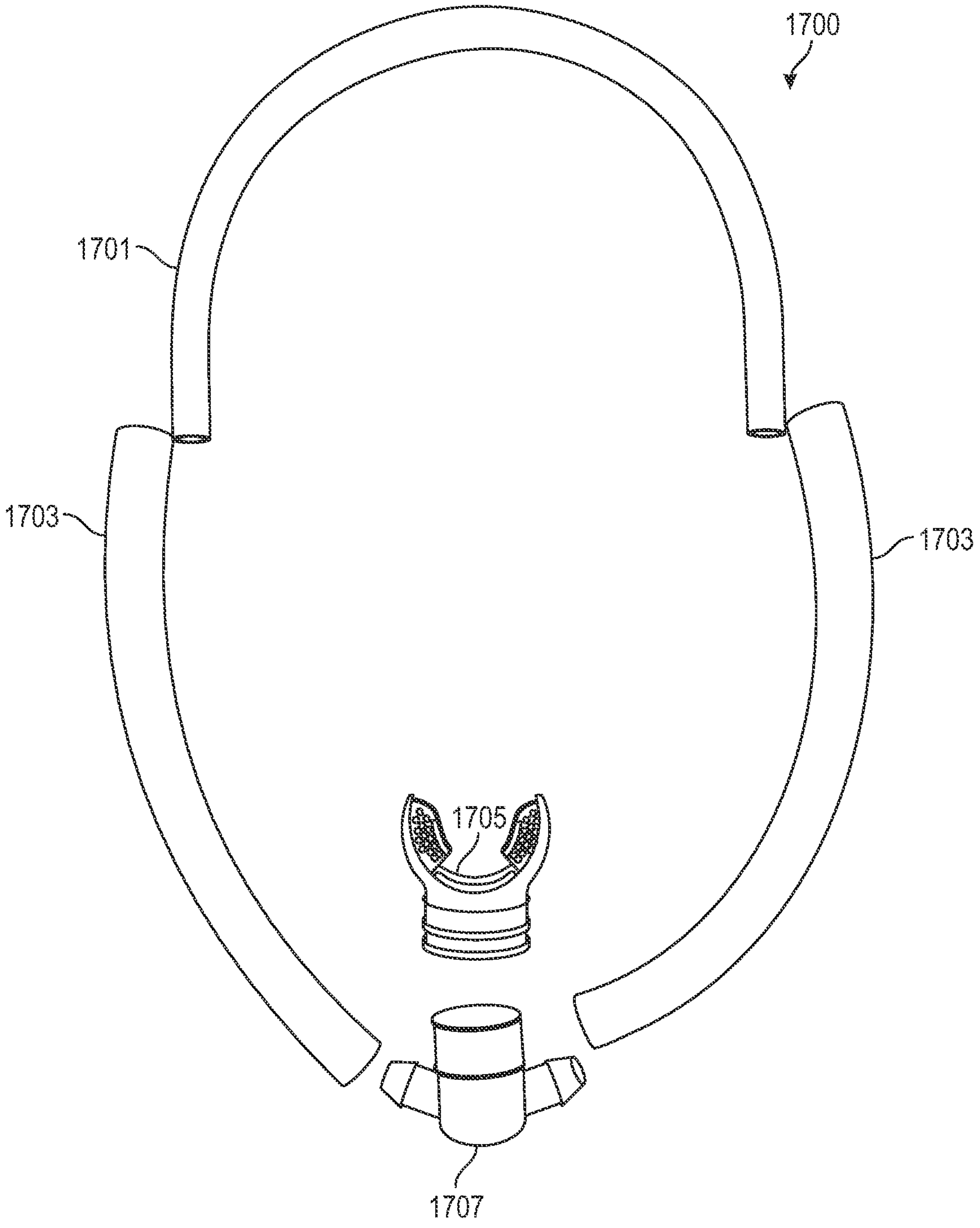
FIG. 17E is a top-down view of one embodiment of a breathing-apparatus, showing that breathing-apparatus embodiment in a disassembled configuration.

FIG. 17E is a top-down view of one embodiment of breathing-apparatus 1700, showing that breathing-apparatus 1700 embodiment in a disassembled configuration. In some embodiments, breathing-apparatus 1700 may comprise one rigid-elongate-hollow-member 1701, two separate and distinct flexible-elongate-hollow-members 1703, one mouthpiece 1705, and one fitting 1707. In some embodiments, each opposite terminal end of rigid-elongate-hollow-member 1701 may be (removably) connected to a given terminal end of one of the two flexible-elongate-hollow-members 1703. In some embodiments, the other remaining two terminals ends of the flexible-elongate-hollow-members 1703 may each be (removably) connected to a different location of the same fitting 1707. In some embodiments, that fitting may be further (removably) connected to mouthpiece 1705. In some embodiments, the parts and/or components of breathing-apparatus 1700 may be routinely disassembled to facilitate cleaning and/or sterilization of those parts and/or components of breathing-apparatus 1700.

Figure 17F:
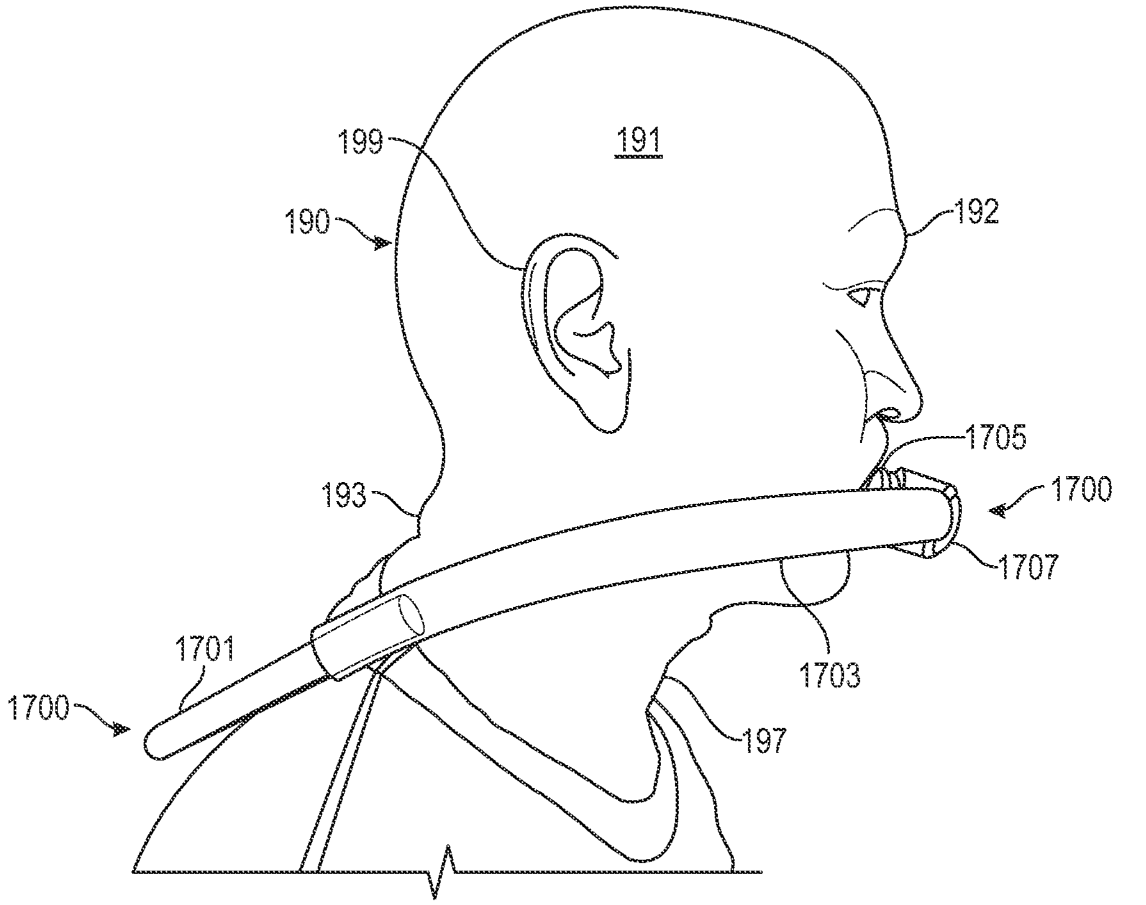
FIG. 17F is right side view of the breathing-apparatus of FIG. 17A (in its assembled configuration) in its intended relational configuration with respect to human user.
Figure 17G:
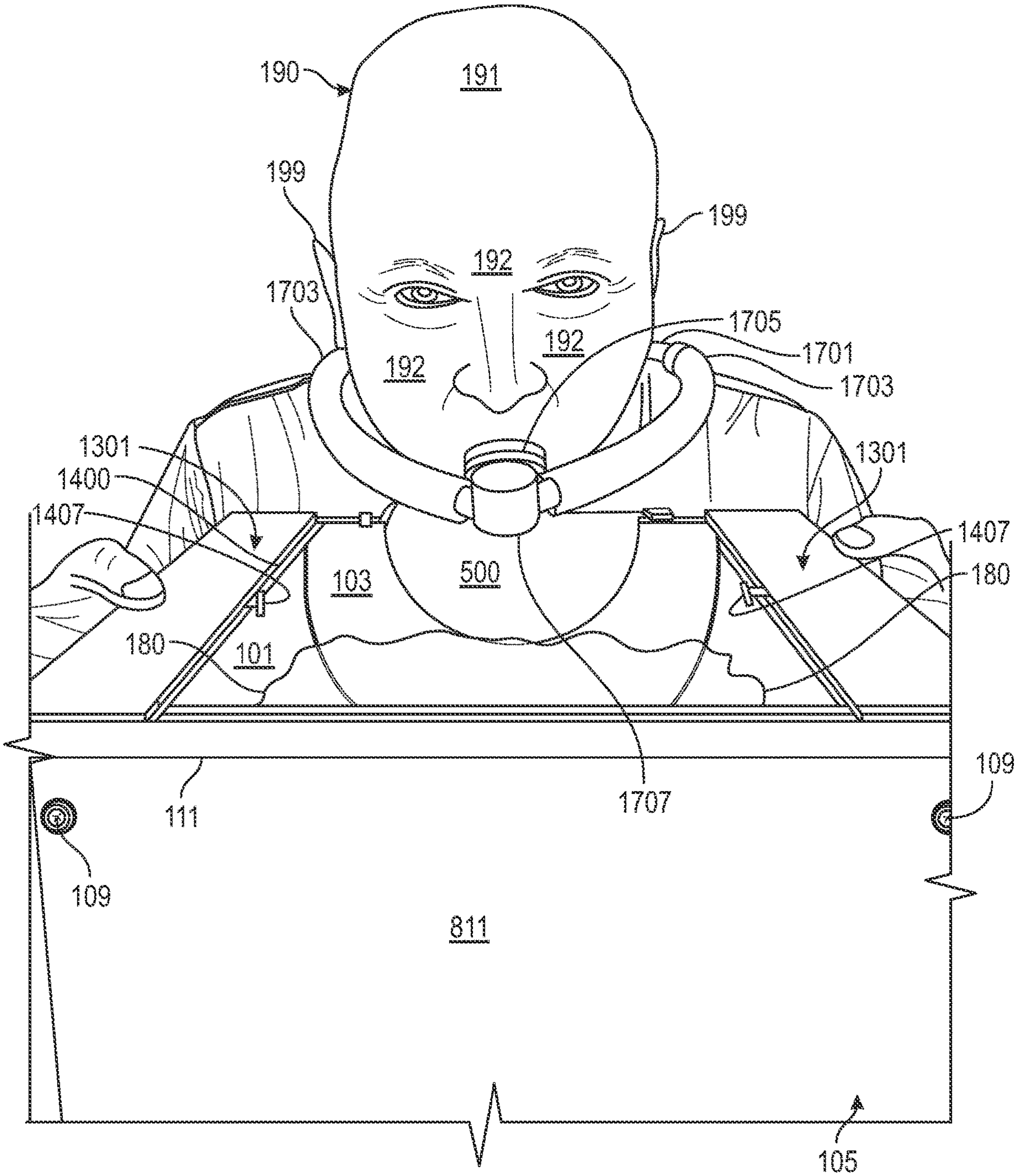
FIG. 17G is a rear top perspective view of the soaking-device of FIG. 1A and showing the breathing-apparatus of FIG. 17B (removably) fitted to a human user, but with the head of the human user not yet at least partially submerged within the immersion-liquid of the vessel portion of the soaking-device of FIG. 1A.
Figure 17H:
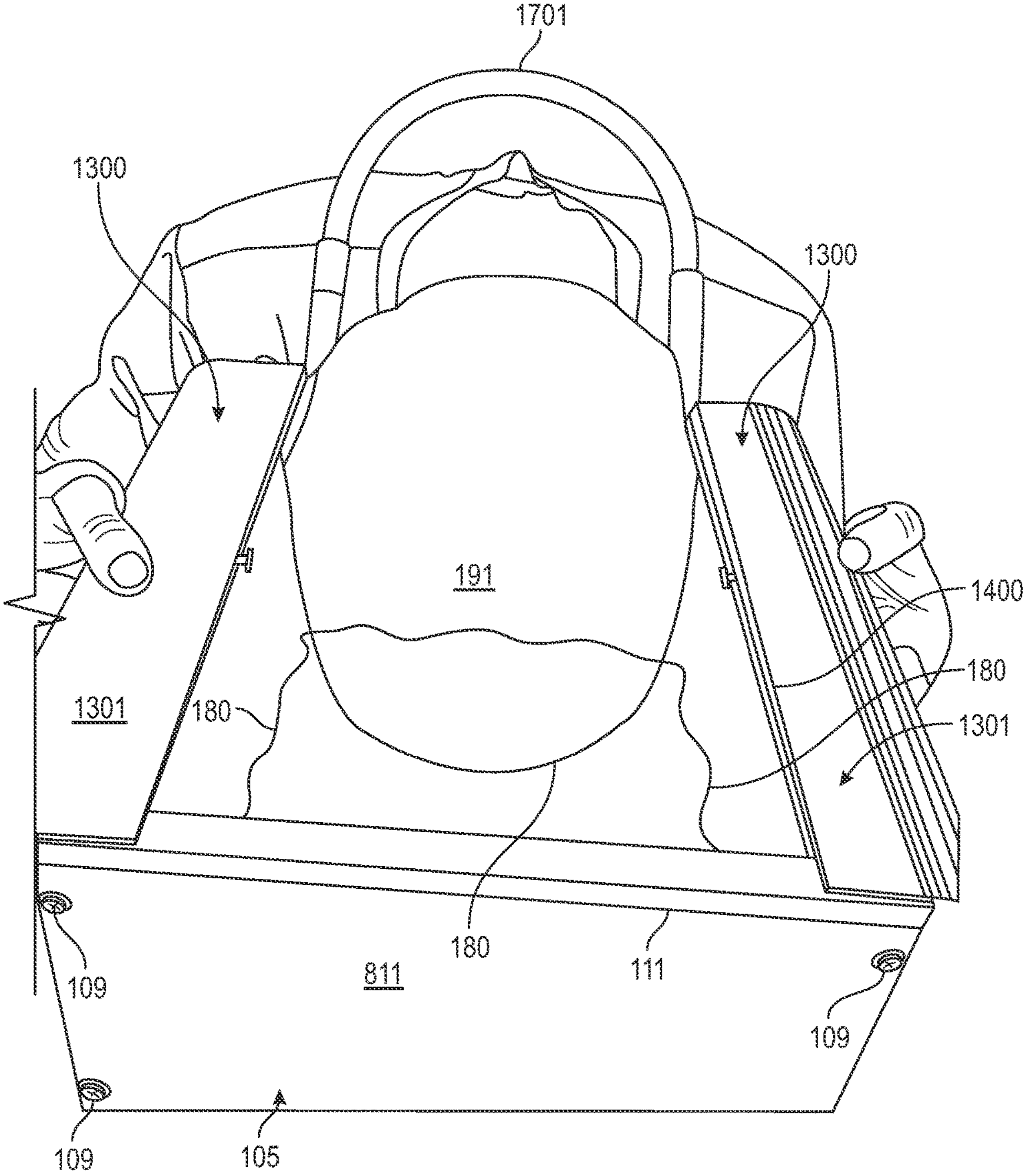
FIG. 17H is a rear top perspective view of the soaking-device of FIG. 1A and showing the breathing-apparatus of FIG. 17B (removably) fitted to a human user, but with the head (and/or the face) of the human user at least partially submerged within the immersion-liquid of the vessel portion of the soaking-device of FIG. 1A.

FIG. 17F is right side view of breathing-apparatus 1700 in its intended relational configuration with respect to user 190; showing mouthpiece 1705 currently being gripped by the mouth, lip, teeth, and/or gums of user 190; with each of the two separate and distinct flexible-elongate-hollow-members 1703 passing over a side of face 192 of user 190; with opposite portions of breathing-apparatus 1700 in direct physical contact with the shoulders of user 190 (or with those opposite portions of breathing-apparatus 1700 close to the shoulders of user 190 [e.g., within two inches of the given shoulder of user 190]); and with rigid-elongate-hollow-member 1701 being disposed over an upper back portion of user 190. In some embodiments, when breathing-apparatus 1700 is in use (as intended), such as shown in FIG. 17F through FIG. 17H, the opposite portions of breathing-apparatus 1700 may be in direct physical contact with the shoulders of user 190 or those opposite portions of breathing-apparatus 1700 may be located close (near, adjacent, proximate) to the shoulders of user 190, such as, within two inches of the given shoulder of user 190. In some embodiments, the opposite portions of breathing-apparatus 1700 that may be near or in direct physical contact with the shoulder(s) of user 190, may portions of flexible-elongate-hollow-member 1703 and/or of rigid-elongate-hollow-member 1701. In some embodiments, when breathing-apparatus 1700 is in use (as intended), such as shown in FIG. 17F through FIG. 17H, the curvature and/or arc of rigid-elongate-hollow-member 1701 may help to keep the opposite portions of breathing-apparatus 1700 resting upon the shoulders of user 190. In some embodiments, when breathing-apparatus 1700 is in use (as intended), such as shown in FIG. 17F through FIG. 17H, the curvature and/or arc of rigid-elongate-hollow-member 1701 may help to an overall alignment of breathing-apparatus 1700 in a position that is comfortable for user 190. In some embodiments, when breathing-apparatus 1700 is in use (as intended), such as shown in FIG. 17F through FIG. 17H, head 191 of user 190 may be located in the interior void space of breathing-apparatus 1700, with a front of head 191 of user 190 being located closer to mouthpiece 1705 than to rigid-elongate-hollow-member 1701. In some embodiments, when breathing-apparatus 1700 is in use (as intended), such as shown in FIG. 17F through FIG. 17H, the curvature and/or arc of rigid-elongate-hollow-member 1701 may help to keep the opposite portions of breathing-apparatus 1700 resting upon the shoulders of user 190.

FIG. 17G is a rear top perspective view of soaking-device 100, showing breathing-apparatus 1700 (removably) fitted to user 190, but with head 191 of user 190 not yet at least partially submerged within immersion-liquid 180 of the vessel portion of soaking-device 100. In some embodiments, when breathing-apparatus 1700 may be (removably) fitted to user 190, at least some portion of mouthpiece 1705 may be (removably) gripped by a mouth, a lip, teeth, a gum, portions thereof, combinations thereof, and/or the like of user 190. See e.g., FIG. 17G and/or FIG. 17F. FIG. 17G may be a rear respective view of FIG. 17F (or front view from the perspective of user 190), but also showing soaking-device 100. In some embodiments, the relational configurations as between breathing-apparatus 1700 and user 190 shown in FIG. 17F may be maintained in FIG. 17G.

FIG. 17H is a rear top perspective view of soaking-device 100, showing breathing-apparatus 1700 (removably) fitted to user 190, but now with head 191 of user 190 at least partially submerged within immersion-liquid 180 of the vessel portion of soaking-device 100. In some embodiments, when breathing-apparatus 1700 may be (removably) fitted to user 190, at least some portion of mouthpiece 1705 may be (removably) gripped by a mouth, a lip, teeth, a gum, portions thereof, combinations thereof, and/or the like of user 190. FIG. 17H may be a same or similar view as compared to FIG. 17G, but in FIG. 17H head 191 (and/or face 192) of user 190 may be at least partially submerged immersion-liquid 180 of the vessel portion of soaking-device 100; whereas, in FIG. 17G head 191 (and/or face 192) of user 190 may not be at least partially submerged immersion-liquid 180 of the vessel portion of soaking-device 100. In some embodiments, in FIG. 17H, at least some portions of breathing-apparatus 1700 may be submerged within immersion-liquid 180 of the vessel portion of soaking-device 100. In some embodiments, in FIG. 17H, mouthpiece 1705 and/or at least some portions of flexible-elongate-hollow-member 1703 may be submerged within immersion-liquid 180 of the vessel portion of soaking-device 100. In some embodiments, in FIG. 17H, rigid-elongate-hollow-member 1701 and/or aperture(s) 1709 may be disposed above and outside of immersion-liquid 180 of the vessel portion of soaking-device 100. In some embodiments, in FIG. 17H, at least a portion of rigid-elongate-hollow-member 1701 may be located at a highest point with respect to: other portions of rigid-elongate-hollow-member 1701, other portions of breathing-apparatus 1700, soaking-device 100, face 192 of user 190, head 191 of user 190, user 190, portions thereof, combinations thereof, and/or the like. In some embodiments, in FIG. 17H, at least a portion of mouthpiece 1705 may be located at a lowest point with respect to other portions of breathing-apparatus 1700. In some embodiments, the relational configurations as between breathing-apparatus 1700 and user 190 shown in FIG. 17F and/or in FIG. 17G may be maintained in FIG. 17H.

In some embodiments, when breathing-apparatus 1700 may be in use as intended (see e.g., FIG. 17F to FIG. 17H), fresh external ambient air may be move into (through) aperture(s) 1709, then into the hollow interior of rigid-elongate-hollow-member 1701, then into the hollow interior of flexible-elongate-hollow-member 1703, then into the hollow interior of mouthpiece 1705, and then into the mouth of user 190. In some embodiments, when breathing-apparatus 1700 may be in use as intended (see e.g., FIG. 17F to FIG. 17H), internal used (respired and/or exhaled) air (e.g., which may contain more carbon dioxide [CO2] than the fresh external ambient air) may move out from the mouth of user 190, then into the hollow interior of mouthpiece 1705, then into the hollow interior of flexible-elongate-hollow-member 1703, then into the hollow interior of rigid-elongate-hollow-member 1701, then through aperture(s) 1709, and lastly out into the fresh external ambient air. In some embodiments, from aperture(s) 1709 to mouthpiece 1705, breathing-apparatus 1700 may comprise at least one airtight sealed pathway that is configured for respiratory gas movement. Thus, breathing-apparatus 1700 may be used for natural and/or normal respiratory breathing of user 190. See e.g., FIG. 17B to FIG. 17H.

Note, FIG. 17H may also show two opposing mating-members 1407, with each such mating-member 1407 being slidingly confined (retained) to its respective slot 1400 (track 1400).

In some embodiments, soaking-device 100 may be used without breathing-apparatus 1700. In some embodiments, in lieu of breathing-apparatus 1700, i.e., breathing-apparatus 1700 may be replaced with any breathing apparatus or the like shown and described in U.S. Pat. Nos. 10,667,990, 10,449,341, 10,667,991, 11,154,697, U.S. design Pat. D863,575, U.S. design Pat. D863,576, U.S. design Pat. D864,403, U.S. design Pat. D889,675, and/or in U.S. design Pat. D916,303; wherein the disclosures of these U.S. patents is incorporated by reference herein as if fully set-forth herein.

In some embodiments, in lieu of breathing-apparatus 1700, i.e., breathing-apparatus 1700 may be replaced with a snorkel used for snorkeling or the like.

Figure 18A:
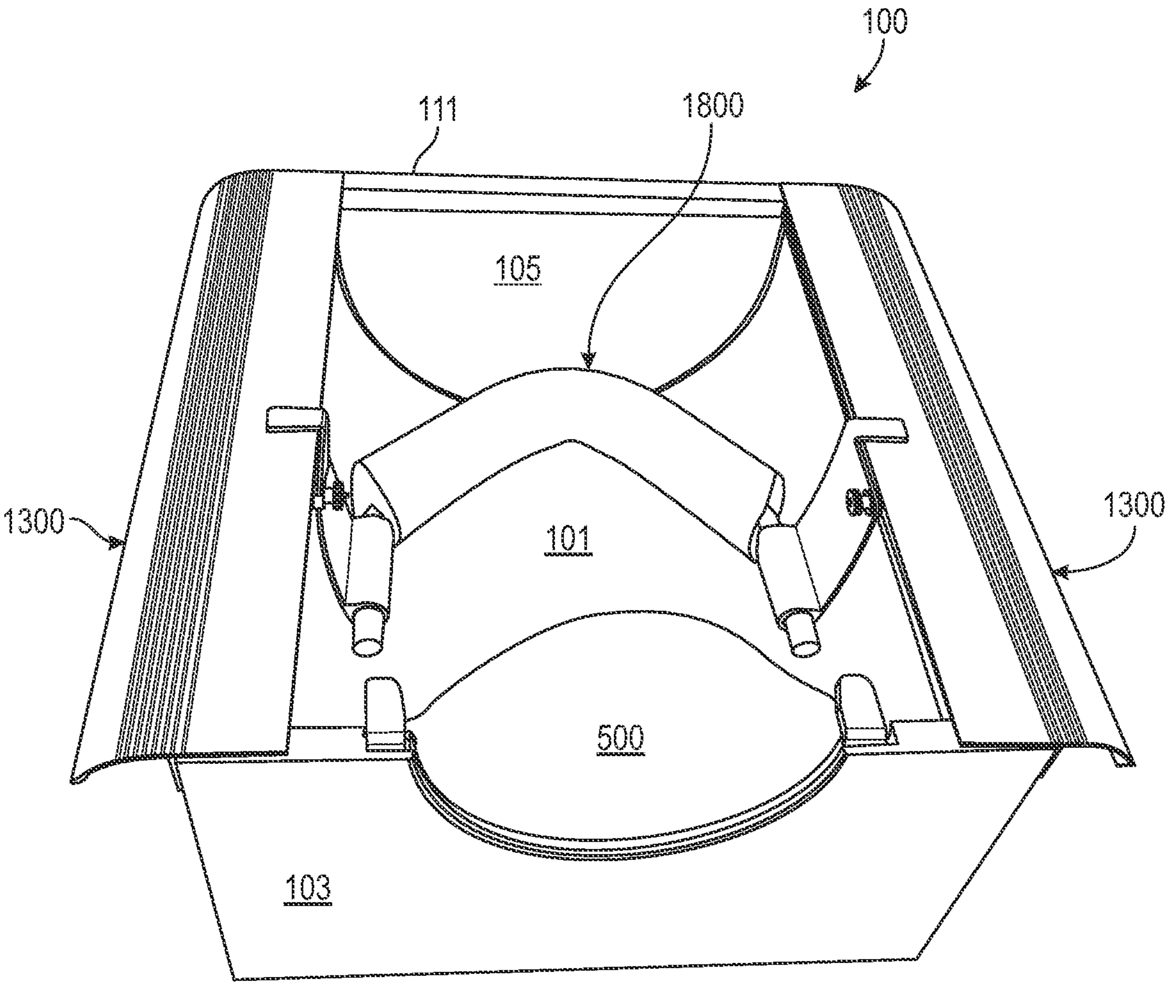
FIG. 18A depicts a partial top perspective view of the soaking-device of FIG. 1A that may have been removably fitted with a headrest.

FIG. 18A depicts a partial top perspective view of soaking-device 100 that may have been removably fitted with a headrest 1800. In some embodiments, headrest 1800 may be a headrest (head rest). In some embodiments, soaking-device 100 may comprise headrest 1800. In some embodiments, headrest 1800 may be a removable accessory to soaking-device 100. In some embodiments, headrest 1800 may be optional or omitted. In some embodiments, at least some external portions of headrest 1800 may be configured to physically support at least a portion of head 191 and/or at least a portion of face 192 of human user 190, when at a least portion of head 191 and/or of face 192 of human user 190 may be removably residing (resting) within the vessel portion of soaking-device 100 and/or at least partially within the immersion-liquid 180 within the vessel portion of soaking-device 100. In some embodiments, headrest 1800 may be configured to prevent or mitigate neck (muscle) fatigue of user 190, when user 190 may have at least a portion of their head 191 and/or at least a portion of their face 192 removably residing within the immersion-liquid 180 within the vessel portion of soaking-device 100; so that user 190 does not have to use their neck muscles to support a weight of their head 191 when user 190 may be using soaking-device 100 as intended. In some embodiments, when headrest 1800 may be intended to be used as a headrest for when at least a portion of head 191 and/or at least a portion of face 192 may be removably residing within the immersion-liquid 180 within the vessel portion of soaking-device 100; then at least a majority of headrest 1800 structure may reside within the vessel portion of soaking-device 100. In some embodiments, headrest 1800 may comprise: at least one cushion-member 1801, at least one support-member 1811 (arm 1811), and at least one bracket(s) 1821. In some embodiments, headrest 1800 may comprise: at least one cushion-member 1801, at least one support-member 1811 (arm 1811), at least one bracket(s) 1821, and fastening-hardware configured to attach bracket(s) 1821 to slot 1400 (channel 1400) and/or to mating-member(s) 1407. In some embodiments, headrest 1800 may comprise: at least one cushion-member 1801, at least one support-member 1811 (arm 1811), and two brackets 1821. In some embodiments, headrest 1800 may comprise: at least one cushion-member 1801, at least one support-member 1811 (arm 1811), two brackets 1821, and fastening-hardware configured to attach brackets 1821 to slots 1400 (channels 1400) and/or to mating-members 1407.

In some embodiments, this fastening-hardware may comprise one or more of: washer(s) 1831, thumb-screw(s) 1833, and/or the like.

Figure 18B:
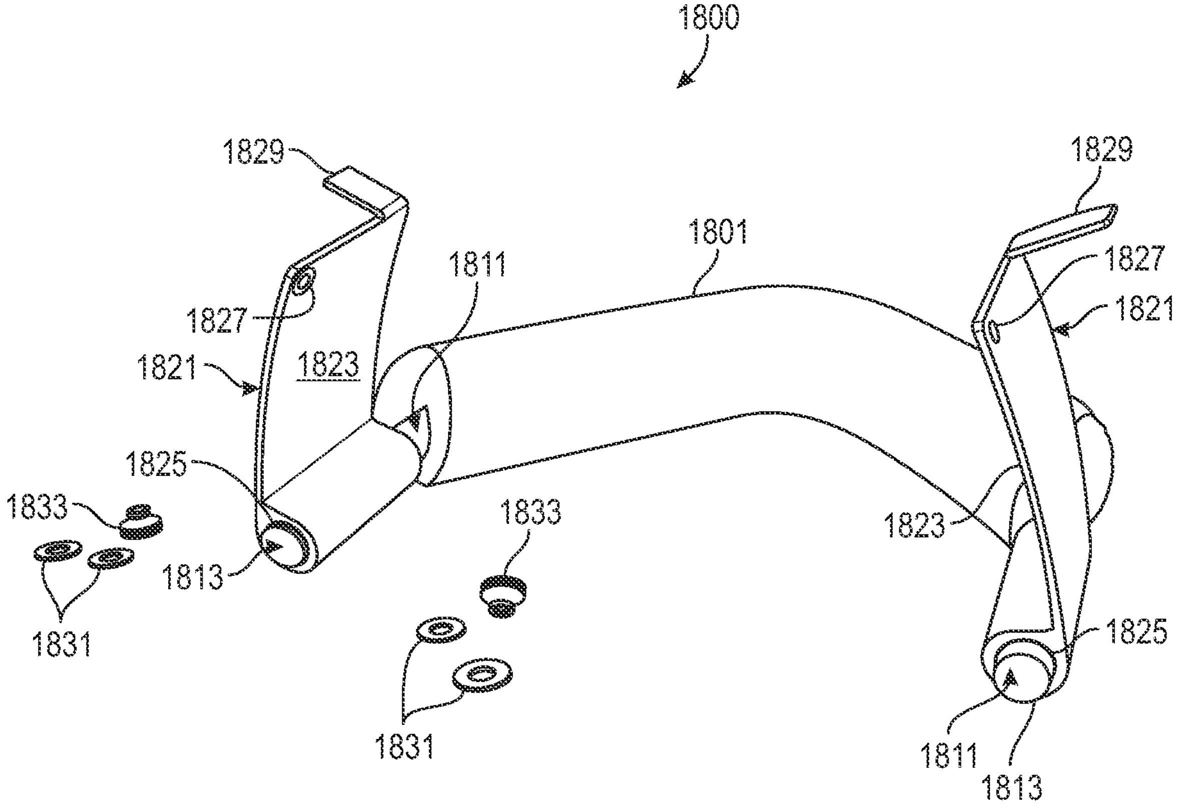
FIG. 18B depicts a perspective view of the headrest of FIG. 18A, along with at least some of its fastening-hardware; however, the soaking-device of FIG. 1A is not shown.

FIG. 18B depicts a perspective view of headrest 1800, along with at least some of its fastening-hardware, such as, but not limited to, washer(s) 1831, thumb-screw(s) 1833, and/or the like. However, soaking-device 100 is not shown in FIG. 18C.

Figure 18C:
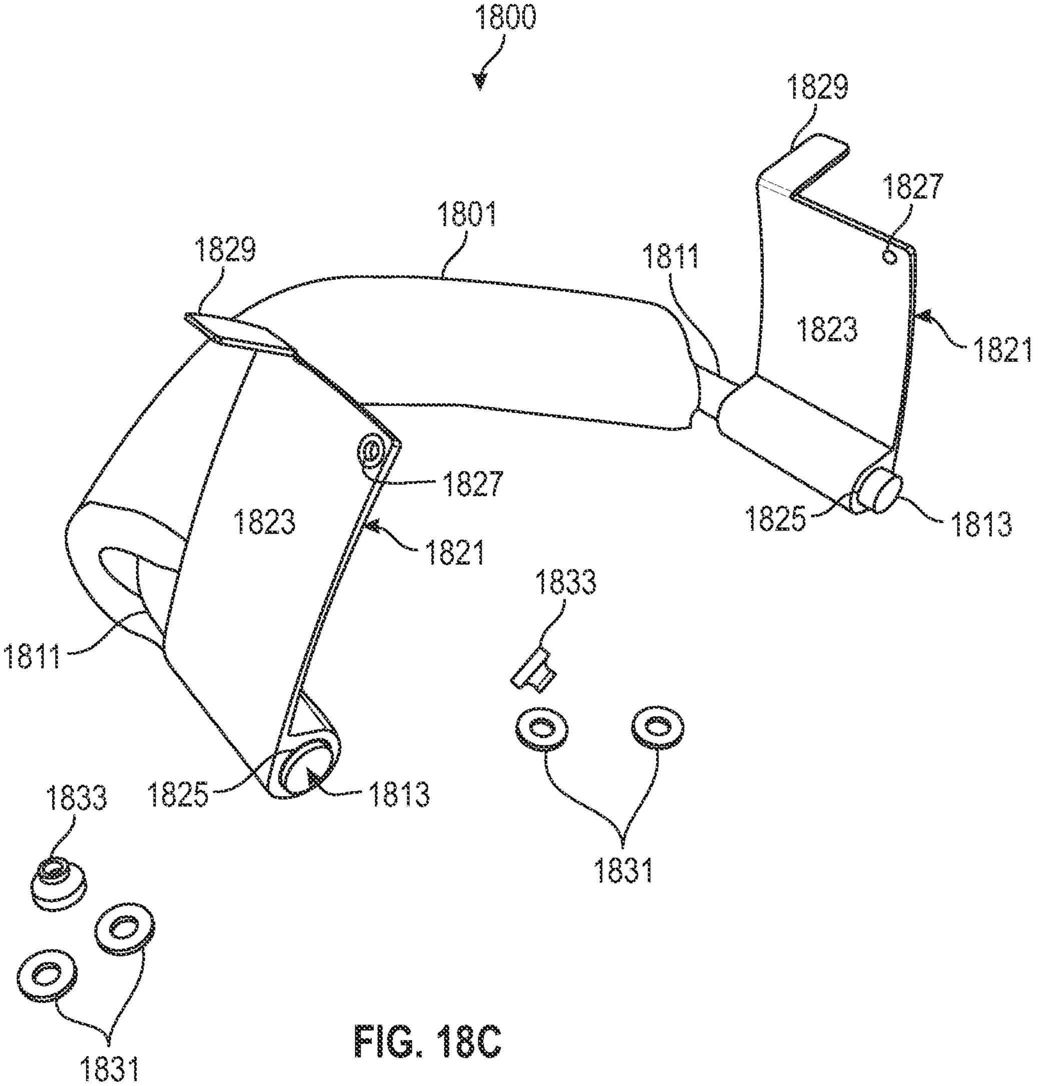
FIG. 18C depicts another perspective view of the headrest of FIG. 18A, along with at least some of its fastening-hardware; however, the soaking-device of FIG. 1A is not shown.

FIG. 18C depicts another perspective view of headrest 1800, along with at least some of its fastening-hardware, such as, but not limited to, washer(s) 1831, thumb-screw(s) 1833, and/or the like. However, soaking-device 100 is not shown in FIG. 18C.

FIG. 18B and FIG. 18C may show that support-member (arm) 1811 may comprise two opposing terminal-ends 1813 and with a middle 1815 portion disposed between those two opposing terminal-ends 1813. In some embodiments, middle 1815 of support-member (arm) 1811 may be a middle portion of support-member (arm) 1811. In some embodiments, support-member (arm) 1811 may be a rigid member. In some embodiments, support-member (arm) 1811 may be a self-supporting member. In some embodiments, along a finite and fixed length of support-member (arm) 1811 may be three fixed and non-movable angles. In some embodiments, support-member (arm) 1811 may be bent (by a machine during factory assembly of headrest 1800) into at least substantially into a predetermined shape, such as, but not limited to, a U-shape, a V-shape, a pentagon shape without the base side of the pentagon, portions thereof, combinations thereof, and/or the like. In some embodiments, support-member (arm) 1811 may generally not be bent and/or deformed by unaided user 190. In some embodiments, at least some of middle 1815 may be covered by cushion-member 1801.

FIG. 18B and FIG. 18C may show that a given bracket 1821 may comprise a main section, termed a blade-portion 1823 (or a plate-portion 1823). In some embodiments, disposed on opposite ends of a given plate-portion 1823 may be a receiver 1825 and a different receiver 1827. In some embodiments, receiver 1825 may be configured for receiving a given terminal-end 1813 of support-member (arm) 1811. Whereas, in some embodiments, receiver 1827 may be configured for receiving a portion of mating-member 1407. In some embodiments, receiver 1825 and receiver 1827 may be disposed opposite from each other on plate-portion 1823. In some embodiments, receiver 1825 may be hole that runs (all the way) across a transverse-width of plate-portion 1823. In some embodiments, receiver 1825 may be hole that runs in a direction across a transverse-width of plate-portion 1823. In some embodiments, the void hole of receiver 1825 may be sized, shaped, and/or complementary to an external diameter (or an external shape) of a portion of support-member (arm) 1811 (such as, a given terminal-end 1813 portion). In some embodiments, receiver 1827 may be hole that runs (all the way) across a thickness of plate-portion 1823. In some embodiments, receiver 1827 may be hole that runs in a direction across a thickness of plate-portion 1823. In some embodiments, the void hole of receiver 1827 may be sized, shaped, and/or complementary to an external diameter (or an external shape) of a portion of mating-member 1407. In some embodiments, a direction that receiver 1825 runs in may be at least substantially orthogonal to a direction that receiver 1827 runs in. In some embodiments, plate-portion 1823 may further comprise at least one tab 1829. In some embodiments, tab 1829 may be a tab of externally protruding rigid material. In some embodiments, tab 1829 may be located closer to receiver 1827 than to receiver 1825. In some embodiments, tab 1829 may be disposed opposite from receiver 1825. In some embodiments, when headrest 1800 may be removably attached to soaking-device 100 (e.g., at channels 1400), then tab(s) 1829 may physically rest on top of top-portion 1301 of handle(s) 1300. See e.g., FIG. 18A and FIG. 23.

FIG. 18B and FIG. 18C may show fastening-hardware, such as, but not limited to, washer(s) 1831, thumb-screw(s) 1833, and/or the like. In some embodiments, when (removably) attaching a given bracket 1821 to a given channel 1400, receiver 1827 may be fitted onto a portion of a given mating-member 1407, wherein at least a portion of that given mating-member 1407 may be (slidingly) retained within channel 1400. In some embodiments, a thumb-screw 1833, wing-nut 1833, or the like may then be attached to a terminal-end of that given mating-member 1407 to keep that bracket 1821 from becoming disengaged with that given mating-member 1407. In some embodiments, disposed on either side, or on both sides of receiver 1827, an in colinear and/or coaxial alignment with receiver 1827, may at least one washer 1831. In some embodiments, a washer 1831 may be configured to fit around shaft portion(s) of mating-member 1407.

FIG. 19A through FIG. 19E may show at least some steps involved in (removably) attaching a given bracket 1821 to soaking-device 100.

Figure 19A:
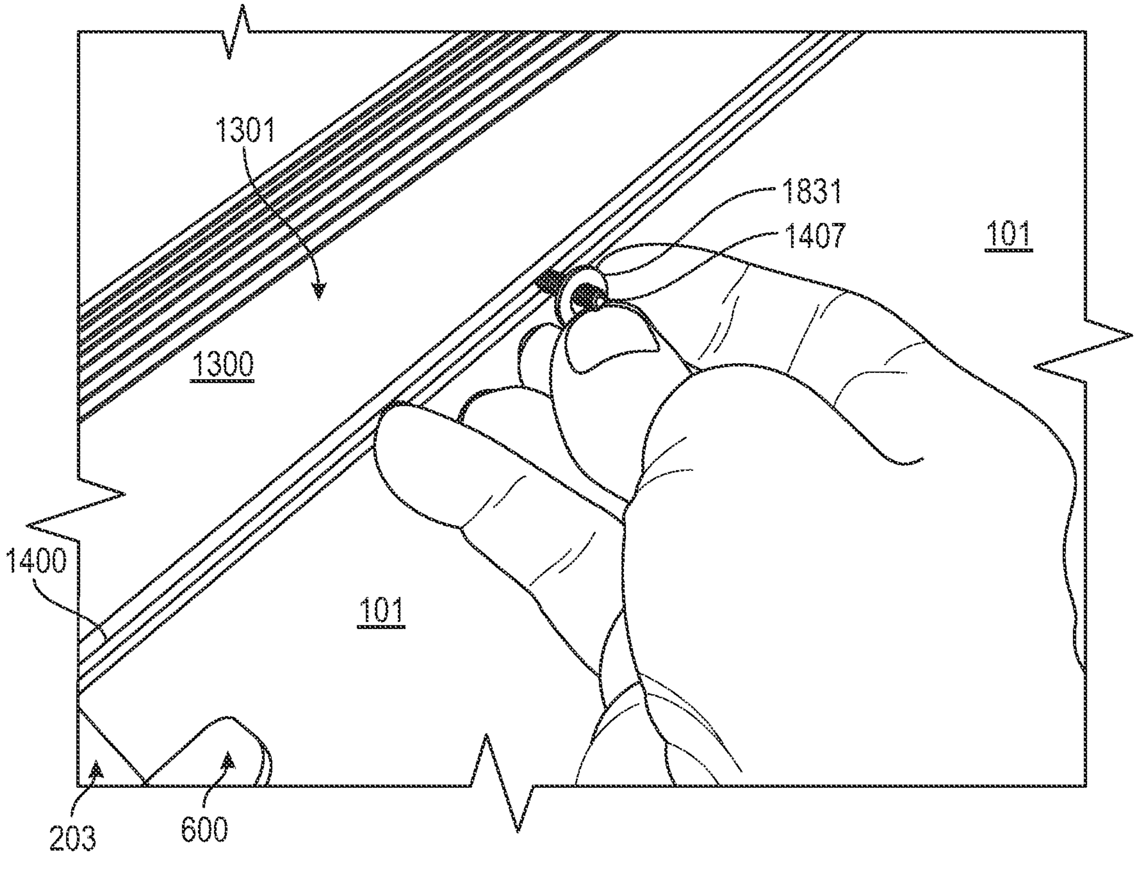
FIG. 19A may show a partial perspective view showing attachment of at least one washer to a (threaded) shaft protruding portion of a given mating-member, wherein other portion(s) of that given mating-member may be (removably and/or slidingly) retained within a channel of a given handle.

FIG. 19A may show a partial perspective view showing (removable) attachment of at least one washer 1831 to a (threaded) shaft protruding portion of a given mating-member 1407, wherein other portion(s) of that given mating-member 1407 may be (removably and/or slidingly) retained within channel 1400. In some embodiments, this step shown in FIG. 19A may be optional and/or omitted.

Figure 19B:
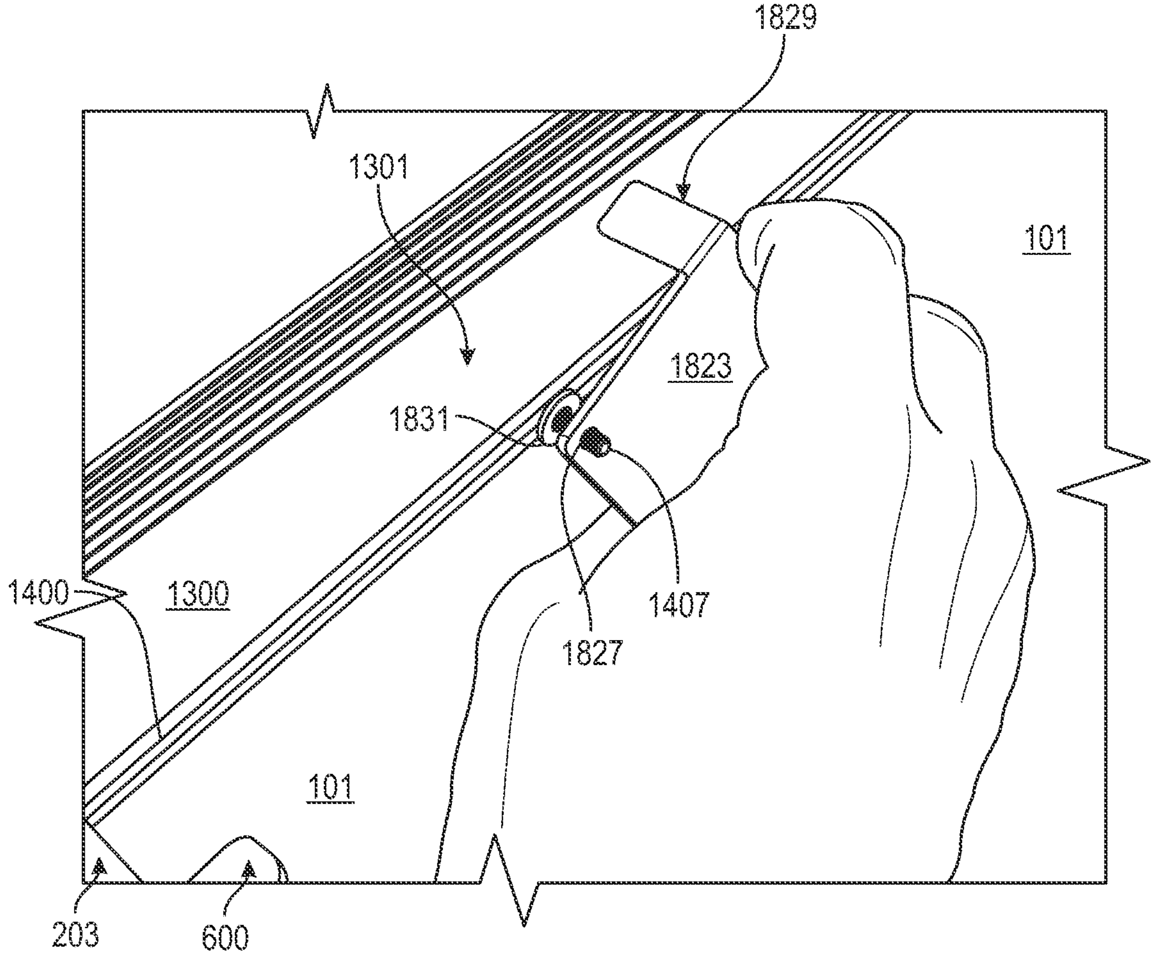
FIG. 19B may show a partial perspective view showing (removable) attachment of a receiver (hole) of a given (headrest) bracket to (threaded) shaft protruding portions of the given mating-member of FIG. 19A.

FIG. 19B may continue where FIG. 19A left off. FIG. 19B may show a partial perspective view showing (removable) attachment of receiver 1827 of bracket 1821 to (threaded) shaft protruding portions of the given mating-member 1407.

Figure 19C:
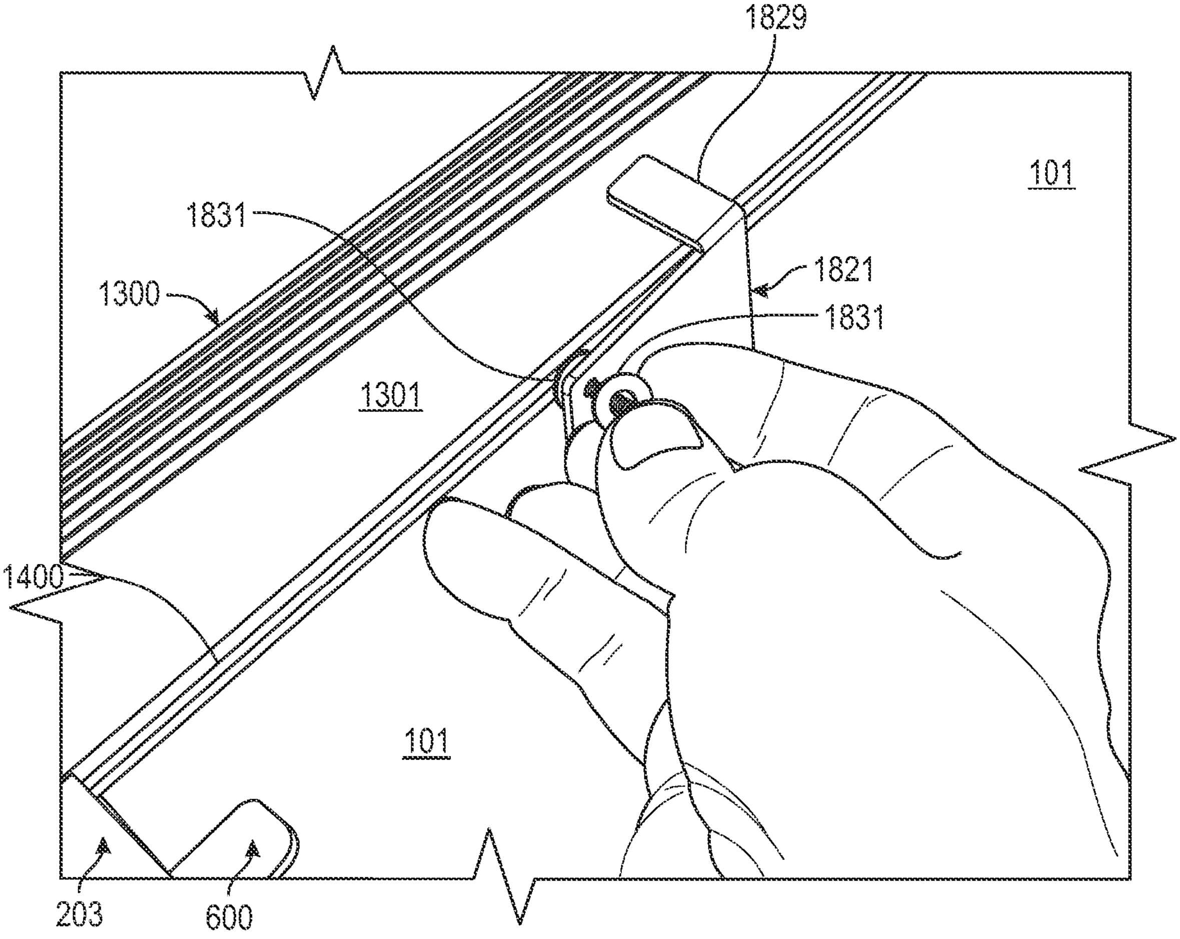
FIG. 19C may show a partial perspective view showing (removable) attachment of at least one (different) washer to the (threaded) shaft protruding portion of the given mating-member of FIG. 19A and on one side of the receiver hole of FIG. 19B.

FIG. 19C may continue where FIG. 19B left off. FIG. 19C may show a partial perspective view showing (removable) attachment of at least one washer 1831 to the (threaded) shaft protruding portion of the given mating-member 1407 and on one side of receiver 1827. In some embodiments, this step shown in FIG. 19C may be optional and/or omitted. In some embodiments, after FIG. 19C, there may now be two different washers 1831 on the (threaded) shaft protruding portions of the given mating-member 1407 and with receiver 1827 disposed between those two washers 1831.

Figure 19D:
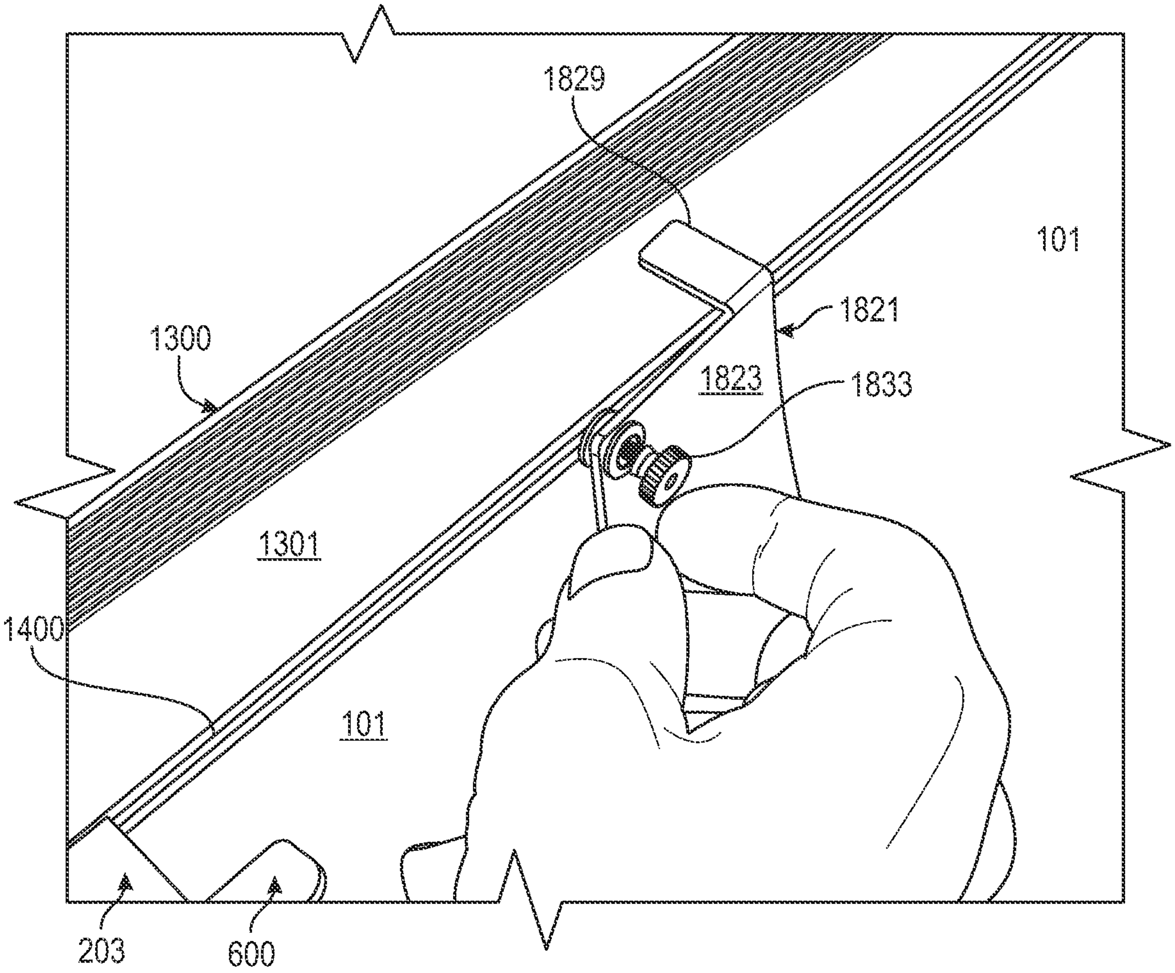
FIG. 19D may show a partial perspective view showing (removable) attachment of a thumb-screw (or a wing-nut or the like) to a terminal end (threaded) shaft protruding portion of the given mating-member of FIG. 19A and on one side of the receiver of FIG. 19B.

FIG. 19D may continue where FIG. 19C left off. FIG. 19D may show a partial perspective view showing (removable) attachment of a thumb-screw 1833 (or wing-nut 1833 or the like) to a terminal end (threaded) shaft protruding portion of the given mating-member 1407 and on one of side receiver 1827. In some embodiments, (removable) attachment of thumb-screw 1833 (or wing-nut 1833 or the like) to a terminal end (threaded) shaft protruding portion of the given mating-member 1407 may help to keep bracket 1821 (removably) attached to the given mating-member 1407; i.e., so that the (threaded) shaft protruding portion of the given mating-member 1407 may not inadvertently slip out of receiver 1827.

Figure 19E:
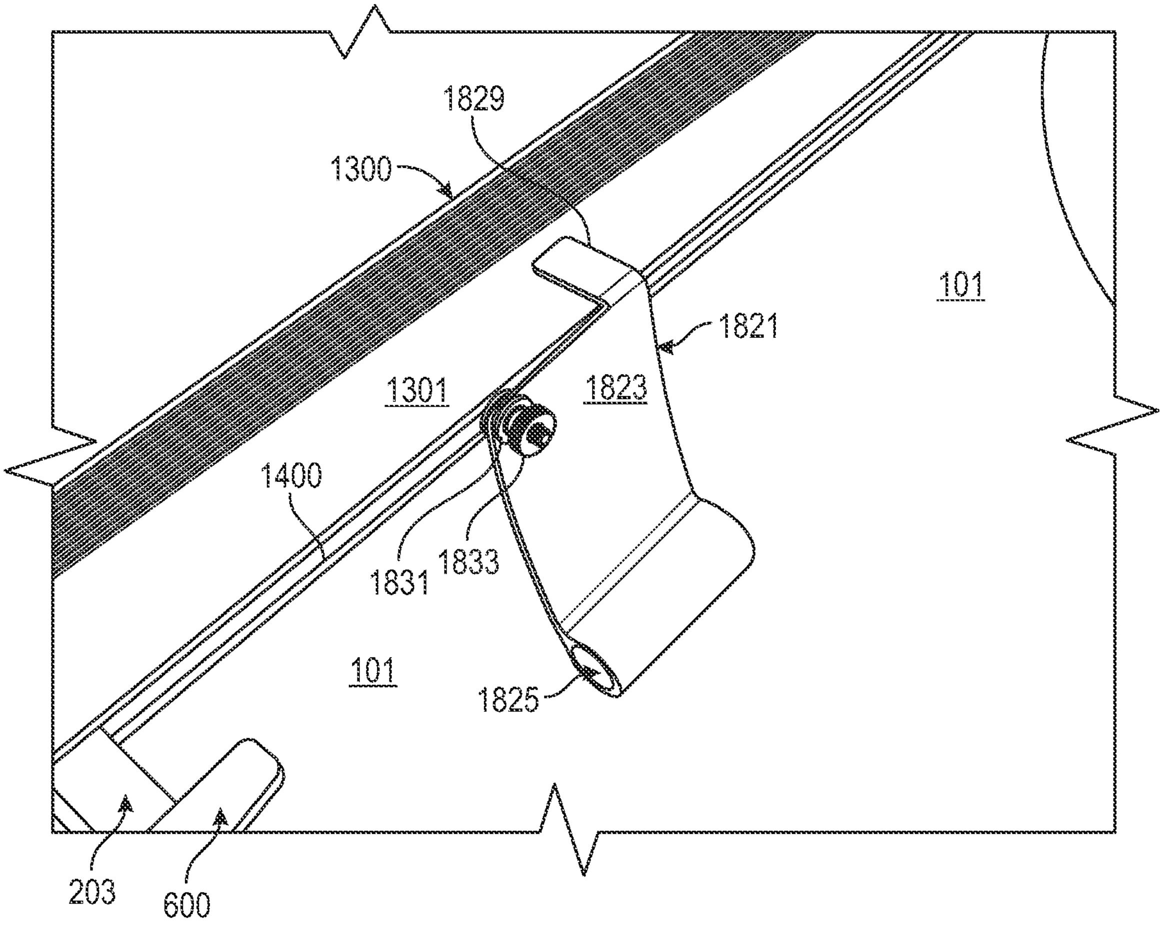
FIG. 19E may show a partial perspective view showing a given (headrest) bracket of FIG. 19B (removably) attached to soaking-device of FIG. 1A, pursuant to the steps shown in FIG. 19A to FIG. 19D.

FIG. 19E may continue where FIG. 19D left off. FIG. 19E may show a partial perspective view showing a given bracket 1821 (removably) attached to soaking-device 100, pursuant to the steps shown in FIG. 19A to FIG. 19D. In some embodiments, in FIG. 19E, thumb-screw 1833 (or wing-nut 1833 or the like) may be (removably) tightened down against washer 1831 and/or against an outer external surface of blade-portion 1823. In some embodiments, in the configuration shown in FIG. 19E, tab 1829 (of bracket 1821) may rest on top of top-portion 1301 of handle 1300. Note, in some embodiments, bracket 1821, via its receiver 1827, may rotate (freely) around the (threaded) shaft protruding portion of the given mating-member 1407 that is within receiver 1827.

Figure 20A:
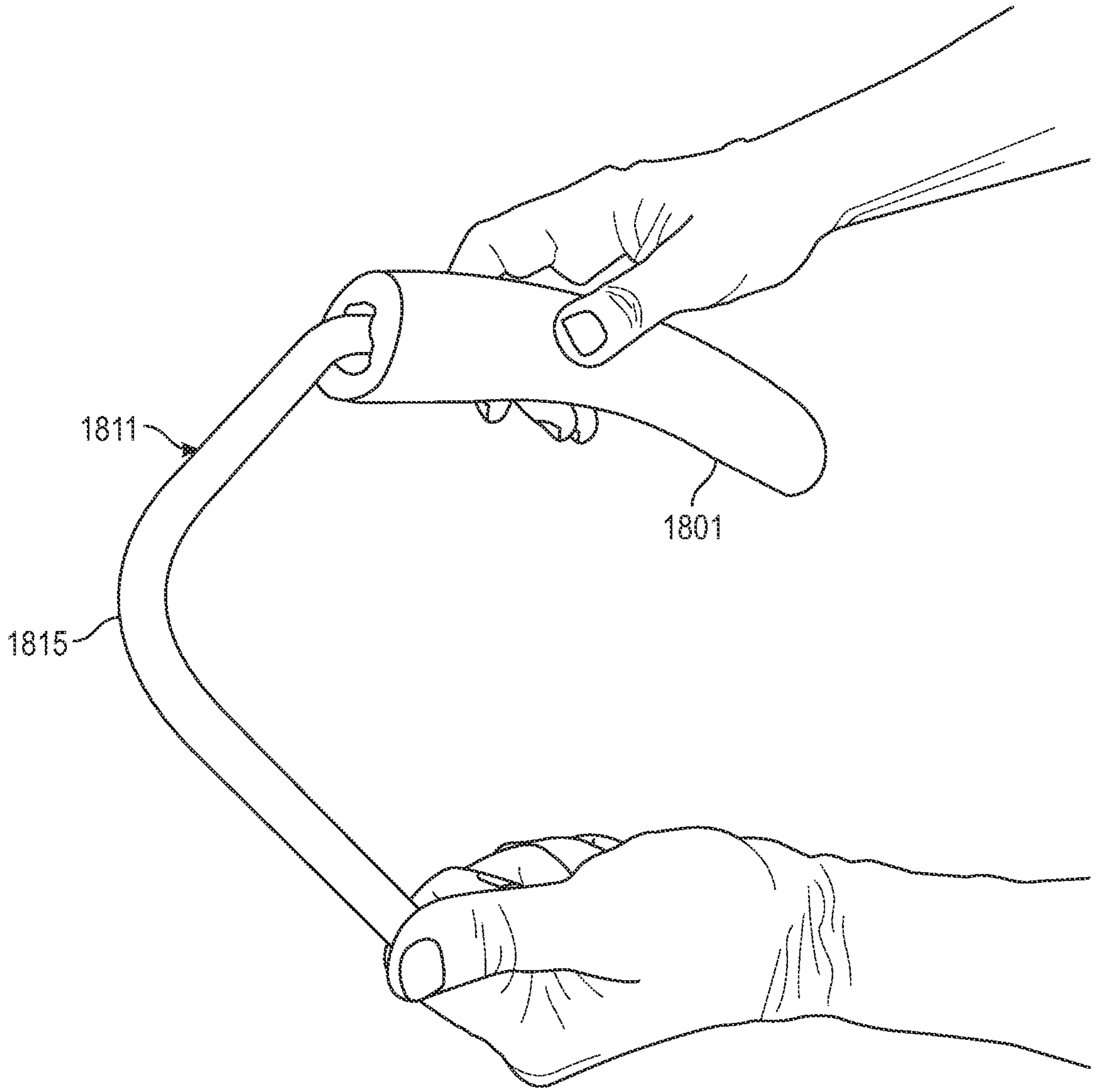
FIG. 20A is at least a partial perspective view showing a process of (removable) attachment of a cushion-member to a support-member (arm), where both are components of a headrest assembly.

FIG. 20A is at least a partial perspective view showing a process of (removable) attachment of cushion-member 1801 to support-member (arm) 1811. In some embodiments, FIG. 20A shows how the hollow central axial (elongate) void of relatively flexible cushion-member 1801 may be slid onto and over the relatively rigid support-member (arm) 1811. In some embodiments, cushion-member 1801 may comprise an elongate slit that runs along an elongate length of cushion-member 1801 and which leads to the hollow central axial (elongate) void of relatively flexible cushion-member 1801. In some embodiments, this elongate slit may aid in the (removable) attachment of cushion-member 1801 to support-member (arm) 1811.

Figure 20B:
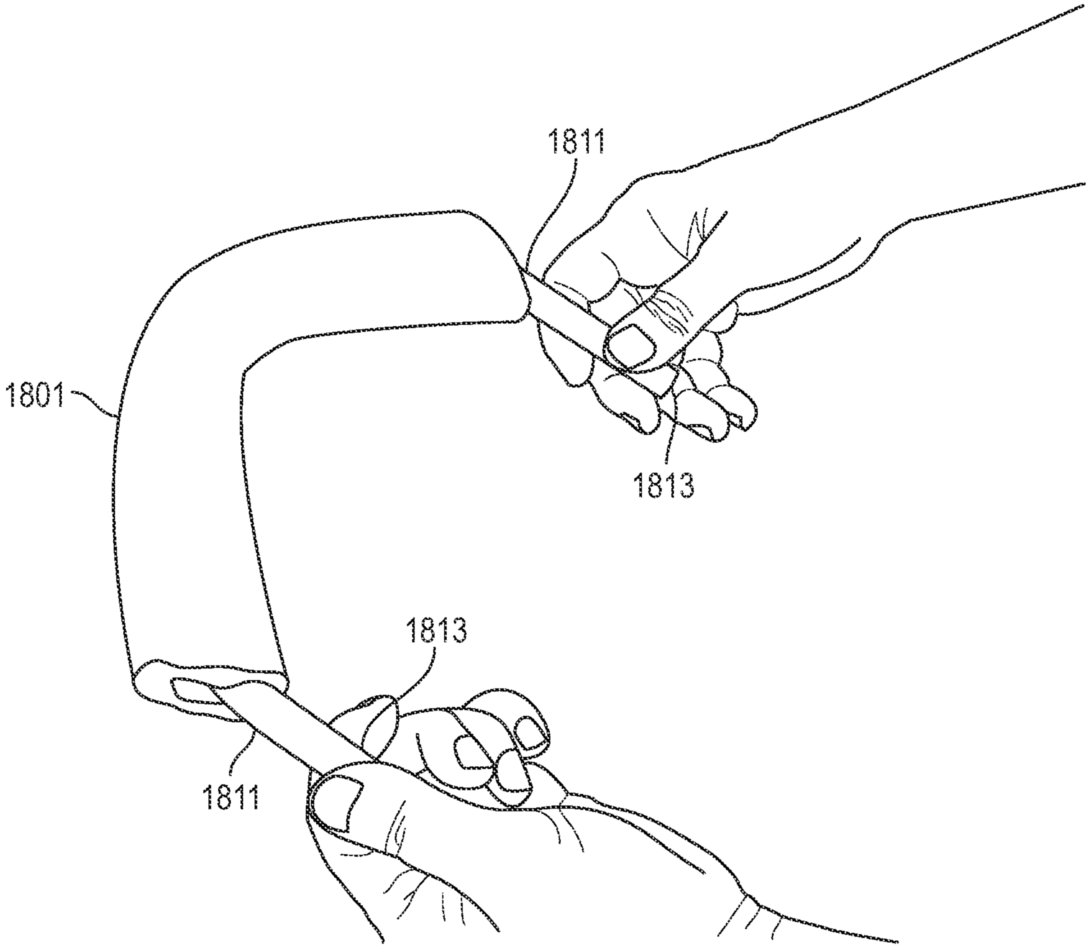
FIG. 20B is at least a partial perspective view showing the final (removable) attached configuration of the cushion-member of FIG. 20A to the support-member (arm) of FIG. 20A.

FIG. 20B is at least a partial perspective view showing the final (removable) attached configuration of cushion-member 1801 to support-member (arm) 1811. In some embodiments, once cushion-member 1801 may be finally and properly (removably) attached to support-member (arm) 1811, about equal (length) portions of cushion-member 1801 may be located to either side of middle 1815 of support-member (arm) 1811.

Figure 21A:
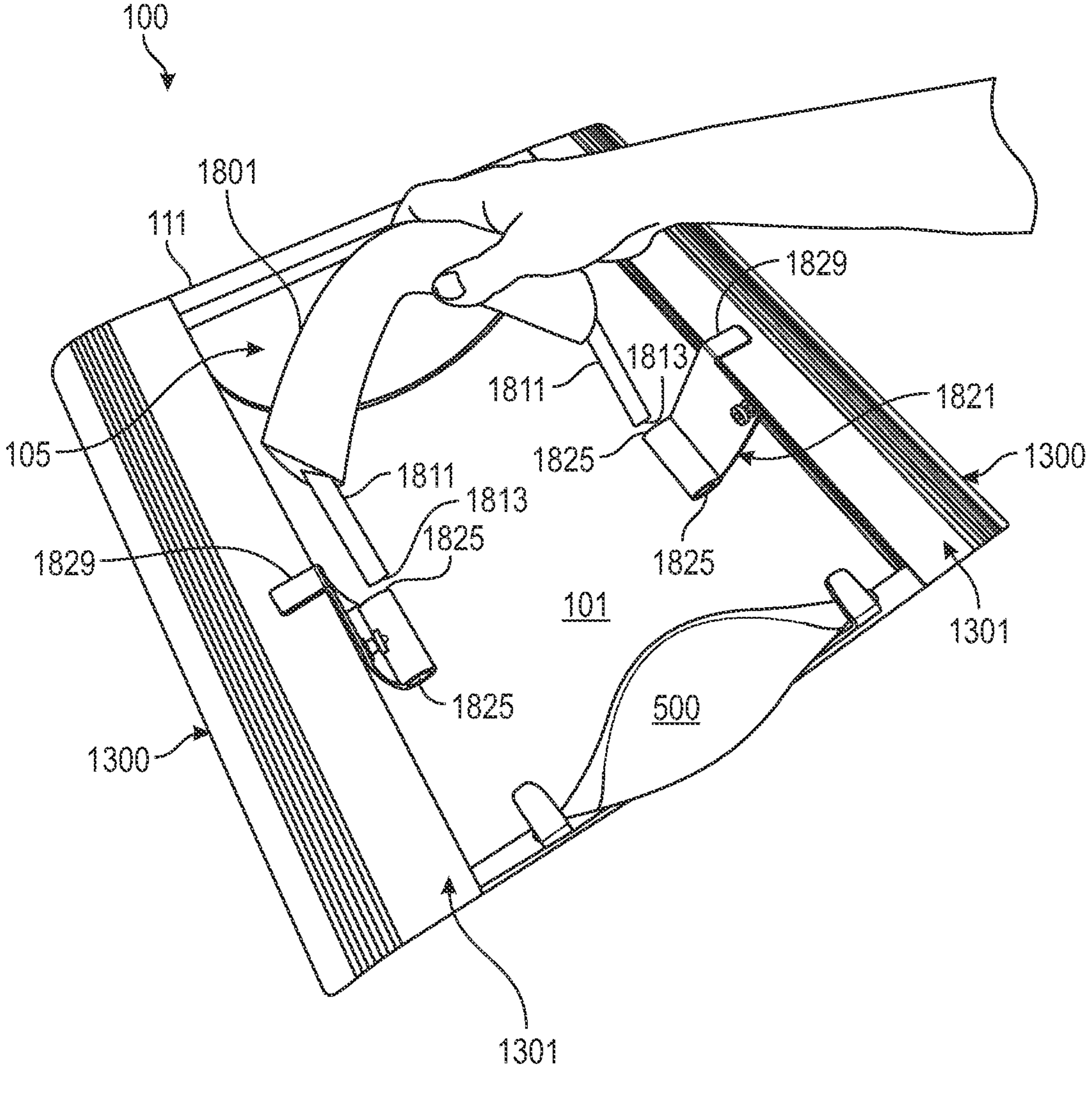
FIG. 21A is a partial perspective view showing the two terminal-ends of a (headrest) support-member (arm) just prior to being inserted into a receiver of each (headrest) bracket.
Figure 21B:
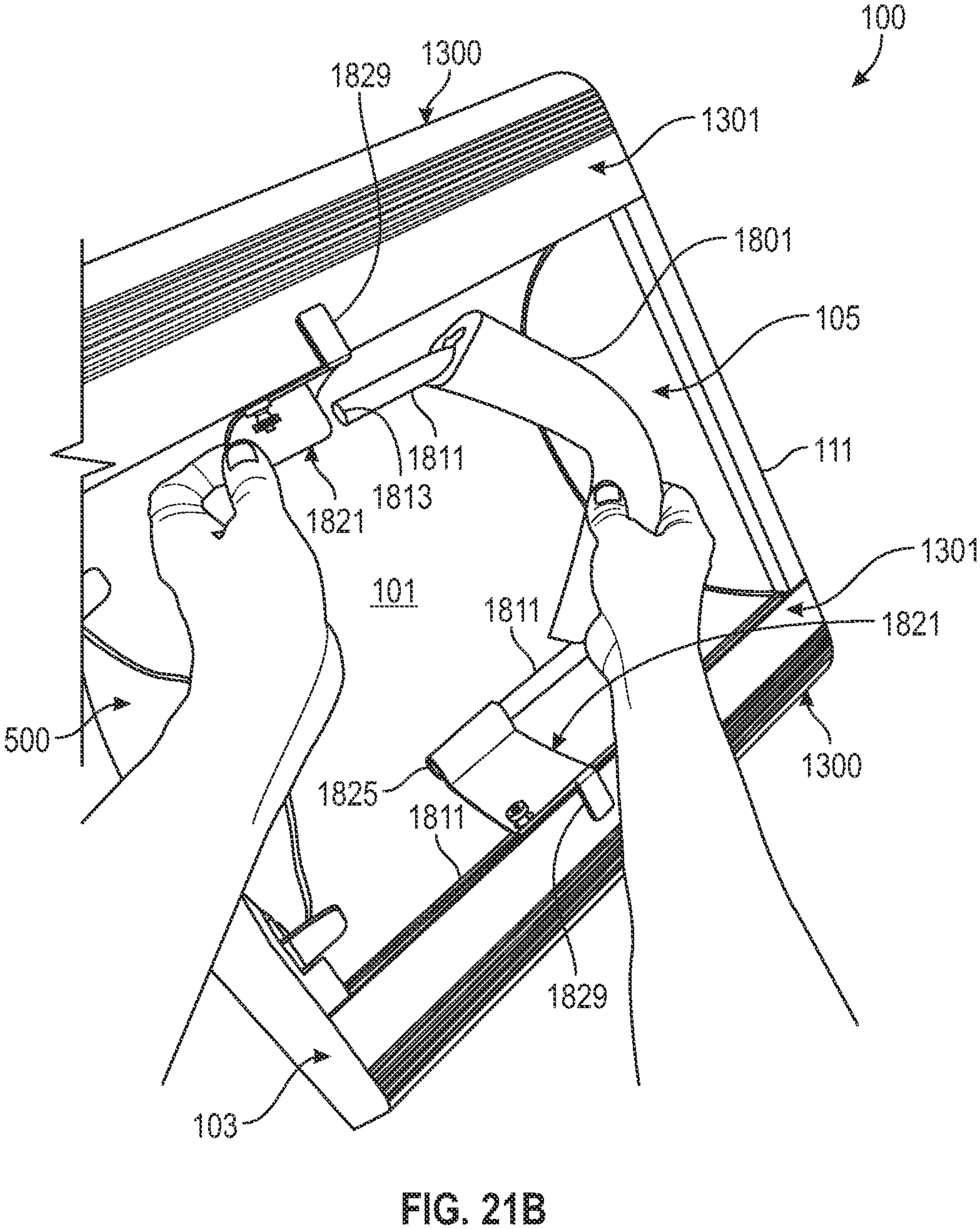
FIG. 21B is a partial perspective view showing one of the two terminal-ends of the (headrest) support-member (arm) being at least partially inserted into a receiver of one of the two (headrest) brackets; and with the other remaining terminal-end still being free of its receiver of the other remaining (headrest) bracket.
Figure 21C:
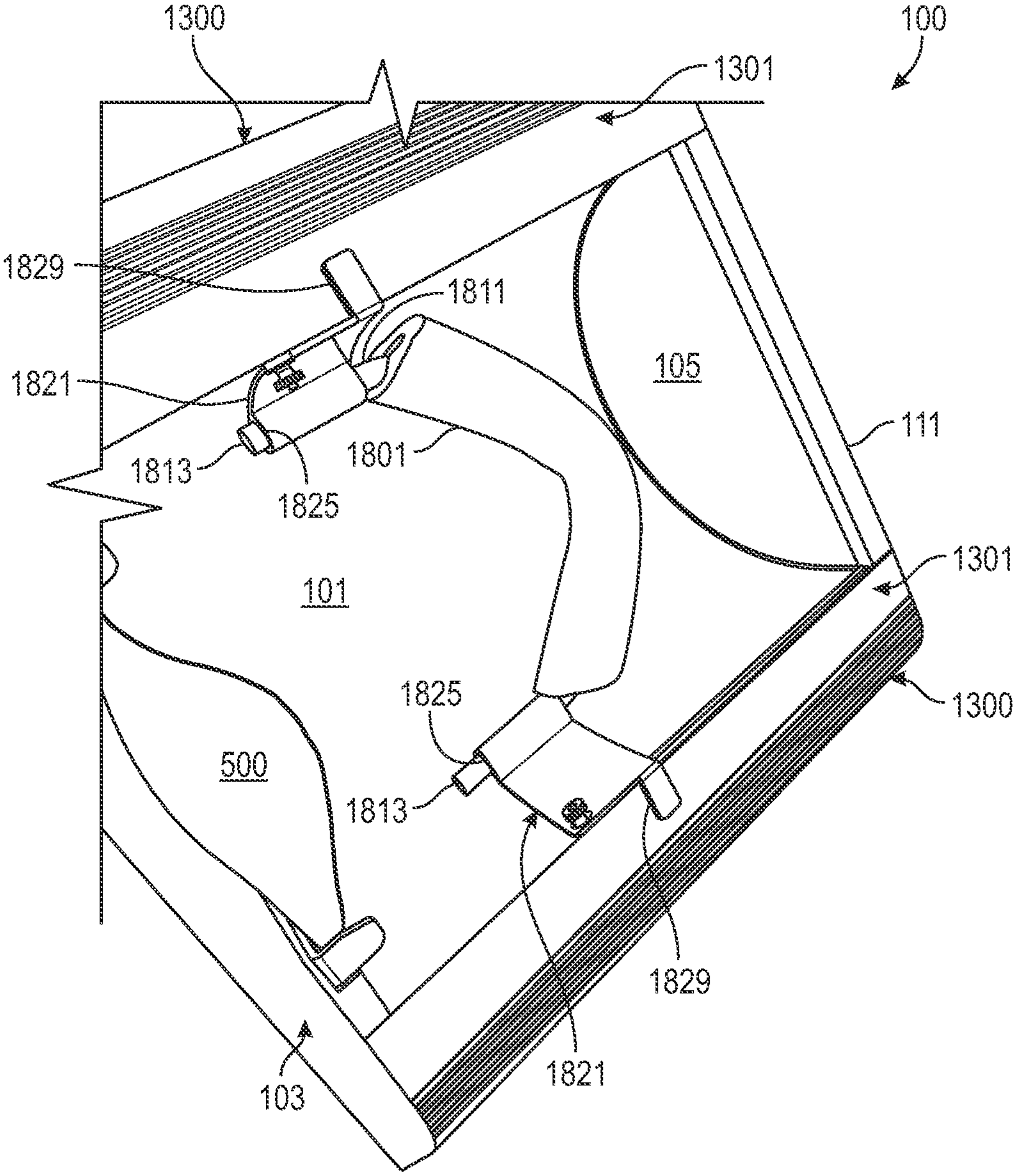
FIG. 21C is a partial perspective view showing the two terminal-ends of the (headrest) support-member (arm) having been (fully) (removably) inserted into a receiver of each (headrest) bracket.

FIG. 21A to FIG. 21C shows steps of (removably) attaching support-member (arm) 1811 to brackets 1821, wherein brackets 1821 may already be (removably) attached to soaking-device 100.

FIG. 21A is a partial perspective view showing the two terminal-ends 1813 of support-member (arm) 1811 just prior to being inserted into a receiver 1825 of each bracket 1821. FIG. 21B shows these steps a bit further along than FIG. 21A. FIG. 21B is a partial perspective view showing one of the two terminal-ends 1813 of support-member (arm) 1811 being at least partially inserted into a receiver 1825 of one of the two brackets 1821; and with the other remaining terminal-end 1813 still being free of its receiver 1825 of the other bracket 1821. FIG. 21C shows these steps a bit further along than FIG. 21B. FIG. 21C is a partial perspective view showing the two terminal-ends 1813 of support-member (arm) 1811 having been (removably) inserted into a receiver 1825 of each bracket 1821. In some embodiments, FIG. 21C may show the final (removable) attached configuration as between support-member (arm) 1811 and the two brackets 1821.

Figure 22A:
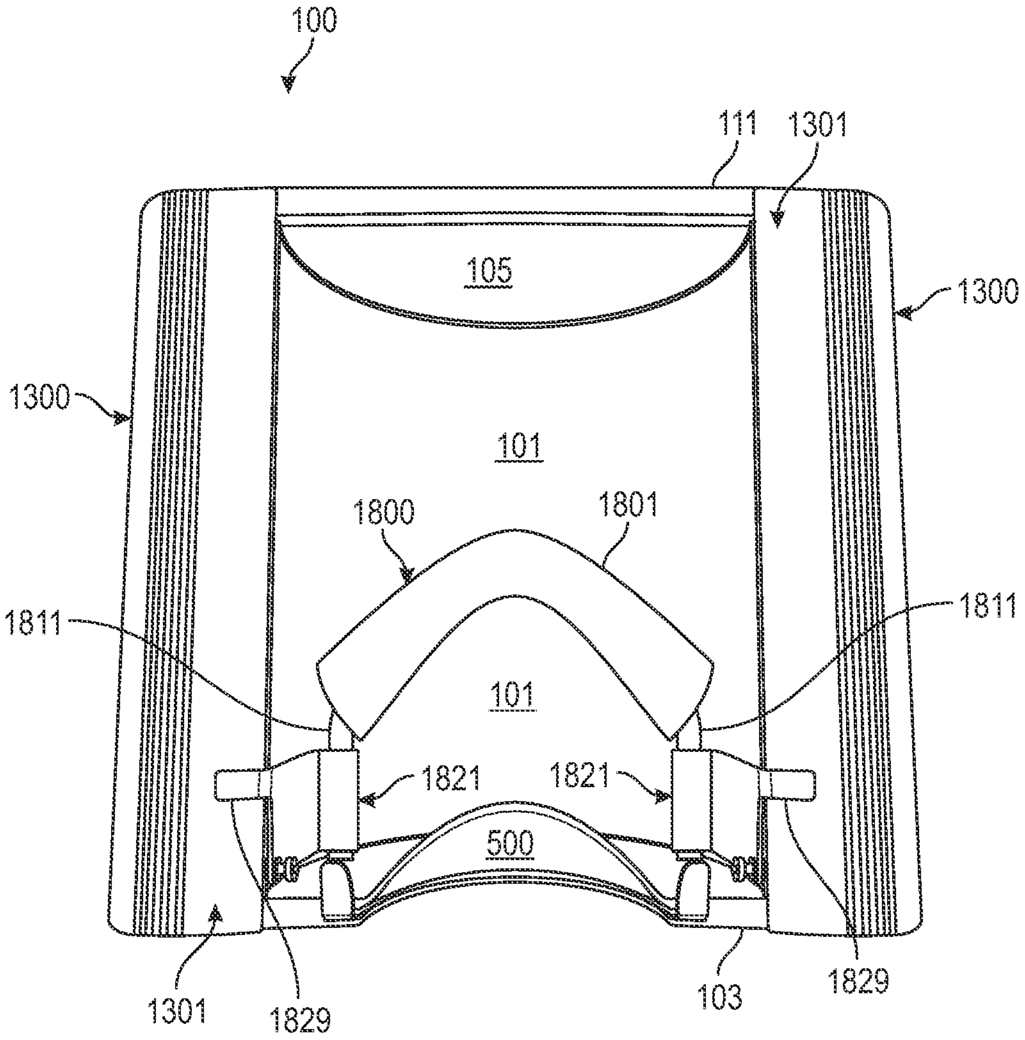
FIG. 22A is a top perspective view of the soaking-device of FIG. 1A, shown with a removably attached headrest, shown in its minimum setting configuration.

FIG. 22A is a top perspective view of soaking-device 100, with a removably attached headrest 1800 shown in its minimum setting configuration. In some embodiments, when headrest 1800 may be in this minimum setting configuration, the mating-members 1407 are slid as far forward in channels 1400 as possible, generally with some portion of headrest 1800 touching internal (interior) surface 701 of front-panel 103. In some embodiments, this minimum setting configuration of headrest 1800, may be accomplished, by loosening thumb-screws 1833 (wing-nuts 1833 or the like) and then sliding headrest 1800 as forward towards front-panel 103.

Figure 22B:
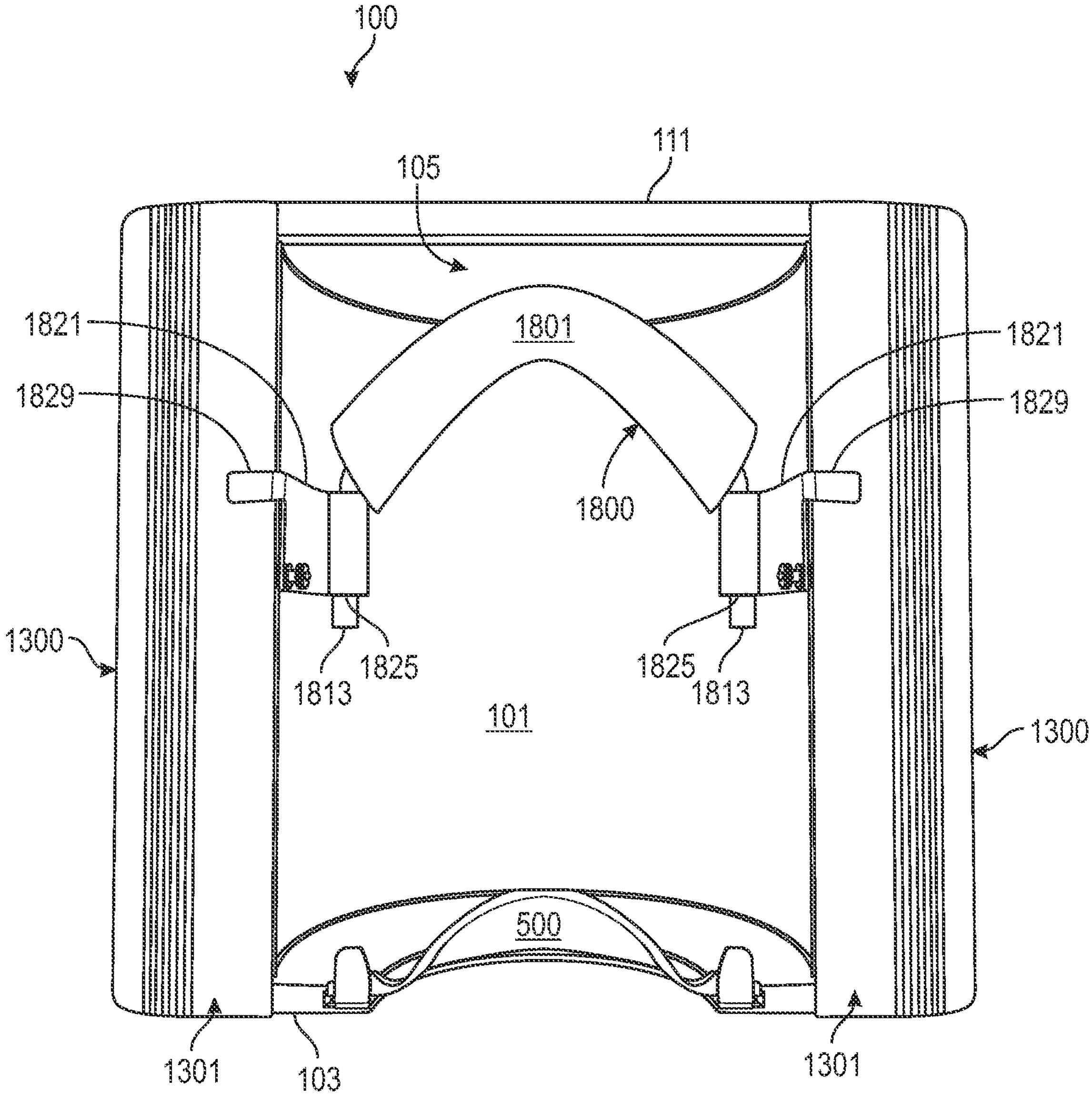
FIG. 22B is a top perspective view of the soaking-device of FIG. 1A, shown with a removably attached headrest, shown in its maximum setting configuration.

FIG. 22B is a top perspective view of soaking-device 100, with a removably attached headrest 1800 shown in its maximum setting configuration. In some embodiments, when headrest 1800 may be in this maximum setting configuration, the mating-members 1407 are slid as far backward (rearward) in channels 1400 as possible, generally with some portion of headrest 1800 touching internal (interior) surface 701 of rear-panel 105. In some embodiments, this maximum setting configuration of headrest 1800, may be accomplished, by loosening thumb-screws 1833 (wing-nuts 1833 or the like) and then sliding headrest 1800 as backwards (rearwards) towards rear-panel 105.

In some embodiments, headrest 1800 may be set to any position from the minimum setting configuration to maximum setting configuration, including those endpoints as shown in FIG. 22A and in FIG. 22B. In this manner, positioning of headrest 1800 within the vessel portion of soaking-device 100 may be varied to accommodate user 190 necks, faces, and/or heads of different sizes.

Figure 23:
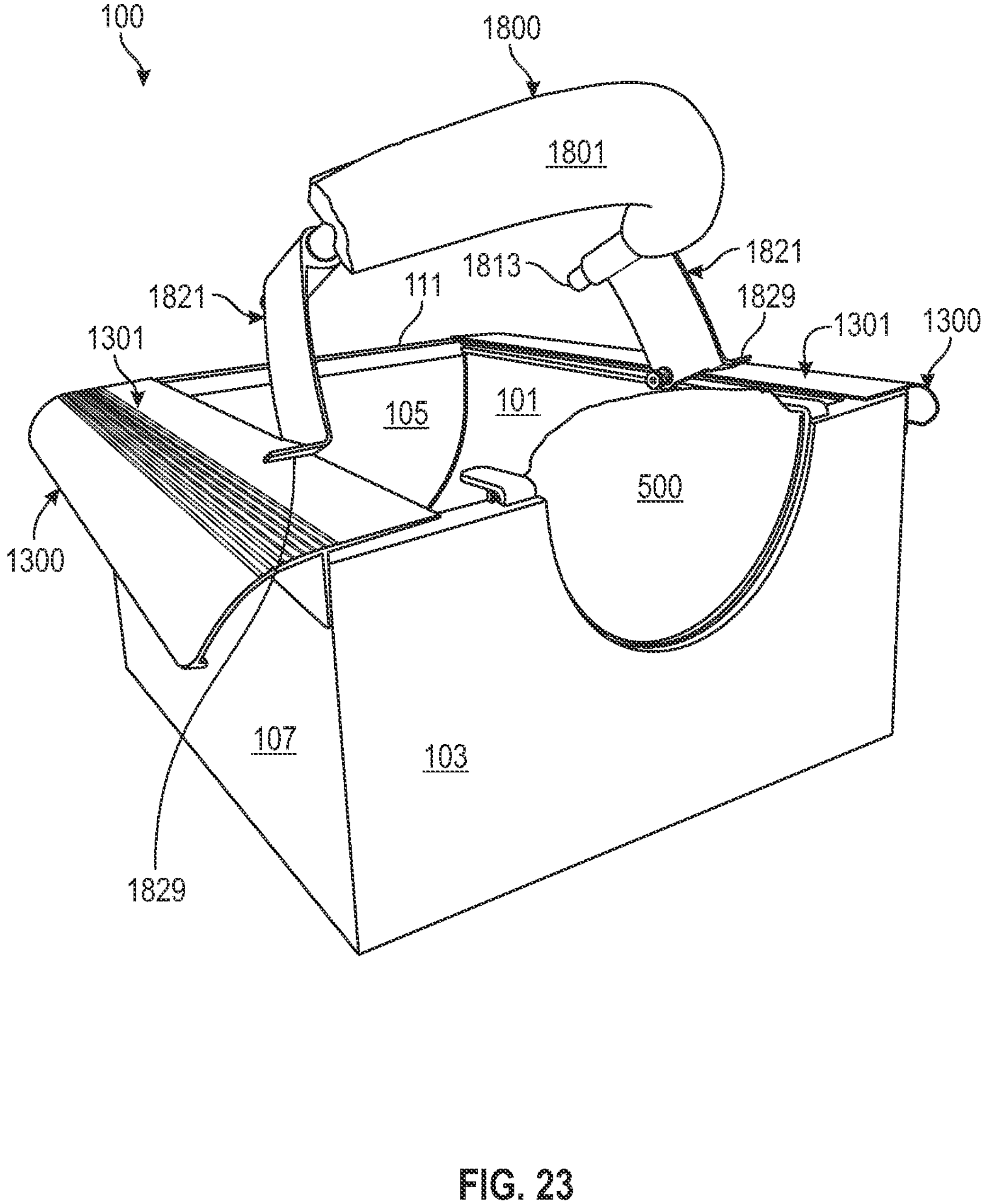
FIG. 23 shows a top, front, and side perspective view of the soaking-device of FIG. 1A, with the headrest of FIG. 18A (removably) attached to the soaking-device of FIG. 1A, but with the headrest of FIG. 18A shown in its "inverted" configuration as compared to its "in-vessel" configuration shown in FIG. 18A.

FIG. 23 shows a top, front, and side perspective view of soaking-device 100, with headrest 1800 (removably) attached to soaking-device 100, but with headrest 1800 shown in its inverted configuration as compared to its in-vessel configuration shown in FIG. 18A. Compare FIG. 23 to FIG. 18A. In some embodiments, when headrest 1800 may be removably attached to soaking-device 100, such as in shown in FIG. 18A, FIG. 19A to FIG. 19E, and in FIG. 21A to FIG. 23, then headrest 1800 may rotate (pivot) back and forth as desired by user 190 between the in-vessel configuration shown in FIG. 18A and the inverted configuration shown in FIG. 23. In some embodiments, headrest 1800 may rotate (pivot) between its in-vessel configuration and its inverted configuration because brackets 1821 may rotate (pivot) about at least some of the elongate portions of mating-members 1407 that may be (removably) residing within the receivers 1827 of those brackets 1821. In some embodiments, when headrest 1800 may be in its inverted configuration (e.g., as shown in FIG. 23), most, if not all, of headrest 1800 may be outside and/or above the vessel portion of soaking-device 100, but while headrest 1800 may still be (removably) attached to soaking-device 100. In some embodiments, when headrest 1800 may be in its inverted configuration (e.g., as shown in FIG. 23), all of cushion-member 1801 and support-member (arm) 1811 may be outside and/or above the vessel portion of soaking-device 100, but while headrest 1800 may still be (removably) attached to soaking-device 100. In some embodiments, when headrest 1800 may be in its inverted configuration (e.g., as shown in FIG. 23), most, if not all, of brackets 1821 may be outside and/or above the vessel portion of soaking-device 100, but while headrest 1800 may still be (removably) attached to soaking-device 100. In some embodiments, when headrest 1800 may be in its inverted configuration (e.g., as shown in FIG. 23), at least most of brackets 1821 may be outside and/or above the vessel portion of soaking-device 100, but while headrest 1800 may still be (removably) attached to soaking-device 100. In some embodiments, the inverted configuration of headrest 1800 may permit user 190 to more readily access the vessel portion of soaking-device 100, without headrest 1800 getting in the way. In some embodiments, the inverted configuration of headrest 1800 may permit upper surfaces of the vessel portion of soaking-device 100, to be inspected, cleaned, washed, wiped down, dried, sterilized, portions thereof, combinations thereof, and/or the like, and without headrest 1800 getting in the way of such activities. In some embodiments, when headrest 1800 may be in the inverted configuration, tabs 1829 may be in (removable) physical contact with the upper surfaces of top-portion 1301 of handles 1300.

Figure 24:
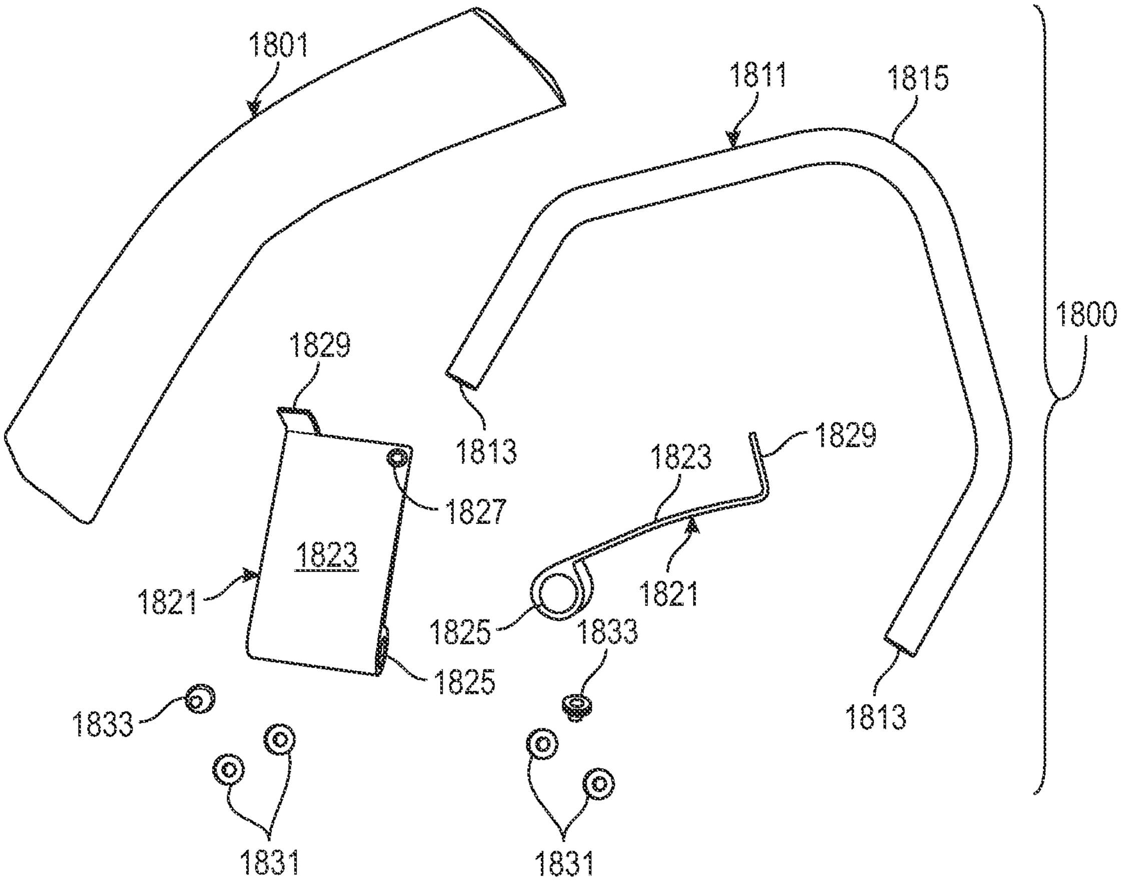
FIG. 24 shows at least some of the components (parts) of the headrest of FIG. 18A in a dissembled configuration.

FIG. 24 shows at least some of the components (parts) of headrest 1800 in a dissembled configuration. FIG. 24 may show cushion-member 1801 detached from support-member (arm) 1811. FIG. 24 may show support-member (arm) 1811 detached from the brackets 1821. FIG. 24 may show the brackets 1821, washers 1831, and thumb-screw 1833 (wing-nut 1833 or the like) detached from the channels 1400 and/or from the mating-members 1407. In some embodiments, headrest 1800 may comprise: at least one cushion-member 1801, at least one support-member 1811 (arm 1811), and at least one bracket(s) 1821. In some embodiments, headrest 1800 may comprise: at least one cushion-member 1801, at least one support-member 1811 (arm 1811), at least one bracket(s) 1821, and fastening-hardware configured to attach bracket(s) 1821 to slot 1400 (channel 1400) and/or to mating-member(s) 1407. In some embodiments, headrest 1800 may comprise: at least one cushion-member 1801, at least one support-member 1811 (arm 1811), and two brackets 1821. In some embodiments, headrest 1800 may comprise: at least one cushion-member 1801, at least one support-member 1811 (arm 1811), two brackets 1821, and fastening-hardware configured to attach brackets 1821 to slots 1400 (channels 1400) and/or to mating-members 1407. In some embodiments, this fastening-hardware may comprise one or more of: washer(s) 1831, thumb-screw(s) 1833, and/or the like. FIG. 24 may show some or all of the components (parts) of at least one embodiment of headrest 1800.

Figure 25A:
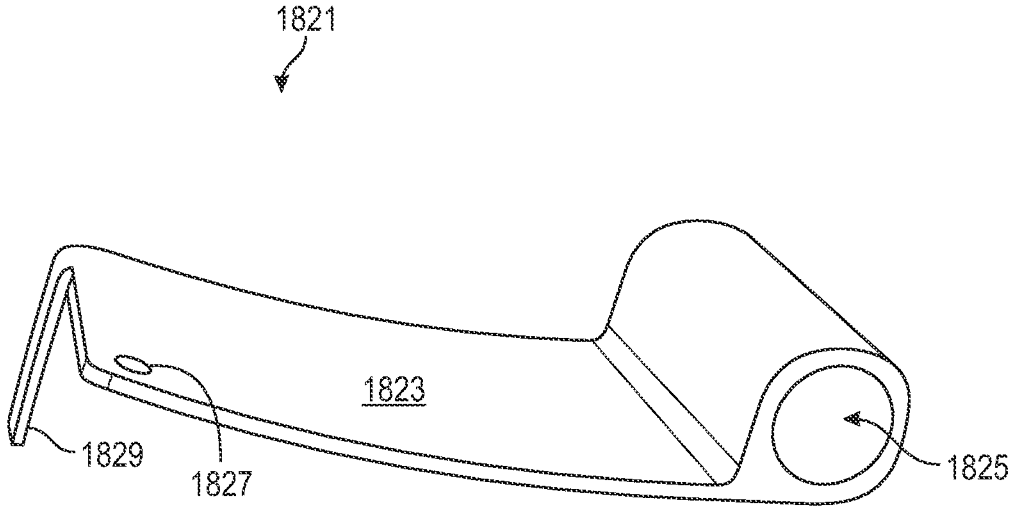
FIG. 25A shows a perspective view of just a single (headrest) bracket by itself.
Figure 25B:
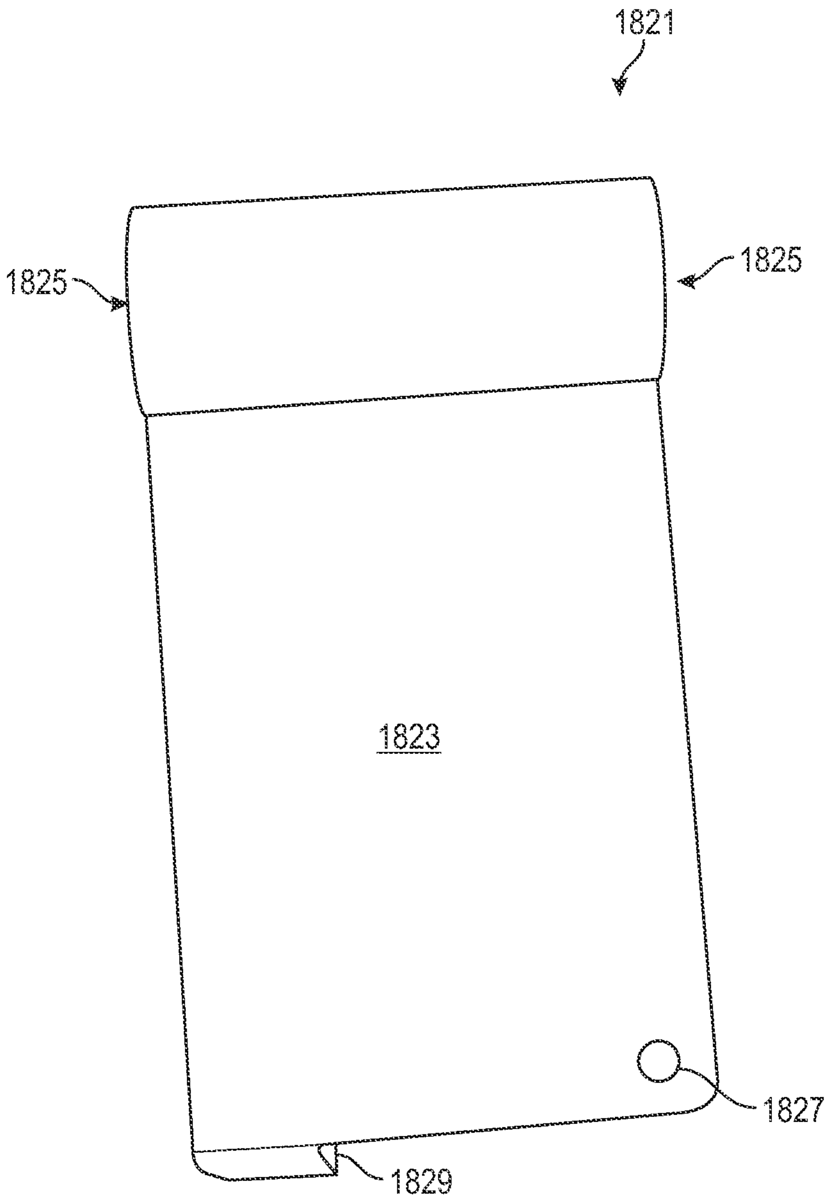
FIG. 25B may be top-down view, with respect to FIG. 25A, of the (headrest) bracket of FIG. 25A.
Figure 25C:
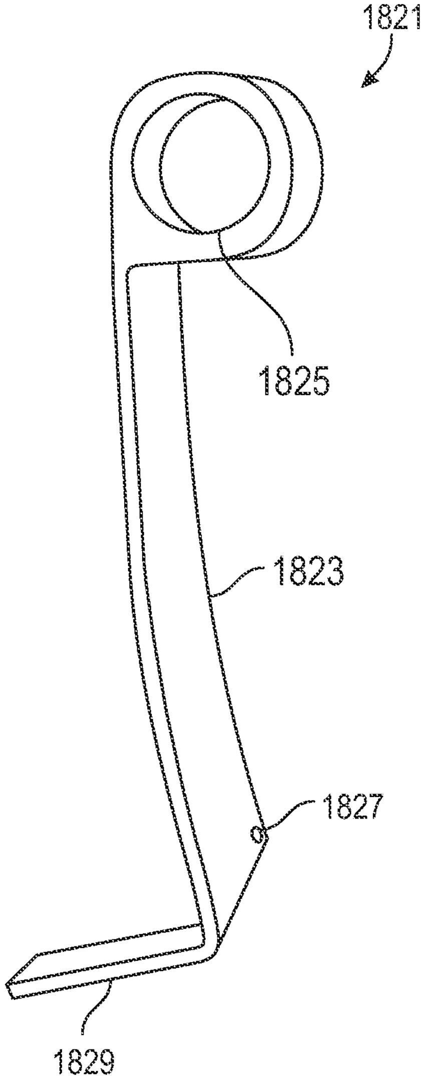
FIG. 25C may be left-side view, with respect to FIG. 25A, of the (headrest) bracket of FIG. 25A.
Figure 25D:
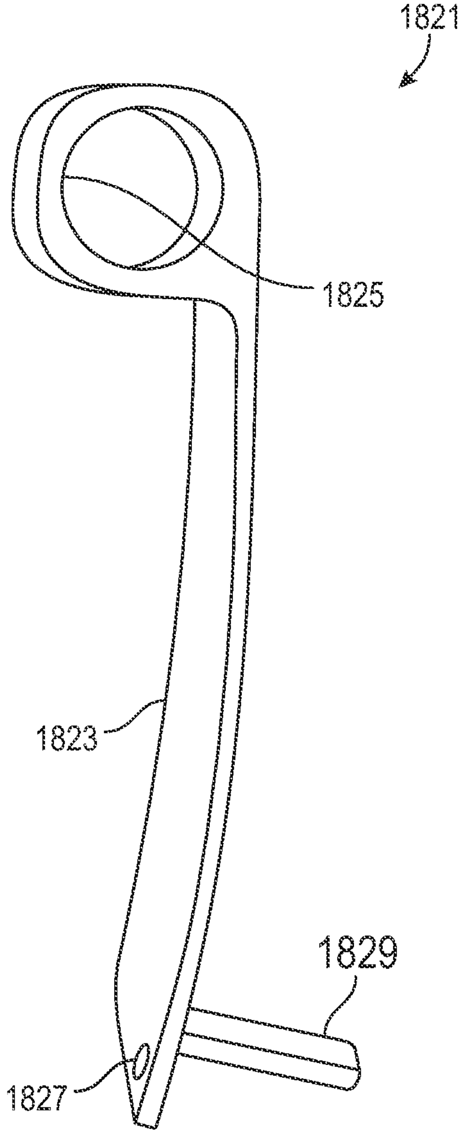
FIG. 25D may be right-side view, with respect to FIG. 25A, of the (headrest) bracket of FIG. 25A.

FIG. 25A to FIG. 25D shows various and different views of just a single bracket 1821 by itself. FIG. 25A shows a perspective view of just a single bracket 1821 by itself. In some embodiments, blade-portion (plate-portion) 1823 may have a predetermined curvature. In some embodiments, the predetermined curvature of blade-portion (plate-portion) 1823 may be complementary match the predetermined curvature of portions of floor-and-sidewalls 101, such as, sidewall-portion 1103, so that when portions of blade-portion (plate-portion) 1823 descend down into the vessel portion of soaking-device 100, when headrest 1800 may be in its in-vessel configuration, these descending portions of blade-portion (plate-portion) 1823 do not physically interfere with the predetermined curvature of portions of floor-and-sidewalls 101, such as, sidewall-portion 1103. See also, FIG. 18A. Various geometries and/or structures of bracket 1821, as already discussed, may also be seen in FIG. 25A, such as, but not limited to, blade-portion (plate-portion) 1823, receiver 1825, receiver 1827, and tab 1829. FIG. 25B may be top-down view, with respect to FIG. 25A, of just a single bracket 1821 by itself. In some embodiments, a through-hole of receiver 1827 may be visible in FIG. 25B. FIG. 25C may be left-side view, with respect to FIG. 25A, of just a single bracket 1821 by itself. FIG. 25D may be right-side view, with respect to FIG. 25A, of just a single bracket 1821 by itself. In some embodiments, a through-hole of receiver 1825 may be visible in FIG. 25C and/or FIG. 25D. In some embodiments, FIG. 25C and/or FIG. 25D may also show the predetermined curvature of blade-portion (plate-portion) 1823. In some embodiments, FIG. 25C and/or FIG. 25D may also show that tab 1829 extends from a different side/surface of blade-portion (plate-portion) 1823 as compared to receiver 1825. In some embodiments, receiver 1825 and tab 1829 may extend from opposite (different) sides (surfaces) of blade-portion (plate-portion) 1823. See e.g., FIG. 25C and/or FIG. 25D. Note, the designations of top-down view, left-side view, and right-side view of FIG. 25B to FIG. 25D are all just with respect to the view of FIG. 25A; that is, these designations may be arbitrary to bracket 1821 itself.

Figure 26:
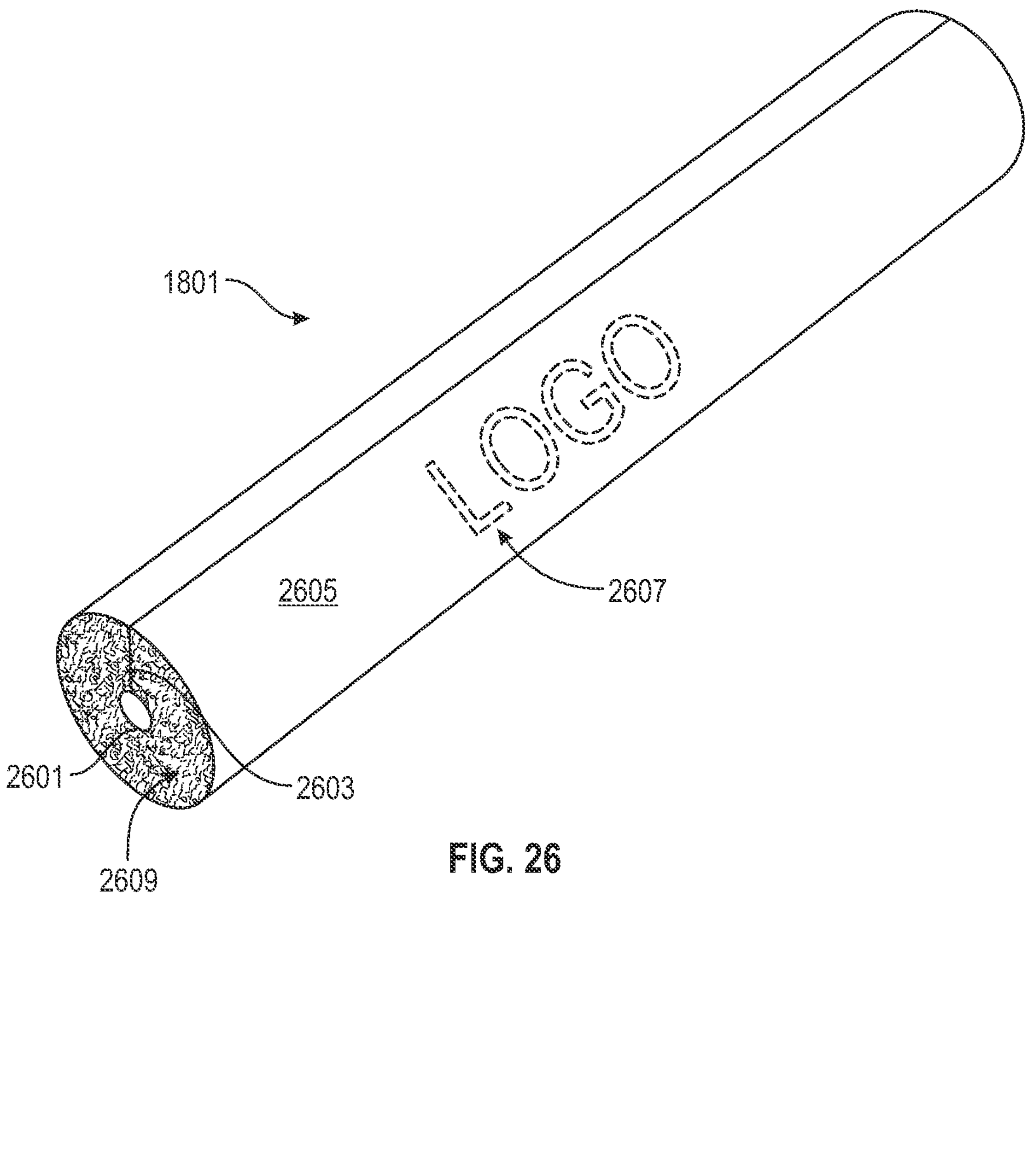
FIG. 26 is a perspective view of a (headrest) cushion-member.

FIG. 26 is a perspective view of cushion-member 1801. In some embodiments, cushion-member 1801 may be a component (part) of headrest 1800. In some embodiments, cushion-member 1801 may be configured to function as a cushion for at least some portions of head 191 and/or of face 192 of user 190. In some embodiments, cushion-member 1801 may be the same or at least substantially (mostly) similar to foam elongate members used to cover over portions of structural frame members (e.g., handle bars) of bicycles and/or motocross motorcycles and the like. In some embodiments, cushion-member 1801 may be the same or at least substantially (mostly) similar to foam swimming pool noodles used as toys and/or floatation devices. In some embodiments, cushion-member 1801 may be an elongate member of fixed, predetermined, non-variable, and/or finite length. In some embodiments, cushion-member 1801 may be an elongate cylindrical member or an elongate member that may be at least substantially (mostly) cylindrical. In some embodiments, cushion-member 1801 may be an elongate member that may be at least substantially (mostly): polygonal in transverse width cross-section, circular in transverse width cross-section, oval in transverse width cross-section, elliptical in transverse width cross-section, half-circular in transverse width cross-section, portions thereof, combinations thereof, and/or the like. In some embodiments, cushion-member 1801 may be an elongate flexible member. In some embodiments, an interior material (internal-material 2609) of cushion-member 1801 may be at least substantially (mostly) made from/of one or more of: a foam, an elastomer, a flexible plastic, portions thereof, combinations thereof, and/or the like. In some embodiments, cushion-member 1801 may comprise at least one central-axial-bore 2601. In some embodiments, central-axial-bore 2601 may be a hollow interior space of cushion-member 1801. In some embodiments, a length of central-axial-bore 2601 may run in at least at substantially (mostly) parallel direction as an overall length of cushion-member 1801. In some embodiments, opposite terminal ends of cushion-member 1801 may provide unrestricted and/or free access to openings of central-axial-bore 2601. In some embodiments, at least some of central-axial-bore 2601 may be configured to (removably) fit around at least some portions of support-member (arm) 1811. In some embodiments, one or more of the two (2) opposite terminal ends of cushion-member 1801 may be used to provide access for at least some portions of support-member (arm) 1811 getting into central-axial-bore 2601. In some embodiments, cushion-member 1801 may comprise at least one slit 2603. In some embodiments, slit 2603 may be an elongate slit running at least most of the entire length of cushion-member 1801 in a direction from one terminal end of cushion-member 1801 to the other remaining terminal end of cushion-member 1801. In some embodiments, slit 2603 may provide an access pathway from an external side/surface of cushion-member 1801 to central-axial-bore 2601. In some embodiments, slit 2603 may be configured to permit at least some portions of support-member (arm) 1811 to get into central-axial-bore 2601. In some embodiments, cushion-member 1801 may comprise at least one cover (sleeve) 2605. In some embodiments, cover (sleeve) 2605 may be a cover and/or a sleeve of cushion-member 1801. In some embodiments, cover (sleeve) 2605 may be a cover and/or a sleeve that may substantially (mostly) cover over the exterior lengthwise surfaces of the elongate (foam) member portions of cushion-member 1801. In some embodiments, cover (sleeve) 2605 may be a fabric, elastomer, and/or plastic (such as, but not limited to, vinyl) cover that provides at least some of the external surface of cushion-member 1801. In some embodiments, cover (sleeve) 2605 may be slid over and onto the exterior lengthwise surfaces of the elongate (foam) member portions of cushion-member 1801. In some embodiments, cover (sleeve) 2605 may be a flexible, hollow, and elongate member. In some embodiments, running along a length of cover (sleeve) 2605 may be Velcro or the like sealable slit that may be configured to aid and/or facilitate (removable) attachment of cover (sleeve) 2605 to the exterior lengthwise surfaces of the elongate (foam) member portions of cushion-member 1801. In some embodiments, this Velcro or the like fastener may be described as two complementary surfaces, one of a plurality of hooks and the other of a plurality of loops. In some embodiments, cushion-member 1801 may comprise at least one indicia 2607. In some embodiments, located on at least some of the exterior (lengthwise) surfaces of the elongate (foam) member portions of cushion-member 1801 may be one or more indicia 2607. In some embodiments, cover (sleeve) 2605 may comprise at least one indicia 2607. In some embodiments, one or more indicia 2607 may be located on at least some exterior surfaces of cover (sleeve) 2605. In some embodiments, indicia 2607 may comprise at least one of: a trademark (a service mark), a logo, a letter, a number, a symbol, a word, a code, an instruction, a writing, a message, artwork, a drawing, a sketch, a predetermined color, two-dimensional (2D) artwork, a name, a company name, a brand, an advertisement, a QR code, a barcode (a bar code), a 2D code, a website address, a phone number, an email address, a social media handle, a signature, portions thereof, combinations thereof, and/or the like.

Figure 27A:
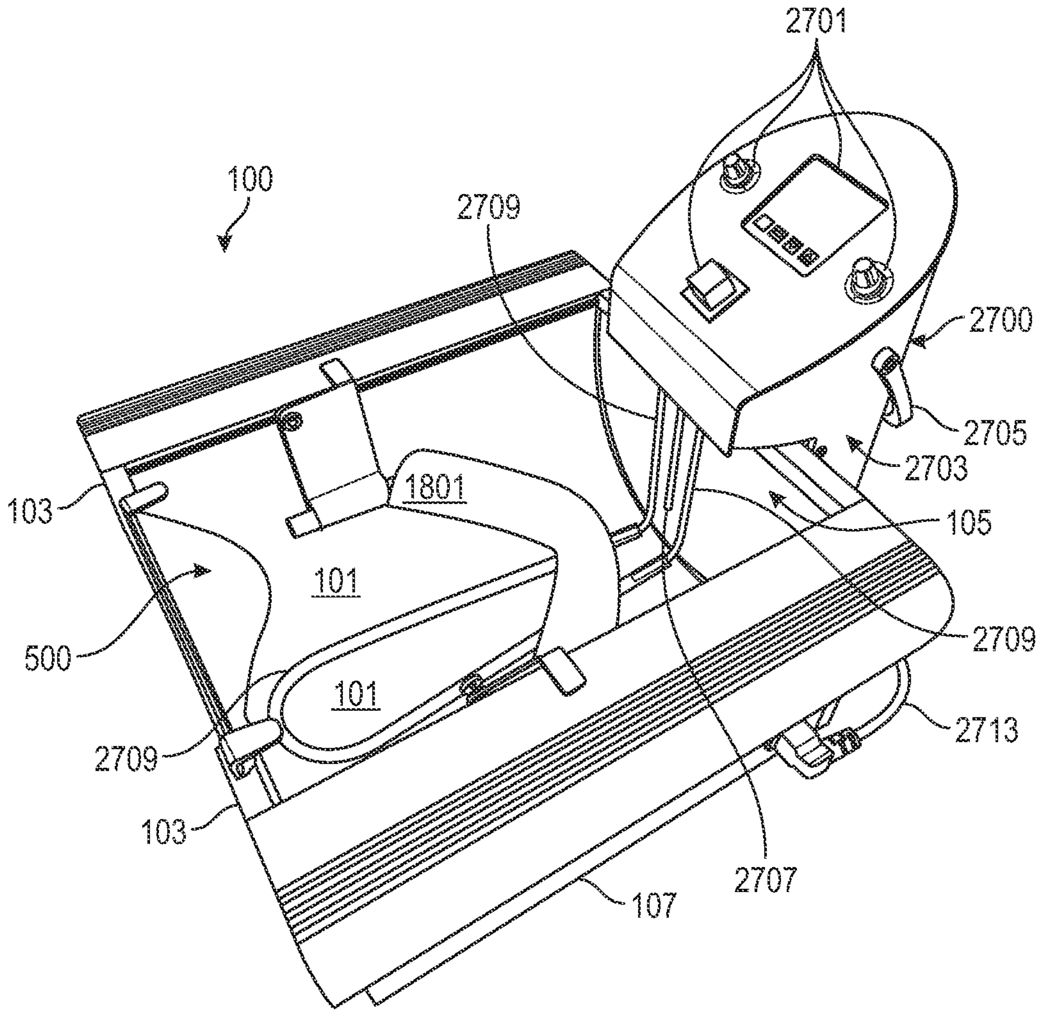
FIG. 27A is top perspective view of the soaking-device of FIG. 1A (removably) fitted with a tower.

FIG. 27A is top perspective view of soaking-device 100 (removably) fitted with a tower 2700. In some embodiments, tower 2700 may comprise a user-interface 2701. In some embodiments, user-interface 2701 may be how user 190 uses, controls, sets, manages, programs, and/or the like the electronics and/or the electronic features of soaking-device 100, such as, but not limited to, lights, lighting of immersion-liquid 180, gas bubble production within immersion-liquid 180, heating of immersion-liquid 180, cooling of immersion-liquid 180, electrical stimulation of immersion-liquid 180, portions thereof, combinations thereof, and/or the like. In some embodiments, at least some of user-interface 2701 may be located on tower 2700, exteriorly visible on tower 2700, and/or exteriorly accessible on tower 2700. In some embodiments, user-interface 2701 may comprise one or more of: a screen, a touchscreen, a LCD (liquid crystal display), a button, a switch, a dial, a slider, a membrane switch, a keypad, a keyboard, a light, a speaker, a microphone, a buzzer, a bell, a remote-control, portions thereof, combinations thereof, and/or the like. See also, FIG. 29 for user-interface 2701. See also, FIG. 41 for I/O 4113. In some embodiments, one or more I/O 4113 may be visible and/or accessible from user-interface 2701.

Continuing discussing FIG. 27A, in some embodiments, tower 2700 may further comprise a housing 2703. In some embodiments, at least some of user-interface 2701 may be located on housing 2703, exteriorly visible on housing 2703, and/or exteriorly accessible on housing 2703. In some embodiments, housing 2703 may be a housing of tower 2700. In some embodiments, housing 2703 may be at least substantially (mostly) a rigid structural member. In some embodiments, an exterior of housing 2703 may be at least substantially solid, enclosed, and/or free of holes and/or breaks. In some embodiments, housing 2703 may be at least substantially (mostly) hollow, with one or more interior void spaces. In some embodiments, these one or more interior void spaces of housing 2703 may be configured for receiving and/or housing one or more: insulation; (electric) heat pad(s); (electric) heat tape; (electric) heat element(s); (electric) heating element(s); a chiller; air pump(s); compressor (s); gas line tubing (airline tubing); gas line tubing valve(s) (airline tubing valve(s)); gas line tubing check-valve(s) (airline tubing check-valve(s)); lighting driver (transformer); a transformer; a thermostat; a rheostat; electronics; circuitry; ground fault interrupt (GFI) circuitry and/or breaker; power supply; AC/DC converter(s); wireless power transmitter(s); wireless power receiver(s); wiring; cabling; tubing; air/gas tubing; heat sink; fins; a computer; circuit board(s); printed circuit board(s) (PCBs); central processing unit(s) (CPUs); motherboard; memory (for operating system, firmware, software, settings, data, and/or the like); storage (for operating system, firmware, software, settings, data, and/or the like); buttons; switches; antennas; radios; light(s); light emitting diode (LED); speaker(s); combinations thereof; portions thereof; and/or the like. In some embodiments, at least some of the electronics housed within housing 2703 may be operatively connected to user-interface 2701 and/or to an external main power supply, such as, but not limited to, main-power-cable 2711.

Continuing discussing FIG. 27A, in some embodiments, tower 2700 may further comprise at least one handle 2705; and/or housing 2703 may comprise at least one handle 2705. In some embodiments, handle 2705 may be a handle. In some embodiments, handle 2705 may be configured to be used as a handle for tower 2700. In some embodiments, handle 2705 may be configured to freely support a weight of tower 2700. In some embodiments, handle 2705 may be configured to freely support a weight of tower 2700, including, but not limited to, temperature-sensor(s) 2707, gas-line-tubing 2709, main-power-cable 2711, intermediary-power-cable(s) 2713, portions thereof, combinations thereof, and/or the like. See e.g., FIG. 30. In some embodiments, handle 2705 may be rotatable and/or articulable. For example, compare handle 2705 positions in FIG. 27A, FIG. 27C, and/or FIG. 27D.

Continuing discussing FIG. 27A, in some embodiments, tower 2700 may further comprise at least one temperature-sensor 2707. In some embodiments, temperature-sensor 2707 may be one or more of: a temperature probe, a thermocouple, a thermometer, a thermopile, an infrared thermometer, a thermistor, a thermowell, portions thereof, combinations thereof, and/or the like. In some embodiments, temperature-sensor 2707 may extend into immersion-liquid 180, when tower may be (removably) attached to soaking-device 100 as intended. In some embodiments, temperature-sensor 2707 may be configured to shine (focus) infrared light into immersion-liquid 180, when tower may be (removably) attached to soaking-device 100 as intended. In some embodiments, temperature-sensor 2707 may be configured to sense and/or determine a current temperature of at least a portion/region of immersion-liquid 180. In some embodiments, temperature-sensor 2707 may be configured to sense and/or determine a current temperature of immersion-liquid 180 and to report, convey, send, and/or transmit such temperature data to one or more of: a thermostat, a rheostat, a temperature controller, a CPU, a processor, a screen of user-interface 2701, a touchscreen of user-interface 2701, portions thereof, combinations thereof, and/or the like. In some embodiments, temperatures sensed at temperature-sensor 2707 may be displayed on a screen of user-interface 2701, a touchscreen of user-interface 2701, portions thereof, combinations thereof, and/or the like.

Continuing discussing FIG. 27A, in some embodiments, tower 2700 may further comprise at least some gas-line-tubing 2709. In some embodiments, gas-line-tubing 2709 may run from an exterior of tower 2700 and into the vessel portion of soaking-device 100. In some embodiments, gas-line-tubing 2709 may be gas line tubing and/or airline tubing. In some embodiments, gas-line-tubing 2709 may be rigid, flexible, combinations thereof, and/or the like. In some embodiments, gas-line-tubing 2709 may be a hollow elongate member. In some embodiments, at least some of gas-line-tubing 2709 may be configured to transport one or more gasses therein, such as, but not limited to, air, oxygen, nitrogen, carbon dioxide, at least one predetermined gas, portions thereof, combinations thereof, and/or the like. In some embodiments, at least some portion (region) of gas-line-tubing 2709 that may (removably) reside within the vessel portion of soaking-device 100 during intended use, may have one or more holes, perforations, and/or the like so as to release gas bubbles into immersion-liquid 180, during intended use. In some embodiments, when soaking-device 100 and/or tower 2700 may have gas-line-tubing 2709, gas bubble production within immersion-liquid 180 need not always be on (generating gas bubbles in immersion-liquid 180) when soaking-device 100 is in intended use by user 190; i.e., gas bubbles production within immersion-liquid 180, when present/available, may be turned on or off. In some embodiments, soaking-device 100 and/or tower 2700 may be without gas-line-tubing 2709 or the like.

Continuing discussing FIG. 27A, in some embodiments, tower 2700 may further comprise at least one main-power-cable 2711; housing 2703 may comprise at least one main-power-cable 2711; and/or soaking-device 100 may comprise at least one main-power-cable 2711. In some embodiments, main-power-cable 2711 may be a power cable assembly that is configured to bring electrical power from an electrical outlet/receptacle of a building to tower 2700. In some embodiments, a given main-power-cable 2711 may be configured for whatever electrical standard/code may be appropriate by location, region, country, nation, state, municipality, and/or the like. In some embodiments, a given main-power-cable 2711 may be configured for U.S. standard 120-volt AC (alternating current) electrical service, or 220-volt AC electrical service, or some other predetermined electrical service supply. In some embodiments, main-power-cable 2711 may comprise one or more ground fault interrupt (GFI) circuitry and/or breaker. In some embodiments, when one terminal plug end of main-power-cable 2711 may be plugged into a building with electrical power and the other remaining opposite terminal end plug may be plugged into tower 2700, then tower 2700 and/or soaking-device 100 may be appropriately and sufficiently electrically powered.

Continuing discussing FIG. 27A, in some embodiments, tower 2700 may further comprise at least one intermediary-power-cable 2713; housing 2703 may comprise at least one intermediary-power-cable 2713; and/or soaking-device 100 may comprise at least one intermediary-power-cable 2713. In some embodiments, tower 2700 may further comprise at least two intermediary-power-cables 2713; housing 2703 may comprise at least two intermediary-power-cables 2713; and/or soaking-device 100 may comprise at least two intermediary-power-cables 2713. In some embodiments, intermediary-power-cable 2713 may be a (electric) power cable assembly that is configured to bring electrical power from tower 2700 to electronics of soaking-device 100; and/or intermediary-power-cable 2713 may be configured to communications between electronics of tower 2700 and electronics of soaking-device 100. In some embodiments, a given intermediary-power-cable 2713 may be configured for whatever electrical standard/code may be appropriate for electronics of soaking-device 100. For example, and without limiting the scope of the present invention, in some embodiments, LEDs of soaking-device 100 may be 5-volt LEDs and intermediary-power-cable 2713 (or a portion thereof) may then be configured for 5-volt transmission. For example, and without limiting the scope of the present invention, in some embodiments, heater(s) and/or cooler(s) (chiller(s) of soaking-device 100 may be 120-volt AC devices or 220-volt AC devices, and then intermediary-power-cable 2713 (or a portion thereof) may then be configured for 120-volt AC or 220-volt AC transmission. In some embodiments, a single intermediary-power-cable 2713 assembly may be configured to handle two or more different voltage transmissions, such as, but not limited to, 5-volt and 120-volt AC, or 5-volt and 220-volt AC or others. In some embodiments, intermediary-power-cable 2713 may comprise one or more ground fault interrupt (GFI) circuitry and/or breaker. In some embodiments, when one terminal plug end of intermediary-power-cable 2713 may be plugged into tower 2700 and the other remaining opposite terminal end plug may be plugged into an exterior panel of soaking-device 100 (such as, but not limited to, external (exterior) surface 811 of a side-panel 107).

In some embodiments, (removable) wired connections between tower 2700 and side-panels 107 and/or rear-panel 105 (e.g., intermediary-power-cable(s) 2713) may be replaced with a wireless power transmission and receiving system, with a wireless power transmitter (e.g., a first antenna coil) located within (and/or on) tower 2700 and a complimentary wireless power receiver (e.g., a second antenna coil) located sufficiently close to the wireless power transmitter located within (and/or on) rear-panel 105 and/or side-panels 107.

Figure 27B:
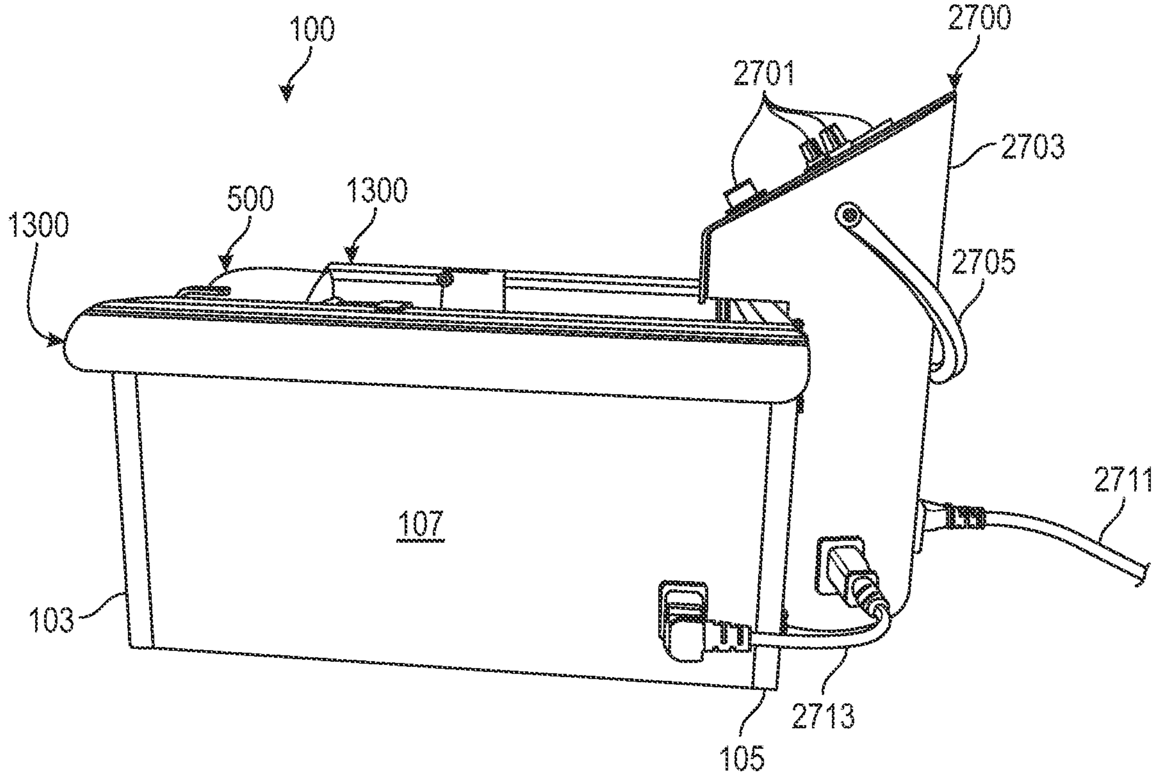
FIG. 27B is a right perspective view of the soaking-device of FIG. 1A (removably) fitted with the tower of FIG. 27A.

FIG. 27B is a right perspective view of soaking-device 100 (removably) fitted with tower 2700. FIG. 27B shows intermediary-power-cable 2713 (removably) attached to tower 2700 and to an exterior panel of soaking-device 100 (such as, but not limited to, external (exterior) surface 811 of a side-panel 107).

Figure 27C:
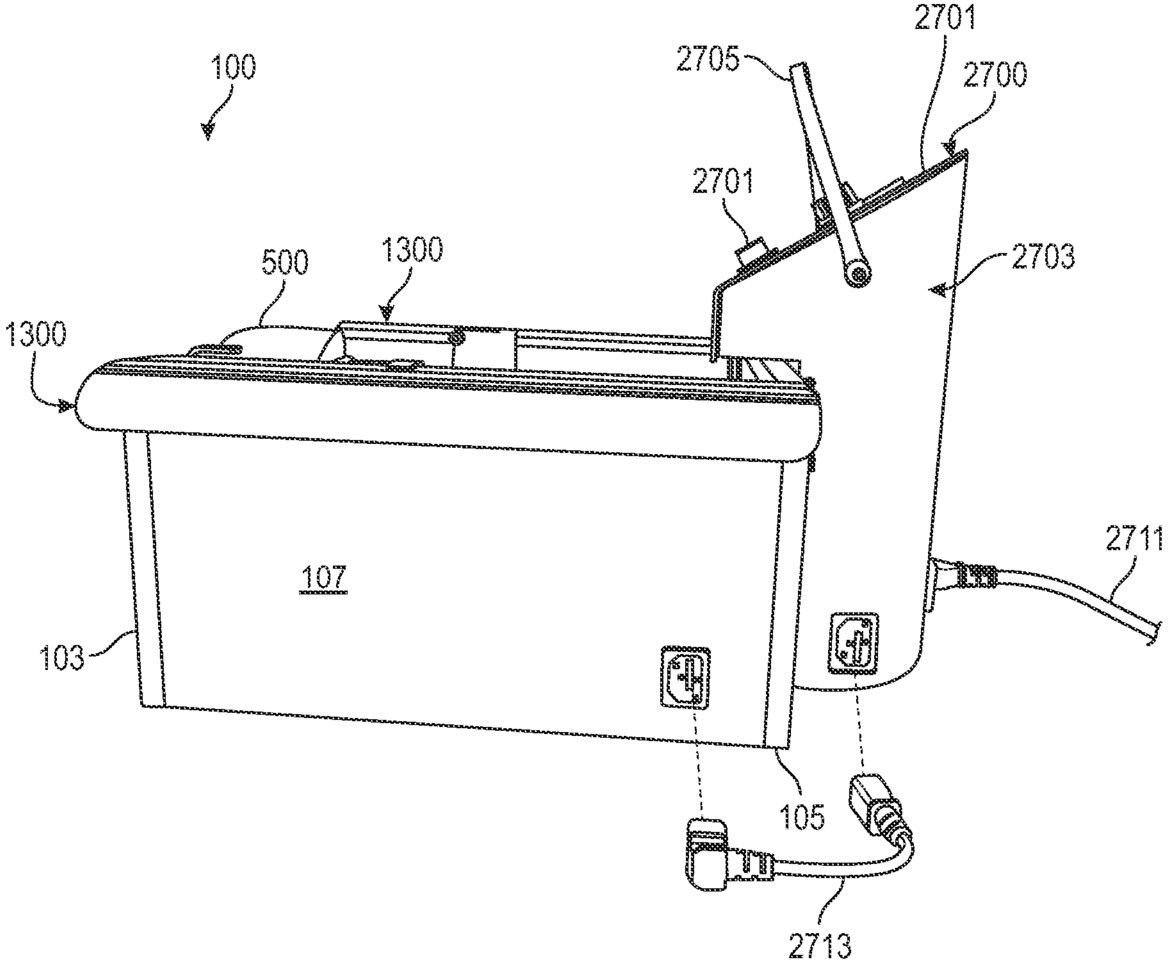
FIG. 27C is another right perspective view of the soaking-device of FIG. 1A (removably) fitted with the tower of FIG. 27A.

FIG. 27C is another right perspective view of soaking-device 100 (removably) fitted with tower 2700. FIG. 27C shows intermediary-power-cable 2713 detached from tower 2700 and from an exterior panel of soaking-device 100 (such as, but not limited to, external (exterior) surface 811 of a side-panel 107). Whereas. FIG. 27B shows intermediary-power-cable 2713 (removably) attached to tower 2700 and to an exterior panel of soaking-device 100 (such as, but not limited to, external (exterior) surface 811 of a side-panel 107).

Notice that handle 2705 is shown in different positions in FIG. 27C verses FIG. 27B (or FIG. 27A).

Figure 27D:
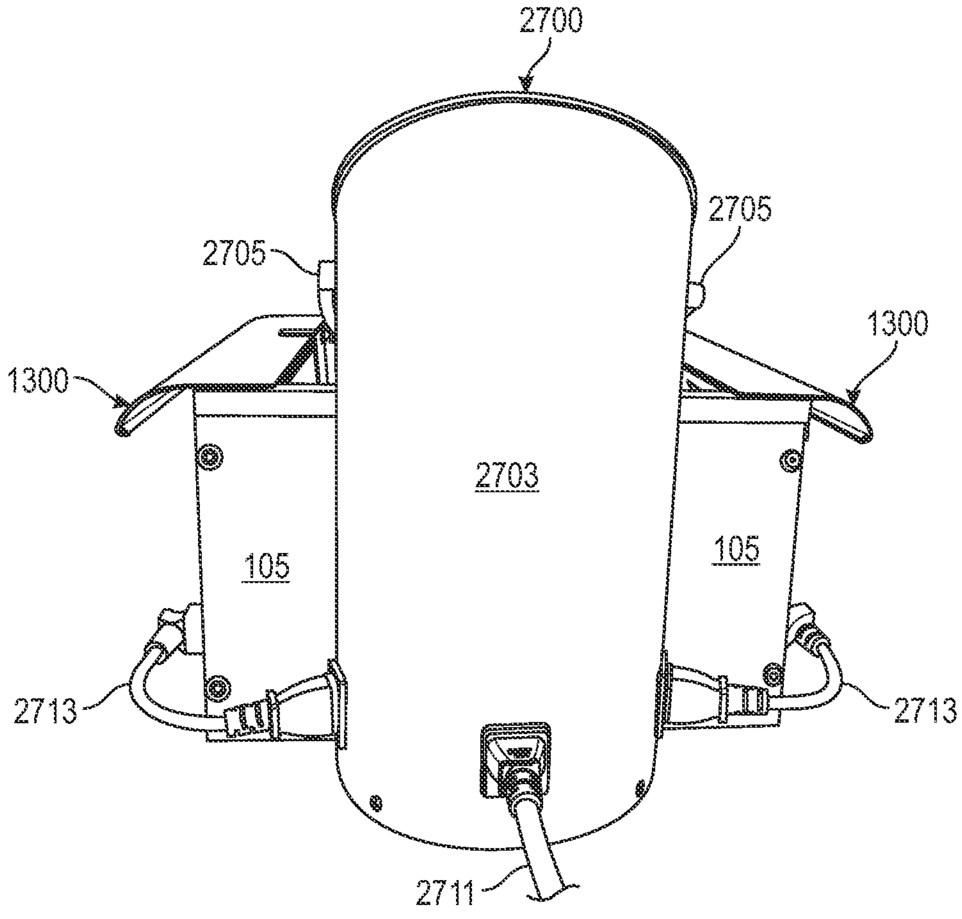
FIG. 27D is a rear (back) perspective view of the soaking-device of FIG. 1A (removably) fitted with the tower of FIG. 27A.

FIG. 27D is a rear (back) perspective view of soaking-device 100 (removably) fitted with tower 2700. FIG. 27D show two different intermediary-power-cables 2713 may be utilized. In some embodiments, one such intermediary-power-cable 2713 may be configured to convey electrical power from tower 2700 to soaking-device 100 for powering the lights (LED(s)) of soaking-device 100. In some embodiments, the other such intermediary-power-cable 2713 may be configured to convey electrical power from tower 2700 to soaking-device 100 for powering the heater(s) and/or the cooler(s) (chiller(s)) of soaking-device 100. FIG. 27D may show that one terminal end plug of main-power-cable 2711 (removably) attached to housing 2703. Notice that handle 2705 is shown in different positions in FIG. 27D, versus FIG. 27B (or FIG. 27A) or FIG. 27C.

Figure 27E:
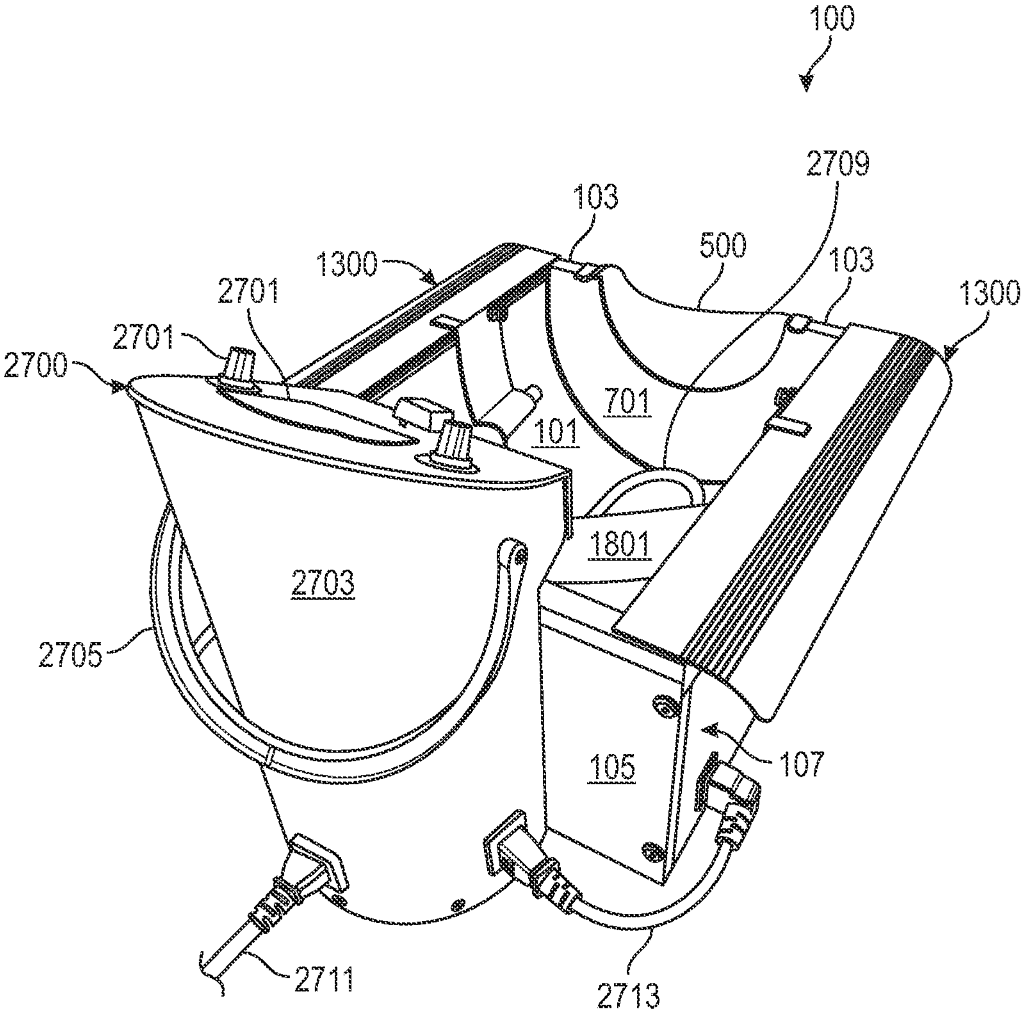
FIG. 27E is a rear (back), top, and left-side perspective view of the soaking-device of FIG. 1A (removably) fitted with the tower of FIG. 27A.

FIG. 27E is a rear (back), top, and left-side perspective view of soaking-device 100 (removably) fitted with tower 2700.

Figure 28:
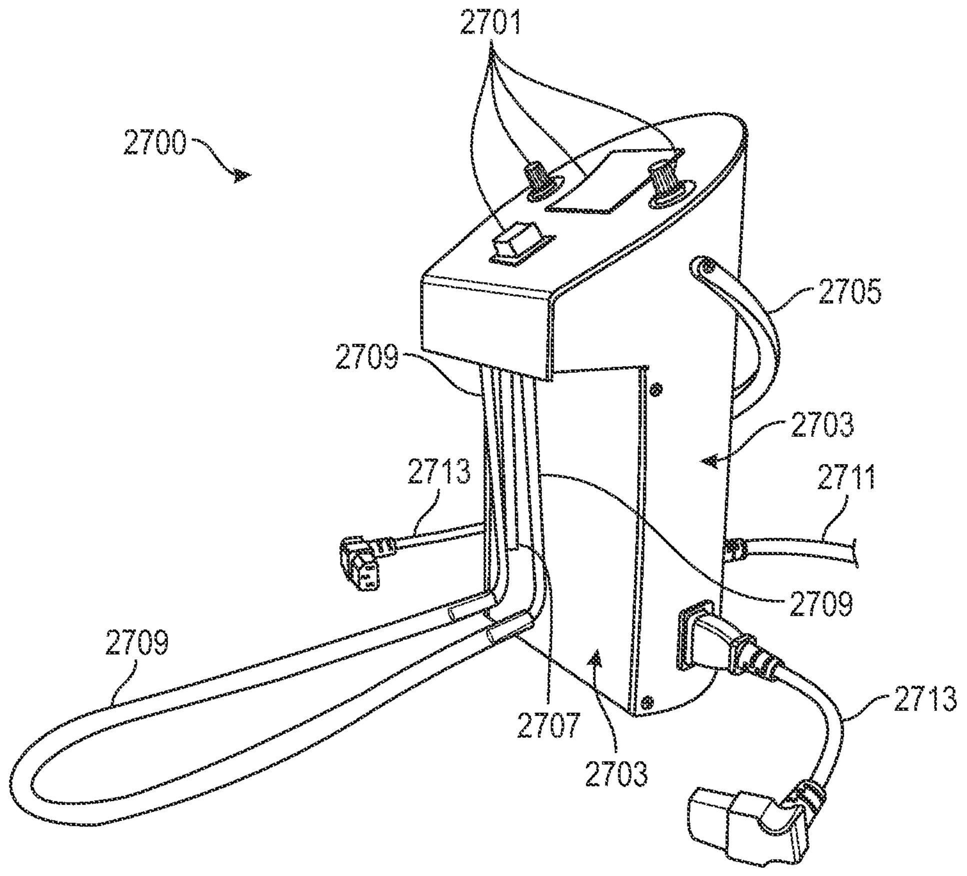
FIG. 28 is a right-side perspective view of just the tower of FIG. 27A (with the soaking-device of FIG. 1A omitted from the figure).

FIG. 28 is a right-side perspective view of just tower 2700 (with soaking-device 100 omitted from the figure). In some embodiments, there may be a gap 3001 of void space between an external (vertical) surface of housing 2703 and the descending portions of temperature-sensor 2707 and/or of gas-line tubing 2709. In some embodiments, a thickness of rear-panel 105 may be sized and/or shaped to (removably) fit into this gap 3001. See e.g., FIG. 30 that better shows this gap 3001.

Figure 29:
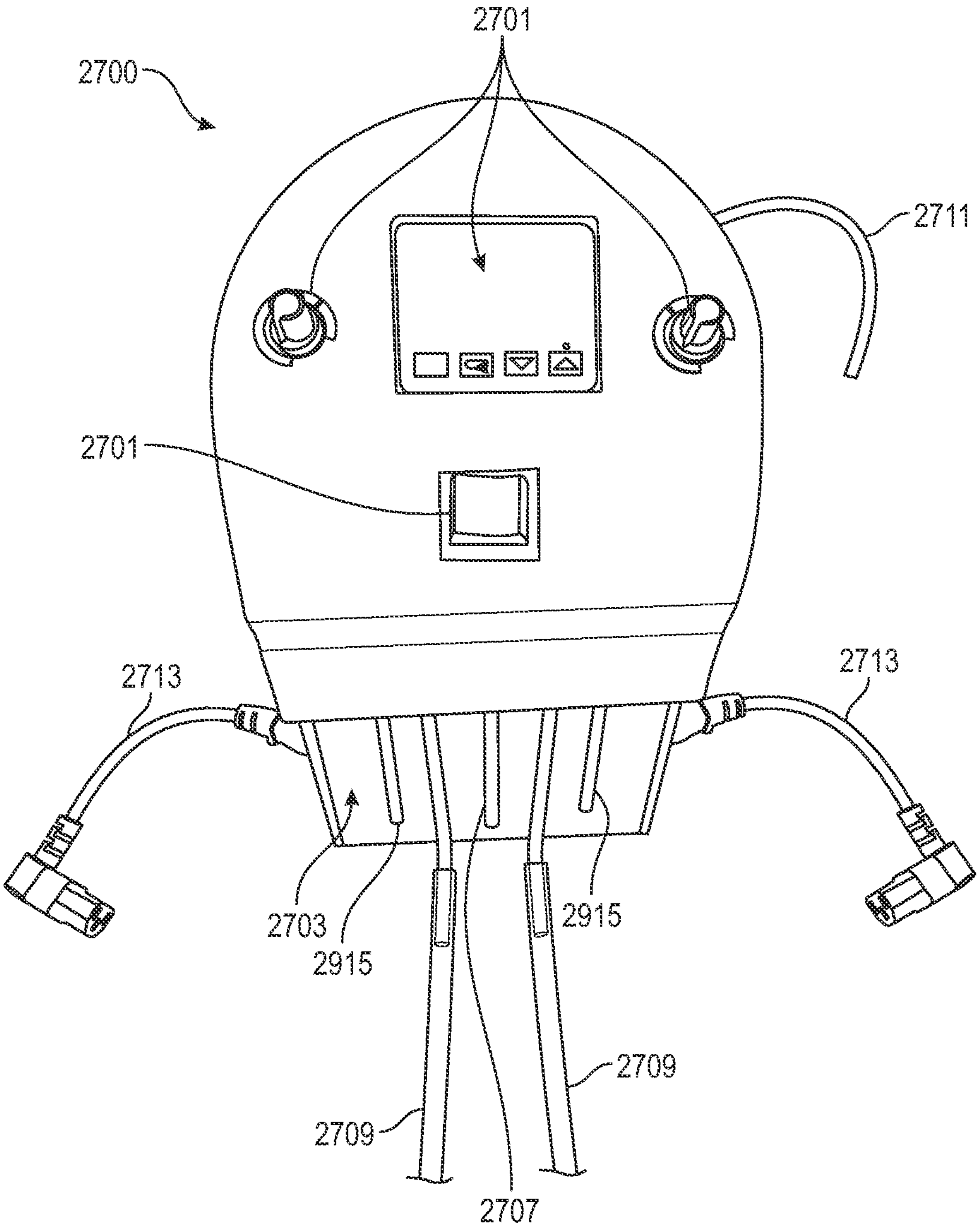
FIG. 29 is a top perspective view of a portion of the tower of FIG. 27A, showing a top of the tower of FIG. 27A.

FIG. 29 is a top perspective view of a portion of tower 2700 showing a top of tower 2700, showing at least some of user-interface 2701.

Continuing discussing FIG. 29, in some embodiments, tower 2700 may further comprise at least one electrode 2915. In some embodiments, tower 2700 may further comprise at least two electrodes 2915. In some embodiments, these electrode(s) 2915 of tower 2700 may descent from housing 2703 of tower 2700, at least in a similar fashion as temperature-sensor 2707 and/or as gas-line-tubing 2709. In some embodiments, reference numerals 2707, 2709, and/or 2915 may be for such electrode(s). In some embodiments, these electrode(s) 2915 of tower 2700 may descent from housing 2703 of tower 2700, and into immersion-liquid 180, when tower 2700 may be removably attached (engaged) to rear-panel 105 of soaking-device 100, such as shown in FIG. 27A; however, note that electrode(s) 2915 are not shown in FIG. 27A, but are shown in FIG. 29. In some embodiments, these electrode(s) 2915 of tower 2700 may be configured to provide electrical stimulation (e-stem) to the immersed face 192 and/or head 191 portion(s) of user 190, when such portions of user 190 may be removably immersed within immersion-liquid 180. In some embodiments, these electrode(s) 2915 of tower 2700 may be configured to send, emit, discharge, portions thereof, combinations thereof, and/or the like into 180 electrical stimulation, electrical voltage, current, pulses, impulses, portions thereof, combinations thereof, and/or the like. In some embodiments, the electrical voltage, current, pulses, impulses, portions thereof, combinations thereof, and/or the like discharged into immersion-liquid 180 from electrode(s) 2915 may not be high enough (large enough) to be harmful to user 190.

Figure 30:
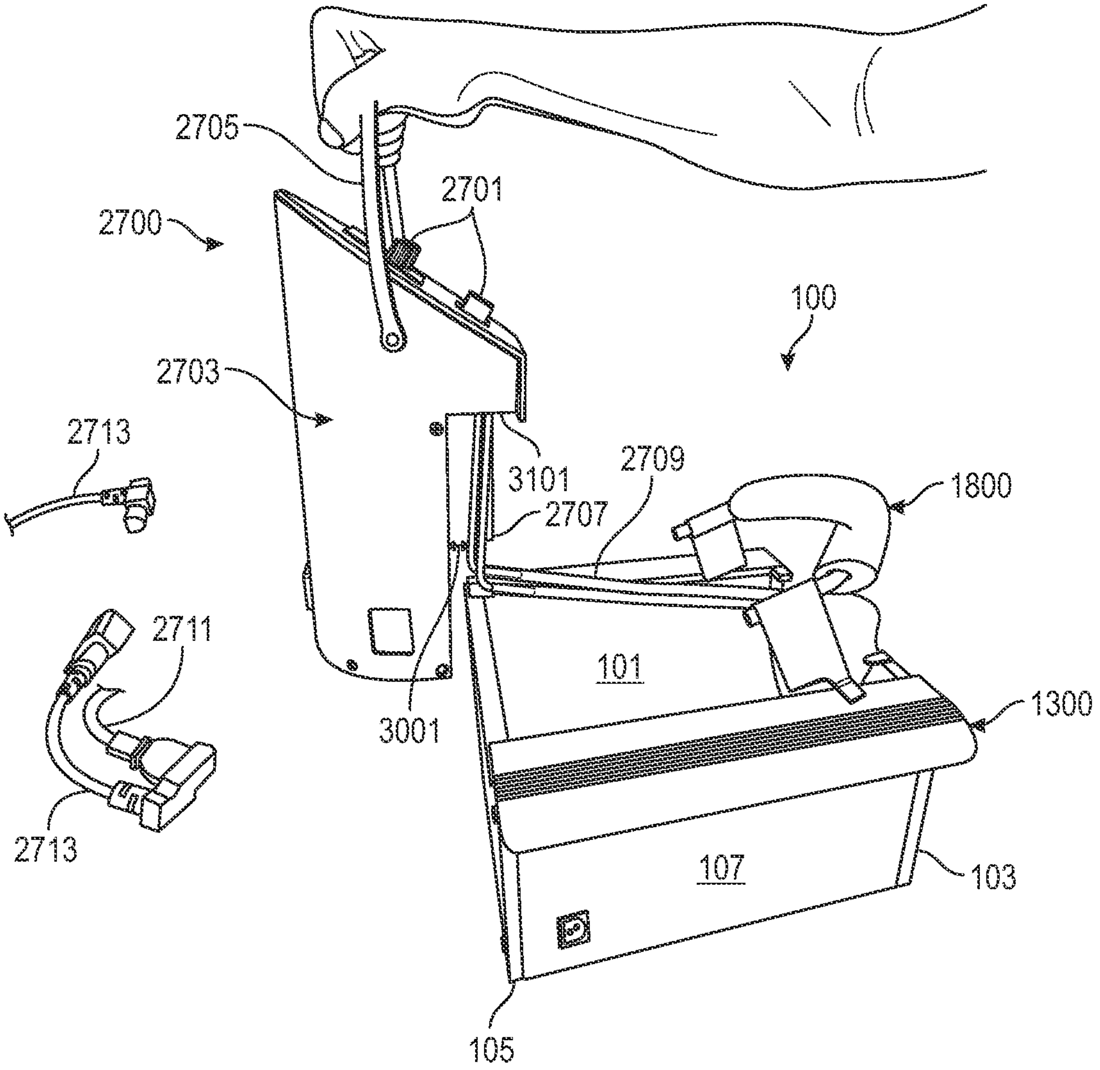
FIG. 30 is a left-side perspective view showing how the tower of FIG. 27A may be installed or removed from the soaking-device of FIG. 1A.

FIG. 30 is a left-side perspective view showing how tower 2700 may be installed or removed from soaking-device 100. In some embodiments, there may be gap 3001 of void space between an external (vertical) surface of housing 2703 and the descending portions of temperature-sensor 2707, gas-line tubing 2709, electrode(s) 2915, liquid-level-sensor 3103, sensor(s), portions thereof, combinations thereof, and/or the like.

In some embodiments, at least some of the descending portions of one or more of: temperature-sensor 2707, gas-line tubing 2709, electrode(s) 2915, liquid-level-sensor 3103, sensor(s), portions thereof, combinations thereof, and/or the like may extend and descend from a manifold (block) 3101 or the like portion of tower 2700. In some embodiments, manifold (block) 3101 may be a portion of tower 2700 that extends over a portion of immersion-liquid 180 (near rear-panel 105) when tower 2700 may be removably attached (installed) to soaking-device 100 (rear-panel 105); such that at least some of the descending portions of one or more of: temperature-sensor 2707, gas-line tubing 2709, electrode(s) 2915, liquid-level-sensor 3103, sensor(s), portions thereof, combinations thereof, and/or the like may descend down into immersion-liquid 180 and/or point at/towards immersion-liquid 180.

In some embodiments, a thickness of rear-panel 105 may be sized and/or shaped to (removably) fit into this gap 3001. In some embodiments, to install tower 2700 to soaking-device 100, user 190 may simply hold and lift tower 2700 into place, with user 190 holding handle 2705, and lifting tower 2700 such that the thickness of rear-panel 105 slides upwards into gap 3001, with at least some of the descending portions of temperature-sensor 2707, gas-line tubing 2709, electrode(s) 2915, liquid-level-sensor 3103, sensor(s), portions thereof, combinations thereof, and/or the like then residing within the vessel portion of soaking-device 100 and/or pointing at/towards immersion-liquid 180 within the vessel portion of soaking-device 100. In some embodiments, to uninstall (remove) tower 2700 from soaking-device 100, this process may be essentially reversed. In some embodiments, to uninstall (remove) tower 2700 from soaking-device 100, user 190 may simply hold and lift tower 2700 out of place, with user 190 holding handle 2705, and lifting tower 2700 such that the thickness of rear-panel 105 slides downwards and out from gap 3001, with temperature-sensor 2707, gas-line tubing 2709, electrode(s) 2915, liquid-level-sensor 3103, sensor(s), portions thereof, combinations thereof, and/or the like then no longer residing within the vessel portion of soaking-device 100. In some embodiments, the install and/or the uninstall process(es) of FIG. 30 may be done with the main-power-cable 2711 and/or the intermediary-power-cable(s) 2713 detached from tower 2700 or attached to tower 2700.

Figure 31:
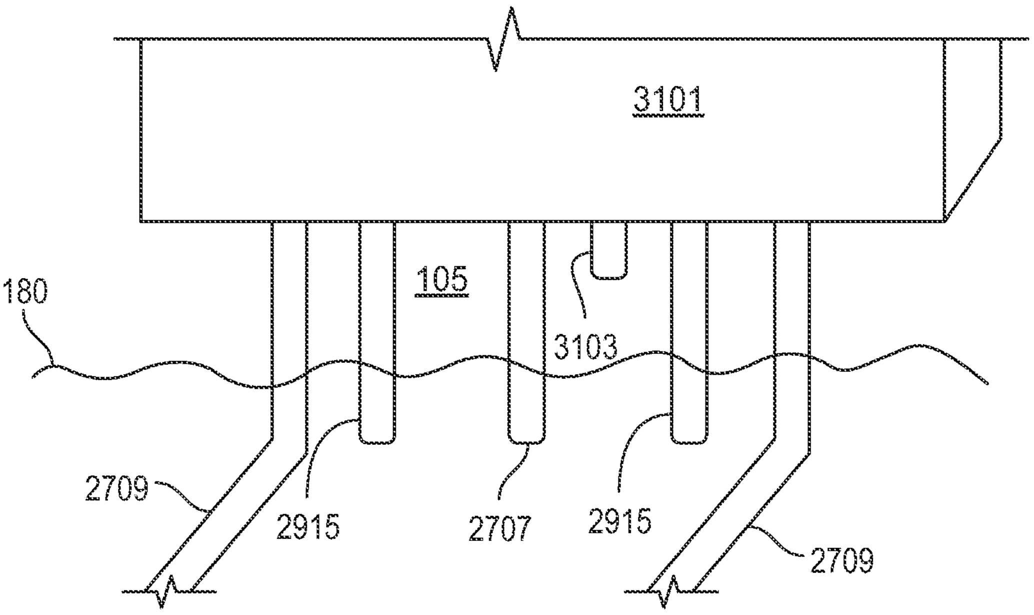
FIG. 31 is partial perspective view of a block (manifold) region (portion) of the tower of FIG. 27A showing where one or more of a temperature-sensor, gas-line tubing, electrode(s), a liquid-level-sensor, sensor(s), portions thereof, combinations thereof, and/or the like that may extend and/or descend from a bottom (or exterior side) of the block (manifold) and/or be visible from the bottom (or the exterior side) of the block (manifold).

FIG. 31 is partial perspective view of a block (manifold) 3101 region (portion) of tower 2700 showing where one or more of temperature-sensor 2707, gas-line tubing 2709, electrode(s) 2915, liquid-level-sensor 3103, sensor(s), portions thereof, combinations thereof, and/or the like may extend and descend from a bottom (or exterior side) of block (manifold) 3101 and/or be visible from the bottom (or the exterior side) of block (manifold) 3101. In some embodiments, liquid-level-sensor 3103 may be a sensor configured to determine, find, read, sense, and/or the like an upper (top) level of immersion-liquid 180 within the vessel portion of soaking-device 100. In some embodiments, liquid-level-sensor 3103 may utilize a sensing technology that requires at least a portion of liquid-level-sensor 3103 to be physically contacting immersion-liquid 180 and/or liquid-level-sensor 3103 may utilize a sensing technology that merely requires at least a portion of liquid-level-sensor 3103 to be proximate (e.g., within one foot) and/or aimed (pointed) at immersion-liquid 180. In some embodiments, the sensing technology of liquid-level-sensor 3103 may be selected from at least one of: a range finding sensor, an optical sensor, an infrared sensors, an optical infrared sensor, a laser sensor, an acoustic sensor, using sound waves, using sonar, using radar, using radio waves, a capacitive-based sensor, a resistance-based sensor, an inductance-based sensor, a permittivity based sensor, a complex permittivity based sensor, a complex impedance based sensor, portions thereof, combinations thereof, and/or the like. In some embodiments, liquid-level-sensor 3103 may be configured to determine, find, read, sense, and/or the like of an upper (top) level of immersion-liquid 180 within the vessel portion of soaking-device 100. In some embodiments, liquid-level-sensor 3103 may be configured to operate as a kill switch to prevent any heating-elements (e.g., electronics 117 may comprise at least one heating-element) of soaking-device 100 to heat up (be electrically energized) if immersion-liquid 180 may be detected as below a minimum predetermined liquid level within soaking-device 100. In some embodiments, liquid-level-sensor 3103 may be in operational communication with at least some electronics 117 may of soaking-device 100 such as, but not limited to, a thermostat, a rheostat, a controller, a PCB, a circuit, portions thereof, combinations thereof, and/or the like of soaking-device 100. In some embodiments, liquid-level-sensor 3103 may be configured to prevent any heating-elements (e.g., electronics 117 may comprise at least one heating-element) of soaking-device 100 to heat up (be electrically energized) if immersion-liquid 180 may be detected as below a minimum predetermined liquid level within soaking-device 100.

Continuing discussing FIG. 31, in some embodiments, reference numerals "2707," "2915," and/or "3103" may be for one or more of: a temperature-sensor, a temperature probe, a thermocouple, a thermometer, a thermopile, an infrared thermometer, a thermistor, a thermowell, an electrode, a probe, a liquid-level sensor, a range finding sensor, an optical sensor, an infrared sensor, an optical infrared sensor, a laser sensor, an acoustic sensor, a sound emitter, a sound receiver, a radio wave emitter, a radio wave receiver, a capacitive-based sensor, a resistance-based sensor, an inductance-based sensor, a permittivity based sensor, a complex permittivity based sensor, a complex impedance based sensor, portions thereof; combinations thereof; and/or the like. In some embodiments, tower 2700 and/or block 3101 may comprise at least one of the members of reference numerals "2707," "2709," "2915," and/or "3103." In some embodiments, the members of reference numerals "2707," "2915," and/or "3103" may be of different or the same lengths with respect to each other. In some embodiments, at least one of the members of reference numerals "2707," "2915," and/or "3103" may be of a length to directly physically touch immersion-liquid 180 within soaking-device 100, when tower 2700 may be removably attached (installed) onto soaking-device 100 (such as over rear-panel 105). In some embodiments, at least one of the members of reference numerals "2707," "2915," and/or "3103" may be oriented to point at (aim at/target towards) immersion-liquid 180 within soaking-device 100, when tower 2700 may be removably attached (installed) onto soaking-device 100 (such as over rear-panel 105). In some embodiments, the members of reference numerals "2707," "2709," "2915," and/or "3103" may be arranged in a variety of different patterns, quantities, configurations, and/or the like with respect to each other; i.e., not just limited to the pattern, quantity, and configuration, with respect to each other, shown in FIG. 31.

Figure 32:
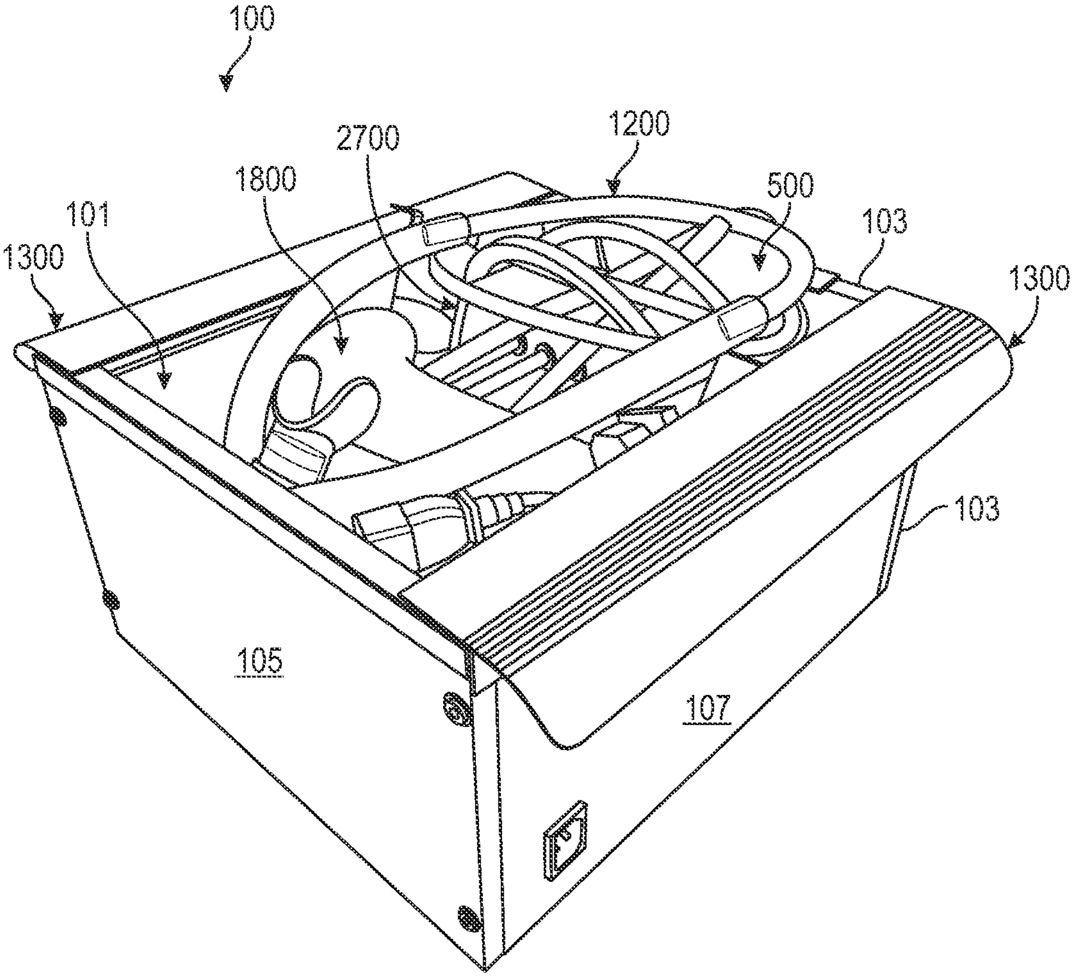
FIG. 32 is a top left perspective view of a soaking-device in a storage configuration and/or in a travel configuration, with at least some components of the soaking-device temporarily stored within a vessel portion of the soaking-device.

FIG. 32 is a top left perspective view of soaking-device 100 in a storage configuration and/or in a travel configuration. In some embodiments, when soaking-device 100 may be in this storage configuration and/or in this travel configuration, then at least some of the accessories of soaking-device 100 may be removably held within the vessel portion of soaking-device 100. In some embodiments, the one or more accessories that may be stored within the vessel portion of soaking-device 100 may comprise: breathing-apparatus 1700, headrest 1800, tower 2700, temperature-sensor 2707, main-power-cable 2711, intermediary-power-cable 2713, portions thereof, combinations thereof, and/or the like.

Figure 33A:
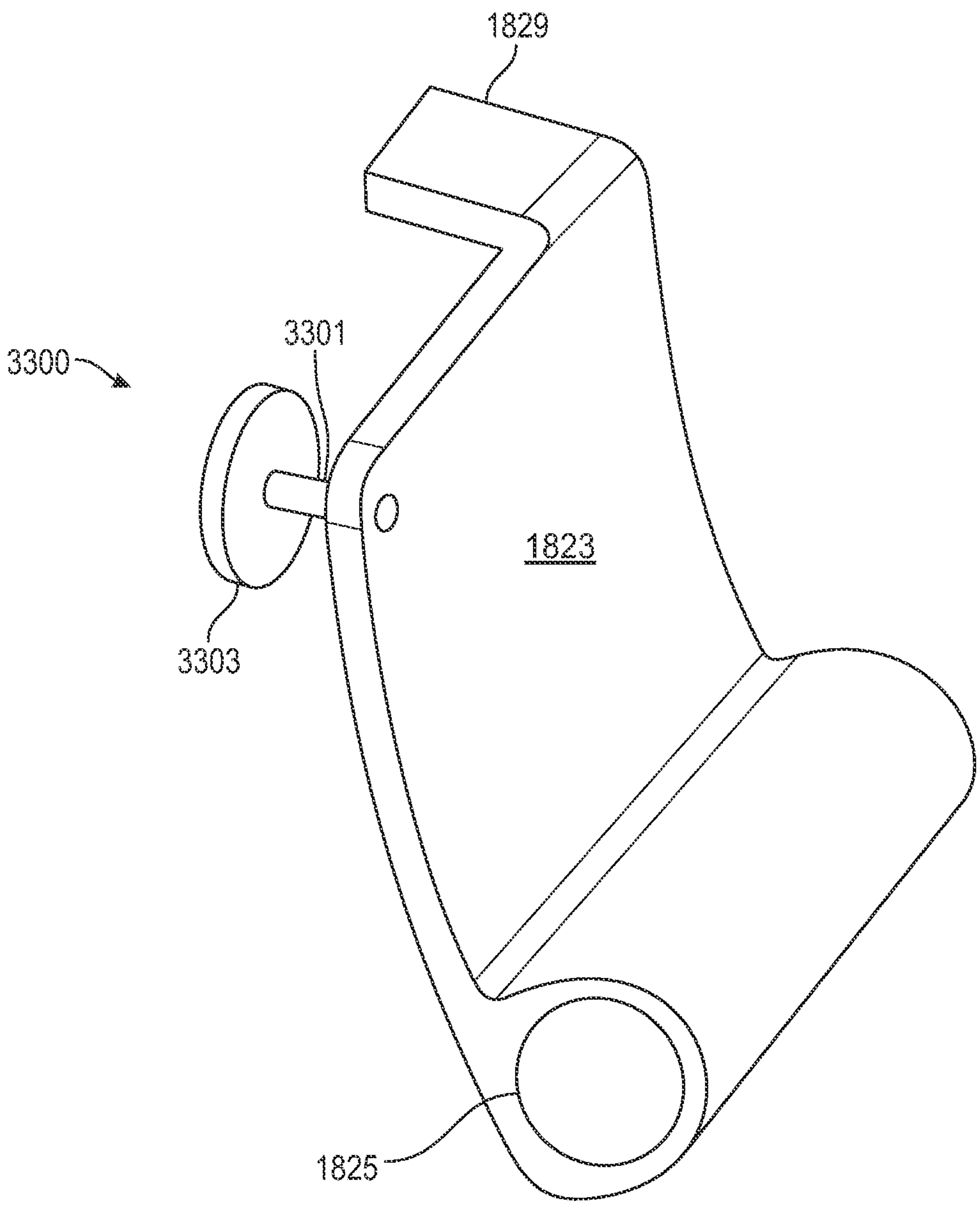
FIG. 33A shows another embodiment of the bracket from FIG. 18A.
Figure 33B:
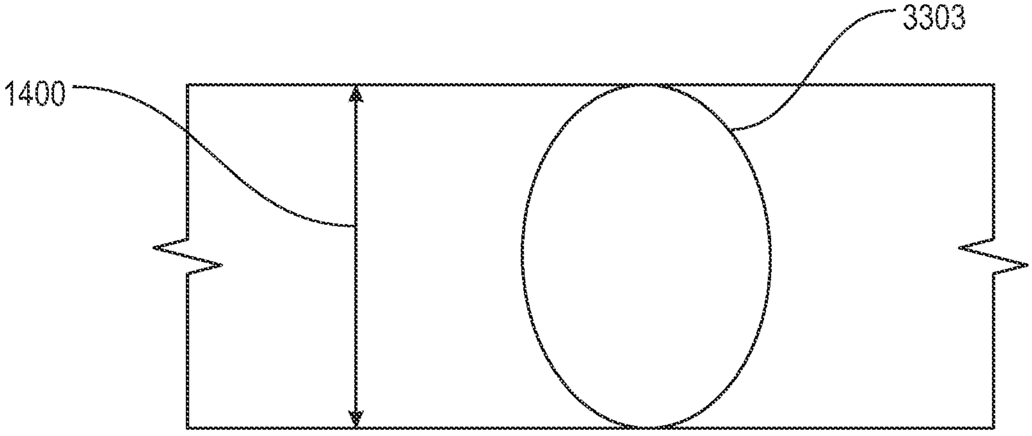
FIG. 33B is a partial view showing an oval-member (of the bracket of FIG. 33A) retained within a slot of the soaking-device of FIG. 1A, with the oval-member having a particular rotational orientation towards the slot, namely, with the oval-member rotated so as to generate (maximum) friction between the oval-member 3303 and the slot.

FIG. 33A shows another embodiment of bracket 1821, namely a bracket 3300, in a perspective view of this bracket 3300. In some embodiments, bracket 1821 may be replaced by bracket 3300. In some embodiments, headrest 1800 may comprise one or two bracket(s) 3300. In some embodiments, bracket 3300 may be at least substantially (mostly) structurally, geometrically, and/or dimensionally identical to bracket 1821, except that in bracket 3300 receiver 1827 may be replaced by a post 3301 and an oval-member 3303. In some embodiments, post 3301 may be a structural post member, i.e., an elongate member, that extends (protrudes) from a corner region of blade-portion (plate-portion) 1823 and on a terminal end of post 3301 may be the oval-member 3303 attached thereto. In some embodiments, post 3301 may extend away from a major (main) external surface of blade-portion (plate-portion) 1823. In some embodiments, oval-member 3303 may be disc (disk) like member that is oval in shape as opposed to being circular in shape. In some embodiments, oval-member 3303 may be attached to a terminal end of post 3301. In some embodiments, any diameter and/or transverse width dimension of oval-member 3303 may be larger than a diameter of post oval-member 3303. As shown in FIG. 33B and in FIG. 33C, oval-member 3303 may be sized and shaped to be received within slot 1400 (and/or within enclosed-region 1403).

FIG. 33B is a partial view showing oval-member 3303 retained within slot 1400 (and/or within enclosed-region 1403), with oval-member 3303 having a particular rotational orientation towards slot 1400 (and/or to enclosed-region 1403), namely, with oval-member 3303 rotated so as to generate (maximum) friction between oval-member 3303 and slot 1400 (and/or enclosed-region 1403). In some embodiments, this (maximum) frictional orientation of oval-member 3303 against slot 1400 (and/or enclosed-region 1403) shown in FIG. 33B may correspond to when headrest 1800 may be in its in-vessel configuration as shown in FIG. 18A. In some embodiments, when oval-member 3303 may be in this (maximum) frictional orientation as shown in FIG. 33B, it may be difficult for user 190 (via hands of user 190) to translationally slide headrest 1800 along the lengths of tracks 1400 (because of this friction).

Figure 33C:
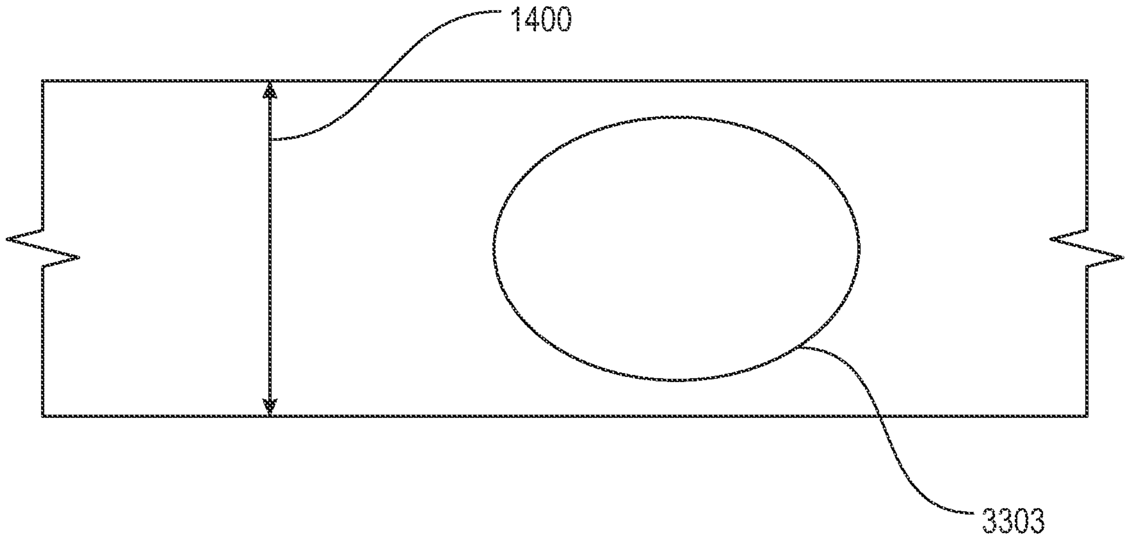
FIG. 33C is a partial view showing the oval-member of FIG. 33B retained within the slot of the soaking-device of FIG. 1A, with the oval-member having a particular rotational orientation towards the slot, namely, with the oval-member rotated so as to have minimum friction between the oval-member 3303 and the slot.

FIG. 33C is a partial view showing oval-member 3303 retained within slot 1400 (and/or within enclosed-region 1403), with oval-member 3303 having a particular rotational orientation towards slot 1400 (and/or to enclosed-region 1403), namely, with oval-member 3303 rotated so as to have minimum friction between oval-member 3303 and slot 1400 (and/or enclosed-region 1403). In some embodiments, this minimum-frictional orientation of oval-member 3303 against slot 1400 (and/or enclosed-region 1403) shown in FIG. 33C may correspond to when headrest 1800 may be in its inverted configuration as shown in FIG. 23. In some embodiments, this minimum-frictional orientation of oval-member 3303 against slot 1400 (and/or enclosed-region 1403) shown in FIG. 33C may facilitate sliding translation (adjustment) of headrest 1800 along the lengths of slots 1400; for example, to arrive at the opposing configurations shown in FIG. 22A and in FIG. 22B.

Note, in some embodiments, oval-member 3303 shown in FIG. 33B and shown in FIG. 33C may be at least substantially (mostly) rotated ninety (90) degrees from each other (plus or minus five (5) degrees).

Figure 34A:
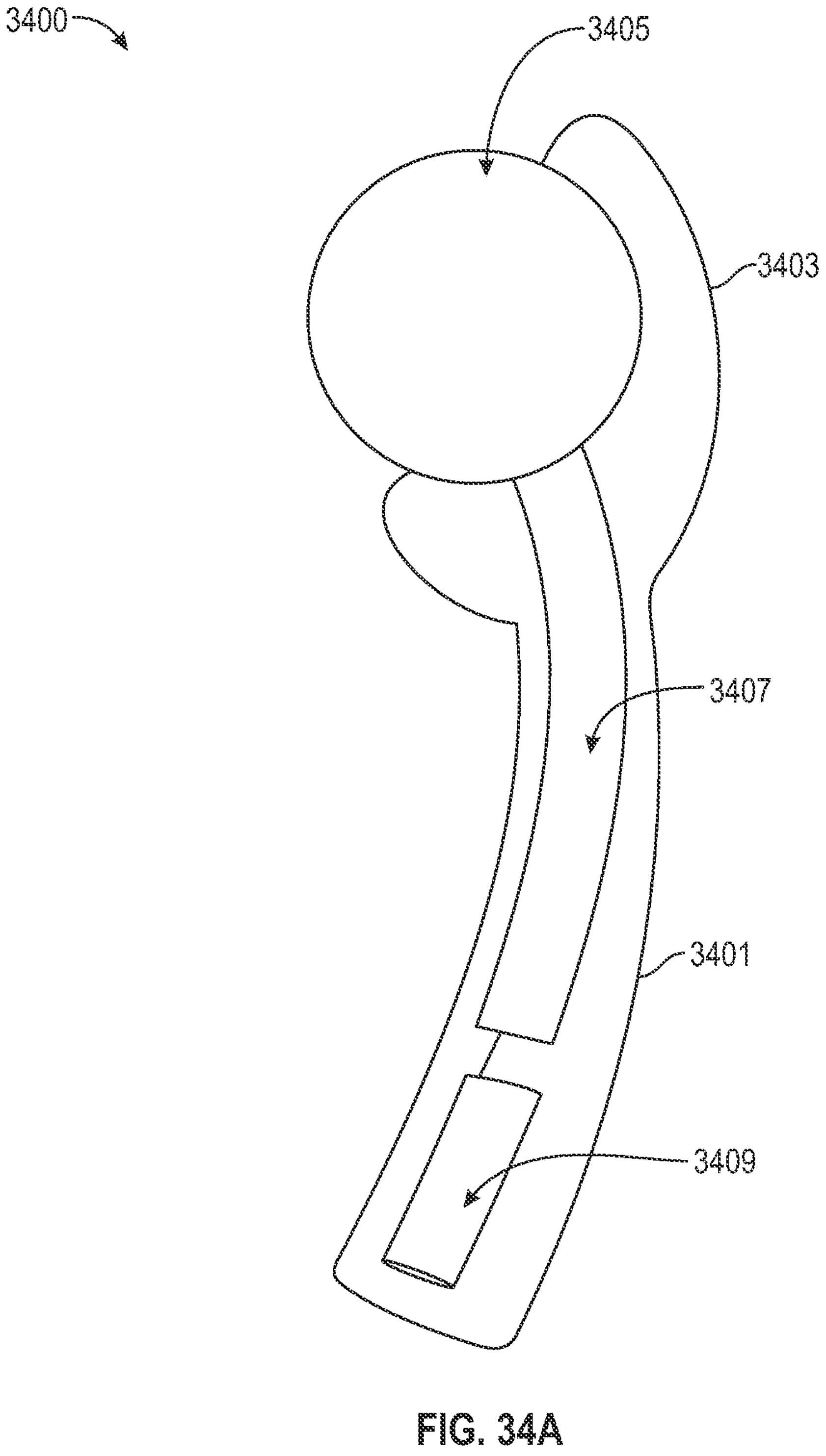
FIG. 34A shows a side cutaway view of a handheld conformable bladder thermal delivery device.
Figure 41:
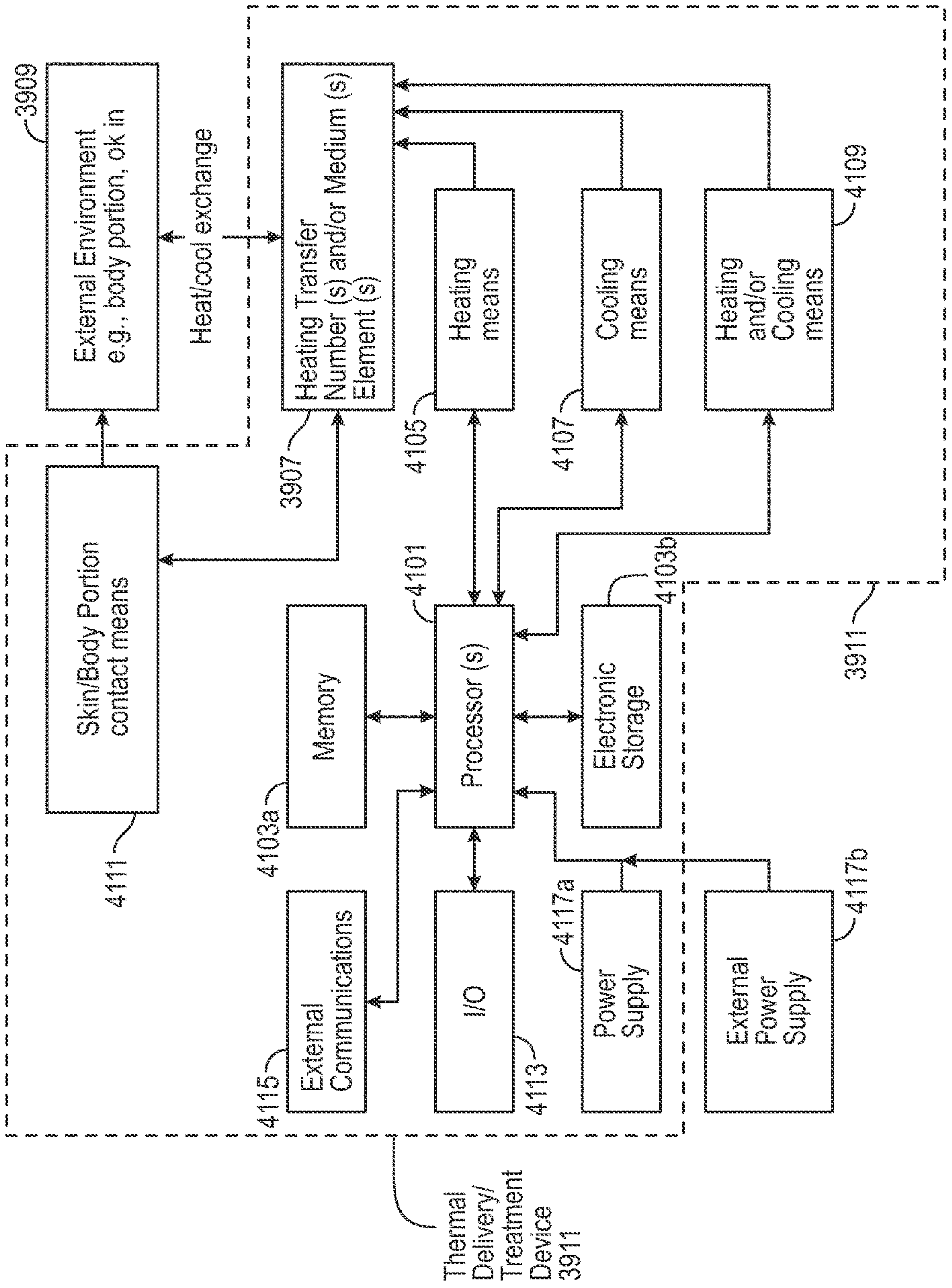
FIG. 41 is a block diagram of a given thermal delivery device showing at least some elements, such as, but not limited to, hardware and/or electronics elements, of the given thermal delivery device.

FIG. 34A may show a side cutaway view of a handheld conformable bladder thermal delivery device 3400. In some embodiments, handheld conformable bladder thermal delivery device 3400 may be a handheld device. In some embodiments, handheld conformable bladder thermal delivery device 3400 may be used by subject 3905 (user 190) holding and using handheld conformable bladder thermal delivery device 3400 on a given portion 3909 of subject 3905 (user 190); and/or a different person may be holding handheld conformable bladder thermal delivery device 3400 and using handheld conformable bladder thermal delivery device 3400 on portion(s) 3909 of subject 3905 (user 190). In some embodiments, handheld conformable bladder thermal delivery device 3400 may be configured to heat and/or to cool any portion 3909 of subject 3905 (user 190). In some embodiments, handheld conformable bladder thermal delivery device 3400 may be an example of a thermal delivery device 3911. FIG. 41 may be applicable to handheld conformable bladder thermal delivery device 3400. In some embodiments, handheld conformable bladder thermal delivery device 3400 may comprise at least some electronics of FIG. 41. In some embodiments, handheld conformable bladder thermal delivery device 3400 may fall within categories 4205, 4213, 4215, and/or 4217 (of FIG. 42). In some embodiments, handheld conformable bladder thermal delivery device 3400 may be selected from categories 4205, 4213, 4215, and/or 4217 (of FIG. 42). In some embodiments, with respect to handheld conformable bladder thermal delivery device 3400, the heat transfer medium 3907 may be a solid, a gel, beads, a non-immersion liquid, and/or the like. In some embodiments, with handheld conformable bladder thermal delivery device 3400, portion 3909 of subject 3905 (user 190) may be any portion of that subject 3905 (user 190). In some embodiments, an overall 3D shape of handheld conformable bladder thermal delivery device 3400 may superficially resemble an ice-cream scooper, with a ball/sphere in the scoop. In some embodiments, handheld conformable bladder thermal delivery device 3400 may comprise: a handle 3401, bladder-retainer 3403, conformable-bladder 3405, and heating and/or cooling means 3407. In some embodiments, handheld conformable bladder thermal delivery device 3400 may further comprise power-supply 3409. See e.g., FIG. 34A.

Continuing discussing FIG. 34A, in some embodiments, handle 3401 may be configured to function and/or operate as a handle. In some embodiments, handle 3401 may be an elongate member that is configured to be removably gripped by one or two hands (of subject 3905 [user 190] or of a different person). In some embodiments, handle 3401 may be rigid. In some embodiments, at least some exterior portion(s) of handle 3401 may be finned, have radiators, and/or have heat exchanger elements. In some embodiments, one end of handle 3401 may be attached to bladder-retainer 3403 and/or one end of handle 3401 may transition and form into bladder-retainer 3403. In some embodiments, bladder-retainer 3403 may be a 3D structure that is configured to (removably) retain and/or house conformable-bladder 3405. In some embodiments, bladder-retainer 3403 may be rigid. In some embodiments, conformable-bladder 3405 may be the heat transfer element(s) 3907 (see e.g., FIG. 39) of handheld conformable bladder thermal delivery device 3400. In some embodiments, conformable-bladder 3405 may be a bladder filled at least partially with heat transfer element(s) 3907. In some embodiments, the heat transfer element(s) 3907 filling(s) (contents) of conformable-bladder 3405 may be one or more of: gel, beads, sand, non-immersion heat transfer liquid(s), refrigerant(s), portions thereof, combinations thereof, and/or the like. In some embodiments, exterior surfaces of conformable-bladder 3405 may be an example of skin/body contact means 4111 (see e.g., FIG. 41). In some embodiments, exterior surfaces of conformable-bladder 3405 may be flexible, elastic, soft, malleable, stretchable, and/or conformable. In some embodiments, a 3D shape of conformable-bladder 3405, when no external forces are being applies to conformable-bladder 3405, may be at least substantially (mostly) similar to: a sphere, an ellipsoid, an egg shape, an ovoid, a torus, a donut shape, portions thereof, combinations thereof, and/or the like. See e.g., FIG. 34A.

Continuing discussing FIG. 34A, in some embodiments, located at least partially within handle 3401 may be heating and/or cooling means 3407. In some embodiments, heating and/or cooling means 3407 may be configured to heat and/or to cool heat transfer element(s) 3907 within conformable-bladder 3405. In some embodiments, at least a portion of heating and/or cooling means 3407 may be in direct physical communication with at least some portion of heat transfer element(s) 3907 within conformable-bladder 3405. In some embodiments, heating and/or cooling means 3407 may be configured to control, provide, and/or maintain a temperature of heat transfer element(s) 3907 within conformable-bladder 3405 within a predetermined range of temperatures and/or for a predetermined amount of time. In some embodiments, heating and/or cooling means 3407 may be an example of heating and/or cooling means 4109, cooling means 4107, or of heating means 4105 (see e.g., FIG. 41). In some embodiments, heating and/or cooling means 3407 may be at least partially located: on an inside of handle 3401; within handle 3401; on handle 3401; attached to handle 3401; on an exterior of handle 3401; portions thereof; combinations thereof; and/or the like. In some embodiments, heating and/or cooling means 3407 may comprise heat exchange fins, a heat sink, and/or a fan/blower located outside of handle 3401 (located to an exterior of handle 3401). In some embodiments, heating and/or cooling means 3407 may be electrically powered. In some embodiments, heating and/or cooling means 3407 may be electrically powered by power-supply 3409. In some embodiments, power-supply 3409 may be an example of Power-Supply 4117*a* (see e.g., FIG. 41). In some embodiments, heating and/or cooling means 3407 may be electrically powered by Power-Supply 4117*a* and/or External Power-Supply 4117*b* (see e.g., FIG. 41). In some embodiments, heating and/or cooling means 3407 may comprise one or more temperature probes, temperature sensors, thermocouples, thermometers, portions thereof, combinations thereof, and/or the like, that may be configured to sense a temperature of the heat transfer element(s) 3907 within conformable-bladder 3405. In some embodiments, heating and/or cooling means 3407 may comprise at least one thermostat and/or be operatively connected to at least one thermostat, wherein the at least one thermostat may be configured to control a temperature of heat transfer element(s) 3907 within conformable-bladder 3405. See e.g., FIG. 34A.

Figure 34B:
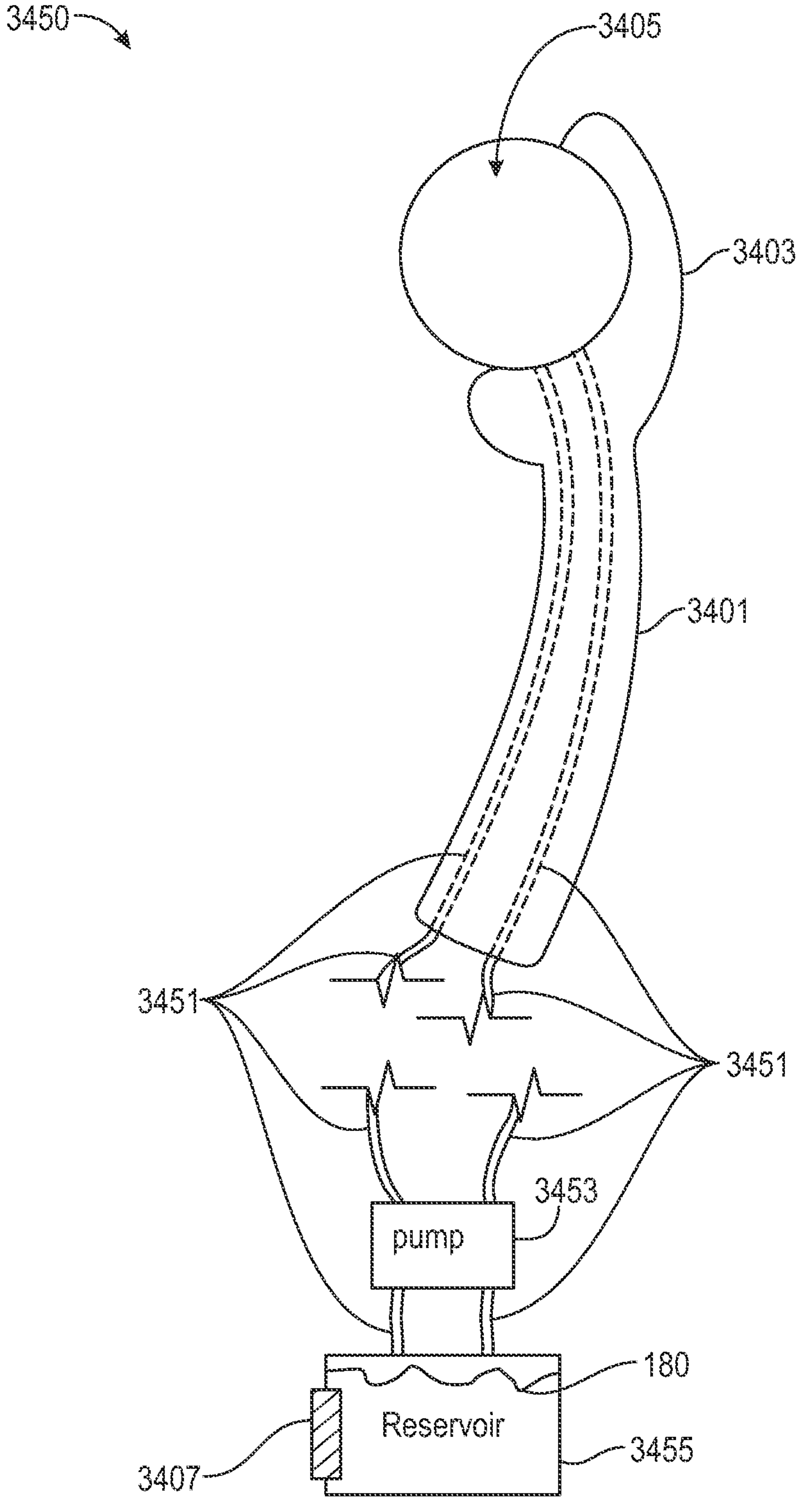
FIG. 34B shows a side cutaway view of a handheld conformable bladder thermal delivery device.

FIG. 34B may show a side cutaway view of a handheld conformable bladder thermal delivery device 3450. In some embodiments, handheld conformable bladder thermal delivery device 3450 may be a handheld device. In some embodiments, handheld conformable bladder thermal delivery device 3450 may be used by subject 3905 (user 190) holding and using handheld conformable bladder thermal delivery device 3450 on a given portion 3909 of subject 3905 (user 190); and/or a different person may be holding handheld conformable bladder thermal delivery device 3450 and using handheld conformable bladder thermal delivery device 3450 on portion(s) 3909 of subject 3905 (user 190). In some embodiments, handheld conformable bladder thermal delivery device 3450 may be configured to heat and/or to cool any portion 3909 of subject 3905 (user 190). In some embodiments, handheld conformable bladder thermal delivery device 3450 may be an example of a thermal delivery device 3911. FIG. 41 may be applicable to handheld conformable bladder thermal delivery device 3450. In some embodiments, handheld conformable bladder thermal delivery device 3450 may comprise at least some electronics of FIG. 41. In some embodiments, handheld conformable bladder thermal delivery device 3450 may fall within categories 4205, 4213, and/or 4215. In some embodiments, handheld conformable bladder thermal delivery device 3450 may be selected from categories 4205, 4213, and/or 4215. In some embodiments, with respect to handheld conformable bladder thermal delivery device 3450, the heat transfer medium 3907 may be non-immersion liquid(s), refrigerant(s), and/or the like. In some embodiments, with handheld conformable bladder thermal delivery device 3450, portion 3909 of subject 3905 (user 190) may be any portion of that subject 3905 (user 190). In some embodiments, an overall 3D shape of handheld conformable bladder thermal delivery device 3450 may superficially resemble an ice-cream scooper, with a ball/sphere in the scoop. In some embodiments, handheld conformable bladder thermal delivery device 3450 may comprise: handle 3401, bladder-retainer 3403, conformable-bladder 3405, and heating and/or cooling means 3407. In some embodiments, handheld conformable bladder thermal delivery device 3450 may further comprise power-supply 3409. In some embodiments, handheld conformable bladder thermal delivery device 3450 may further comprise: tubing(s) 3451, pump 3453, and reservoir 3455. See e.g., FIG. 34B.

Continuing discussing FIG. 34B, in some embodiments, handheld conformable bladder thermal delivery device 3450 may comprise at least two (2) tubings (tubes) 3451, one for warmer non-immersion heat transfer liquid(s) 3907 and one for cooler non-immersion heat transfer liquid(s) 3907. In some embodiments, tubing(s) (tube(s)) 3451 may be configured for transporting and/or circulating the non-immersion heat transfer liquid(s) 3907 from reservoir 3455 to conformable-bladder 3405. In some embodiments, tubing(s) (tube(s)) 3451 may run from reservoir 3455 to conformable-bladder 3405. In some embodiments, at least some portion of tubing(s) (tube(s)) 3451 may run through an interior/inside of handle 3401. In some embodiments, at least some portion of tubing(s) (tube(s)) 3451 may extend into conformable-bladder 3405. In some embodiments, a portion of tubing(s) (tube(s)) 3451 that extends away from and out of handle 3401 may terminated in a fitting/connection. In some embodiments, such a fitting/connection may be configured for removable attachment to an outlet of a sink, to a hose, and/or to a hose bib. In some embodiments, tubing(s) (tube(s)) 3451 may flexible and waterproof. In some embodiments, with respect to handheld conformable bladder thermal delivery device 3450, conformable-bladder 3405 may comprise tubing(s) (tube(s)) 3451 and/or at least some non-immersion heat transfer liquid(s) 3907; wherein at least some of the tubing(s) (tube(s)) 3451 and at least some of the non-immersion heat transfer liquid(s) 3907 are located within/inside of conformable-bladder 3405. See e.g., FIG. 34B.

Continuing discussing FIG. 34B, in some embodiments, pump 3453 may be configured to pump the non-immersion heat transfer liquid(s) 3907 between (back and forth) from inside of conformable-bladder 3405 and inside of reservoir 3455. In some embodiments, pump 3453 may be configured to pump and circulate the non-immersion heat transfer liquid(s) 3907 between (back and forth) from inside of conformable-bladder 3405 and inside of reservoir 3455. In some embodiments, pump 3453 and/or reservoir 3455 may be located exteriorly (externally) from/of conformable-bladder 3405. In some embodiments, pump 3453 may be disposed between conformable-bladder 3405 and reservoir 3455. In some embodiments, pump 3453 may be located at least partially within reservoir 3455. In some embodiments, pump 3453 may be attached to handle 3401 and/or attached to reservoir 3455. In some embodiments, pump 3453 may be electrically powered. In some embodiments, pump 3453 may be electrically powered, for example, by power-supply 3409 (Power-Supply 4117*a*) and/or by External Power-Supply 4117*b*. In some embodiments, pump 3453 may be configured to provide a predetermined minimum of head pressure; which may help conformable-bladder 3405 to remain in a predetermined 3D shape when no other external forces are acting on conformable-bladder 3405. In some embodiments, pump 3453 may operate quietly and/or at low flowrates. In some embodiments, pump 3453 may be a medical grade and/or a food grade pump. In some embodiments, pump 3453 may not introduce pump grease, pump oils, and/or pump lubricants into the non-immersion heat transfer liquid(s) 3907. In some embodiments, tubing 3451 may operatively link pump 3453, conformable-bladder 3405, and/or reservoir 3455. In some embodiments, reservoir 3455 may be configured to contain, house, retain, and/or hold at least some of the non-immersion heat transfer liquid(s) 3907. In some embodiments, reservoir 3455 may be a waterproof container. In some embodiments, reservoir 3455 may comprise one or more port(s)/valve(s) 3511 (see e.g., FIG. 35). In some embodiment, reservoir 3455 may comprise an inlet and an outlet. In some embodiments, the inlet and/or the outlet of reservoir 3455 may be configured to (removably) attach to tubing 3451. In some embodiments, heating and/or cooling means 3407 may be at least partially located: on an interior of reservoir 3455; within reservoir 3455; on reservoir 3455; attached to reservoir 3455; on an exterior of reservoir 3455; portions thereof; combinations thereof; and/or the like. In some embodiments, heating and/or cooling means 3407 may be configured to heat and/or to cool the non-immersion heat transfer liquid(s) 3907. See e.g., FIG. 34B.

Note, the tubing 3451 (or tubing 3507), the liquid holding reservoir 3455 (with or without an associated heating and/or cooling means), and/or the communicatively associated pump 3453 shown in FIG. 34B, may be used in similar fashion and/or for a similar function (e.g., circulating heated and/or cooled liquid) for other soaking-devices and/or thermal delivery devices, such as, but not limited to, soaking-device 100, whole head thermal delivery device 3500, face/head thermal delivery device 3600, face/head thermal delivery device 3700, and/or the like.

Figure 35:
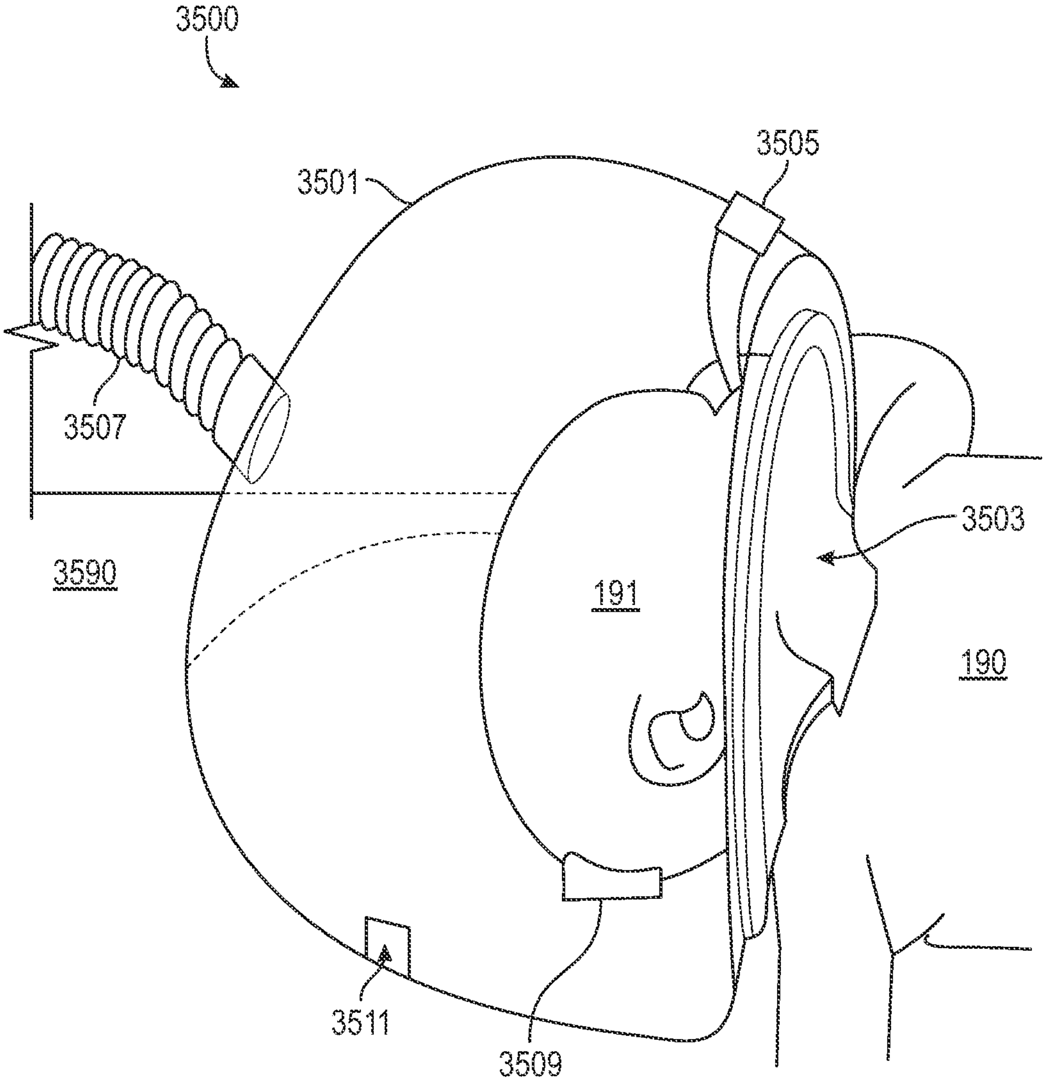
FIG. 35 shows a side perspective view of a whole head immersion thermal delivery device.

FIG. 35 shows a side perspective view of a whole head immersion thermal delivery device 3500. In some embodiments, whole head immersion thermal delivery device 3500 may be an example of a thermal delivery device 3911 (see e.g., FIG. 39). FIG. 41 may be applicable to whole head immersion thermal delivery device 3500. In some embodiments, whole head immersion thermal delivery device 3500 may comprise at least some electronics of FIG. 41. In some embodiments, whole head immersion thermal delivery device 3500 may fall within category 4207 (see e.g., FIG. 42). In some embodiments, whole head immersion thermal delivery device 3500 may be selected from category 4207. In some embodiments, with respect to whole head immersion thermal delivery device 3500, the heat transfer medium 3907 (see e.g., FIG. 39) may be a heated and/or cooled immersion liquid 3907 (such as, but not limited to, immersion-liquid 180), such as, but not limited to, water (with or without various predetermined additives). In some embodiments, with respect to whole head immersion thermal delivery device 3500, the heat transfer medium 3907 (see e.g., FIG. 39) may be a heated and/or cooled sprayed liquid 3907, that is sprayed into flat-bottomed containment vessel 3501. In some embodiments, with respect to whole head immersion thermal delivery device 3500, the heat transfer medium 3907 may be heated and/or cooled humidified air 3907 (with or without various predetermined additives). In some embodiments, this heated and/or cooled humidified air 3907 may be air with nebulized water droplets suspended therein. In some embodiments, a relative humidity (RH) of the air within flat-bottomed containment vessel 3501 may be ninety percent (90%) or higher. In some embodiments, the heat transfer medium 3907 may be delivered to flat-bottomed containment vessel 3501 via tube(s) 3507. In some embodiments, with respect to whole head immersion thermal delivery device 3500, portion 3909 of subject 3905 (user 190) may be the whole head of that subject 3905 or a portion thereof. In some embodiments, whole head immersion thermal delivery device 3500 may comprise: flat-bottomed containment vessel 3501, heating and/or cooling means 4109 (4105 and/or 4107) (see e.g., FIG. 41), breathing apparatus 3505, and neck gasket 3503. In some embodiments, whole head immersion thermal delivery device 3500 may comprise flat bottomed containment vessel 3501, heating and/or cooling means 4109 (4105 and/or 4107), breathing apparatus 3505, and neck gasket 3503; and whole head immersion thermal delivery device 3500 may further comprise one or more of: headrest 3509, port/valve 3511, and/or cord/tube 3507. In some embodiments of whole head immersion thermal delivery device 3500, one or more of headrest 3509, port/valve 3511, and/or cord/tube 3507 may be optional.

Continuing discussing FIG. 35, in some embodiments, flat-bottomed containment vessel 3501 may be configured to removably fit entirely over and/or surrounding a whole head 3909 of subject 3905. In some embodiments, flat bottomed containment vessel 3501 may be configured to contain, house, retain, and/or hold at least some of the immersion liquid 3907 (see e.g., FIG. 39), sprayed liquid, and/or humidified air. In some embodiments, when flat bottomed containment vessel 3501 may be removably attached to subject 3905, at least some of the immersion liquid 3907 may be located between whole head 3909 and an interior of flat-bottomed containment vessel 3501. In some embodiments, flat bottomed containment vessel 3501 may be a substantially hollow three-dimensional (3D) shape. In some embodiments, a shape of flat-bottomed containment vessel 3501 may be similar to a shape of a helmet but with a flat bottom/rear portion. In some embodiments, flat bottomed containment vessel 3501 may comprise a flat and/or planar bottom/rear portion. In some embodiments, this flat and/or planar bottom/rear portion of flat-bottomed containment vessel 3501 may be configured to removably rest upon supportive surface 3590. In some embodiments, supportive surface 3590 may be flat and/or planar surface, such as, but not limited, to at least a portion of: a table top, a desk top, a bench top, a counter top, a floor, a ground, a horizontal surface, portions thereof, combinations thereof, and/or the like. See e.g., FIG. 35.

Continuing discussing FIG. 35, in some embodiments, a majority of flat-bottomed containment vessel 3501 may be made of one or more sidewalls and/or hulls. In some embodiments, the one or more sidewalls and/or hulls (of flat-bottomed containment vessel 3501) may be: waterproof, hydrophobic, solid, insulated, rigid, semi-rigid, thermally stable (from 0 degrees to 200 degrees Celsius), portions thereof, combinations thereof, and/or the like. In some embodiments, the one or more sidewalls and/or hulls (of flat-bottomed containment vessel 3501) may be at least substantially (mostly) made from: a plastic, a thermoplastic, an injection molded plastic, an injection molded material, a 3D printed material, an extruded material, a metal, an alloy, glass, wood, a composite, a laminate, an elastomer, a rubber, silicone, portions thereof, combinations thereof, and/or the like. In some embodiments, plastics and/or the like may be more desirable as compared to glass, metal, and/or metal alloys for materials of construction for the one or more sidewalls and/or hulls (of flat-bottomed containment vessel 3501) because plastics are more insulating than glass, metal, and/or metal alloys; i.e., glass, metal, and/or metal alloys tend to act as thermal bridges for heat transfer. In some embodiments, a majority of the one or more sidewalls and/or hulls (of flat-bottomed containment vessel 3501) may be at least substantially optically clear, transparent, and/or translucent so that subject 3905 may be able to see through the at least the portion/region of the one or more sidewalls and/or hulls. In some embodiments, at least a portion/region of the one or more sidewalls and/or hulls (of flat-bottomed containment vessel 3501) may be at least substantially optically clear, transparent, and/or translucent so that subject 3905 may be able to see through the at least the portion/region of the one or more sidewalls and/or hulls. In some embodiments, the at least the portion/region of the one or more sidewalls and/or hulls may be configured to function/operate as a (closed) window. In some embodiments, at least other portions/regions of the one or more sidewalls and/or hulls (of flat-bottomed containment vessel 3501) may be opaque and/or not optically clear, transparent, and/or translucent. In some embodiments, a region of the one or more sidewalls and/or hulls (of flat-bottomed containment vessel 3501) may be configured to be removed very quickly to function as safety-breakaway(s) to very quickly drain the immersion liquid 3907 from within flat bottomed containment vessel 3501 and/or to provide outside/exterior air directly to the mouth and/or nose of subject 3905. See e.g., FIG. 35.

Continuing discussing FIG. 35, in some embodiments, heating and/or cooling means 4109 (4105 and/or 4107) (see e.g., FIG. 41) may be configured to heat and/or to cool immersion liquid 3907 within flat-bottomed containment vessel 3501. In some embodiments, heating and/or cooling means 4109 (4105 and/or 4107) may be configured to control, provide, and/or maintain a temperature of immersion liquid 3907 within flat bottomed containment vessel 3501 within a predetermined range of temperatures and/or for a predetermined amount of time. In some embodiments, the heating and/or cooling means of whole head thermal delivery device 3500 may be an example of heating and/or cooling means 4109, cooling means 4107, or of heating means 4105. In some embodiments, heating and/or cooling means 4109 (4105 and/or 4107) may be at least partially located: on an interior of flat bottomed containment vessel 3501; within flat bottomed containment vessel 3501; on flat bottomed containment vessel 3501; attached to flat bottomed containment vessel 3501; on an exterior of flat bottomed containment vessel 3501; attached to a pump (configured to pump immersion liquid 3907); attached to a liquid holding reservoir; connected to tubing 3507; attached to tubing 3507; connected to terminal end of tubing 3507; attached to terminal end of tubing 3507; portions thereof; combinations thereof; and/or the like. In some embodiments, heating and/or cooling means 4109 (4105 and/or 4107) may not have moving parts/components within flat-bottomed containment vessel 3501. In some embodiments, heating and/or cooling means 4109 (4105 and/or 4107) may comprise heat exchange fins, a heat sink, and/or a fan/blower located outside of liquid flat-bottomed containment vessel 3501 (e.g., located to an exterior of flat-bottomed containment vessel 3501, of its pump, and/or of its liquid holding reservoir). In some embodiments, heating and/or cooling means 4109 (4105 and/or 4107) may be electrically powered, for example, by Power Supply 4117*a* and/or External Power Supply 4117*b*. In some embodiments, heating and/or cooling means 4109 (4105 and/or 4107) may comprise one or more temperature probes, temperature sensors, thermocouples, thermometers, portions thereof, combinations thereof, and/or the like, that may be configured to sense a temperature of immersion liquid 3907 within flat bottomed containment vessel 3501. In some embodiments, heating and/or cooling means 4109 (4105 and/or 4107) may comprise at least one thermostat and/or be operatively connected to at least one thermostat, wherein the at least one thermostat may be configured to control a temperature of immersion liquid 3907 within flat bottomed containment vessel 3501. See FIG. 41 for heating and/or cooling means 4109 (4105 and/or 4107).

Continuing discussing FIG. 35, in some embodiments, breathing apparatus 3505 may be configured to permit subject 3905 (user 190) to breathe outside air when the whole head 3909 of subject 3905 may be (removably) enclosed within flat-bottomed containment vessel 3501 and flat-bottomed containment vessel 3501 may be at least mostly (substantially) filled/contain immersion liquid 3907. In some embodiments, breathing apparatus 3505 may be a waterproof sealed passageway from an inside of flat-bottomed containment vessel 3501 to an exterior/outside of flat-bottomed containment vessel 3501, that may be configured for the movement/passage of respiratory gasses (e.g., air in and carbon dioxide out). In some embodiments, an exterior/outside portion of breathing apparatus 3505 may be attached to the one or more sidewalls and/or hulls of flat-bottomed containment vessel 3501. In some embodiments, an exterior/outside portion of breathing apparatus 3505 may be located on an exterior/outside portion of flat-bottomed containment vessel 3501. In some embodiments, an exterior/outside portion of breathing apparatus 3505 may be located on an exterior/outside portion of flat-bottomed containment vessel 3501 (such as, but not limited to, at a top of flat-bottomed containment vessel 3501). In some embodiments, breathing apparatus 3505 may comprise a mouthpiece 1705. In some embodiments, mouthpiece 1705 may be configured to be removably gripped by a mouth of subject 3905. In some embodiments, mouthpiece 1705 may be located on an interior/inside front of flat-bottomed containment vessel 3501.

Continuing discussing FIG. 35, in some embodiments, neck gasket 3503 may be configured to removably provide a watertight seal around a periphery (circumference) of a neck of subject 3905, when subject 3905 may be wearing/using whole head immersion thermal delivery device 3500 (e.g., as shown in FIG. 35). In some embodiments, neck gasket 3503 may be substantially (mostly) planar annular ring/disk shape of elastomeric material, with at least an inside diameter. In some embodiments, an outside portion of this planar annular ring/disk may or may not be circular, depending upon a shape of where neck gasket 3503 attaches to flat bottomed containment vessel 3501. In some embodiments, the outside portion (of neck gasket 3503) may be attached to a side of flat-bottomed containment vessel 3501. In some embodiments, the inside diameter (of neck gasket 3503) may be configured to removably attach to the external periphery of the neck of subject 3905, providing a watertight seal between the neck of subject 3905 and neck gasket 3503. In some embodiments, the inside diameter (of neck gasket 3503) may be removably attached to (snuggingly fitted up against) the periphery (circumference) of the neck of subject 3905. In some embodiments, neck gasket 3503 may be stretched over the whole head 3909 of subject 3905 (e.g., when inserting or removing head 3909 from whole head immersion thermal delivery device 3500). In some embodiments, the elastomeric material(s) and/or portion(s) of neck gasket 3503 may be made at least partially from one or more of: an elastomer, silicone, rubber, neoprene, a plastic, portions thereof, combinations thereof, and/or the like. In some embodiments, seal neck gasket 3503 may be similar to a neck gasket in a preexisting (prior art) dry suit, with respect to structure, function, size, geometry, and/or material(s) of construction. Commercially available preexisting (prior art) dry suit neck gaskets are incorporated by reference.

Continuing discussing FIG. 35, in some embodiments, headrest 3509 may be configured to provide a comfortable resting region for a rear/back portion of whole head 3909 when subject 3905 may be using whole head immersion thermal delivery device 3500 and laying on a back of subject 3905 or when subject 3905 may be resting their back against some surface (such as, but not limited to, supportive surface 3590). In some embodiments, headrest 3509 may be a cushion or the like. In some embodiments, headrest 3509 may comprise padding and/or foam. In some embodiments, headrest 3509 may be located on an inside/interior of flat-bottomed containment vessel 3501. In some embodiments, headrest 3509 may be located on an inside/interior of liquid containment vessel 3501 at a bottom of flat-bottomed containment vessel 3501. In some embodiments, headrest 3509 may be attached to an inside/interior of flat-bottomed containment vessel 3501 at a bottom of flat-bottomed containment vessel 3501 on the flat and/or planar portion of flat-bottomed containment vessel 3501. In some embodiments, headrest 3509 may be removably attached to an inside/interior of flat-bottomed containment vessel 3501 at a bottom of flat-bottomed containment vessel 3501. In some embodiments, headrest 3509 may be removable from flat bottomed containment vessel 3501. In some embodiments, positioning of headrest 3509 within flat bottomed containment vessel 3501 may be adjustable by inclusion of an adjustment means. Some embodiments of whole head immersion thermal delivery device 3500 may or may not comprise a headrest 3509. In some embodiments, headrest 3509 may be optional with respect to thermal delivery device 3500 and/or with respect to a thermal delivery device 3911.

Continuing discussing FIG. 35, in some embodiments, port/valve 3511 may be configured to fill and/or drain flat bottomed containment vessel 3501 of at least most of the immersion liquid 3907 that may reside within flat bottomed containment vessel 3501; and/or to fill and/or drain flat bottomed containment vessel 3501 with air (or other gas). In some embodiments, flat bottomed containment vessel 3501 may comprise one or more port(s)/valve(s) 3511. In some embodiments, port(s)/valve(s) 3511 may be located on a top, a side, and/or a bottom of flat-bottomed containment vessel 3501. In some embodiments, port(s)/valve(s) 3511 of flat-bottomed containment vessel 3501 may be openable and closeable. In some embodiments, port(s)/valve(s) 3511 of flat-bottomed containment vessel 3501 may function as plug(s). In some embodiments, port(s)/valve(s) 3511 may be configured as safety-breakaway(s) to very quickly drain the immersion liquid 3907 from within flat bottomed containment vessel 3501 and/or to provide outside/exterior air directly to the mouth and/or nose of subject 3905.

Continuing discussing FIG. 35, in some embodiments, cord(s)/tube(s) 3507 may be configured to function as an electrical cord to provide external electrical power to whole head immersion thermal delivery device 3500; and/or as (hollow) tube(s) for movement of immersion liquid 3907. In some embodiments, whole head immersion thermal delivery device 3500 and/or flat-bottomed containment vessel 3501 may comprise one or more cord(s)/tube(s) 3507. In some embodiments, at least some portion of cord(s)/tube(s) 3507 may be attached to flat-bottomed containment vessel 3501 in a watertight manner. In some embodiments, at least some portion of cord(s)/tube(s) 3507 may be attached in a watertight manner to flat bottomed containment vessel 3501, heating and/or cooling means 4109 (4105 and/or 4107), a pump of whole head thermal delivery device 3500, a liquid holding reservoir of whole head thermal delivery device 3500, portions thereof, combinations thereof, and/or the like. In some embodiments, cord(s)/tube(s) 3507 may be: an electrical power cord of whole head immersion thermal delivery device 3500; and/or a hose for movement/passage of immersion liquid 3907. In some embodiments, cord(s)/tube(s) 3507 may be sheathed. In some embodiments, at least portions of multiple cords and/or tubes 3507 may be bundled together. In some embodiments, at least portions of multiple cords and/or tubes 3507 may be bundled together and sheathed. In some embodiments, a distal terminal end of tubing 3507 may be designated as terminal end of tubing 3507. In some embodiments, terminal end of tubing 3507 may be configured to (removable) attachment to heating and/or cooling means 4109 (4105 and/or 4107), a pump of whole head thermal delivery device 3500, and/or a liquid holding reservoir of whole head thermal delivery device 3500.

Continuing discussing FIG. 35, in some embodiments, whole head immersion thermal delivery device 3500 may further comprise a pump, a liquid holding reservoir, tubing 3507, portions thereof, combinations thereof, and/or the like. In some embodiments, whole head immersion thermal delivery device 3500 may utilize this pump, this liquid holding reservoir, tubing 3507, portions thereof, combinations thereof, and/or the like. In some embodiments, this pump of whole head immersion thermal delivery device 3500 may be configured to pump the immersion liquid 3907 between (back and forth) from inside of flat-bottomed containment vessel 3501 and inside of the liquid holding reservoir. In some embodiments, this pump may be configured to pump and circulate the immersion liquid 3907 between (back and forth) from inside of flat-bottomed containment vessel 3501 and inside of the liquid holding reservoir. In some embodiments, this pump and/or this liquid holding reservoir may be located exteriorly (externally) from/of flat-bottomed containment vessel 3501. In some embodiments, this pump may be disposed between flat-bottomed containment vessel 3501 and its liquid holding reservoir. In some embodiments, this pump may be located at least partially (or totally) within the liquid holding reservoir. In some embodiments, this pump may be attached to flat-bottomed containment vessel 3501 and/or attached to the liquid holding reservoir. In some embodiments, this pump may be electrically powered. In some embodiments, this pump may be electrically powered, for example, by Power Supply 4117*a* and/or by External Power Supply 4117*b*. In some embodiments, this pump may be configured to provide a predetermined minimum of head pressure. In some embodiments, this pump may operate quietly and/or at low flowrates. In some embodiments, this pump may be a medical grade and/or a food grade pump. In some embodiments, this pump may not introduce pump grease, pump oils, and/or pump lubricants into the immersion liquid 3907. In some embodiments, tubing 3507 may operatively link this pump, liquid containment vessel 3501, and/or the liquid holding reservoir (such that immersion liquid 3907 may flow from and between these components). In some embodiments, the liquid holding reservoir may be configured to contain, house, retain, and/or hold at least some of the immersion liquid 3907. In some embodiments, the liquid holding reservoir may be a waterproof container. In some embodiments, the liquid holding reservoir may comprise one or more port(s)/valve(s) 3511. In some embodiment, the liquid holding reservoir may comprise an inlet and an outlet. In some embodiments, the inlet and/or the outlet of the liquid holding reservoir may be configured to (removably) attach to tubing 3507. In some embodiments, heating and/or cooling means 4109 (4105 and/or 4107) may be at least partially located: on an interior of the liquid holding reservoir; within the liquid holding reservoir; on the liquid holding reservoir; attached to the liquid holding reservoir; on an exterior of the liquid holding reservoir; portions thereof; combinations thereof; and/or the like.

Figure 36:
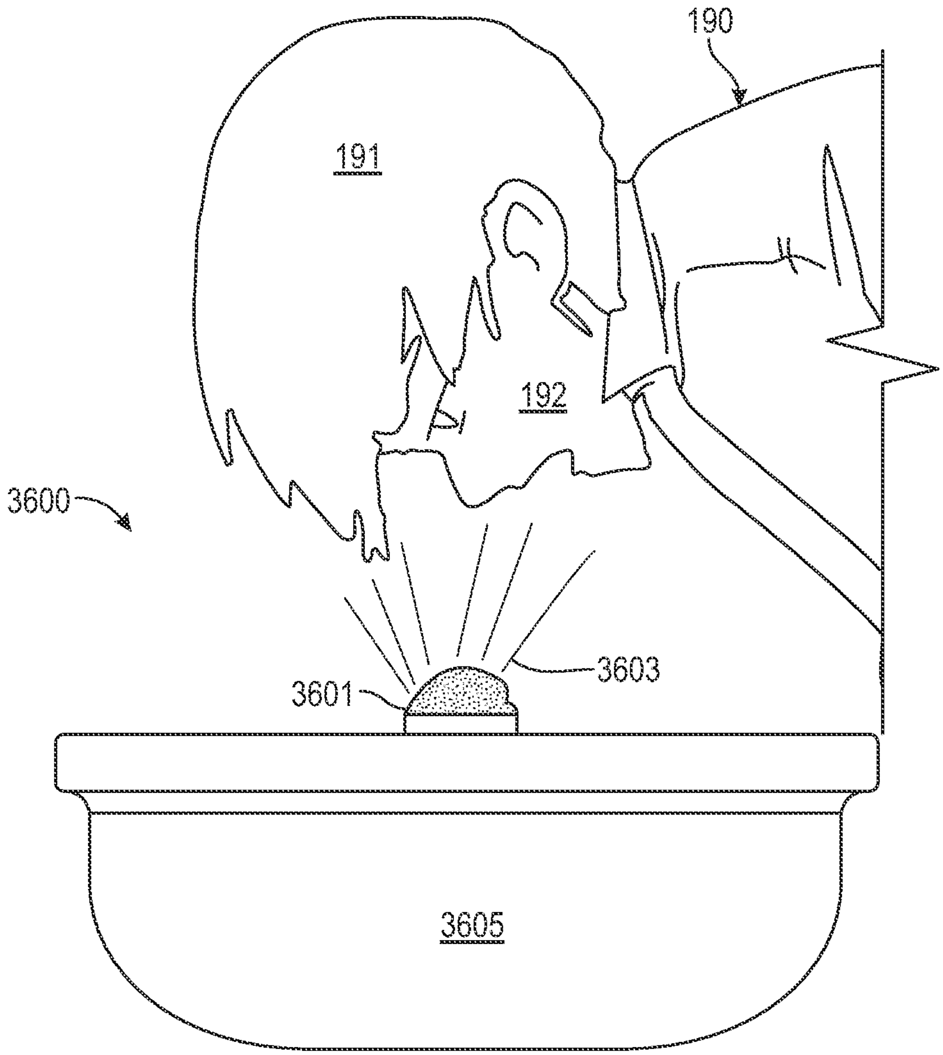
FIG. 36 shows a side view of a face/head thermal delivery device.

FIG. 36 shows a side view of a face/head thermal delivery device 3600. In some embodiments, face/head thermal delivery device 3600 may be an example/type of a thermal delivery device 3911 (see e.g., FIG. 39). FIG. 41 may be applicable to face/head thermal delivery device 3600. In some embodiments, face/head thermal delivery device 3600 may comprise at least some electronics of FIG. 41. In some embodiments, face/head thermal delivery device 3600 may fall within category 4209 (see e.g., FIG. 42). In some embodiments, face/head thermal delivery device 3600 may be selected from category 4209. In some embodiments, with respect to face/head thermal delivery device 3600, the heat transfer medium 3907 may be a liquid 3603, such as, but not limited to, water (with or without various predetermined additives). In some embodiments, with respect to face/head thermal delivery device 3600, portion 3909 of subject 3905 (user 190) may be the whole head 191 and/or the face 192 of that subject 3905 or a portion thereof. In some embodiments, face/head thermal delivery device 3600 may comprise: a catch basin 3605 and at least one jet/nozzle 3601.

Continuing discussing FIG. 36, in some embodiments, during intended use of face/head thermal delivery device 3600, subject 3905 positions their face 3909 (face 192) and/or their head 3909 (head 191) over and proximate (near) both of the catch basin 3605 and the at least one jet/nozzle 3601 and temperature-controlled (hot, warm, cold, cool, and/or freezing) liquid 3907 (liquid 3603) may exit at least one jet/nozzle 3601 to spray upwards and against face 3909 (face 192) and/or against head 3909 (head 191); wherein then that sprayed liquid 3907 (liquid 3603) may then drip (fall) via gravity into basin catch basin 3605. In some embodiments, "over and proximate (near)" between both of the catch basin 3605 and the at least one jet/nozzle 3601 and face 3909 (face 192) and/or head 3909 (head 191) may be a distance of two (2) feet or less. In some embodiments, during intended use, subject 3905 may be sitting, standing, or laying down (with face 3909 [face 192] down or up). In some embodiments, during intended use, subject 3905 may also use a breathing apparatus (e.g., snorkel or the like), for example, when face 3909 (face 192) may be down and being struck by liquid 3907 (liquid 3603).

Continuing discussing FIG. 36, in some embodiments, catch basin 3605 may function as a catch basin to receive dripping (falling) liquid 3907 (liquid 3603) after such liquid 3907 (liquid 3603) has been sprayed against face 3909 (face 192) and/or against head 3909 (head 191). In some embodiments, catch basin 3605 may be configured to receive and/or hold liquid 3907 (liquid 3603) therein. In some embodiments, catch basin 3605 may be at least substantially (mostly) waterproof. In some embodiments, catch basin 3605 may be at least substantially (mostly) open at its top and concave. In some embodiments, catch basin 3605 may be at least substantially (mostly) open at its top, at least substantially (mostly) closed at its sides and bottom. In some embodiments, the sides and/or the bottom of catch basin 3605 may comprise a drain and/or may be plumbed/connected to a drain.

Continuing discussing FIG. 36, in some embodiments, catch basin 3605 may be fitted with a mostly soft and mostly flexible "neck gasket" as that term is used with respect to the Hydroeffacer device; wherein this may permit subject 3905 to use face/head thermal delivery device 3600 and/or to use catch basin 3605 with face 3909 (face 192) in a down position and with a soft tissue front of a neck 197 of subject 3905 pressing against catch basin 3605 (pressing against the neck gasket) without hurting/harming the soft tissue front of the neck 197 of subject 3905 and without discomfort to subject 3905 (because no hard surfaces/structures are pressing into the soft tissue of the front of the neck of subject 3905 by virtue of catch basin 3605 including a neck gasket). Note, this type of neck gasket does not go around a circumference entirety of the neck of subject 3905, such as a neck gasket in a commercially available prior art dry suit. Rather this type of neck gasket (utilized in devices 100, 3600, and/or 3700) only is pressed up against the soft tissue front of the neck 197 of subject 3905 during intended use when face 3909 (face 192) is in a down position (i.e., face 192 is facing the ground).

Continuing discussing FIG. 36, in some embodiments, at least one jet/nozzle 3601 may be configured to receive temperature-controlled (hot, warm, cold, cool, and/or freezing) liquid 3907 (liquid 3603) and then eject that received temperature controlled (hot, warm, cold, cool, and/or freezing) liquid 3907 (liquid 3603) upwards in the form of temperature-controlled liquid 3907 (liquid 3603) stream/jet. In some embodiments, at least one jet/nozzle 3601 may be attached to catch basin 3605. In some embodiments, at least one jet/nozzle 3601 may extend/protrude upwards from catch basin 3605. In some embodiments, at least one jet/nozzle 3601 may extend/protrude from a concave, sidewall, and/or bottom portion of catch basin 3605. In some embodiments, an inlet/receiving portion of at least one jet/nozzle 3601 may be plumbed (connected) to tubing (such as tubing 3451 and/or 3507), a pump (such as pump 3453), a liquid holding reservoir (such as reservoir 3455), and/or heating and/or cooling means (such as heating and/or cooling means 3407, heating means 4105, cooling means 4107, and/or heating and/or cooling means 4109). In such embodiments, liquid 3907 (liquid 3603) dripping back into catch basin 3605 may then be delivered back to the reservoir via some tubing for continued temperature control and then temperature-controlled liquid 3907 (liquid 3603) may be pumped back from that reservoir to at least one jet/nozzle 3601 via the pump and other tubing. That is, liquid 3907 (liquid 3603) may recirculate in such embodiments to help with the temperature control of liquid 3907 (liquid 3603). Whereas, in other embodiments, at least one jet/nozzle 3601 may be plumbed (connected) to preexisting hot- and cold-water sources of the building where face/head thermal delivery device 3600 may be utilized in/at.

Figure 37:
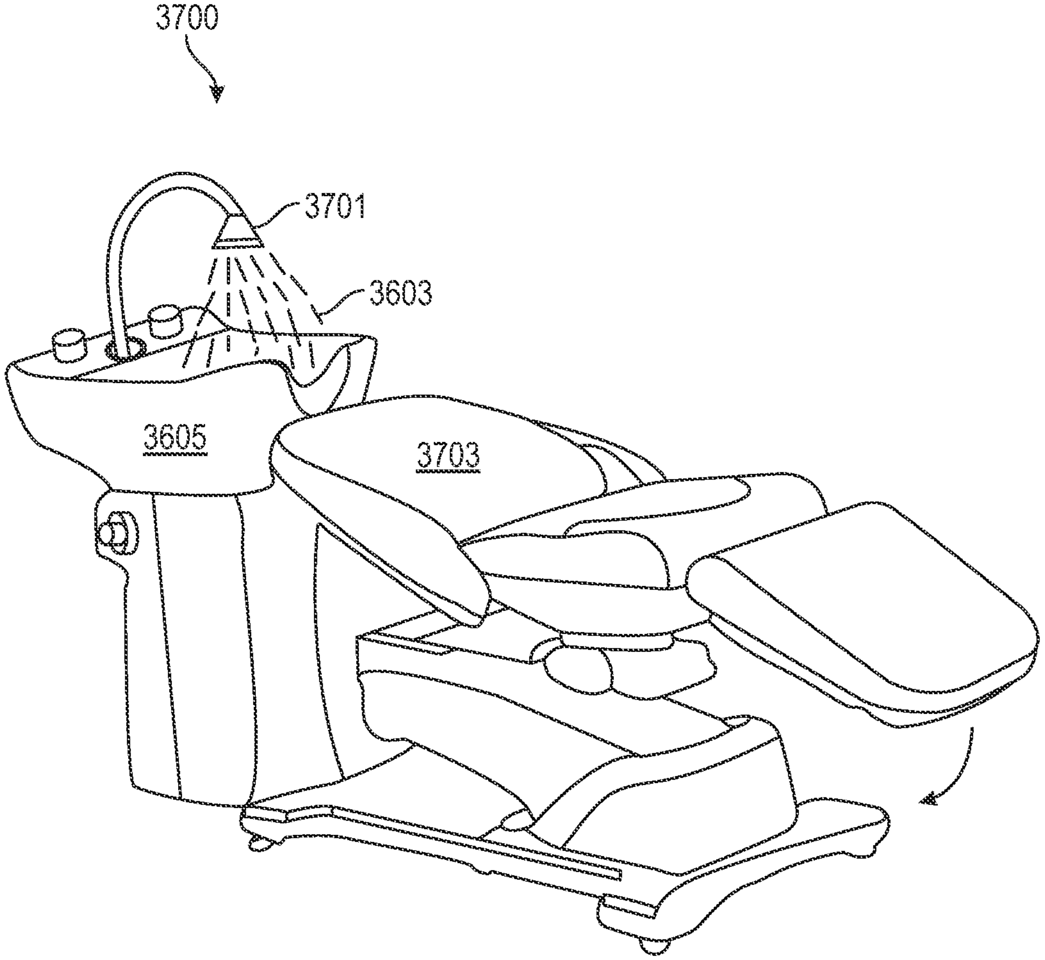
FIG. 37 shows a left side perspective view of a face/head thermal delivery device.

FIG. 37 shows a left side perspective view of a face/head thermal delivery device 3700. In some embodiments, face/head thermal delivery device 3700 may be an example/type of a thermal delivery device 3911 (see e.g., FIG. 39). FIG. 41 may be applicable to face/head thermal delivery device 3700. In some embodiments, face/head thermal delivery device 3700 may comprise at least some electronics of FIG. 41. In some embodiments, face/head thermal delivery device 3700 may fall within category 4209 (see e.g., FIG. 42). In some embodiments, face/head thermal delivery device 3700 may be selected from category 4209. In some embodiments, with respect to face/head thermal delivery device 3700, the heat transfer medium 3907 may be a liquid 3603, such as, but not limited to, water (with or without various predetermined additives). In some embodiments, with respect to face/head thermal delivery device 3700, portion 3909 of subject 3905 (user 190) may be the whole head 191 and/or the face 192 of that subject 3905 or a portion thereof. In some embodiments, face/head thermal delivery device 3700 may comprise: catch basin 3605 and at least one jet/nozzle 3701.

Continuing discussing FIG. 37, in some embodiments, during intended use of face/head thermal delivery device 3700 subject 3905 (user 190) may position their face 3909 (face 192) and/or their head 3909 (head 191) over and proximate (near) catch basin 3605 and below and proximate (near) to at least one jet/nozzle 3701 and temperature-controlled (hot, warm, cold, cool, and/or freezing) liquid 3907 (liquid 3603) may exit at least one jet/nozzle 3701 to spray/stream/drip downwards and against face 3909 (face 192) and/or head 3909 (head 191); wherein then that ejected liquid 3907 (liquid 3603) may then drip (fall) via gravity into basin catch basin 3605. In some embodiments, "over and proximate (near)" between catch basin 3605 and face 3909 (face 192) and/or head 3909 (head 191) may be a distance of two (2) feet or less. In some embodiments, "below and proximate (near)" between at least one jet/nozzle 2403 and face 3909 (face 192) and/or head 3909 (head 191) may be a distance of two (2) feet or less. In some embodiments, during intended use, subject 3905 (user 190) may be sitting, standing, or laying down (with face 3909 [face 192] down or up [with respect to the ground]). In some embodiments, during intended use, subject 3905 may also use a breathing apparatus (e.g., snorkel or the like), for example, when face 3909 (face 192) may be down (pointing down towards the ground) and being struck by liquid 3907 (liquid 3603) in their face 192. In some embodiments, during intended use of face/head thermal delivery device 3700, head 3909 (head 191) (of subject 3905) may be removably disposed between a top/upper portion of catch basin 3605 and below a bottom of the exit/outlet portion(s) of at least one jet/nozzle 3701.

Continuing discussing FIG. 37, in some embodiments, catch basin 3605 may function as a catch basin to receive dripping (falling) liquid 3907 (liquid 3603) after such liquid 3907 (liquid 3603) has been directed against face 3909 (face 192) and/or head 3909 (head 191). In some embodiments, catch basin 3605 may be configured to receive and/or hold at least some of liquid 3907 (liquid 3603) therein. In some embodiments, catch basin 3605 may be at least substantially (mostly) waterproof. In some embodiments, catch basin 3605 may be at least substantially (mostly) open at its top and concave. In some embodiments, catch basin 3605 may be at least substantially (mostly) open at its top, at least substantially (mostly) closed at its sides and bottom. In some embodiments, the sides and/or the bottom of catch basin 3605 may comprise a drain and/or may be plumbed/connected to a drain.

Continuing discussing FIG. 37, in some embodiments, catch basin 3605 may be fitted with a mostly soft and mostly flexible "neck gasket" (where the neck indenture is basin

3605) as that term is used with respect to the Hydroeffacer device; wherein this may permit subject 3905 (user 190) to use face/head thermal delivery device 3700 and/or to use catch basin 3605 with face 3909 (face 192) in a down position (with respect to the ground), with face 3909 (face 192) at least partially inside and/or above a top/upper surface of catch basin 3605 and with the soft tissue front of the neck 197 of subject 3905 pressing against catch basin 3605 (pressing against the neck gasket) without hurting/harming the soft tissue front of the neck 197 of subject 3905 and without discomfort to subject 3905 (because no hard surfaces/structures are pressing into the soft tissue of the front of the neck 197 of subject 3905 by virtue of catch basin 3605 including a neck gasket). Note, this type of neck gasket does not go completely around a circumference entirety of the neck of subject 3905, such as a neck gasket in a preexisting commercially available prior art dry suit. Rather this type of neck gasket (utilized in devices 100, 3600, and/or 3700) only is pressed up against the soft tissue front of the neck 197 of subject 3905 during intended use when face 3909 (face 192) is in a down position (where the down position is pointing/facing towards the ground).

Continuing discussing FIG. 37, in some embodiments, at least one jet/nozzle 3701 may be configured to receive temperature-controlled (hot, warm, cold, cool, and/or freezing) liquid 3907 (liquid 3603) and then eject that received temperature controlled (hot, warm, cold, cool, and/or freezing) liquid 3907 (liquid 3603) downwards (with respect to the ground) in the form of temperature-controlled liquid 3907 (liquid 3603) stream, jet, spray, and/or drips. In some embodiments, at least one jet/nozzle 3701 may be attached to catch basin 3605. In some embodiments, at least some portion of at least one jet/nozzle 3701 may extend/protrude from catch basin 3605. In some embodiments, the exit/outlet portion(s) of at least one jet/nozzle 3701 may be located above catch basin 3605 such that there is a distance gap between a top of catch basin 3605 and a bottom of the exit/outlet portion(s) of at least one jet/nozzle 3701, wherein this distance gap is sized to removably fit head 3909 (head 191) of subject 3905. In some embodiments, this distance gap may be fixed and/or non-variable. In some embodiments, this distance gap may be variable and/or changeable because a height of the exit/outlet portion(s) of at least one jet/nozzle 3701 may be adjustable, variable, and/or changeable. In some embodiments, an inlet/receiving portion of at least one jet/nozzle 3701 may be plumbed (connected) to tubing (such as tubing 3451 and/or 3507), pump (such as pump 3453), liquid holding reservoir (such as reservoir 3455), and/or heating and/or cooling means (such as heating means 4105, cooling means 4107, and/or heating and/or cooling means 4109—see e.g., FIG. 41). In such embodiments, liquid 3907 (liquid 3603) dripping back into catch basin 3605 may then be delivered by to the liquid holding reservoir (such as reservoir 3455) via some tubing (such as tubing 3451 and/or 3507) for continued temperature control and then temperature-controlled liquid 3907 (liquid 3603) may be pumped back from the liquid holding reservoir (such as reservoir 3455) to at least one jet/nozzle 3701 via the pump (such as pump 3453) and some other tubing (such as tubing 3451 and/or 3507). That is, liquid 3907 (liquid 3603) may recirculate in such embodiments to help with the temperature control of liquid 3907 (liquid 3603).

Whereas, in other embodiments, at least one jet/nozzle 3701 may be plumbed (connected) to preexisting hot and cold liquid (water) sources of the building where face/head thermal delivery device 3700 may be utilized in/at.

Continuing discussing FIG. 37, in some embodiments, next to, adjacent, and/or proximate to catch basin 3605 may be support structure 3703 for person 3905 (user 190). In some embodiments, support structure 3703 for person 3905 may be in the form of a chair, seat, couch, day bed, bed, sofa, settee, divan, combinations thereof, and/or the like. In some embodiments, support structure 3703 for person 3905 may be configured for at least most of subject 3905 to removably rest upon (on top of). In some embodiments, support structure for person 3905 may be configured for supporting at least most of subject 3905. In some embodiments, subject 3905 may sit on, lay on, and/or rest on support structure 3703 for person 3905. In some embodiments, support structure 3703 for person 3905 may be one or more of a: chair, seat, couch, day bed, bed, sofa, settee, divan, combinations thereof, and/or the like. In some embodiments, face/head thermal delivery device 3700 and/or 3600 may comprise support structure for person 3905 (user 190).

Figure 38:
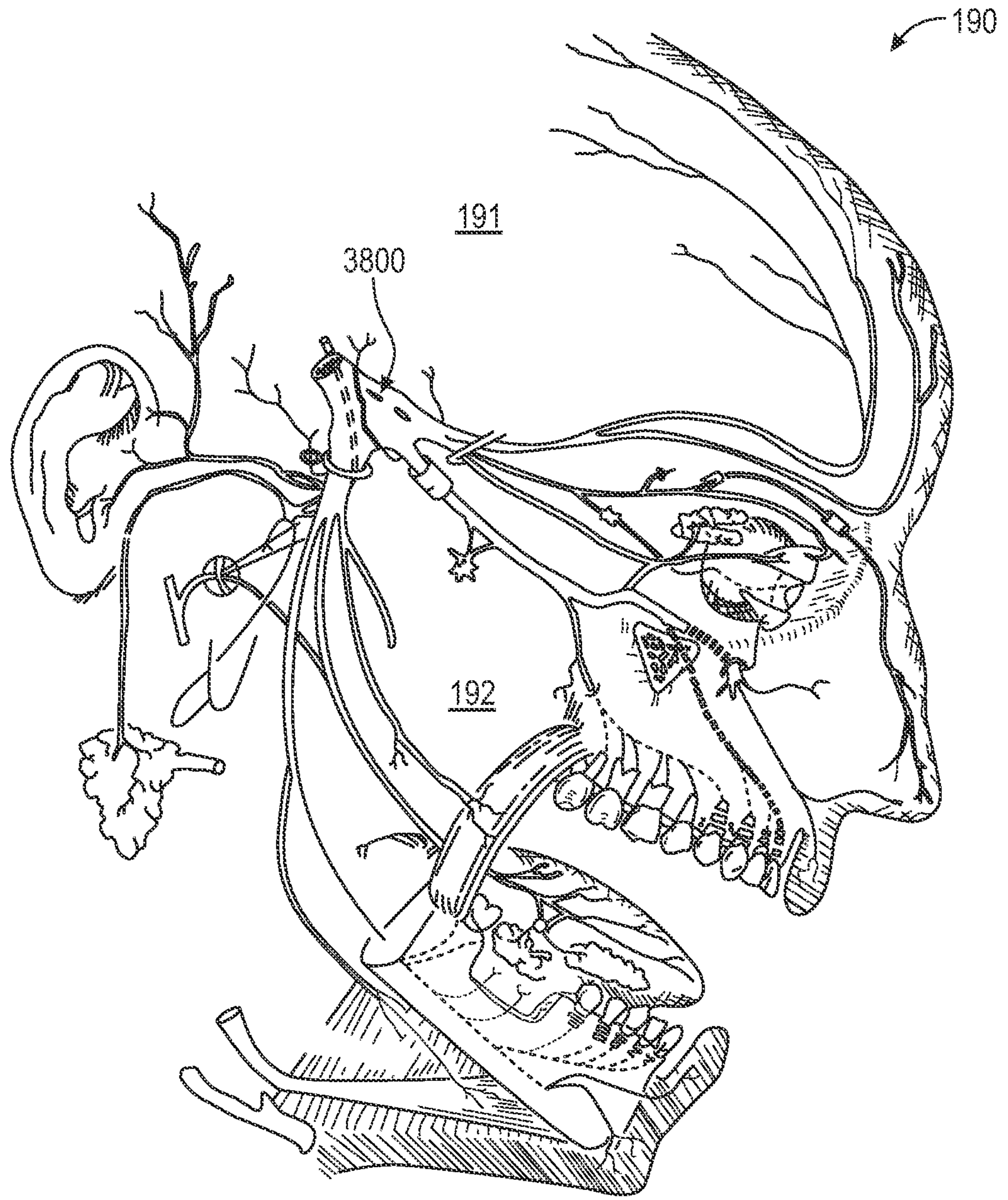
FIG. 38 (Prior Art)
FIG. 38 is prior art and shows a diagram of the human trigeminal nerve.

FIG. 38 (prior art) shows a diagram of the human trigeminal nerve 3800. The overall anatomical structure of the trigeminal nerve is well known and readily shown in many anatomy textbooks and/or the like. The trigeminal nerve or portion thereof may be a target of thermal activation, stimulation, delivery, and/or treatment by one or more of the thermal delivery device(s) 3911 (see e.g., FIG. 39) shown and discussed herein that may be used to thermally target at least the face 192 and/or the head 191 as the portion(s) 3909 (see e.g., FIG. 39). The trigeminal nerve, also known as the fifth cranial nerve, cranial nerve V, or simply CN V, is a cranial nerve responsible for sensation in the face and motor functions such as biting and chewing. The trigeminal nerve is the most complex of the cranial nerves. The trigeminal nerve name ("trigeminal"=tri-, or three, and -geminus, or twin: so "three-born, triplet") derives from each of the two nerves (one on each side of the pons) having three major branches: the ophthalmic nerve (V1), the maxillary nerve (V2), and the mandibular nerve (V3). The ophthalmic and maxillary nerves are purely sensory, whereas the mandibular nerve supplies motor as well as sensory (or "cutaneous") functions. The entire face is made up of the three main peripheral nerves, the three divisions (branches) of the trigeminal nerve (the fifth cranial nerve [CN V] and also the largest and most complex of the twelve cranial nerves) which are the Ophthalmic nerve (V1), the Maxillary nerve (V2), and the Mandibular nerve (V3) all of which converge on the trigeminal ganglion (also called the semilunar ganglion or Gasserian ganglion), located in Meckel's cave and containing the cell bodies of incoming sensory-nerve fibers. Adding to the complexity of the trigeminal nerve is that autonomic nerve fibers as well as special sensory fibers (e.g., taste) are contained within the trigeminal nerve. Note, the trigeminal nerve is wired directly into the brain. Also, note that the trigeminal nerve is without and/or bypasses the blood-brain-barrier (BBB).

FIG. 39 shows a method in a written form, identifying important aspects/parameters of this method via assigned reference numerals. In some embodiments, the invention may be characterized as a method of inducing 3901 a desired and/or intended outcome 3903 in a subject 3905 by touching (placing) a heat transfer element 3907 against (touching) a portion 3909 of the subject 3905, wherein the heat transfer element 3907 may be at least initially at a different temperature from a surface of the portion 3909 of the subject 3905; wherein temperature of the heat transfer element 3907 may be controlled (and/or generated) by a thermal means 3911. In some embodiments, thermal means 3911 may be referred to as a thermal delivery device 3911 and/or as a thermal treatment device 3911.

In some embodiments, the invention may be characterized as a method of inducing 3901 a desired and/or intended outcome 3903 in a subject 3905 by touching (placing) a heat transfer element 3907 against (touching) a portion 3909 of the subject 3905; wherein temperature of the heat transfer element 3907 may be controlled (and/or generated) by the thermal means 3911; wherein the thermal means 3911 provides cold and/or heat to the heat transfer element 3907; wherein at least a portion of that cold and/or heat is transferred from the heat transfer element 3907 to the portion 3909 of the subject 3905, resulting in cooling and/or heating of the portion 3909 of the subject 3905 that results in the desired and/or intended outcome 3903 in the subject 3905.

Note, in a strict thermodynamics sense, when the thermal means 3911 may be making the heat transfer element 3907 cold as compared to the portion 3909 of the subject 3905, heat energy from the portion 3909 of the subject 3905 may be passing into the heat transfer element 3907 and the thermal means 3911 may then be pumping (moving) that heat energy out of the heat transfer element 3907—because technically heat energy, in the thermodynamic sense, moves from hotter regions to cooler regions; i.e., any cooling process is technically pulling heat out of the object being cooled (and herein the object being cooled is portion 3909).

Continuing discussing FIG. 39, in some embodiments, the "inducing" 3901 word in this method of FIG. 39 may be replaced by: causing, facilitating, generating, producing, triggering, enabling, activating, stimulating, and/or the like.

Continuing discussing FIG. 39, in some embodiments, subject 3905 (user 190) is the one who may receive the benefit of execution of the method of FIG. 39. In some embodiments, subject 3905 and user 190 may be used interchangeably herein. In some embodiments, the subject 3905 of this method of FIG. 39 may be selected from at least one: a vertebrate animal, a mammal, a primate, a human being, a patient, a living organism, a person, a *Homo sapiens*, combinations thereof, and/or the like.

Note, the subject 3905 (human) and/or any portions thereof are not/never claimed by any embodiments of the present invention. Rather, the inventions and/or the embodiments discloses herein may be used on and/or to benefit human 3905.

Continuing discussing FIG. 39, in some embodiments, the portion 3909 of the subject 3905 (user 190) of this method of FIG. 39 may be selected from at least one: a face 192; a facial cheek; a forehead, lips, nose, chin, a head 191 (cranium); the entire head 191; a portion thereof; a combination thereof; and/or the like. In some embodiments, the portion 3909 of the subject 3905 (user 190) of this method of FIG. 39 may be selected from at least one: the face 192; a facial cheek; a forehead, lips, nose, chin, a head 191 (cranium); the entire head 191; entire body of the subject 3905; a body but not a head of the subject 3905; an appendage; a limb; a digit; a finger, a thumb, a toe, a torso; a chest; a leg; an arm; a hand; a foot; a portion thereof; a combination thereof; and/or the like. Note, the portion 3909 of the subject 3905 and/or any portions thereof are not/never claimed by any embodiments of the present invention. In some embodiments, portion 3909 may be at least some portion of the trigeminal nerve and/or at least some tissue that is touching at least some region of the trigeminal nerve.

Continuing discussing FIG. 39, in some embodiments, the desired and/or intended outcome 3903 of this method of FIG. 39 may be with respect to the subject 3905. In some embodiments, the desired and/or intended outcome 3903 of this method of FIG. 39 may be as compared to situations when the subject 3905 is not experiencing the thermal treatment of the method of FIG. 39 (or the subject 3905 has not recently received thermal treatment by method of FIG. 39, wherein "recently" in this context may be less than thirty (30) minutes).

In some embodiments, the desired and/or intended outcome 3903 of this method of FIG. 39 may be selected from at least one of: release of at least one neurotransmitter; release of at least one type of neurotransmitter; increased rate of release of at least one neurotransmitter; increased duration of release of at least one neurotransmitter; decreased rate of release of at least one neurotransmitter; decreased duration of release of at least one neurotransmitter; release of dopamine; increased rate of release of dopamine; increased duration of release of dopamine; decreased rate of release of dopamine; decreased duration of release of dopamine; release of norepinephrine; increased rate of release of norepinephrine; increased duration of release of norepinephrine; decreased rate of release of norepinephrine; decreased duration of release of norepinephrine; release of serotonin; increased rate of release of serotonin; increased duration of release of serotonin; decreased rate of release of serotonin; decreased duration of release of serotonin; release of endorphins; increased rate of release of endorphins; increased duration of release of endorphins; decreased rate of release of endorphins; decreased duration of release of endorphins; release of oxytocin; increased rate of release of oxytocin; increased duration of release of oxytocin; decreased rate of release of oxytocin; decreased duration of release of oxytocin; treatment of a disease, ailment, disorder, injury, medical, and/or health condition of the subject 3905; treatment of a disease, ailment, disorder, injury, medical, and/or health condition of the subject 3905 that benefits (improves) from an (interim) increase in at least one neurotransmitter; treatment of a psychiatric condition of the subject 3905; treatment of a psychiatric condition such as, but not limited to, depression, schizophrenia, bipolar, attention-deficit/hyperactivity disorder (ADHD), post-traumatic stress syndrome (PTSD), mood swings, aggression, anxiety, panic attacks; treatment of a brain injury in the subject 3905; treatment of a neurological condition of the subject 3905; treatment of a neurological condition such as, but not limited to, (tobacco and/or nicotine) smoking, (chemical) addiction, behavioral addiction, (chemical) dependence, behavioral dependence, OCD (obsessive-compulsive disorder), dementia, Alzheimer's disease, ADHD (attention deficit hyperactivity disorder), PTSD (post-traumatic stress disorder), Parkinson's disease, MS (multiple sclerosis), tinnitus; treatment of headaches, migraines, and/or (intoxication) hangovers of the subject 3905; treatment of cardiovascular issues of the subject 3905; treatment of heart issues of the subject 3905; control of blood glucose levels; improving insulin sensitivity; control (lowering or raising) of heart-rate; control (lowering or raising) of blood-pressure; treatment of kidney and/or renal issues of the subject 3905; treatment of cancer (such as, but not limited to breast cancer and/or brain cancer) of the subject 3905; treatment of obesity of the subject 3905; stress relief; treatment of sinus problems; treatment of eye problems/disorders; treatment of sleep disorders; treatment of skin problems; treatment of acne; treatment of rosacea; treatment of psoriasis; treatment of wrinkles; treatment of age spots; treatment of dry skin; relieves pain and suffering particularly in rheumatism, fibromyalgia, and/or asthma; improved cardiac function and cardiac function in heart failure; improved peripheral blood flow in ischemic limbs;

in myocardial infarction, method of FIG. 39 may increase eNOS (endothelial nitric oxide synthase) vascular endothelial growth factor mRNA levels; a novel noninvasive therapy for myocardial infarction; improved exercise tolerance and endothelial function; improved peripheral circulation in cerebral palsy; reduced LDL (low-density lipoprotein) cholesterol and increases HDL (high-density lipoprotein) cholesterol; prevents ischemic heart disease; delays ischemic heart disease; improved quality of life for subject 3905 with chronic obstructive pulmonary disease (COPD); improved bronchial patency; reduced frequency of infections; increased cutaneous blood flow; skin hydration; skin moisturization; aids skin exfoliation; facilitating shaving; provides relaxation; reducing at least one symptom of a given disease, ailment, disorder, injury, medical, and/or health condition of the subject 3905; reducing a duration of at least one symptom of a given disease, ailment, disorder, injury, medical, and/or health condition of the subject 3905; reducing pain, pressure, and/or discomfort of headaches, migraines, and/or (intoxication) hangovers of the subject 3905; improving mood, relaxation, soothing feelings, calmness, appetite, cognitive performance, and/or healing of the subject 3905; improving sexual function of the subject 3905; enhancing performance of the subject 3905 with respect to sexual function, cognitive function, mood, appetite, and/or alertness; increasing metabolic rate of the subject 3905; building muscle without working out/exercise of the subject 3905; burning body fat (such as, but not limited to, brown adipose tissue [BAT]) without working out/exercise of the subject 3905; slowing down aging of the subject 3905; increasing medication/chemical transmission across the blood-brain barrier (BBB), of the subject 3905, by putting facial nerves (of the subject 3905) into a particular state via thermal excitation; increasing transdermal medication delivery (e.g., by transdermal patch) efficacy by making skin in proximity of the heat transfer element/medium more porous; improvement of blood chemistry, quality, apparent age (e.g., appears younger), serum brain-derived neurotrophic factor (BDNF), proteins, and/or properties; improvement of cerebral spinal fluid (CSF), chemistry, quality, apparent age (e.g., appears younger), serum BDNF, proteins, and/or properties; increases serum BDNF; increase in adipocyte-derived hormones, neurotrophic factor, neuron-inducing factor, BDNF, and/or complete blood count improvements; blood anti-aging; blood with increased longevity; blood that ages more slowly; CSF anti-aging; CSF that ages more slowly; CSF that has better/improved longevity; improved memory; neurogenesis and in the production of neurotrophins; control, triggering, and/or promotion of flow of CSF through perivascular spaces (PVSs) in the brain for clearance of metabolic wastes out from the brain; increase, triggering, and/or promotion of protein expressions; a greater release of at least one type of neurotransmitter as compared to when human 190 (3905) is not being treated by the method; improving skin health of the at least some of face 192; reducing severity of at least one skin wrinkle of the at least some of face 192; reducing acne severity of the at least some of face 192; reducing rash severity of the at least some of face 192; increased healing of a wound (a cut, puncture, and/or laceration) of at least a portion of the at least some of face 192; a reduction in bruising (and/or swelling) of at least a portion of the at least some of face 192; a reduction in stress of human 190 (3905); a reduction in anxiety of human 190 (3905); a reduction in depression of human 190 (3905); an increased feeling relaxation, calmness, and/or contentment; as at least a partial treatment for addiction; as at least a partial treatment for substance abuse; transdermal delivery of at least one chemical (chemical-additive) within immersion-liquid 180 across the at least some of face 192; a reduction in headache severity of human 190 (3905); a reduction in sinus pressure of human 190 (3905); an increase in metabolism as compared to when human 190 (3905) is not being treated by the method; an increase in producing brown fat and/or browning of white adipose tissue (WAT), as compared to when human 190 (3905) is not being treated by the method; improving cardiovascular health of human 190 (3905); reducing pain of human 190 (3905); as a least a partial treatment of myocardial infarction (heart attack), transient ischemic attack (TIA), and/or stroke; as at least a partial treatment for blepharitis (that is commonly known as dry eye); cleaning [irrigation] of an exterior of an eye of human 190 (3905); encouraging removal of an object from an exterior of the eye of human 190 (3905); as at least a partial treatment for diabetes; as at least a partial means of preventing diabetes; or improved quality of sleep when the method is carried out prior to sleeping (e.g., carried out one hour or less prior to sleeping); portions thereof; combinations thereof; and/or the like. In some embodiments, the desired outcome 3903 (the desired and/or intended outcome 3903) may be as compared to when human 190 (3905) is not being treated by the thermal therapy method (and/or the hydrotherapy method)

For example, thermal therapy from method of FIG. 39 may reduce symptoms associated with chemical addictions and/or chemical dependencies, wherein such chemicals may include, but are not limited to: nicotine, alcohol, ethanol, caffeine, opioids, medications, over the counter medications, prescription medications, controlled substances, drugs, delta-9-tetrahydrocannabinol (THC), tobacco, marijuana, cocaine, benzodiazepines, glucose, sucrose, fructose, lactose, sugar, adrenalin, portions thereof, combinations thereof, and/or the like. Similarly, behavioral addictions and/or dependencies, such as, but not limited to, eating, food, sex, gambling, portions thereof, combinations thereof, and/or the like, may be improved by thermal therapies from the method of FIG. 39.

In some embodiments, the increase in neurotransmitter release by the method of FIG. 39, may be mostly with respect to neurons in the brain of the subject 3905 (i.e., the synapses [gaps] between brain neurons), particularly when it may be the facial, cranial, and/or head nerves (of the subject 3905) that may be thermally stimulated by the thermal means 3911 (thermal delivery device 3911).

In some embodiments, the neurotransmitter that the method of FIG. 39 may cause release thereof may be selected from at least one of: dopamine, serotonin, norepinephrine, endorphin, oxytocin, at least one of the four happy hormones, combinations thereof, and/or the like. In some embodiments, dopamine, serotonin, endorphins, and oxytocin may be referred to as the four happy hormones.

In some embodiments, when the desired and/or intended outcome 3903 of this method of FIG. 39 may at least be a release of brain/cranial neurotransmitters, then the thermal means 3911 (thermal delivery device 3911) (such as, but not limited to, a "face soaking device") may be configured to deliver the thermal therapy (heat and/or cold) to at least the face and/or the head 191 (cranium) of the subject 3905; i.e., the portion 3909 of the subject 3905 in such scenarios may be at least the face 192 and/or the head 191 (cranium) of the subject 3905.

In some embodiments, the injury that may be treated by the method of FIG. 39 may be at least one of: physical trauma to tissue, soft tissue trauma, a hematoma, a cut, a laceration, a tear, a break, a rip, a puncture, a rupture, a scrape, an abrasion, a portion thereof, a combination thereof, and/or the like, with respect to tissue of the subject 3905.

In some embodiments, portion 3909 (of subject 3905) may be at least some portion of the trigeminal nerve and/or at least some tissue that is touching at least some region of the trigeminal nerve. See e.g., FIG. 38 for a schematic diagram of the trigeminal nerve. Note, the trigeminal nerve is wired directly into the brain (as opposed to being wired to the spinal cord like most of the nerves of a human). Also, note that the trigeminal nerve is without and/or bypasses the blood-brain-barrier (BBB). Of the twelve (12) cranial nerves within the human body, only the trigeminal nerve is associated with four (4) different nuclei, wherein from cranial to caudal, these four (4) nuclei are the: mesencephalic, primary sensory, motor, and spinal nuclei. The trigeminal nerve controls cerebral blood flow. Many studies demonstrate successful regulation of cerebral blood flow via trigeminal nerve stimulation, which may provide at least one framework for controlling and/or managing cerebral blood flow to treat, prevent, or mitigate various disorders of cerebral perfusion. Stimulation of the trigeminal nerve clearly has a significant impact on cerebral perfusion in both normal conditions and pathologic states. Thermal delivery device(s) 3911 may be used to stimulate the trigeminal nerve by thermally stimulating the face 192, the head 191, portions thereof, combinations thereof, and/or the like (wherein the face 192, the head 191, portions thereof, combinations thereof, and/or the like may be examples of portions 3909).

It has been shown that head-out but body immersion in hot water increases serum BDNF (brain-derived neurotrophic factor) in healthy human males. In some embodiments, when portion 3909 (of subject 3905) may be at least some portion of the trigeminal nerve and/or at least some tissue that is touching at least some region of the trigeminal nerve (e.g., the face 192 and/or the head 191), then thermal treatment of that portion 3909 may be accomplished by thermal delivery device(s) 3911. Thermal delivery device(s) 3911 contemplated herein may be used to increase serum BDNF in subject 3905 by thermally treating portion 3909 (such as, but not limited to, the face 192 and/or the head 191) of subject 3905.

Thermal treatments have been shown to increase in adipocyte-derived hormones, neurotrophic factor, neuron-inducing factor, BDNF (brain-derived neurotrophic factor), and/or complete blood count improvements. The thermal effect of water immersion has been shown to causes changes in the concentration of substances in the blood (such as, but not limited to, blood cells, hormones, lipids, and the like). A study reported that warm water immersion played a direct role in preventing diseases by increasing the levels of adipocyte-derived hormones, which have been associated with obesity and inflammatory disorders. Another study reported that water immersion was beneficial in maintaining brain function and homeostasis by increasing the concentration of brain-derived neurotrophic factor, a neuron-inducing factor, and reducing the concentration of cortisol, which is commonly referred to as the stress hormone. Such changes in the concentration of substances in the blood can be explained by the direct effect of disease prevention and treatment. Thermal delivery device(s) 3911 may be used to provide various thermal treatments to portion(s) 3909 to increase in adipocyte-derived hormones, neurotrophic factor, neuron-inducing factor, BDNF, and/or improve complete blood counts.

Cold water immersion of swimmers has shown improved blood characteristics, such as, that blood exposed to the cold-water immersion appearing like the blood of comparably younger people. Thermal delivery device(s) 3911 contemplated herein may be used to improve blood quality (e.g., making the thermally treated blood appear younger) in subject 3905 by thermally treating portion 3909 (such as, but not limited to, the face 192, the head 191, the hands, the body, etc.) of subject 3905. Thus, thermal therapy via thermal delivery device(s) 3911 may be used as a blood anti-aging, longevity increasing, aging slowing down, reversed aging, and/or as a blood renewal treatment.

Similarly, thermal therapy of the face 192 and/or the head 191 (e.g., the trigeminal nerve or portion thereof) via thermal delivery device(s) 3911 may be used to improve CSF (cerebral spinal fluid). Thermal therapy of the face 192 and/or the head 191 (e.g., the trigeminal nerve or portion thereof) via thermal delivery device(s) 3911 may facilitate CSF having the appearance, qualities, and/or properties of CSF associated with comparably younger people. Thus, thermal therapy via thermal delivery device(s) 3911 may be used as a CSF anti-aging treatment, a CSF that ages more slowly, a CSF with increased longevity, and/or the like. Transplants of younger CSF into older individuals has been associated with improved memory in those older individuals. CSF may be about 80% derived from the blood (while the remaining about 20% consists of brain-derived and intrathecally produced molecules). Further, CSF may be renewed/newly produced three (3) to five (5) per pay. Thus, because CSF may be mainly mostly derived from blood and because thermal treatment of blood may result in that thermally treated blood appearing younger, then thermal treatment of the face 192 and/or the head 191 may also result in CSF that appears younger.

Further, note that the flow of CSF through perivascular spaces (PVSs) in the brain is important for clearance of metabolic wastes. Further still, this CSF flow to clear metabolic wastes (e.g., pulsatile) may be controlled, triggered, and/or promoted via cold or hot water immersion. Thus, thermal treatment of the face 192 and/or the head 191 (e.g., as portion(s) 3909) via thermal delivery device(s) 3911 may result in the control, triggering, and/or promotion of clearance of metabolic wastes from the brain, by triggering CSF flow through the PVSs of the brain.

Similarly, thermal delivery device(s) 3911 may be used to cool and/or heat portion(s) 3909 to achieve arterial pulsations. For example, cold water immersion may result in arterial blood flow constrictions; whereas, warm/hot water immersion may result in increased arterial blood flow. In some embodiments, an arterial pulsation may be: an intermittent increase in arterial blood flow of a given portion 3909 above a baseline/default value of arterial blood flow; an intermittent decrease and/or constriction in arterial blood flow of a given portion 3909 below a baseline/default value of arterial blood flow; and/or an intermittent increase followed by an intermittent decrease/constriction in arterial blood flow of a given portion 3909 or vice-versa.

The central nervous system (CNS) and the brain are protected against harmful/foreign substances within the blood by the blood-brain barrier (BBB) and the blood-cerebrospinal (B-CSF) barrier. Such barriers along with liver metabolism of substances in the blood can make delivery of drugs, medications, and/or chemicals to the brain difficult.

The human body often uses various naturally occurring negative feedback loops to reduce the amounts and/or concentrations of compounds (such as, but not limited to, neurotransmitters, hormones, proteins, and/or the like) in the body with a general goal of maintaining homeostasis of the body. In general, a spike of a given compound above a certain threshold will often trigger a negative feedback loop to bring that spiked compound below a threshold. The endocrine system is notorious for such negative feedback loops, with many examples of paired hormones that have opposite effects. However, very often when western medicine is treating a disease and/or health problem, often some compound is made bioavailable to the body, but the long-term efficacy of such delivered compounds is often limited by the bodies' natural feedback loops which seek to bring the added compound into what the body perceives as a normal amount/concentration. Such naturally occurring negative feedback loops in the human body may make many anti-aging, longevity, and/or slowing down the aging process difficult to implement. For example, administering human growth hormones to adults for anti-aging, longevity, and/or slowing down the aging process may have poor long-term efficacy because of the bodies' natural negative feedback loops which may seek to reduce the amounts/concentrations of such delivered human growth hormones. Successful long-term anti-aging, longevity, and/or slowing down the aging process treatments and/or modalities may need to avoid (not suppress) such natural negative feedback loops. Suppressing the bodies' natural negative feedback loops might not be desirable, as such suppression may lead to a loss of homeostasis. Thermal treatments using thermal delivery device(s) 3911 may avoid triggering such natural negative feedback loops and result in net increases of desired compounds (such as, but not limited to, neurotransmitters, hormones, proteins, and/or the like) and/or of new neuron growth/development. Note, something like exercise may be inferior to thermal treatments using thermal delivery device(s) 3911. For example, while exercise may cause an intermittent increase in dopamine, such exercised induced dopamine is essentially metabolized as produced and/or requires a significant caloric energy source to fuel the exercise, such that when the energy consumed is considered along with how much and how fast that dopamine is produced and consumed, there is no net gain from the exercise with respect to dopamine production. Whereas, in contrast thermal therapy via a thermal delivery device 3911 may cause net increases in dopamine without caloric energy intake. Thermal treatments using thermal delivery device(s) 3911 may instead trigger the bodies' natural positive feedback loops, leading to net increases in desired compounds, wherein such increase in desired compounds may be used in various anti-aging, longevity promoting, and/or slowing down the aging process treatments.

In some embodiments, the face 192 (e.g., as portion 3909), because of the trigeminal nerve, may be an ideal, a desired, and/or a better location on the body of subject 3905 for transdermal drug delivery. Because the trigeminal nerve is without and/or bypasses the blood-brain barrier, drug transdermal delivery via the face 192 may provide an ideal, a desired, and/or a better location on the body of subject 3905 for getting the administered drug(s) into the brain, to brain cells, and/or into brain cells. Drugs, chemicals, medications, and/or the like (drugs) may bypass the blood-brain barrier because the trigeminal ganglion is outside the blood-brain barrier. In this capacity, the trigeminal ganglion may act as an integrative organ. The trigeminal ganglion thus may be a target of drug action outside the blood-brain barrier.

Because the trigeminal nerve is without the blood-brain barrier, the trigeminal nerve may also be without the blood-cerebrospinal fluid barrier and/or without the blood nerve (or neurol) barrier. If so, the face 192 (e.g., as portion 3909), because of the trigeminal nerve, may further be an ideal, a desired, and/or a better location on the body of subject 3905 for transdermal drug delivery.

Any of the thermal delivery devices 3911 shown and discussed herein may be used to heat and/or to cool a given (targeted) region of skin 3909 on a target organism 3905 (e.g., human); wherein application of heat and/or cold to that given (targeted) region of skin 3909, increases the skin's permeability with respect to one or more chemical species.

Any of the thermal delivery devices 3911 shown and discussed herein may be used for transdermal delivery of one or more chemical species by using the given thermal delivery device 3911 to change and increase the skin's 3909 permeability to such chemical species by the application of heat and/or cold to the given (targeted) region of skin 3909; and by having the given chemicals species be in direct physical contact with that given (targeted) region of skin 3909 that has been heat and/or cold treated by the given thermal delivery device 3911.

Any of the thermal delivery devices 3911 shown and discussed herein may be used for the delivery of one or more chemical species across a given (targeted) region of skin 3909 and into the target organism's 3905 body by using the given thermal delivery device 3911 to change and increase the skin's 3909 permeability to such chemical species by the application of heat and/or cold to the given (targeted) region of skin 3909; and by having the given chemicals species be in direct physical contact with that given (targeted) region of skin 3909 that has been heat and/or cold treated by the given thermal delivery device 3911.

In some embodiments, a given thermal delivery device 3911 that is heating (and/or cooling) the face 192, may be used for transdermal delivery of (at least partially or mostly) water-soluble chemical species, through the skin of the face 192, and directly into the bloodstream and/or brain (bypassing the blood-brain-barrier [BBB]). For example, at skin and/or body temperature(s) of subject 3905 that may be warm enough to induce sweating, hair follicles and/or sweat glands open up thereby allowing more water than normal to penetrate into and/or through the epidermis, which is not typical if the skin/body is not heated up first. The epidermis generally functions to keep external water outside of the body (e.g., when the body is not sweating). This is at least one reason why some prior art transdermal delivery patches use nonpolar (hydrophobic) medication(s), as the given nonpolar (hydrophobic) medication may be able pass through the epidermis. However, if the epidermis were thermally treated with a given thermal delivery device 3911, then some water-soluble chemical species may be transdermally delivered through the epidermis of the face 192, and directly into the bloodstream and/or brain (bypassing the blood-brain-barrier [BBB]). For example, and without limiting the scope of the present invention, in this manner, (at least mostly to partially) water-soluble moisturizer(s) may be delivered into the epidermis once the skin has been thermally treated via a given thermal delivery device 3911. This may provide a more effective means of treating/reducing skin wrinkles in the treated region as compared to skin that was not so thermally treated. The thermal treatment of the skin allows deeper penetration into the epidermis of the (at least mostly to partially) water-soluble moisturizer(s) as compared to not using such thermal treatment of the skin. This deeper penetration allows more of the epidermis to benefit from the greater availability of the (at least mostly to partially) water-soluble moisturizer(s).

In some embodiments, the one or more chemical species (chemical-additive and/or at least one chemical) may be predetermined. In some embodiments, the one or more chemical species may be selected from at least one predetermined: chemical, salt, ion, molecule, medicine, medicament, pharmaceutical, biological, carbohydrate, amino acid, peptide, protein, nucleic acid, DNA (e.g., a string of deoxyribonucleic acid), RNA (e.g., a string of ribonucleic acid), fatty acid, hormone, antibiotic, a moisturizer, a skin bleacher, an oxidizer, a skin peal, a skin mud, a skin clay, liposome, portions thereof, combinations thereof, and/or the like. In some embodiments, the one or more chemical species may be at least one of: naturally occurring, synthetic, human made, water soluble, fat soluble, plant derived, algae derived, animal derived, bacteria derived, fungus derived, archaebacteria derived, protozoan derived, portions thereof, combinations thereof, and/or the like.

In some embodiments, the one or more chemical species may be dispersed, carried, and/or dissolved within one or more solvents, carrier fluids, and/or immersion liquids, such as, but not limited to, water.

For example, and without limiting the scope of the present invention, soaking-device 100, whole head thermal delivery device 3500, the Hydroeffacer face soaking device (see e.g., U.S. Pat. No. 10,667,990) or any other immersion based thermal delivery device 3911 shown and discussed herein may have its given immersion liquid (e.g., immersion-liquid 180) holding (receiving) vessel appropriately filled with the desired immersion liquid (e.g., water) and the one or more chemical species (additives) may added to that immersion liquid, such that when the given body part 3909 (such as, but not limited to, the face 192, head 191, hand, and/or the like) is immersed within that immersion liquid, with the one or more chemical species (additives), and heat and/or cold is then applied to that immersion liquid from that immersion based thermal delivery device 3911, that applied heat and/or cold, via the immersion liquid, will heat and/or cool the skin of the immersed body part 3909, increasing the skin's permeability for transdermal delivery of the one or more chemical species.

Further, when immersed body part 3909 may be the face 192, the head 191, or portions thereof, and because the trigeminal nerve is without and/or bypasses the blood-brain-barrier (BBB), then the transdermally delivered one or more chemical species (additives) may be further delivered to the brain, brain cells, and/or to CSF (cerebral spinal fluid) of that subject 3909 (user 190). That is, thermal delivery devices 3911 that heat and/or cool the face 192, the head 191, or portions thereof (such as, but not limited to, soaking-device 100, whole head thermal delivery device 3500, the Hydroeffacer face soaking device [see e.g., U.S. Pat. No. 10,667,990]), may be used for transdermal delivery of the one or more chemical species (additives) to the brain, brain cells, and/or to CSF of that subject 3909 (user 190).

Note, thermal stimulation and/or activation of the nerves (such as, but not limited to facial and/or cranial nerves) may be more desirable as compared to electrical and/or magnetic stimulation and/or activation of the such nerves. This may be because by virtue of evolution (natural selection), the body has more and/or stronger preexisting pathways that respond to thermal stimulation and/or activation of the nerves since changes in environmental temperatures are common in the environment for organisms to deal with; whereas, electrical and/or magnetic changes are far less common in the environment, so from an evolutionary perspective, most organisms are less likely to have many and/or strong pathways for dealing with electrical and/or magnetic changes. In other words, thermal changes are more normal for a body to deal with as compared to electrical and/or magnetic changes which are more abnormal/unnatural for the body to deal with. As such, it is not unusual that electrical and/or magnetic stimulation and/or activation of the vagus and trigeminal nerves have had limited success.

For instance, electrical and/or magnetic stimulation and/or activation of the vagus nerve stimulates the GABA transmitter/receptor pathway, which once triggered, often inhibits dopamine release that can cause depression, weight gain, and/or addiction; whereas, thermal stimulation and/or activation of the nerves (such as, but not limited to facial and/or cranial nerves) (which is comparatively more normal than electrical and/or magnetic stimulation) may instead increase, promote, and/or generate dopamine release, along with the benefits that may come from a dopamine release.

Because the trigeminal ganglion direct wired connection to the brain (unlike most the other human nerves); because the trigeminal nerve is the largest and most complex cranial nerve; because the trigeminal nerve is outside (without) the blood-brain barrier; because the trigeminal nerve is bathed in CSF; and/or, because the trigeminal nerve is largely located inside the head 191 and gives rise to three main peripheral nerves providing nearly all intra- and extracranial structures with nerve fibers of various somatosensory functions—that the trigeminal nerve largely functions and/or operates as the "motherboard" for the entire body and, therefore, the transition site for sensory information from the periphery to the central nervous system and that intracellular modulatory mechanisms and intercellular signaling are capable of controlling sensory information relevant for the pathophysiology of syndrome, diseases and injury. And hence, thermal stimulation and/or activation of the trigeminal nerve (e.g., via use of thermal delivery device(s) 3911) may be used to treat a variety of syndromes, diseases, and/or injuries.

The blood-brain barrier (BBB) and the blood-cerebrospinal (B-CSF) barrier are main protections to the brain and central nervous system (CNS). But these protections can also be roadblocks to treatments and/or prevention by making it difficult to target and/or reach the brain. Thus, if one can induce and/or cause the body to make its own neurons, hormones, and/or neurotransmitters, via a more natural means, such as, by thermal stimulation and/or activation, which the body has preexisting pathways to utilize, then such thermal stimulation and/or activation of targeted regions, such as, but not limited to the face 192 and/or the head 191, with or without medicine(s), may increase neuron growth and development in a controlled manner and/or release hormones/neurotransmitters to treat, cure, and/or prevent disease; and without triggering the body's natural defense mechanisms.

Neurogenesis is the process by which new neurons are formed in the brain. Neurogenesis is crucial when an embryo is developing, but also continues in certain brain regions after birth and throughout a human's lifespan. It has been shown that immersion in thermally controlled water generates positive effects on cerebral blood flows, cortical activation, executive functions, and the production of neurotrophins in healthy subjects. Although the vast majority of neurons in the mammalian brain are formed prenatally, parts of the adult brain (for example, the hippocampus) retain the ability to grow new neurons from neural stem cells, a process known as neurogenesis. Neurotrophins are chemicals that help to stimulate and control neurogenesis. Thermal treatment of portion 3909 (such as, but not limited to, the face 192 and/or the head 191) with thermal delivery device(s) 3911 may result in neurogenesis and in the production of neurotrophins.

Continuing discussing FIG. 39, in some embodiments, the heat transfer element 3907 (or heat transfer medium 3907 or heat transfer fluid 3907) of this method of FIG. 39 may be selected from at least one: a fluid, a liquid, an immersion liquid (immersion-liquid 180), (sprayed/jetted) heat-transfer-liquid 3603, a slurry, a gas, air, carbon dioxide (gas), nitrogen (gas), a gel, a slime, a mud, a paste, a thermal paste, a clay, a metal, an alloy, a solid, beads, sand, a fluidized bed, heat exchanger fluid, refrigeration fluid, water, ice, water ice, dry ice (carbon dioxide ice), ice cubes, crushed ice, ice liquid mixtures, ice water mixtures, mineral water (e.g., for balneo-therapy), sparkling water, salt water, acidic water (pH less than 7), soft water, hard water, basic water (in terms pH, i.e., pH higher than 7), oil, air, oxygen, nitrogen, carbon dioxide, antifreeze, ethylene glycol, portions thereof, combinations thereof, and/or the like. In some embodiments, the heat transfer element/medium 3907 may be configured to (adapted to) facilitate a heat transfer means between the portion 3909 (of subject 3905/user 190) and the thermal means 3911. In some embodiments, the heat transfer means may be selected from at least one: conduction, convection, radiation, portions thereof, combinations thereof, and/or the like. For example, when at least a portion of the heat transfer element/medium 3907 may be a fluid, then heat transfer may predominantly occur by convection and/or by conduction; whereas, when at least a portion of the heat transfer element/medium 3907 may be a solid material (e.g., a metal or alloy), then heat transfer may predominantly occur by conduction (and/or radiation). For example, when at least a portion of the heat transfer element/medium 3907 may be air and/or a gas, then heat transfer may occur by convection, conduction, and/or radiation.

Continuing discussing FIG. 39, in some embodiments, the thermal means 3911 of this method of FIG. 39 may comprise at least one thermostat. In some embodiments, the thermal means 3911 of this method of FIG. 39 may be at least one thermal delivery device 3911. In some embodiments, the thermal delivery device 3911 may be at least one of: soaking-device 100 (which may be used for heating and/or cooling the face 192 of the subject 3905); handheld-thermal-device 3400 (which may be used for heating and/or cooling the portion 3909 of the subject 3905); handheld-thermal-device 3450 (which may be used for heating and/or cooling the portion 3909 of the subject 3905); whole head thermal delivery device 3500 (which may be used for heating and/or cooling the head 191 and/or the face 192 of the subject 3905); whole head immersion thermal delivery device 4400; whole head immersion thermal delivery device 4450; whole head immersion thermal delivery device 4475; whole head immersion thermal delivery device 4500; face immersion thermal delivery device 4600; face immersion thermal delivery device 4650; face immersion thermal delivery device 4700; "face soaking device" (Hydroeffacer) (for heating or cooling the face 192 of the subject 3905); a face mask thermal delivery device(s) from U.S. provisional patent application 63/390,926 filed on Jul. 20, 2022 (for heating and/or cooling the face 192 of the subject 3905); a head mask thermal delivery device(s) from U.S. provisional patent application 63/390,926 filed on Jul. 20, 2022 (for heating or cooling the head 191 or portion thereof of the subject); a hat (cap and/or beanie) thermal delivery device(s) from U.S. provisional patent application 63/390,926 filed on Jul. 20, 2022 (for heating or cooling the head 191 or portion thereof of the subject); a headband thermal delivery device(s) from U.S. provisional patent application 63/390,926 filed on Jul. 20, 2022 (for heating or cooling a portion of the head 191 of the subject); a head container thermal delivery device(s) from U.S. provisional patent application 63/390,926 filed on Jul. 20, 2022 (for heating or cooling the head 191 or portion thereof of the subject); a body container thermal delivery device(s) from U.S. provisional patent application 63/390,926 filed on Jul. 20, 2022 (for heating or cooling the body, but not the head of the subject); a body and head container thermal delivery device(s) from U.S. provisional patent application 63/390,926 filed on Jul. 20, 2022 (for heating or cooling the body and the head 191 of the subject); an inverted dry suit thermal delivery device(s) from U.S. provisional patent application 63/390,926 filed on Jul. 20, 2022 (for heating or cooling the body, but not the head of the subject); a clothing article (e.g., glove and/or mitten) thermal delivery device(s) from U.S. provisional patent application 63/390,926 filed on Jul. 20, 2022 (for heating or cooling what the clothing covers of the subject); a sleeping bag (body bag) thermal delivery device(s) from U.S. provisional patent application 63/390,926 filed on Jul. 20, 2022 (for heating or cooling what the clothing covers of the subject); a blanket thermal delivery device(s) from U.S. provisional patent application 63/390,926 filed on Jul. 20, 2022 (for heating or cooling what the clothing covers of the subject); a transdermal patch (for heating or cooling at least a portion of the subject 3905 and for delivering at least one chemical to the 3905 as well); a portion thereof; a combination thereof; and/the like.

In some embodiments, in addition to or in the alternative to using the thermal delivery device 3911 to generate the desired and/or intended outcome 3903, the thermal delivery device 3911 may also be used recreationally and/or used casually.

In some embodiments, the "face soaking device" may be a device/apparatus/machine at least as substantially (mostly) shown and/or described in U.S. Pat. Nos. 10,667,990, 10,449,341, 10,667,991, U.S. utility patent 391154697, U.S. design Pat. D863,575, U.S. design Pat. D863,576, U.S. design Pat. D864,403, U.S. design Pat. D889,675, and/or U.S. design Pat. D916,303; wherein the "face soaking device" may comprise a vessel (configured to hold an immersion liquid), a breathing apparatus, a headrest, a neck gasket, and at least one heating and/or cooling means. In some embodiments, the immersion liquid (e.g., immersion-liquid 180) may be an example of the heat transfer element/medium 3907 of the method of FIG. 39. In some embodiments, the face soaking device may comprise a means for releasing gas bubbles and/or emitting light into the immersion liquid. In some embodiments, the gas bubbles may be from air, oxygen, nitrogen, carbon dioxide, other predetermined gas, portions thereof, combinations thereof, and/or the like. In some embodiments, the immersion liquid may include (comprise) ice, water ice, dry ice, ice cubes, crushed ice, cooling pack(s), portions thereof, combinations thereof, and/or the like. In some embodiments, the face soaking device may be referred to as a "Hydroeffacer."

Note, prior art thermal therapies (such as body cold water immersion) generally involve the patient being in a standing position and not in a position where the body is entirely at rest and supported. Whereas, with the face soaking device (Hydroeffacer) the entire body may be at rest and supported during the thermal therapy; e.g., the body may be sitting down and the head 191 is entirely supported by the headrest of the face soaking device (Hydroeffacer); wherein thermal therapies administered by the face soaking device (Hydroeffacer) may result in greater amounts of neurotransmitters as compared to merely standing (or swimming) cold water body immersion.

Note, when the "face soaking device" may be used to treat and/or improve a region of skin and/or tissues there below (such as, but not limited to, the face 192 or portion thereof) then the "face soaking device" may be referred to as a skin treatment device.

Note, the disclosures of U.S. Pat. No. 10,667,990, 10,449, 341, 10,667,991, U.S. utility patent 391154697, U.S. design Pat. D863,575, U.S. design Pat. D863,576, U.S. design Pat. D864,403, U.S. design Pat. D889,675, and U.S. design Pat. D916,303 are incorporated by reference herein, in their respective entireties, as if fully set forth herein.

In some embodiments, the inverted dry suit (e.g., of a thermal delivery device 3911), from U.S. provisional patent application 63/390,926 filed on Jul. 20, 2022, may have circumferential gaskets for the ankles, wrists, and/or neck of subject 3905 (user 190) (i.e., where the given gasket goes entirely around the entire perimeter circumference of the given ankle, wrist, and/or neck of subject 3905 [user 190]). In some embodiments, the inverted dry suit, from U.S. provisional patent application 63/390,926 filed on Jul. 20, 2022, may be configured to retain an immersion liquid within the inverted dry suit, but to otherwise be dry on an exterior of the inverted dry suit. In some embodiments, the immersion liquid may be an example of the heat transfer element/medium 3907 of the method of FIG. 39.

In some embodiments, a transdermal patch (e.g., of a thermal delivery device 3911) that does have its own heating and/or cooling capability may be used in conjunction with a given thermal delivery device 3911. For example, and without limiting the scope of the present invention, a given transdermal patch, without its own heating and/or cooling capability, may be worn on the face 192 before, during, and/or after thermal treatment via use of a given thermal delivery device 3911. For example, and without limiting the scope of the present invention, a given transdermal patch, without its own heating and/or cooling capability, may be worn on the face 192 before, during, and/or after thermal treatment via use of a given soaking-device 100, whole head thermal delivery device 3500, the "face soaking device" (Hydroeffacer), or the like. In some embodiments, the thermal delivery device 3911 may comprise at least a portion of the heat transfer element/medium 3907. In some embodiments, the thermal delivery device 3911 may contain, house, retain, and/or the like at least a portion of the heat transfer element/medium 3907 within some portion of the thermal delivery device 3911.

In some embodiments, the thermal delivery device 3911 may comprise at least one heating and/or cooling means (see e.g., heating means 4105, cooling means 4107, and/or heating and/or cooling means 4109 of FIG. 41). In some embodiments, at least one heating and/or cooling means may be operationally attached to the thermal delivery device 3911. In some embodiments, the at least one heating and/or cooling means may be located externally, internally, or a combination of both external and internal with respect to the thermal delivery device 3911. In some embodiments, a given thermal delivery device 3911 may be configured to provide cooling, heating, heating and cooling at the same time, heating and cooling at different times, only/just cooling, only/just heating, portions thereof, combinations thereof, and/or the like via the heating and/or cooling means. Note, the at least one heating and/or cooling means may be associated with reference numerals 4105, 4107, and/or 4109. Specifically, 4109 may be a heating and/or a cooling means; 4107 may be just a cooling means; and 4105 may be just a heating means. See FIG. 41 and its discussion for cooling means 4109, cooling means 4107, and/or heating means 4105.

Note, in some applications/uses, cooling therapies may be preferred over heating therapies as overeating may be more dangerous than cooling. For example, heat stroke may be fatal quicker than hypothermia; and heat stroke may be more difficult to treat than hypothermia. Given a same amount of time, excessive heat may be more damaging than excessive cold.

Note, depending upon the nature and/or type of the heat transfer element/medium/fluid 3907, different temperatures may be used (e.g., temperatures output by the thermal delivery device 3911). For example, the most extreme (hottest or coldest) temperatures may be used when the heat transfer fluid 3907 may be a gas like air; whereas, comparatively less extreme temperatures may be used when the heat transfer fluid 3907 may be a liquid; and even less extreme temperatures may be used when the heat transfer element/medium 3907 may be a metal/alloy solid. This may be so because rates of heat transfer may be driven at least in part by the nature and/or type of the heat transfer element/medium 3907 utilized. For example, and without limiting the scope of the present invention, if the heat transfer fluid 3907 is humid air, then hot temperatures at or above 120 degrees Fahrenheit (° F.) (48.9 degrees Celsius [° C.]) (but below 215° F. [101.7° C.]) may be utilized; whereas, if the heat transfer fluid 3907 is water, then hot temperatures from 104° F. (40° C.) to 119° F. (48.3° C.) may be used.

In some embodiments, the at least one heating and/or cooling means 4105, 4107, and 4109 may utilize at least one of the following means for heating and/or for cooling the at least the portion of the heat transfer element/medium 3907: a heater using electrical resistance; a heater using inductance; a resistive heater; inductive heating; an emitter of electromagnetic (EM) radiation; an transducer of EM radiation; an electrode; a radiation source; a light source; a heat pump; an ultrasound source; a vibration source; a condenser; a compressor; a refrigerator; a chiller; a freezer; a Peltier circuit; a solid state heating/cooling circuit; a blower; a fan; a radiator; a heat sink; a cooling tower; a pump; a heating and/or a cooling coil; a heat exchanger; a predetermined chemical reaction configured for heating or for cooling; a heat pack; a heated heat pack (e.g., heated via a microwave and/or an oven); a cold pack; a frozen cold pack; a chemical based heat pack; a chemical based cold pack; an ice pack; (water) ice; dry ice; carbon dioxide ice; cold water; cold liquid; cool water; cool liquid; hot water; hot liquid; warm water; warm liquid; hot air; warm air; cold air; cool air; dry air; humid air; liquid nitrogen; portions thereof; combinations thereof; and/or the like. In some embodiments, the emitter, the transducer, the electrode, the radiation source, the light source, and/or the like, may emit radiation (of a predetermined wavelength/frequency of electromagnetic [EM] radiation) that in turn may heat the heat transfer element/medium 3907. In some embodiments, the heat pump, the condenser, the compressor, the refrigerator, the chiller, the freezer, the pump, and/or the like may be used in a heating and/or a cooling cycle that utilizes repeated compression and expansion of a heat transfer gas/fluid (such as, but not limited to, a refrigerant, a common refrigerant, and/or the like). In some embodiments, the refrigerant may be selected from one or more of: water, a predetermined HFC (hydrofluorocarbon), R134A HFC (norflurane or Freon 134A), R744 $CO_2$, R717 ammonia, a predetermined HCFC (hydrochlorofluorocarbon), R2, R123, R124, R151, a predetermined HCS (hydrocarbon), R600A (isobutene), R290

(propane), R407C, R404A, R410A, R448A, R449A, Freon, ethylene glycol, carbon dioxide, a greenhouse gas, portions thereof, combinations thereof, and/or the like. In some embodiments, this heat transfer gas/fluid (e.g., refrigerant) may be an example of the heat transfer element/medium 3907.

In some embodiments, the thermostat may be configured to control heating and/or cooling output of the heating and/or cooling means. In some embodiments, the thermostat may comprise one or more temperature measuring means, such as, but not limited to, thermocouples, temperature probes, thermometers, temperature sensor(s), portions thereof, combinations thereof, and/or the like. In some embodiments, the thermostat may comprise a temperature controller, a PID controller, a PLC controller, portions thereof, combinations thereof, and/or the like. In some embodiments, the thermostat may be configured to obtain a temperature of: at least some portion of the surface of the portion of the subject 3905; at least some portion of the heat transfer element/medium 3907 (e.g., immersion-liquid 180); at least some portion of the heating and/or cooling means; a portion thereof; a combination thereof; and/or the like.

In some embodiments, the thermal delivery device 3911 may comprise at least one of: the heating and/or cooling means (4105, 4107, and/or 4109); the thermostat; electronics; circuitry; a printed circuit board (PCB); a processor 4101; memory 4103*a* (transitory memory) (e.g., RAM [random access memory]); storage 4103*b* (non-transitory memory) (e.g., a hard drive [solid state, optical, and/or spinning], backup drive, tape drive, or the like); a means to electrically power electronics of the thermal delivery device 3911 (e.g., Power-Source 4117*a*); a battery; a means to receive external electrical power (e.g., an electrical plug or an electrical receptacle [e.g., a means for interacting with Power-Source 4117*b*]); electrical wiring/cabling; firmware; software; inputs means 4113; output means 4113; a portion thereof; a combination thereof; and/or the like. See e.g., FIG. 41. In some embodiments, the thermal delivery device 3911 may be battery powered and/or plugged into an external electrical power source 4117*b*. In some embodiments, a battery of the thermal delivery device 3911 may be rechargeable (at least for a set quantity of duty cycles).

In some embodiments, the inputs means 4113 of the thermal delivery device 3911 may comprise at least one: user interface, touchscreen, keyboard, switch, button, dial, slider, mouse, touch pad, track ball, camera, microphone, remote-control, radio, antenna, receiver, wireless communication means, RFID (radio frequency identification)/NFC (near field communication) reader, QR code reader, barcode reader, temperature probe, thermocouple, thermometer, a portion thereof, a combination thereof, and/or the like. See e.g., FIG. 41.

In some embodiments, the outputs means 4113 of the thermal delivery device 3911 may comprise at least one: display, screen, speaker, light, buzzer, alarm, radio, antenna, transmitter, RFID/NFC signal emitter, wireless communication means, printer, a portion thereof, a combination thereof, and/or the like. See e.g., FIG. 41.

Figure 40:
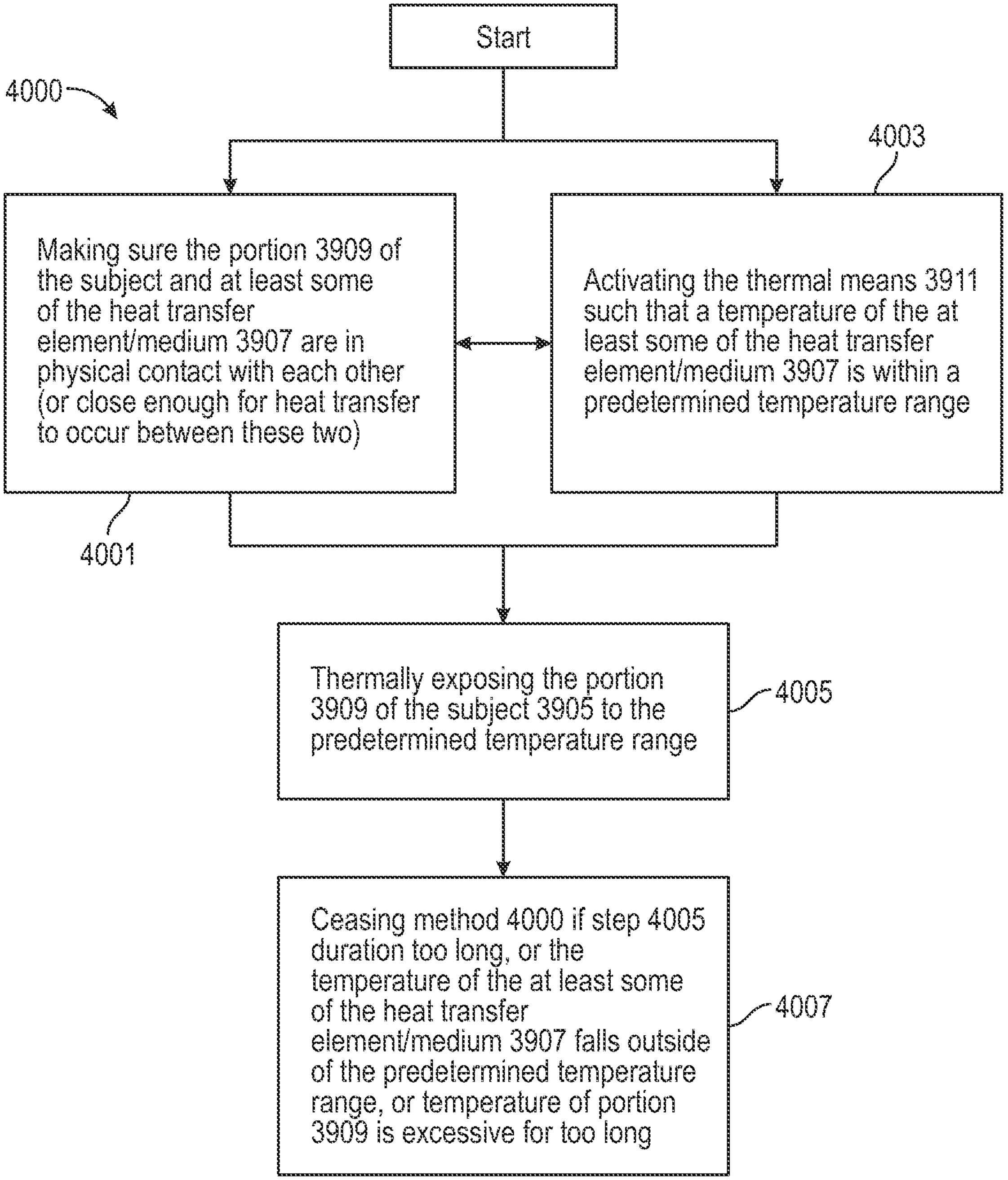
FIG. 40 is a flowchart showing at least some steps of a method of inducing a desired and/or intended outcome in a subject (user) by touching (placing) a heat transfer element (medium) against (touching) a portion of the subject, wherein the heat transfer element (medium) may be at least initially at a different temperature from a surface of the portion of the subject; wherein temperature of the heat transfer element (medium) may be controlled (and/or generated) by a thermal means.

FIG. 40 is a flowchart of at least some steps of method 4000. In some embodiments, method 4000 may a method of inducing 3901 a desired and/or intended outcome 3903 in a subject 3905 (user 190) by touching (placing) a heat transfer element 3907 against (touching) a portion 3909 of the subject 3905, wherein the heat transfer element 3907 may be at least initially at a different temperature from a surface of the portion 3909 of the subject 3905; wherein temperature of the heat transfer element 3907 may be controlled (and/or generated) by a thermal means 3911. In some embodiments, method 4000 may comprise at least one of the following steps: step 4001, step 4003, step 4005, step 4007, portions thereof, combinations thereof, and/or the like. In some embodiments, at least one of the following steps: step 4001, step 4003, step 4005, step 4007, may be executed sequentially within numeral order. In some embodiments, at least one of the following steps: step 4001, step 4003, step 4005, step 4007, may be executed out of numeral order. In some embodiments, at least one of the following steps: step 4001, step 4003, step 4005, step 4007, may be executed at least partially concurrently (simultaneously). In some embodiments, at least one of the following steps: step 4001, step 4003, step 4005, step 4007, may be optional.

Continuing discussing FIG. 40, in some embodiments, step 4001 may be a step of making sure the portion 3909 of the subject 3905 and at least some of the heat transfer element/medium 3907 are in physical contact with each other (or close enough to each other to enable/facilitate heat transfer between each other). In some embodiments, when heat transfer element/medium 3907 may be the immersion liquid of a "face soaking device," then step 4001 may be executed by making the vessel of the "face soaking device" is at least minimally filled with the immersion liquid and then immersing the user's (subject 3905) face (portion 3909) into that immersion liquid. In some embodiments, method 4000 may begin with step 4001 (and/or with step 4003). In some embodiments, step 4001 and step 4003 may occur independently, concurrently, sequentially, and/or at least partially overlapping with each other. In some embodiments, step 4001 may progress to step 4003 and/or to step 4005.

Continuing discussing FIG. 40, in some embodiments, step 4003 may be a step of activating the thermal deliver device 3911 such that a temperature of the at least some of the heat transfer element/medium 3907 is within a predetermined temperature range. In some embodiments, step 4003 for the "face soaking device" as the thermal delivery device 3911, may entail turning on the "face soaking device" and setting and/or selecting an operating temperature for the immersion liquid to be within the predetermined temperature range. Note in some embodiments, if the operating temperature is at, or targeted to be at, an endpoint of the predetermined temperature range, that may be considered as the (operating) temperature to be within predetermined temperature range. For example, and without limiting the scope of the present invention, if the predetermined temperature range is 58° F. to 55° F. (14.4° C. to 12.8° C.), then a temperature of 58° F. (14.4° C.) may be considered to be within this predetermined temperature range. In some embodiments, method 4000 may begin with step 4003 (and/or with step 4001). In some embodiments, step 4003 and step 4001 may occur independently, concurrently, sequentially, and/or at least partially overlapping with each other. In some embodiments, step 4003 may progress to step 4001 and/or to step 4005.

Continuing discussing FIG. 40, in some embodiments, step 4005 may be a step of thermally exposing the portion 3909 of the subject 3905 to the predetermined temperature range or a temperature selected from the predetermined temperature range. In some embodiments, step 4005 may continue for a predetermined duration (amount of time) at the temperature from the predetermined temperature range; and that predetermined duration may be dependent upon the temperature of the heat transfer element/medium 3907 (e.g., temperature of the immersion liquid), what region is the portion 3909 (e.g., the face), the type of organism for subject 3905 (e.g., a human), and what specific/particular desired and/or intended outcome 3903 (e.g., dopamine release in the brain) that may be targeted with this particular application of method 4000.

In some embodiments, the colder the operating temperature of the heat transfer element/medium 3907 (selected from a given predetermined temperature range) the shorter the duration of thermal exposure of the portion 3909 of subject 3905 may be.

In some embodiments, the hotter the operating temperature of the heat transfer element/medium 3907 (selected from a given predetermined temperature range) the shorter the duration of thermal exposure of the portion 3909 of subject 3905 may be.

For example, and without limiting the scope of the present invention, with respect to adult humans, exposure of 150° F. water for two seconds or exposure of 140° F. water for six second or exposure of 130° F. water for thirty seconds or exposure of 120° F. for five minutes—may cause third degree burns; and this of course may vary by skin thickness, subcutaneous fat thickness, extent of subcutaneous vascularization, and heart rate. Higher subcutaneous vascularization and/or higher heart rates may help to facilitate faster dissipation of thermal energy (because blood is mostly water and water has good heat capacity).

In some embodiments, the operating temperature (of the heat transfer element/medium 3907) and the duration of such thermal exposure may be set and/or controlled such as to avoid harm, damage, burns, hypothermia, heat stroke, heat exhaustion, and/or the like to the subject 3905. In some embodiments, step 4005 may progress to step 4007.

Continuing discussing FIG. 40, in some embodiments, step 4007 may be a step of ceasing (stopping) method 4000 if the step 4005 duration runs long enough; the temperature of the heat transfer element/medium 3907 falls outside of the predetermined temperature range; the (surface) temperature of the portion 3909 of the subject 3905 is excessive for too long a period of time.

FIG. 41 may be a block diagram of a given thermal delivery device 3911 showing at least some elements of the given thermal delivery device 3911. In some embodiments, a given thermal delivery device 3911 may be configured to provide: heating and/or cooling to portion 3909: only cooling to portion 3909; only heating to portion 3909; portions thereof; combinations thereof; and/or the like. In some embodiments, at a minimum, a given thermal delivery device 3911 may comprise at least one of heating and/or cooling means 4109, cooling means 4107, and/or heating means 4105, and a skin/body portion contact means 4111.

Continuing discussing FIG. 41, in some embodiments, depending upon the nature of the given thermal delivery device 3911 and its associated heat transfer member(s), medium(s), and/or element(s) 3907, then that thermal delivery device 3911 may also comprise the associated heat transfer member(s), medium(s), and/or element(s) 3907. In some embodiments, when the associated heat transfer member(s), medium(s), and/or element(s) 3907 may be a solid, a gel, beads, portions thereof, combinations thereof, and/or the like, then the associated heat transfer member(s), medium(s), and/or element(s) 3907 may a part of the given thermal delivery device 3911; and as such, then that given thermal delivery device 3911 may comprise that associated heat transfer member(s), medium(s), and/or element(s) 3907. For example, and without limiting the scope of the present invention, in handheld conformable bladder thermal delivery device 3400; in headband thermal delivery device (s) and/or in cheek thermal delivery device(s) from U.S. provisional patent application 63/390,926 filed Jul. 20, 2022, by the same inventor (John Richard Taylor) as the present patent application, whose disclosures are incorporated by reference herein as if fully set forth herein, then the associated heat transfer member(s), medium(s), and/or element(s) 3907 may be part of that given thermal delivery device 3911.

Whereas, in other embodiments, the given thermal delivery device 3911 and its associated heat transfer member(s), medium(s), and/or element(s) 3907, that given thermal delivery device 3911 may not comprise the associated heat transfer member(s), medium(s), and/or element(s) 3907 as part of that given thermal delivery device 3911. For example, and without limiting the scope of the present invention, when the given thermal delivery device 3911 is soaking-device 100 and/or the Hydroeffacer face soaking device (see e.g., U.S. Pat. No. 10,667,990), then the associated heat transfer member(s), medium(s), and/or element(s) 3907 may be an immersion liquid (e.g., immersion-liquid 180), such as, but not limited to, water; and that soaking-device 100 and/or Hydroeffacer face soaking device may not comprise the immersion liquid (e.g., immersion-liquid 180) (water); rather, that immersion liquid (e.g., immersion-liquid 180) (water) may be added to and/or used with that soaking-device 100 and/or Hydroeffacer face soaking device during intended/normal use, as the associated heat transfer member(s), medium(s), and/or element(s) 3907. Such a scenario may also be the scenario for whole head immersion thermal delivery device(s) and/or face immersion thermal delivery device(s) from U.S. provisional patent application 63/390,926 filed Jul. 20, 2022, by the same inventor (John Richard Taylor) as the present patent application, whose disclosures are incorporated by reference herein as if fully set forth herein; i.e., each of these given thermal delivery devices 3911 may use an immersion liquid (such as, but not limited, to water) as its associated heat transfer member(s), medium(s), and/or element(s) 3907 that gets added to the given thermal delivery device during intended use. However, in still other embodiments, when the immersion liquid includes (proprietary) ingredients (additives), then the associated heat transfer member(s), medium(s), and/or element(s) 3907 may be a part of that given thermal delivery device 3911 and/or part of a system and/or a method that utilizes that associated heat transfer member(s), medium(s), and/or element(s) 3907 with the added ingredients (additives).

Continuing discussing FIG. 41, in some embodiments, skin/body portion contact means 4111 may be a portion of a given thermal delivery device 3911 that directly physically (removably) contacts (touches) skin and/or a body portion 3909 of subject 3905 (user 190). In some embodiments, skin/body portion contact means 4111 may be a portion of a given thermal delivery device 3911 that directly physically (removably) contacts (touches) skin and/or a body portion 3909 of subject 3905 (user 190) and that is involved in heat/cool transfer to skin and/or a body portion 3909 of subject 3905 (user 190). In some embodiments, heat transfer member(s), medium(s), and/or element(s) 3907 and skin/body portion contact means 4111 may refer to a same structure, part, component, element, portion thereof, combinations thereof, and/or the like of a given thermal delivery device 3911; and in such embodiments, then reference numerals 3907 and 4111 may be used interchangeably. In some embodiments, when heat transfer member(s), medium(s), and/or element(s) 3907 may be a solid, a gel, beads, portions thereof, combinations thereof, and/or the like, then heat transfer member(s), medium(s), and/or element(s) 3907 may be a same structure, part, component, element, portion thereof, combinations thereof, and/or the like with respect to skin/body portion contact means 4111. For example, and without limiting the scope of the present invention, (conformable) bladder 3405 (of handheld-thermal-device 3400) may be an example of both skin/body portion contact means 4111 and of heat transfer member(s), medium(s), and/or element(s) 3907. Whereas, and in contrast, with respect to soaking-device 100, there the heat transfer member(s), medium(s), and/or element(s) 3907 may be the immersion-liquid 180 and there may be no skin/body portion contact means 4111 that is involved in thermal heat/cool transfer (but there may be skin/body portion contact means 4111 used in other uses, such as headrest 1800 or mouthpiece 1705).

Continuing discussing FIG. 41, in some embodiments, heating and/or cooling means 4109 may be configured to provide heating and/or cooling to portion 3909, via heat transfer member(s), medium(s), and/or element(s) 3907 and/or via skin/body portion contact means 4111. In some embodiments, heating and/or cooling means 4109 may be one or more of: a heater using electrical resistance, a heater using inductance, resistive heating; inductive heating; an emitter of electromagnetic (EM) radiation; an transducer of EM radiation; an electrode; a radiation source; a light source; a heat pump; an ultrasound source; a vibration source; a condenser; a compressor; a refrigerator; a chiller; a freezer; a Peltier circuit; a solid state heating/cooling circuit; a blower; a fan; a radiator; a heat sink; a cooling tower; a pump; a heating and/or a cooling coil; a heat exchanger; a predetermined chemical reaction configured for heating or for cooling; a heat pack; a heated heat pack (e.g., heated via a microwave and/or an oven); a cold pack; an ice pack; a frozen cold pack; a chemical based heat pack; a chemical based cold pack; (water) ice; dry ice; cold water; cold liquid; cool water; cool liquid; hot water; hot liquid; warm water; warm liquid; hot air; warm air; cold air; cool air; dry air; humid air; portions thereof; combinations thereof; and/or the like. In some embodiments, the emitter, the transducer, the electrode, the radiation source, the light source, and/or the like, may emit radiation (of a predetermined wavelength/frequency of EM radiation) that in turn may heat the heat transfer element/medium. In some embodiments, the heat pump, the condenser, the compressor, the refrigerator, the chiller, the freezer, the pump, and/or the like may be used in a heating or a cooling cycle that utilizes repeated compression and expansion of a heat transfer gas/fluid (such as, but not limited to, a refrigerant, a common refrigerant, and/or the like). In some embodiments, the refrigerant may be selected from one or more of: water, a predetermined HFC (hydrofluorocarbon), R134A HFC (norflurane or Freon 134A), R744 CO2, R717 ammonia, a predetermined HCFC (hydrochlorofluorocarbon), R2, R123, R124, R151, a predetermined HCS (hydrocarbon), R600A (isobutene), R290 (propane), R407C, R404A, R410A, R448A, R449A, Freon, ethylene glycol, portions thereof, combinations thereof, and/or the like. In some embodiments, this heat transfer gas/fluid (e.g., refrigerant) may be an example of the heat transfer element/medium 3907.

Continuing discussing FIG. 41, in some embodiments, cooling means 4107 may be configured to provide cooling to portion 3909, via heat transfer member(s), medium(s), and/or element(s) 3907 and/or via skin/body portion contact means 4111. In some embodiments, cooling means 4107 may one or more of: a heat pump; a condenser; a compressor; a refrigerator; a chiller; a freezer; a Peltier circuit; a solid state heating/cooling circuit; a blower; a fan; a radiator; a heat sink; a cooling tower; a pump; a heating and/or a cooling coil; a heat exchanger; a predetermined chemical reaction configured for cooling; a cold pack; a frozen cold pack; an ice pack; a chemical based cold pack; (water) ice; dry ice; cold water; cold liquid; cool water; cool liquid; cold air; cool air; dry air; humid air; portions thereof; combinations thereof; and/or the like. In some embodiments, the heat pump, the condenser, the compressor, the refrigerator, the chiller, the freezer, the pump, and/or the like may be used in a heating or a cooling cycle that utilizes repeated compression and expansion of a heat transfer gas/fluid (such as, but not limited to, a refrigerant, a common refrigerant, and/or the like). In some embodiments, the refrigerant may be selected from one or more of: water, a predetermined HFC (hydrofluorocarbon), R134A HFC (norflurane or Freon 134A), R744 CO2, R717 ammonia, a predetermined HCFC (hydrochlorofluorocarbon), R2, R123, R124, R151, a predetermined HCS (hydrocarbon), R600A (isobutene), R290 (propane), R407C, R404A, R410A, R448A, R449A, Freon, ethylene glycol, portions thereof, combinations thereof, and/or the like. In some embodiments, this heat transfer gas/fluid (e.g., refrigerant) may be an example of the heat transfer element/medium 3907.

Continuing discussing FIG. 41, in some embodiments, heating means 4105 may be configured to provide heating to portion 3909, via heat transfer member(s), medium(s), and/or element(s) 3907 and/or via skin/body portion contact means 4111. In some embodiments, heating means 4105 may one or more of: a heater using electrical resistance, a heater using inductance, resistive heating; inductive heating; an emitter of electromagnetic (EM) radiation; an transducer of EM radiation; an electrode; a radiation source; a light source; a heat pump; an ultrasound source; a vibration source; a condenser; a compressor; a Peltier circuit; a solid state heating/cooling circuit; a blower; a fan; a radiator; a heat sink; a pump; a heating and/or a cooling coil; a heat exchanger; a predetermined chemical reaction configured for heating; a heat pack; a heated heat pack (e.g., heated via a microwave and/or an oven); a chemical based heat pack; hot water; hot liquid; warm water; warm liquid; hot air; warm air; dry air; humid air; portions thereof; combinations thereof; and/or the like. In some embodiments, the emitter, the transducer, the electrode, the radiation source, the light source, and/or the like, may emit radiation (of a predetermined wavelength/frequency of EM radiation) that in turn may heat the heat transfer element/medium. In some embodiments, the heat pump, the condenser, the compressor, the refrigerator, the chiller, the freezer, the pump, and/or the like may be used in a heating or a cooling cycle that utilizes repeated compression and expansion of a heat transfer gas/fluid (such as, but not limited to, a refrigerant, a common refrigerant, and/or the like). In some embodiments, the refrigerant may be selected from one or more of: water, a predetermined HFC (hydrofluorocarbon), R134A HFC (norflurane or Freon 134A), R744 CO2, R717 ammonia, a predetermined HCFC (hydrochlorofluorocarbon), R2, R123, R124, R151, a predetermined HCS (hydrocarbon), R600A (isobutene), R290 (propane), R407C, R404A, R410A, R448A, R449A, Freon, ethylene glycol, portions thereof, combinations thereof, and/or the like. In some embodiments, this heat transfer gas/fluid (e.g., refrigerant) may be an example of the heat transfer element/medium 3907.

Continuing discussing FIG. 41, in some embodiments, heating and/or cooling means 4109, cooling means 4107, and/or heating means 4105 may be located externally, internally, partially externally and partially internally, with respect to an exterior surface of thermal delivery device 3911.

Continuing discussing FIG. 41, in some embodiments, skin/body portion contact means 4111 may be a portion of thermal delivery device 3911 that may be configured to contain heat transfer member(s), medium(s), and/or element(s) 3907 and/or to directly transfer at least some of the heat/cold from heating and/or cooling means 4109, cooling means 4107, and/or heating means 4105 to portion 3909. In some embodiments, skin/body portion contact means 4111 may in direct physical contact with at least some portions of: heat transfer member(s), medium(s), and/or element(s) 3907; portion 3909; heating and/or cooling means 4109; cooling means 4107; heating means 4105; portions thereof; combinations thereof; and/or the like.

For example, and without limiting the scope of the present invention, in some embodiments, when the given thermal delivery device 3911 may be soaking-device 100; the Hydr-effacer face soaking device (see e.g., U.S. Pat. No. 10,667,990); whole head immersion thermal delivery device(s) and/or face immersion thermal delivery device(s) from U.S. provisional patent application 63/390,926 filed Jul. 20, 2022, by the same inventor (John Richard Taylor) as the present patent application, whose disclosures are incorporated by reference herein as if fully set forth herein, then skin/body portion contact means 4111 may be a vessel configured to confine, retain, and/or house an immersion liquid (such as, but not limited to, water) as the associated heat transfer member(s), medium(s), and/or element(s) 3907 for that given thermal delivery device 3911.

For example, and without limiting the scope of the present invention, in some embodiments, when the given thermal delivery device 3911 may be handheld conformable bladder thermal delivery device 3400; headband thermal delivery device(s), and/or cheek thermal delivery device(s) from U.S. provisional patent application 63/390,926 filed Jul. 20, 2022, by the same inventor (John Richard Taylor) as the present patent application, whose disclosures are incorporated by reference herein as if fully set forth herein, then skin/body portion contact means 4111 may be a portion of the given thermal delivery device 3911 that is configured to come into direct physical contact with portion 3909 and to transfer at least some heat/cold from heating and/or cooling means 4109, 4107, and/or 4105 from that skin/body portion contact means 4111 to that portion 3909.

In some embodiments, the heating means 4105, cooling means 4107, and/or the heating and/or cooling means 4109 may be accomplished by heating and/or cooling the immersion liquid (e.g., immersion-liquid 180) away from (separately from and/or independently of) the given thermal delivery device 3911. For example, and without limiting the scope of the present invention, the immersion liquid (e.g., immersion-liquid 180) may be heated using an oven, a microwave, a pot, a kettle, and/or the like and then that heated immersion liquid (e.g., immersion-liquid 180) may be poured into the given thermal delivery device 3911. For example, and without limiting the scope of the present invention, the immersion liquid (e.g., immersion-liquid 180) may be cooled (chilled) by placing the immersion liquid (e.g., immersion-liquid 180) within a refrigerator or freezer and then that cooled (chilled) immersion liquid (e.g., immersion-liquid 180) may be poured into the given thermal delivery device 3911. For example, and without limiting the scope of the present invention, the immersion liquid (e.g., immersion-liquid 180) may be cooled (chilled) by placing ice and/or ice packs into the immersion liquid (e.g., immersion-liquid 180).

FIG. 41 may show a block diagram that also shows at least some hardware (electronic) components/circuitry of a given thermal delivery device 3911. FIG. 41 may depict a block diagram showing some main/sub-hardware elements for a given thermal delivery device 3911. In some embodiments, at least some electronics/circuitry aspects of a given thermal delivery device 3911 may be located: internally within the given thermal delivery device 3911; externally outside of the given thermal delivery device 3911; on an exterior surface of the given thermal delivery device 3911; portions thereof; combinations thereof; and/or the like. In some embodiments, at least some electronics/circuitry of the given thermal delivery device 3911 may be a computer.

Continuing discussing FIG. 41, in some embodiments, a given thermal delivery device 3911 may comprise be one or more circuits. In some embodiments, the given thermal delivery device 3911 may comprise one or more printed circuit board(s) (PCB(s)). In some embodiments, the given thermal delivery device 3911 may comprise one or more computer/electronics chip(s). In some embodiments, at least some of the electronics of the given thermal delivery device 3911 may comprise one or more of the following sub-hardware elements (components): Processor(s) 4101, Memory 4103, I/O Means 4113, Power Supply 4117*a*, I/O for External Communications 4115, connecting wiring (cables), bus, portions thereof, combinations thereof, and/or the like. "I/O" herein may refer to "inputs/outputs" as is commonly known in the computing and electronics industries. In some embodiments, Processor(s) 4101, Memory 4103, I/O Means 4113, Power Supply 4117*a*, and I/O for External Communications 4115, connecting wiring (cables), bus, portions thereof, combinations thereof, and/or the like may function as a computer of the given thermal delivery device 3911. In some embodiments, the one or more Processor(s) 4101 may be electrically and/or optically coupled (e.g., via wiring, cabling, bus, and/or the like) with the one or more Memory 4103, one or more I/O for External Communications 4115, I/O Means 4113, and Power Supply 4117*a*. In some embodiments, at least some of Processors 4101, one or more Memory 4103, one or more I/O for External Communications 4115, I/O Means 4113, and/or Power Supply 4117*a* may be operationally linked with one another, such as via electrical (and/or optical) wired connections.

Continuing discussing FIG. 41, in some embodiments, Processor(s) 4101 may be one or more processors, including one or more central processors and/or one or more processors for graphics. In some embodiments, Processor(s) 4101 may be in communication with Memory 4103. In some embodiments, Processor(s) 4101 may be in communication with I/O for External Communications 4115. In some embodiments, Processor(s) 4101 may be in communication with I/O Means 4113. In some embodiments, Processor(s) 4101 may be in communication with Power Supply 4117*a*. In some embodiments, Processor(s) 4101 may be in communication with heating and/or cooling means 4109, cooling means 4107, heating means 4105, portions thereof, combinations thereof, and/or the like. In some embodiments, such communications may be facilitated via wired connections for electrical (and/or optical) communications. In some embodiments, Processor 4101 may receive electrical power necessary for operations from Power Supply 4117*a*. In some embodiments, Processor(s) 4101 may at least partially instruct and/or control heating and/or cooling means 4109, cooling means 4107, heating means 4105, Memory/Storage 4103, I/O Means 4113, Power Supply 4117*a*, External Communications 4115, portions thereof, combinations thereof, and/or the like.

Continuing discussing FIG. 41, in some embodiments, the inputs of I/O Means 4113 of a given thermal delivery device 3911 may be one or more inputs selected from: a remote-control; a keypad; a keyboard; a touchscreen; temperature thermocouple(s); temperature sensor(s); temperature probe(s); temperature thermometer(s); short circuit sensor (s); kill switch; circuit breaker(s); sensor(s); external motion sensor(s); internal movement sensor (e.g., accelerometer, GPS-module, and/or the like); button(s); switches; a stylus; a mouse; a trackball; a touchpad; a lever; slide(s); dial(s); knob(s); camera(s) (external and/or internal); motion detector(s); hardwired electrical power ports (e.g., a USB port or the like); hardwired data ports (e.g., a USB port or the like); incoming communications received via I/O for External Communications 4115; microphone(s); portions thereof; combinations thereof; and/or the like.

Continuing discussing FIG. 41, in some embodiments, the outputs of I/O Means 4113 of a given thermal delivery device 3911 may be one or more outputs selected from: command(s) and/or instruction(s) for energizing heating and/or cooling means 4109, cooling means 4107, and/or heating means 4105 for heating and/or cooling; command(s) and/or instruction(s) for ceasing heating and/or cooling means 4109, cooling means 4107, and/or heating means 4105 for stopping heating and/or cooling; light(s) (e.g., light emitting diode(s) [LEDs]); information displayed on a monitor, a screen (including a touchscreen), or a display; liquid crystal display (LCD); readout(s); speaker(s); buzzer(s); bell(s); whistle(s); alarm(s); printout(s); printer(s); outgoing information transmitted via the hardwired port (e.g., a USB port or the like); outgoing information transmitted via I/O for External Communications 4115; pump(s) (such as, pump 3453); portions thereof; combinations thereof; and/or the like.

Continuing discussing FIG. 41, in some embodiments, Processor(s) 4101 may execute a computer program known as an operating system (e.g., a Microsoft Windows operating system, a Linux operation system, an Apple and/or Macintosh operating system, a mobile computing device operating system, any other suitable operating system, portion thereof, combinations thereof, and/or the like) and/or firmware which may control the execution of other computer programs (e.g., application programs); and may provide for scheduling, input/output (I/O) and other device control, accounting, compilation, storage assignment, data management, memory management, communication; and/or dataflow control. Collectively, Processor(s) 4101 and its operating system/firmware may define a computer platform for which the application programs and other computer program languages may be written in. In some embodiments, Processor(s) 4101 may also execute one or more computer programs to implement various functions and/or methods of the present invention, such as, but not limited to, heating and/or cooling software. These computer programs may be written in any type of computer program language, including, but not limited to, a procedural programming language, object-oriented programming language, macro language, portion thereof, combinations thereof, and/or the like.

These computer programs, including the operating system/firmware, may be stored in Memory 4103*a* and/or in (e.g., non-transitorily stored) Electronic Storage 4103*b*. Note, reference numeral "4103" without the "a" or the "b" may refer to Memory 4103*a*, Electronic Storage 4103*b*, or both Memory 4103*a* and Electronic Storage 4103*b*. Memory 4103 may refer to Memory 4103*a*, Electronic Storage 4103*b*, or both Memory 4103*a* and Electronic Storage 4103*b*. Memory 4103 may store (hold) information on a volatile or non-volatile medium, and may be fixed and/or removable. Memory 4103*a* may refer to volatile computer memory, such as, but not limited to RAM (random access memory) (or DRAM or the like); whereas, Electronic Storage 4103*b* may refer to non-volatile and non-transitory storage (such as, but not limited to, a hard drive, an optical drive, a SSD (solid state drive), a spinning drive, a backup drive, a tape drive, a magnetic drive, and/or the like). Memory 4103 may include a tangible computer readable and computer writable non-volatile recording medium, on which signals are stored that define a computer program or information to be used by the computer program. The recording medium may, for example, be disk memory, flash memory, and/or any other article(s) of manufacture usable to record and store information (in a non-transitory fashion). In some embodiments, in operation, Processor(s) 4101 may cause(s) data to be read from the nonvolatile recording medium (e.g., Electronic Storage 4103*b*) into a volatile memory (e.g., a random-access memory, or RAM) (e.g., Memory 4103*a*) that may allow for more efficient (i.e., faster) access to the information by the Processor(s) 4101 as compared against the non-volatile recording medium (e.g., Electronic Storage 4103*b*). The Processor(s) 4101 may manipulate(s) the data within integrated circuit memory and may then copy the data to the non-volatile recording medium (e.g., Electronic Storage 4103*b*) after processing may be completed. A variety of mechanisms are known for managing data movement between the nonvolatile recording medium (e.g., Electronic Storage 4103*b*) and the integrated circuit memory element (e.g., Memory 4103*a*), and the invention is not limited to any mechanism, whether now known or later developed. The invention is also not limited to a particular processing unit (e.g., Processor 4101) or storage unit (e.g., Memory 4103).

In some embodiments, at least some step(s) and method(s) discussed herein and as depicted in the figures may be implemented as non-transitory computer-readable medium including codes executable by a processor, such as Processor(s) 4101. That is, such non-transitory computer-readable medium may be the one or more Electronic Storage 4103*b* units. That is, such a processor may be Processor(s) 4101; or alternatively, Processor(s) 4101 may comprise such a processor.

Continuing discussing FIG. 41, in some embodiments, Processor(s) 4101 may also be in communication with I/O for External Communications 4115. Processor(s) 4101 may control I/O for External Communications 4115, depending upon the instructions that Processor(s) 4101 may be processing/executing. I/O for External Communications 4115 may permit communication between a given thermal delivery device 3911 one or more of: a separate/different computer, a separate/different thermal delivery device 3911, a smartphone, a laptop, a tablet computer, a server (computer), a router, a network switch, a modem, network hardware, a gateway, a separate/different antenna, portions thereof, combinations thereof, and/or the like.

Continuing discussing FIG. 41, in some embodiments, I/O for External Communications 4115 may comprise one or more radios and/or antennas to facilitate wireless communications, such as WiFi (Wi-Fi), Bluetooth, ZigBee, cellular, RFID, NFC, a predetermined wireless communication protocol, combinations thereof, and/or the like. In some embodiments, I/O for External Communications 4115 may comprise at least one Bluetooth chipset and/or the like. In some embodiments, I/O for External Communications 4115 may comprise a network card and/or a network adapter. In some embodiments, I/O for External Communications 4115 may be a network card and/or a network adapter. In some embodiments, I/O for External Communications 4115 may be in wired and/or wireless communications with the Internet, WAN (wide area network), LAN (local area network), portions thereof, combinations thereof, and/or the like.

Continuing discussing FIG. 41, in some embodiments, Power Supply 4117*a* may be configured to provide electrical power to at least some of the main sub-hardware elements, electronics, circuits, portions thereof, combinations thereof, and/or the like of a given thermal computing device 3911. In some embodiments, Power Supply 4117*a* may comprise one or more batteries, capacitors, portions thereof, combinations thereof, and/or the like. In some embodiments, Power Supply 4117*a* may be one or more batteries. In some embodiments, such batteries of Power Supply 4117*a* may be solid state, electrolyte based, liquid based, portions thereof, combinations thereof, and/or the like. In some embodiments, Power Supply 4117*a* may be one or more rechargeable batteries. In some embodiments, Power Supply 4117*a* may be one or more backup batteries. In some embodiments, batteries of Power Supply 4117*a* may comprise graphene, lithium, sodium, combinations thereof, and/or the like. In some embodiments, Power Supply 4117*a* may be one or more AC/DC adapters or electrical power conditioners allowing thermal computing device 3911 to receive standardized AC (alternating current) electrical power from an external wired Power Source 4117*b* (such as, but not limited to, 120 volts AC, 220 volts AC, or 240 volts AC). In some embodiments, Power Supply 4117*a* may comprise one or more solar panels for generating electrical power, wherein such one or more solar panels may be located on an external surface of thermal computing device 3911 or located externally to thermal computing device 3911. In some embodiments, Power Source 4117*b* may be a power source that is external to and/or separate from thermal computing device 3911. In some embodiments, Power Source 4117*b* may be in the form of a wired external power supply that may be in operative communication with thermal computing device 3911. In some embodiments, Power Source 4117*b* may be in the form of a wired external power supply that may be in operative communication with Power Supply 4117*a* of thermal computing device 3911.

In some embodiments, Power Supply 4117*a* may comprise a wireless electrical power emitter (transmitter) in the form of a broad cast antenna (coil) (i.e., a first antenna [first coil]) located within tower 2700; and Power Supply 4117*a* may also comprise a wireless electrical power receiver (harvester) in the form of a receiving antenna (coil) (i.e., a second antenna [second coil]) located within (and/or attached to) rear-panel 105 and/or within (and/or attached to) side-panel 107. In this manner, when tower 2700 is removably attached to (installed at) rear-panel 105, then tower 2700, via this first antenna may provide wireless power to the second antenna of rear-panel 105 and/or of side-panel 107. In such embodiments, intermediary-power-cable 2713 may be omitted and/or optional.

The main sub-hardware elements, electronics, circuits, portions thereof, combinations thereof, and/or the like (such as, but not limited to, Processor(s) 4101, Memory 4103, Memory 4103*a*, Electronic Storage 4103*b*, I/O Means 4113, Power Supply 4117, and/or External Communications 4115) of a given thermal computing device 3911, including their workings and configurations, are well known in the relevant computing and electronics industries and such information is incorporated herein by reference.

Continuing discussing FIG. 41, in some embodiments, thermal delivery device 3911 may comprise one or more of: heat transfer member(s), medium(s), and/or element(s) 3907, heating and/or cooling means 4109, cooling means 4107, heating means 4105, skin/body portion contact means 4111, Processor(s) 4101, Memory 4103, Memory 4103*a*, Electronic Storage 4103*b*, I/O Means 4113, Power Supply 4117, Power Supply 4117*a*, External Communications 4115, portions thereof, combinations thereof, and/or the like. Note, some embodiments of thermal delivery device 3911 may not comprise the heat transfer member(s), medium(s), and/or element(s) 3907; e.g., when the associated heat transfer member(s), medium(s), and/or element(s) 3907 is an immersion liquid such as water without proprietary ingredients/additives. Note, some embodiments of thermal delivery device 3911 may not be electronic or may not have electronic components.

Figure 42:
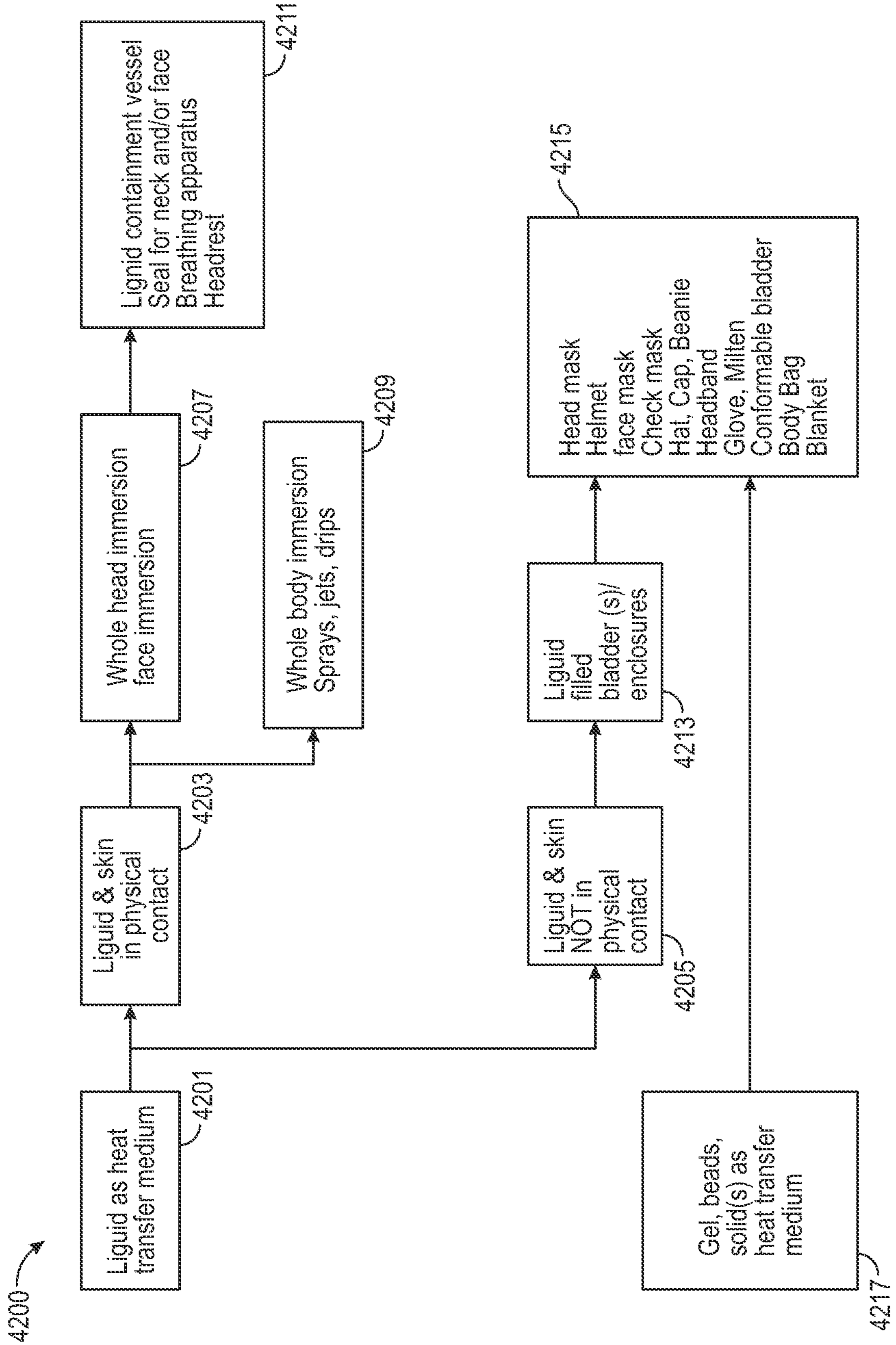
FIG. 42 is an organizational chart that shows a framework for organizing (categorizing) various thermal delivery devices discussed herein.

FIG. 42 is an organizational chart 4200 that shows a framework for organizing various thermal delivery devices 3911 discussed herein. FIG. 42 shows that at least some of the thermal delivery devices 3911 contemplated herein may be organized into two (2) separate categories, that of category 4201 of thermal delivery devices 3911 that use at least one liquid as the main heat transfer medium 3907; and category 4217 of thermal delivery devices 3911 that do not use at least one liquid as the main heat transfer medium 3907. In some embodiments, category 4217 may be of thermal delivery devices 3911 that use solid(s), gel, beads, portions thereof, combinations thereof, and/or the like as the heat transfer medium 3907. In some embodiments, category 4201 may be further sub-organized (sub-divided) into category 4203 and into category 4205. In some embodiments, category 4203 may be of thermal delivery devices 3911 wherein the heat transfer medium 3907 liquid (e.g., water) and the skin portion 3909 are in direct physical contact with each other during normal/intended use of the given thermal delivery device 3911. In some embodiments, category 4205 may be of thermal delivery devices 3911 wherein the heat transfer medium 3907 liquid and the skin portion 3909 are not in direct physical contact with each other during normal/intended use of the given thermal delivery device 3911. In some embodiments, category 4203 may be further sub-organized (sub-divided) into category 4207 and into category 4209. In some embodiments, category 4207 may be of thermal delivery devices 3911 wherein the heat transfer medium 3907 liquid (e.g., water) is an immersion liquid and the entire head 3909 or portion thereof (e.g., face 3909) may be immersed within this immersion liquid during normal/intended use of the given thermal delivery device 3911. Examples of thermal delivery devices 3911 that may be fall/fit within category 4207 may be: soaking-device 100; the Hydroeffacer face soaking device (see e.g., U.S. Pat. No. 10,667,990); whole head immersion thermal delivery device 3500; whole head and/or face immersion thermal delivery device(s) from U.S. provisional patent application 63/390,926 filed Jul. 20, 2022, by the same inventor (John Richard Taylor) as the present patent application, whose disclosures are incorporated by reference herein as if fully set forth herein; combinations thereof; and/or the like. In some embodiments, thermal delivery devices 3911 within category 4207 may share some characteristics, features, and/or elements as indicated by category 4211. In some embodiments, category 4211 may comprise one or more characteristics, features, and/or elements such as, but not limited to: a liquid (immersion fluid) containment vessel, a (primary) water-tight seal/gasket around the neck and/or around a periphery of the face, a breathing apparatus, and optionally in some embodiments, a headrest. In some embodiments, the liquid (immersion fluid) containment vessel may be single hulled, double hulled, and/or triple hulled. In some embodiments, one or more hulls of the liquid (immersion fluid) containment vessel may be fully or partially insulated.

Continuing discussing FIG. 42, in some embodiments, category 4209 may be of thermal delivery devices 3911 wherein the heat transfer medium 3907 liquid (e.g., water) is an immersion liquid and the entire body 3909 or portion thereof may be immersed within this immersion liquid during normal/intended use of the given thermal delivery device 3911; or portion 3909 (or a portion of portion 3909) may be wetted with a spray and/or a jet of the immersion liquid during normal/intended use of the given thermal delivery device 3911. Examples of thermal delivery devices 3911 that may be fall/fit within category 4209 may be: face/head thermal delivery device 3600; face/head thermal delivery device 3700; whole-body immersion thermal delivery device(s), glove device(s), mitten device(s), sleeping/body bag like device(s), and/or blanket like device(s) from U.S. provisional patent application 63/390,926 filed Jul. 20, 2022, by the same inventor (John Richard Taylor) as the present patent application, whose disclosures are incorporated by reference herein as if fully set forth herein; combinations thereof; and/or the like.

Continuing discussing FIG. 42, and referring to category 4205, in some embodiments, category 4205 may be of thermal delivery devices 3911 wherein the heat transfer medium 3907 liquid (such as, but not limited to, water) and the skin portion 3909 are not in direct physical contact with each other during normal/intended use of the given thermal delivery device 3911. In some embodiments, category 4205 may comprise a sub-category of category 4213, wherein in category 4213 may be of thermal delivery devices 3911 wherein the heat transfer medium 3907 liquid (such as, but not limited to, water) may be (entirely) housed, retained, and/or maintained within bladder(s) and/or enclosure(s), and it may be the exterior(s) of such liquid filled bladder(s) and/or enclosure(s) that come into direct physical contact with skin portion 3909 during normal/intended use of the given thermal delivery device 3911. In some embodiments, such liquid 3907 filled bladder(s) and/or enclosure(s) may be entirely sealed and/or closed off to prevent leakage of the heat transfer liquid 3907 during normal/intended use of the given thermal delivery device 3911. In some embodiments, such heat transfer liquid 3907 filled bladder(s) and/or enclosure(s) may be opened, filled, and/or drained of the heat transfer liquid 3907 during maintenance of the given thermal delivery device 3911.

Continuing discussing FIG. 42, in some embodiments, category 4205 and/or category 4213 may comprise category 4215. In some embodiments, category 4215 may be of thermal delivery devices 3911 such as, but not limited to: conformable bladder devices (e.g., handheld-thermal-device 3450); head mask device(s), helmet device(s), face mask device(s), cheek mask device(s), hat device(s), head cap device(s), beanie device(s), headband device(s), glove device(s), mitten device(s), body bag device(s), and/or blanket device(s) from U.S. provisional patent application 63/390,926 filed Jul. 20, 2022, by the same inventor (John Richard Taylor) as the present patent application, whose disclosures are incorporated by reference herein as if fully set forth herein; portions thereof; combinations thereof; and/or the like.

Continuing discussing FIG. 42, in some embodiments, category 4217 may be of thermal delivery devices 3911 that do not use at least one liquid as the main heat transfer medium 3907. In some embodiments, category 4217 may be of thermal delivery devices 3911 that use solid(s), gel, beads, portions thereof, combinations thereof, and/or the like as the heat transfer medium 3907. In some embodiments, category 4217 may comprise category 4215. In some embodiments, category 4215 may be of thermal delivery devices 3911 such as, but not limited to: conformable bladder devices (e.g., handheld-thermal-device 3400); head mask device(s), helmet device(s), face mask device(s), cheek mask device(s), hat device(s), head cap device(s), beanie device(s), headband device(s), glove device(s), mitten device(s), body bag device(s), and/or blanket device(s) from U.S. provisional patent application 63/390,926 filed Jul. 20, 2022, by the same inventor (John Richard Taylor) as the present patent application, whose disclosures are incorporated by reference herein as if fully set forth herein; portions thereof; combinations thereof; and/or the like. Note, category 4215 of category 4217 may differ from category 4215 of category 4205/4213 in that thermal delivery devices 3911 of category 4215 of category 4217 may be of thermal delivery devices 3911 that do not use at least one liquid as the main heat transfer medium 3907 and that instead use solid(s), gel, beads, portions thereof, combinations thereof, and/or the like as the heat transfer medium 3907.

Figure 43:
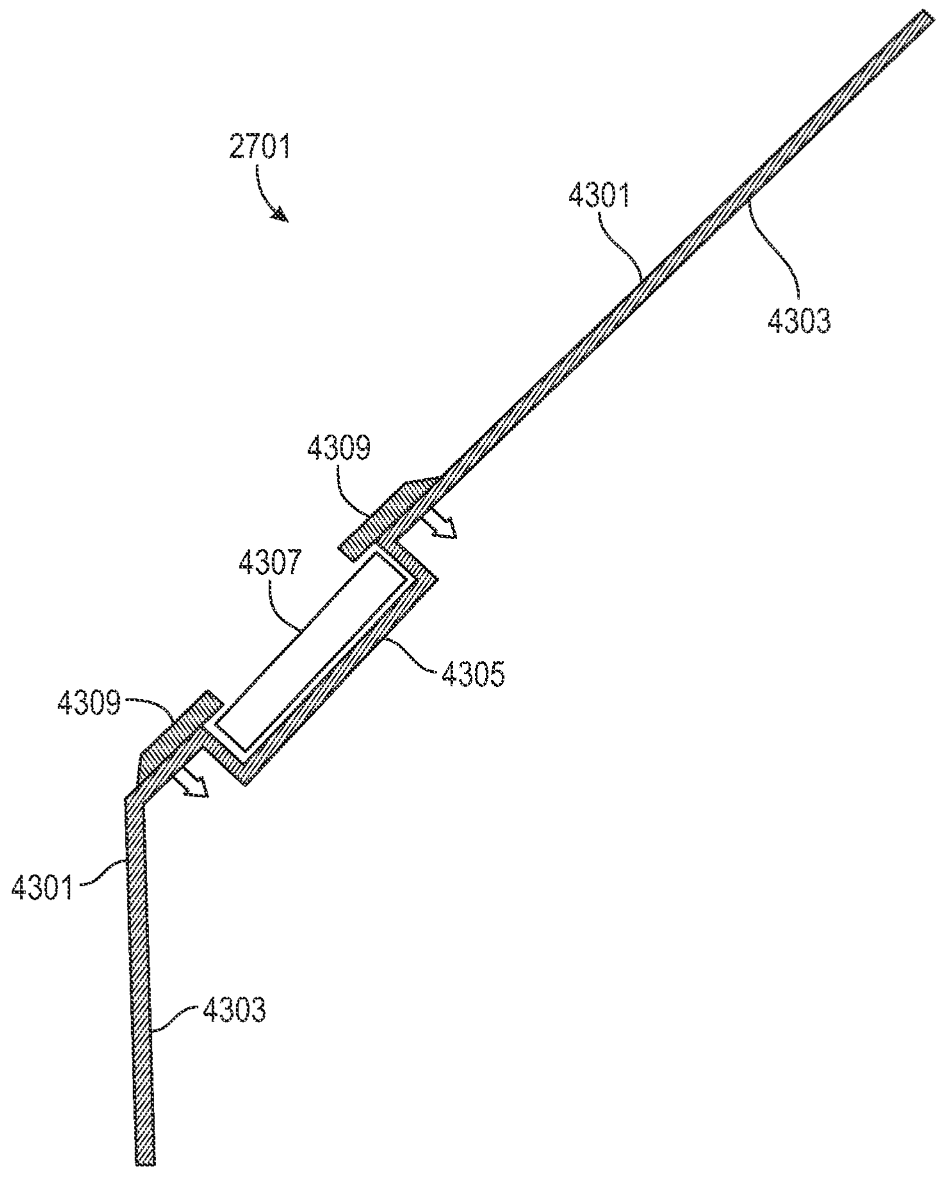
FIG. 43 is a cross-sectional drawing of a control-panel of a user-interface 2701 of a tower of a soaking-device.

FIG. 43 is a cross-sectional drawing of a control-panel of the user-interface 2701 of tower 2700. For example, and without limiting the scope of the present invention, this FIG. 43 cross-sectional view of the control-panel of the user-interface 2701 may be the control-panel shown in FIG. 29 or an embodiment thereof. In some embodiments, this control-panel of user-interface 2701 may be at least partially (to at least mostly) made from one or more: plastics, metals, and/or alloys. In some embodiments, this user-interface 2701 control-panel may comprise a panel-exterior 4301 and a panel-interior 4303. In some embodiments, panel-exterior 4301 and panel-interior 4303 may be disposed opposite from each other. In some embodiments, panel-exterior 4301 and panel-interior 4303 may be separated from each other by a thickness of this user-interface 2701 control-panel. In some embodiments, panel-exterior 4301 may be an exterior facing surface of this user-interface 2701 control-panel. In some embodiments, panel-interior 4303 may be an interior facing surface of this user-interface 2701 control-panel. In some embodiments, at least some of the I/O 4113 may be visible and/or accessed from panel-exterior 4301, such as, but not limited to, one or more of: a remote-control; a keypad; a keyboard; a screen; a display; a touchscreen; a button; a switch; a stylus; a mouse; a trackball; a touchpad; a lever; a slide; a dial; a knob; a camera; a motion detector; a hardwired electrical power port; a hardwired data port; portions thereof; combinations thereof; and/or the like. In some embodiments, this user-interface 2701 control-panel may comprise at least one tray (indentation/pocket) 4305. In some embodiments, at least one tray (indentation/pocket) 4305 may be located on and/or accessible from panel-exterior 4301. In some embodiments, tray (indentation/pocket) 4305 may be a tray, an indentation, and/or a pocket located on panel-exterior 4301 and/or accessible from panel-exterior 4301 that is configured to removably hold at least one remote-control 4307. In some embodiments, remote-control 4307 may be configured to control various functions of thermal delivery device 3911 (e.g., soaking-device 100), such as, but not limited to, one or more of: lighting, heating, cooling, gas bubbles production, portions thereof, combinations thereof, and/or the like. In some embodiments, at least a portion of a top opening to tray (indentation/pocket) 4305 may be at least partially covered by one or more trim-elements 4309 (trim 4309) to help retain remote-control 4307 within its tray (indentation/pocket) 4305 when remote-control 4307 may not be in use; wherein in such embodiments, remote-control 4307 may be slid out (e.g., to the right or to the left of tower 2700) of tray (indentation/pocket) 4305 if handheld use may be desired. In some embodiments, panel-exterior 4301 may have various indicia marked thereon, such as, but not limited to, one or more of: a logo, a sticker, a label, an instruction; a QR code; a barcode; a 2D (two-dimensional) code; a code; a temperature marking; a time marking; a word; a warning; a brand; a range; a model number; a serial number; portions thereof; combinations thereof; and/or the like.

Figure 44A:
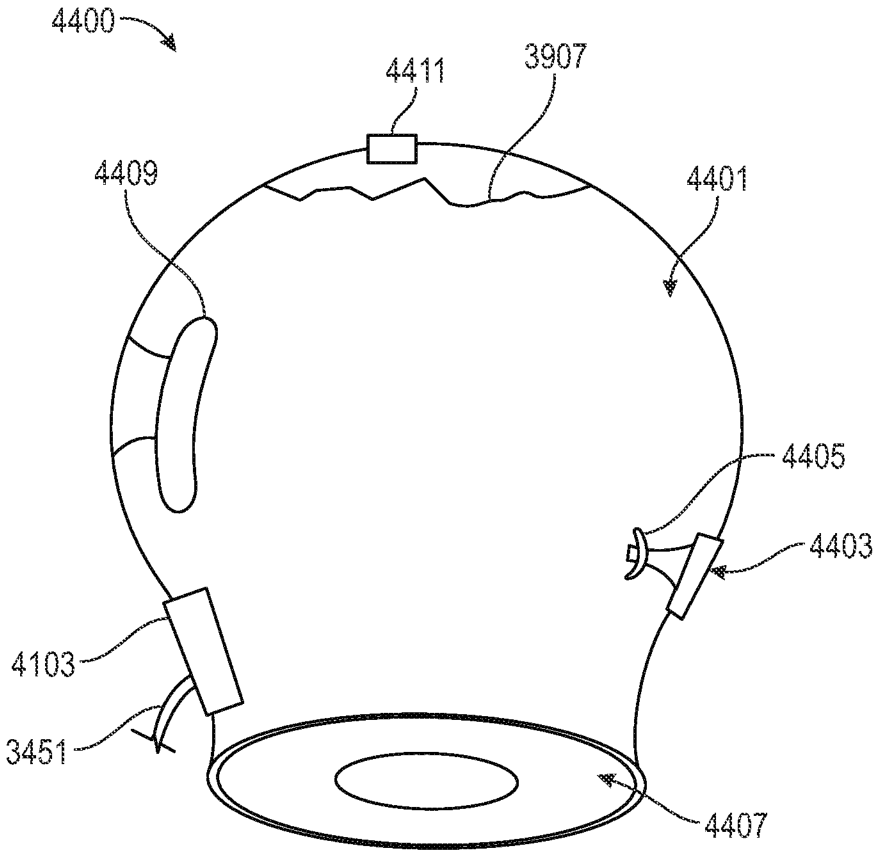
FIG. 44A shows a side bottom perspective view of a whole head immersion thermal delivery device.

FIG. 44A shows a side bottom perspective view of a whole head immersion thermal delivery device 4400. In some embodiments, whole head immersion thermal delivery device 4400 may be an example of a thermal delivery device 3911. FIG. 41 may be applicable to whole head immersion thermal delivery device 4400. In some embodiments, whole head immersion thermal delivery device 4400 may comprise at least some electronics of FIG. 41. In some embodiments, whole head immersion thermal delivery device 4400 may fall within category 4207. In some embodiments, whole head immersion thermal delivery device 4400 may be selected from category 4207. In some embodiments, with respect to whole head immersion thermal delivery device 4400, the heat transfer medium 3907 (heat transfer fluid 3907) may be an immersion fluid, such as, but not limited to, water (with or without various predetermined additives). In some embodiments, with respect to whole head immersion thermal delivery device 4400, portion 3909 of subject 3905 may be the whole head of that subject 3905 or a portion thereof. In some embodiments, whole head immersion thermal delivery device 4400 may comprise fluid containment vessel 4401, heating and/or cooling means 4109, breathing apparatus 4403, and neck gasket 4407. In some embodiments, whole head immersion thermal delivery device 4400 may comprise fluid containment vessel 4401, heating and/or cooling means 4109, breathing apparatus 4403, and neck gasket 4407 (circumferential-seal-for-neck 4407); and whole head immersion thermal delivery device 4400 may further comprise a headrest 4409, a port/valve 4411, and/or a cord/tube 3451. In some embodiments of whole head immersion thermal delivery device 4400, one or more of headrest 4409, port/valve 4411, and/or cord/tube 3451 may be optional.

Continuing discussing FIG. 44A, in some embodiments, fluid containment vessel 4401 may be configured to removably fit entirely over and/or surrounding a whole head 3909 (head 190) of subject 3905. In some embodiments, fluid containment vessel 4401 may be configured to contain, house, retain, and/or hold the immersion fluid 3907. In some embodiments, when fluid containment vessel 4401 may be removably attached to subject 3905 (user 190), immersion fluid 3907 may be located between whole head 3909 (head 191) and an interior of fluid containment vessel 4401. In some embodiments, fluid containment vessel 4401 may be a substantially hollow three-dimensional (3D) shape. In some embodiments, a shape of fluid containment vessel 4401 may be similar to a shape of a helmet. In some embodiments, a majority of fluid containment vessel 4401 may be made of one or more sidewalls and/or hulls. In some embodiments, the one or more sidewalls and/or hulls (of fluid containment vessel 4401) may be: waterproof, hydrophobic, solid, insulated, rigid, semi-rigid, thermally stable, portions thereof, combinations thereof, and/or the like. In some embodiments, the one or more sidewalls and/or hulls (of fluid containment vessel 4401) may be at least substantially (mostly) made from: a plastic, a thermoplastic, an injection molded plastic, an injection molded material, a 3D printed material, an extruded material, a metal, an alloy, glass, wood, a composite, a laminate, an elastomer, a rubber, silicone, portions thereof, combinations thereof, and/or the like. In some embodiments, plastics and/or the like may be more desirable as compared to glass, metal, and/or metal alloys for materials of construction for the one or more sidewalls and/or hulls (of fluid containment vessel 4401) because plastics are more insulating than glass, metal, and/or metal alloys; i.e., glass, metal, and/or metal alloys tend to act as thermal bridges for heat transfer. In some embodiments, a majority of the one or more sidewalls and/or hulls (of fluid containment vessel 4401) may be at least substantially optically clear, transparent, and/or translucent so that subject 3905 (user 190) may be able to see through the at least the portion/region of the one or more sidewalls and/or hulls. In some embodiments, at least a portion/region of the one or more sidewalls and/or hulls (of fluid containment vessel 4401) may be at least substantially optically clear, transparent, and/or translucent so that subject 3905 (user 190) may be able to see through the at least the portion/region of the one or more sidewalls and/or hulls. In some embodiments, the at least the portion/region of the one or more sidewalls and/or hulls may be configured to function/operate as a (closed) window. In some embodiments, at least other portions/regions of the one or more sidewalls and/or hulls (of fluid containment vessel 4401) may be opaque and/or not optically clear, transparent, and/or translucent. In some embodiments, a region of the one or more sidewalls and/or hulls (of fluid containment vessel 4401) may be configured to be removed very quickly to function as safety-breakaway(s) to very quickly drain the immersion fluid 3907 from within fluid containment vessel 4401 and/or to provide outside/exterior air directly to the mouth and/or nose of subject 3905 (user 190).

Continuing discussing FIG. 44A, in some embodiments, heating and/or cooling means 4109 may be configured to heat and/or to cool immersion fluid 3907 within fluid containment vessel 4401. In some embodiments, heating and/or cooling means 4109 may be configured to control, provide, and/or maintain a temperature of immersion fluid 3907 within fluid containment vessel 4401 within a predetermined range of temperatures and/or for a predetermined amount of time. In some embodiments, heating and/or cooling means 4109 may be an example of heating and/or cooling means 4109, cooling means 4107, or of heating means 4105. In some embodiments, heating and/or cooling means 4109 may be at least partially located: on an interior of fluid containment vessel 4401; within fluid containment vessel 4401; on fluid containment vessel 4401; attached to fluid containment vessel 4401; on an exterior of fluid containment vessel 4401; portions thereof; combinations thereof; and/or the like. In some embodiments, heating and/or cooling means 4109 may not have moving parts/components within fluid containment vessel 4401. In some embodiments, heating and/or cooling means 4109 may comprise heat exchange fins, a heat sink, and/or a fan/blower located outside of fluid containment vessel 4401 (located to an exterior of fluid containment vessel 4401). In some embodiments, heating and/or cooling means 4109 may be electrically powered, for example, by Power Supply 4117*a* and/or External Power Supply 4117*b*. In some embodiments, heating and/or cooling means 4109 may comprise one or more temperature probes, temperature sensors, thermocouples, thermometers, portions thereof, combinations thereof, and/or the like, that may be configured to sense a temperature of immersion fluid 3907 within fluid containment vessel 4401. In some embodiments, heating and/or cooling means 4109 may comprise at least one thermostat and/or be operatively connected to at least one thermostat, wherein the at least one thermostat may be configured to control a temperature of immersion fluid 3907 within fluid containment vessel 4401.

Continuing discussing FIG. 44A, in some embodiments, breathing apparatus 4403 may be configured to permit subject 3905 (user 190) to breathe outside air when the whole head 3909 (head 191) of subject 3905 (user 190) may be (removably) enclosed within fluid containment vessel 4401 and fluid containment vessel 4401 may be filled/contain immersion fluid 3907. In some embodiments, breathing apparatus 4403 may be a sealed passageway from an inside of fluid containment vessel 4401 to an exterior/outside of fluid containment vessel 4401, that may be configured for the movement/passage of respiratory gasses (e.g., air in and carbon dioxide out). In some embodiments, an exterior/outside portion of breathing apparatus 4403 may be attached to the one or more sidewalls and/or hulls of fluid containment vessel 4401. In some embodiments, an exterior/outside portion of breathing apparatus 4403 may be located on an exterior/outside portion of fluid containment vessel 4401. In some embodiments, an exterior/outside portion of breathing apparatus 4403 may be located on an exterior/outside portion of fluid containment vessel 4401 at a top of fluid containment vessel 4401. In some embodiments, breathing apparatus 4403 may comprise a mouthpiece 4405. In some embodiments, mouthpiece 4405 may be configured to be removably gripped by a mouth of subject 3905. In some embodiments, mouthpiece 4405 may be located on an interior/inside front of fluid containment vessel 4401.

Continuing discussing FIG. 44A, in some embodiments, neck gasket 4407 (circumferential-seal-for-neck 4407) may be configured to removably provide a watertight seal around a periphery of a neck of subject 3905 (user 190), when subject 3905 (user 190) may be wearing/using whole head immersion thermal delivery device 4400. In some embodiments, neck gasket 4407 may be substantially (mostly) planar annular ring shape of elastomeric material, with an outside diameter and an inside diameter. In some embodiments, the outside diameter (of neck gasket 4407) may be attached to a base of fluid containment vessel 4401. In some embodiments, the inside diameter (of neck gasket 4407) may be configured to removably attach to the periphery of the neck of subject 3905 (user 190), providing a watertight seal between the neck of subject 3905 (user 190) and neck gasket 4407. In some embodiments, the inside diameter (of neck gasket 4407) may be removably attached to the periphery of the neck of subject 3905 (user 190). In some embodiments, neck gasket 4407 may be stretched over the whole head 3909 of subject 3905 (user 190) (e.g., when taking whole head immersion thermal delivery device 4400 on or off). In some embodiments, the elastomeric material(s) and/or portion(s) of neck gasket 4407 may be made at least partially from one or more of: an elastomer, silicone, rubber, neoprene, a plastic, portions thereof, combinations thereof, and/or the like. In some embodiments, neck gasket 4407 (circumferential-seal-for-neck 4407) may be similar to the same as a neck gasket in a preexisting (prior art) dry suit.

Continuing discussing FIG. 44A, in some embodiments, headrest 4409 may be configured to provide a comfortable resting region for a rear/back portion of whole head 3909 (head 191) when subject 3905 (user 190) may be using whole head immersion thermal delivery device 4400 and laying on a back of subject 3905 (user 190) or when subject 3905 (user 190) may be resting their back against some surface. In some embodiments, headrest 4409 may be a cushion or the like. In some embodiments, headrest 4409 may comprise padding and/or foam. In some embodiments, headrest 4409 may be located on an inside/interior of fluid containment vessel 4401. In some embodiments, headrest 4409 may be located on an inside/interior of fluid containment vessel 4401 at a back/rear of fluid containment vessel 4401. In some embodiments, headrest 4409 may be attached to an inside/interior of fluid containment vessel 4401 at a back/rear of fluid containment vessel 4401. In some embodiments, headrest 4409 may be removably attached to an inside/interior of fluid containment vessel 4401 at a back/rear of fluid containment vessel 4401. In some embodiments, headrest 4409 may be removable from fluid containment vessel 4401. In some embodiments, positioning of headrest 4409 within fluid containment vessel 4401 may be adjustable by inclusion of an adjustment means. Some embodiments of whole head immersion thermal delivery device 4400 may or may not comprise a headrest 4409. In some embodiments, headrest 4409 may be optional with respect to thermal delivery device 4400 and/or with respect to a thermal delivery device 3911.

Continuing discussing FIG. 44A, in some embodiments, port/valve 4411 may be configured to fill and/or drain fluid containment vessel 4401 of the immersion fluid 3907; and/or to fill and/or drain fluid containment vessel 4401 with air (e.g., air may be an example of immersion fluid 3907). In some embodiments, fluid containment vessel 4401 may comprise one or more port(s)/valve(s) 4411. In some embodiments, port(s)/valve(s) 4411 may be located on a top, a side, and/or a bottom of fluid containment vessel 4401. In some embodiments, port(s)/valve(s) 4411 of fluid containment vessel 4401 may be openable and closeable. In some embodiments, port(s)/valve(s) 4411 of fluid containment vessel 4401 may function as plug(s). In some embodiments, port(s)/valve(s) 4411 may be threaded and/or barbed. In some embodiments, port(s)/valve(s) 4411 may be configured as safety-breakaway(s) to very quickly drain the immersion fluid 3907 from within fluid containment vessel 4401 and/or to provide outside/exterior air directly to the mouth and/or nose of subject 3905 (user 190).

Continuing discussing FIG. 44A, in some embodiments, cord(s)/tube(s) 3451 may be configured to function as an electrical cord to provide external electrical power to whole head immersion thermal delivery device 4400; and/or as a (hollow) tube for movement of immersion fluid 3907 (to and/or from fluid containment vessel 4401). In some embodiments, fluid containment vessel 4401 may comprise one or more cord(s)/tube(s) 3451. In some embodiments, at least some portion of cord(s)/tube(s) 3451 may be attached to fluid containment vessel 4401 in a watertight manner. In some embodiments, cord(s)/tube(s) 3451 may be: an electrical power cord of whole head immersion thermal delivery device 4400; and/or a hose for movement/passage of immersion fluid 3907. In some embodiments, cord(s)/tube(s) 3451 may be sheathed. In some embodiments, at least portions of multiple cords and/or tubes 3451 may be bundled together. In some embodiments, at least portions of multiple cords and/or tubes 3451 may be bundled together and sheathed.

Figure 44B:
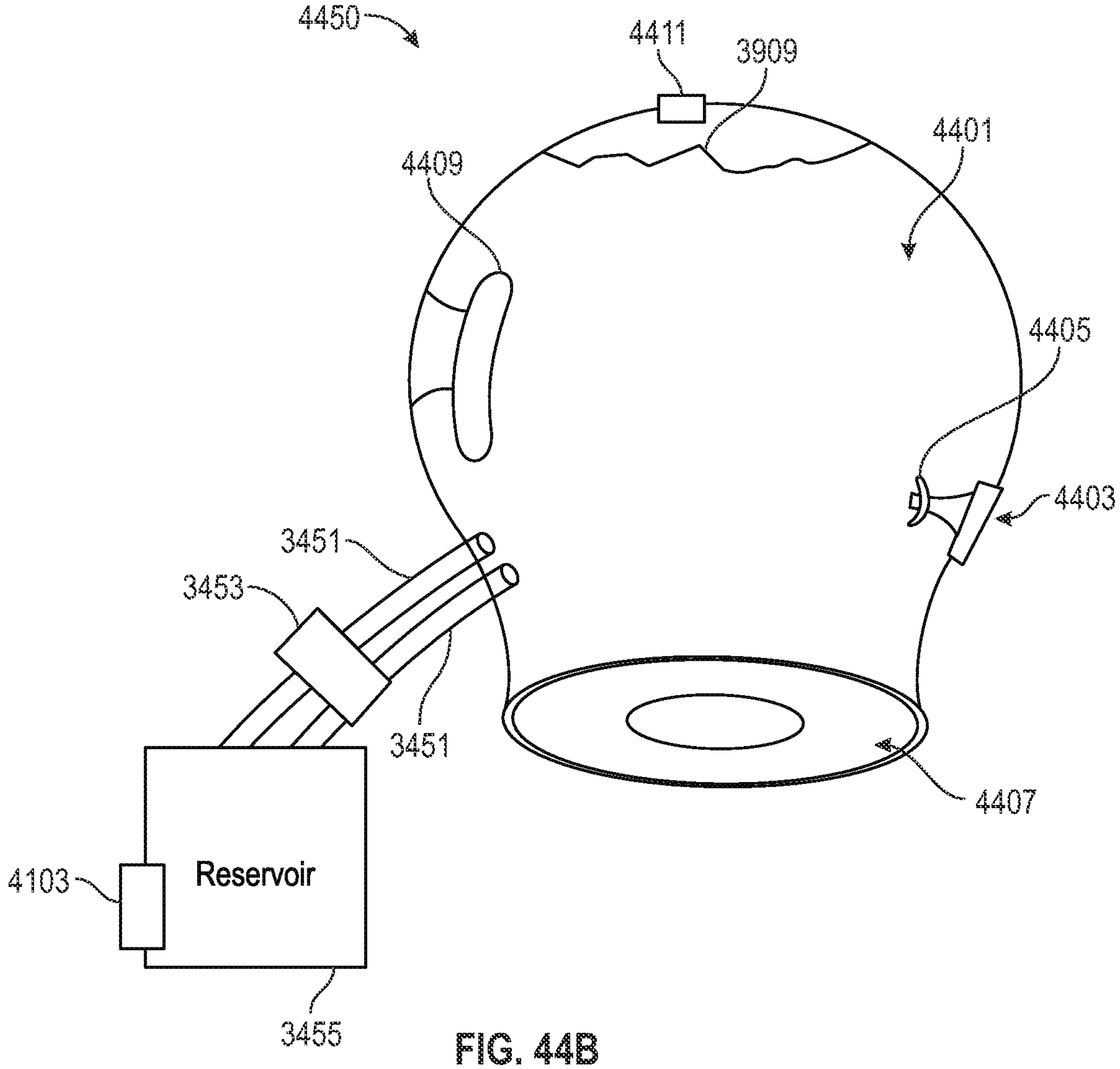
FIG. 44B shows a side bottom perspective view of a whole head immersion thermal delivery device.

FIG. 44B shows a side bottom perspective view of a whole head immersion thermal delivery device 4450. In some embodiments, whole head immersion thermal delivery device 4450 may be an example of a thermal delivery device 3911. FIG. 41 may be applicable to whole head immersion thermal delivery device 4450. In some embodiments, whole head immersion thermal delivery device 4450 may comprise at least some electronics of FIG. 41. In some embodiments, whole head immersion thermal delivery device 4450 may fall within category 4207. In some embodiments, whole head immersion thermal delivery device 4450 may be selected from category 4207. In some embodiments, with respect to whole head immersion thermal delivery device 4450, the heat transfer medium 3907 may be an immersion fluid, such as, but not limited to, water (with or without various predetermined additives). In some embodiments, with respect to whole head immersion thermal delivery device 4450, portion 3909 of subject 3905 (user 190) may be the whole head 191 of that subject 3905 (user 190) or a portion thereof. In some embodiments, whole head immersion thermal delivery device 4450 may comprise fluid containment vessel 4401, heating and/or cooling means 4109, breathing apparatus 4403, and seal (neck gasket) 4407. In some embodiments, whole head immersion thermal delivery device 4450 may comprise fluid containment vessel 4401, heating and/or cooling means 4109, breathing apparatus 4403, and seal (neck gasket) 4407; and whole head immersion thermal delivery device 4450 may further comprise one or more: a headrest 4409, a port/valve 4411, and/or a cord/tube 3451. In some embodiments of whole head immersion thermal delivery device 4450, one or more of headrest 4409, port/valve 4411, and/or cord/tube 3451 may be optional. In some embodiments, whole head immersion thermal delivery device 4450 may further comprise pump 3453, reservoir 3455, portions thereof, combinations thereof, and/or the like. In some embodiments, pump 3453 may be configured to pump the immersion fluid 3907 between (back and forth) from inside of fluid containment vessel 4401 and inside of reservoir 3455. In some embodiments, pump 3453 may be configured to pump and circulate the immersion fluid 3907 between (back and forth) from inside of fluid containment vessel 4401 and inside of reservoir 3455. In some embodiments, pump 3453 and/or reservoir 3455 may be located exteriorly (externally) from/of fluid containment vessel 4401. In some embodiments, pump 3453 may be disposed between fluid containment vessel 4401 and reservoir 3455. In some embodiments, pump 3453 may be located at least partially within reservoir 3455. In some embodiments, pump 3453 may be attached to fluid containment vessel 4401 and/or attached to reservoir 3455. In some embodiments, pump 3453 may be electrically powered. In some embodiments, pump 3453 may be electrically powered, for example, by Power Supply 4117*a* and/or External Power Supply 4117*b*. In some embodiments, pump 3453 may be configured to provide a predetermined minimum of head pressure. In some embodiments, pump 3453 may operate quietly and/or at low flowrates. In some embodiments, pump 3453 may be a medical grade and/or a food grade pump. In some embodiments, pump 3453 may not introduce pump grease, pump oils, and/or pump lubricants into the immersion fluid 3907. In some embodiments, tubing 3451 may operatively link pump 3453, fluid containment vessel 4401, and/or reservoir 3455. In some embodiments, reservoir 3455 may be configured to contain, house, retain, and/or hold at least some of the immersion fluid 3907. In some embodiments, reservoir 3455 may be a waterproof and/or an airtight container. In some embodiments, reservoir 3455 may comprise one or more port(s)/valve(s) 4411. In some embodiment, reservoir 3455 may comprise an inlet and an outlet. In some embodiments, the inlet and/or the outlet of reservoir 3455 may be configured to (removably) attach to tubing 3451. In some embodiments, heating and/or cooling means 4109 may be at least partially located: on an interior of reservoir 3455; within reservoir 3455; on reservoir 3455; attached to reservoir 3455; on an exterior of reservoir 3455; portions thereof; combinations thereof; and/or the like. See e.g., FIG. 44B.

Figure 44C:
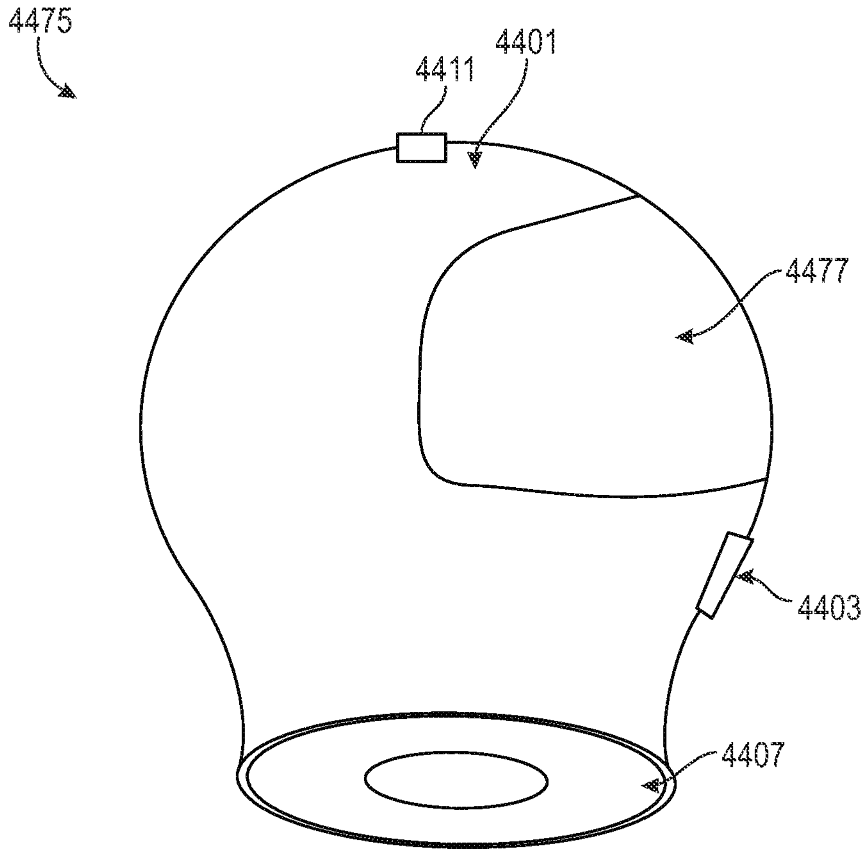
FIG. 44C shows a side bottom perspective view of a whole head immersion thermal delivery device.

FIG. 44C shows a side bottom perspective view of a whole head immersion thermal delivery device 4475. In some embodiments, whole head immersion thermal delivery device 4475 may be an example of a thermal delivery device 3911. FIG. 41 may be applicable to whole head immersion thermal delivery device 4475. In some embodiments, whole head immersion thermal delivery device 4475 may comprise at least some electronics of FIG. 41. In some embodiments, whole head immersion thermal delivery device 4475 may fall within category 4207. In some embodiments, whole head immersion thermal delivery device 4475 may be selected from category 4207. In some embodiments, with respect to whole head immersion thermal delivery device 4475, the heat transfer medium 3907 may be an immersion fluid, such as, but not limited to, water (with or without various predetermined additives). In some embodiments, with respect to whole head immersion thermal delivery device 4475, portion 3909 of subject 3905 (user 190) may be the whole head 191 of that subject 3905 (user 190) or a portion thereof. In some embodiments, whole head immersion thermal delivery device 4475 may comprise fluid containment vessel 4401, heating and/or cooling means 4109, breathing apparatus 4403, and seal (neck gasket) 4407. In some embodiments, whole head immersion thermal delivery device 4475 may comprise fluid containment vessel 4401, heating and/or cooling means 4109, breathing apparatus 4403, and seal (neck gasket) 4407; and whole head immersion thermal delivery device 4475 may further comprise a headrest 4409, a port/valve 4411, and/or a cord/tube 3451. In some embodiments of whole head immersion thermal delivery device 4475, one or more of headrest 4409, port/valve 4411, and/or cord/tube 3451 may be optional. In some embodiments, whole head immersion thermal delivery device 4475 may be at least substantially (mostly) the same as whole head immersion thermal delivery device 4400/4450, except in whole head immersion thermal delivery device 4475, fluid containment vessel 4401 may comprise at least one transparent viewing plate/window 4477. In some embodiments, transparent viewing plate/window 4477 may be a viewing plate/window of fluid containment vessel 4401 that may be configured to permit subject 3905 to see out of/from inside of fluid containment vessel 4401 to an exterior of fluid containment vessel 4401. In some embodiments, transparent viewing plate/window 4477 may be at least substantially (mostly) optically clear, transparent, and/or translucent, with respect to human vision. In some embodiments, transparent viewing plate/window 4477 may be made from plastic and/or glass. In some embodiments, transparent viewing plate/window 4477 may be single, double, or triple paned. In some embodiments, transparent viewing plate/window 4477 may be non-openable. In some embodiments, transparent viewing plate/window 4477 may be openable. In some embodiments, when transparent viewing plate/window 4477 may be openable, when transparent viewing plate/window 4477 may be closed, a watertight seal may exist as between transparent viewing plate/window 4477 and fluid containment vessel 4401. See e.g., FIG. 44C.

Figure 45:
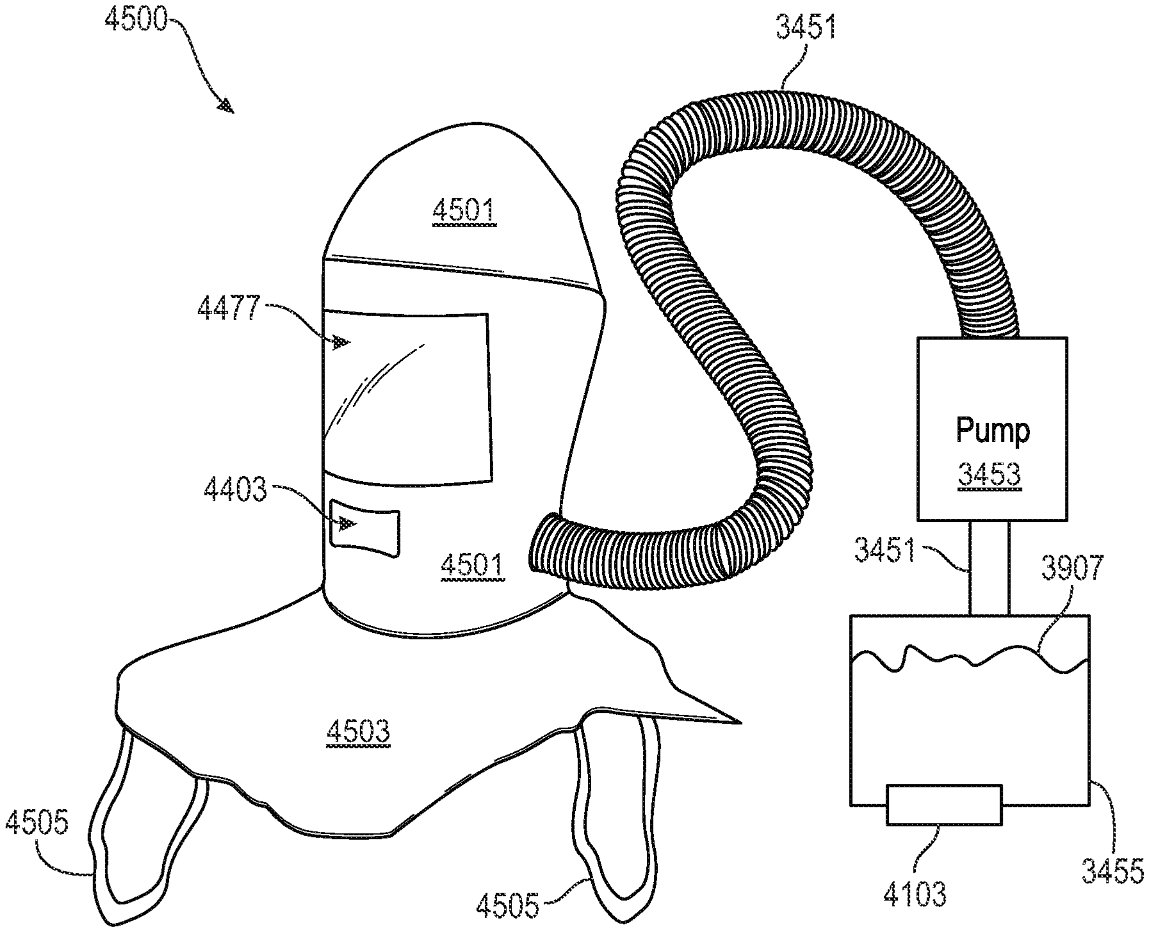
FIG. 45 shows a front side perspective view of a whole head immersion thermal delivery device.

FIG. 45 shows a front side perspective view of a whole head immersion thermal delivery device 4500. In some embodiments, whole head immersion thermal delivery device 4500 may be an example of a thermal delivery device 3911. FIG. 41 may be applicable to whole head immersion thermal delivery device 4500. In some embodiments, whole head immersion thermal delivery device 4500 may comprise at least some electronics of FIG. 41. In some embodiments, whole head immersion thermal delivery device 4500 may fall within category 4207. In some embodiments, whole head immersion thermal delivery device 4500 may be selected from category 4207. In some embodiments, with respect to whole head immersion thermal delivery device 4500, the heat transfer medium 3907 may be an immersion fluid, such as, but not limited to, water (with or without various predetermined additives). In some embodiments, with respect to whole head immersion thermal delivery device 4500, the heat transfer medium 3907 may be an immersion gas, such as, but not limited to, air and/or oxygen. In some embodiments, with respect to whole head immersion thermal delivery device 4500, portion 3909 of subject 3905 (user 190) may be the whole head 191 of that subject 3905 (user 190) or a portion thereof. In some embodiments, whole head immersion thermal delivery device 4500 may be similar to whole head immersion thermal delivery device 4400, whole head immersion thermal delivery device 4450, and/or whole head immersion thermal delivery device 4475, except containment vessel 4501 of whole head immersion thermal delivery device 4500 may be of a different shape (e.g., conical and/or pyramidal) as compared to fluid containment vessel 4401 (e.g., spherical and/or ellipsoid); containment vessel 4501 may be semi-rigid to flexible; and/or whole head immersion thermal delivery device 4500 may have shoulder cover 4503 and/or shoulder/armpit straps 4505. In some embodiments, whole head immersion thermal delivery device 4500 may comprise one or more of: containment vessel 4501, transparent viewing plate/window 4407, shoulder cover 4503, shoulder/armpit straps 4505, heating and/or cooling means 4109, breathing apparatus 4403, tubing 3451, pump 3453, reservoir 3455, portions thereof, combinations thereof, and/or the like. See e.g., FIG. 45.

Continuing discussing FIG. 45, in some embodiments, containment vessel 4501 may be configured to removably fit entirely over and/or surrounding a whole head 3909 (head 191) of subject 3905 (user 190). In some embodiments, containment vessel 4501 may be configured to contain, house, retain, and/or hold the immersion fluid 3907. In some embodiments, when containment vessel 4501 may be removably attached to subject 3905 (user 190), immersion fluid/gas 3907 may be located between whole head 3909 (head 191) and an interior of containment vessel 4501. In some embodiments, containment vessel 4501 may be a substantially hollow three-dimensional (3D) shape. In some embodiments, a shape of containment vessel 4501 may be similar to a shape of a helmet. In some embodiments, a shape of containment vessel 4501 may be at least substantially (mostly) cylindrical in shape with or without a pyramidal top. In some embodiments, a majority of containment vessel 4501 may be made of one or more sidewalls and/or hulls. In some embodiments, the one or more sidewalls and/or hulls (of containment vessel 4501) may be: waterproof, hydrophobic, solid, insulated, rigid, semi-rigid, flexible, thermally stable, portions thereof, combinations thereof, and/or the like. In some embodiments, the one or more sidewalls and/or hulls (of containment vessel 4501) may be at least substantially (mostly) made from: a plastic, a thermoplastic, an injection molded plastic, an injection molded material, a 3D printed material, an extruded material, a metal, an alloy, glass, wood, a composite, a laminate, an elastomer, a rubber, silicone, a fabric, a textile, portions thereof, combinations thereof, and/or the like. In some embodiments, plastics and/or the like may be more desirable as compared to glass, metal, and/or metal alloys for materials of construction for the one or more sidewalls and/or hulls (of containment vessel 4501) because plastics are more insulating than glass, metal, and/or metal alloys; i.e., glass, metal, and/or metal alloys tend to act as thermal bridges for heat transfer. In some embodiments, a majority of the one or more sidewalls and/or hulls (of containment vessel 4501) may be at least substantially optically clear, transparent, and/or translucent so that subject 3905 (user 190) may be able to see through the at least the portion/region of the one or more sidewalls and/or hulls. In some embodiments, at least a portion/region of the one or more sidewalls and/or hulls (of containment vessel 4501) may be at least substantially optically clear, transparent, and/or translucent so that subject 3905 (user 190) may be able to see through the at least the portion/region of the one or more sidewalls and/or hulls. In some embodiments, the at least the portion/region of the one or more sidewalls and/or hulls may be configured to function/operate as a (closed) window. In some embodiments, at least other portions/regions of the one or more sidewalls and/or hulls (of containment vessel 4501) may be opaque and/or not optically clear, transparent, and/or translucent. In some embodiments, a region of the one or more sidewalls and/or hulls (of containment vessel 4501) may be configured to be removed very quickly to function as safety-breakaway(s) to very quickly drain the immersion fluid 3907 from within containment vessel 4501 and/or to provide outside/exterior air directly to the mouth and/or nose of subject 3905 (user 190). In some embodiments, containment vessel 4501 may comprise at least one breathing apparatus 4403. See e.g., FIG. 45.

Note, in some embodiments, a bottom interior of containment vessel 4501 may comprise a seal (neck gasket) 4407.

Continuing discussing FIG. 45, in some embodiments, containment vessel 4501 and/or whole head immersion thermal delivery device 4500 may comprise at least one transparent viewing plate/window 4477. In some embodiments, transparent viewing plate/window 4477 (of containment vessel 4501) may be flexible. See e.g., FIG. 45.

Continuing discussing FIG. 45, in some embodiments, containment vessel 4501 and/or whole head immersion thermal delivery device 4500 may comprise shoulder cover 4503. In some embodiments, shoulder cover 4503 may extend from a bottom portion/region of containment vessel 4501. In some embodiments, shoulder cover 4503 may be configured to drape over at least a portion of the shoulders region of a given subject 3905 (user 190). In some embodiments, shoulder cover 4503 may be flexible, pliable, and/or waterproof. Note, some embodiments of whole head immersion thermal delivery device 4500 may be with or without shoulder cover 4503.

Continuing discussing FIG. 45, in some embodiments, containment vessel 4501, whole head immersion thermal delivery device 4500, and/or shoulder cover 4503 may comprise shoulder/armpit straps 4505 (straps-for-armpits/shoulders 4505). In some embodiments, shoulder/armpit straps 4505 may extend from a bottom portion/region of containment vessel 4501. In some embodiments, shoulder/armpit straps 4505 may extend from a bottom portion/region of shoulder cover 4503. In some embodiments, shoulder/armpit straps 4505 may be configured to removably attach whole head immersion thermal delivery device 4500 to the shoulders/arm pit regions of the given subject 3905 (user 190). In some embodiments, shoulder/armpit straps 4505 may be flexible, pliable, and/or adjustable. Note, some embodiments of whole head immersion thermal delivery device 4500 may be with or without shoulder/armpit straps 4505.

Continuing discussing FIG. 45, in some embodiments, heating and/or cooling means 4109 may be configured to heat and/or to cool immersion fluid/gas 3907 within containment vessel 4501. In some embodiments, heating and/or cooling means 4109 may be configured to control, provide, and/or maintain a temperature of immersion fluid/gas 3907 within containment vessel 4501 within a predetermined range of temperatures and/or for a predetermined amount of time. In some embodiments, heating and/or cooling means 4109 may be an example of heating and/or cooling means 4109, cooling means 4107, or of heating means 4105. In some embodiments, heating and/or cooling means 4109 may be at least partially located: on an interior of fluid containment vessel 4401; within containment vessel 4501; on containment vessel 4501; attached to containment vessel 4501; on an exterior of containment vessel 4501; on pump 3453; attached to pump 3453; within pump 3453; on reservoir 3455; attached to reservoir 3455; within reservoir 3455; portions thereof; combinations thereof; and/or the like. In some embodiments, heating and/or cooling means 4109 may not have moving parts/components within containment vessel 4501. In some embodiments, heating and/or cooling means 4109 may comprise heat exchange fins, a heat sink, and/or a fan/blower located outside of containment vessel 4501 (e.g., located to an exterior of containment vessel 4501, on an exterior of pump 3453, and/or on an exterior of reservoir 3455). In some embodiments, heating and/or cooling means 4109 may comprise one or more temperature probes, temperature sensors, thermocouples, thermometers, portions thereof, combinations thereof, and/or the like, that may be configured to sense a temperature of immersion fluid/gas 3907 within containment vessel 4501. In some embodiments, heating and/or cooling means 4109 may comprise at least one thermostat and/or be operatively connected to at least one thermostat, wherein the at least one thermostat may be configured to control a temperature of immersion fluid/gas 3907 within containment vessel 4501.

Continuing discussing FIG. 45, in some embodiments, when whole head immersion thermal delivery device 4500 may comprise at least some tubing 3451, at least one pump 3453, and/or at least one reservoir 3455. In some embodiments, tubing 3451 may operatively link containment vessel 4501 to pump 3453 and/or may operatively link containment vessel 4501 to reservoir 3455, so that immersion fluid 3907 may move between containment vessel 4501 and reservoir 3455 by operation of pump 3453. In some embodiments, whole head immersion thermal delivery device 4500 may further comprise pump 3453, reservoir 3455, portions thereof, combinations thereof, and/or the like. In some embodiments, pump 3453 may be configured to pump the immersion fluid 3907 between (back and forth) from inside of containment vessel 4501 and inside of reservoir 3455. In some embodiments, pump 3453 may be configured to pump and circulate the immersion fluid/gas 3907 between (back and forth) from inside of containment vessel 4501 and inside of reservoir 3455. In some embodiments, pump 3453 and/or reservoir 3455 may be located exteriorly (externally) from/of containment vessel 4501. In some embodiments, pump 3453 may be disposed between containment vessel 4501 and reservoir 3455. In some embodiments, pump 3453 may be located at least partially within reservoir 3455. In some embodiments, pump 3453 may be attached to containment vessel 4501 and/or attached to reservoir 3455. In some embodiments, pump 3453 may be electrically powered. In some embodiments, tubing 3451 may operatively link pump 3453, containment vessel 4501, and/or reservoir 3455. Note, tubing 3451, pump 3453, and reservoir 3455 were also discussed above in the discussion of FIG. 44B of whole head immersion thermal delivery device 4450 and those discussions may be applicable to at least some embodiments of whole head immersion thermal delivery device 4500.

Figure 46A:
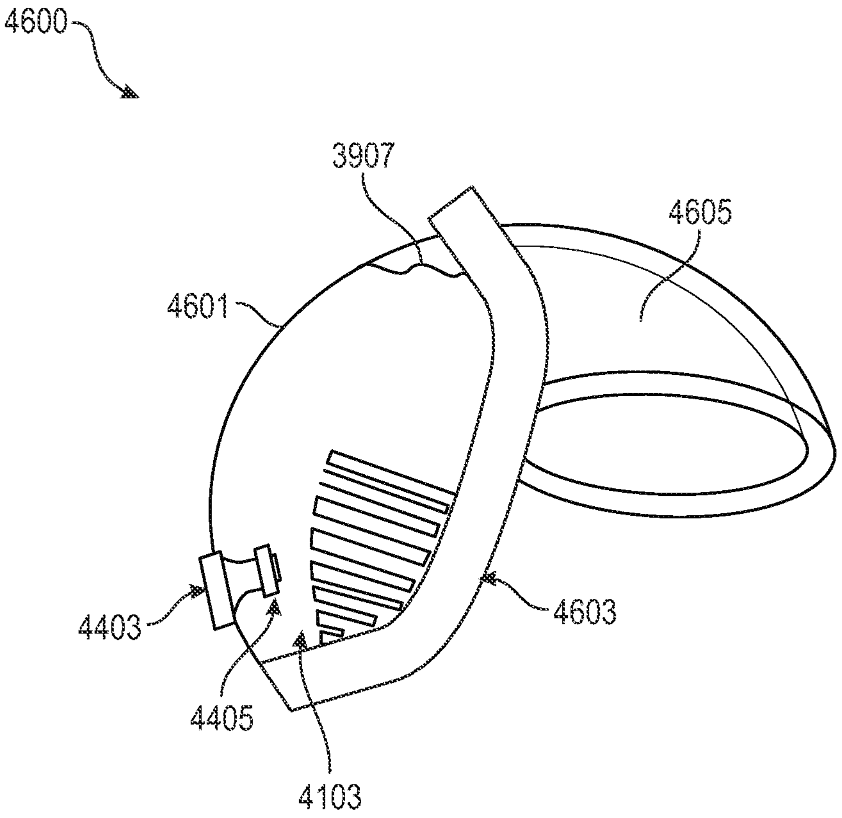
FIG. 46A shows a side perspective view of a face immersion thermal delivery device.

FIG. 46A shows a side perspective view of a face immersion thermal delivery device 4600. In some embodiments, face immersion thermal delivery device 4600 may be an example of a thermal delivery device 3911. FIG. 41 may be applicable to face immersion thermal delivery device 4600. In some embodiments, face immersion thermal delivery device 4600 may comprise at least some electronics of FIG. 41. In some embodiments, face immersion thermal delivery device 4600 may fall within category 4207. In some embodiments, face immersion thermal delivery device 4600 may be selected from category 4207. In some embodiments, with respect to face immersion thermal delivery device 4600, the heat transfer medium 3907 may be an immersion fluid, such as, but not limited to, water (with or without various predetermined additives). In some embodiments, with respect to face immersion thermal delivery device 4600, portion 3909 of subject 3905 (user 190) may be the face 192 of that subject 3905 (user 190) or a portion thereof. In some embodiments, face immersion thermal delivery device 4600 may comprise fluid containment vessel 4601, heating and/or cooling means 4109, breathing apparatus 4403, seal (face gasket) 4603 (face-peripheral-seal 4603), and head-strap(s) 4605. In some embodiments, face immersion thermal delivery device 4600 may comprise fluid containment vessel 4601, heating and/or cooling means 4109, breathing apparatus 4403, seal (face gasket) 4603, and head-strap(s) 4605; and face immersion thermal delivery device 4600 may further comprise, port(s)/valve(s) 4411, and/or cord(s)/tube(s) 3451. In some embodiments of face immersion thermal delivery device 4600, one or more of port/valve 4411 and/or cord/tube 3451 may be optional.

Continuing discussing FIG. 46A, in some embodiments, fluid containment vessel 4601 may be configured to removably fit entirely over and/or surrounding a whole face 192 3909 or portion thereof of subject 3905 (user 190). In some embodiments, fluid containment vessel 4601 may be configured to contain, house, retain, and/or hold the immersion fluid 3907. In some embodiments, when fluid containment vessel 4601 may be removably attached to subject 3905 (user 190), immersion fluid 3907 may be located between face 3909 (face 192) and an interior of fluid containment vessel 4601. In some embodiments, fluid containment vessel 4601 may be a substantially hollow three-dimensional (3D) shape. In some embodiments, a peripheral shape of fluid containment vessel 4601 may be similar to a peripheral shape of a human face. In some embodiments, a shape of fluid containment vessel 4601 may be similar to a shape of a face mask, a snorkel face mask, a diving face mask, a respirator face mask, a gas face mask, a firefighter's face mask, and/or the like. In some embodiments, a majority of fluid containment vessel 4601 may be made of one or more sidewalls and/or hulls. In some embodiments, the one or more sidewalls and/or hulls (of fluid containment vessel 4601) may be: waterproof, hydrophobic, solid, insulated, rigid, semi-rigid, thermally stable, portions thereof, combinations thereof, and/or the like. In some embodiments, the one or more sidewalls and/or hulls (of fluid containment vessel 4601) may be at least substantially (mostly) made from: a plastic, a thermoplastic, an injection molded plastic, an injection molded material, a 3D printed material, an extruded material, a metal, an alloy, glass, wood, a composite, a laminate, an elastomer, a rubber, silicone, portions thereof, combinations thereof, and/or the like. In some embodiments, plastics and/or the like may be more desirable as compared to glass, metal, and/or metal alloys for materials of construction for the one or more sidewalls and/or hulls (of fluid containment vessel 4601) because plastics are more insulating than glass, metal, and/or metal alloys; i.e., glass, metal, and/or metal alloys tend to act as thermal bridges for heat transfer. In some embodiments, fluid containment vessel 4601 may be a transparent viewing plate/window 4601. In some embodiments, a majority of the one or more sidewalls and/or hulls (of fluid containment vessel 4601) may be at least substantially optically clear, transparent, and/or translucent so that subject 3905 (user 190) may be able to see through the at least the portion/region of the one or more sidewalls and/or hulls. In some embodiments, at least a portion/region of the one or more sidewalls and/or hulls (of fluid containment vessel 4601) may be at least substantially optically clear, transparent, and/or translucent so that subject 3905 (user 190) may be able to see through the at least the portion/region of the one or more sidewalls and/or hulls. In some embodiments, the at least the portion/region of the one or more sidewalls and/or hulls may be configured to function/operate as a (closed) window. In some embodiments, at least other portions/regions of the one or more sidewalls and/or hulls (of fluid containment vessel 4601) may be opaque and/or not optically clear, transparent, and/or translucent. In some embodiments, a region of the one or more sidewalls and/or hulls (of fluid containment vessel 4601) may be configured to be removed very quickly to function as safety-breakaway(s) to very quickly drain the immersion fluid 3907 from within fluid containment vessel 4601 and/or to provide outside/exterior air directly to the mouth and/or nose of subject 3905 (user 190).

Continuing discussing FIG. 46A, in some embodiments, heating and/or cooling means 4109 may be configured to heat and/or to cool immersion fluid 3907 within fluid containment vessel 4601. In some embodiments, heating and/or cooling means 4109 may be configured to control, provide, and/or maintain a temperature of immersion fluid 3907 within fluid containment vessel 4601 within a predetermined range of temperatures and/or for a predetermined amount of time. In some embodiments, heating and/or cooling means 4109 may be an example of heating and/or cooling means 4109, cooling means 4107, or of heating means 4105. In some embodiments, heating and/or cooling means 4109 may be at least partially located: on an interior of fluid containment vessel 4601; within fluid containment vessel 4601; on fluid containment vessel 4601; attached to fluid containment vessel 4601; on an exterior of fluid containment vessel 4601; portions thereof; combinations thereof; and/or the like. In some embodiments, heating and/or cooling means 4109 may not have moving parts/components within fluid containment vessel 4601. In some embodiments, heating and/or cooling means 4109 may comprise heat exchange fins, a heat sink, and/or a fan/blower located outside of fluid containment vessel 4601 (located to an exterior of fluid containment vessel 4601). In some embodiments, heating and/or cooling means 4109 may comprise one or more temperature probes, temperature sensors, thermocouples, thermometers, portions thereof, combinations thereof, and/or the like, that may be configured to sense a temperature of immersion fluid 3907 within fluid containment vessel 4601. In some embodiments, heating and/or cooling means 4109 may comprise at least one thermostat and/or be operatively connected to at least one thermostat, wherein the at least one thermostat may be configured to control a temperature of immersion fluid 3907 within fluid containment vessel 4601.

Continuing discussing FIG. 46A, in some embodiments, fluid containment vessel 4601 may comprise at least one breathing apparatus 4403. In some embodiments, breathing apparatus 4403 may be configured to permit subject 3905 to breathe outside air when the face 3909 of subject 3905 may be (removably) enclosed within fluid containment vessel 4601 and fluid containment vessel 4601 may be filled/contain immersion fluid 3907. In some embodiments, breathing apparatus 4403 may be sealed passageway from an inside of fluid containment vessel 4601 to an exterior/outside of fluid containment vessel 4601, that may be configured for the movement/passage of respiratory gasses (e.g., air in and carbon dioxide out). In some embodiments, an exterior/outside portion of breathing apparatus 4403 may be attached to the one or more sidewalls and/or hulls of fluid containment vessel 4601. In some embodiments, an exterior/outside portion of breathing apparatus 4403 may be located on an exterior/outside portion of fluid containment vessel 4601. In some embodiments, an exterior/outside portion of breathing apparatus 4403 may be located on an exterior/outside portion of fluid containment vessel 4601 at a top of fluid containment vessel 4601. In some embodiments, mouthpiece 4405 may be located on an interior/inside front of fluid containment vessel 4601.

Continuing discussing FIG. 46A, in some embodiments, seal (face gasket) 4603 (face-peripheral-seal 4603) may be configured to removably provide a watertight seal around a periphery of a face 3909 (face 192) of subject 3905 (user 190), when subject 3905 (user 190) may be wearing/using face immersion thermal delivery device 4600 and/or 4650. In some embodiments, seal (face gasket) 4603 may be located at least around a periphery edge of fluid containment vessel 4601. In some embodiments, seal (face gasket) 4603 may be substantially (mostly) made of at least elastomeric material. In some embodiments, the elastomeric material(s) and/or portion(s) of seal (face gasket) 4603 may be made at least partially from one or more of: an elastomer, silicone, rubber, neoprene, a plastic, portions thereof, combinations thereof, and/or the like. In some embodiments, seal (face gasket) 4603 may be similar or the same as a gasket in a preexisting (prior art) full face snorkel/diving mask.

Continuing discussing FIG. 46A, in some embodiments, port(s)/valve(s) 4411 may be configured to fill and/or drain fluid containment vessel 4601 of the immersion fluid 3907; and/or to fill and/or drain fluid containment vessel 4601 with air. In some embodiments, fluid containment vessel 4601 may comprise one or more port(s)/valve(s) 4411. In some embodiments, port(s)/valve(s) 4411 may be located on a top, a side, and/or a bottom of fluid containment vessel 4601. In some embodiments, port(s)/valve(s) 4411 of fluid containment vessel 4601 may be openable and closeable. In some embodiments, port(s)/valve(s) 4411 of fluid containment vessel 4601 may function as plug(s). In some embodiments, port(s)/valve(s) 4411 may be configured as safety-breakaway(s) to very quickly drain the immersion fluid 3907 from within fluid containment vessel 4601 and/or to provide outside/exterior air directly to the mouth and/or nose of subject 3905 (user 190).

Continuing discussing FIG. 46A, in some embodiments, cord(s)/tube(s) 3451 may be configured to function as an electrical cord to provide external electrical power to face immersion thermal delivery device 4600; and/or as a tube for movement/passage/circulation of immersion fluid 3907. In some embodiments, fluid containment vessel 4601 may comprise one or more cord(s)/tube(s) 3451. In some embodiments, at least some portion of cord(s)/tube(s) 3451 may be attached to fluid containment vessel 4601 in a watertight manner. In some embodiments, cord(s)/tube(s) 3451 may be: an electrical power cord of face immersion thermal delivery device 4600; and/or a hose for movement/passage of immersion fluid 3907.

Continuing discussing FIG. 46A, in some embodiments, head-strap(s) 4605 may be configured to removably secure fluid containment vessel 4601 to a head 191 of subject 3905 (user 190). In some embodiments, face immersion thermal delivery device 4600 and/or fluid containment vessel 4601 may comprise one or more head-strap(s) 4605. In some embodiments, head-strap(s) 4605 may be configured to fit around sides, a top, and/or a back/rear of the head 191 of subject 3905 (user 190). In some embodiments, head-strap(s) 4605 may be attached to an edge of fluid containment vessel 4601 and/or to each other. In some embodiments, head-strap(s) 4605 may be at least substantially (mostly) flexible and/or made from at least one elastomeric material, such as, but not limited to, silicone, rubber, neoprene, plastic, portions thereof, combinations thereof, and/or the like. In some embodiments, head-strap(s) 4605 may be at least substantially (mostly) flexible and/or made from a woven and/or fabric material. In some embodiments, head-strap(s) 4605 may be adjustable.

Figure 46B:
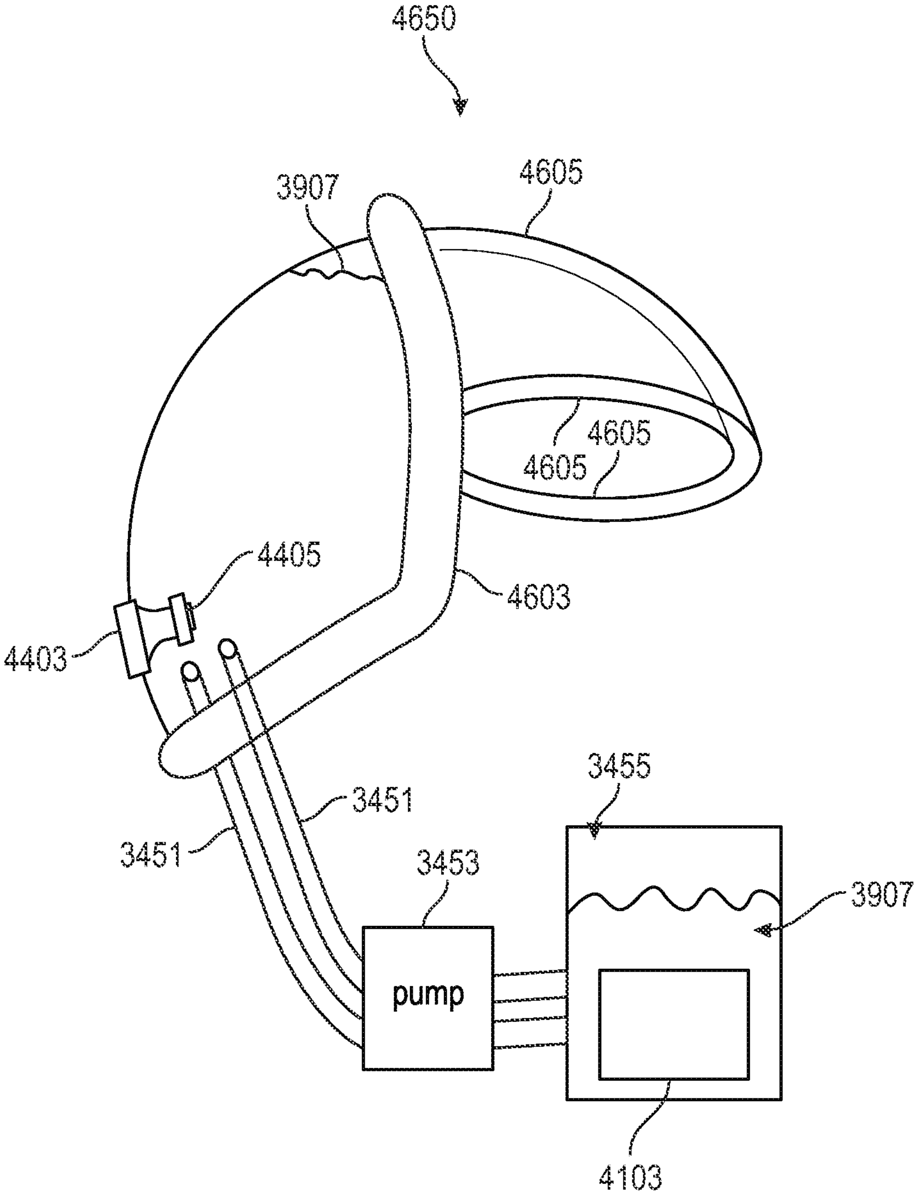
FIG. 46B shows a side perspective view of a face immersion thermal delivery device.

FIG. 46B shows a side perspective view of a face immersion thermal delivery device 4650. In some embodiments, face immersion thermal delivery device 4650 may be an example of a thermal delivery device 3911. FIG. 41 may be applicable to face immersion thermal delivery device 4650. In some embodiments, face immersion thermal delivery device 4650 may comprise at least some electronics of FIG. 41. In some embodiments, face immersion thermal delivery device 4650 may fall within category 4207. In some embodiments, face immersion thermal delivery device 4650 may be selected from category 4207. In some embodiments, with respect to face immersion thermal delivery device 4650, the heat transfer medium 3907 may be an immersion fluid, such as, but not limited to, water (with or without various predetermined additives). In some embodiments, with respect to face immersion thermal delivery device 4650, portion 3909 of subject 3905 (user 190) may be the face 192 of that subject 3905 (user 190) or a portion thereof. In some embodiments, face immersion thermal delivery device 4650 may comprise fluid containment vessel 4601, heating and/or cooling means 4109, breathing apparatus 4403, seal (face gasket) 4603, and head-strap(s) 4605. In some embodiments, face immersion thermal delivery device 4650 may comprise fluid containment vessel 4601, heating and/or cooling means 4109, breathing apparatus 4403, seal (face gasket) 4603, and head-strap(s) 4605; and face immersion thermal delivery device 4650 may further comprise port(s)/valve(s) 4411 and/or a cord(s)/tube(s) 3451. In some embodiments of face immersion thermal delivery device 4650, one or more of port(s)/valve(s) 4411, and/or cord(s)/tube(s) 3451 may be optional. In some embodiments, face immersion thermal delivery device 4650 may further comprise pump 3453, reservoir 3455, portions thereof, combinations thereof, and/or the like. In some embodiments, pump 3453 may be configured to pump the immersion fluid 3907 between (back and forth) from inside of fluid containment vessel 4601 and inside of reservoir 3455. In some embodiments, pump 3453 may be configured to pump and circulate the immersion fluid 3907 between (back and forth) from inside of fluid containment vessel 4601 and inside of reservoir 3455. In some embodiments, pump 3453 and/or reservoir 3455 may be located exteriorly (externally) from/of fluid containment vessel 4601. In some embodiments, pump 3453 may be disposed between fluid containment vessel 4601 and reservoir 3455. In some embodiments, pump 3453 may be attached to fluid containment vessel 4601 and/or attached to reservoir 3455. In some embodiments, tubing 3451 may operatively link pump 3453, fluid containment vessel 4601, and/or reservoir 3455. See e.g., FIG. 46B.

Figure 47:
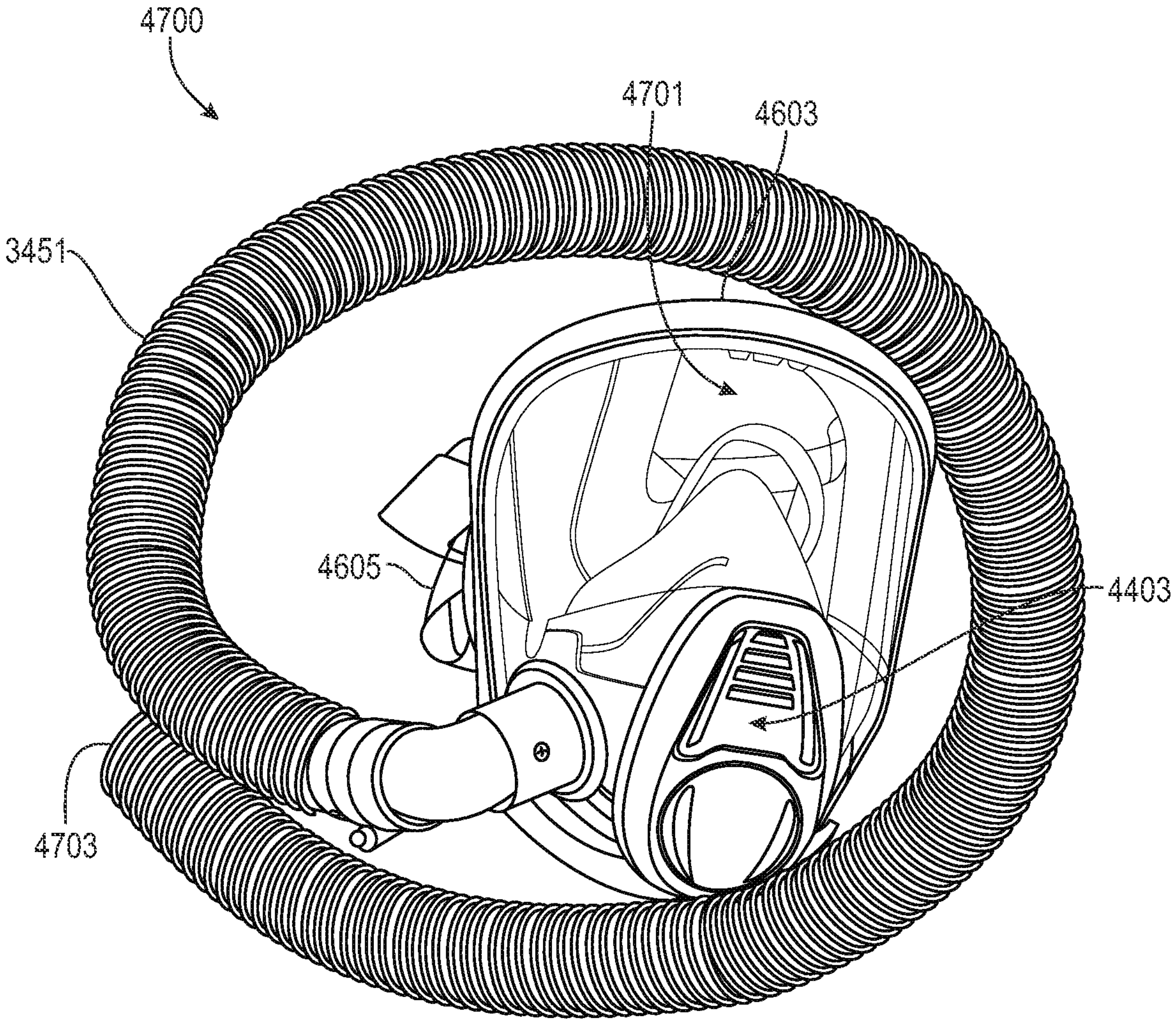

FIG. 47 shows a right front perspective view of a face immersion thermal delivery device 4700. In some embodiments, face immersion thermal delivery device 4700 may be an example of a thermal delivery device 3911. FIG. 41 may be applicable to face immersion thermal delivery device 4700. In some embodiments, face immersion thermal delivery device 4700 may comprise at least some electronics of FIG. 41. In some embodiments, face immersion thermal delivery device 4700 may fall within category 4207. In some embodiments, face immersion thermal delivery device 4700 may be selected from category 4207. In some embodiments, with respect to face immersion thermal delivery device 4700, the heat transfer medium 3907 may be an immersion fluid, such as, but not limited to, water (with or without various predetermined additives). In some embodiments, with respect to face immersion thermal delivery device 4700, the heat transfer medium 3907 may be an immersion gas, such as, but not limited to, air and/or oxygen. In some embodiments, with respect to face immersion thermal delivery device 4700, portion 3909 of subject 3905 (user 190) may be the face 192 of that subject 3905 (user 190) or a portion thereof. In some embodiments, face immersion thermal delivery device 4700 may comprise containment vessel 4701, gasketed rim 4603, head-strap(s) 4605, and tubing 3451. In some embodiments, face immersion thermal delivery device 4700 may further comprise pump 3453, reservoir 3455, portions thereof, combinations thereof, and/or the like. In some embodiments, pump 3453 may be configured to pump the immersion fluid/gas 3907 between (back and forth) from inside of containment vessel 4701 and inside of reservoir 3455. In some embodiments, pump 3453 may be configured to pump and circulate the immersion fluid/gas 3907 between (back and forth) from inside of containment vessel 4701 and inside of reservoir 3455. In some embodiments, pump 3453 and/or reservoir 3455 may be located exteriorly (externally) from/of containment vessel 4701. In some embodiments, pump 3453 may be disposed between containment vessel 4701 and reservoir 3455. In some embodiments, pump 3453 may be attached to containment vessel 4701 and/or attached to reservoir 3455. In some embodiments, tubing 3451 may operatively link pump 3453, containment vessel 4701, and/or reservoir 3455. In some embodiments, heating and/or cooling means 4109 may be at least partially located: on an interior of reservoir 3455; within reservoir 3455; on reservoir 3455; attached to reservoir 3455; on an exterior of reservoir 3455; on containment vessel 4701; attached to containment vessel 4701; portions thereof; combinations thereof; and/or the like. See e.g., FIG. 47.

Continuing discussing FIG. 47, in some embodiments, containment vessel 4701 may be configured to removably fit entirely over and/or surrounding a whole face 3909 (face 192) or portion thereof of subject 3905 (user 190). In some embodiments, containment vessel 4701 may be configured to contain, house, retain, and/or hold the immersion fluid/gas 3907. In some embodiments, when containment vessel 4701 may be removably attached to subject 3905 (user 190), immersion fluid/gas 3907 may be located between face 3909 (face 192) and an interior of containment vessel 4701. In some embodiments, containment vessel 4701 may be a substantially hollow and/or concave three-dimensional (3D) shape. In some embodiments, a peripheral shape of containment vessel 4701 may be similar to a peripheral shape of a human face. In some embodiments, a shape of containment vessel 4701 may be similar to a shape of a face mask, a snorkel face mask, a diving face mask, a respirator face mask, a gas face mask, a firefighter's face mask, and/or the like. In some embodiments, a majority of containment vessel 4701 may be made of one or more sidewalls and/or hulls. In some embodiments, the one or more sidewalls and/or hulls (of containment vessel 4701) may be: waterproof, hydrophobic, solid, insulated, rigid, semi-rigid, thermally stable, portions thereof, combinations thereof, and/or the like. In some embodiments, the one or more sidewalls and/or hulls (of containment vessel 4701) may be at least substantially (mostly) made from: a plastic, a thermoplastic, an injection molded plastic, an injection molded material, a 3D printed material, an extruded material, a metal, an alloy, glass, wood, a composite, a laminate, an elastomer, a rubber, silicone, portions thereof, combinations thereof, and/or the like. In some embodiments, plastics and/or the like may be more desirable as compared to glass, metal, and/or metal alloys for materials of construction for the one or more sidewalls and/or hulls (of containment vessel 4701) because plastics are more insulating than glass, metal, and/or metal alloys; i.e., glass, metal, and/or metal alloys tend to act as thermal bridges for heat transfer. In some embodiments, containment vessel 4701 may be a transparent viewing plate/window 4701. In some embodiments, a majority of the one or more sidewalls and/or hulls (of containment vessel 4701) may be at least substantially optically clear, transparent, and/or translucent so that subject 3905 (user 190) may be able to see through the at least the portion/region of the one or more sidewalls and/or hulls. In some embodiments, at least a portion/region of the one or more sidewalls and/or hulls (of containment vessel 4701) may be at least substantially optically clear, transparent, and/or translucent so that subject 3905 (user 190) may be able to see through the at least the portion/region of the one or more sidewalls and/or hulls. In some embodiments, the at least the portion/region of the one or more sidewalls and/or hulls may be configured to function/operate as a (closed) window. In some embodiments, at least other portions/regions of the one or more sidewalls and/or hulls (of containment vessel 4701) may be opaque and/or not optically clear, transparent, and/or translucent. In some embodiments, a region of the one or more sidewalls and/or hulls (of containment vessel 4701) may be configured to be removed very quickly to function as safety-breakaway(s) to very quickly drain the immersion fluid/gas 3907 from within containment vessel 4701 and/or to provide outside/exterior air directly to the mouth and/or nose of subject 3905 (user 190). In some embodiments, containment vessel 4701 may comprise at least one breathing apparatus 4403. See e.g., FIG. 47.

Continuing discussing FIG. 47, in some embodiments, gasketed rim 4603 may be configured to removably provide a watertight seal around a periphery of a face 3909 (face 192) of subject 3905 (user 190), when subject 3905 (user 190) may be wearing/using face immersion thermal delivery device 4700. In some embodiments, attached and/or at a perimeter edge of containment vessel 4701 may be gasketed rim 4603. In some embodiments, gasketed rim 4603 may be located at least around a periphery edge of containment vessel 4701.

Continuing discussing FIG. 47, in some embodiments, head strap(s) 4605 may be configured to removably secure containment vessel 4701 to a head 191 of subject 3905 (user 190). In some embodiments, face immersion thermal delivery device 4700 and/or containment vessel 4701 may comprise one or more head strap(s) 4605. In some embodiments, head strap(s) 4605 may be configured to fit around sides, a top, and/or a back/rear of the head 191 of subject 3905 (user 190). In some embodiments, head strap(s) 4605 may be attached to an edge (e.g., rigid portions of gasketed rim 4603) of containment vessel 4701 and/or to each other.

Continuing discussing FIG. 47, in some embodiments, a distal terminal end of tubing 3451 may be designated as terminal end of tubing 4703. In some embodiments, terminal end of tubing 4703 may be configured to (removable) attachment to heating and/or cooling means 4109, pump 3453 and/or to reservoir 3455.

As discussed herein, at least one invention and/or embodiment disclosed herein may be characterized as a method of inducing 3901 a desired—and/or—intended-outcome 3903 in subject 3905 by touching heat-transfer-element (medium) 3907 against portion 3909 of subject 3905. In some embodiments, heat-transfer-element (medium) 3907 may be at least initially at a different temperature from a surface of portion 3909 of subject 3905. In some embodiments, the temperature(s) of heat-transfer-element (medium) 3907 may be maintained, controlled, and/or generated by thermal means (thermal delivery means and/or thermal delivery device) 3911. See e.g., FIG. 39 and FIG. 40.

In some embodiments, this method of FIG. 39 may be further framed in the following manner. For example, and without limiting the scope of the present invention, this method may be a method of causing release of at least one type of neurotransmitter in an animal 3905 by, at least in part, heating portion 3909 of animal 3905, cooling portion 3909, or alternating between heating and cooling of portion 3909—using thermal delivery device 3911.

In some embodiments, this method of FIG. 39 may be further framed in the following manner. For example, and without limiting the scope of the present invention, this method may be a method of (indirectly) stimulating a vagus nerve of human 3905 by stimulating trigeminal nerve 3800 of human 3905, wherein the trigeminal nerve 3800 is stimulated, at least in part, by heating the trigeminal nerve 3800, cooling the trigeminal nerve 3800, or alternating between heating and cooling of trigeminal nerve 3800—using thermal delivery device 3911. In some embodiments, the trigeminal nerve 3800 may (also) be stimulated via electrodes (e.g., electrode(s) 2915) that may electrify an immersion-liquid (e.g., immersion-liquid 180). In some embodiments, this method of (indirect) vagus nerve stimulation may be done without direct electrical stimulation of the vagus nerve.

In some embodiments, this method of FIG. 39 may be further framed in the following manner. For example, and without limiting the scope of the present invention, this method may be a method of transdermal delivery of at least one chemical (chemical species, chemical-additive, and/or additive) across portion 3909 of skin by applying the at least one chemical to an exterior portion of the skin of portion 3909 and by, at least in part, heating portion 3909 of the skin, cooling portion 3909 of the skin, or alternating between heating and cooling of portion 3909 of the skin—using thermal delivery device 3911. In some embodiments, applying the at least one chemical to the exterior portion of the skin of portion 3909 may comprise placing (putting) the at least one chemical within the immersion-liquid (e.g., within immersion-liquid 180).

In some embodiments, this method of FIG. 39 may be further framed in the following manner. For example, and without limiting the scope of the present invention, this method may be a method that is configured for providing thermal therapy to face 192 of human 190 (3905) to induce a desired outcome 3903 in human 190 (3905). In some embodiments, this method may comprise a step (a) of exposing at least some of face 192 within immersion-liquid 180 for at least a minimum amount of time, while immersion-liquid 180 is within a temperature-range and while immersion-liquid 180 is within a vessel (e.g., the vessel portion of soaking-device 100) (e.g., so that face 192 may also be at least partially within this vessel portion), wherein during the step (a) front-of-neck 197 of human 190 (3905) is removably physically pressing up against flexible-member 500 (neck-gasket 500) of the vessel (e.g., the vessel portion of soaking-device 100) in a manner that forms a watertight seal between flexible-member 500 (neck-gasket 500) and front-of-neck 197, wherein immersion-liquid 180 acts a heat transfer medium 3907 for the at least some of face 192. In some embodiments, with respect to this method, the thermal therapy may comprise: (1) heating face 192, (2) cooling face 192, or (3) alternating between heating and cooling face 192, wherein the heating and/or the cooling is done by immersion-liquid 180. In some embodiments, during execution of the step (a) this method may further comprise maintaining immersion-liquid 180 within the temperature-range by one or more of: insulating at least some of the vessel (e.g., the vessel portion of soaking-device 100), heating immersion-liquid 180, cooling immersion-liquid 180, or alternating between heating and cooling immersion-liquid 180. In some embodiments, the heating of immersion-liquid 180 and/or the cooling of immersion-liquid 180 may be done by one or more thermal means 3911, 4105, 4107, and/or 4109. In some embodiments, immersion-liquid 180 may comprise water. In some embodiments, immersion-liquid 180 may be at least predominantly a liquid throughout the temperature-range experienced during execution of the step (a) of this method (and at standard sea-level Earth atmospheric pressures). In some embodiments, immersion-liquid 180 may comprise a liquid and at least one chemical-additive, wherein that at least one chemical-additive may be within that liquid. In some embodiments, the at least one chemical-additive may be predetermined and/or may be selected from one or more of: a chemical, a salt, an ion, a molecule, a medicine, a medicament, a pharmaceutical, a carbohydrate, an amino acid, a peptide, a protein, a nucleic acid, a string of deoxyribonucleic acid, a string of ribonucleic acid, a fatty acid, a hormone, an antibiotic, a moisturizer, a skin bleacher, an oxidizer, a skin peal, a skin mud, a skin clay, a liposome, portions thereof, combinations thereof, and/or the like. In some embodiments, the at least one chemical-additive may be one or more of: naturally occurring, synthetic, human made, water soluble, fat soluble, partially water soluble, partially fat soluble, plant derived, algae derived, animal derived, bacteria derived, fungus derived, archaebacteria derived, protozoan derived, portions thereof, combinations thereof, and/or the like. In some embodiments, during execution of the step (a) at least some of the at least one chemical-additive may be transdermally delivered across a portion of the at least some of face 192. In some embodiments, during execution of the step (a), the flexible-member 500 (neck-gasket 500) does not cover over nor touch a rear portion of the neck (back-of-neck 193) of human 190 (3905), wherein the rear portion (back-of-neck 193) may be disposed opposite from the front-of-neck 197. In some embodiments, at least some of the flexible-member 500 (neck-gasket 500) may be waterproof. In some embodiments, during execution of the step (a), a remainder of a body of human 190 (3905), below the neck and not including face 192, is not in physical contact with immersion-liquid 180 (unless human 190 decided to put their hand and/or finger into immersion-liquid 180). In some embodiments, the remainder of the body of human 190 (3905) may be dry during execution of the step (a) of the method. In some embodiments, during execution of the step (a), for at least a portion of the minimum amount of time, the method further comprises use of one or more accessories. In some embodiments, the one or more accessories comprises one or more of: a breathing-apparatus (such as, but not limited to, breathing-apparatus 1700, a breathing apparatus of a Hydroeffacer, a snorkel, and/or the like) that is configured to permit human 190 (3905) to breathe while the at least some of face 192 is immersed within immersion-liquid 180; a headrest (such as, but not limited to, headrest 1800, a headrest [head rest] of a Hydroeffacer, and/or the like) that is configured to support head 191 of human 190 (3905) while the at least some of face 192 is immersed within immersion-liquid 180; a means for releasing of gas bubbles (such as, but not limited to, gas-line-tubing 2709) into immersion-liquid 180 while the at least some of face 192 is immersed within immersion-liquid 180; electrodes (such as, but not limited to, electrode (s) 2915) for electrifying immersion-liquid 180 while the at least some of face 192 is immersed within immersion-liquid 180 to provide some electro-stimulation to the at least some of face 192; and/or a means of emitting electromagnetic radiation (such as, but not limited to, lights, LEDs, and/or light-source 1500) into immersion-liquid 180 while the at least some of face 192 is immersed within immersion-liquid 180. In some embodiments, prior to the method executing the step (a), the method may further comprise a step of placing the at least some of face 192 within immersion-liquid 180 that is residing within the vessel (e.g., the vessel portion of soaking-device 100). In some embodiments, the vessel (e.g., the vessel portion of soaking-device 100) may comprises a top that is at least substantially open.

In some embodiments, the minimum amount of time of the step (a) may be selected from three seconds to three hours. In some embodiments, the minimum amount of time may be split into two or more durations of time.

In some embodiments, characterizing of "heating" or of "cooling" of portion 3909 (e.g., face 192) may be with respect to: a normal average internal body temperature of human 190 (3905) which is typically cited at 37 degrees Celsius (98.6 degrees Fahrenheit); or with respect to how human 190 (3905) might perceive a temperature-range of immersion-liquid 180; and/or whether or not heating means 4105, cooling means 4107, and/or heating and/or cooling means 4109 may be activated or not. For example, and without limiting the scope of the present invention, any temperature-range of immersion-liquid 180 above 37 degrees Celsius (98.6 degrees Fahrenheit) may be characterized as "heating" of portion 3909 (e.g., face 192), if portion 3909 (e.g., face 192) is immersed within immersion-liquid 180—because thermodynamically heat moves from warmer regions to cooler regions (but once portion 3909 [e.g., face 192] is removed from immersion-liquid 180 such a temperature-range could be characterized as cooling due to evaporative cooling of the skin in the air). For example, and without limiting the scope of the present invention, any temperature-range of immersion-liquid 180 below 37 degrees Celsius (98.6 degrees Fahrenheit) may be characterized as "cooling" of portion 3909 (e.g., face 192)—because thermodynamically heat moves from warmer regions to cooler regions. For example, and without limiting the scope of the present invention, a temperature-range of immersion-liquid 180 of 85 to 97 degrees Fahrenheit (29.4 to 36.1 degrees Celsius) may be perceived as warm to cool by some humans. One hundred (100) degrees Fahrenheit (37.8 degrees Celsius) water is often perceived as warm by humans; whereas, water temperatures at 106 degrees Fahrenheit (41.1 degrees Celsius) or higher often induce pain and a sensation of hot (hotness) in humans.

In some embodiments, when immersion-liquid 180 may be actively heated, its temperature-range may be perceived as warm to hot, and/or tolerably painful by human 190 (3905). In some embodiments, when immersion-liquid 180 may be actively heated, its temperature-range may be 95 to less than 120 degrees Fahrenheit (35 to less than 48.9 degrees Celsius). In some embodiments, a maximum of the temperature-range when immersion-liquid 180 may be actively heated, may be targeted for 108.5 degrees Fahrenheit (42.5 degrees Celsius). However, when the heat transfer fluid 3907 may be a gas (e.g., air and/or oxygen), then higher temperatures than 108.5 degrees Fahrenheit (42.5 degrees Celsius) may be utilized. Immersion-liquid 180 is only one example of heat transfer fluid 3907.

In some embodiments, when immersion-liquid 180 may be actively cooled, its temperature-range may be perceived as cool to cold, and/or tolerably painful by human 190 (3905). In some embodiments, when immersion-liquid 180 may be actively cooled, its temperature-range may be 70 to above 32 degrees Fahrenheit (21.1 to above 0 degrees Celsius). In some embodiments, a minimum of the temperature-range when immersion-liquid 180 may be actively cooled, may be targeted for 59 degrees Fahrenheit (15 degrees Celsius). However, when the heat transfer fluid 3907 may be a gas (e.g., air and/or oxygen), then lower temperatures than 59 degrees Fahrenheit (15 degrees Celsius) may be utilized.

For example, and without limiting the scope of the present invention, the desired outcome 3903 in human 190 (3905) may be selected from one or more of: a greater release of at least one type of neurotransmitter as compared to when human 190 (3905) is not being treated by the method; improving skin health of the at least some of face 192; reducing severity of at least one skin wrinkle of the at least some of face 192; reducing acne severity of the at least some of face 192; reducing rash severity of the at least some of face 192; increased healing of a wound (a cut, puncture, and/or laceration) of at least a portion of the at least some of face 192; a reduction in bruising (and/or swelling) of at least a portion of the at least some of face 192; a reduction in stress of human 190 (3905); a reduction in anxiety of human 190 (3905); a reduction in depression of human 190 (3905); an increased feeling relaxation, calmness, and/or contentment; as at least a partial treatment for addiction; as at least a partial treatment for substance abuse; transdermal delivery of at least one chemical (chemical-additive) within immersion-liquid 180 across the at least some of face 192; a reduction in headache severity of human 190 (3905); a reduction in sinus pressure of human 190 (3905); an increase in metabolism as compared to when human 190 (3905) is not being treated by the method; producing brown fat and/or browning of white adipose tissue (WAT); improving cardiovascular health of human 190 (3905); reducing pain of human 190 (3905); as a least a partial treatment of myocardial infarction (heart attack), transient ischemic attack (TIA), and/or stroke; as at least a partial treatment for blepharitis (that is commonly known as dry eye); cleaning of an exterior of an eye of human 190 (3905); encouraging removal of an object from an exterior of the eye of human 190 (3905); as at least a partial treatment for diabetes; as at least a partial means of preventing diabetes; or improved quality of sleep when the method is carried out prior to sleeping. In some embodiments, the desired outcome 3903 (the desired and/or intended outcome 3903) may be as compared to when human 190 (3905) is not being treated by the thermal therapy method (and/or the hydrotherapy method).

In some embodiments, soaking-device 100 and Hydroeffacer (e.g., face soaking device from U.S. Pat. No. 10,667,991) may share some features and also may differ on some features. For example, and without limiting the scope of the present invention, with respect to differences between soaking-device 100 and the Hydroeffacer, the side panels (side walls) (e.g., front-panel 103, rear-panel 105, and/or side-panels 107) and/or floor-and-sidewalls 101 of soaking-device 100 may initially come from flat/planar sheet/panel source materials (at least some of which may be off-the-shelf); whereas, side panels (side walls) and/or a floor of the Hydroeffacer may be injection molded (see e.g., FIG. 2G of U.S. Pat. No. 10,667,991). For example, and without limiting the scope of the present invention, with respect to differences between soaking-device 100 and the Hydroeffacer, the vessel portions of soaking-device 100 (that may contain the immersion-liquid 180) may be formed from three separate and different components (e.g., front-panel 103, rear-panel 105, and floor-and-sidewalls 101); whereas, the vessel portion of the Hydroeffacer (that may contain its immersion liquid) may be formed from one integral tub member (see e.g., inner vessel member 200a of FIG. 2G of U.S. Pat. No. 10,667,991). For example, and without limiting the scope of the present invention, with respect to differences between soaking-device 100 and the Hydroeffacer, at least some control of soaking-device 100 may be from a removable tower 2700 member; whereas, controls of the Hydroeffacer may be integrated into (an upper rear portion of) a vessel (hull) member and may generally be non-removable (see e.g., membrane-switch-receiving-recess 1021 of inner vessel member 200a of FIG. 2G of U.S. Pat. No. 10,667,991). In terms of similarities, both soaking-device 100 and the Hydroeffacer may be used as thermal delivery devices 3911 for thermally soaking and/or treating the face 192, a hand, a foot, a lower arm, a lower leg, a limb, fingers, toes, at least a portion of the head 191, a portion thereof, combinations thereof, and/or the like, of user 190, with a temperature controlled immersion liquid.

In some embodiments, when heat transfer fluid 3907 may be at least a gas such as, but not limited to, air and/or oxygen, the gas heat transfer fluid 3907 may be heated, cooled, heated and/or cooled, humidified, dehumidified, portions thereof, combinations thereof, and/or the like. In some embodiments, when heat transfer fluid 3907 may be at least a gas such as, but not limited to, air and/or oxygen, the gas heat transfer fluid 3907 may be breathable by a human 190 (subject 3905); and in some embodiments, the given thermal delivery device 3911 that may be utilizing such a breathable gas heat transfer fluid 3907, may or may not comprise a breathing apparatus (breathing-apparatus). In some embodiments, a breathing apparatus (breathing-apparatus) may still be employed to minimize heated and/or chilled air/oxygen from reaching lungs of user 190 (subject 3905) even when the gas heat transfer fluid 3907 may be breathable. In some embodiments, whole head (immersion) thermal delivery device(s) 3500, 4400, 4450, 4475, and/or 4500; and/or (whole) face immersion thermal delivery device(s) 4600, 4650, and/or 4700 may employ (utilize) a heat transfer fluid 3907 that may be a liquid, a gas, portions thereof, combinations thereof, and/or the like. In some embodiments, that gas may be a breathable gas, such as, but not limited to air and/or oxygen. In some embodiments, when whole head (immersion) thermal delivery device(s) 3500, 4400, 4450, 4475, and/or 4500; and/or when (whole) face immersion thermal delivery device(s) 4600, 4650, and/or 4700 may employ (utilize) a breathable gas as the heat transfer fluid 3907, then such thermal delivery device(s) 3911 may nor may not comprise a breathing apparatus (breathing-apparatus).

In some embodiments, a system and/or a kit may comprise at least one soaking-device 100 and one or more of: a breathing-apparatus and/or a headrest. In some embodiments, the breathing-apparatus may be selected from one or more of: breathing-apparatus 1700; any breathing apparatus or the like shown and described in U.S. Pat. Nos. 10,667,990, 10,449,341, 10,667,991, 11,154,697, U.S. design Pat. D863,575, U.S. design Pat. D863,576, U.S. design Pat. D864,403, U.S. design Pat. D889,675, and/or in U.S. design Pat. D916,303; a snorkel used for snorkeling or the like; portions thereof; combinations thereof; and/or the like. In some embodiments, the headrest may be selected from one or more of: headrest 1800; any headrest (head rest) or the like shown and described in U.S. Pat. Nos. 10,667,990, 10,449,341, 10,667,991, 11,154,697, U.S. design Pat. D863,575, U.S. design Pat. D863,576, U.S. design Pat. D864,403, U.S. design Pat. D889,675, and/or in U.S. design Pat. D916,303; portions thereof; combinations thereof; and/or the like. In some embodiments, soaking-device 100 may comprise at least one breathing-apparatus 1700 and/or at least one headrest 1800.

In some embodiments, front-panel 103; rear-panel 105; side-panels 107; bottom-panel 113; and/or thermal-break 1309 may be all be formed, cut, extruded, and/or machined (e.g., CNC) from planar sheet stock material, such as, but not limited to, planar sheet material of: plastic, foam plastic, metal, metal alloys, fiberglass, ceramic, wood, laminates, combinations thereof, portions thereof, and/or the like.

In some embodiments, the predetermined shape of floor-and-sidewalls 101 may be formed/made from planar sheet stock material by bending, rolling, stamping, molding, combinations thereof, portions thereof, and/or the like of that initial planar sheet stock material.

In some embodiments, the predetermined shape of handle(s) 1300 may be formed/made from planar sheet stock material by extrusion, bending, rolling, stamping, molding, combinations thereof, portions thereof, and/or the like of that initial planar sheet stock material.

In various embodiments, any plastics used in the thermal delivery devices 3911 discussed herein may be suitable for injection molding. At least some such plastics used in the material(s) of construction for the thermal delivery devices 3911 discussed herein, such as, but not limited to, soaking-device 100 or portions thereof, if any, may be selected from acrylic, acrylonitrile-butadiene styrene (ABS), polyvinyl chloride (PVC), polycarbonate, nylon, polypropylene, polyethylene (e.g., HDPE), with or without strengthening fibers, in expanded foam variation thereof or not, combinations thereof, portions thereof, and/or the like.

Note with respect to the materials of construction, it is not desired nor intended to thereby unnecessarily limit the present invention by reason of such disclosure.

Soaking-device(s) and portions thereof have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method that is configured for providing thermal therapy to a face of a human to induce a desired outcome in the human, wherein the method comprises at least a step (a) of:

receiving a volume of an immersion-liquid into a vessel, wherein the vessel comprises a flexible-member, wherein the immersion-liquid is within a temperature-range for at least a minimum amount of time;

wherein during the step (a) the method is configured to receive at least some of the face into the volume of the immersion-liquid within the vessel while a front of a neck of the human is removably physically pressing against the flexible-member to form a watertight seal between the flexible-member and the front of the neck;

wherein the immersion-liquid acts a heat transfer medium for the at least some of the face.

2. The method according to claim 1, wherein the thermal therapy comprises: heating the face, cooling the face, or alternating between heating and cooling the face, wherein the heating and/or the cooling of the face is done by the immersion-liquid.

3. The method according to claim 1, wherein the desired outcome in the human is selected from one or more of: a greater release of at least one type of neurotransmitter as compared to when the human is not being treated by the method; improving skin health of the at least some of the face; reducing severity of at least one skin wrinkle of the at least some of the face; reducing acne severity of the at least some of the face; reducing rash severity of the at least some of the face; increased healing of a wound of at least a portion of the at least some of the face; a reduction in bruising of at least a portion of the at least some of the face; a reduction in stress of the human; a reduction in anxiety of the human; a reduction in depression of the human; an increased feeling of relaxation, calmness, and/or contentment in the human; as at least a partial treatment for addiction; as at least a partial treatment for substance abuse; transdermal delivery of at least one chemical within the immersion-liquid across the at least some of the face; a reduction in headache severity of the human; a reduction in sinus pressure of the human; an increase in metabolism as compared to when the human is not being treated by the method; an increase in producing brown fat and browning of white adipose tissue; improving cardiovascular health of the human; reducing pain of the human; as a least a partial treatment of myocardial infarction (heart attack), transient ischemic attack (TIA), and/or stroke in the human; as at least a partial treatment for blepharitis that is commonly known as dry eye in the human; cleaning of an exterior of an eye of the human; as at least a partial treatment for diabetes of the human; as at least a partial means of preventing diabetes in the human; or improved quality of sleep for the human when the method is carried out prior to sleeping.

4. The method according to claim 1, wherein the immersion-liquid comprises water.

5. The method according to claim 1, wherein during execution of the step (a) the method further comprises a step of maintaining the immersion-liquid within the temperature-range by one or more of: insulating at least some of the vessel, heating the immersion-liquid, cooling the immersion-liquid, or alternating between heating and cooling the immersion-liquid.

6. The method according to claim 5, wherein the heating of the immersion-liquid and/or the cooling of the immersion-liquid is done by one or more thermal means.

7. The method according to claim 1, wherein the immersion-liquid comprises a liquid and at least one chemical-additive.

8. The method according to claim 7, wherein the at least one chemical-additive is predetermined and is selected from one or more of: a chemical, a salt, an ion, a molecule, a medicine, a medicament, a pharmaceutical, a carbohydrate, an amino acid, a peptide, a protein, a nucleic acid, a string of deoxyribonucleic acid, a string of ribonucleic acid, a fatty acid, a hormone, an antibiotic, a moisturizer, a skin bleacher, an oxidizer, a skin peal, a skin mud, a skin clay, or a liposome.

9. The method according to claim 7, wherein the at least one chemical-additive is one or more of: naturally occurring, synthetic, human made, water soluble, fat soluble, partially water soluble, partially fat soluble, plant derived, algae derived, animal derived, bacteria derived, fungus derived, archaebacteria derived, or protozoan derived.

10. The method according to claim 7, wherein during execution of the step (a) at least some of the at least one chemical-additive is transdermally delivered across a portion of the at least some of the face.

11. The method according to claim 1, wherein the immersion-liquid is at least predominantly a liquid throughout the temperature-range.

12. The method according to claim 1, wherein during execution of the step (a), the flexible-member does not cover over nor touch a rear portion of the neck of the human, wherein the rear portion is disposed opposite from the front of the neck.

13. The method according to claim 1, wherein at least some of the flexible-member is waterproof.

14. The method according to claim 1, wherein during execution of the step (a), a remainder of a body of the human, below the neck and not including the face, is not in physical contact with the immersion-liquid.

15. The method according to claim 14, wherein the remainder of the body of the human is dry.

16. The method according to claim 1, wherein during execution of the step (a), for at least a portion of the minimum amount of time, the method further comprises use of one or more accessories.

17. The method according to claim 1, wherein the one or more accessories comprises one or more of: a breathing-apparatus that is configured to permit the human to breathe while the at least some of the face is immersed within the immersion-liquid; a headrest that is configured to support a head of the human while the at least some of the face is immersed within the immersion-liquid; a means for releasing of gas bubbles into the immersion-liquid while the at least some of the face is immersed within the immersion-liquid; electrodes for electrifying the immersion-liquid while the at least some of the face is immersed within the immersion-liquid to provide some electro-stimulation to the at least some of the face; or a means of emitting electromagnetic radiation into the immersion-liquid while the at least some of the face is immersed within the immersion-liquid.

18. The method according to claim 1, wherein prior to the method executing the step (a), the method further comprises a step of receiving the at least some of the face into the volume of the immersion-liquid that is residing within the vessel.

19. The method according to claim 1, wherein the vessel comprises a top that is at least substantially open.

20. A soaking device comprising:

a vessel having an open top and capable of holding a liquid in an interior volume of the vessel; and a breathing apparatus comprising:

a mouth piece member, at least one tubing, and at least one connector, wherein the at least one tubing comprises two opposing terminal ends, wherein one of the two opposing terminals ends is connected to the mouth piece member and the other of the two opposing terminal ends is connected to the at least one connector, wherein the at least one connector is configured to be attachable to a side wall of the vessel, wherein the breathing apparatus is configured to permit a user to breathe while a face of the user is at least partially submerged within the liquid in the interior volume of the vessel;

wherein the mouth piece member is movable from below the at least one connector to above the at least one connector when the at least one connector is attached to the side wall.

21. A method that is configured for providing thermal therapy to a face of a human to induce a desired outcome in the human, wherein the method comprises at least a step (a) of:

receiving a volume of an immersion-liquid into a vessel, wherein the immersion-liquid is within a temperature-range for at least a minimum amount of time;

wherein a breathing apparatus is configured to be attachable to a side wall of the vessel;

wherein the breathing apparatus comprises a mouth piece member, at least one tubing, and at least one connector, wherein the at least one tubing comprises two opposing terminal ends, wherein one of the two opposing terminals ends is connected to the mouth piece member and the other of the two opposing terminal ends is connected to the at least one connector, wherein the at least one connector is configured to be attachable to the side wall;

wherein the breathing apparatus is configured to permit the human to breathe while at least some the face of the human is at least partially submerged within the immersion-liquid in the vessel;

wherein during the step (a), the method is configured to receive the at least some of the face into the volume of the immersion-liquid within the vessel while the human breathes through the breathing apparatus;

wherein the mouth piece member is movable from below the at least one connector to above the at least one connector when the at least one connector is attached to the side wall.

* * * * *